(12) United States Patent
Nakayama et al.

(10) Patent No.: US 6,897,176 B2
(45) Date of Patent: May 24, 2005

(54) OLEFIN POLYMERIZATION CATALYST AND PROCESS FOR PRODUCING OLEFIN POLYMER WITH THE CATALYST

(75) Inventors: Yasushi Nakayama, Sodegaura (JP); Hideyuki Kaneko, Sodegaura (JP); Hideki Bandoh, Sodegaura (JP); Yoshiho Sonobe, Sodegaura (JP); Junji Saito, Sodegaura (JP); Shinichi Kojoh, Sodegaura (JP); Makoto Mitani, Sodegaura (JP); Yasuhiko Suzuki, Sodegaura (JP); Shigekazu Matsui, Sodegaura (JP); Norio Kashiwa, Sodegaura (JP); Terunori Fujita, Sodegaura (JP)

(73) Assignee: Mitsui Chemicals, Inc., Tokyo (JP)

( * ) Notice: Subject to any disclaimer, the term of this patent is extended or adjusted under 35 U.S.C. 154(b) by 262 days.

(21) Appl. No.: 10/078,670

(22) Filed: Feb. 21, 2002

(65) Prior Publication Data

US 2002/0169072 A1 Nov. 14, 2002

(30) Foreign Application Priority Data

| Feb. 21, 2001 | (JP) | ......... 2001-45632 |
| Feb. 21, 2001 | (JP) | ......... 2001-45633 |
| Nov. 9, 2001 | (JP) | ......... 2001-344587 |

(51) Int. Cl.[7] .............. B01J 31/00; C08F 4/44
(52) U.S. Cl. .............. 502/155; 502/167; 502/226; 526/172
(58) Field of Search .............. 502/155, 167, 502/226; 526/172, 161, 171

(56) References Cited

U.S. PATENT DOCUMENTS

| 3,756,998 A | 9/1973 | Karapinka |
| 5,321,106 A | 6/1994 | LaPointe |
| 5,688,733 A | 11/1997 | Renkema et al. |
| 2002/0193536 A1 | 12/2002 | Kashiwamura et al. |

FOREIGN PATENT DOCUMENTS

| DE | 99 556 A | 8/1973 |
| EP | 0 427 697 A2 | 5/1991 |
| EP | 0 500 392 A2 | 8/1992 |
| EP | 0 574 794 A1 | 12/1993 |
| EP | 0 590 486 A2 | 4/1994 |
| EP | 0 924 223 A2 * | 6/1999 |
| EP | 0 945 471 A1 | 9/1999 |
| EP | 0 950 667 A2 | 10/1999 |
| EP | 0 985 685 A1 | 3/2000 |
| EP | 0 990 664 A1 | 4/2000 |
| EP | 1 026 176 A1 | 8/2000 |
| EP | 1 054 021 A1 | 11/2000 |
| EP | 1 136 122 A1 | 9/2001 |
| EP | 1 170 308 A2 | 1/2002 |
| EP | 1 243 598 A1 | 9/2002 |

(Continued)

OTHER PUBLICATIONS

Brookhart et al., J. Am. Chem. Soc., 1995, vol. 117, pp. 6414–6415.

(Continued)

*Primary Examiner*—Robert D. Harlan
(74) *Attorney, Agent, or Firm*—Birch, Stewart, Kolasch & Birch, LLP

(57) ABSTRACT

A novel olefin polymerization catalyst is provided which comprises (A) a transition metal compound or lanthanoid compound containing two or more atoms selected from the group consisting of boron, nitrogen, oxygen, phosphorus, sulfur, and selenium; and (B) a Lewis acid. A process for producing an olefin polymer is also provided. The catalyst has a high olefin polymerization activity without a combined use of an expensive organoaluminum oxy-compound or organoboron compound, and can maintain the high activity for a long polymerization time.

5 Claims, 1 Drawing Sheet

FOREIGN PATENT DOCUMENTS

| | | |
|---|---|---|
| GB | 1 314 053 A | 4/1973 |
| GB | 1 341 275 A | 12/1973 |
| JP | 62-275106 A | 11/1987 |
| JP | A 501950 | 8/1988 |
| JP | A 502036 | 8/1988 |
| JP | 3179005 | 5/1991 |
| JP | 3179006 | 5/1991 |
| JP | 3207703 | 5/1991 |
| JP | 3207704 | 5/1991 |
| JP | 6-136049 A | 5/1994 |
| JP | 6-340711 A | 12/1994 |
| JP | 8-27210 A | 1/1996 |
| JP | 8-34811 A | 2/1996 |
| JP | 8-245715 A | 9/1996 |
| JP | 9-278821 A | 10/1997 |
| JP | 10-7713 A | 1/1998 |
| JP | 10-182679 A | 7/1998 |
| JP | 10-195128 A | 7/1998 |
| JP | 10-298216 A | 11/1998 |
| JP | 10-324709 A | 12/1998 |
| JP | 10-324710 A | 12/1998 |
| JP | 10-330411 A | 12/1998 |
| JP | 11-29610 A | 2/1999 |
| JP | 11-80231 A | 3/1999 |
| JP | 11-100394 A | 4/1999 |
| JP | 11-181016 A | 7/1999 |
| JP | 11-199593 A | 7/1999 |
| JP | 11-199595 A | 7/1999 |
| JP | 11-292911 A | 10/1999 |
| JP | 2000-1513 A | 1/2000 |
| JP | 2000-86677 A | 3/2000 |
| JP | 2000-264913 A | 9/2000 |
| JP | 2000-273114 A | 10/2000 |
| JP | 2000-302810 A | 10/2000 |
| JP | 2001-2724 A | 1/2001 |
| JP | 2001-187345 A | 7/2001 |
| JP | 2001-192405 A | 7/2001 |
| JP | 2001-200010 A | 7/2001 |
| JP | 2001-213913 A | 8/2001 |
| JP | 2001-316413 A | 11/2001 |
| JP | 2002-53611 A | 2/2002 |
| WO | WO 92/00808 | 1/1992 |
| WO | WO 98/03559 A1 | 1/1998 |
| WO | WO 99/19335 | 4/1999 |
| WO | WO 99/62968 A1 | 12/1999 |
| WO | WO 00/20427 A | 4/2000 |
| WO | WO 01/30861 A1 | 5/2001 |
| WO | WO 01/74831 A1 | 10/2001 |
| WO | WO 01/83571 A2 | 11/2001 |
| WO | WO 02/06358 A1 | 1/2002 |
| WO | WO 02/36642 A2 | 5/2002 |

OTHER PUBLICATIONS

Brookart et al., J. Am. Chem. Soc., 1996, vol. 118, pp. 267–268.
Brookhart et al., J. Am. Chem. Soc., 1996, vol. 118, pp. 11664–11665.
Brookhart et al., J. Am. Chem. Soc., 1998, vol. 120, No. 16, pp. 4048–4049.
Gibson et al., Chem. Commun., 1998, pp. 849–850.
McConville et al., Macromolecules, 1996, vol. 29, pp. 5241–5243.
Jordan et al., Organometallics, 1997, vol. 16, pp. 3283–3302.
Collins et al., Organometallics, vol. 18, No. 15, 1999, pp. 2731–2735.
Eisen et al., Organometallics, 1998, vol. 17, pp. 3155–3157.
Eisen et al., J. Am. Chem. Soc., 1998, vol. 120, pp. 8640–8646.
Jordan et al., J. Am. Chem. Soc., 1997, vol. 119, pp. 8125–8127.
Hakala et al., Macromol. Rapid Commun., 1997, vol. 18, pp. 635–638.
Fujita et al., Journal of Molecular Catalysis A: Chemical 169 (2001), pp. 99–104.
Fujita et al., Catalysis Today, 2001, pp. 63–73.
Fujita et al., Chemistry Letters 2000, pp. 554–555.
Journal of the American Chemical Society, 2001, vol. 123, pp. 6847–6856.

* cited by examiner

OLEFIN POLYMERIZATION CATALYST AND PROCESS FOR PRODUCING OLEFIN POLYMER WITH THE CATALYST

BACKGROUND OF THE INVENTION

1. Field of the Invention

The present invention relates to an olefin polymerization catalyst and a process for producing an olefin polymer with the catalyst. More specifically, the present invention relates to an olefin polymerization catalyst which contains neither an organoaluminum oxy-compound nor an organoboron compound conventionally used as a catalyst component for olefin polymerization, and to a process for producing an olefin polymer with the catalyst.

2. Related Background Art

Recently, the transition metal compounds and lanthanoid compounds containing two or more atoms selected from B, N, O, S, and Se are attracting attention as highly active catalysts for olefin polymerization, as shown, for example, by the papers below:

(1) Brookhart et al., J.Am.Chem.Soc., 117, 6414, (1995)
(2) Brookhart et al., J.Am.Chem.Soc., 118, 267 (1996)
(3) Brookhart et al., J.Am.Chem.Soc., 118, 11664 (1996)
(4) Brookhart et al., J.Am.Chem.Soc., 120, 4049 (1998)
(5) Gibson et al., Chem.Commun., 849 (1998)
(6) McConville et al., Macromolecules, 29, 5241 (1996)
(7) Jordan et al., Organometallics, 16, 3282 (1997)
(8) Collins et al., Organometallics, 18, 2731 (1999)
(9) Eisen et al., Organometallics, 17, 3155 (1998)
(10) Eisen et al, J.Am.Chem.Soc., 120, 8640 (1998)
(11) Jordan et al., J.Am.Chem.Soc., 119, 8125 (1997)
(12) Hakala et al., Macromol.Rapid Commun., 18, 635–638 (1997).

In known processes, however, these catalysts are necessarily used in combination with an expensive organoaluminum oxy-compound or organoboron compound for high olefin polymerization catalyst activity. The high olefin polymerization catalyst activity obtained in combination with the expensive organoaluminum oxy-compound or organoboron compound can be kept only for a short time: the high activity for an olefin polymerization is not retainable for a long time, for example 30 minutes or longer, which period is adopted in the conventional industrial production process.

Therefore, the catalyst is desired which has higher polymerization activity without the expensive organoaluminum oxy-compound or organoboron compound and which has a higher activity for a long catalyst life, such as 30 minutes or more, in polymerization in a conventional industrial process.

SUMMARY OF THE INVENTION

The present invention has been achieved on the aforementioned background. The present invention intends to provide a catalyst which has higher polymerization activity without using the expensive organoaluminum oxy-compound or organoboron compound and has the high activity for a longer time. The present invention intends also to provide a process for producing an olefin polymer employing the catalyst.

The olefin polymerization catalyst of an embodiment of the present invention comprises:

(A) a transition metal compound or lanthanoid compound containing two or more atoms selected from the group consisting of boron, nitrogen, oxygen, phosphorus, sulfur, and selenium; and
(B) a Lewis acid.

Another embodiment of the olefin polymerization catalyst of the present invention comprises:

(A) a transition metal compound or lanthanoid compound containing two or more atoms selected from the group consisting of boron, nitrogen, oxygen, phosphorus, sulfur, and selenium;
(B) a Lewis acid; and
(C) an oxygen-containing compound or nitrogen-containing compound.

Such an olefin polymerization catalyst includes contact mixture of a transition metal compound or lanthanoid compound containing two or more atoms selected from the group consisting of boron, nitrogen, oxygen, phosphorus, sulfur, and selenium (A) and a Lewis acid (B), and an oxygen-containing compound or nitrogen-containing compound (C).

Still another embodiment of the olefin polymerization catalyst of the present invention comprises:

(A) a transition metal compound or lanthanoid compound containing two or more atoms selected from the group consisting of boron, nitrogen, oxygen, phosphorus, sulfur, and selenium;
(B) a Lewis acid;
(C) an oxygen-containing compound or nitrogen-containing compound; and
(D) an inactivating compound which is capable of reacting with the above oxygen-containing compound or nitrogen-containing compound (C) to make inactive the oxygen-containing compound or nitrogen-containing compound (C) to the compound (A).

Such a type of olefin polymerization catalyst, which comprises a transition metal compound or lanthanoid compound (A), a Lewis acid (B), an oxygen-containing compound or nitrogen-containing compound (C), and an inactivating compound (D), includes catalysts prepared by contact-mixing preliminarily an oxygen-containing compound or nitrogen-containing compound (C) and an inactivating compound (D) before contact of the transition metal compound or lanthanoid compound (A) with the oxygen-containing compound or nitrogen-containing compound (C); and catalysts comprising (A) a transition metal compound or lanthanoid compound containing two or more atoms selected from the group consisting of boron, nitrogen, oxygen, phosphorus, sulfur, and selenium; and a contact mixture of (B) a Lewis acid, (C) an oxygen-containing compound or nitrogen-containing compound; and (D) an inactivating compound.

The Lewis acid (B) is at least the one selected from the group of compounds of (b-1) to (b-4):

(b-1) ionic-bonding compounds having a $CdCl_2$ type or a $CdI_2$ type of layered crystal structure;
(b-2) clays•clay minerals, or ion-exchange layered compounds;
(b-3) heteropoly-compounds; and
(b-4) halogenated lanthanoid compounds.

The aforementioned Lewis acid (B) includes halogenated compounds selected from halogenated compounds of magnesium, halogenated compounds of manganese, halogenated compounds of iron, halogenated compounds of cobalt, and halogenated compounds of nickel. The Lewis acid (B) is prepared preferably by deposition from a liquid.

The aforementioned inactivating compound (D) includes at least one compound selected from organoaluminum compounds, halogenated titanium compounds, and halogenated silane compounds.

The process for producing an olefin polymer of the present invention comprises homopolymerizing or copolymerizing an olefin or olefins in the presence of any of the aforementioned olefin polymerization catalysts and optionally (E) an organoaluminum compound.

The olefin polymerization catalyst and the process for olefin polymer production exhibit high olefin polymerization catalyst activity retained for a long polymerization time

DESCRIPTION OF THE PREFERRED EMBODIMENTS

Figure 1:
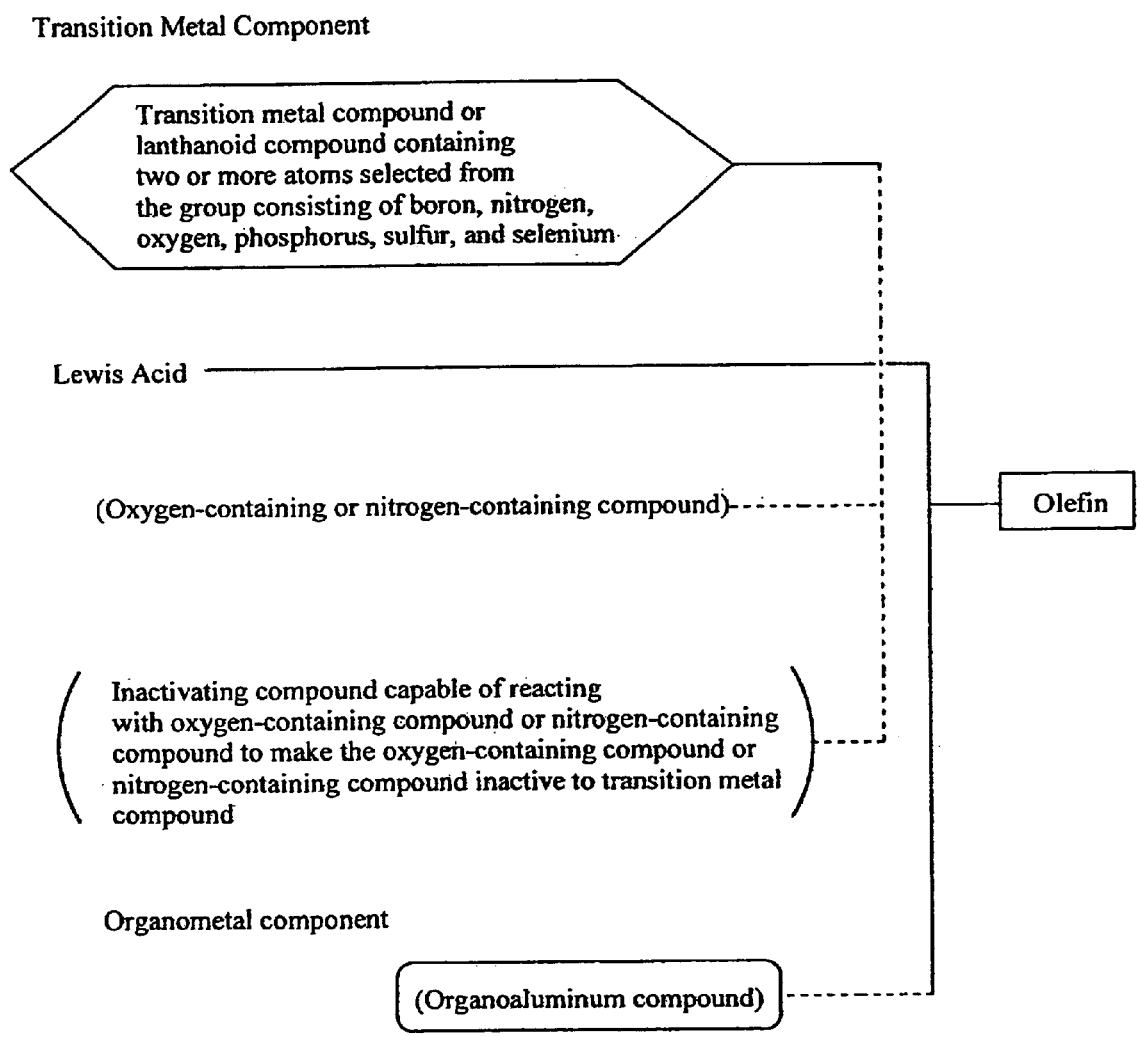
FIG. 1 is a chart for explaining an example of the process for preparing the olefin polymerization catalyst of the present invention.

The olefin polymerization catalyst of the present invention and the process for producing an olefin polymer employing the catalyst of the present invention are explained below.

In the present invention, the term "polymerization" signifies not only homopolymerization but also copolymerization, and the term "polymer" signifies not only homopolymers but also copolymers.

Olefin Polymerization Catalyst

An embodiment of the olefin polymerization catalyst of the present invention comprises:

(A) a transition metal compound or lanthanoid compound containing two or more atoms selected from the group consisting of boron, nitrogen, oxygen, phosphorus, sulfur, and selenium; and (B) a Lewis acid.

Another embodiment of the olefin polymerization catalyst of the present invention comprises:

(A) a transition metal compound or lanthanoid compound containing two or more atoms selected from the group consisting of boron, nitrogen, oxygen, phosphorus, sulfur, and selenium;

(B) a Lewis acid; and (C) an oxygen-containing compound or nitrogen-containing compound.

Still another embodiment of the olefin polymerization catalyst of the present invention comprises:

(A) a transition metal compound or lanthanoid compound containing two or more atoms selected from the group consisting of boron, nitrogen, oxygen, phosphorus, sulfur, and selenium;

(B) a Lewis acid;

(C) an oxygen-containing compound or nitrogen-containing compound; and (D) an inactivating compound which is capable of reacting with the above oxygen-containing compound or nitrogen-containing compound (C) to inactivate the oxygen-containing compound or nitrogen-containing compound against the compound (A).

Firstly, the catalyst components are explained which constitute the olefin polymerization catalyst of the present invention.

(A) Transition Metal Compound or Lanthanoid Compound Containing Two or More Atoms Selected From the Group Consisting of Boron, Nitrogen, Oxygen, Phosphorus, Sulfur, and Selenium The compound (A), namely a transition metal compound or lanthanoid compound containing two or more atoms selected from the group consisting of boron, nitrogen, oxygen, phosphorus, sulfur, and selenium includes compounds (a-1) to (a-27) shown below. Such a transition metal compound or a lanthanoid compound may be used singly or in combination of two or more thereof.

[Compound (a-1)]

The component (A) in the present invention includes the compounds (a-1) represented by General Formulas (I) to (III).

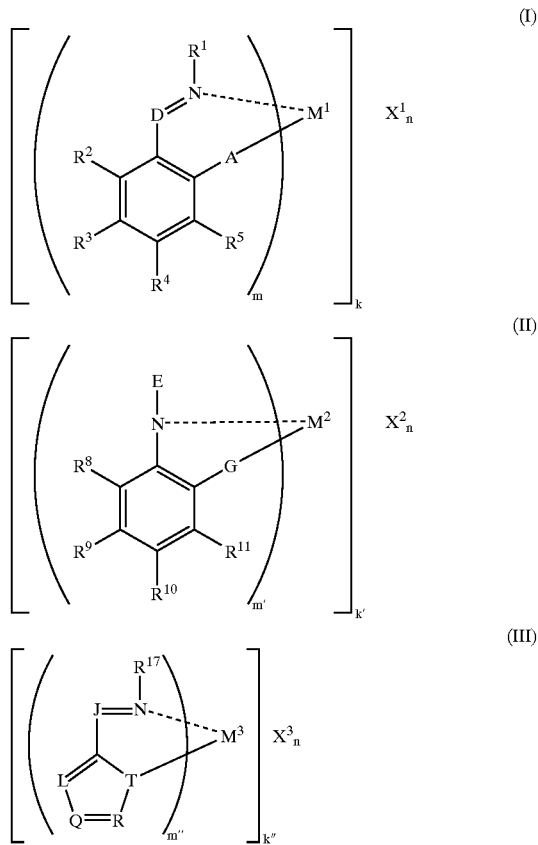

wherein the dotted lines of N - - - - - $M^1$, N - - - - - $M^2$, and N - - - - - $M^3$ signify coordination as well as non-coordination although the dotted line generally signifies coordination.

The symbols $M^1$ in General Formula (I), $M^2$ in General Formula (II), and $M^3$ in General Formula (III) represent the same or different moieties within each of the formulas, and represent respectively a transition metal atom selected from Groups 3–11 of Periodical Table (Group 3 including lanthanoids), preferably a transition metal atom selected from Groups 3–6 and 8–10, more preferably a transition metal atom selected from Groups 4, 5, and 6, still more preferably a metal of Group 4 or 5: specifically including scandium, titanium, zirconium, hafnium, vanadium, niobium, tantalum, cobalt, rhodium, yttrium, chromium, molybdenum, tungsten, manganese, rhenium, iron, ruthenium, nickel, and palladium; preferably scandium, titanium, zirconium, hafnium, vanadium, niobium, tantalum, iron, cobalt, rhodium, nickel, and palladium; more preferably titanium, zirconium, hafnium, vanadium, niobium, tantalum, chromium, and molybdenum; still more preferably titanium, zirconium, hafnium, vanadium, niobium, and tantalum.

The symbols m in Formula (I), m' in Formula (II), and m" in Formula (III) represent the same or different numbers in each of the formulas, and are respectively an integer of 1 to 6, preferably 1 to 4, more preferably 1 to 3, still more preferably 1 to 3, still more preferably 1 to 2.

The symbols k in Formula (I), k' in Formula (II), and k" in Formula (III) represent the same or different numbers in each of Formulas, and are respectively an integer of 1 to 6, preferably 1 to 4, more preferably 1 to 3, still more preferably 1 to 3, still more preferably 1 to 2.

The symbol A in Formula (I) represents an oxygen atom, a sulfur atom, a selenium atom, or a nitrogen atom having a substituent —$R^6$ (—$N(R^6)$—); preferably an oxygen atom or a nitrogen atom.

The symbol D in Formula (I) represents a nitrogen atom, a phosphorus atom, or a carbon atom having a substituent —$R^7$ (—$C(R^7)$—); preferably a carbon atom having a substituent —$R^7$.

The symbols $R^1$–$R^7$ in Formula (I) represent the same or different moieties, and represent respectively a hydrogen atom, a halogen atom, a hydrocarbon group, an oxygen-containing group, a nitrogen-containing group, a boron-containing group, a sulfur-containing group, a phosphorus-containing group, a heterocyclic compound residue, a silicon-containing group, a germanium-containing group, or a tin-containing group; and two or more thereof may be joined together to form one or more rings.

The symbol G in Formula (II) represents an oxygen atom, a sulfur atom, a selenium atom, or a nitrogen atom having a substituent —$R^{12}$ (—$N(R^{12})$—); preferably an oxygen atom.

The symbol E in Formula (II) represents groups of —$R^{13}$ and —$R^{14}$, or =$C(R^{15})R^{16}$.

The symbols $R^8$–$R^{16}$ in Formula (II) represent the same or different moieties, and represent a hydrogen atom, a halogen atom, a hydrocarbon group, an oxygen-containing group, a nitrogen-containing group, a boron-containing group, a sulfur-containing group, a phosphorus-containing group, a heterocyclic compound residue, a silicon-containing group, a germanium-containing group, or a tin-containing group; and two or more thereof may be joined together to form one or more rings.

The symbol J in Formula (III) represents a nitrogen atom, a phosphorus atom, or a carbon atom having a substituent —$R^{18}$ (—$C(R^{18})$=); preferably a carbon atom having a substituent —$R^{18}$.

The symbol T in Formula (III) represents a nitrogen atom or a phosphorus atom; preferably a nitrogen atom.

The symbol L in Formula (III) represents a nitrogen atom, a phosphorus atom, or a carbon atom having a substituent —$R^{19}$ (—$C(R^{19})$=); preferably a carbon atom having a substituent —$R^{19}$.

The symbol Q in Formula (III) represents a nitrogen atom, a phosphorus atom, or a carbon atom having a substituent —$R^{20}$ (—$C(R\ 2)$=); preferably a carbon atom having a substituent —$R^{20}$.

The symbol R in Formula (III) represents a nitrogen atom, a phosphorus atom, or a carbon atom having a substituent —$R^{21}$ (—$C(R\ 21)$=); preferably a carbon atom having a substituent —$R^{21}$.

The symbols $R^{17}$-R in Formula (III) represent the same or different moieties: respectively a hydrogen atom, a halogen atom, a hydrocarbon group, an oxygen-containing group, a nitrogen-containing group, a boron-containing group, a sulfur-containing group, a phosphorus-containing group, a heterocyclic compound residue, a silicon-containing group, a germanium-containing group, or a tin-containing group; and two or more thereof may be joined together to form one or more rings.

In Formula (I), when m is 2 or more, $R^1$ groups, $R^2$ groups, $R^3$ groups, $R^4$ groups, $R^5$ groups, $R^6$ groups, and $R^7$ groups may be the same or different within the groups; and when m is 2 or more, two of the groups of $R^1$–$R^7$ may be linked together.

In Formula (II), when m' is 2 or more, $R^8$ groups, $R^9$ groups, $R^{10}$ groups, $R^{11}$ groups, $R^{12}$ groups, $R^{13}$ groups, $R^{14}$ groups, $R^{15}$ groups, and $R^{16}$ groups may be the same or different; and when m' is 2 or more, two of the groups of $R^8$–$R^{16}$ may be linked together.

In Formula (III), when m" is 2 or more, $R^{17}$ groups, $R^{18}$ groups, $R^{19}$ groups, $R^{20}$ groups, and $R^{21}$ groups, may be the same or different; and when m'" is 2 or more, two of the groups of $R^{17}$–$R^{21}$ may be linked together.

The halogen atoms represented by $R^1$–$R^7$ in Formula (I), $R^8$–$R^{16}$ in Formula (II), and $R^{17}$–$R^{21}$ in Formula (III) include fluorine, chlorine, bromine, and iodine.

The hydrocarbon groups represented by $R^1$–$R^7$ in Formula (I), $R^8$–$R^{16}$ in Formula (II), and $R^{17}$–$R^{21}$ in Formula (III) include linear and branched alkyl groups of 1–30 carbon atoms, preferably 1–20 carbon atoms such as methyl, ethyl, n-propyl, isopropyl, n-butyl, isobutyl, s-butyl, t-butyl, neopentyl, and n-hexyl; linear and branched alkenyl groups of 2–30 carbon atoms, preferably 2–20 carbon atoms such as vinyl, allyl, and isopropenyl;

linear and branched alkynyl groups of 2–30 carbon atoms, preferably 2–20 carbons such as ethynyl, and propargyl; cyclic saturated hydrocarbon groups of 3–30 carbon atoms, preferably 3–20 carbon atoms such as cyclopropyl, cyclobutyl, cyclopentyl, cyclohexyl, and adamantyl;

cyclic unsaturated hydrocarbon groups of 5–30 carbon atoms such as cyclopentadienyl, indenyl, and fluorenyl;

aryl groups of 6–30 carbon atoms, preferably 6–20 carbon atoms such as phenyl, benzyl, naphthyl, biphenylyl, terphenylyl, phenanthryl, and anthryl; and alkyl-substituted aryl groups such as methylphenyl, isopropylphenyl, t-butylphenyl, dimethylphenyl, diisopropylphenyl, di-t-butylphenyl, trimethylphenyl, triisopropylphenyl, and tri-t-butylphenyl.

The aforementioned hydrocarbon groups may have a hydrogen atom substituted by a halogen, being exemplified by halogenated hydrocarbon groups of 1–30 carbon atoms, preferably 1–20 carbon atoms such as trifluoromethyl, pentafluorophenyl, and chlorophenyl.

The aforementioned hydrocarbon groups may be substituted by another hydrocarbon group, exemplified by aryl-substituted alkyl such as benzyl, and cumyl.

Further, the aforementioned hydrocarbon groups may be substituted by a heterocyclic compound residue; an oxygen-containing group such as alkoxy, aryloxy, ester groups, ether groups, acyl, carboxyl, carbonato, hydroxy, peroxy, and carbonic anhydride; a nitrogen-containing group such as amino, imino, amido, imido, hydrazino, hydrazono, nitro, nitroso, cyano, isocyano, cyanate ester groups, amidino, diazo, and ammonium salt-type amino; a boron-containing group such as boranediyl, boranetriyl, and diboranyl; a sulfur-containing group such as mercapto, thioester groups, dithioester groups, alkylthio, arylthio, thioacyl, thioethere groups, thiocyanate ester groups, isothiocyanate ester groups, sulfone ester groups, sulfonamido, thiocarboxyl, dithiocarboxyl, sulfo, sulfonyl, sulfinyl, and sulfenyl; a phosphorus-containing group such as phosphido, phosphoryl, thiophosphoryl, and phosphate; a silicon-substituted group, a germanium-containing group, a tin-containing group, and so forth.

As described above, the hydrocarbon group may be substituted by an oxygen-containing group, a nitrogen-containing group, a boron-containing group, a sulfur-containing group, a phosphorus-containing group, a silicon-substituted group, a germanium-containing group, a tin-containing group, or the like. In this substitution, the substituent like the oxygen-containing group is preferably not directly bonded with the characteristic atomic group thereof to the carbon atom of N or D in Formula (I), to the carbon atom of E in Formula (II), or to the carbon atom of J, L, Q, T, or R.

Of the substituents, particularly preferred are linear and branched alkyl groups of 1–30 carbon atoms, preferably 1–20 carbon atoms such as methyl, ethyl, n-propyl, isopropyl, n-butyl, isobutyl, s-butyl, t-butyl, neopentyl, and n-hexyl; aryl groups of 6–30 carbon atoms, preferably 6–20 carbon atoms such as phenyl, naphthyl, biphenylyl, terphenylyl, and phenanthryl; and substituted aryl groups having 1–5 substitutents such as a halogen atom, an alkyl or alkoxy group having 1–30 carbon atoms, preferably 1–20 carbon atoms, an aryl or aryloxy group of 6–30 carbon atoms, preferably 6–20 carbon atoms.

Two or more of the groups $R^1$–$R^7$, preferably adjacent ones, may be joined together to form one or more rings. Two or more of the groups $R^8$–$R^{16}$, preferably adjacent ones, may be joined together to form one or more rings. Two or more of the groups $R^{17}$–$R^{21}$, preferably adjacent ones, may be linked together to form one or more rings. The ring is exemplified by a benzene ring; condensed rings such as a naphtalene ring, an acenaphthene ring, an indene ring, and the group that hydrogen atom of above condensed rings is substituted by an alkyl group such as methyl, ethyl, propyl, and butyl.

The oxygen-containing group represented by $R^1$–$R^7$ in Formula (I), $R^8$–$R^{16}$ in Formula (II), and $R^{17}$–$R^{21}$ in Formula (III) contains 1–5 oxygen atoms in the group, excluding the heterocyclic compound residue shown below. The oxygen-containing group does not include those containing additionally a nitrogen atom, a sulfur atom, a phosphorus atom, a halogen atom, or a silicon atom which is bonded directly to the oxygen atom. The oxygen-containing group includes specifically alkoxy, aryloxy, ester groups, ether groups, acyl, carboxyl, carbonate, hydroxy, peroxy, and carboxylic anhydride groups. Of these, preferred are alkoxy, aryloxy, acetoxy, carbonyl, hydroxy, and so forth. The oxygen-containing group, which contains a carbon atom or atoms, has 1–30 carbon atoms, preferably 1–20 carbon atoms.

The nitrogen-containing group represented by $R^1$–$R^7$ in Formula (I), $R^8$–$R^{16}$ in Formula (II), and $R^{17}$–$R^{21}$ in Formula (III) contains 1–5 nitrogen atoms in the group, excluding the heterocyclic compound residues shown later. The nitrogen-containing group includes specifically amino, imino, amide groups, imide groups, hydrozino, hydrazono, nitro, nitroso, cyano, isocyano, cyanate ester groups, amidino, diazo, and amino in a form of an ammonium salt. Of these, preferred are amino, imino, amido, imido, nitro, and cyano. The nitrogen-containing group, which contains a carbon atom or atoms, has 1–30 carbon atoms, preferably 1–20 carbon atoms.

The boron-containing group represented by $R^1$–$R^7$ in Formula (I), $R^8$–$R^{16}$ in Formula (II), and $R^{17}$–$R^{21}$ in Formula (III) contains 1–5 boron atoms in the group, excluding the heterocyclic compound residues shown below. The boron-containing group includes specifically boranediyl, boranetriyl, diboranyl, and the like. The boryl group which has one or two hydrocarbon groups, and the borate group which has one to three hydrocarbon groups of 1–30 carbon atoms, preferably 1–20 carbon atoms are preferred. The two or more substituting hydrocarbon groups may be the same or different.

The sulfur-containing group represented by $R^1$–$R^7$ in Formula (I), $R^8$–$R^{16}$ in Formula (II), and $R^{17}$–$R^{21}$ in Formula (III) contains 1–5 sulfur atoms in the group, excluding the heterocyclic compound residues shown below. The sulfur-containing group includes specifically mercapto, thioester groups, dithioester groups, alkylthio, arylthio, thioacyl, thioether groups, thicyanate ester groups, isothicyanate ester groups, sulfonate ester groups, sulfonamido, thiocarboxyl, dithiocarboxyl, sulfo, sulfonyl, sulfinyl, sulfenyl, sulfonato, and sulfinato. Of these, preferred are sulfonate, sulfinato, alkylthio and arylthio. The sulfur-containing group, which contains a carbon atom or atoms, has 1–30 carbon atoms, preferably 1–20 carbon atoms.

The phosphorus-containing group represented by $R^1$–$R^7$ in Formula (I), $R^8$–$R^{16}$ in Formula (II), and $R^{17}$–$R^{21}$ in Formula (III) contains 1–5 phosphorus atoms in the group, excluding the heterocyclic compound residue shown below. The phosphorus containing group includes specifically phosphino, phosphoryl, phosphothioyl, and phosphono.

The heterocyclic compound residue represented by $R^1$–$R^7$ in Formula (I), $R^8$–$R^{16}$ in Formula (II), and $R^{17}$–$R^{21}$ in Formula (III) contains 1–5 heteroatoms in the group of cyclic group. The heteroatom includes O, N, S, P, and B. The ring includes 4- to 7-membered monocyclic or polycyclic moieties, preferably 5- or 6-membered monocyclic or polycyclic moieties. Specifically, the heterocyclic compound residue includes residues of nitrogen-containing compounds such as pyrrole, pyridine, pyrimidine, quinoline, and triazine; residues of oxygen-containing compound such as furan, and pyran; residues of sulfur-containing compound such as thiphene; and the above residues substituted further by an alkyl group of 1–30 carbon atoms, preferably 1–20 carbon atoms, or by an alkoxy group of 1–30 carbon atoms, preferably 1–20 carbon atoms.

The silicon-containing group represented by $R^1$–$R^7$ in Formula (I), $R^8$–$R^{16}$ in Formula (II), and $R^{17}$–$R^{21}$ in Formula (III) contains 1–5 silicon atoms in the group, including silyl groups such as hydrocarbon-substituted silyl; and siloxy groups such as hydrocarbon-substituted siloxy. Specifically the silicon-containing group includes methylsilyl, dimethylsilyl, trimethylsilyl, ethylsilyl, diethylsilyl, triethylsilyl, diphenylmethylsilyl, triphenylsilyl, dimethylphenylsilyl, dimethyl-t-butylsilyl, and dimethyl (pentafluorophenyl) silyl. Of these, preferred are methylsilyl, dimethylsilyl, trimethylsilyl, ethylsilyl, diethylsilyl, triethylsilyl, dimethylphenylsilyl, and triphenylsilyl; particularly preferred are trimethylsilyl, triethylsilyl, triphenylsilyl, and dimethylphenylsilyl. The hydrocarbon-substituted siloxy group is exemplified specifically by trimethylsiloxy. The silicon-containing group, which contains a carbon atom or atoms, has 1–30 carbon atoms, preferably 1–20 carbon atoms.

The germanium-containing group and the tin-containing group represented by $R^1$–$R^7$ in Formula (I), $R^8$–$R^{16}$ in Formula (II), and $R^{17}$–$R^{21}$ in Formula (III) include the above silicon-substituted groups having the silicon replaced by germanium or tin.

The examples of groups $R^1$–$R^7$ in Formula (I), $R^8$–$R^{16}$ in Formula (II), and $R^{17}$–$R^{21}$ in Formula (III) are explained more specifically.

The oxygen-containing group includes alkoxy groups such as methoxy, ethoxy, n-propoxy, isopropoxy, n-butoxy, isobutoxy, and t-butoxy; aryloxy groups such as phenoxy, 2,6-dimethylphenoxy, and 2,4,6-trimethylphenoxy; acyl groups such as formyl, acetyl, benzoyl, p-chlorobenzoyl, and p-methoxybenzoyl; ester groups such as acetyloxy, benzoyloxy, methoxycarbonyl, phenoxycarbonyl, and p-chlorophenoxycarbonyl.

The nitrogen-containing group includes amino groups including alkylamino such as methylamino, dimethylamino, diethylamino, dipropylamino, dibutylamino, and dicyclohexylamino; and arylamino and alkylarylamino such as phenylamino, diphenylamino, ditolylamino, dinaphthylamino, and methylphenylamino; imino groups such as methylimino, ethylimino, propylimino, butylimino, and phenylimino; amido groups such as acetamido, N-methylacetamido, and N-methylbenzamido; and imido groups such as acetimido, and benzimide.

The sulfur-containing group includes alkylthio groups such as methylthio, and ethylthio; arylthio groups such as phenylthio, methylphenylthio, and naphtylthio; thioester groups such as acetylthio, benzoylthio, methylthiocarbonyl, and phenylthiocarbonyl; sulfonic ester groups such as methylsulfonate, ethylsulfonate, and phenylsulfonate; sulfonamido groups such as phenylsulfonamido, N-methylsulfonamido, and N-methyl-p-toluenesulfonamido.

The sulfonate group includes methylsulfonate, trifluoromethanesulfonate, phenylsulfonate, benzylsulfonate, p-toluenesulfonate, trimethylbenzenesulfonate, triisobutylbenzenesulfonate, p-chlorobenzenesulfonate, and pentafolurobenzenesulfonate. The sulfinate group includes methylsulfinate, phenylsulfinate, benzylsulfinate, p-toluenesulfinate, trimethylbenzenesulfinate, and pentafluorobenzenesulfinate.

The phosphorus-containing group includes phosphino groups such as dimethylphosphino, and diphenylphosphino; phosphryl groups such as methylphosphoryl, isopropylphosphoryl, and phenylphosphoryl; phosphothioyl groups such as methylphosphothioyl, isoprophylphosphothioyl, phenylphosphothioyl; phosphono groups including phosphate ester groups such as dimethylphosphate, diisopropylphosphate, and diphenylphosphate, and phosphate group.

The symbol n in Formula (I) represents an integer satisfying the valence of $M^1$; specifically an integer of 0–5, preferably 0–4, more preferably 0–3.

The symbol n in Formula (II) represents an integer satisfying the valence of $M^2$; specifically an integer of 0–5, preferably 0–4, more preferably 0–3.

The symbol n in Formula (III) represents an integer satisfying the valence of $M^3$; specifically an integer of 0–5, preferably 0–4, more preferably 0–3.

The symbol n in Formula (I) represents an integer of preferably 1–4, more preferably 1–3 when $X^1$ is an atom or group other than an oxygen atom.

The symbol n in Formula (II) represents an integer of preferably 1–4, more preferably 1–3 when $X^2$ is an atom or group other than an oxygen atom.

The symbol n in Formula (III) represents an integer of preferably 1–4, more preferably 1–3 when $X^3$ is an atom or group other than an oxygen atom.

The symbol $X^1$ in Formula (I) represents an atom or a group selected from a hydrogen atom, halogen atoms, an oxygen atom, hydrocarbon groups, oxygen-containing groups, nitrogen-containing groups, boron-containing groups, sulfur-containing groups, phosphorus-containing groups, halogen-containing groups, heterocyclic compound residues, silicon-containing groups, aluminum-containing groups, germanium-containing groups, and tin-containing groups.

The symbol $X^2$ in Formula (II) represents an atom or a group selected from a hydrogen atom, halogen atoms, an oxygen atom, hydrocarbon groups, oxygen-containing groups, nitrogen-containing groups, boron-containing groups, sulfur-containing groups, phosphorus-containing groups, halogen-containing groups, heterocyclic compound residues, silicon-containing groups, aluminum-containing groups, germanium-containing groups, and tin-containing groups.

The symbol $X^3$ in Formula (III) represents an atom or a group selected from a hydrogen atom, halogen atoms, an oxygen atom, hydrocarbon groups, oxygen-containing groups, nitrogen-containing groups, boron-containing groups, sulfur-containing groups, phosphorus-containing groups, halogen-containing groups, heterocyclic compound residues, silicon-containing groups, aluminum-containing groups, germanium-containing groups, and tin-containing groups.

The $X^1$ groups in Formula (I) may be the same or different when n is 2 or more. The $X^2$ groups in Formula (II) may be the same or different when n is 2 or more. The $X^3$ groups in Formula (III) may be the same or different when n is 2 or more.

The plural $X^1$ groups in Formula (I) maybe joined together to form one or more rings when n is 2 or more. The plural $X^2$ groups in Formula (II) may be the same or different when n is 2 or more. The plural $X^3$ groups in Formula (III) may be the same or different when n is 2 or more.

The halogen atom represented by $X^1$ in Formula (I), $X^2$ in Formula (II), and $X^3$ in Formula (III) includes fluorine, chlorine, bromine, and iodine.

The hydrocarbon group represented by $X^1$ in Formula (I), $X^2$ in Formula (II), and $X^3$ in Formula (III) includes the same ones shown for $R^1$–$R^7$ in Formula (I), specifically including alkyl groups such as methyl, ethyl, propyl, butyl, hexyl, octyl, nonyl, dodecyl, and eicosyl; cycloalkyl groups of 3–30 carbon atoms such as cyclopentyl, cyclohexyl, norbonyl, and adamantyl; alkenyl groups such as vinyl, propenyl, and cyclohexenyl; arylalkyl groups such as benzyl, phenylethyl, and phenylpropyl; and aryl groups such as phenyl, tolyl, dimethylphenyl, trimethylphenyl, ethyphenyl, propylphenyl, biphenylyl, naphthyl, methylnaphtyl, anthryl, and phenanthryl. The hydrocarbon group includes also halogenated hydorcarbon groups, specifically hydrocarbon groups of 1–20 carbon atoms having at least one hydrogen atom replaced by halogen.

The hydrocarbon group has preferably 1–20 carbon atoms.

The oxygen-containing group represented by $X^1$ in Formula (I), $X^2$ in Formula (II), and $X^3$ in Formula (III) includes the same ones shown for $R^1$–$R^{21}$ above, specifically including a hydroxyl group; alkoxy groups such as methoxy, ethoxy, propoxy, and butoxy; aryloxy groups such as phenoxy, methylphenoxy, dimethylphenoxy, and naphthoxy; arylalkoxy groups such as phenylmethoxy, and phenylethoxy; an acetoxy group; and a carbonyl group.

The nitrogen-containing group represented by $X^1$ in Formula (I), $X^2$ in Formula (II), and $X^3$ in Formula (III) includes the same ones shown for $R^1$–$R^{21}$ above, specifically including an amino group; alkylamino groups such as methylamino, dimethylamino, diethylamino, dipropylamino, dibutylamino, and dicyclohexylamino; and arylamino groups and alkylarylamino groups such as phenylamino, diphenylamino, ditolylamino, dinaphthylamino, and methylphenylamino.

The boron-containing group represented by $X^1$ in Formula (I), $X^2$ in Formula (II), and $X^3$ in Formula (III) includes specifically $BR_4$ (R representing a hydrogen atom, analkyl group, a substituted or unsubstituted aryl group, or a halogen atom, or the like).

The sulfur-containing group represented by $X^1$ in Formula (I), $X^2$ in Formula (II), and $X^3$ in Formula (III) includes the same ones shown for $R^1$–$R^{21}$ above, specifically including sulfonate groups such as methylsulfonate, trifluoromethanesulfonate, phenylsulfonate, benzylsulfonate, p-toluenesulfonate, trimethylbenzenesulfonate, triisobutylbenzenesulfonate, p-chlorobenzenesulfonate, and pentafluorobenzenesulfonate; sulfinate groups such as methylsulfinate, phenylsulfinate, benzylsulfinate, p-toluenesulfinate, trimethylbenzenesulfinate, and pentafluorobenzenesulfinate, alkylthio groups; and arylthio groups.

The phosphorus-containing group represented by $X^1$ in Formula (I), $X^2$ in Formula (II), and $X^3$ in Formula (III) includes specifically trialkylphosphine groups such as trimethylphosphine, tributylphosphine, and tricyclohexylphosphine; triarylphosphine groups such as triphenylphosphine, and tritolylphosphine; phosphite groups (phosphido groups) such as methylphosphite, ethylphosphite, and phenylphosphite; phosphonic acid groups; and phosphinic acid groups.

The halogen-containing group represented by $X^1$ in Formula (I), $X^2$ in Formula (II), and $X^3$ in Formula (III) includes specifically fluorine-containing groups such as $PF_6$, and BF4; and chlorine-containing groups such as $ClO_4$, and $SbCl_6$; and iodine-containing groups such as $IO_4$.

The heterocyclic compound residue represented by $X^1$ in Formula (I), $X^2$ in Formula (II), and $X^3$ in Formula (III) includes the same ones shown for $R^1$–$R^{21}$ above.

The silicon-containing groups represented by $X^1$ in Formula (I), $X^2$ in Formula (II), and $X^3$ in Formula (III) includes the same ones shown for $R^1$–$R^{21}$ above, including specifically hydrocarbon-substituted silyl groups such as phenylsilyl, diphenylsilyl, trimethylsilyl, triethylsilyl, tripropylsilyl, tricyclohexylsilyl, triphenylsilyl, methyldiphenylsilyl, tritolylsilyl, and trinaphthylsilyl; hydrocarbon-substituted silyl ether groups such as trimethylsilyl ether; silicon-substituted alkyl groups such as trimethylsilylmethyl; and silicon-substituted aryl groups such as trimethylsilylphenyl.

The aluminum-containing group represented by $X^1$ in Formula (I), $X^2$in Formula (II), and $X^3$ in Formula (III) includes specifically $AlR_4$ (R representing a hydrogen atom, an alkyl group, a substituted or unsubstituted aryl group, a halogen atom).

The germanium-containing group represented by $X^1$ in Formula (I), $X^2$in Formula (II), and $X^3$ in Formula (III) includes the same ones as shown for $R^1$–$R^{21}$ above.

The tin-containing group represented by $X^1$ in Formula (I), $X^2$ in Formula (II), and $X^3$ in Formula (III) includes the same ones as shown for $R^1$–$R^{21}$ above.

Specific examples of the transition metal compound represented by General Formulas (I), (II), or (III) are shown below.

In the specific examples, the symbol M represents a transition metal atom, including Sc(III), Ti(III), Ti(IV), Zr(III), Zr(IV), Hf(IV), V(III), V(IV), V(V), Nb(V), Ta(V), Fe(II), Fe(III), Co(II), Co(III), Rh(II), Rh(III), Rh(IV), Cr(III), Ni(II), and Pd(II). Of these, preferred are Ti(IV), Zr(IV), Hf(IV), V(III), V(IV), V(V), Nb(V), and Ta(V); particularly preferred are Ti(IV), Zr(IV), and Hf(IV).

In the specific examples below, the symbol X represents a halogen such as Cl, and Br; an oxygen atom; or an alkyl group such as methyl. In the case where plural X moieties are contained, the Xs may be the same or be different.

The number n depends on valency of the metal M. For example, when two monoanion species are bonded to the metal, n=0 for divalent metal, n=1 for trivalent metal, n=2 for tetravalent metal, and n=3 for pentavalent metal: n=1 for V(III) as the metal; n=2 for Ti(IV), Zr(IV), or V(IV); and n=3 for V(V). When one monoanion species is bonded to the metal and one oxygen atom is bonded to the metal through a double bond, n=0 for trivalent metal, n=1 for tetravalent metal, and n=2 for pentavalent metal: n=0 for V(III) metal, n=1 for the metal of Ti(IV), Zr(IV), or V(IV), and n=2 for V(V). When two monoanion species are bonded to the metal and on oxygen atom is bonded to the metal through a double bond, n=0 for tetravalent metal, n=1 for pentavalent metal: n=0 for Ti(IV), Zr(IV), or V(IV), and n=1 for V(V). When one monoanion species is bonded to the metal and one oxygen atom is bonded to the metal through a single bond, n=0 for divalent metal, n=1 for trivaelnt metal, n=2 for tetravalent metal, and n=3 of pentavalent metal: n=1 for V(III), n=2 for Ti(IV), Zr(IV), or V(IV), and n=3 for V(V).

Specific examples of the transition metal compounds represented by General Formula (I), (II), or (III) are shown below.

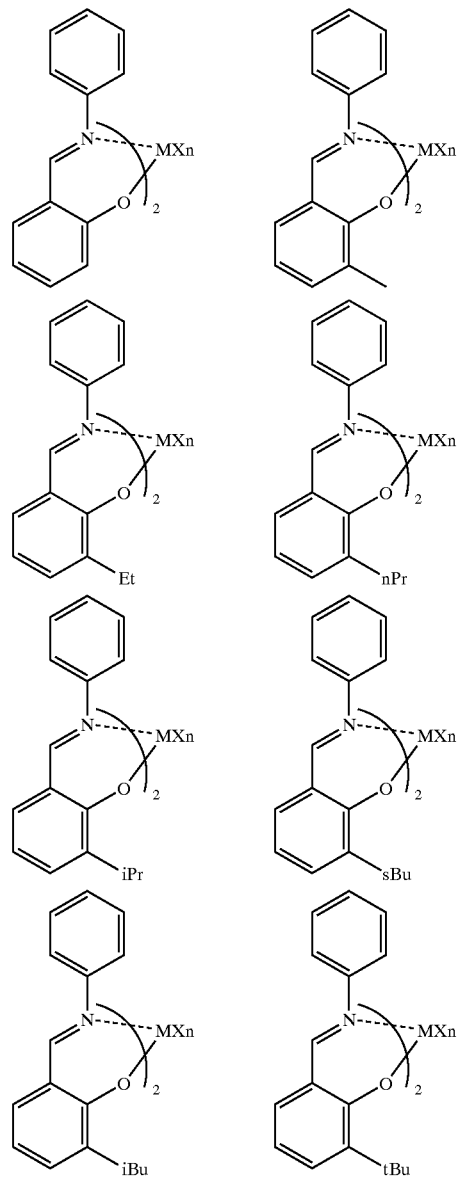

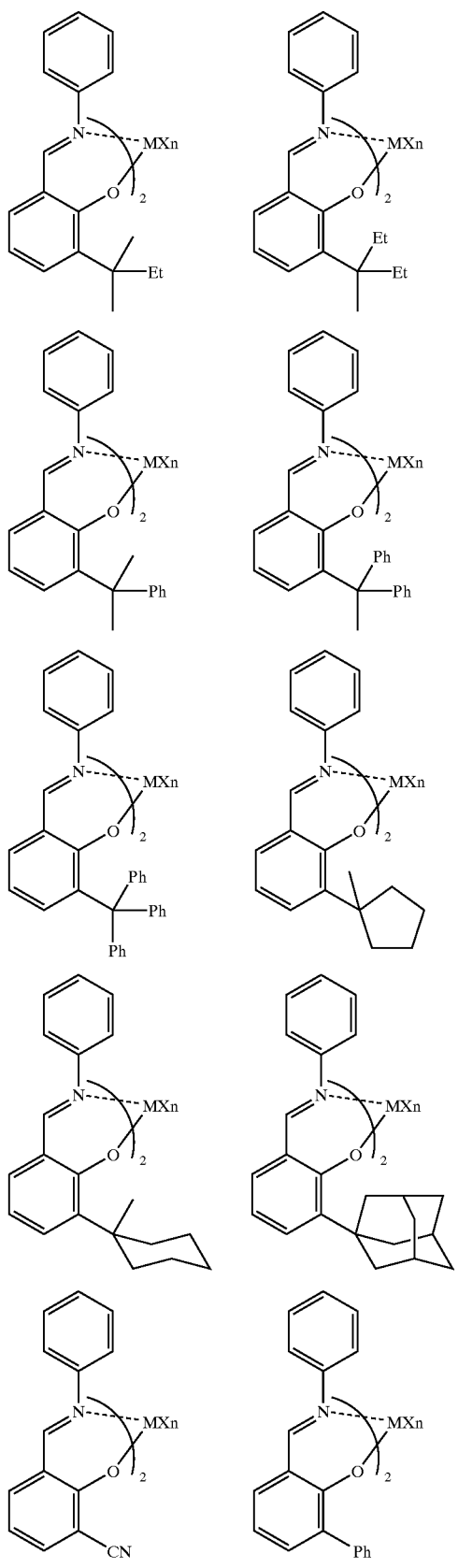
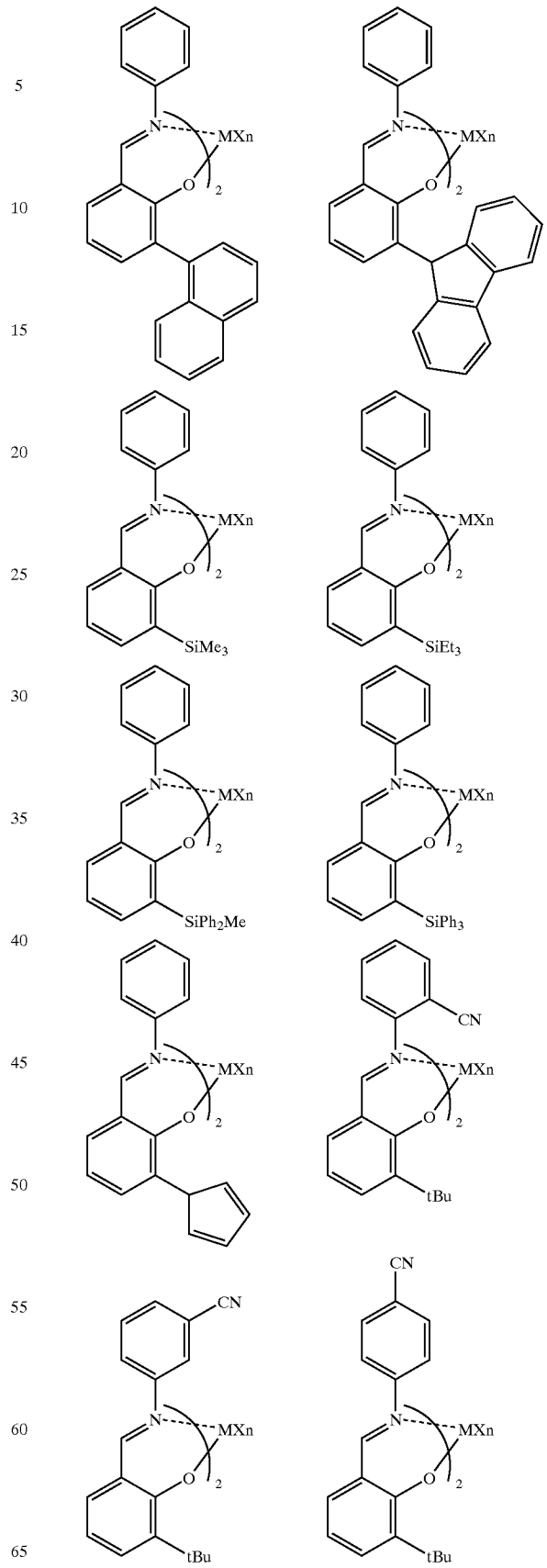

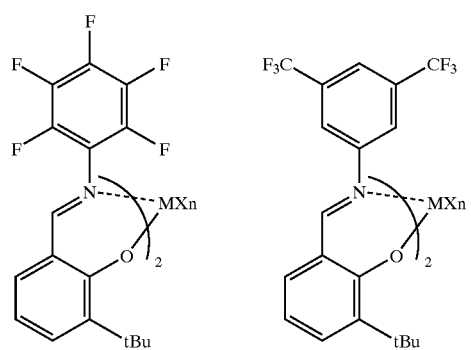
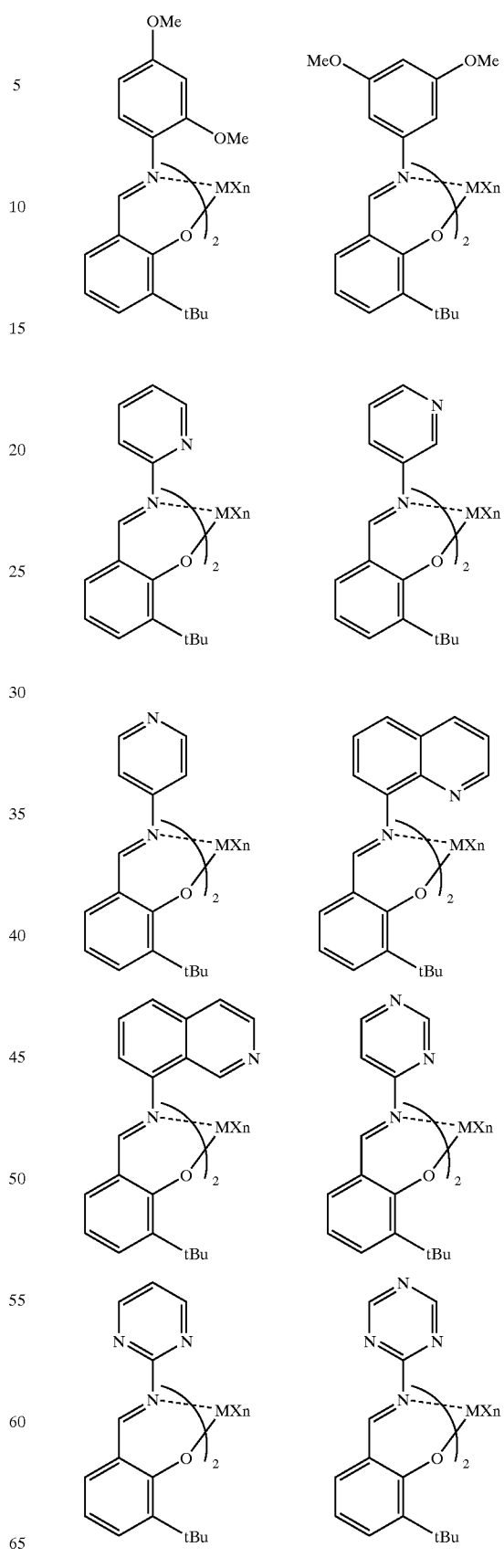

-continued
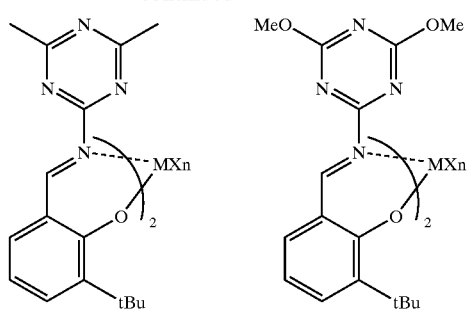
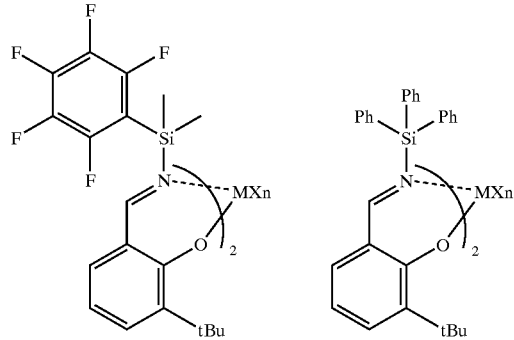
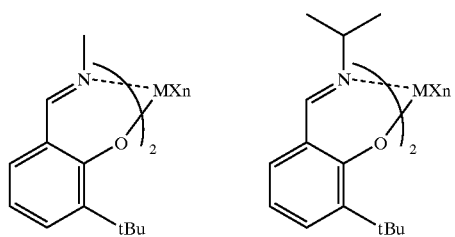
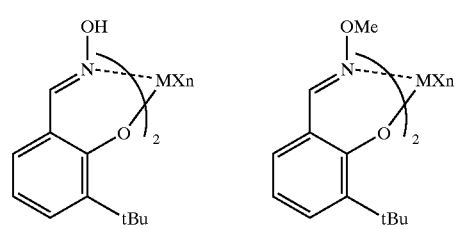
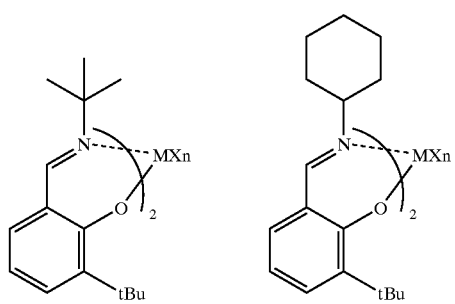
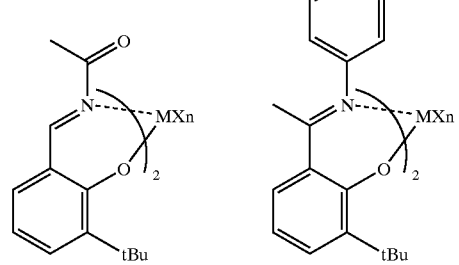
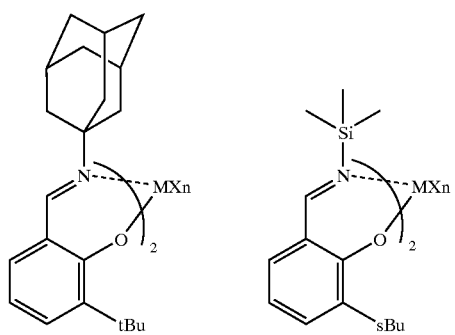
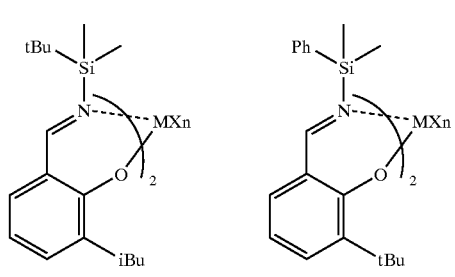
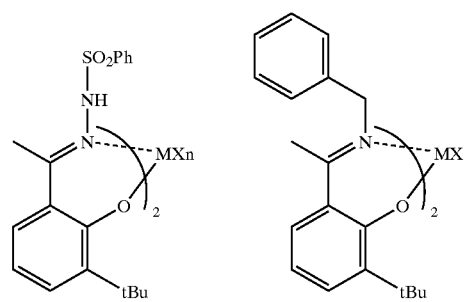

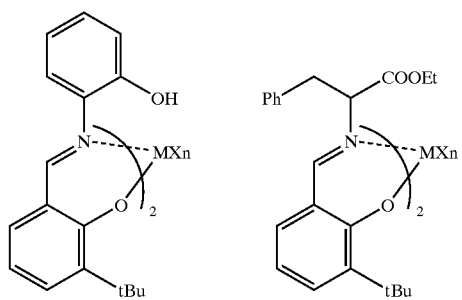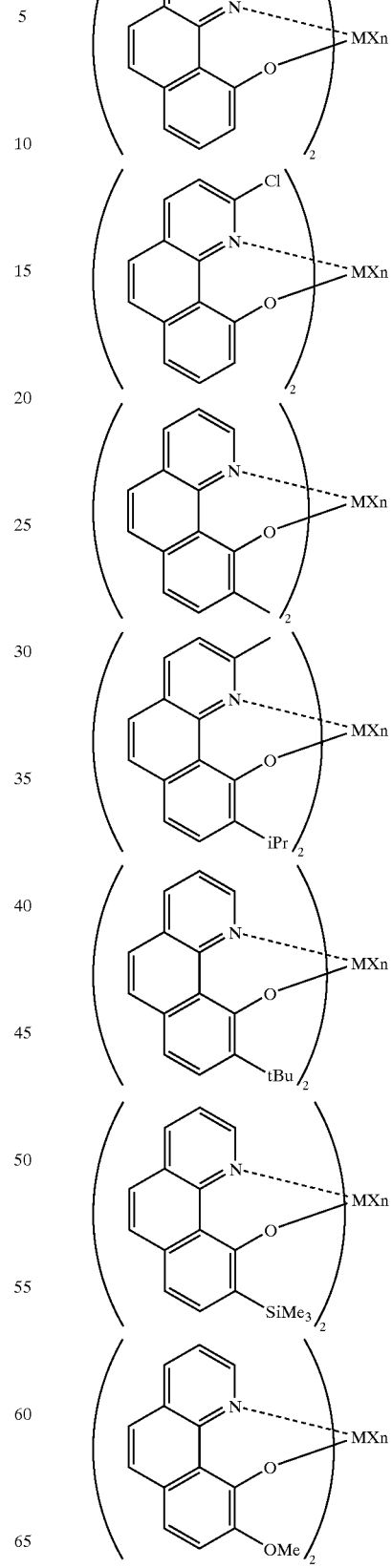

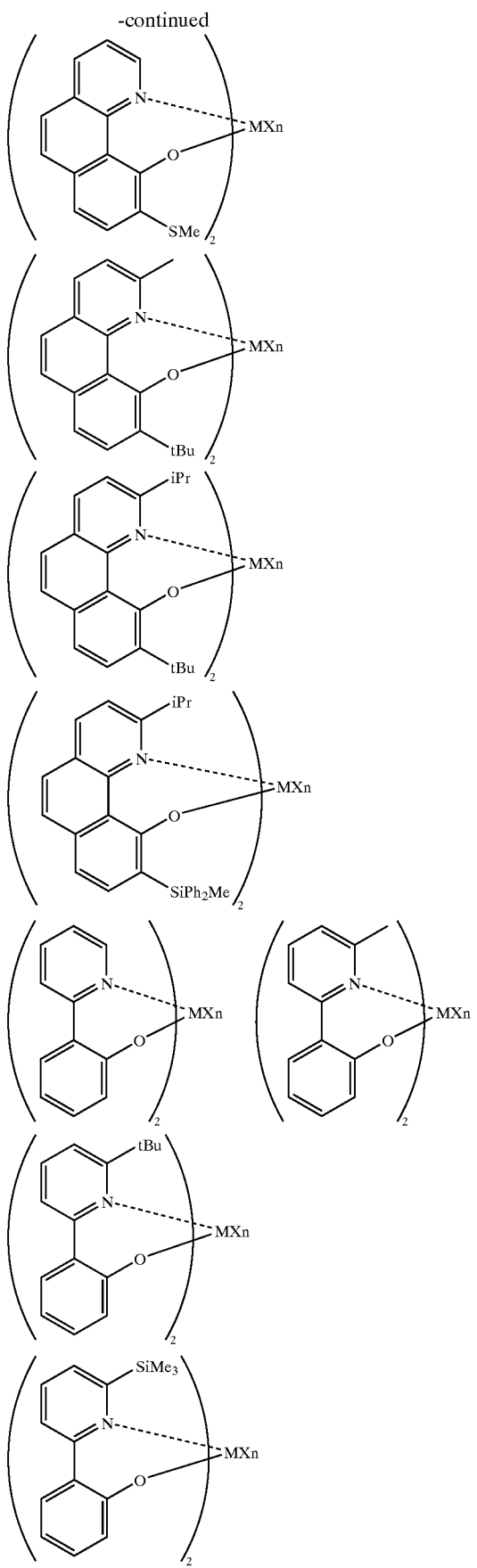
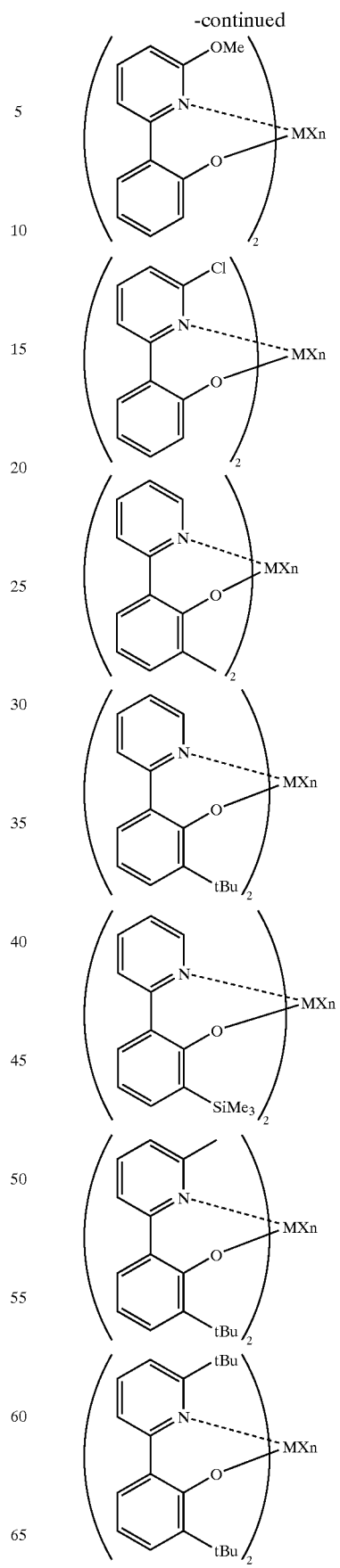

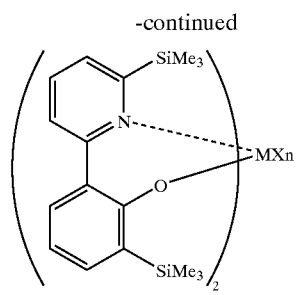
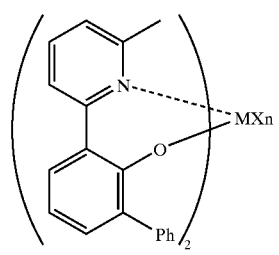
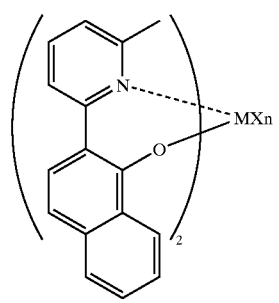
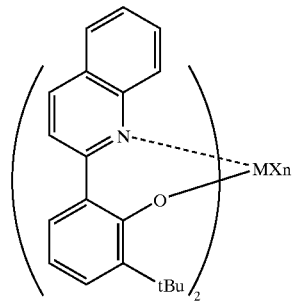
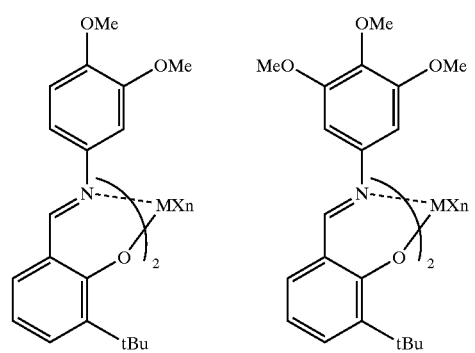
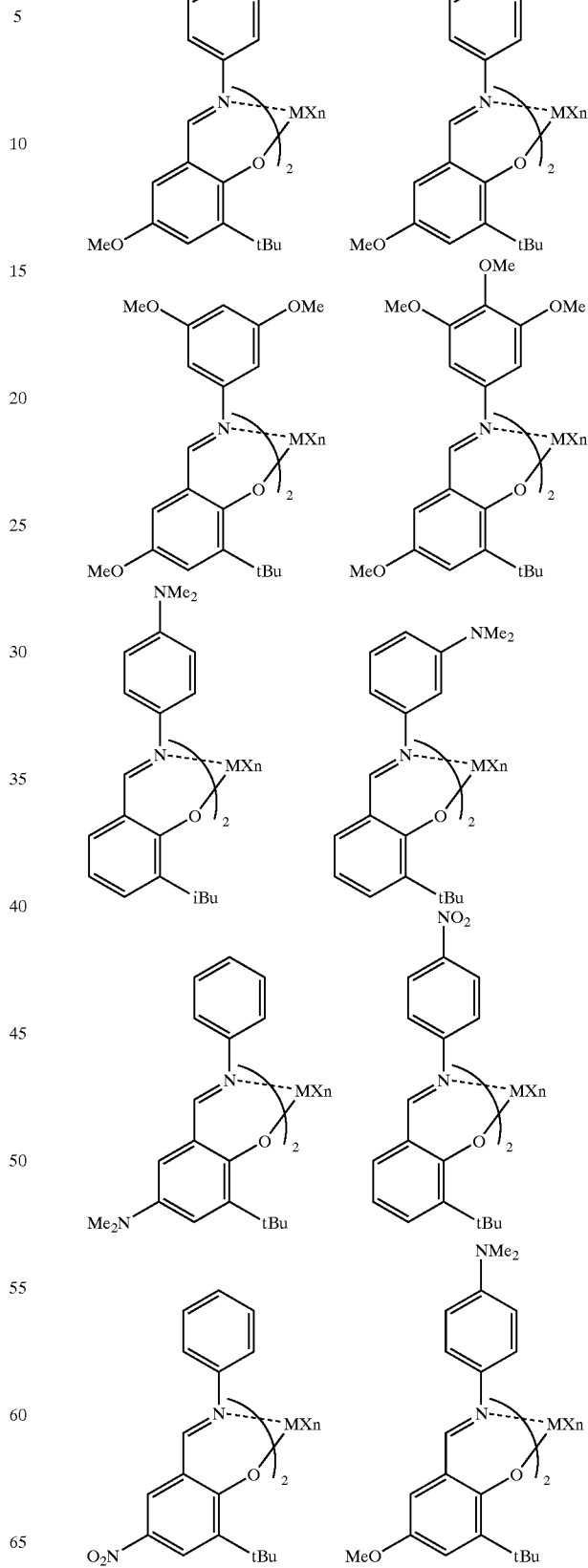

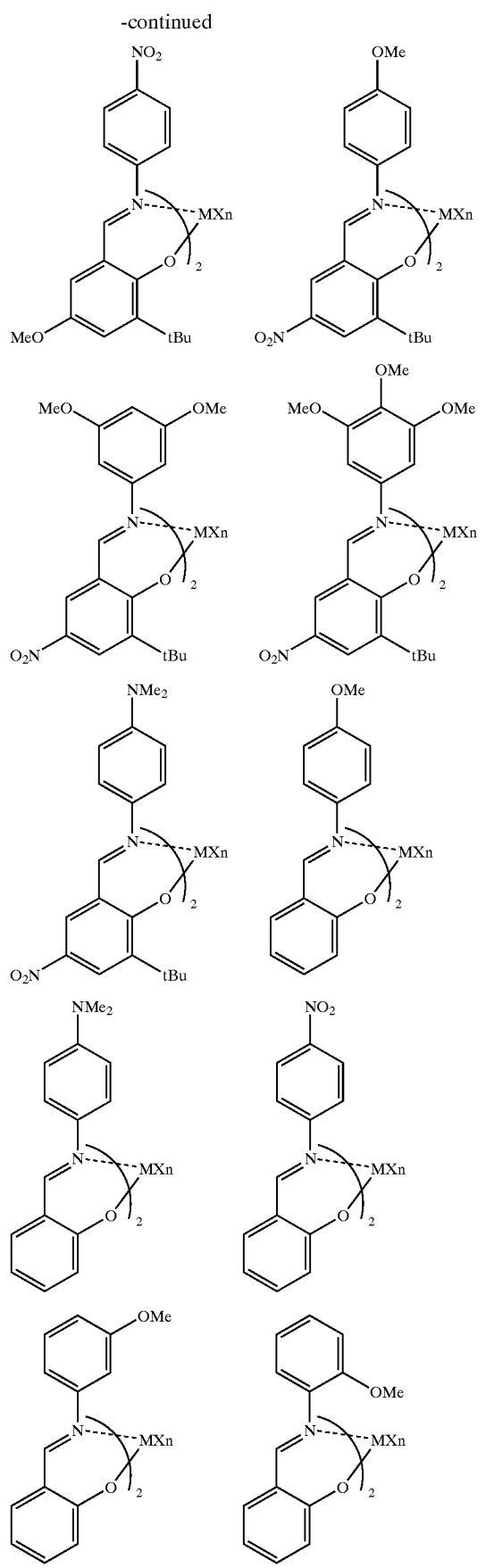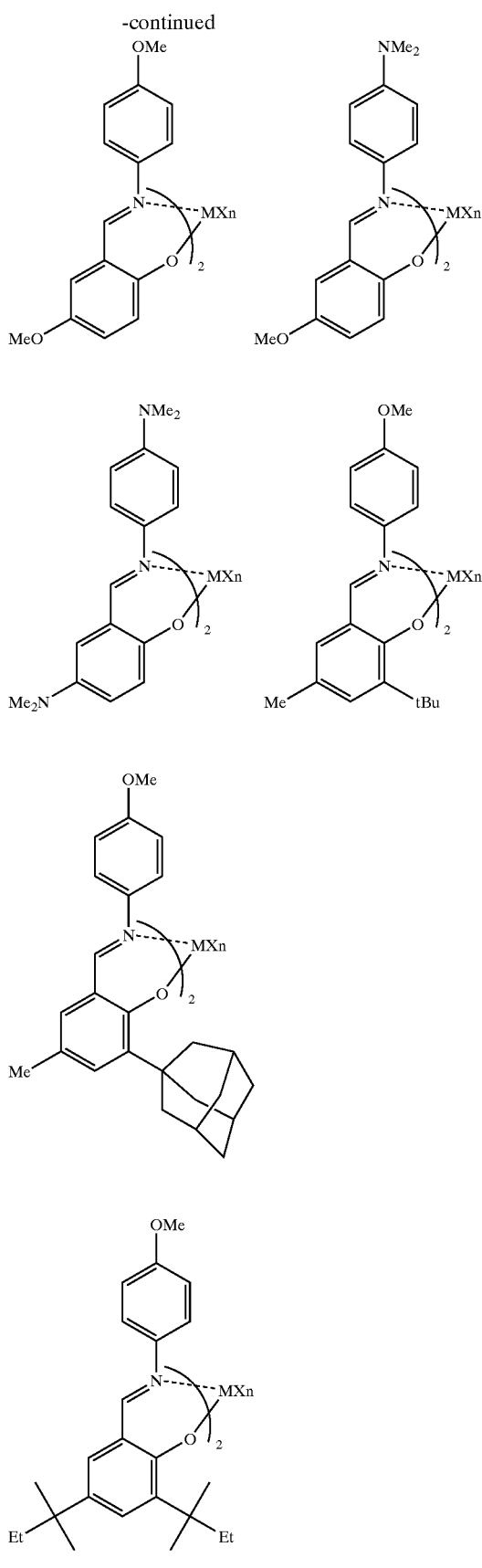

-continued
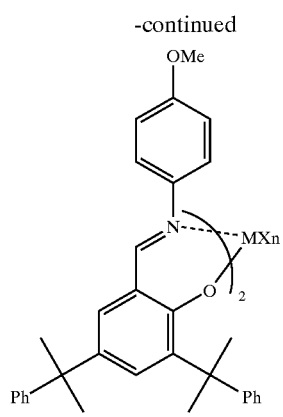
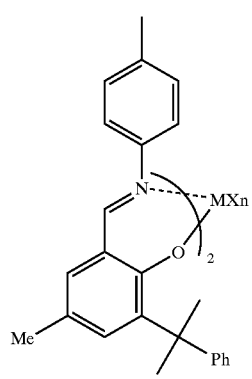
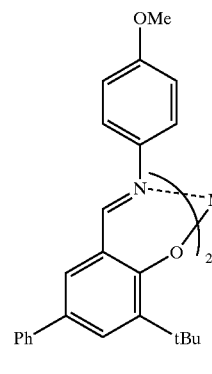
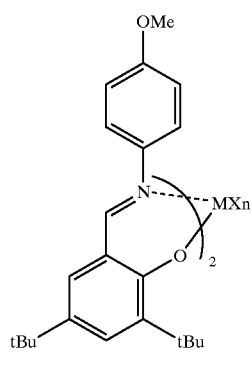
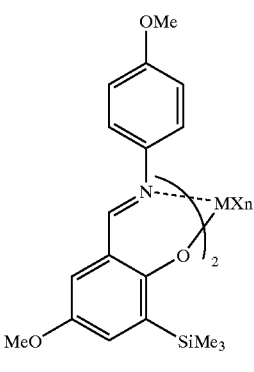
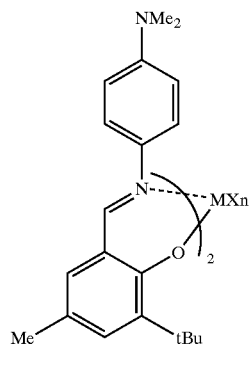
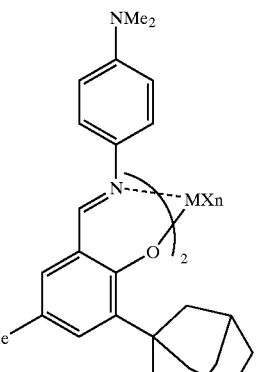
-continued
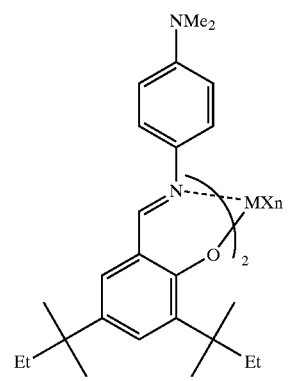
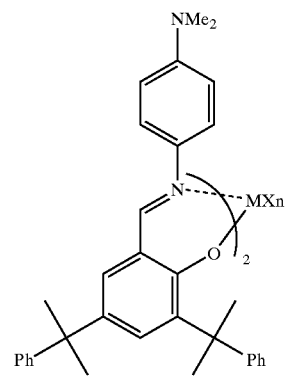
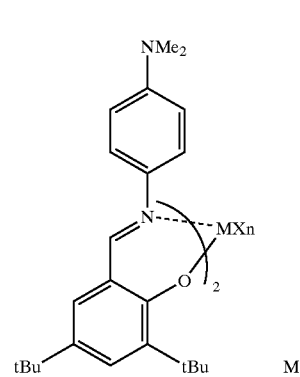
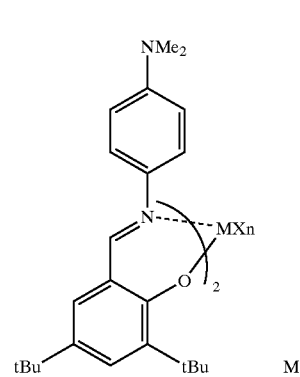
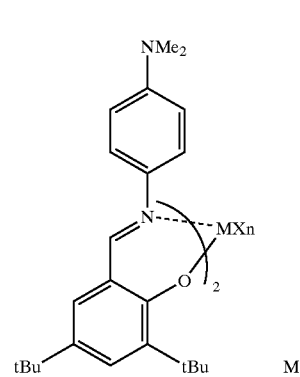
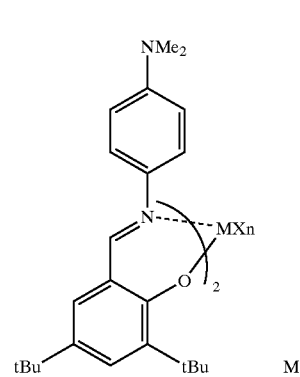

-continued
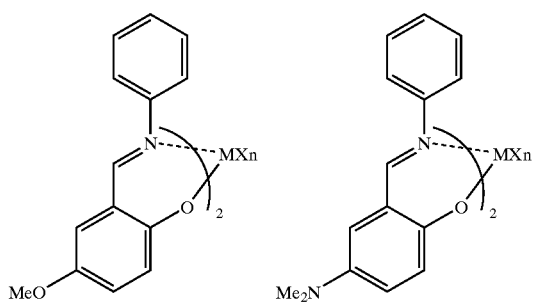
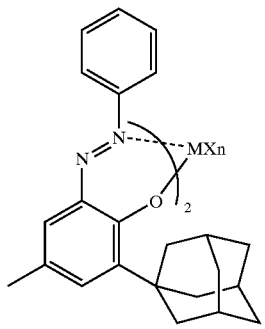
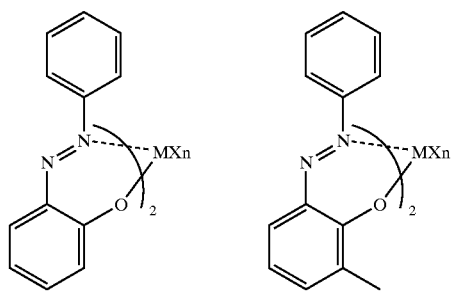
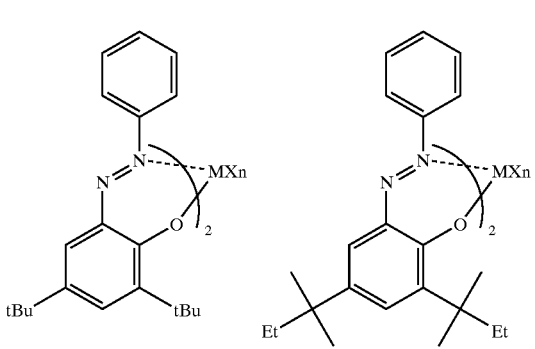
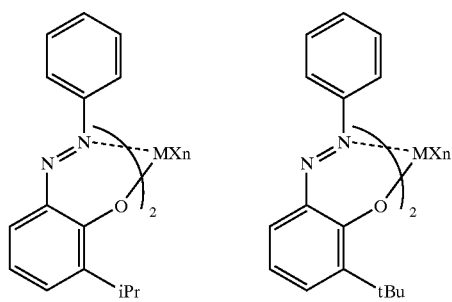
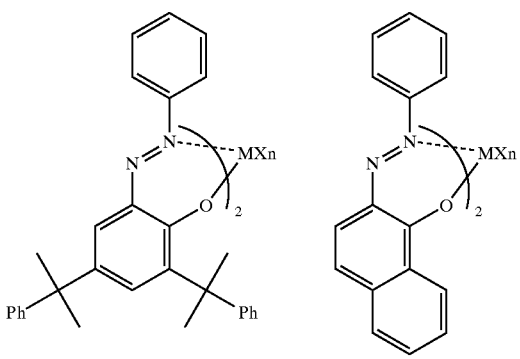
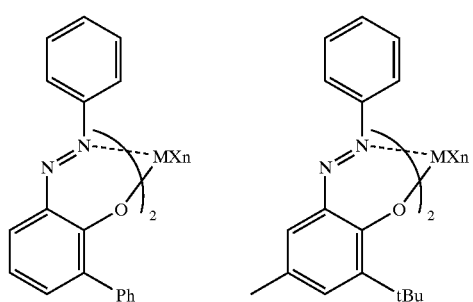
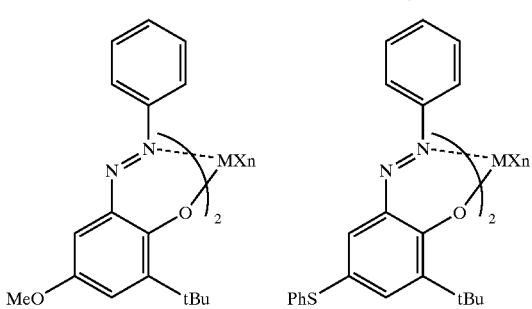
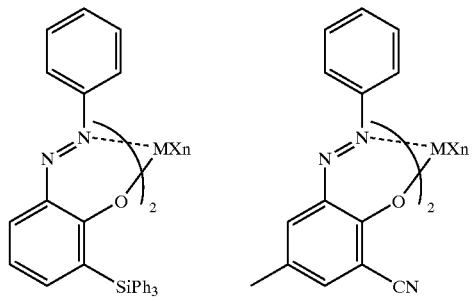
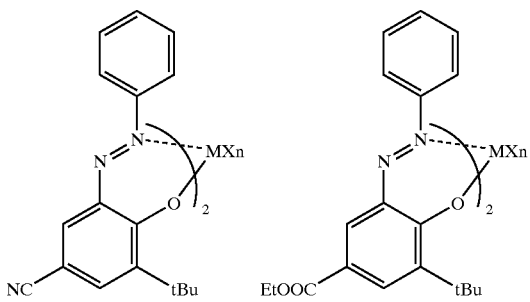

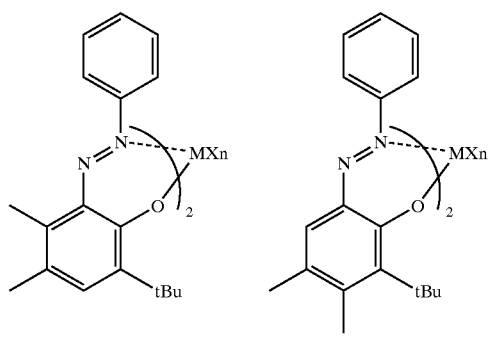
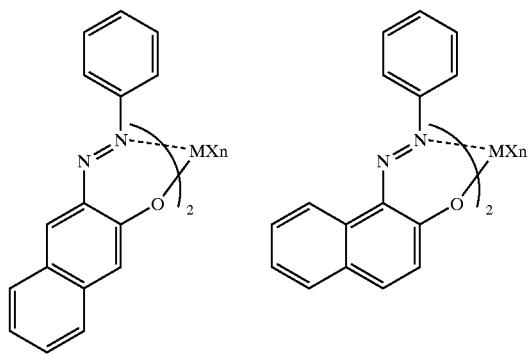
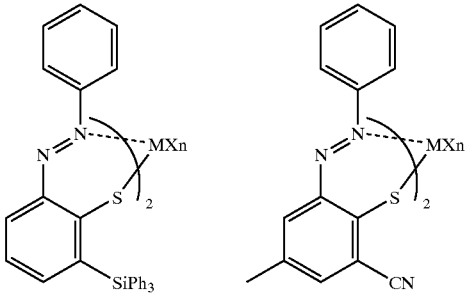
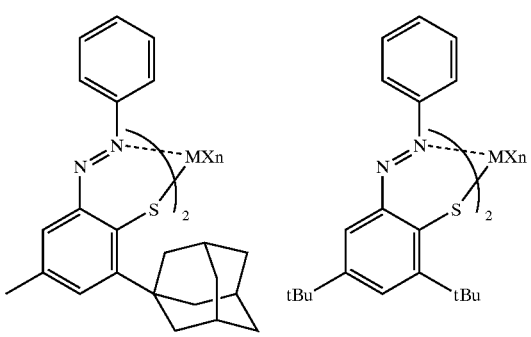
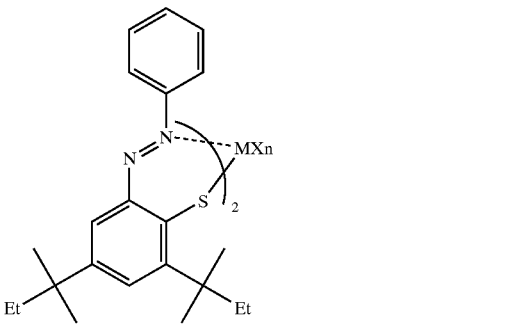
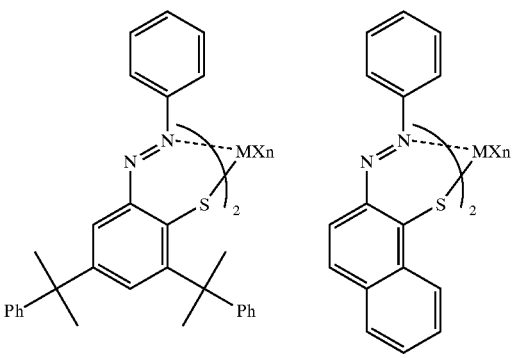
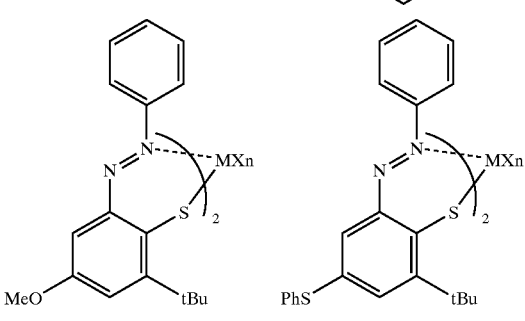

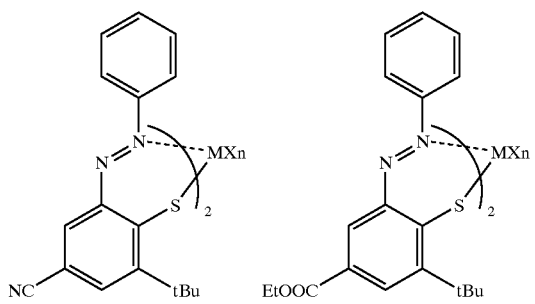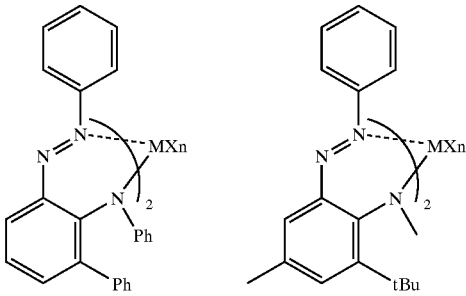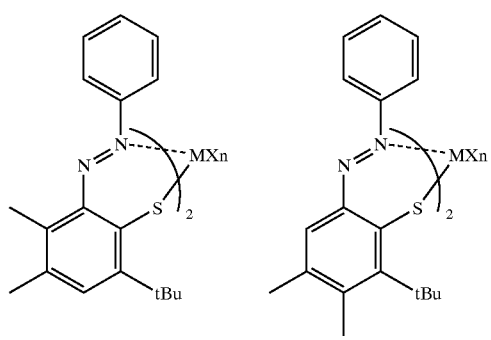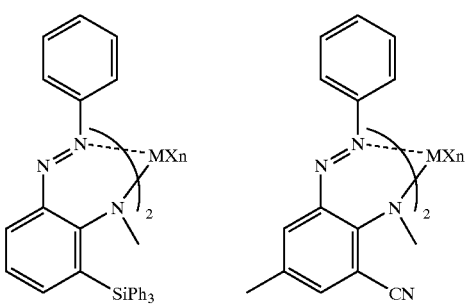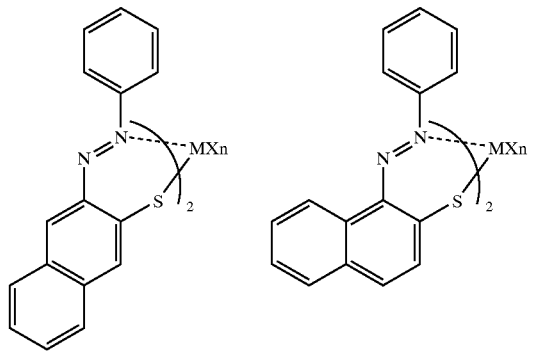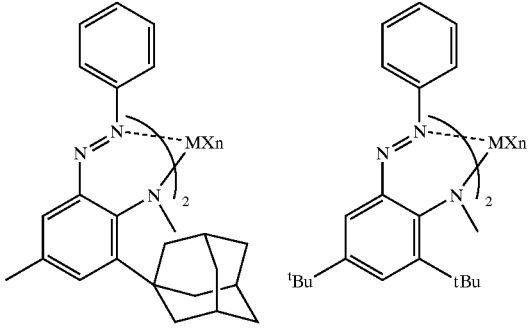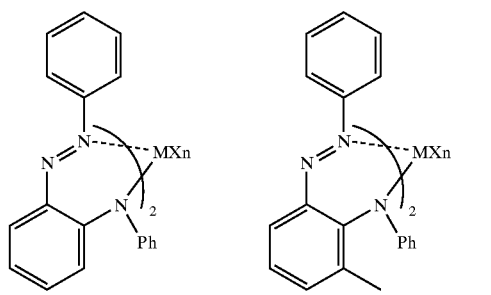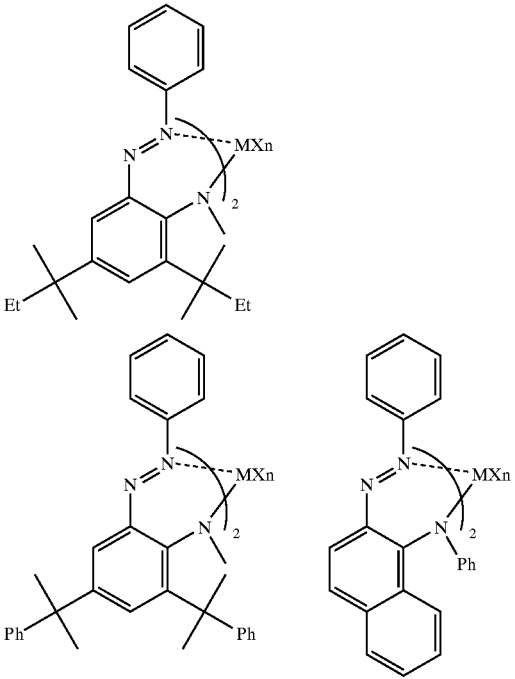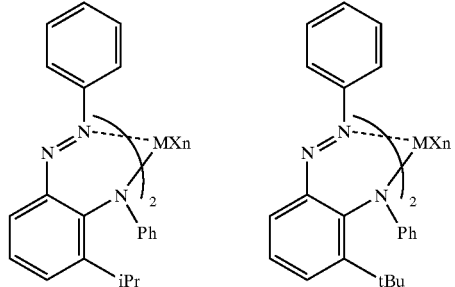

-continued

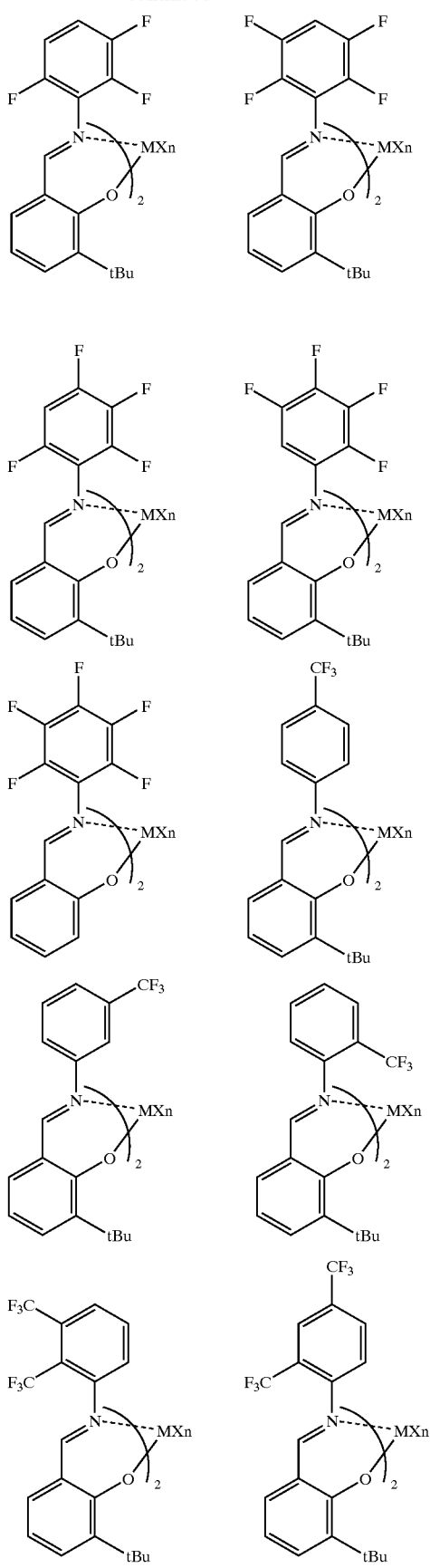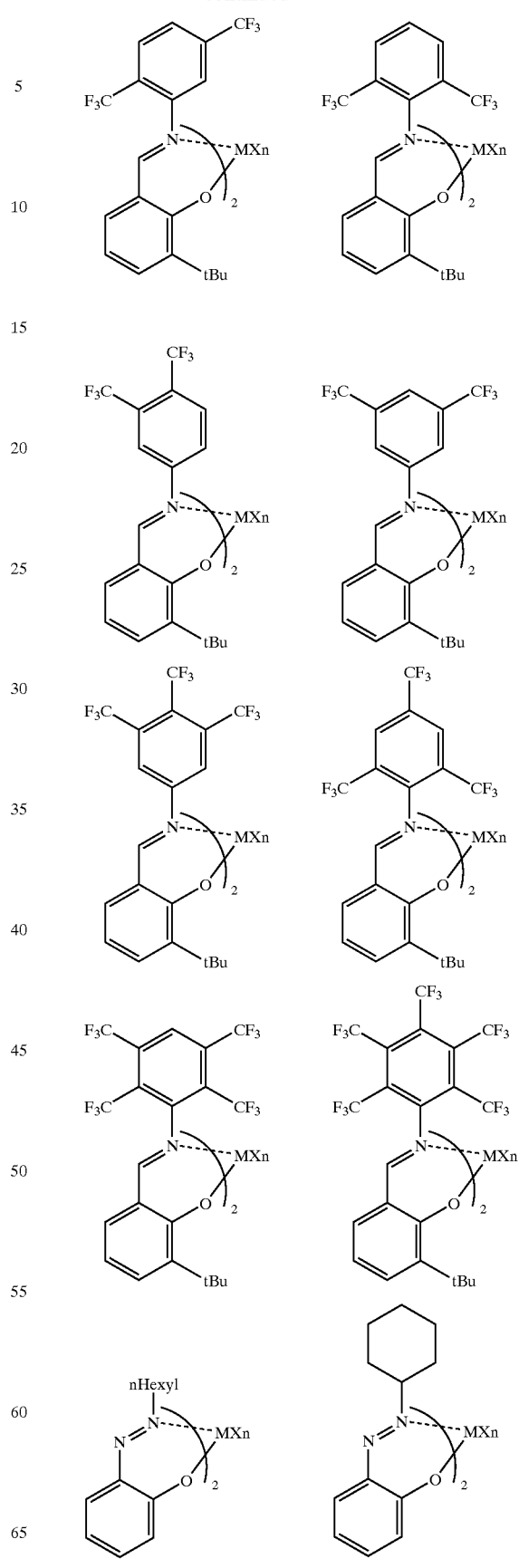

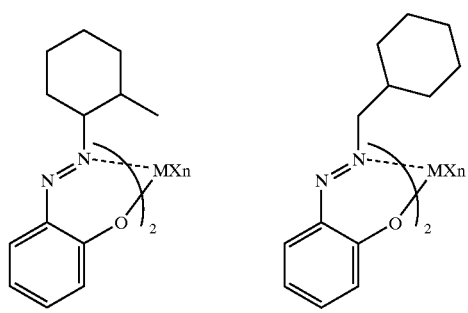
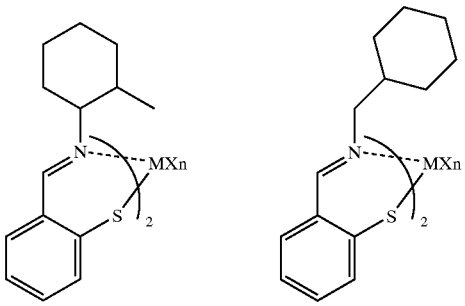

-continued
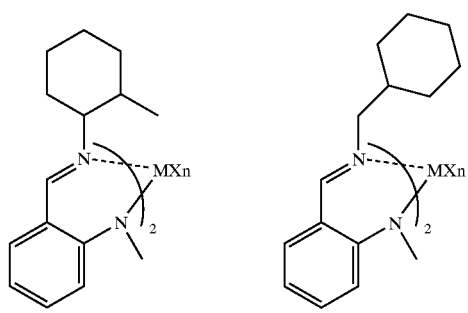
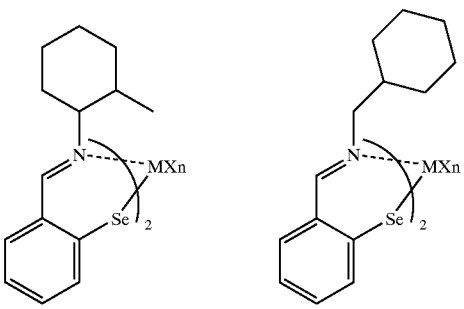
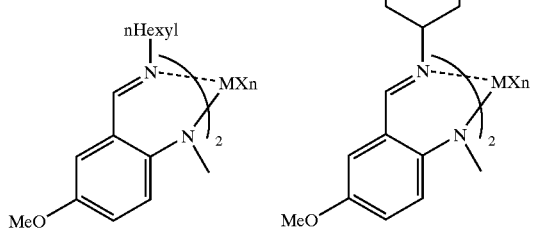
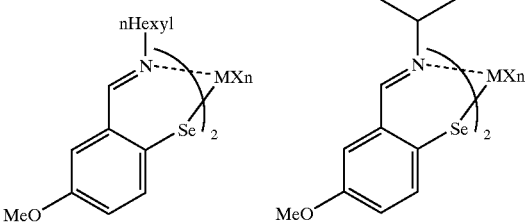
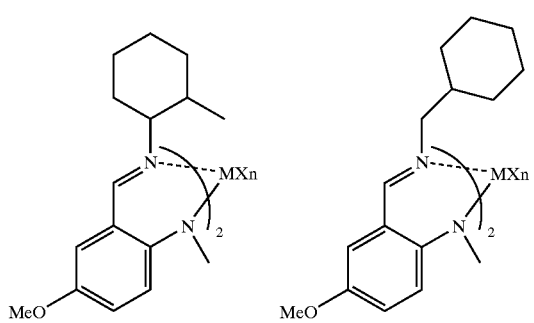
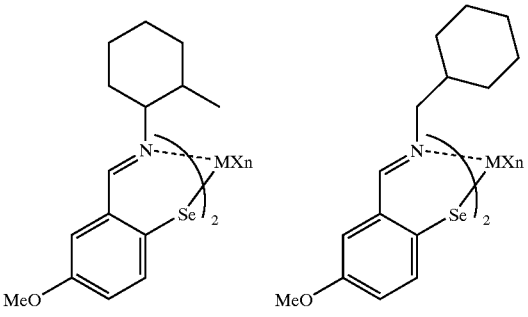
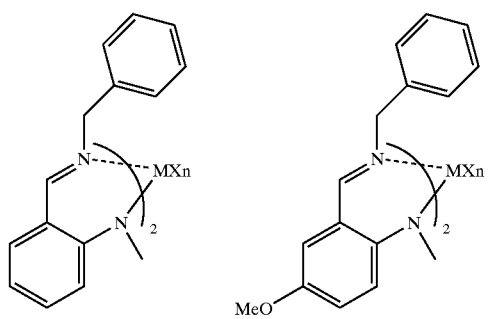
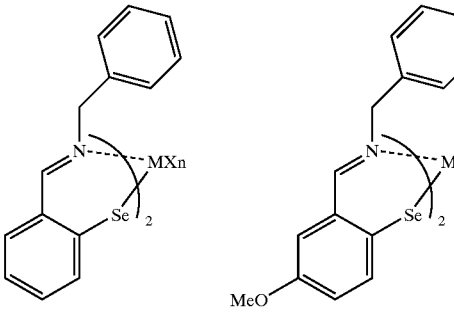
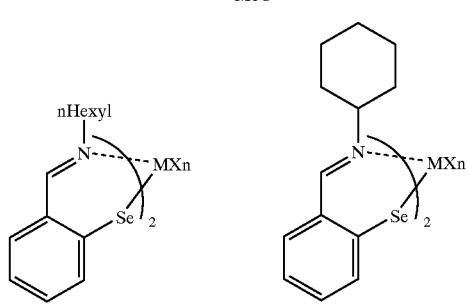
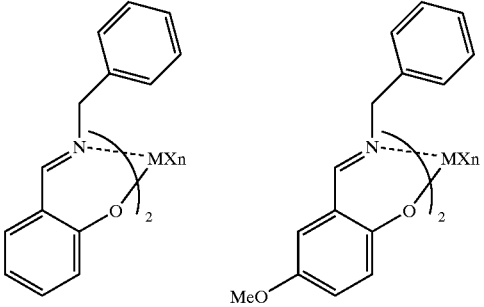

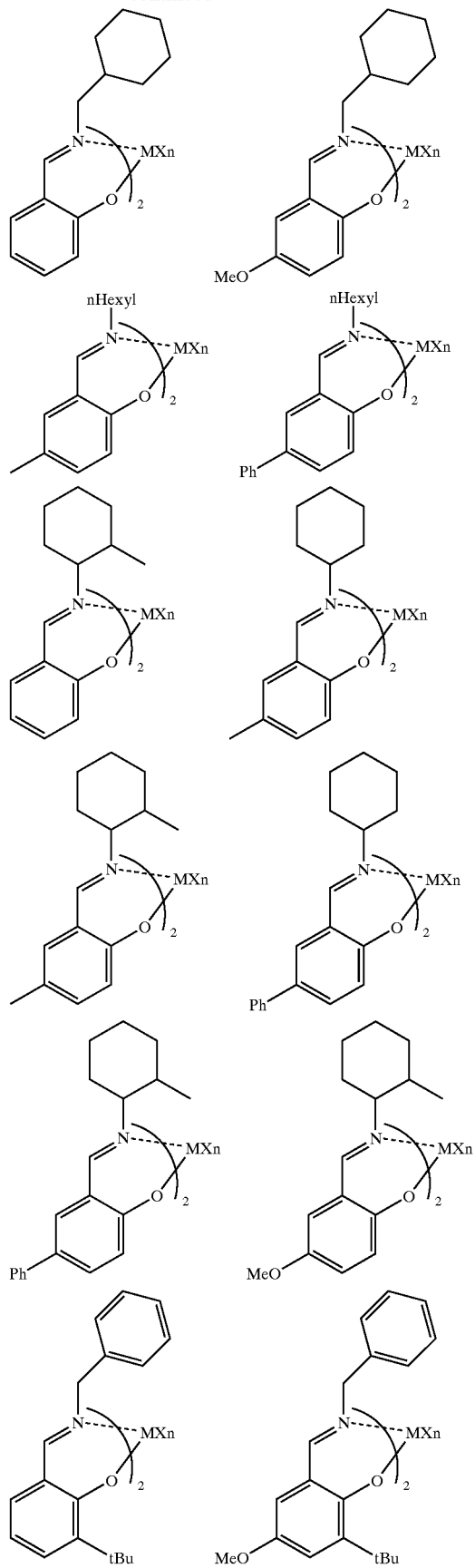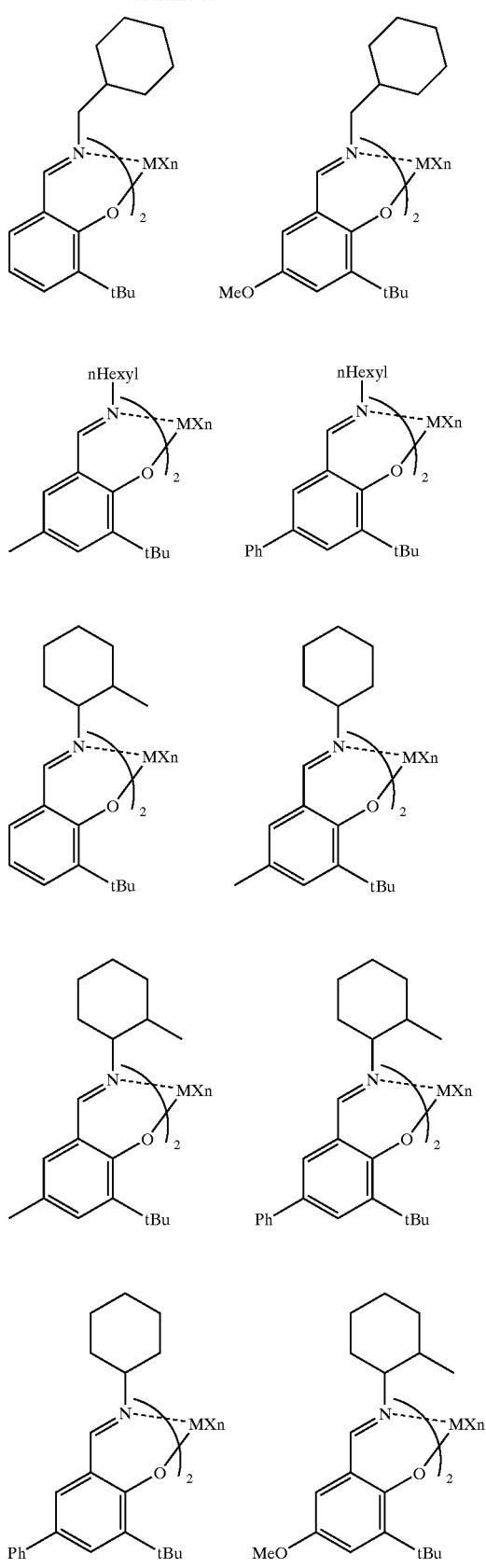

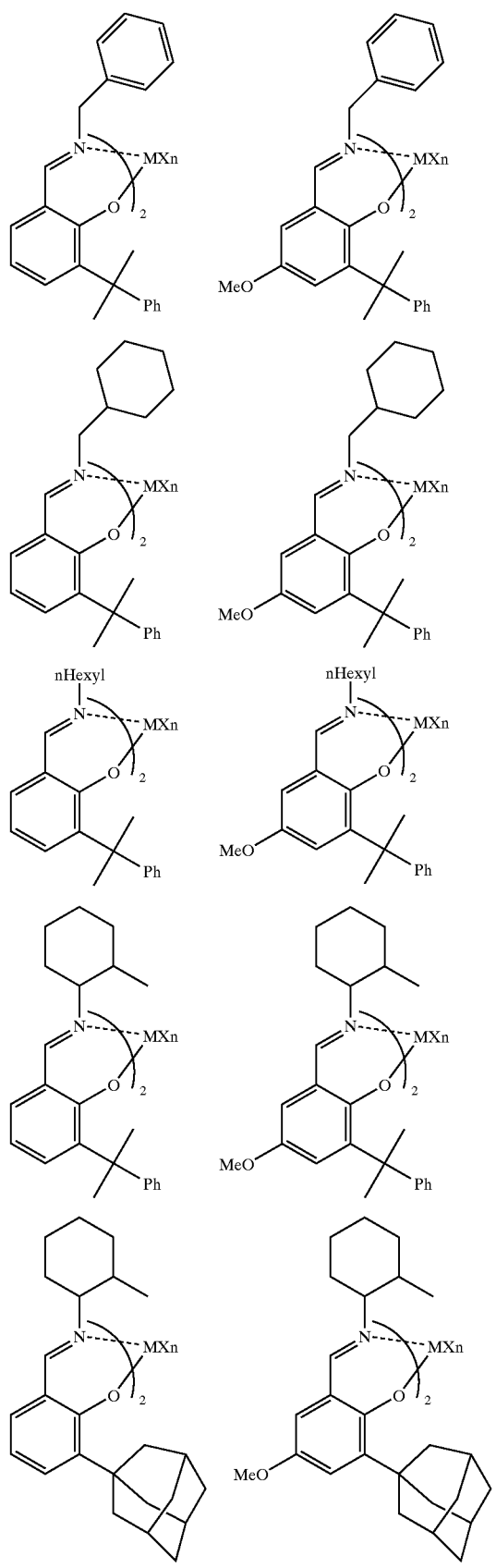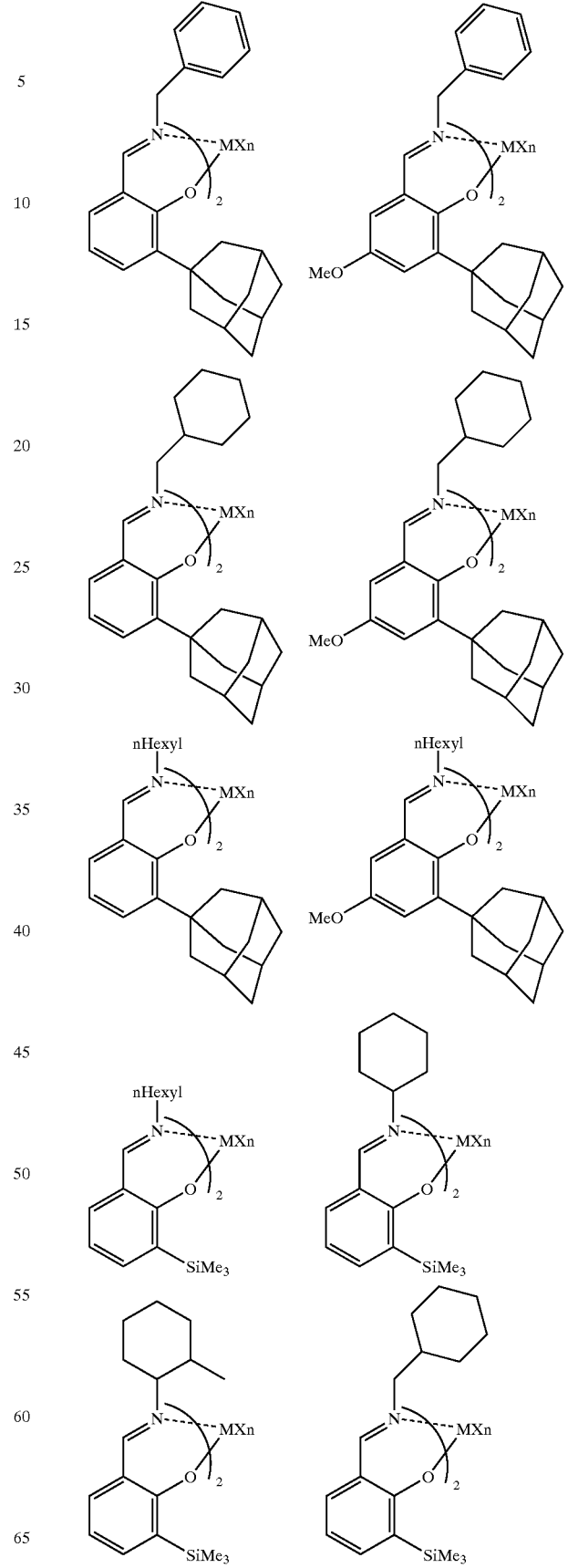

-continued
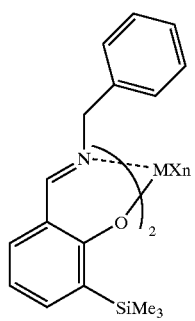
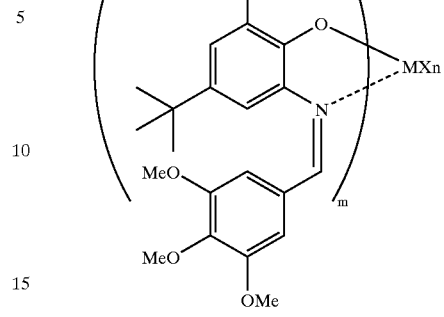
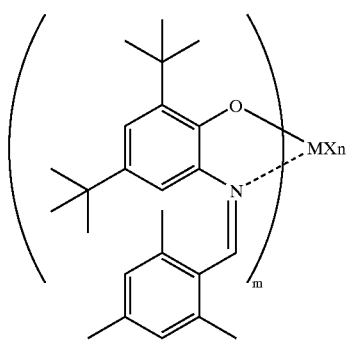
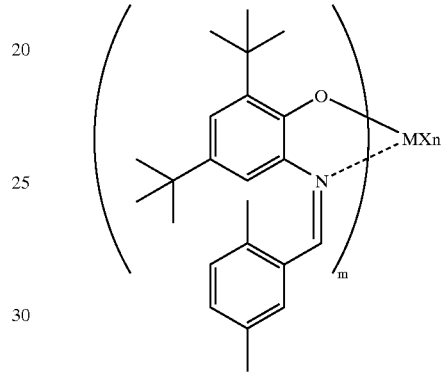
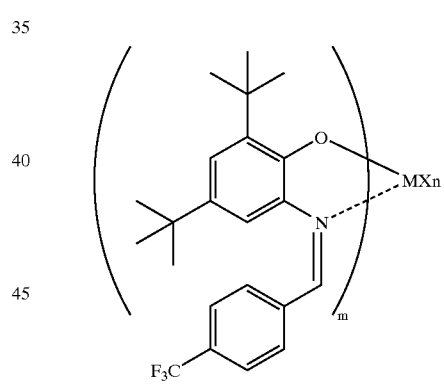
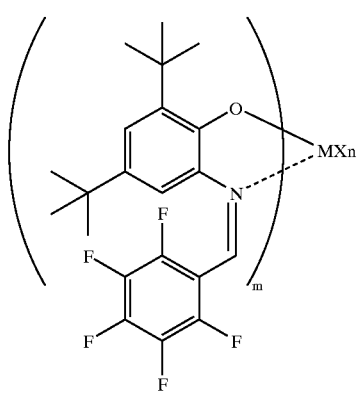
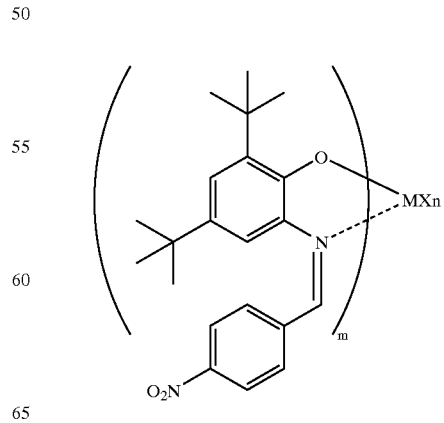

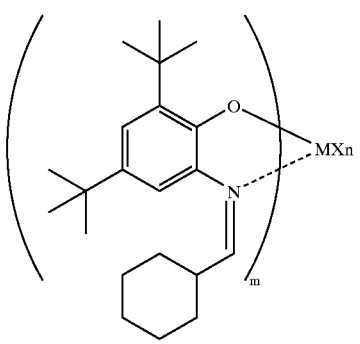
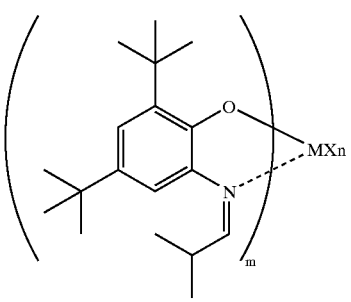
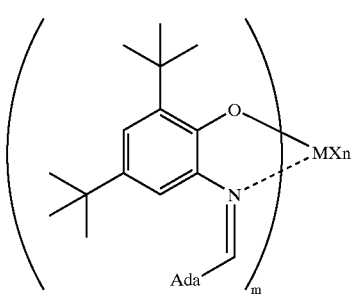
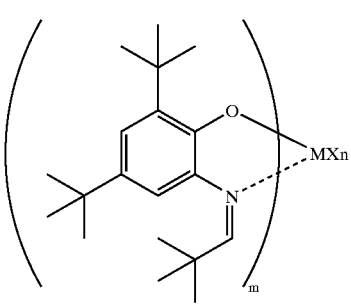
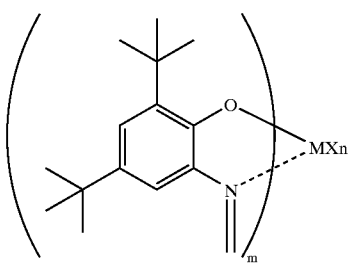
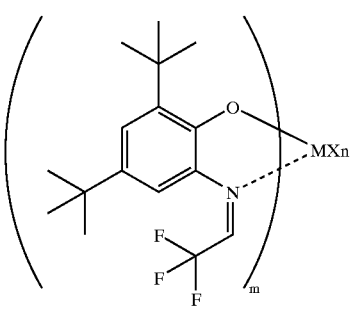
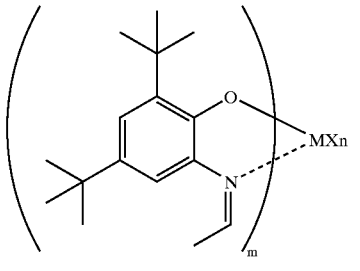
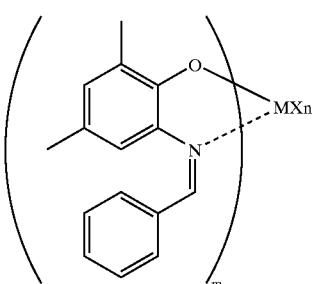
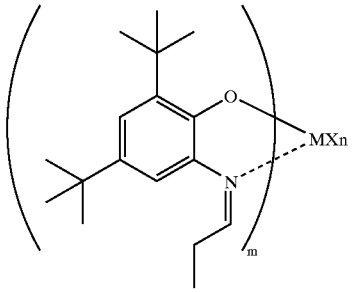
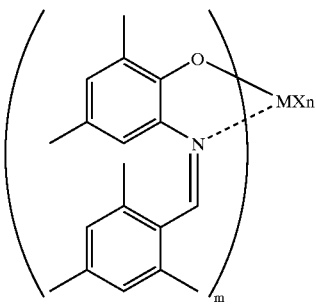

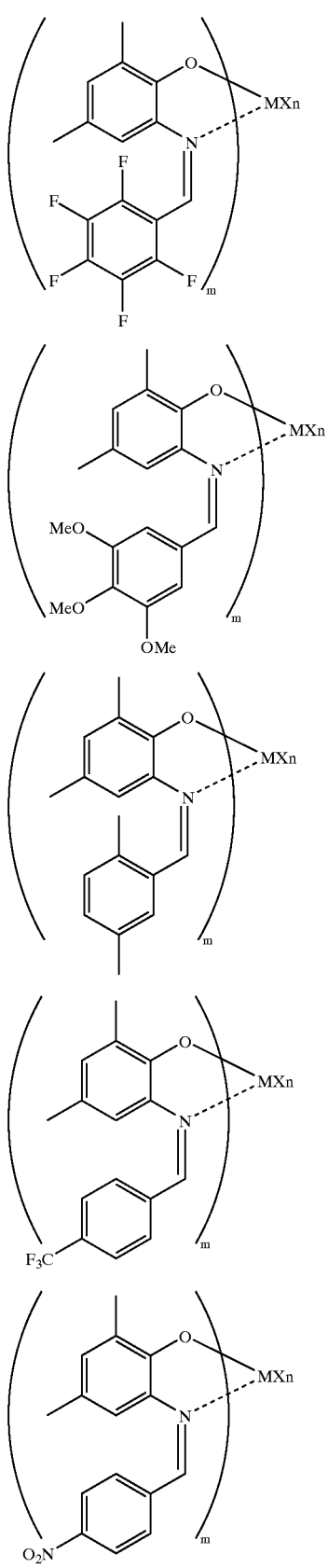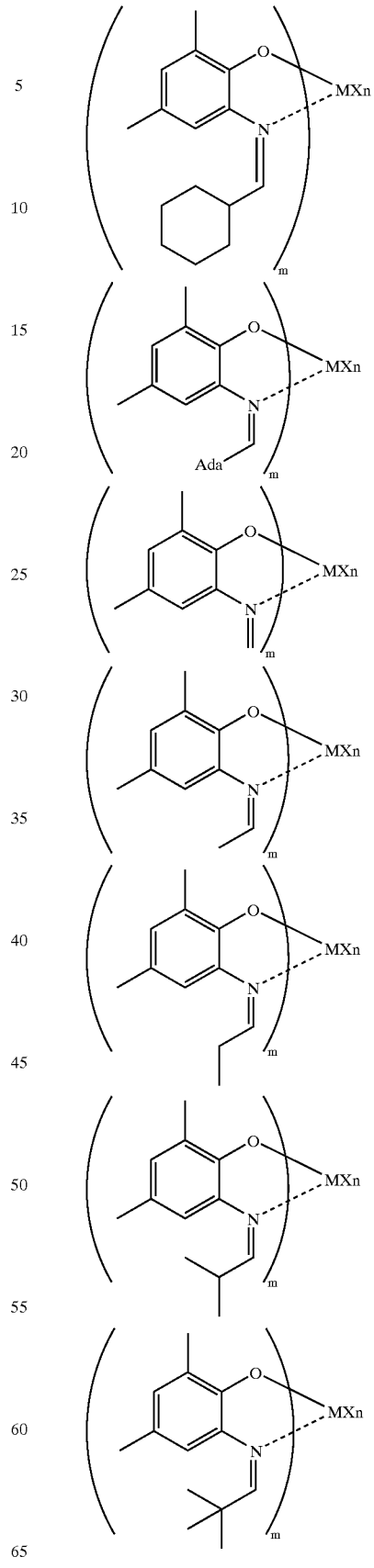

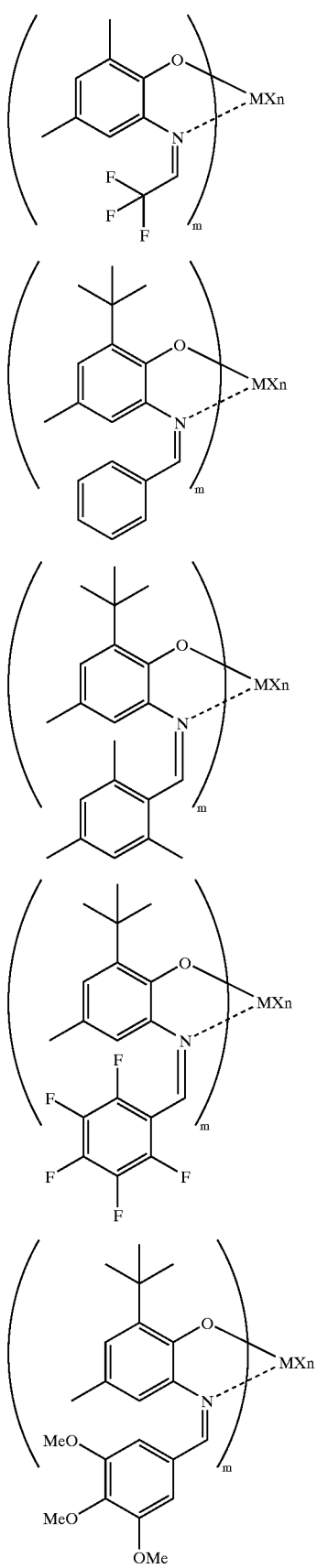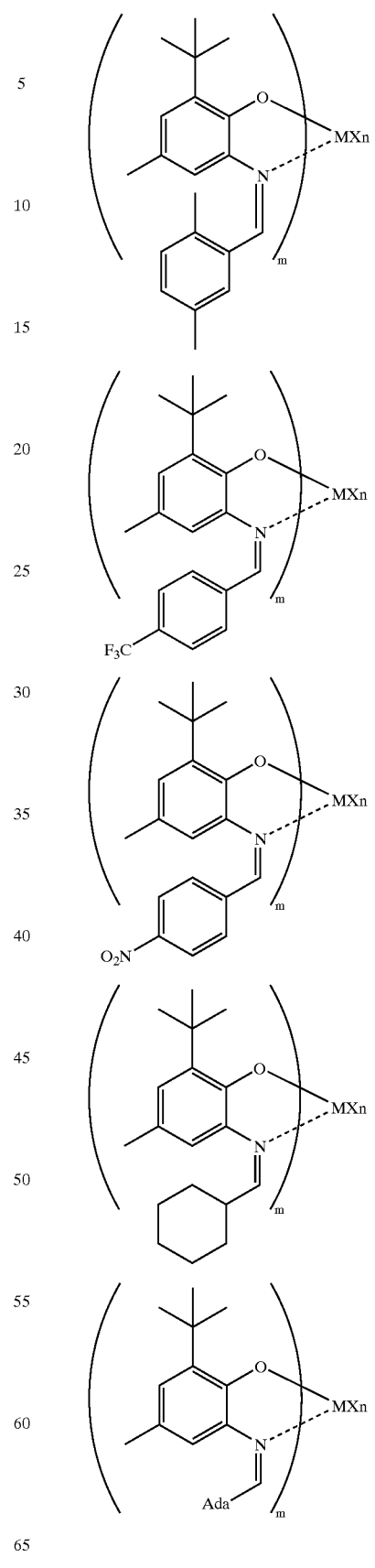

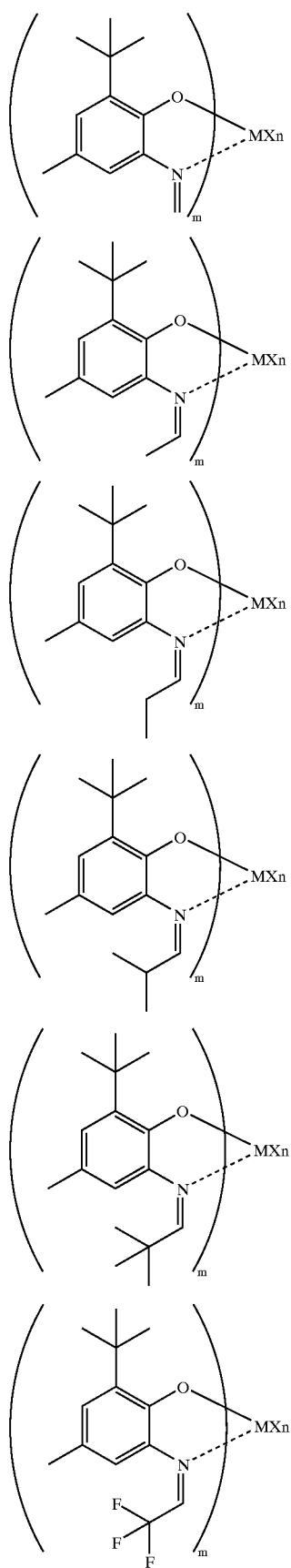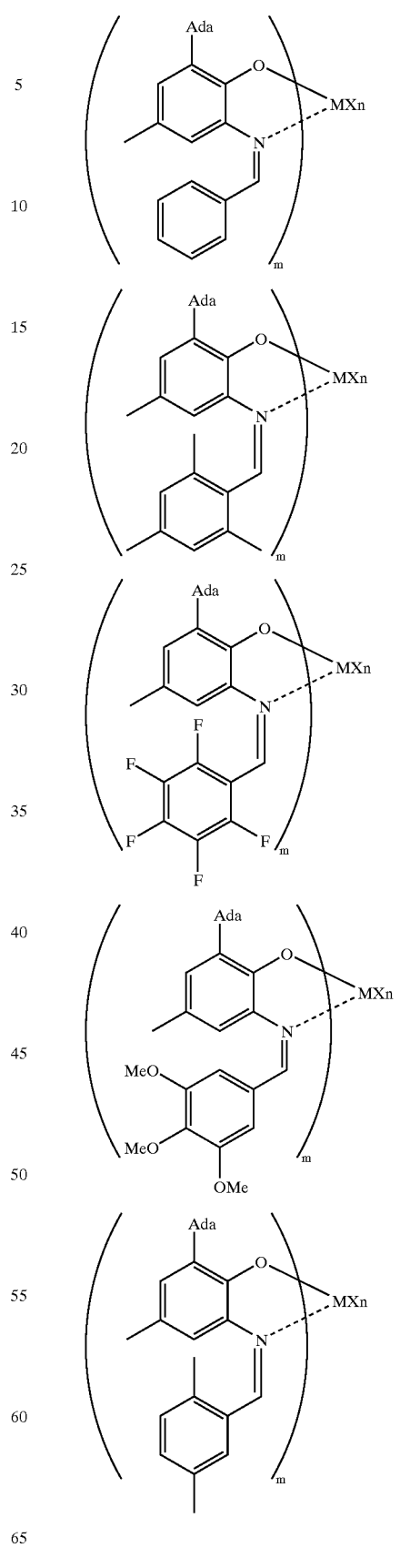

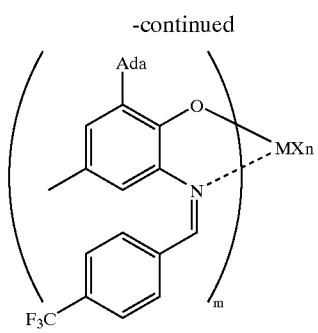
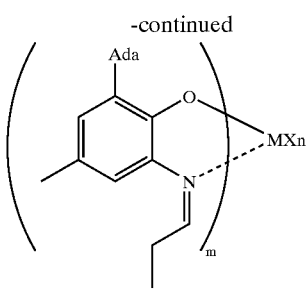
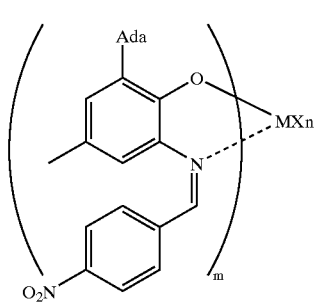
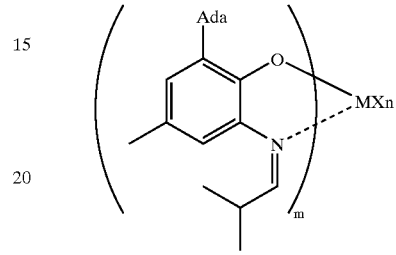
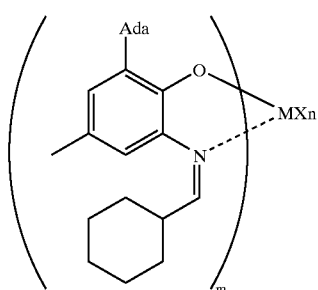
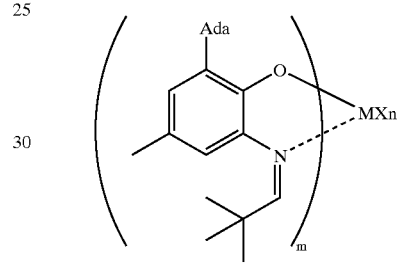
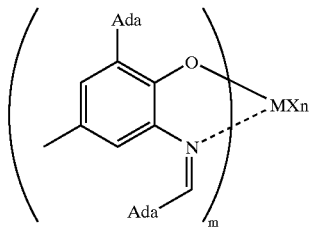
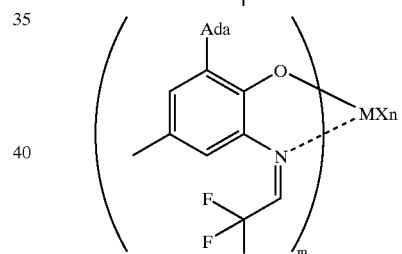
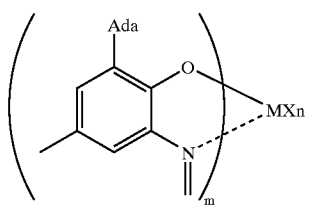
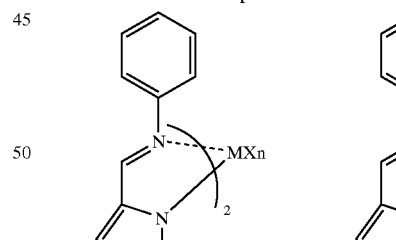
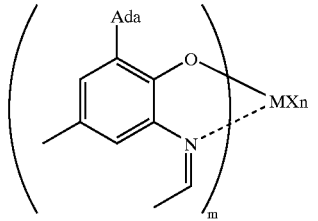
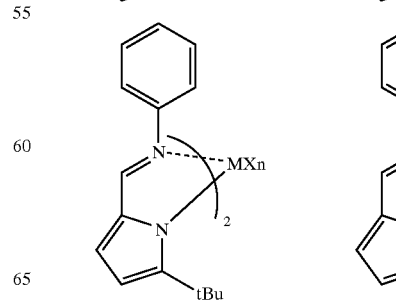

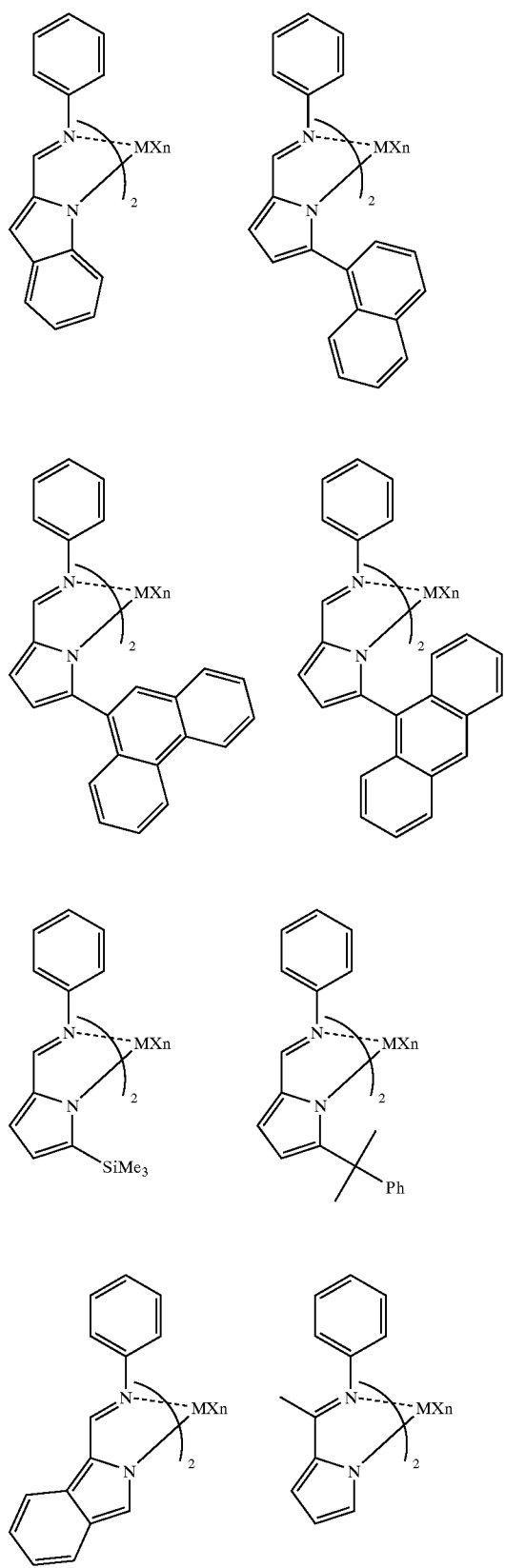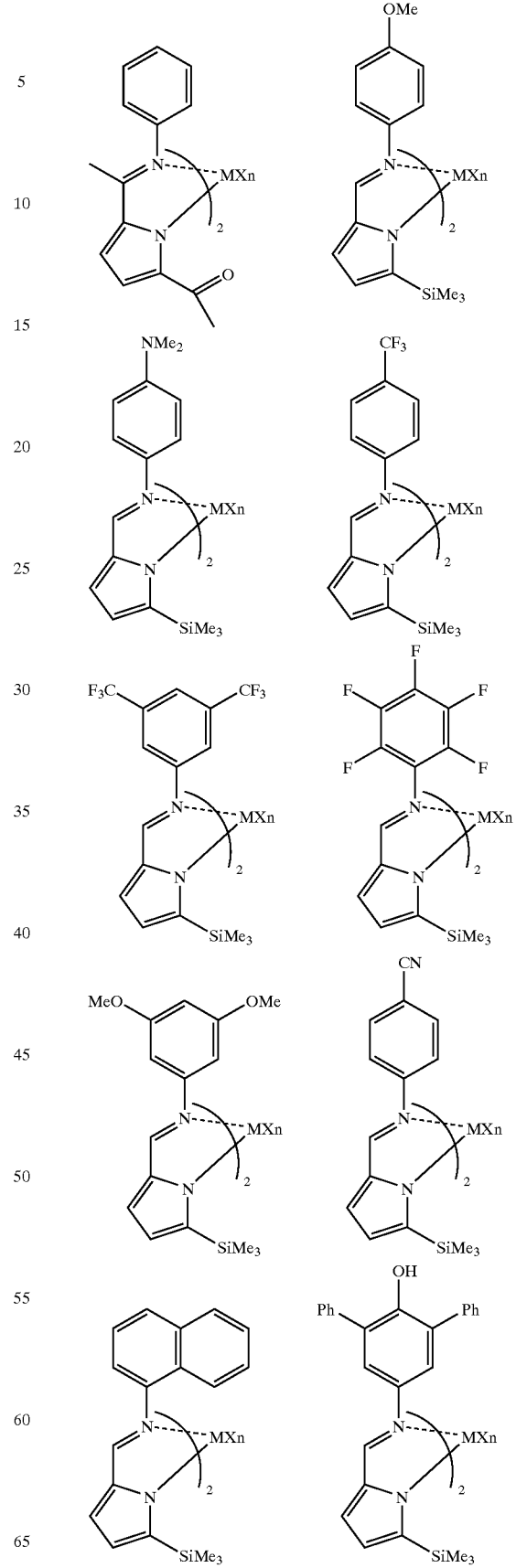

-continued
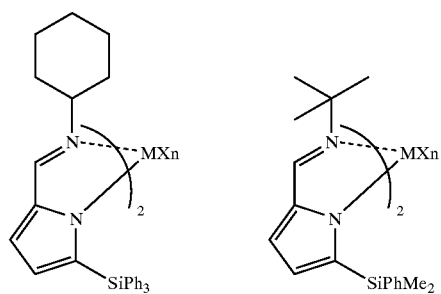
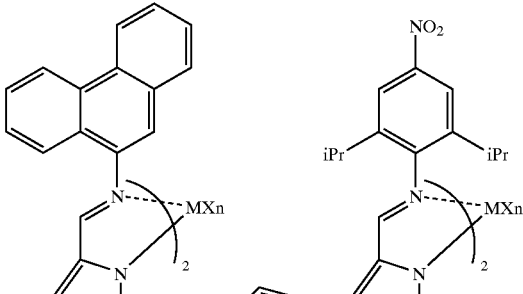
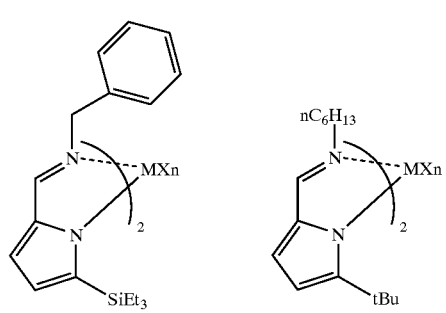
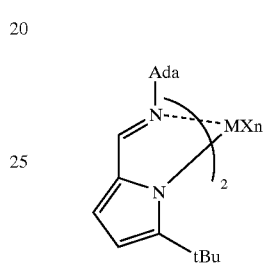
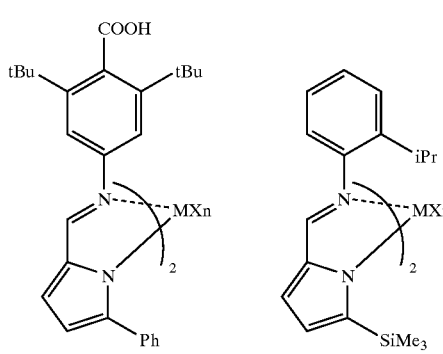
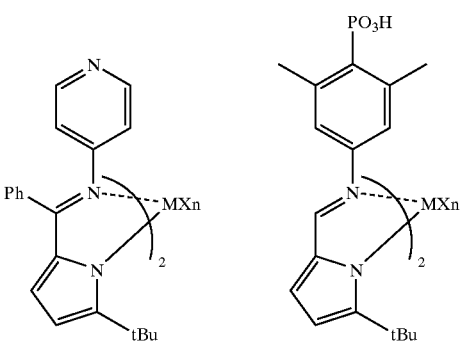
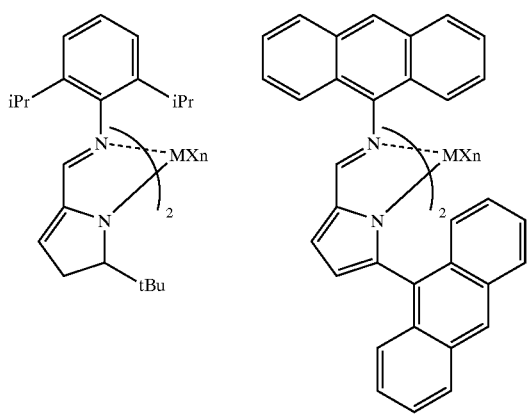
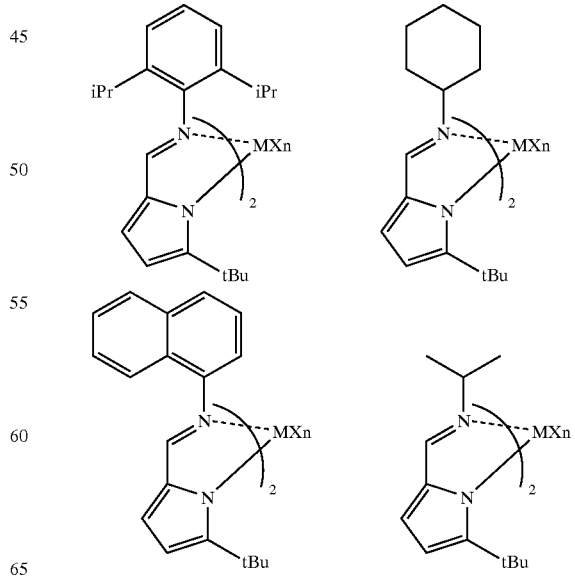

-continued
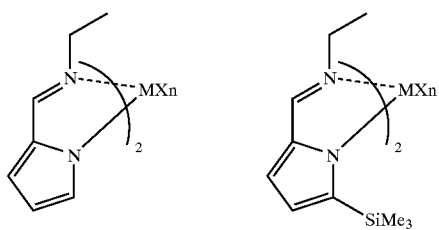
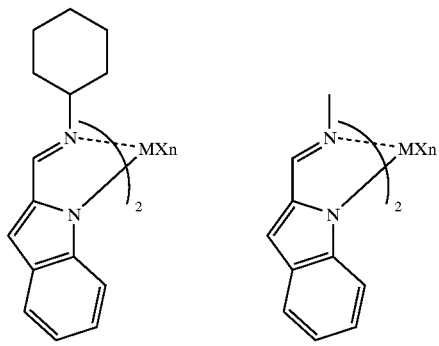
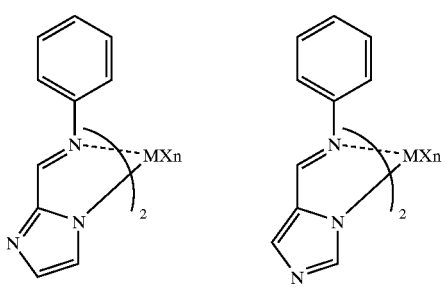
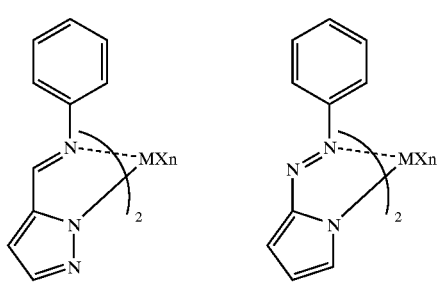
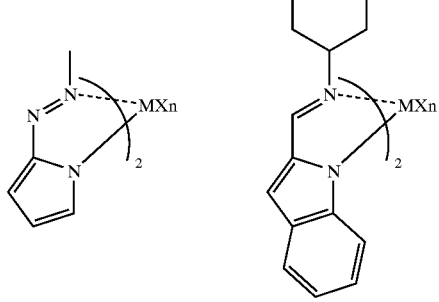
-continued
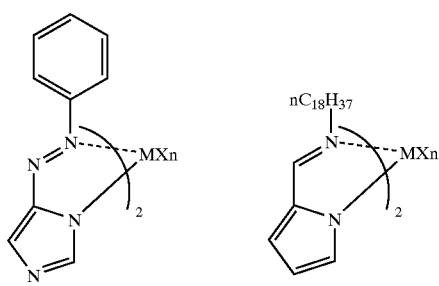
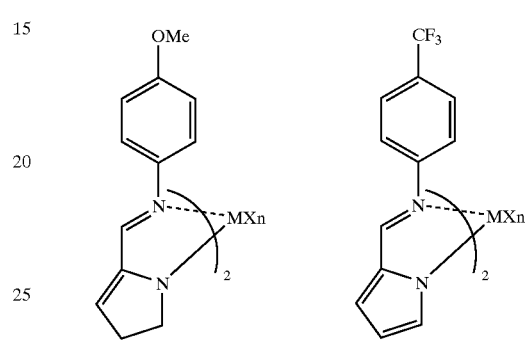
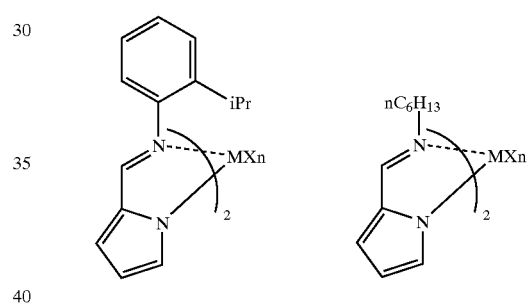
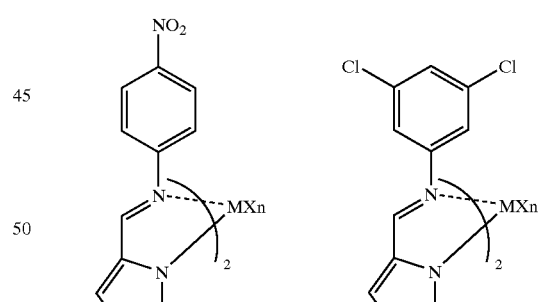
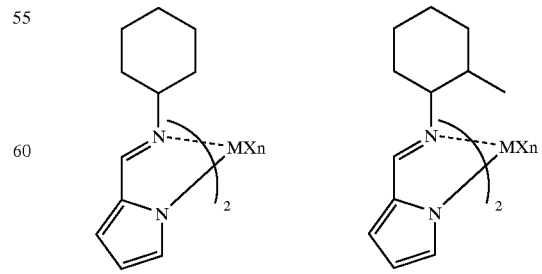

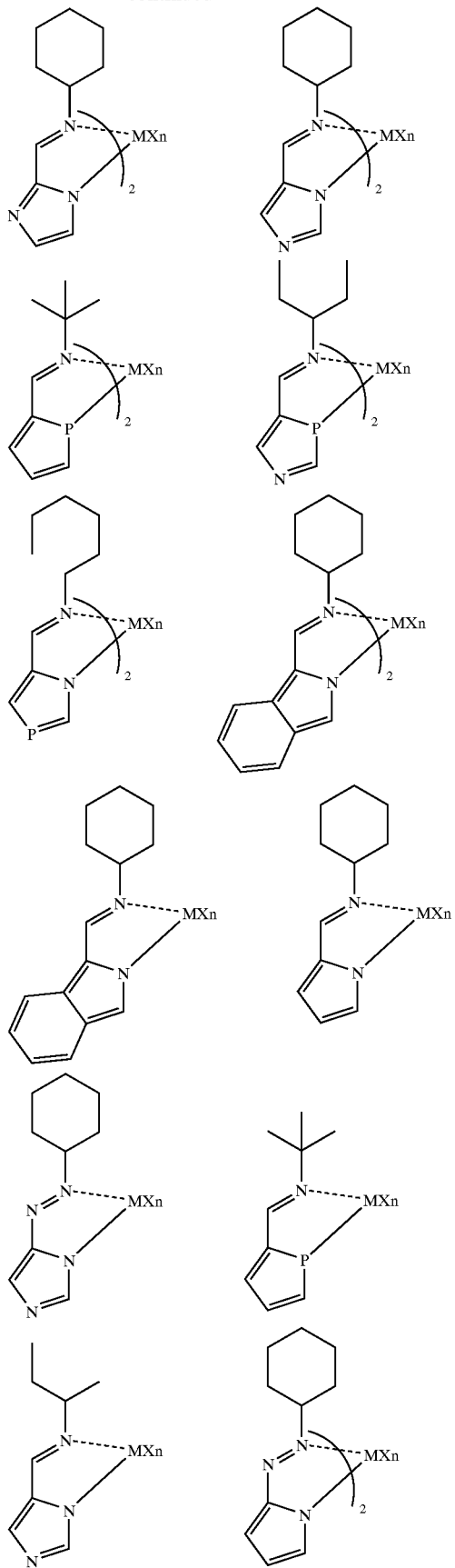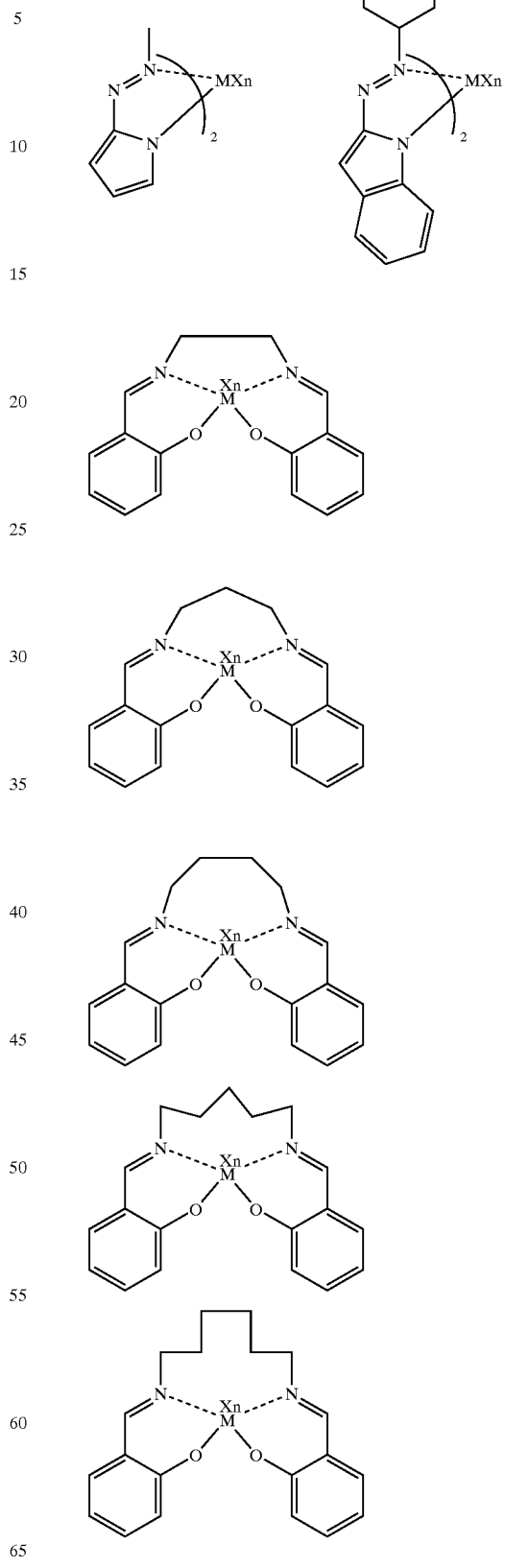

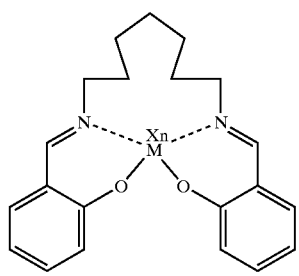
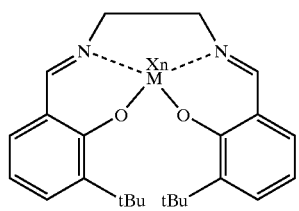
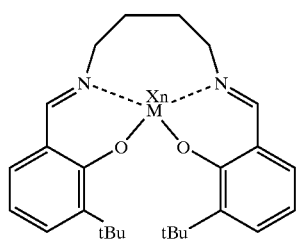
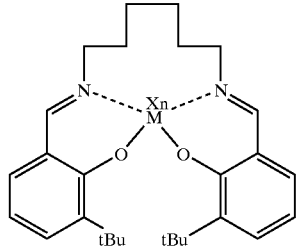
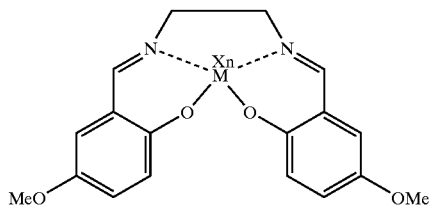
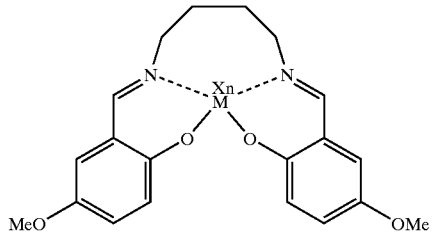
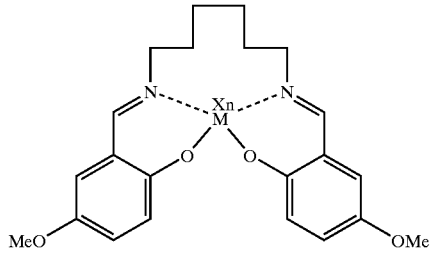
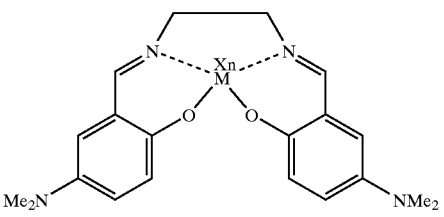
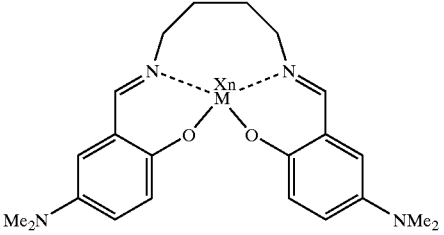
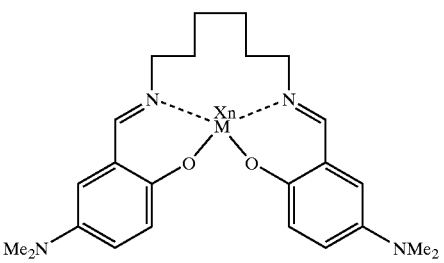
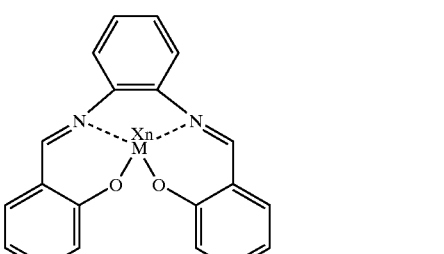
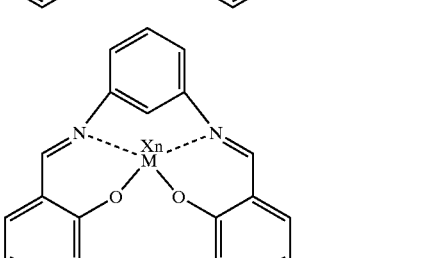
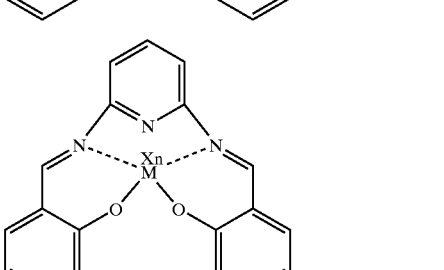
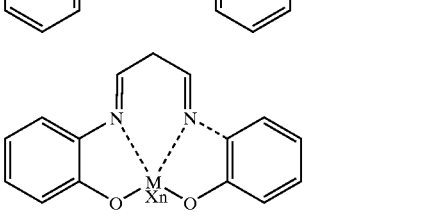

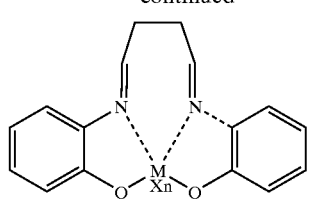
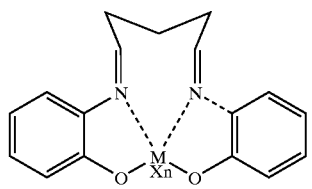
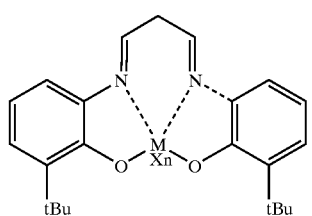
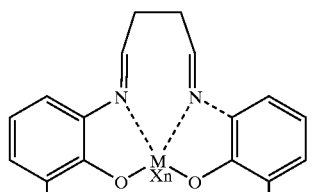
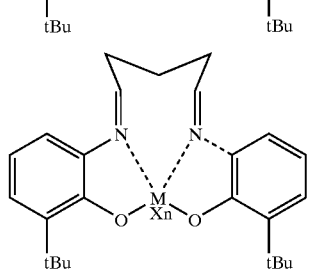
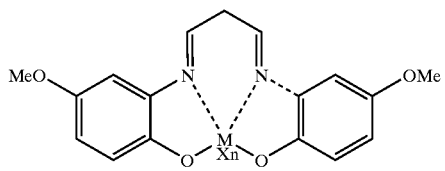
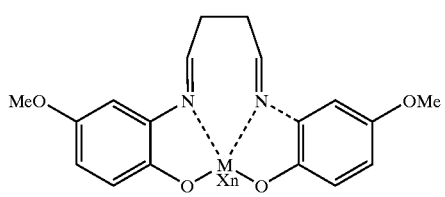
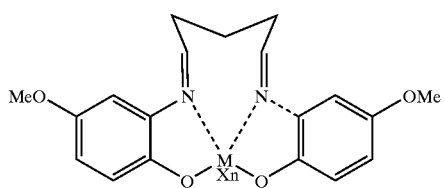
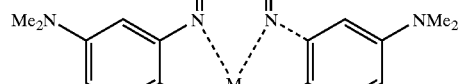
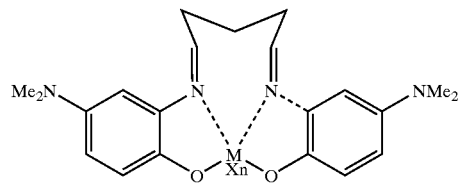
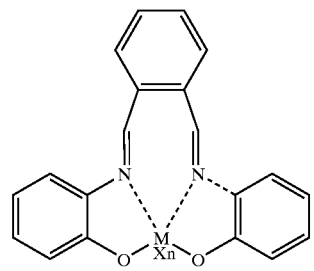
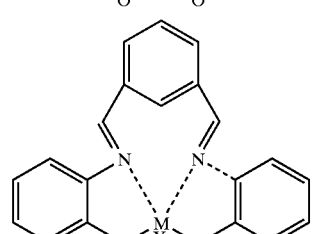
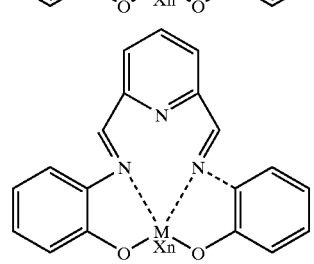
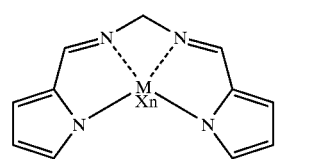
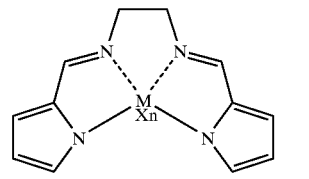

-continued
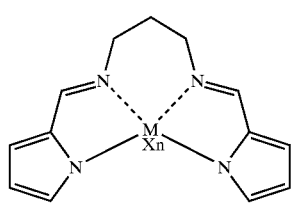
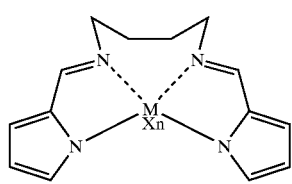
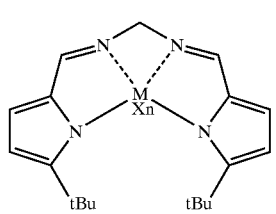
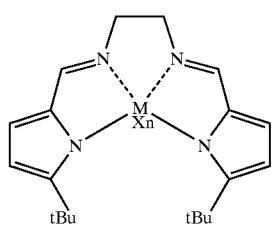
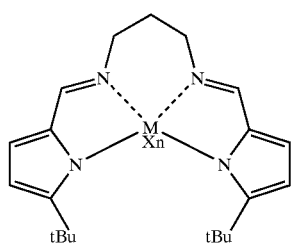
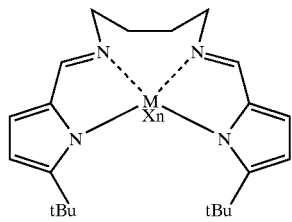
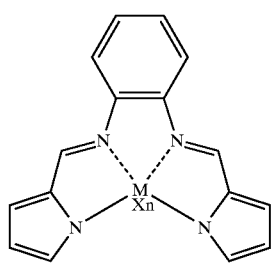
-continued
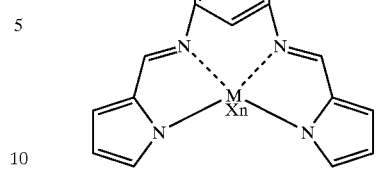
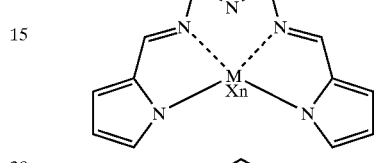
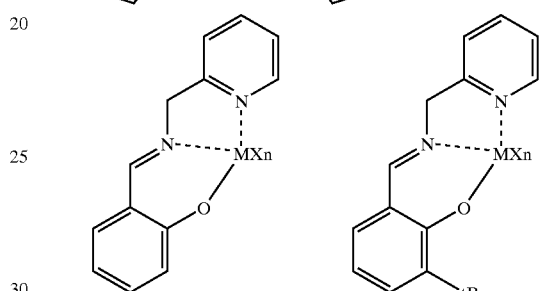
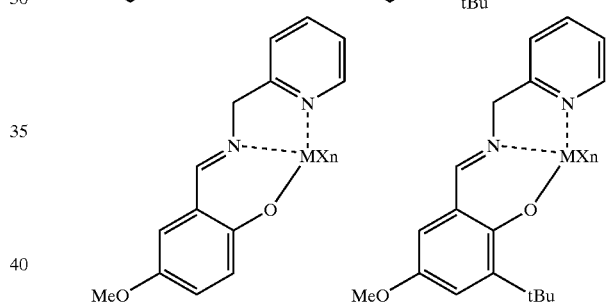
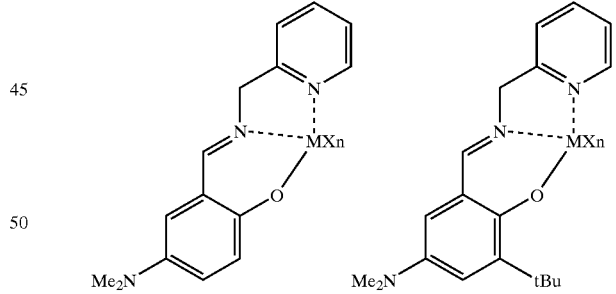
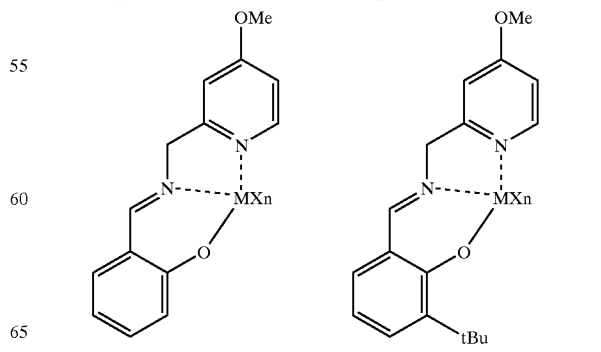

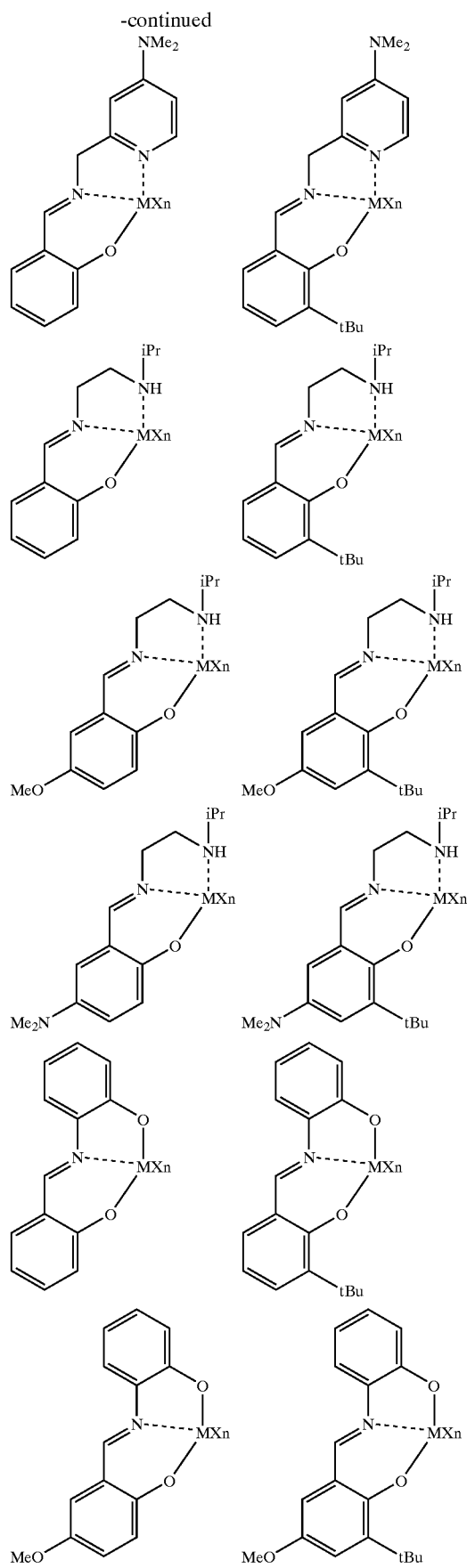
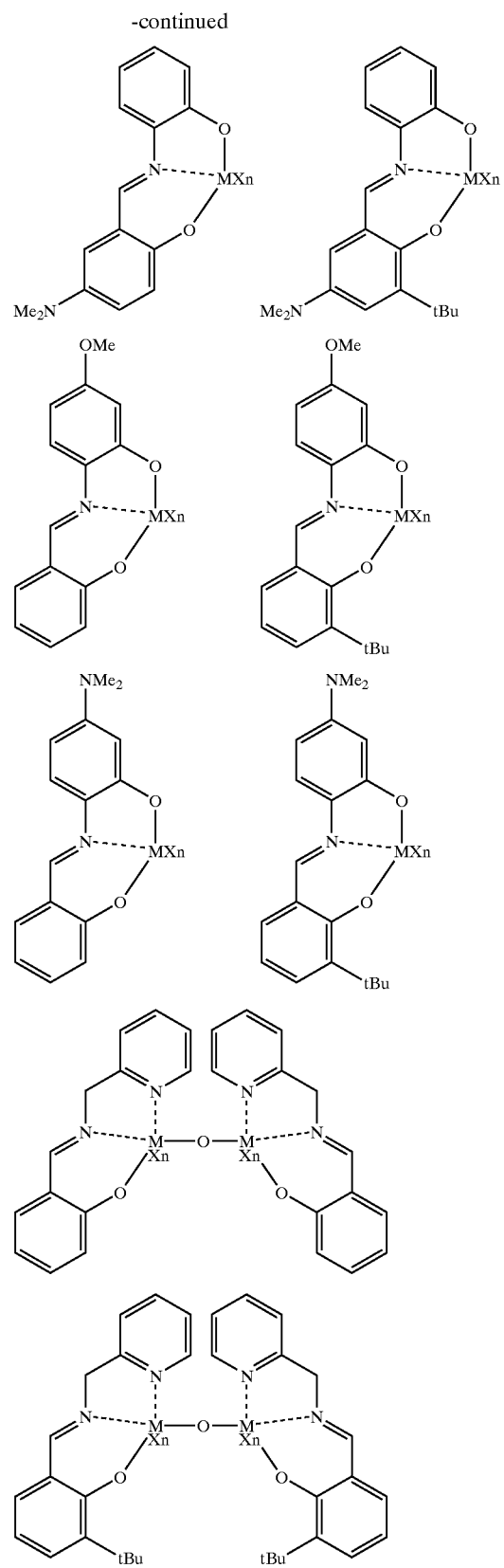

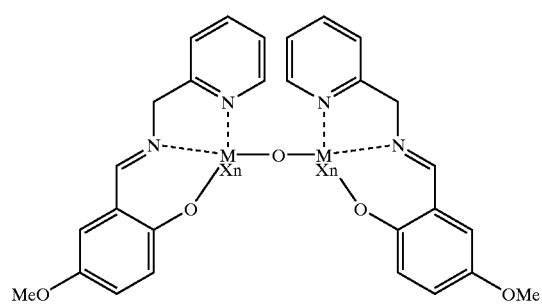
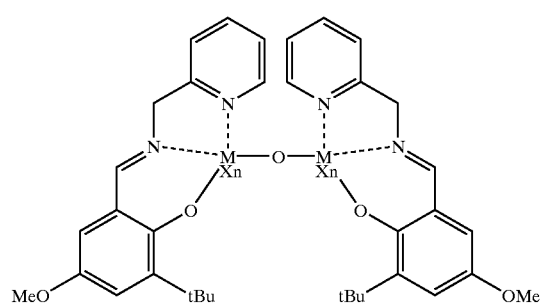
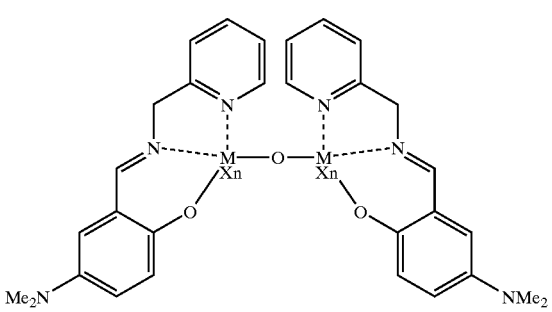
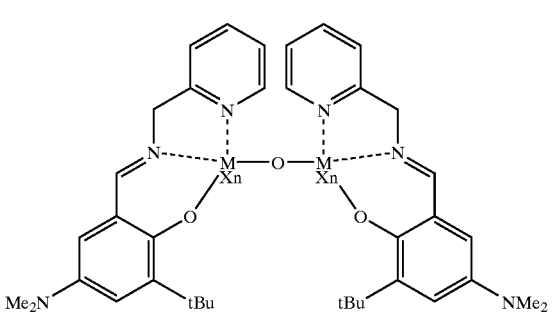
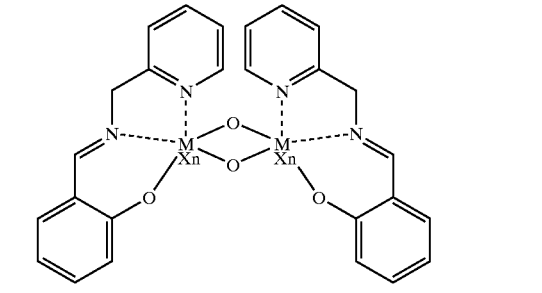
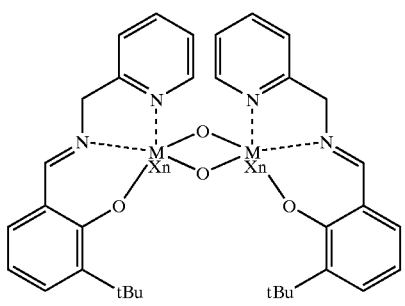
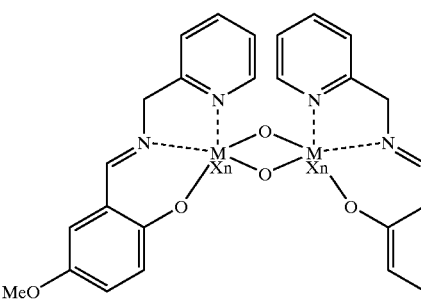
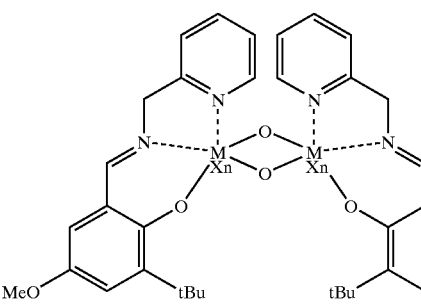
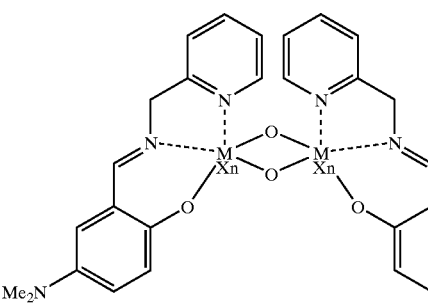
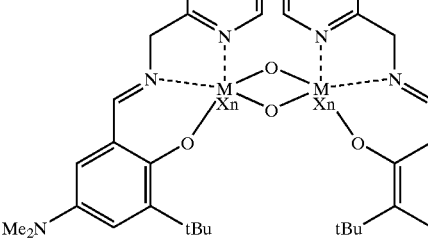

-continued
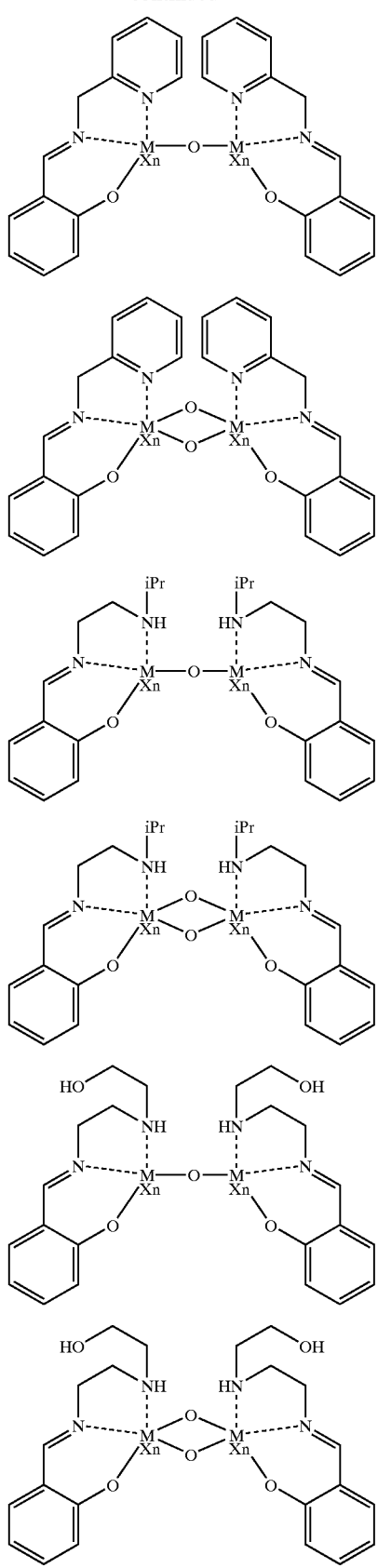
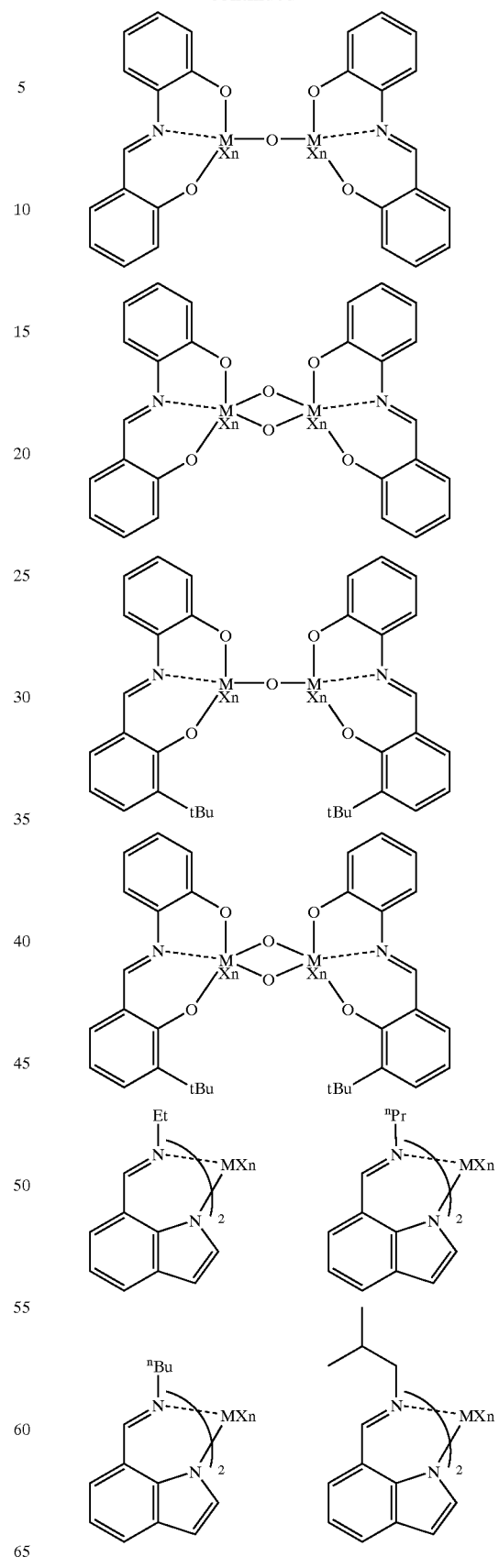

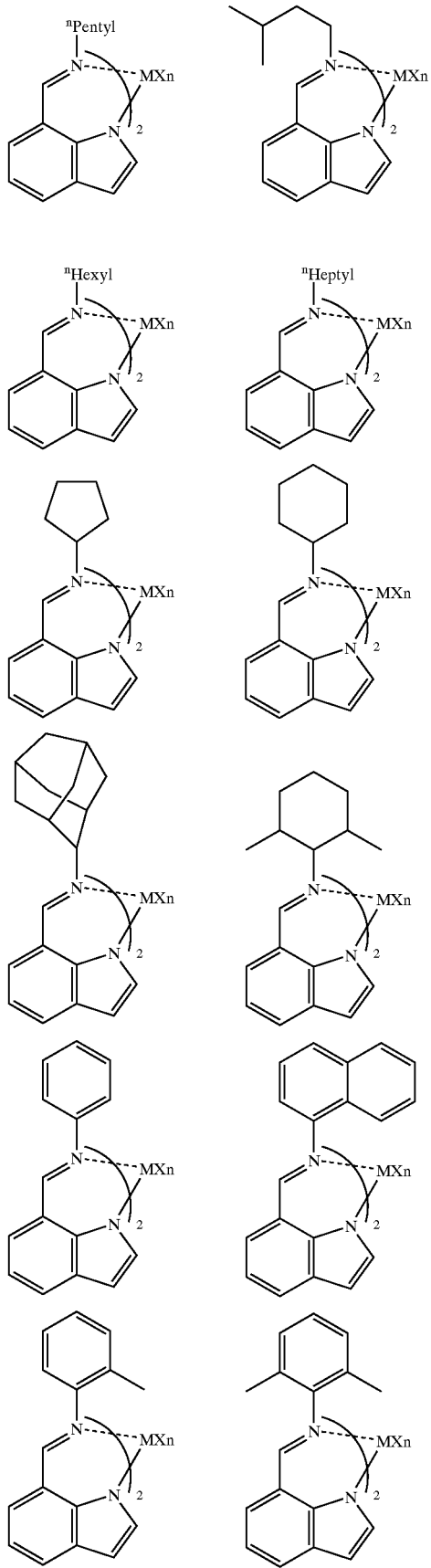
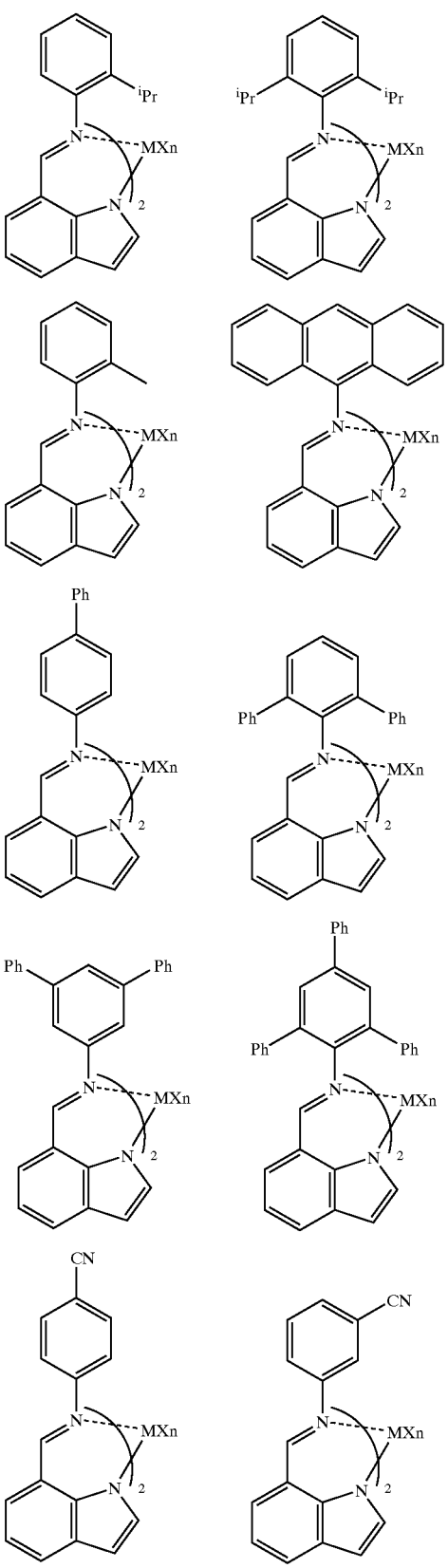

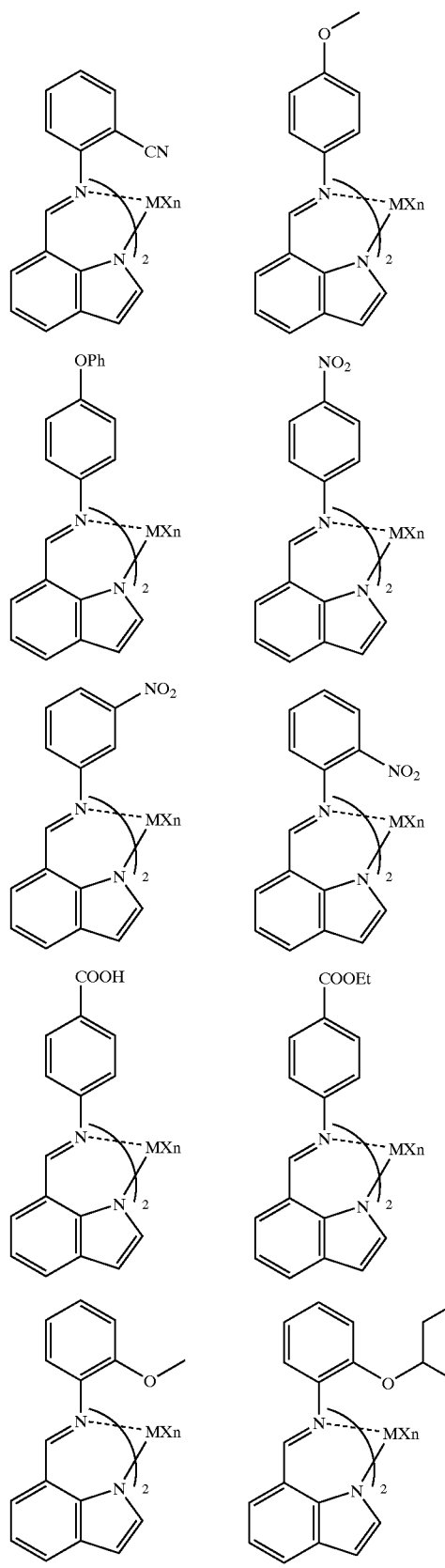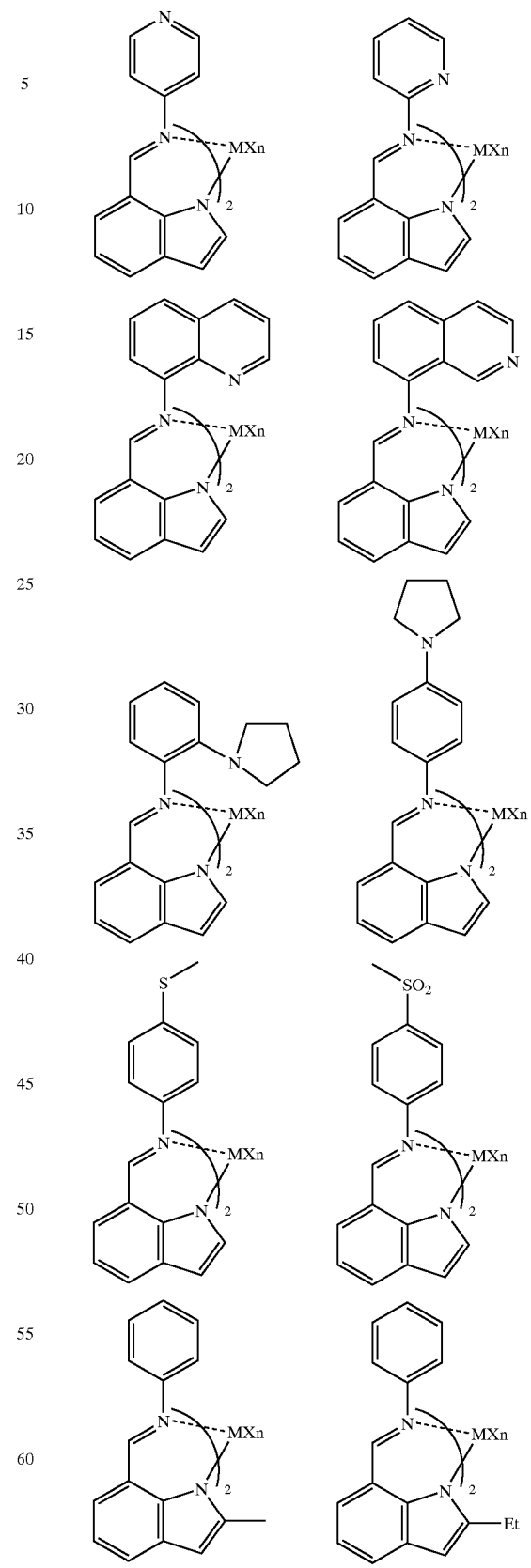

-continued
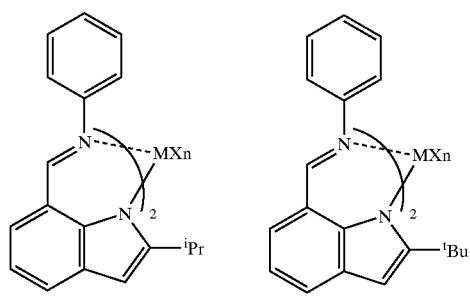
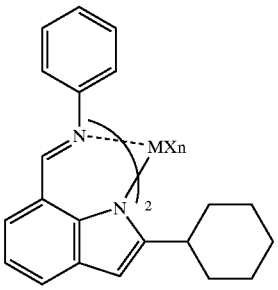
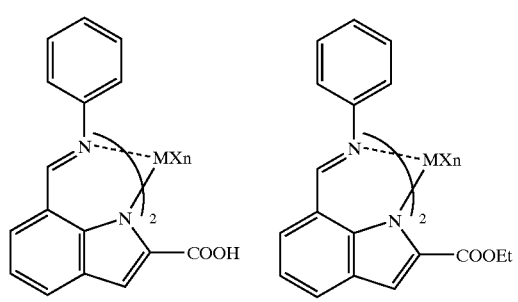
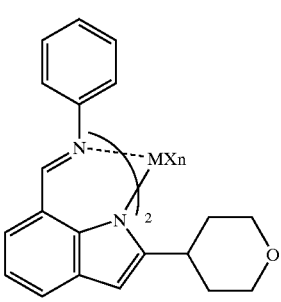
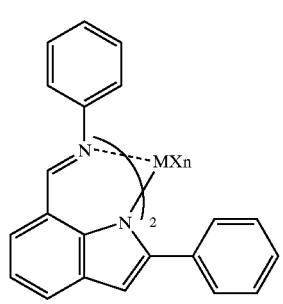
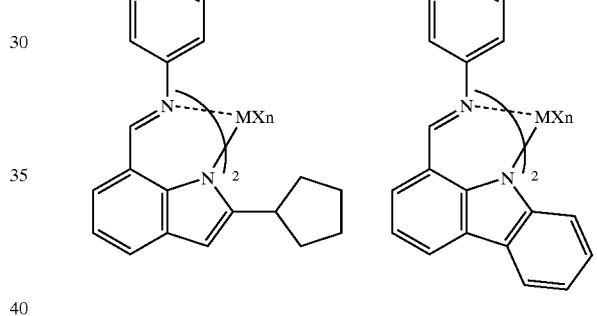
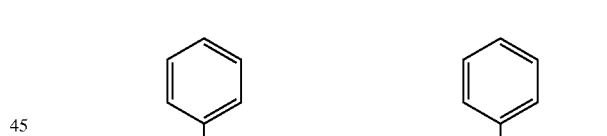
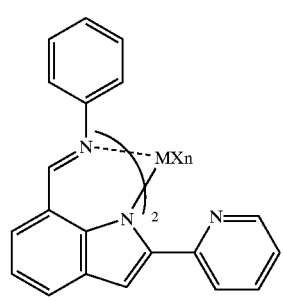
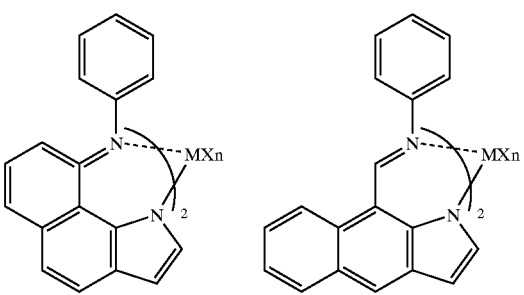
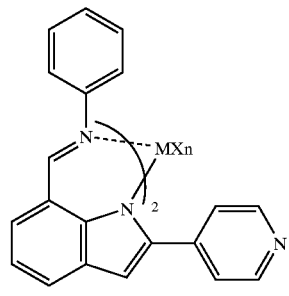
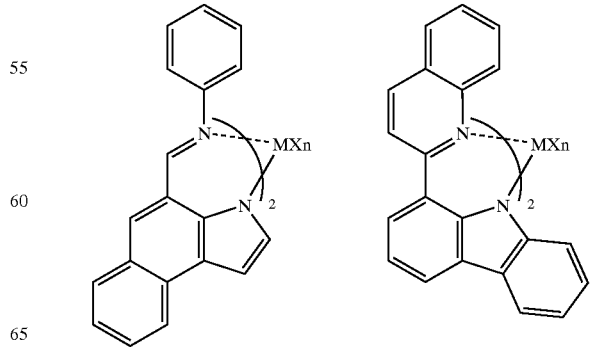

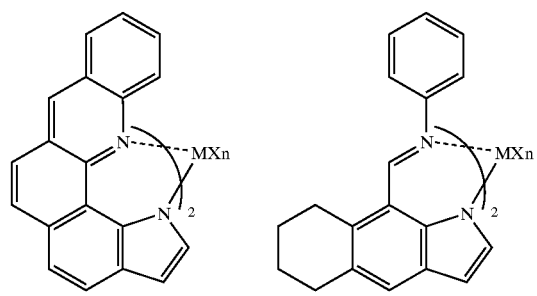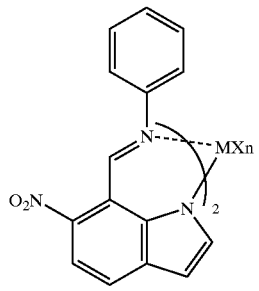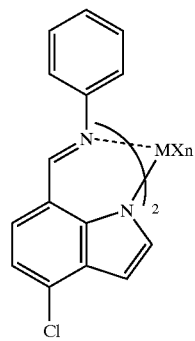
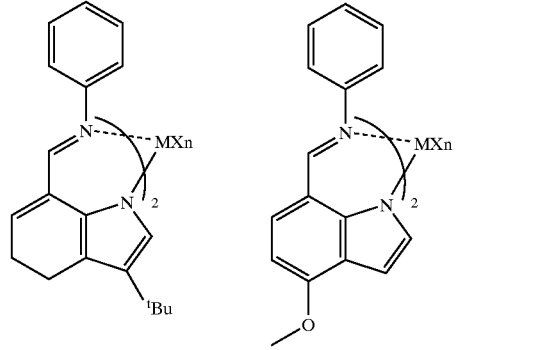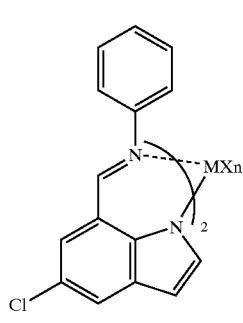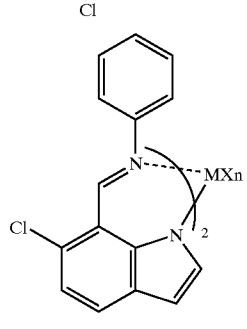
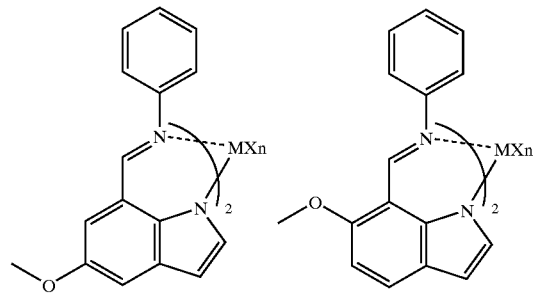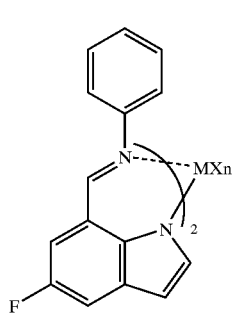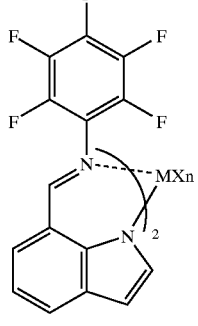
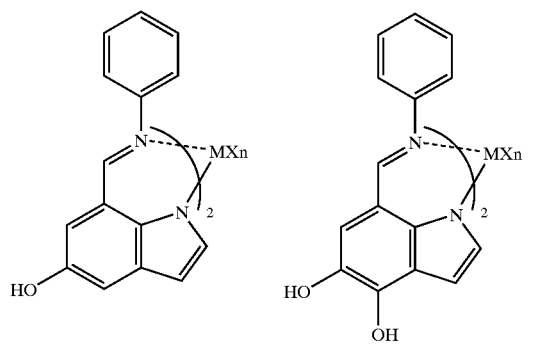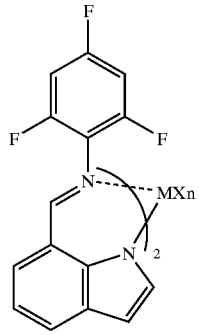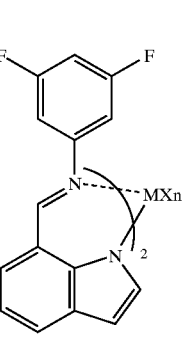
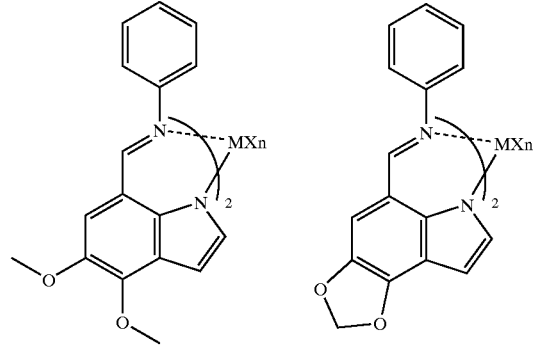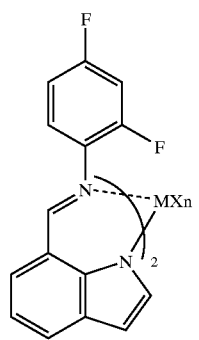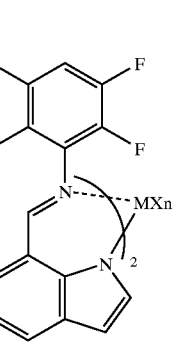

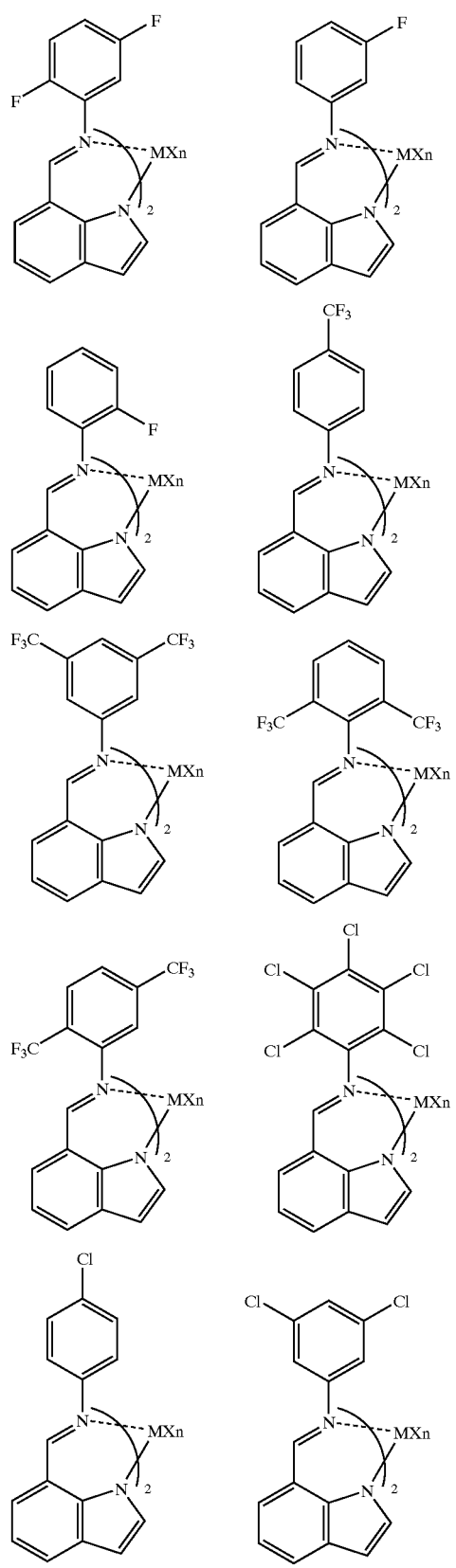
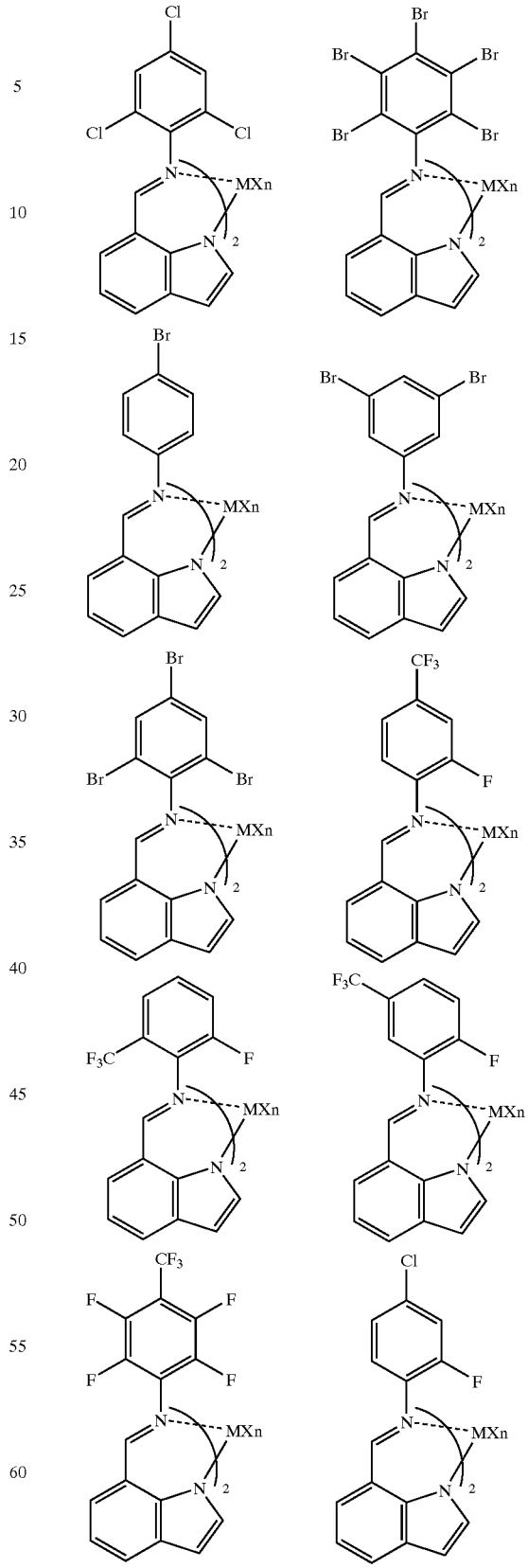

-continued
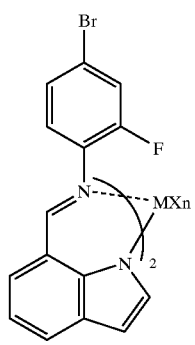
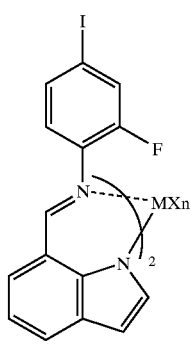
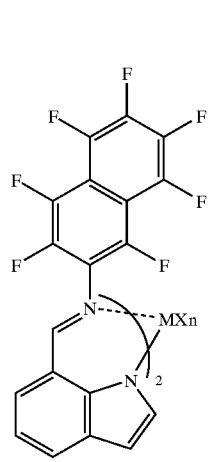
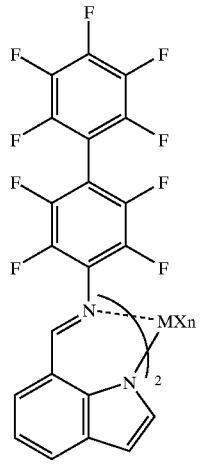
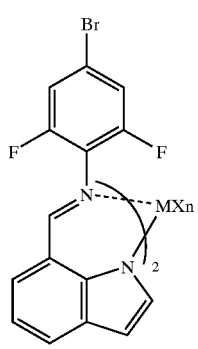
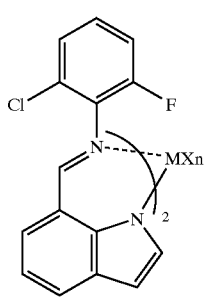
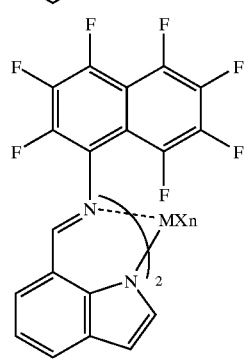
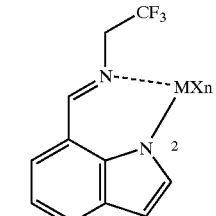
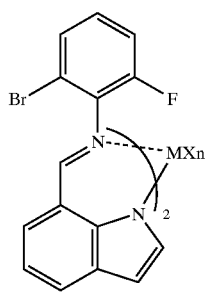
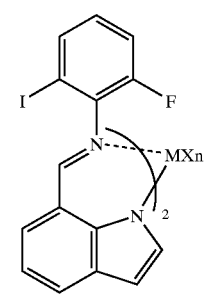
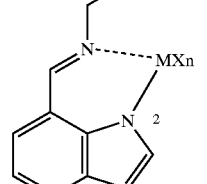
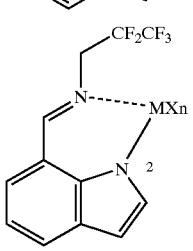
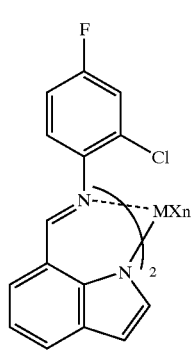
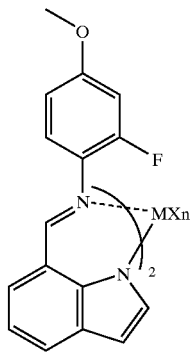
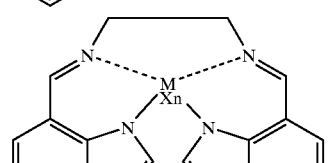
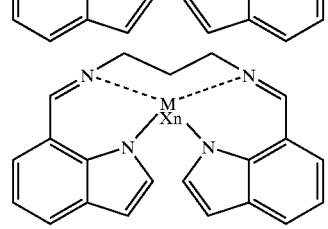

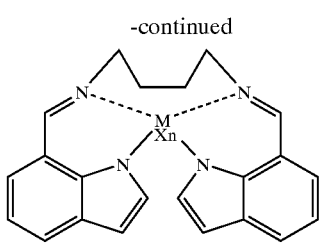
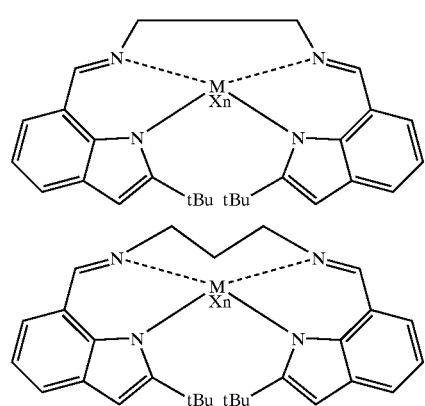
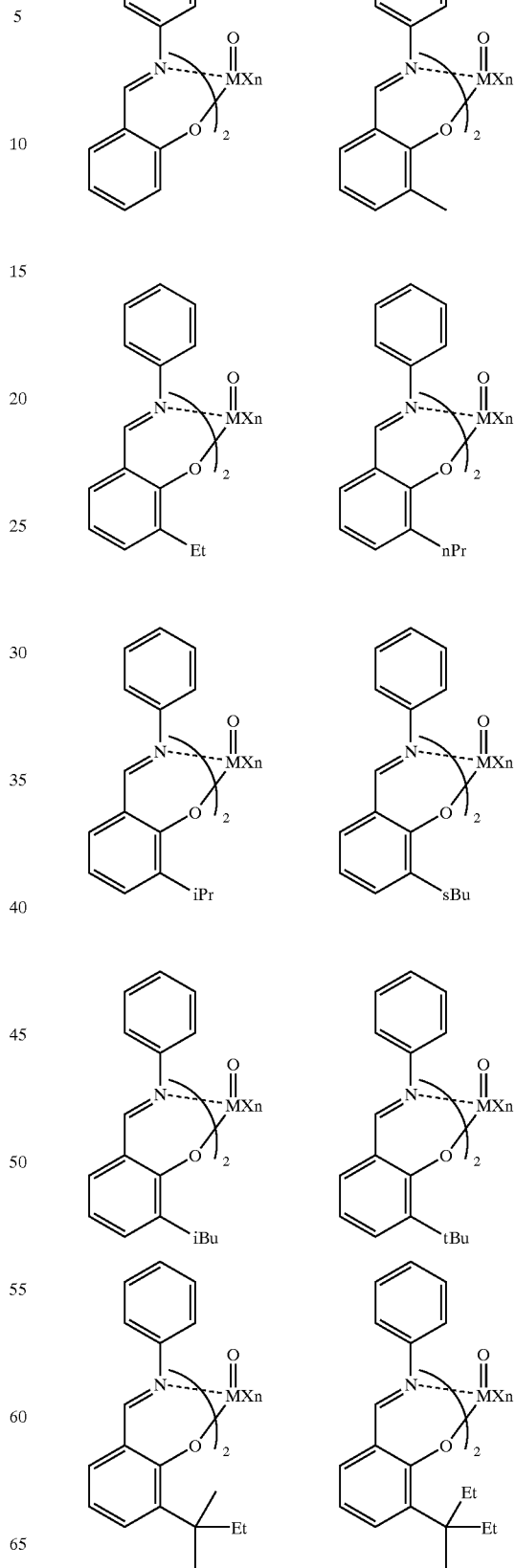

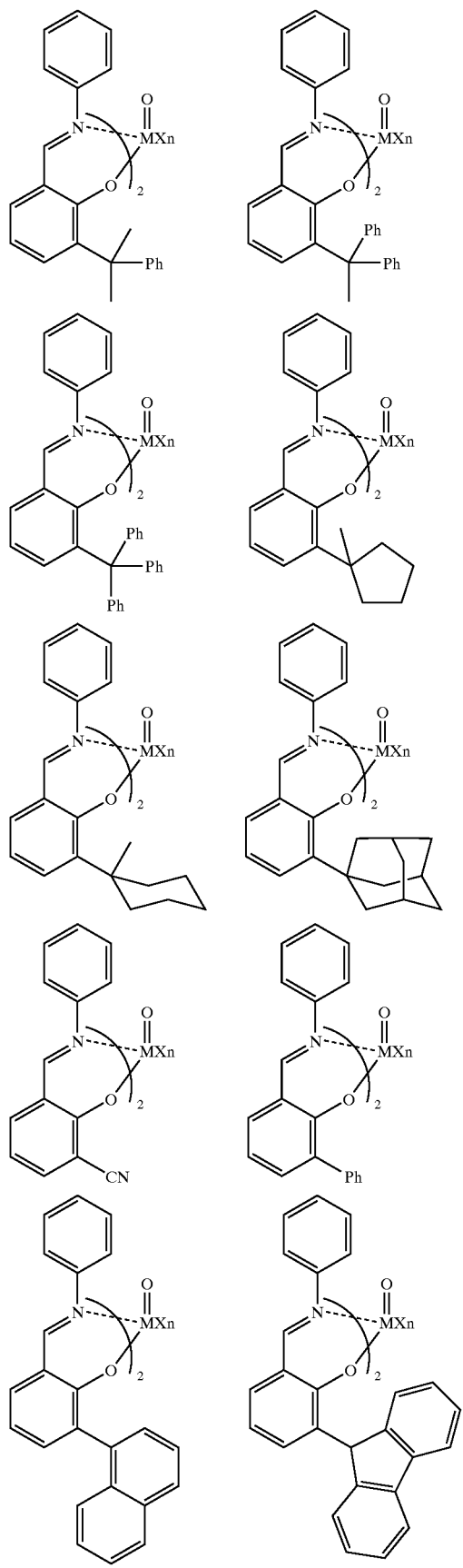
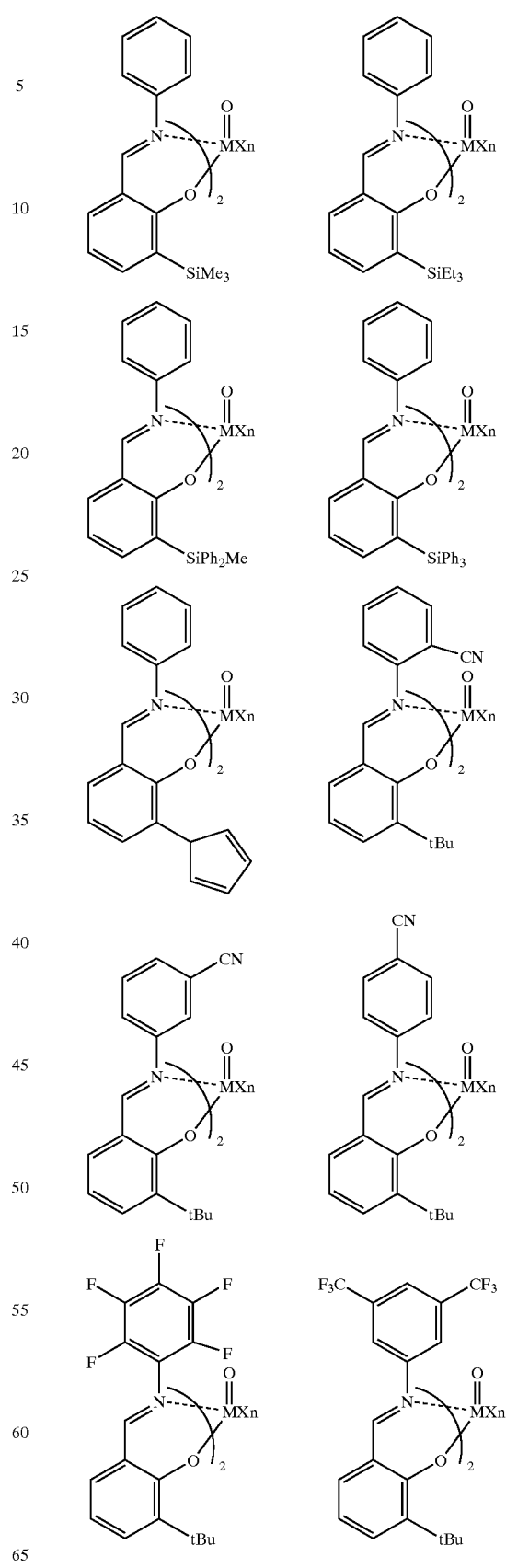

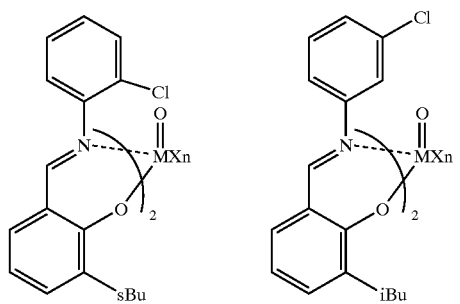
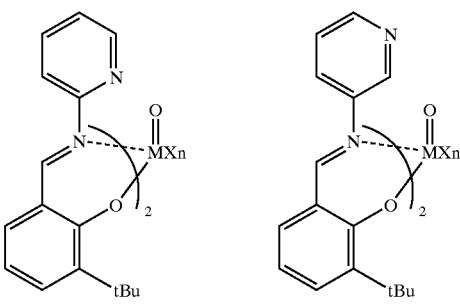
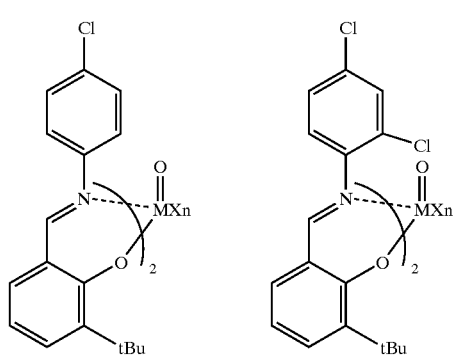
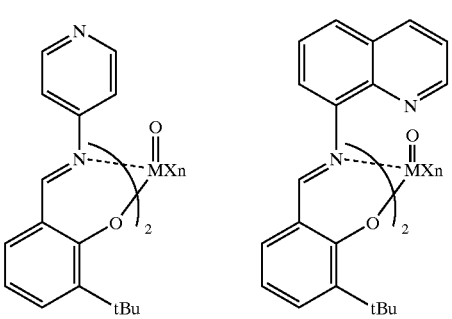
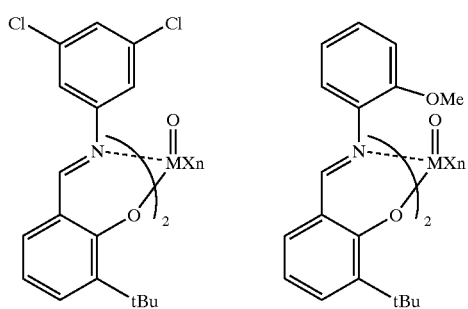
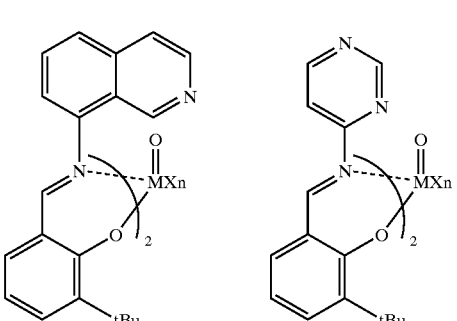
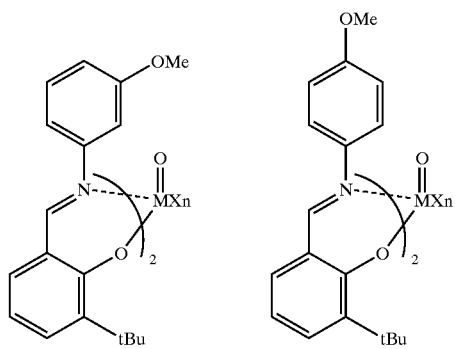
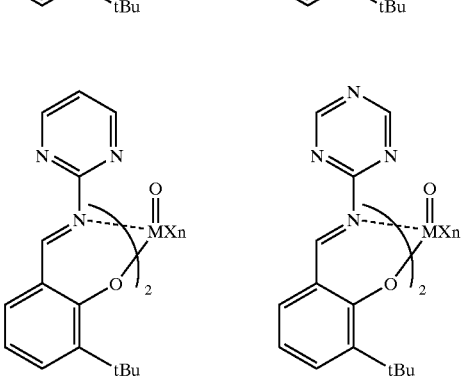
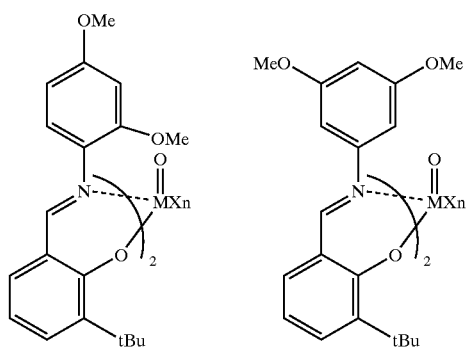
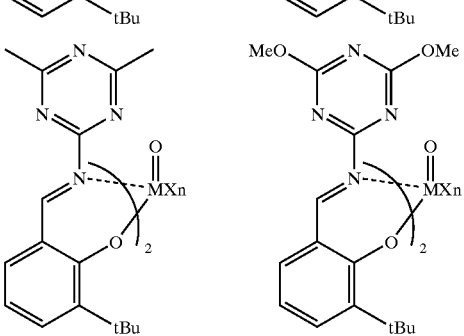

-continued
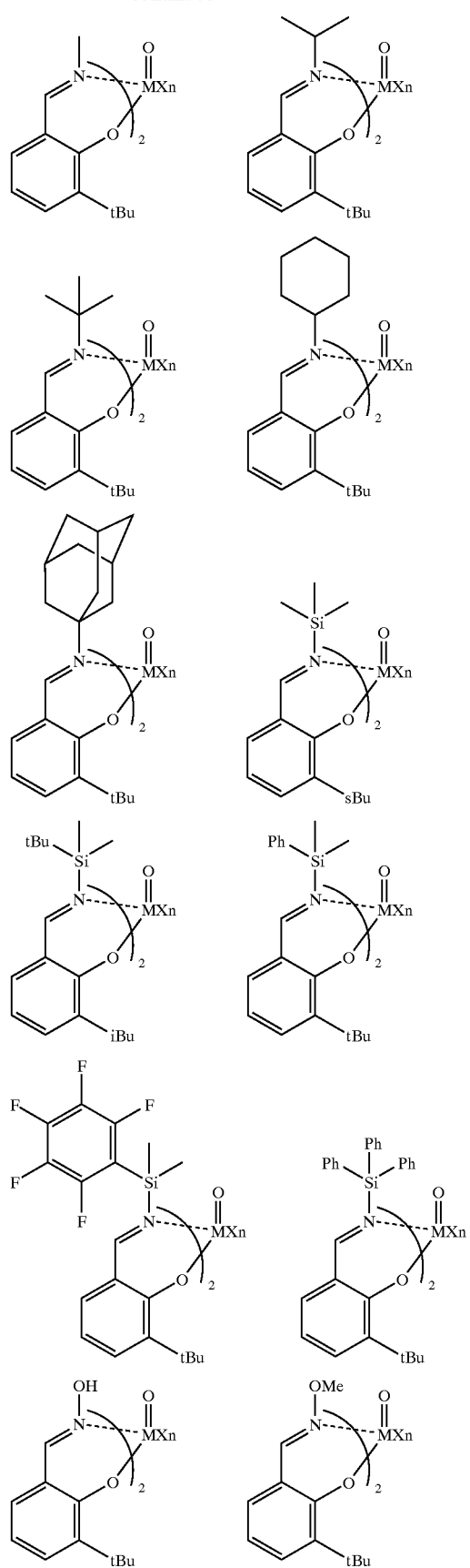
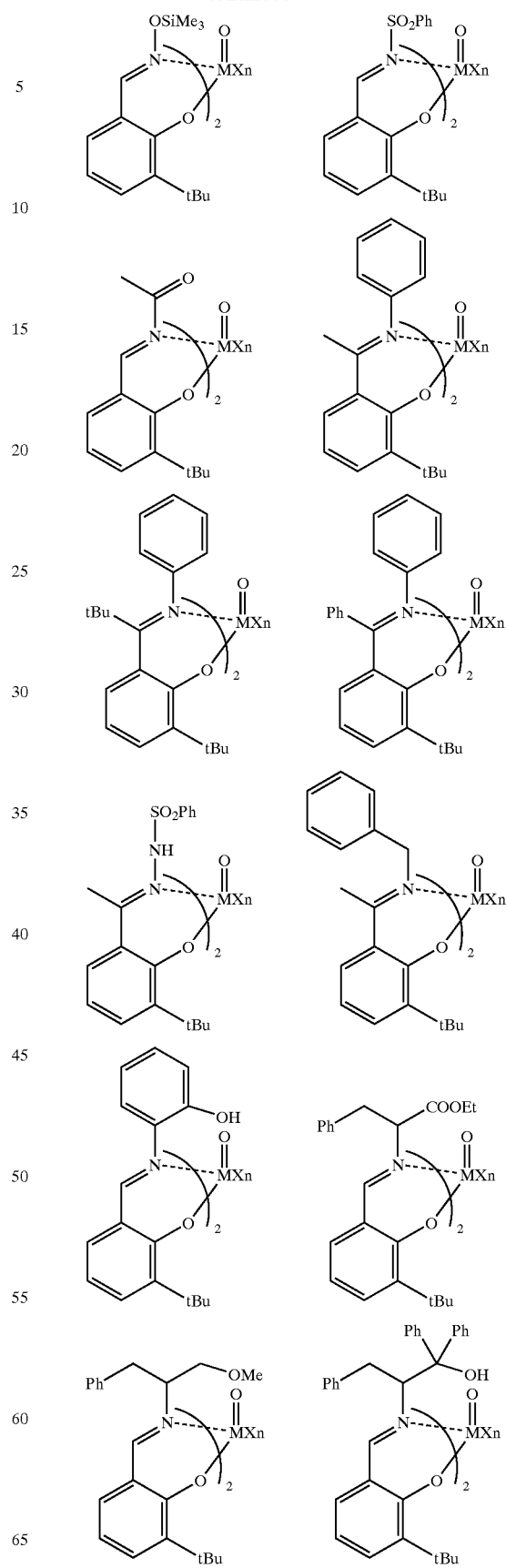

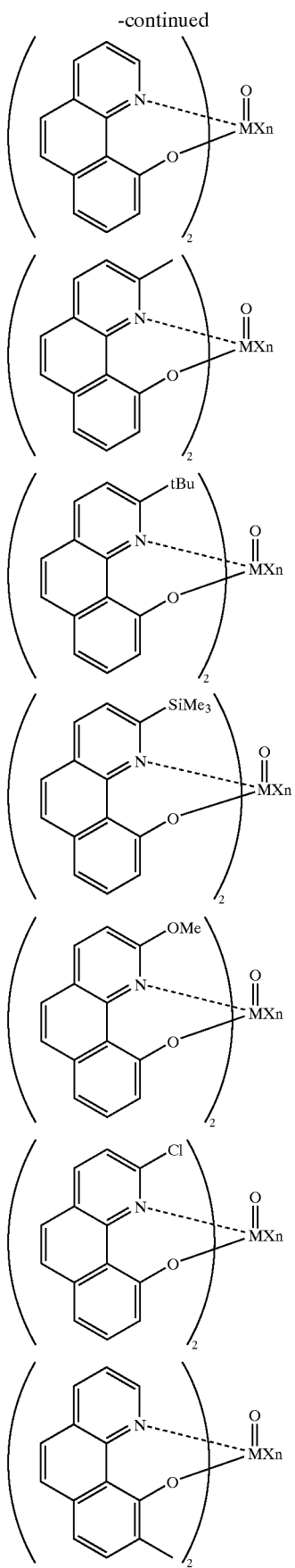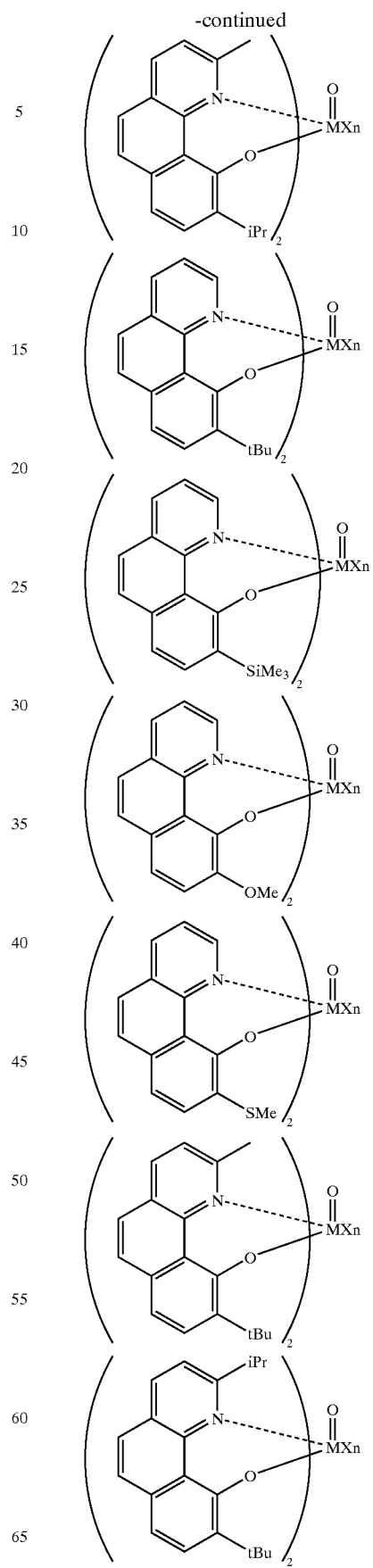

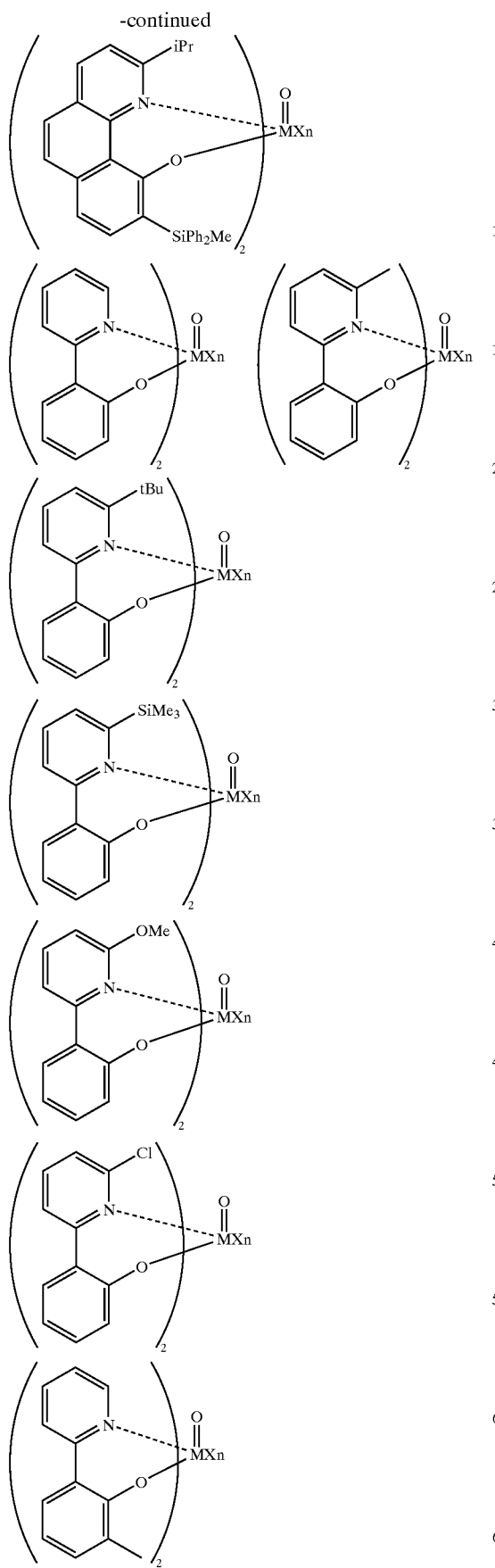
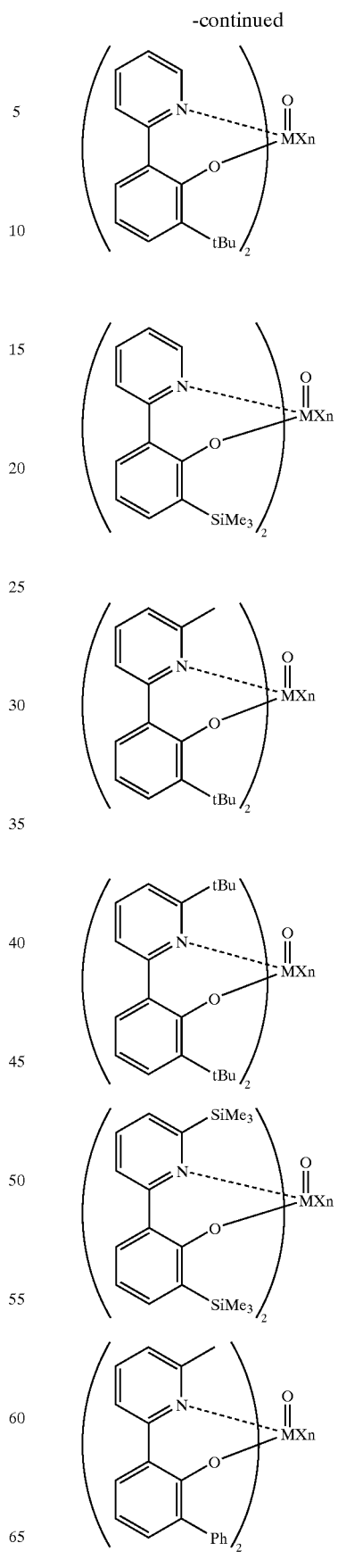

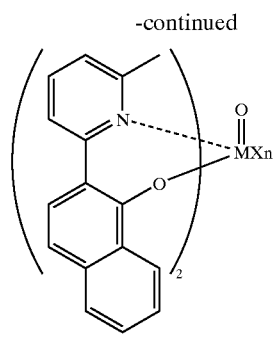
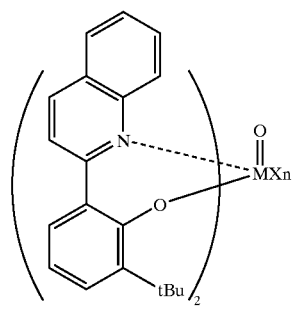
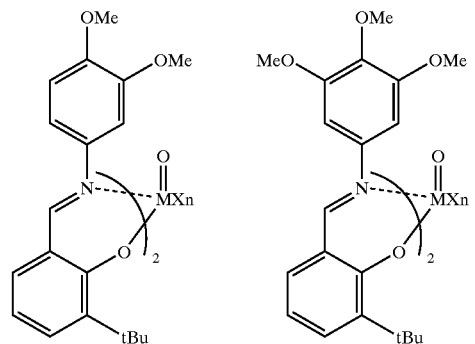
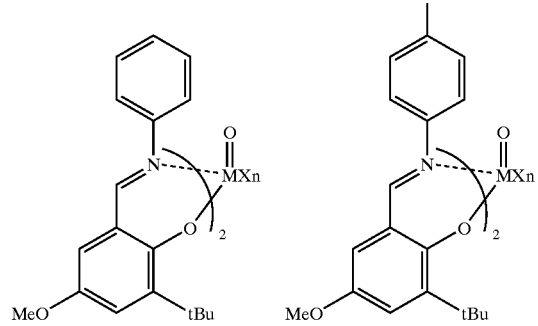
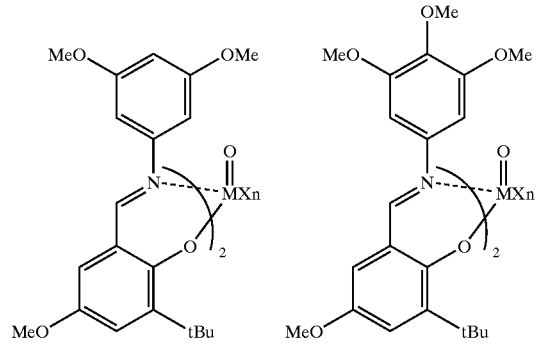
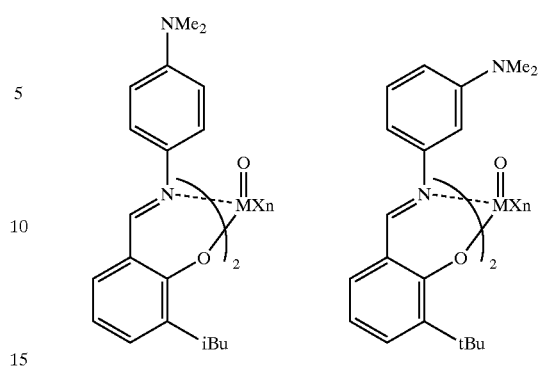
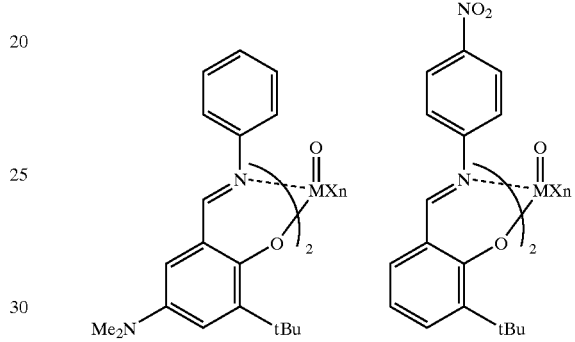
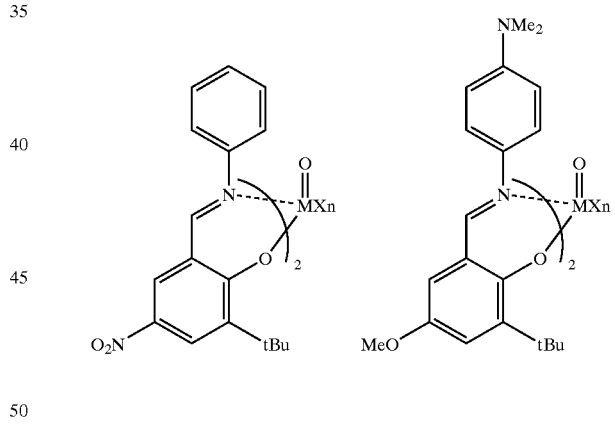
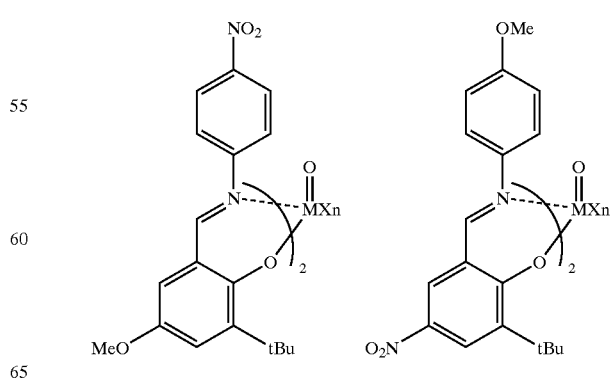

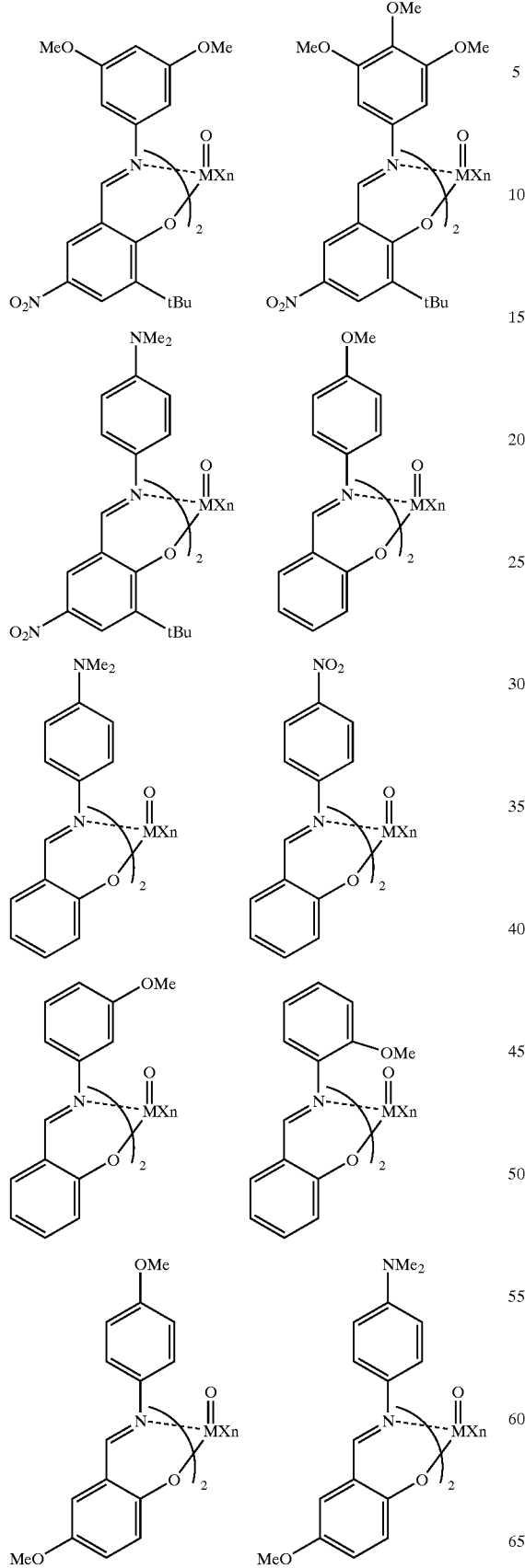
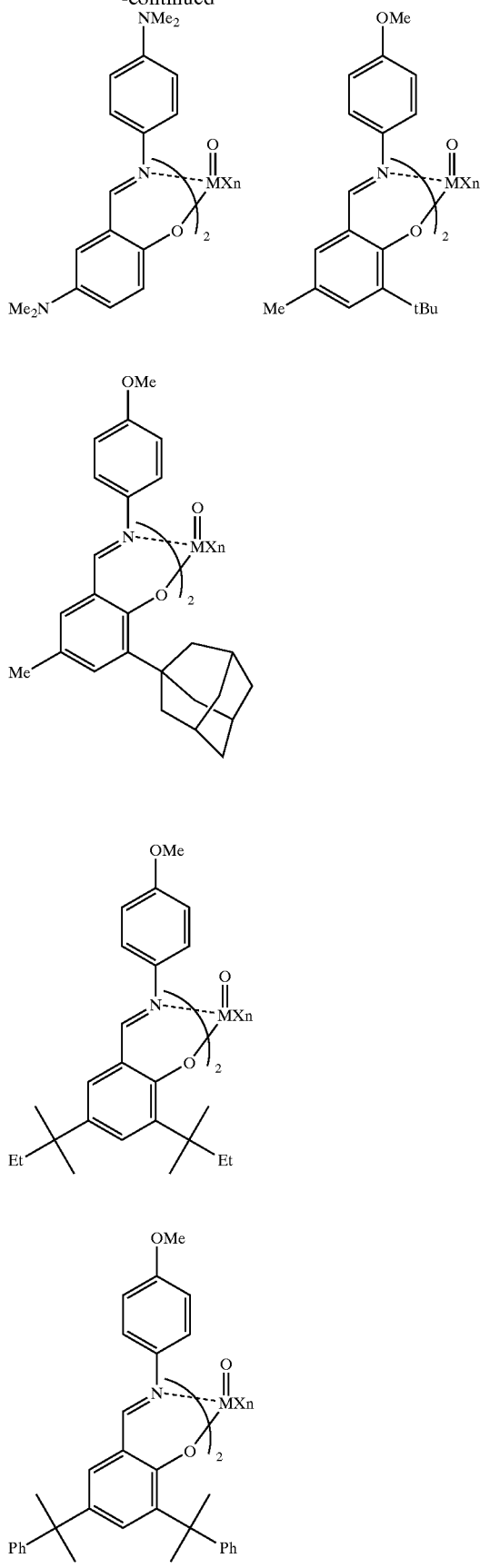

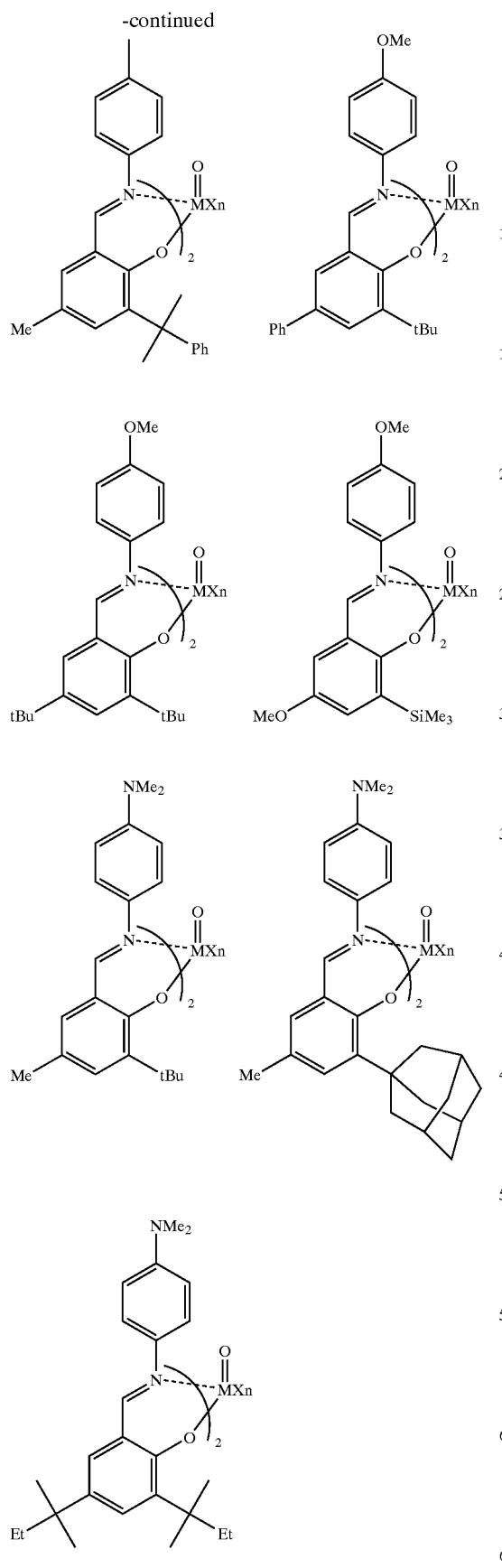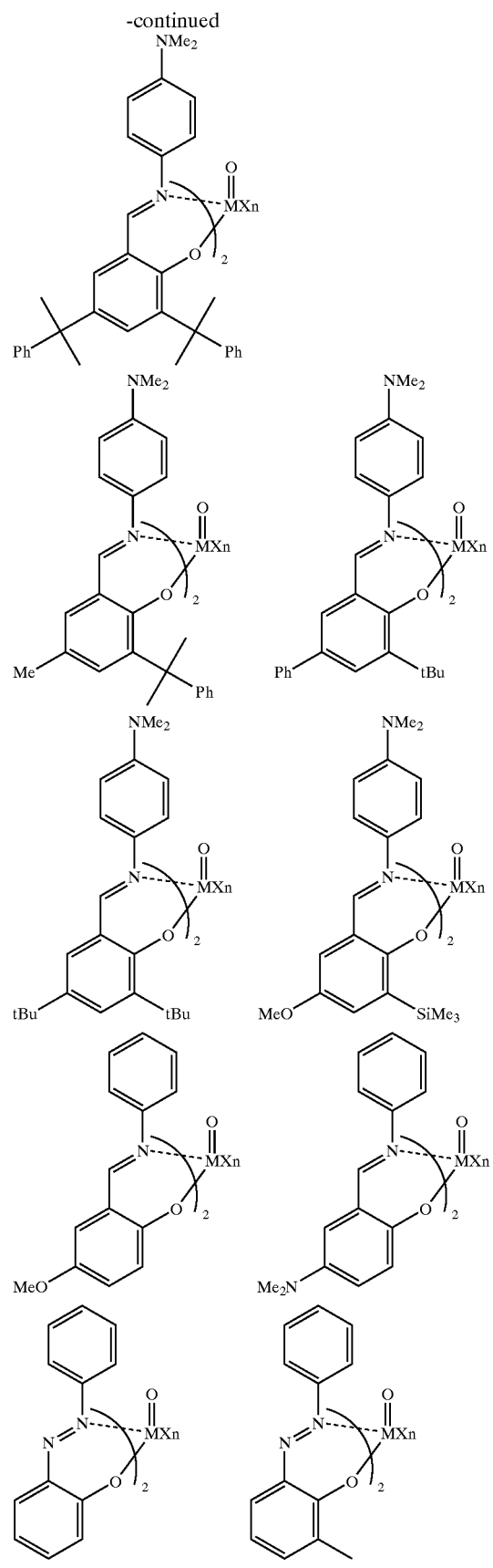

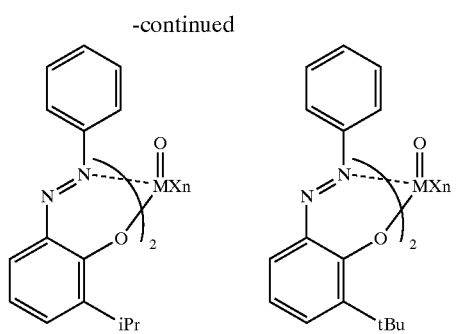
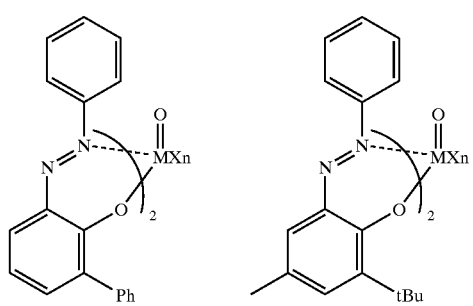
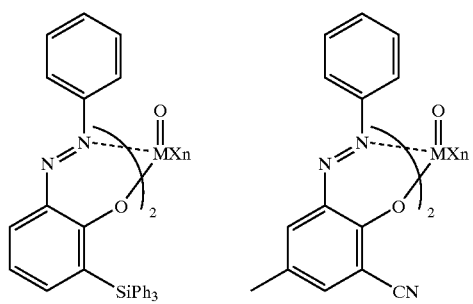
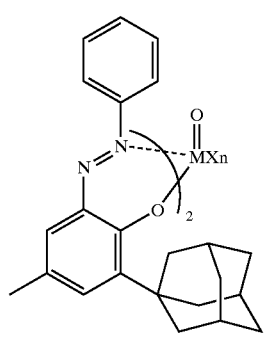
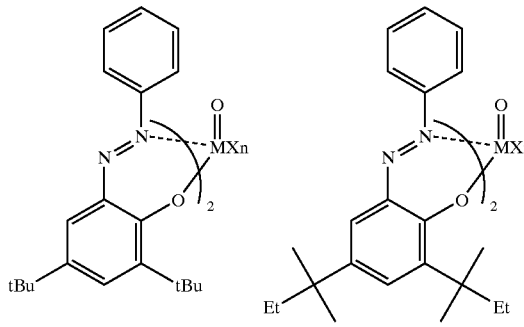
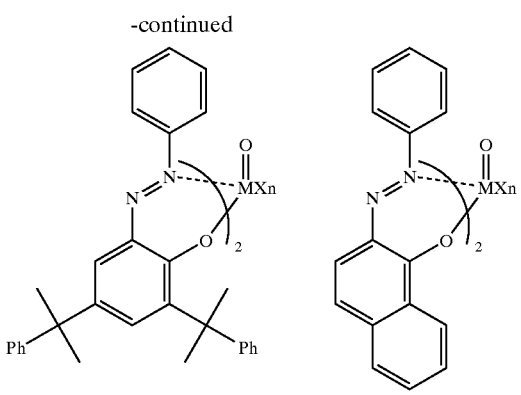
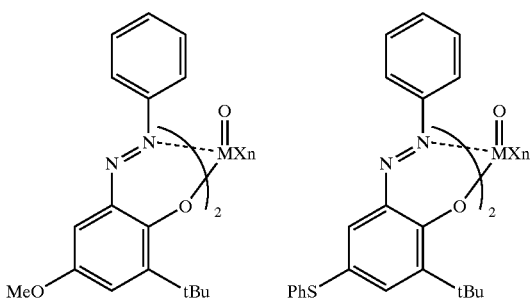
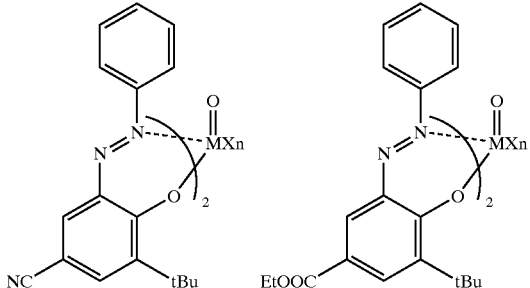
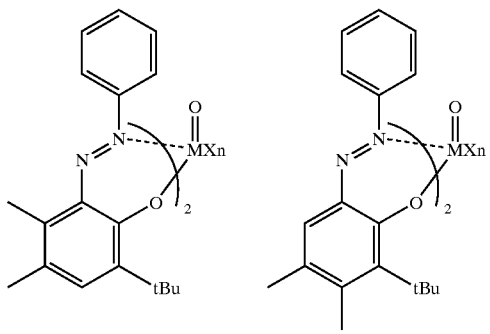
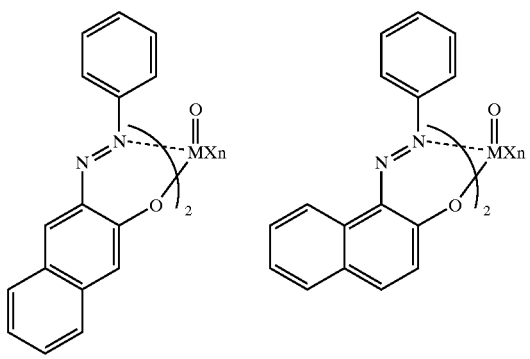

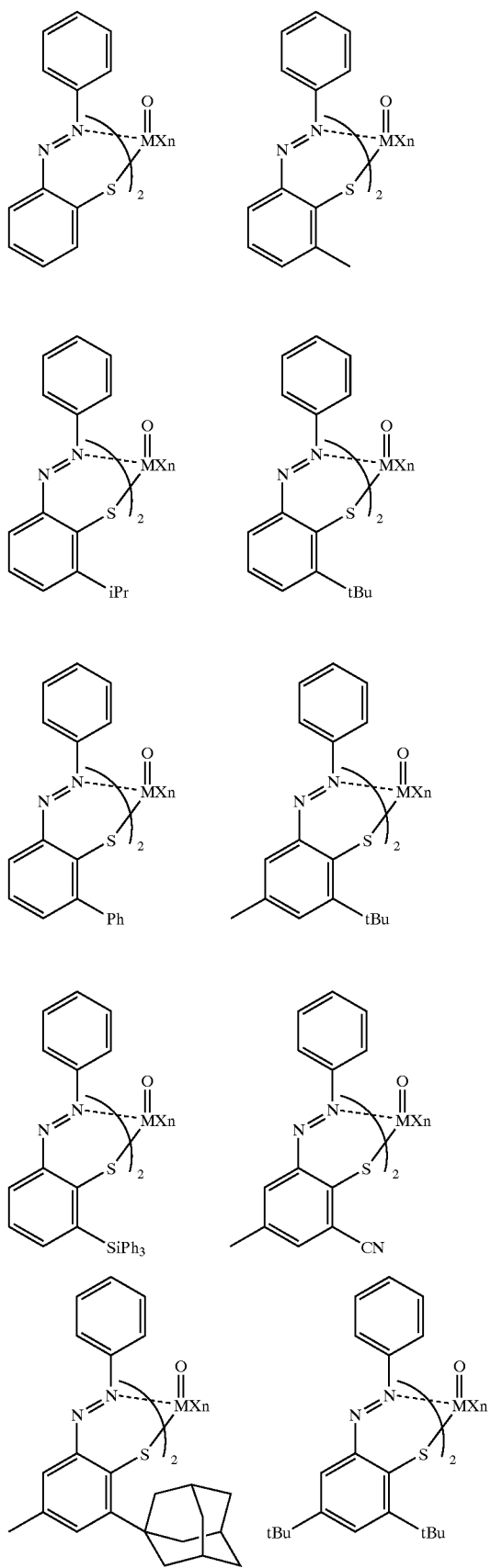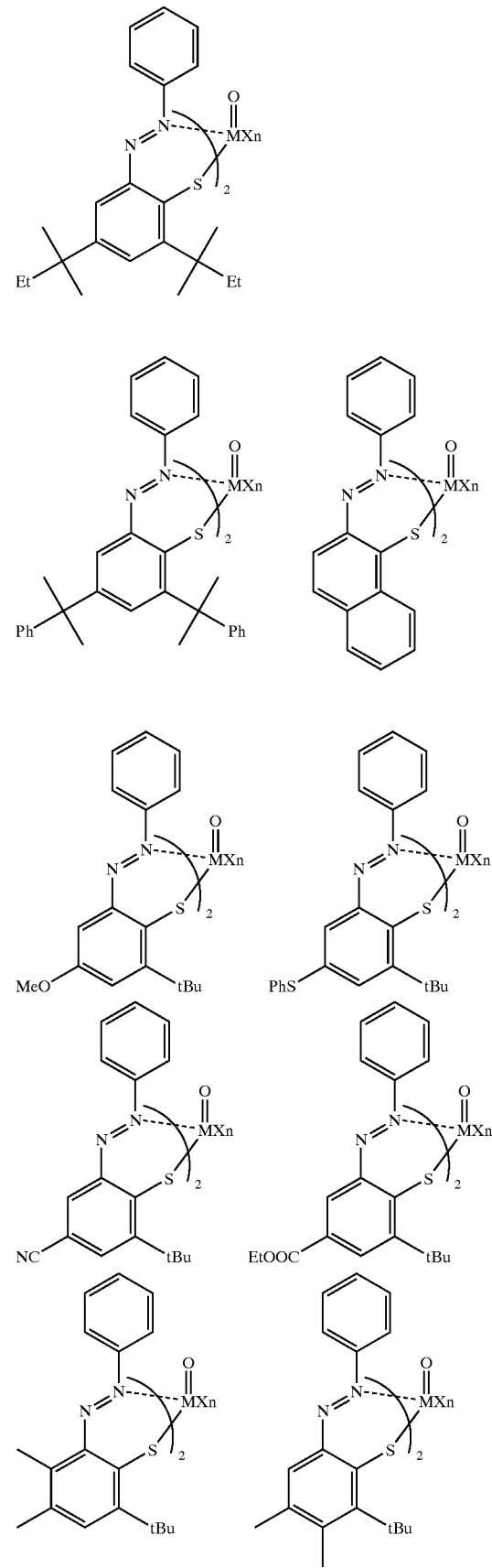

-continued
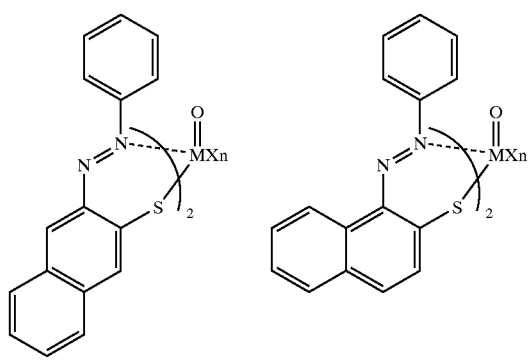
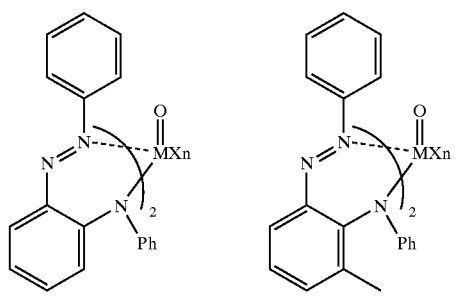
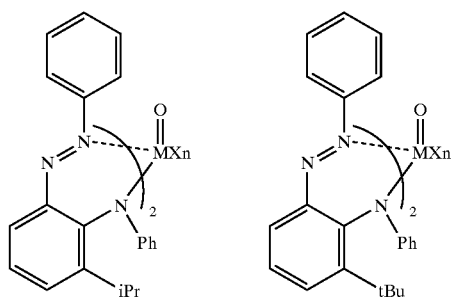
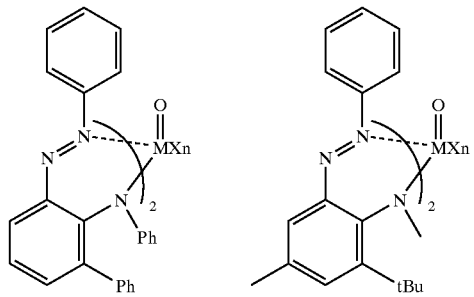
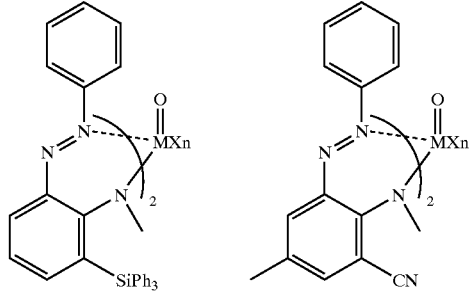
-continued
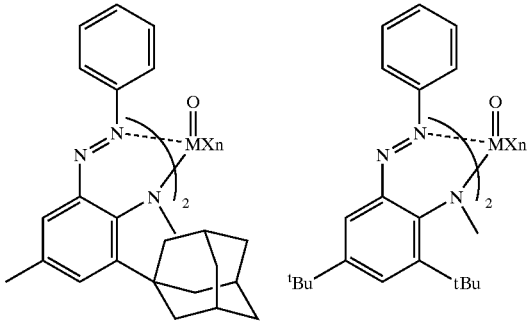
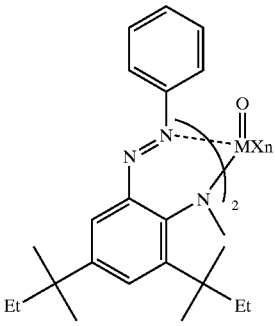
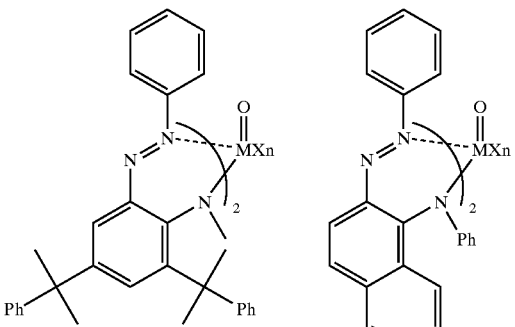
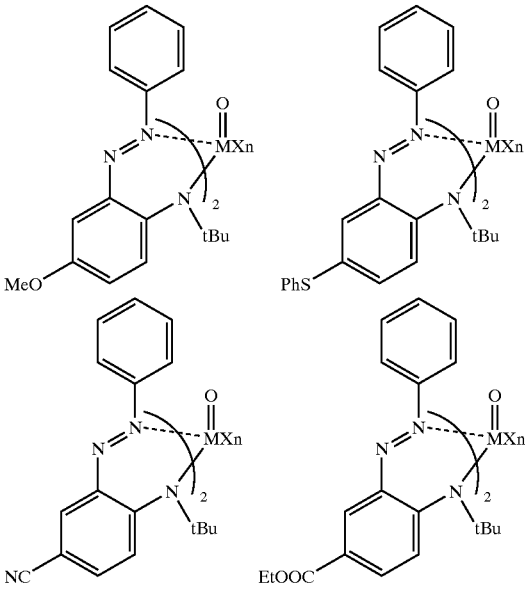

-continued
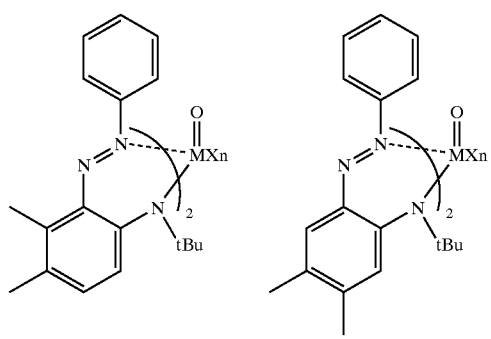
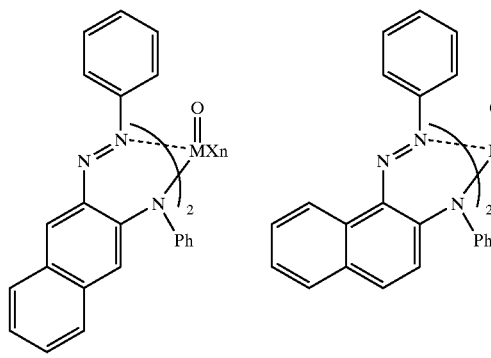
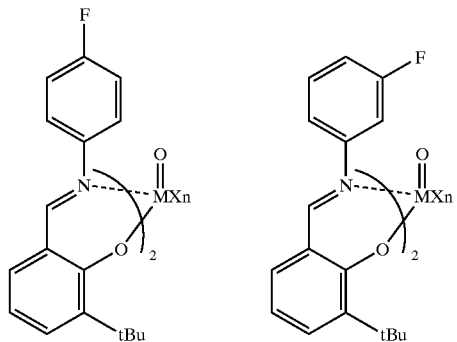
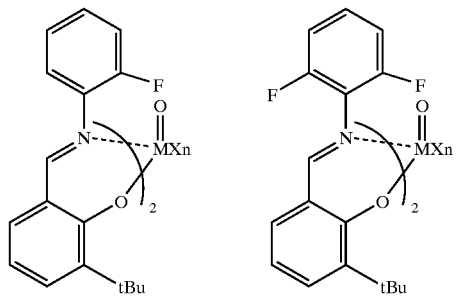
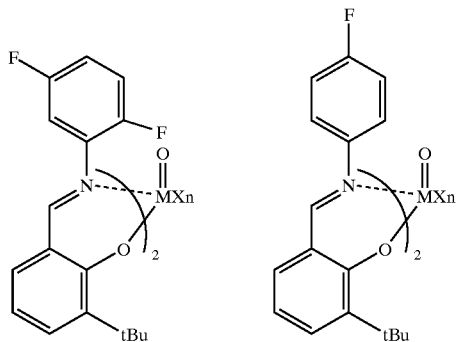
-continued
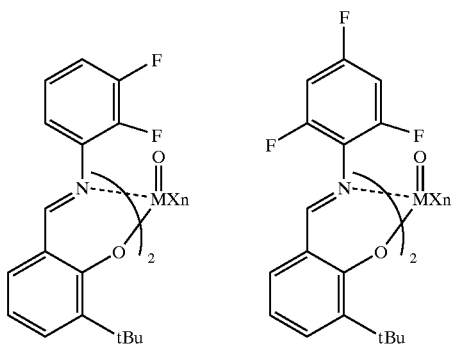
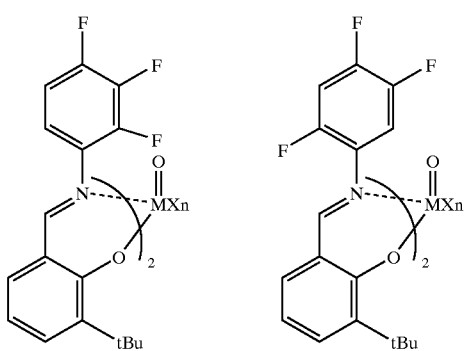
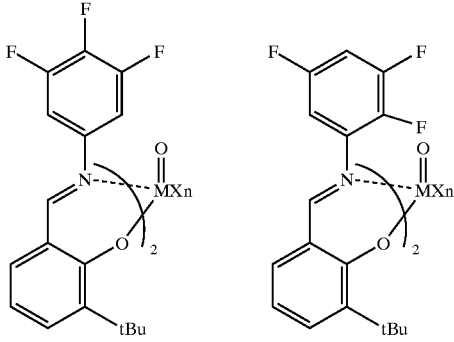
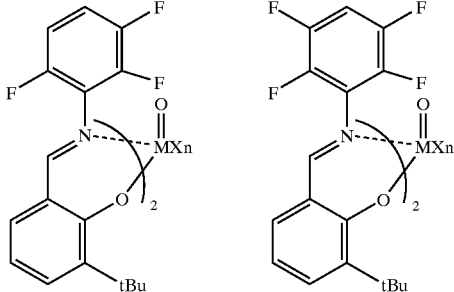
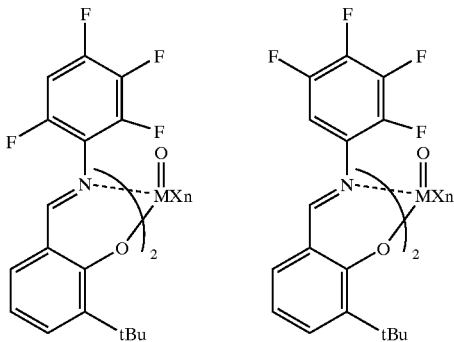

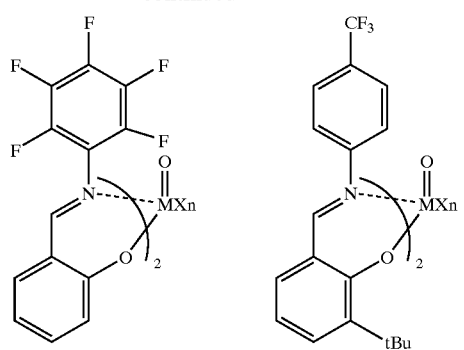
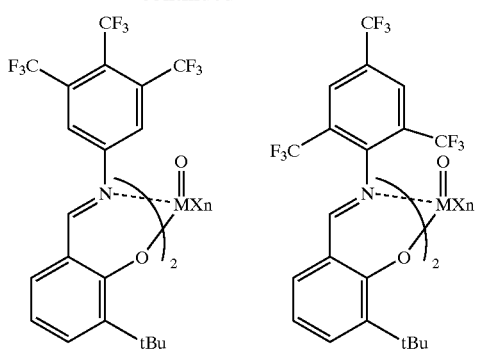
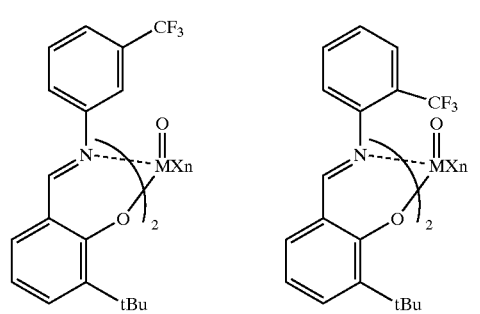
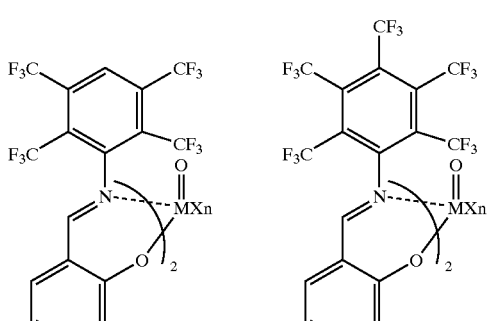
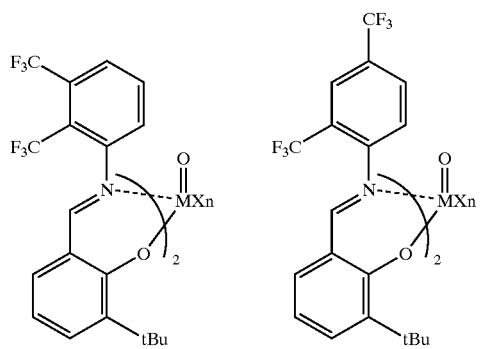
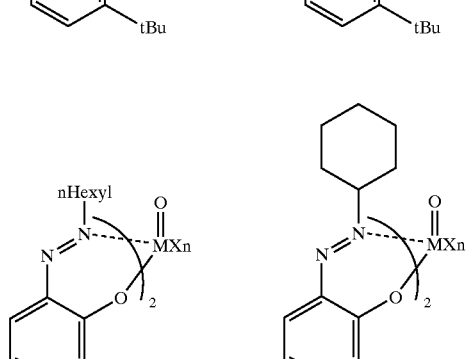
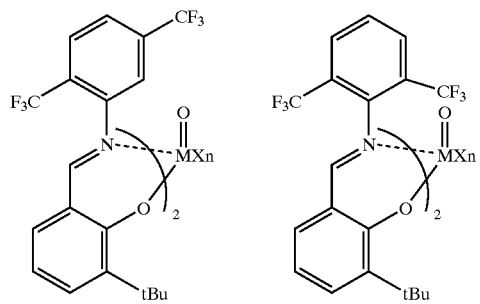
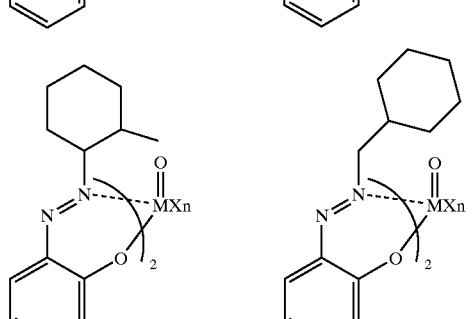
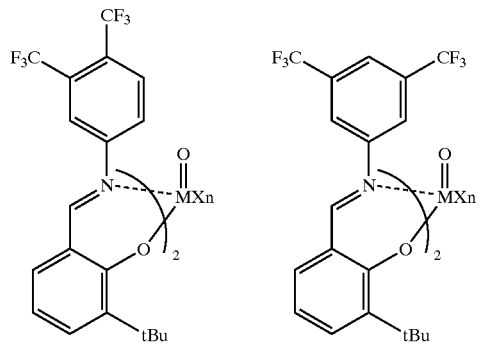
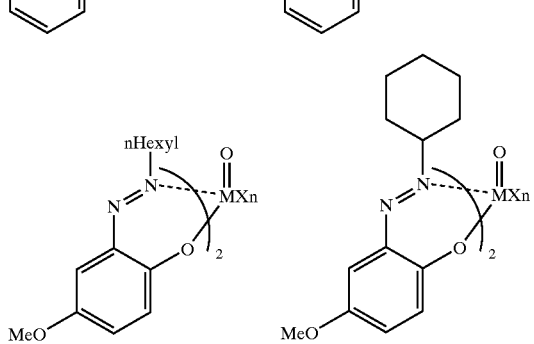

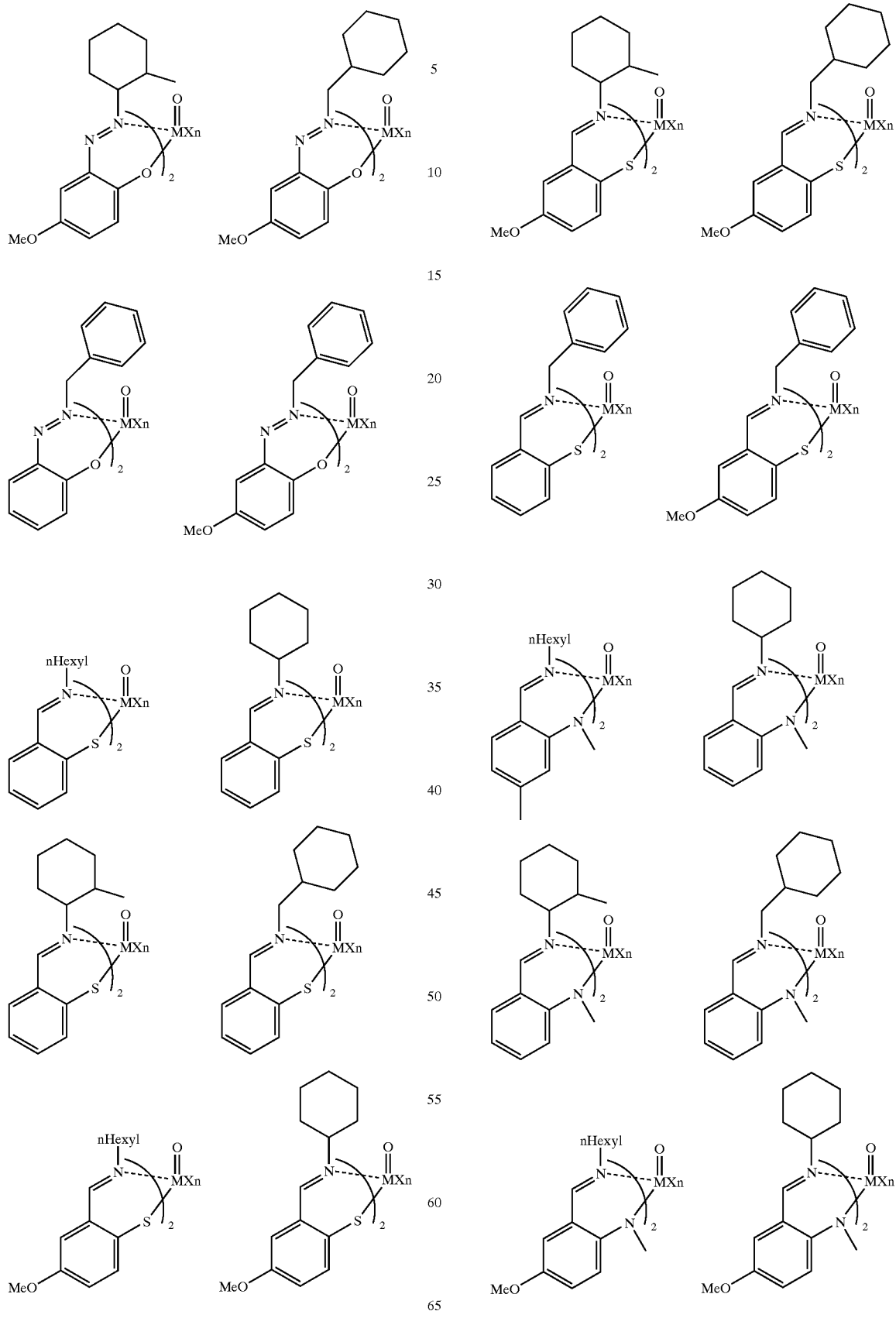

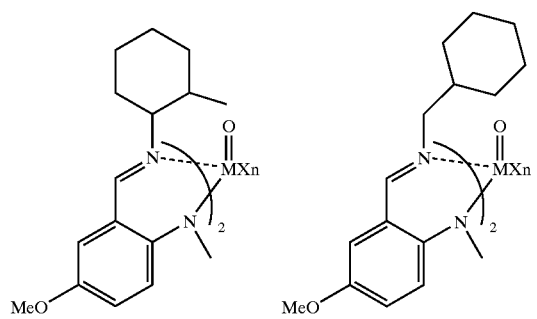
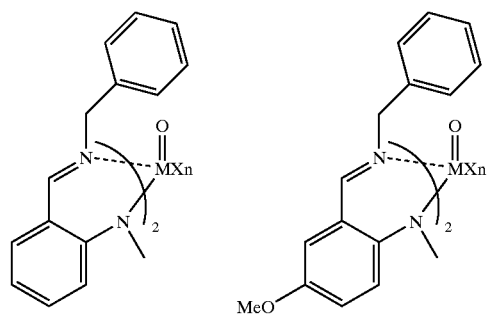
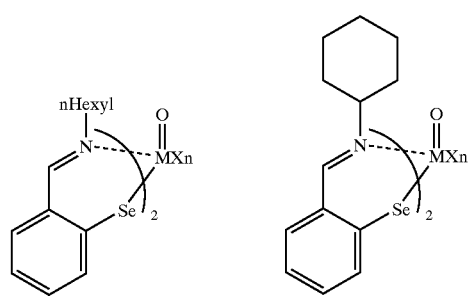
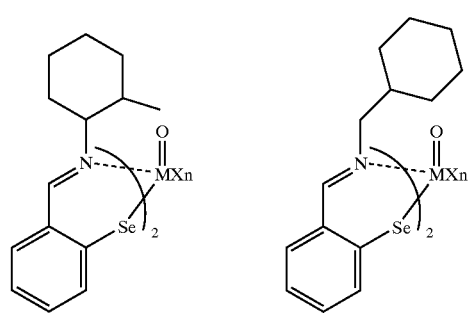
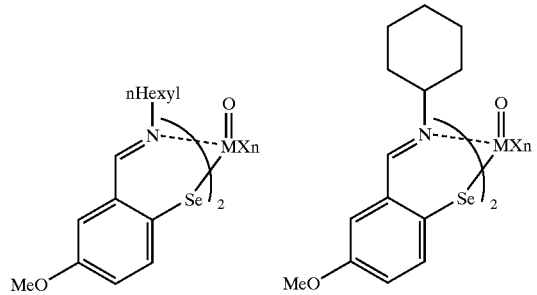
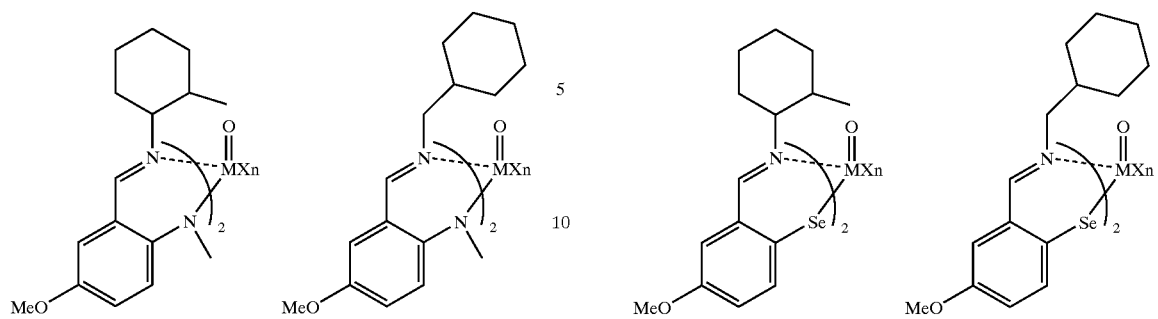
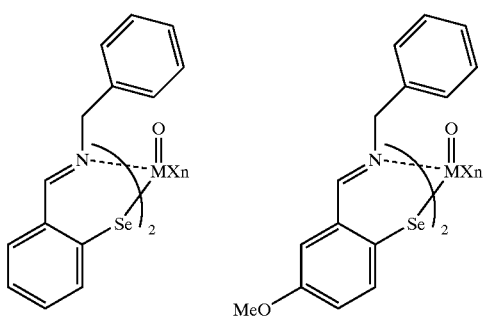
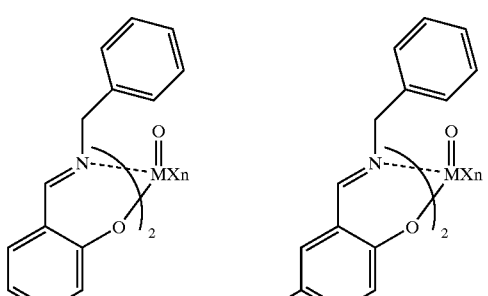
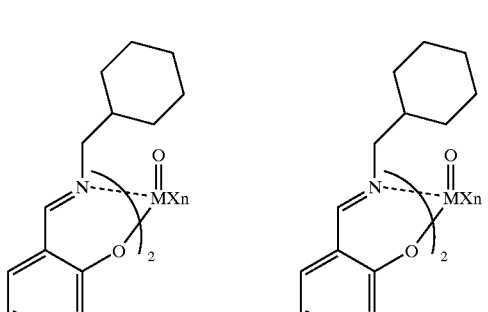
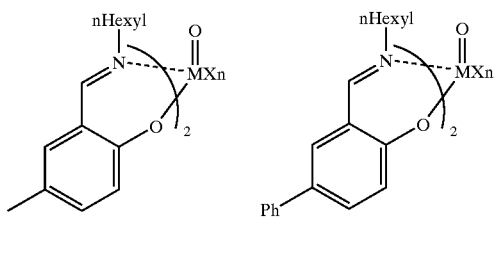

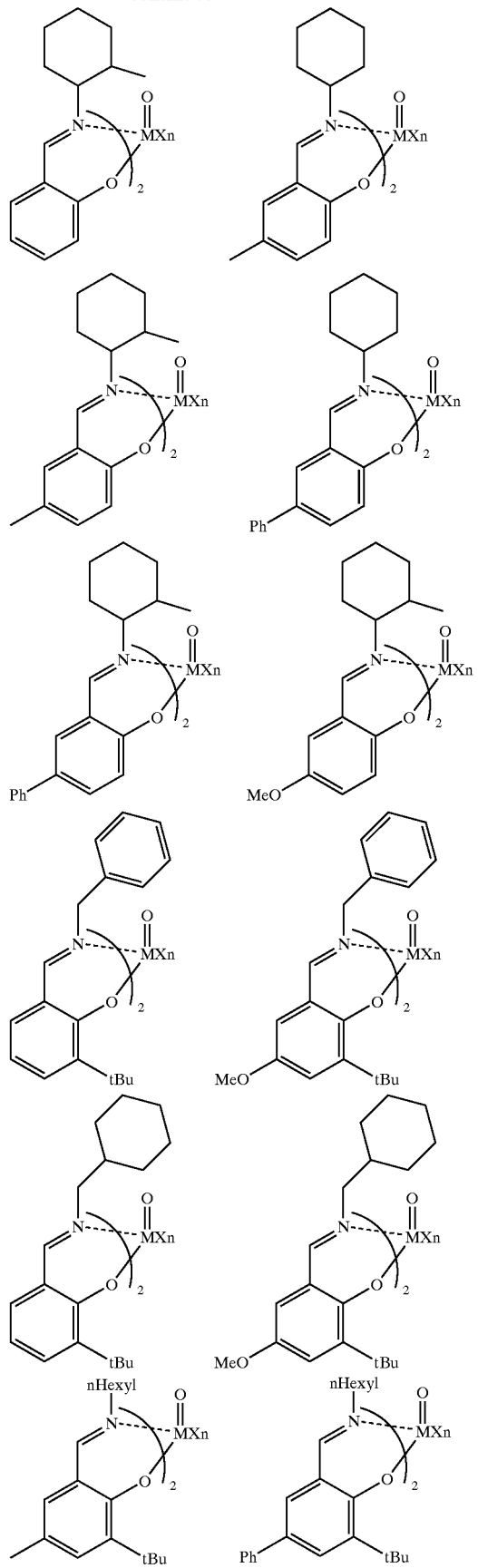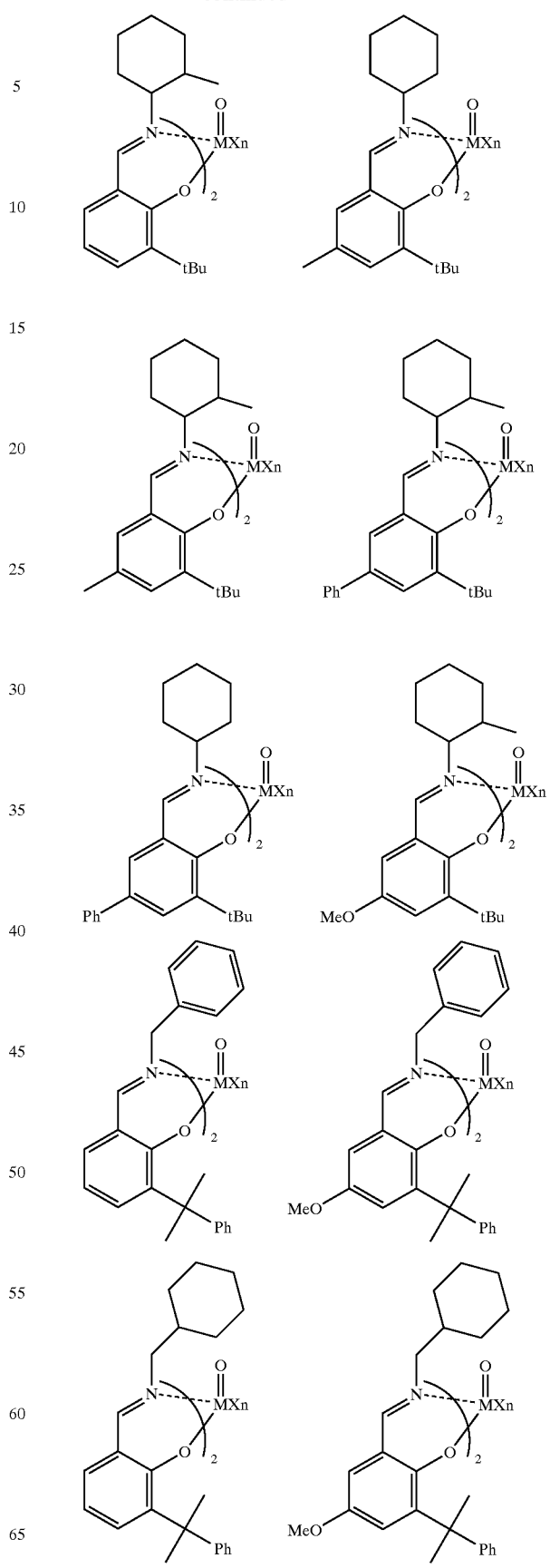

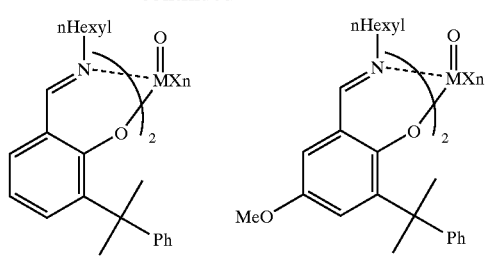
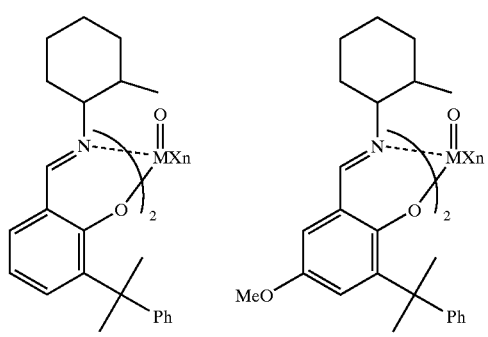
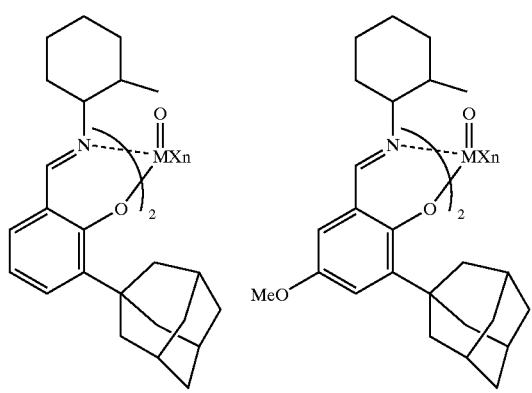
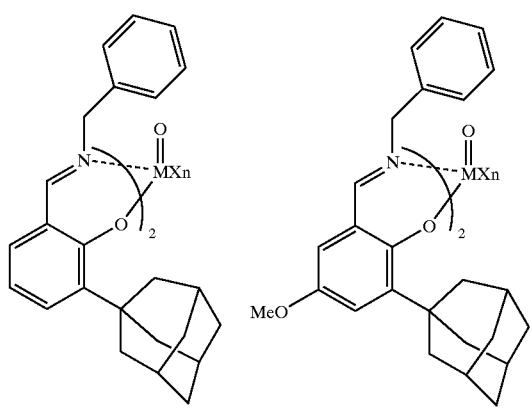
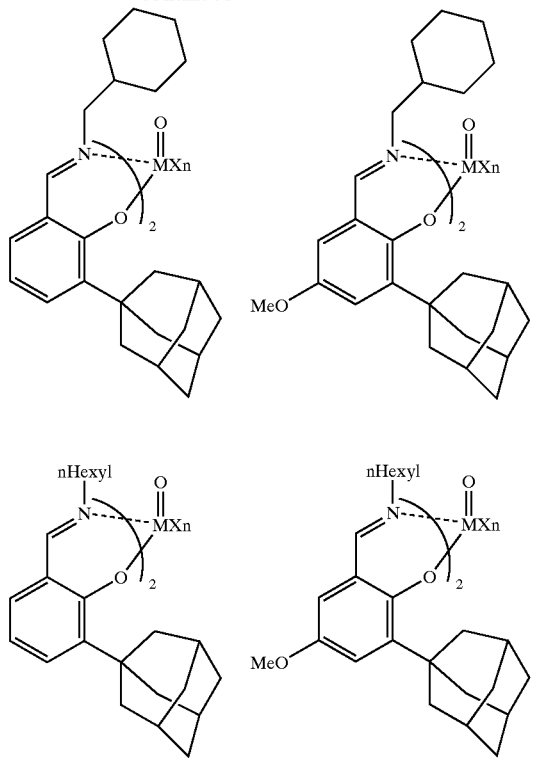
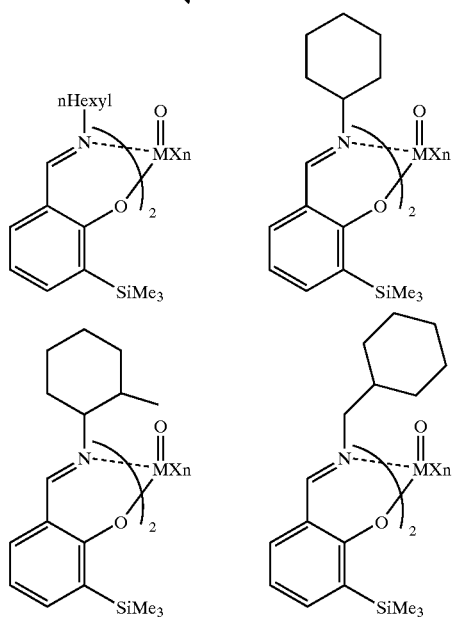
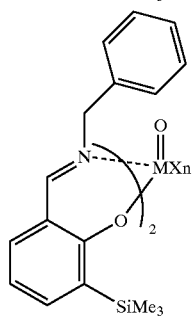

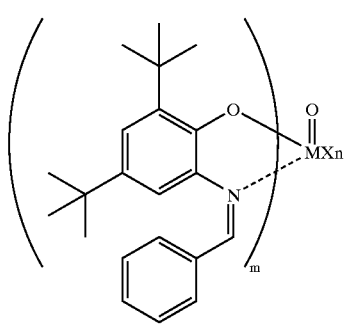
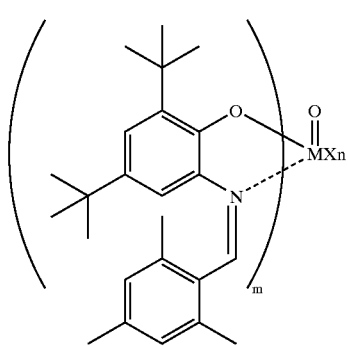
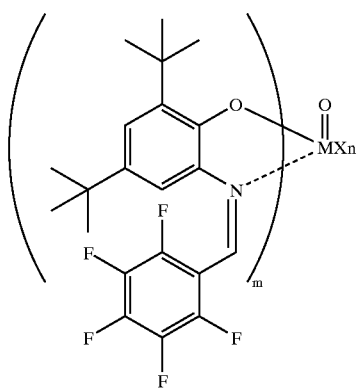
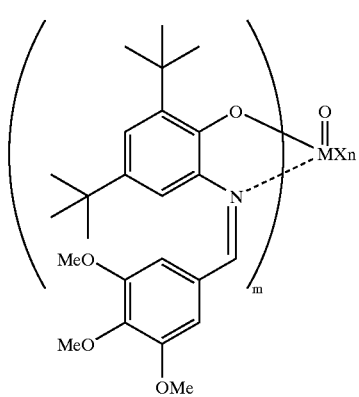
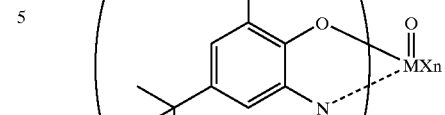
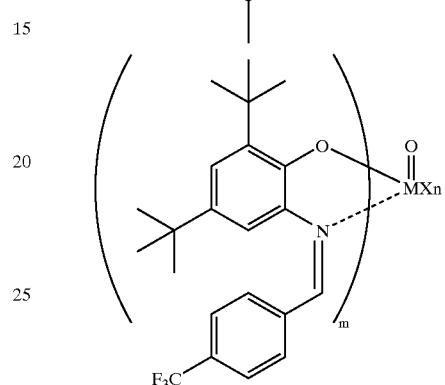
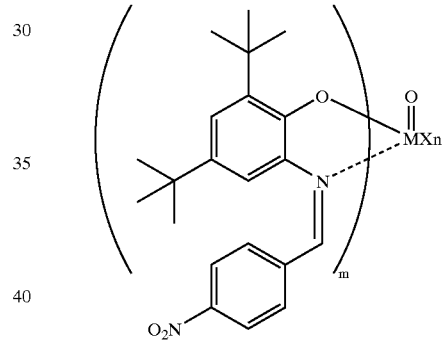
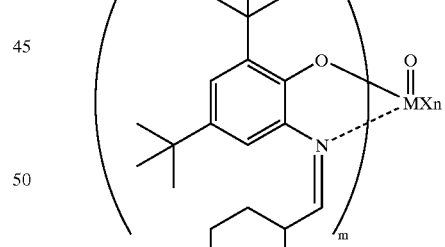
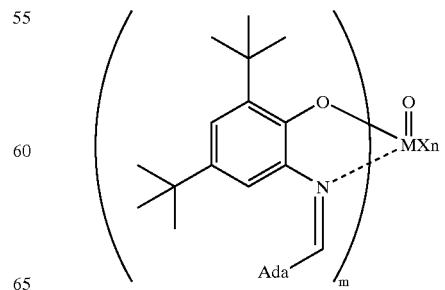

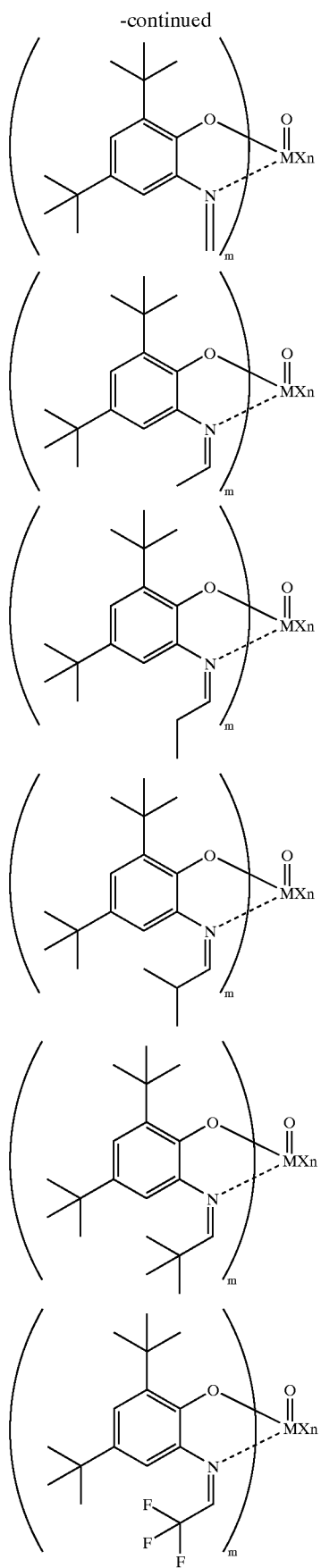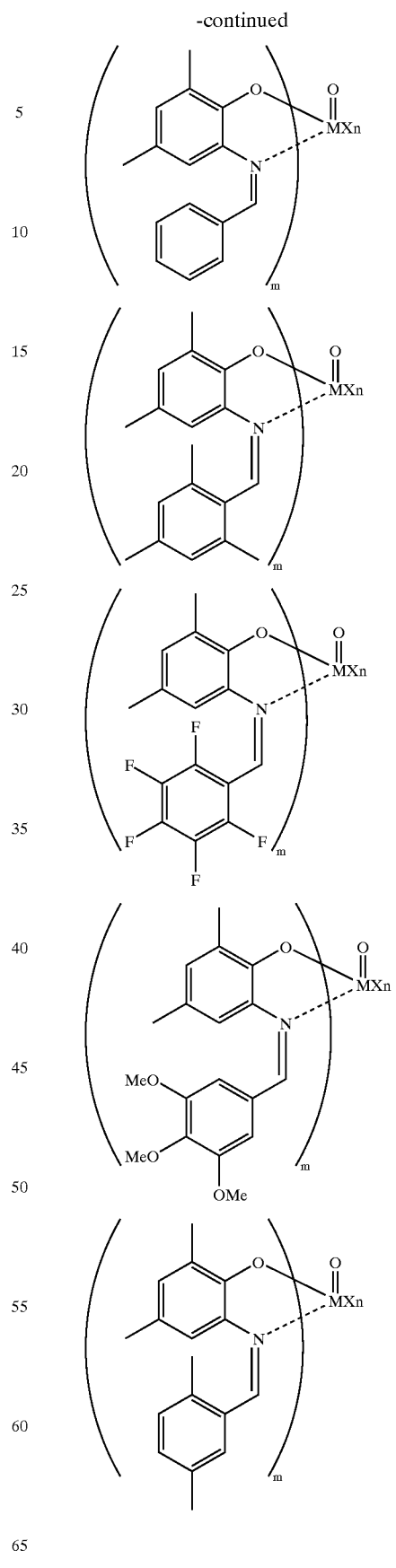

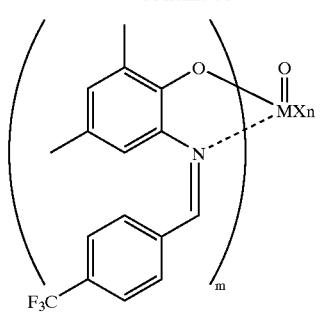
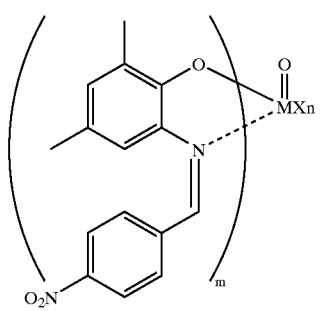
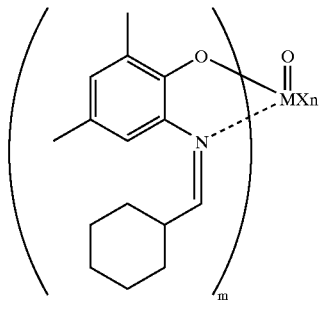
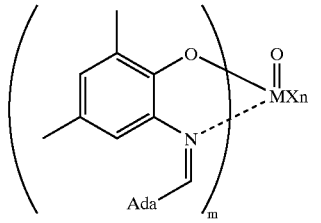
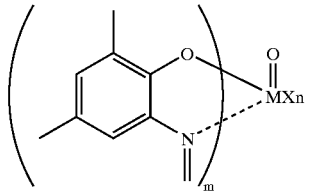
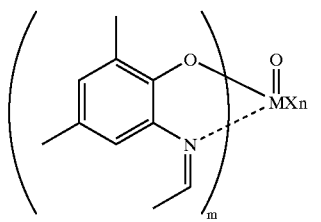
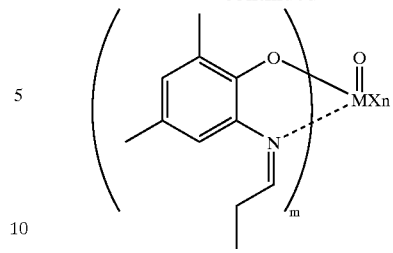
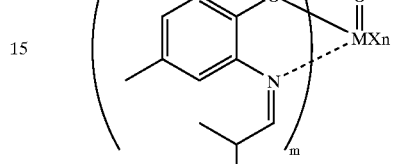
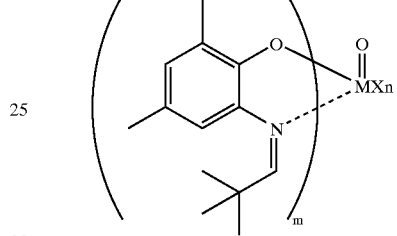
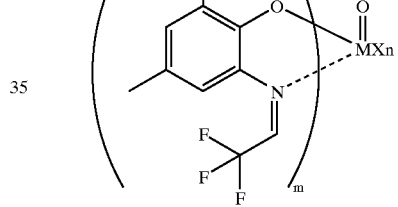
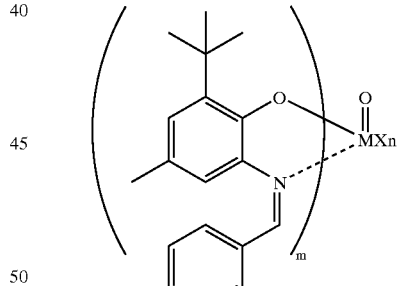
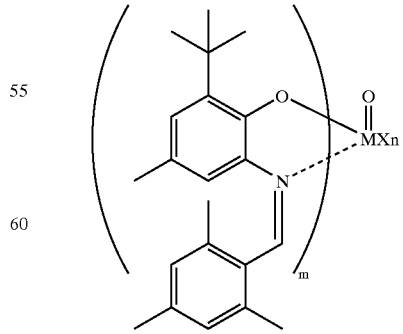

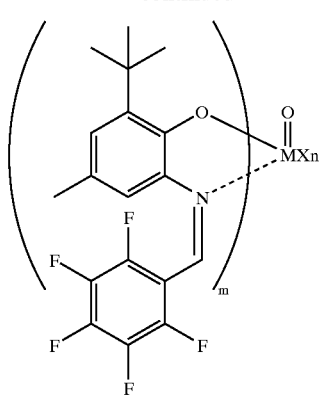
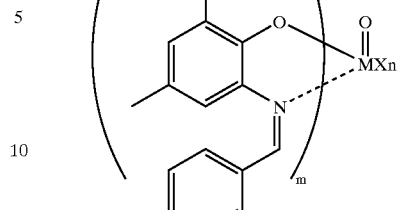
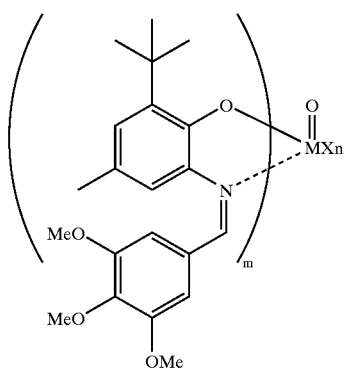
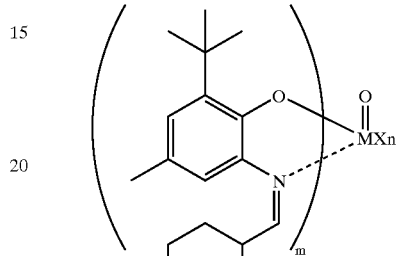
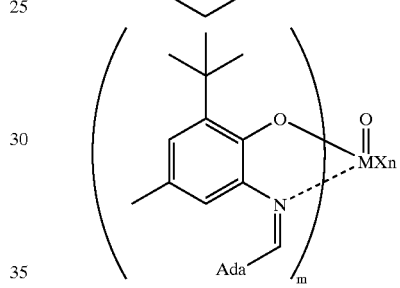
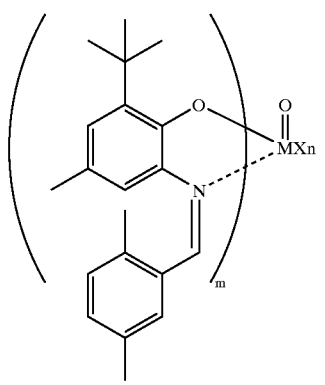
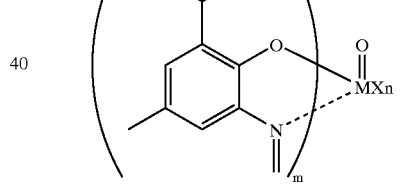
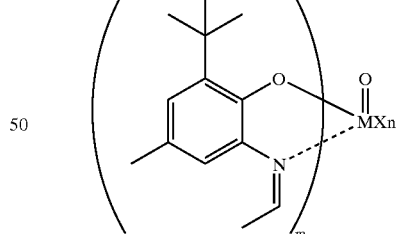
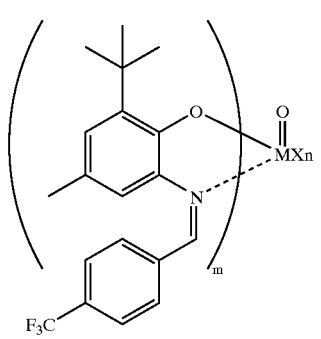
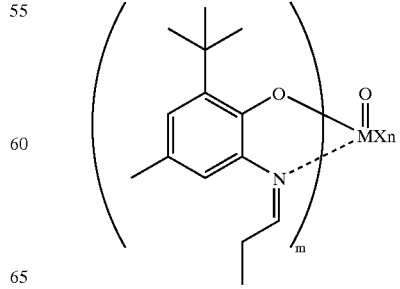

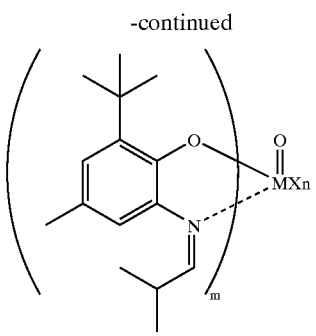
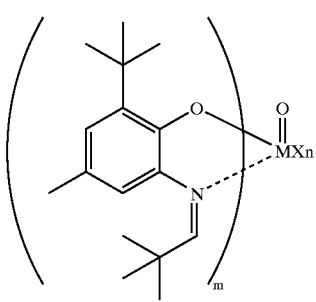
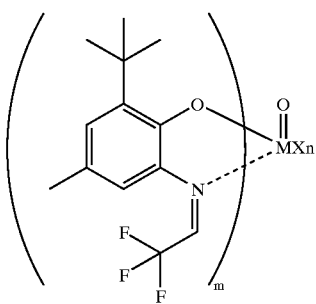
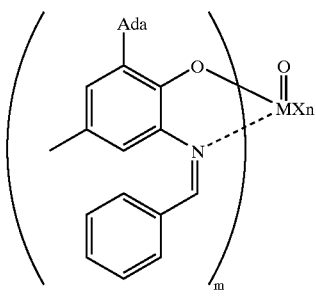
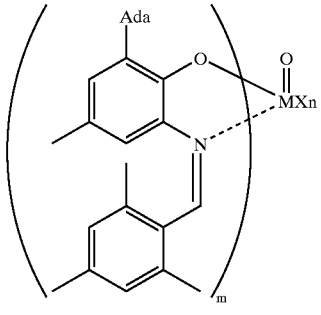
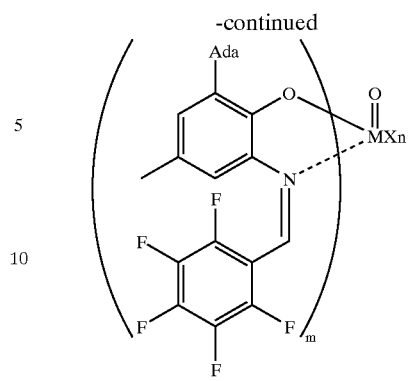
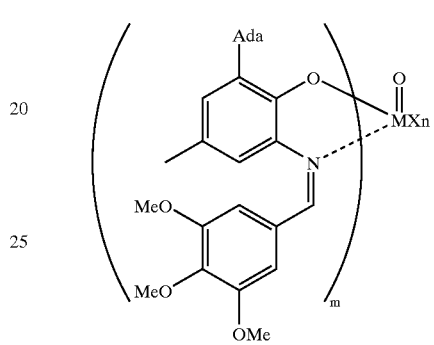
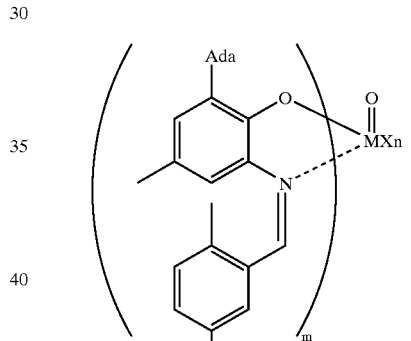
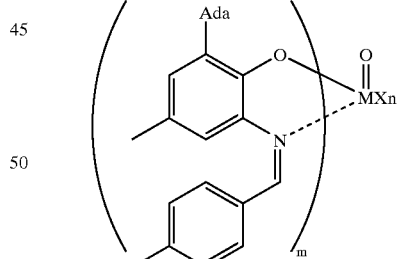
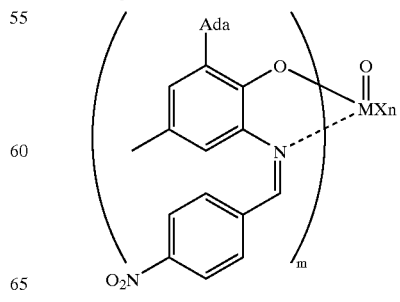

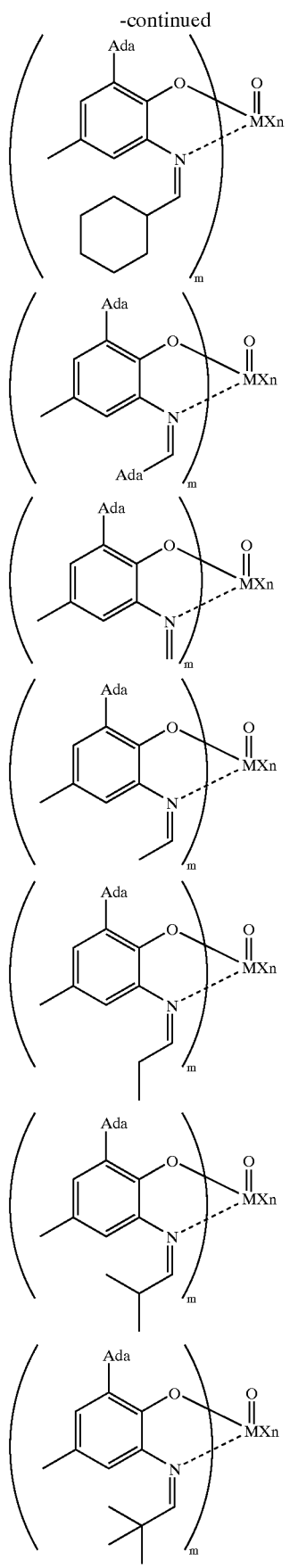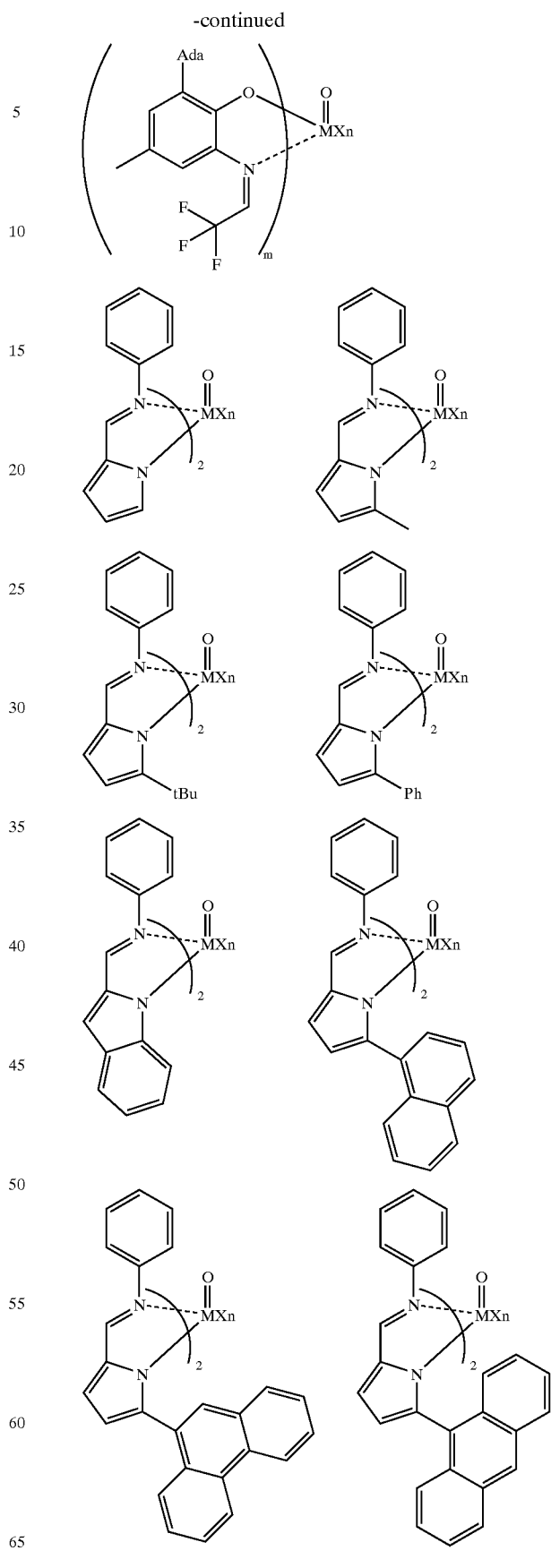

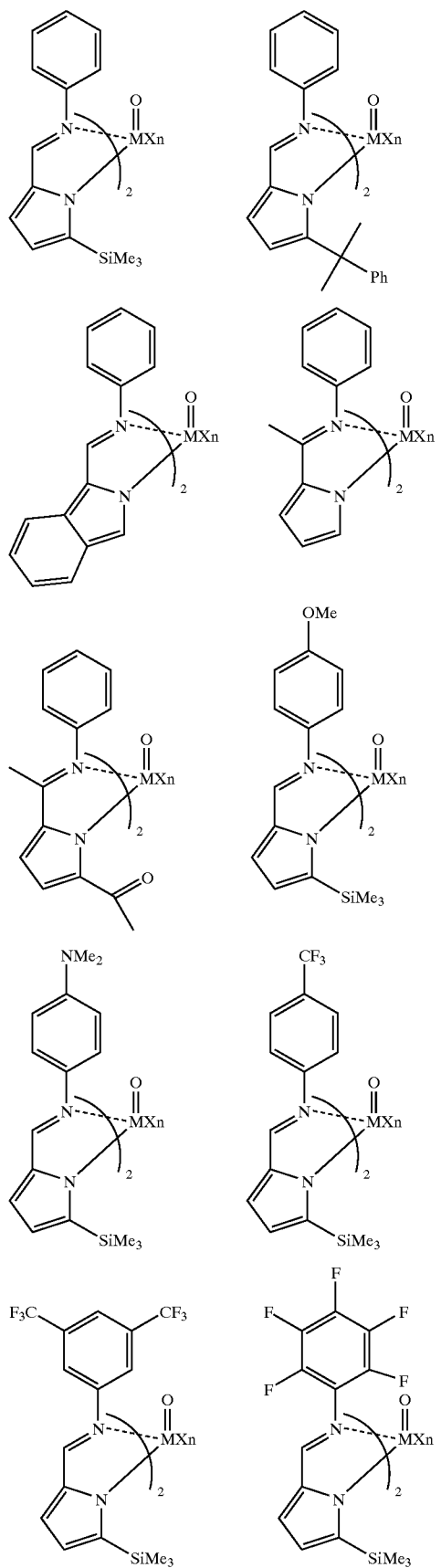
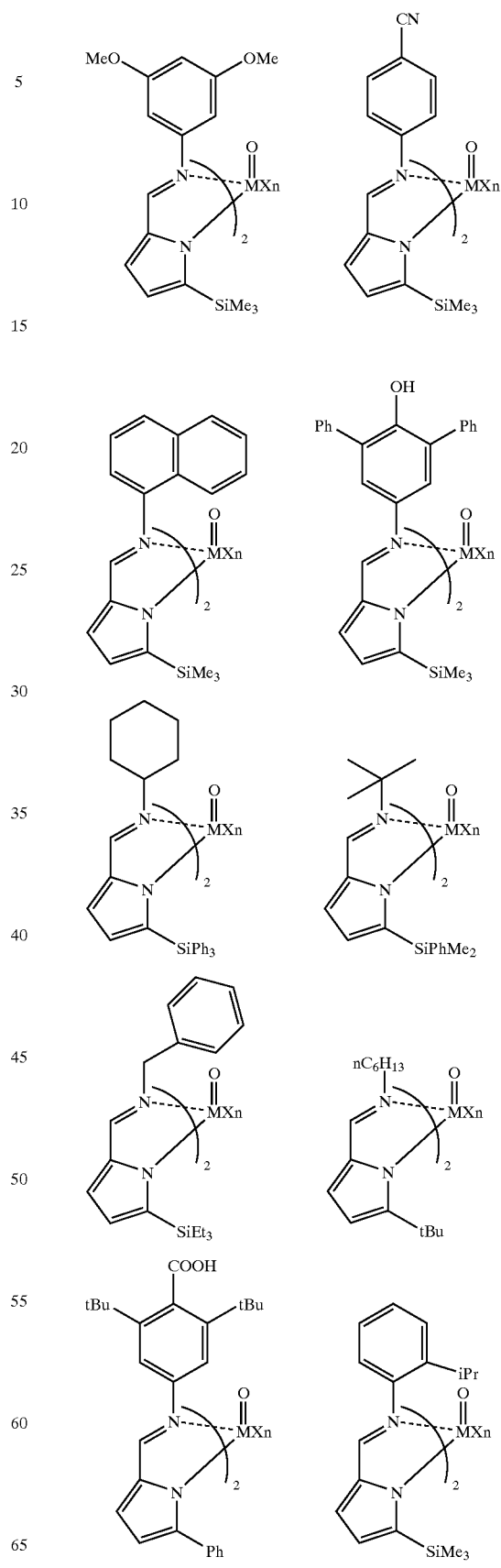

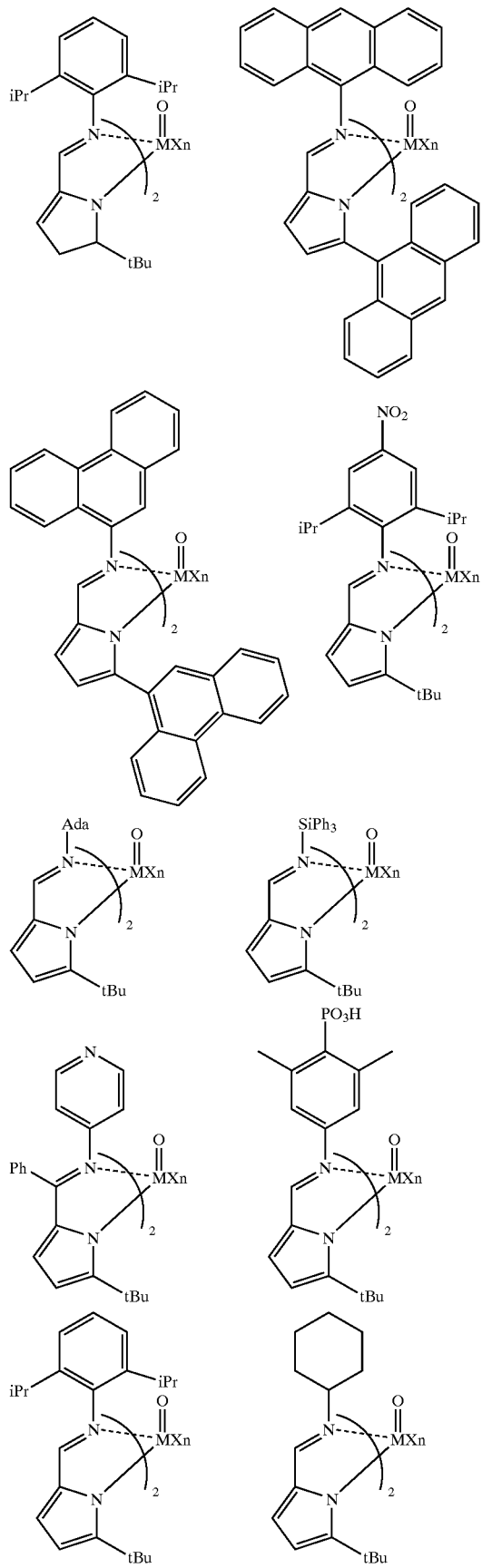
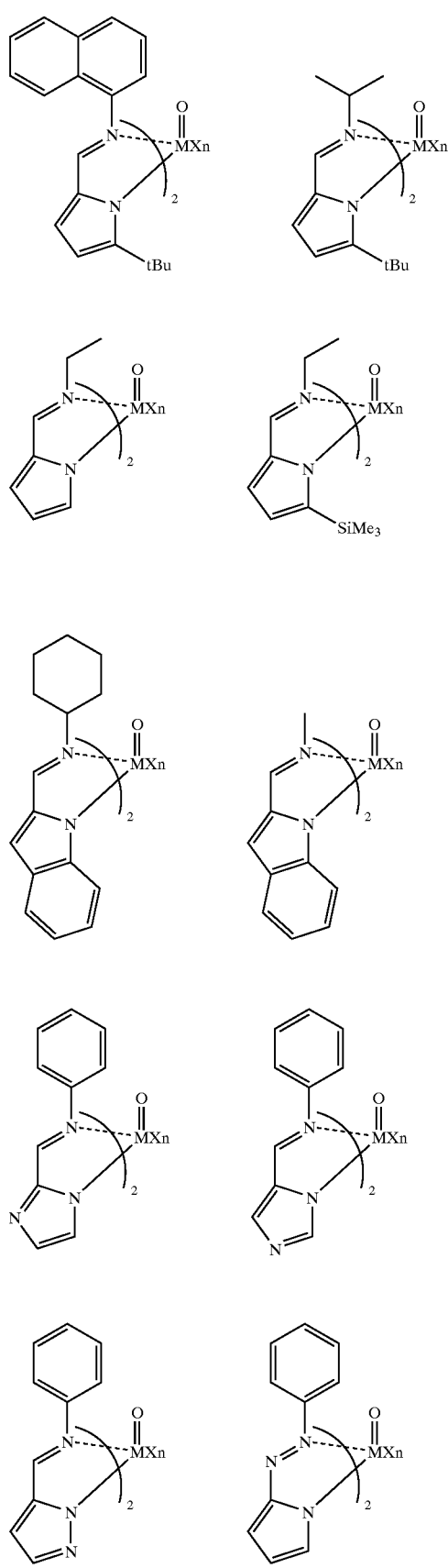

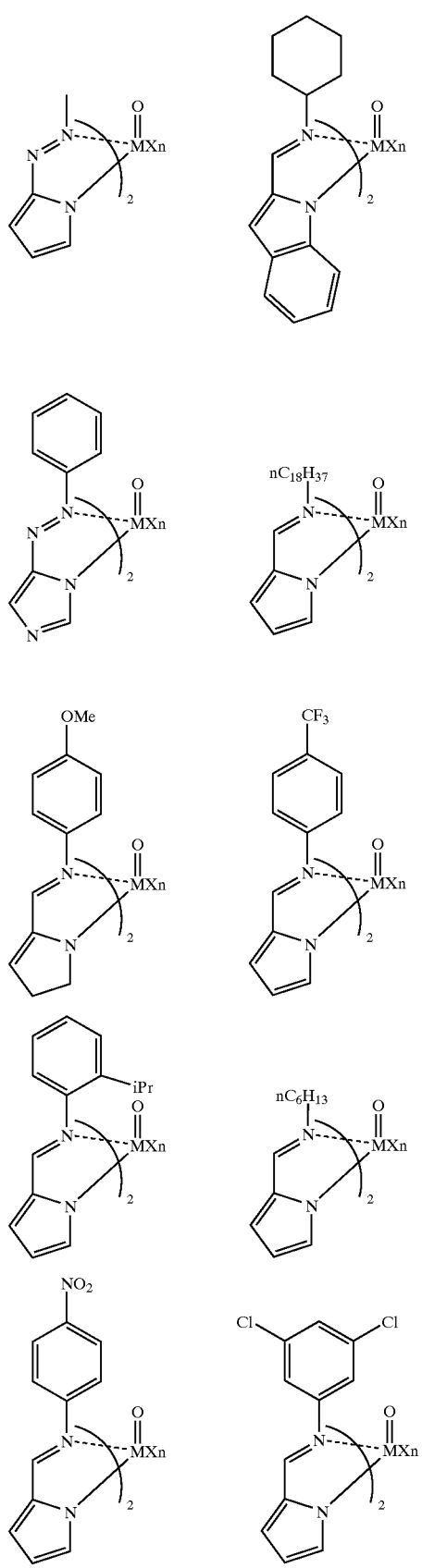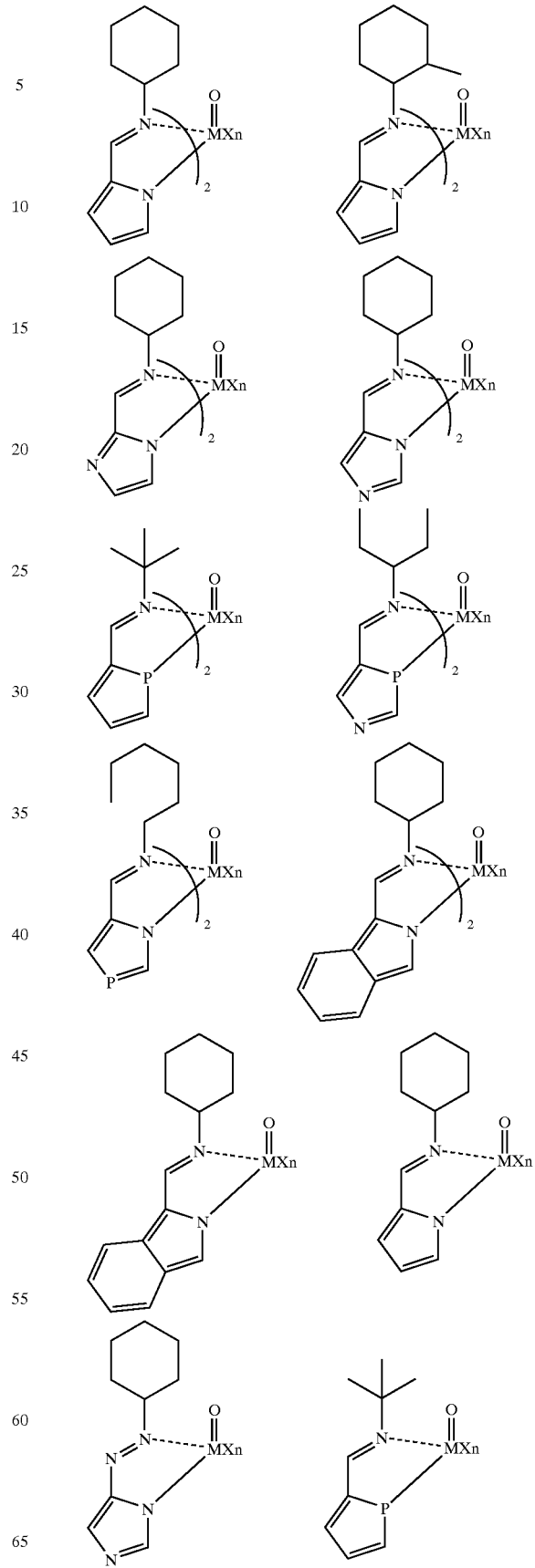

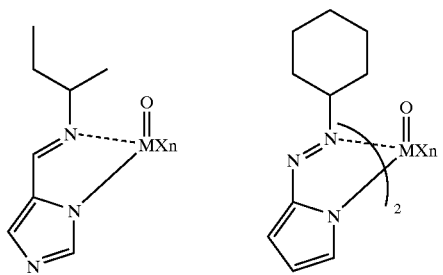
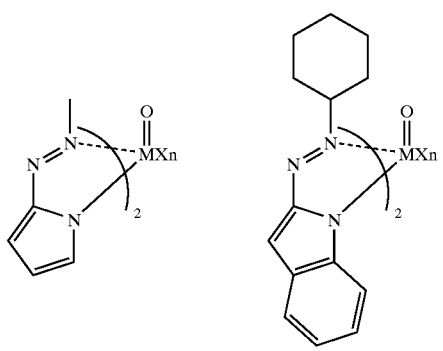
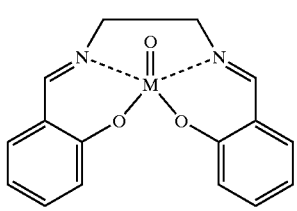
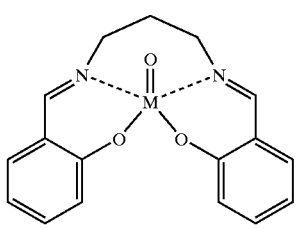
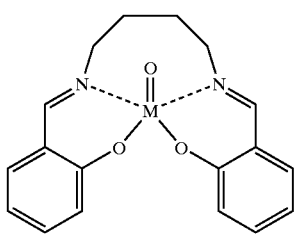
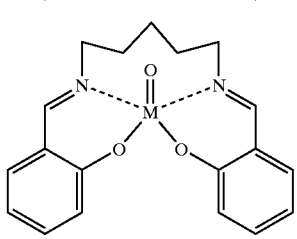
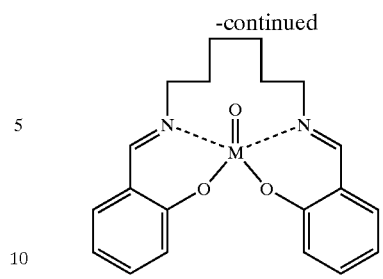
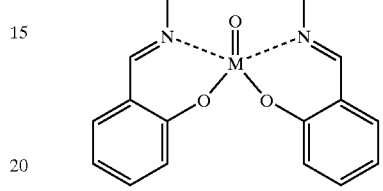
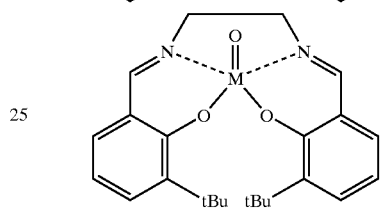
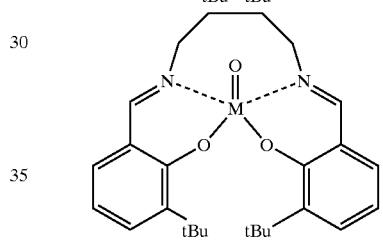
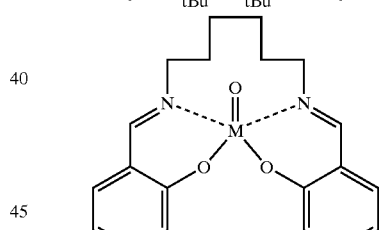
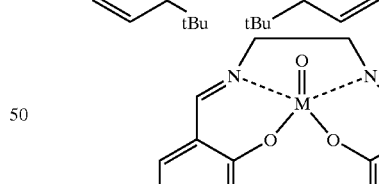
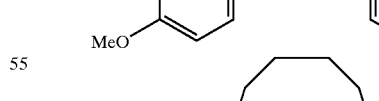
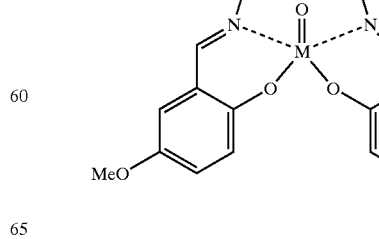

147
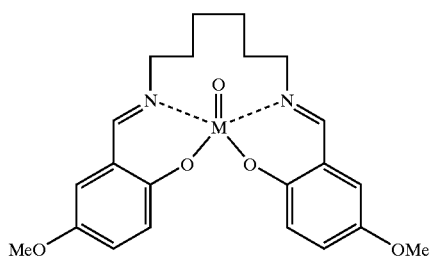
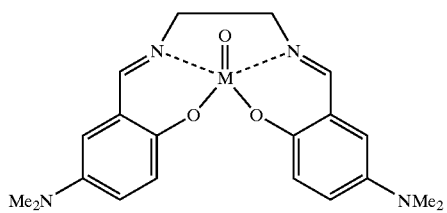
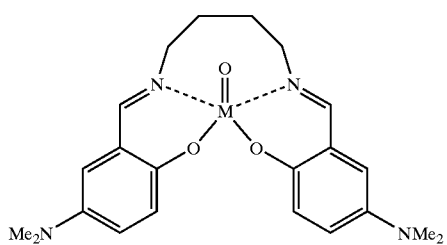
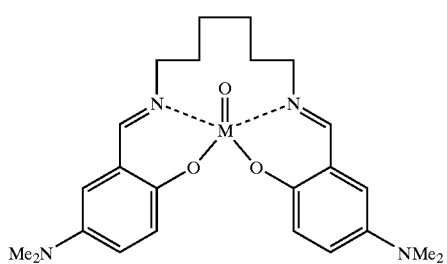
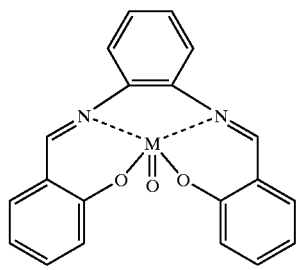
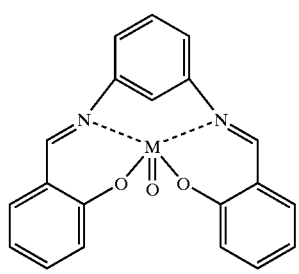
148
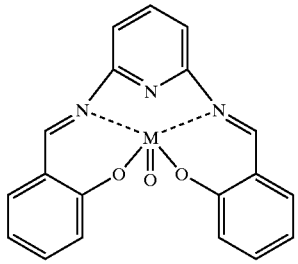
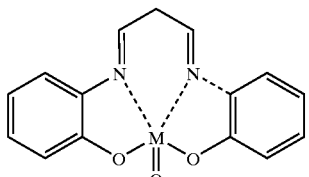
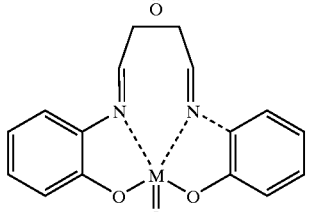
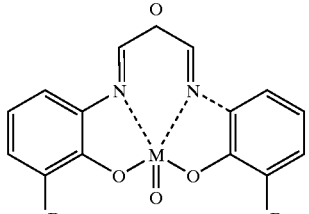
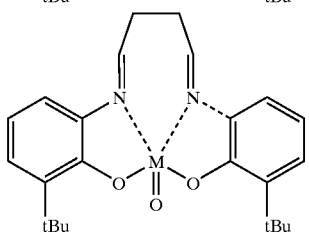
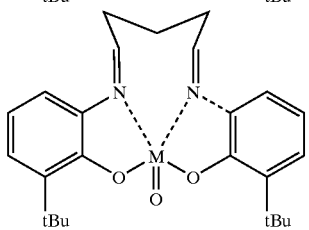

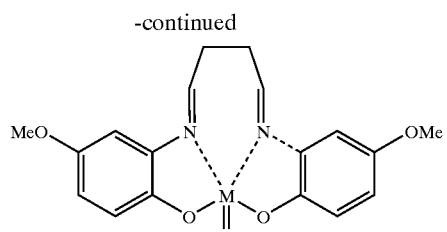
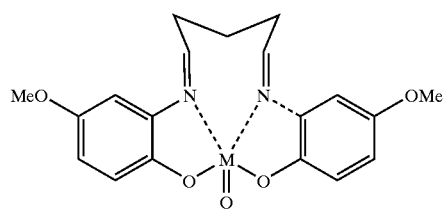
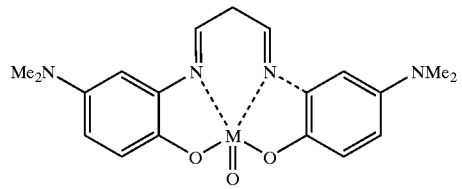
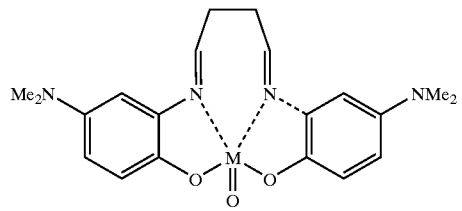
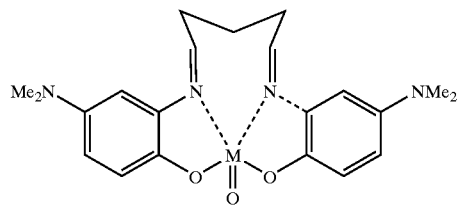
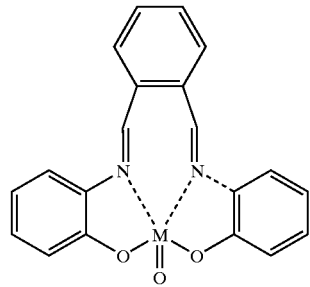
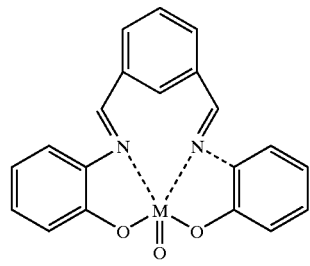
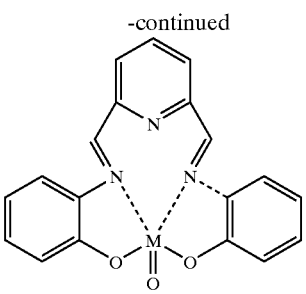
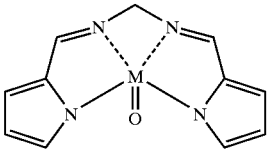
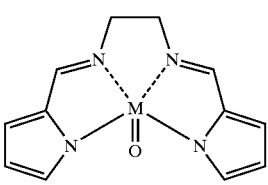
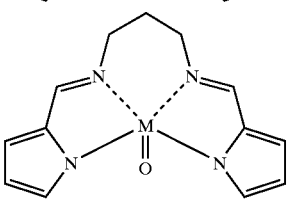
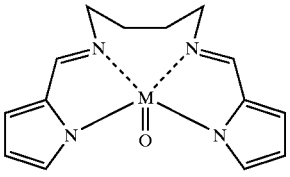
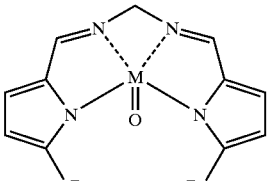
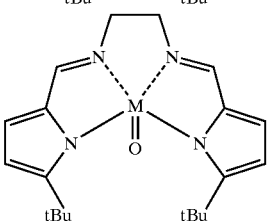
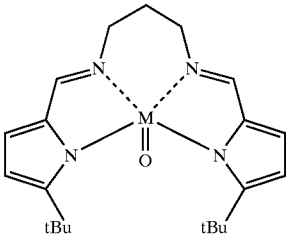

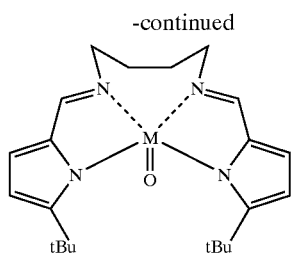
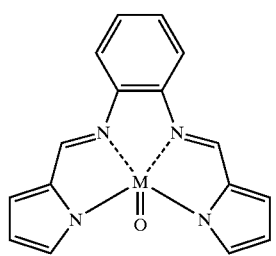
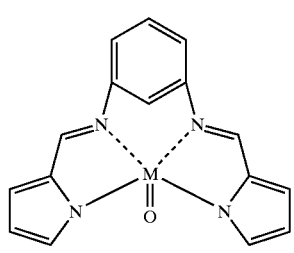
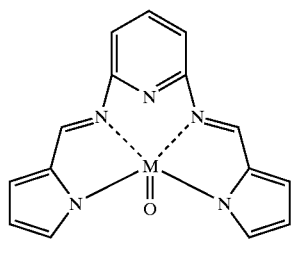
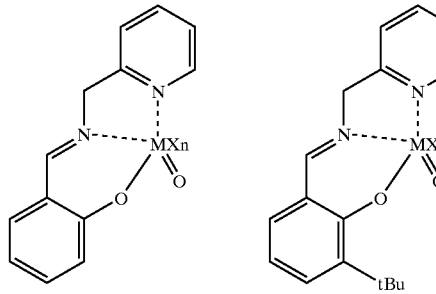
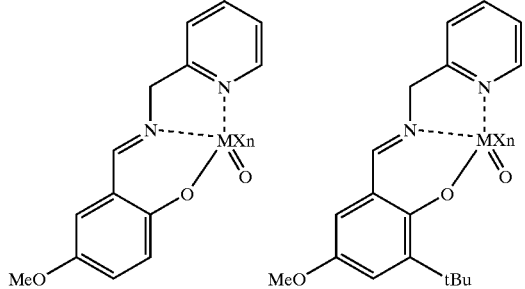
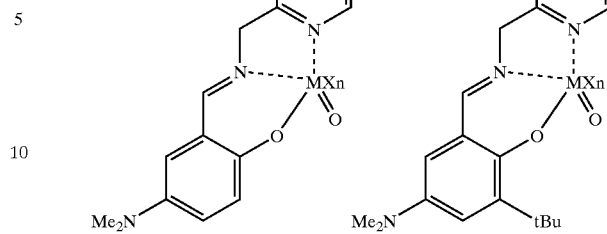
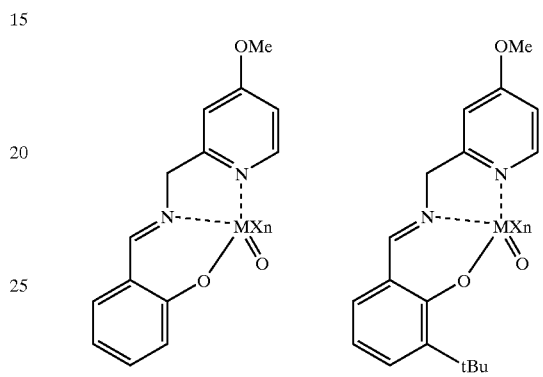
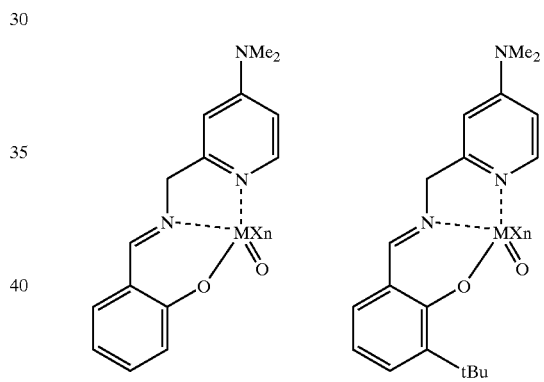
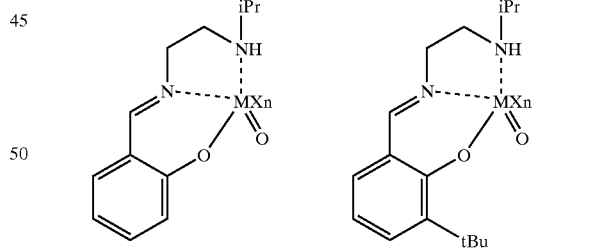
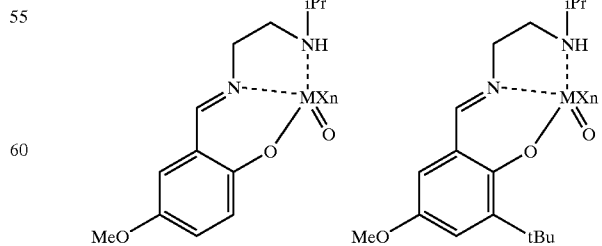

-continued
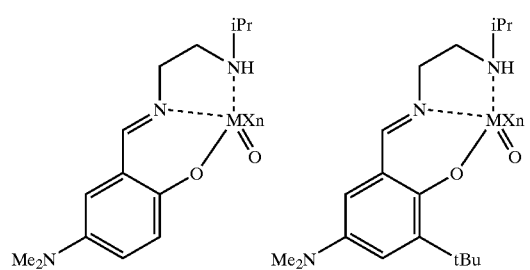
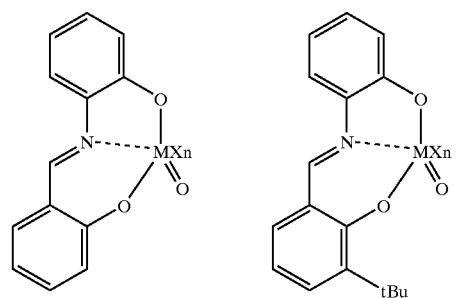
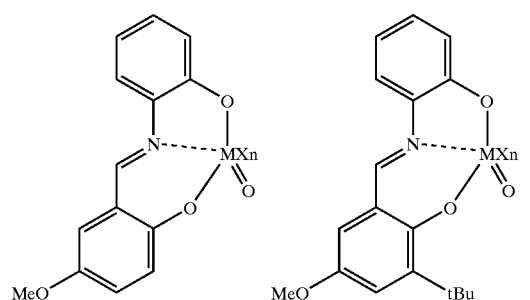
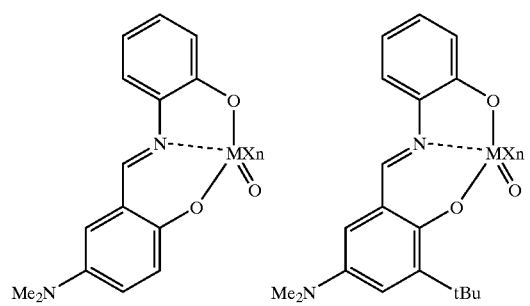
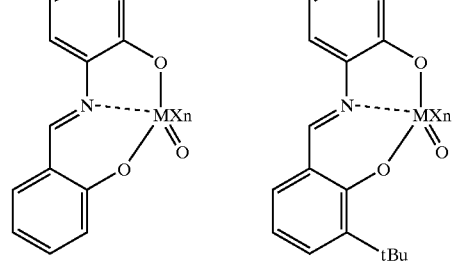
-continued
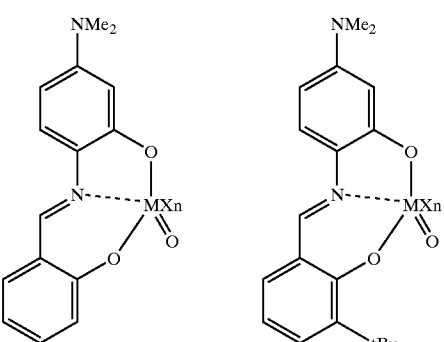
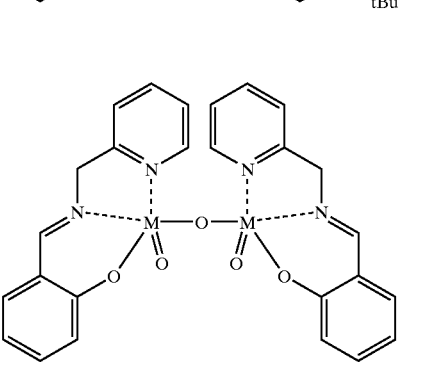
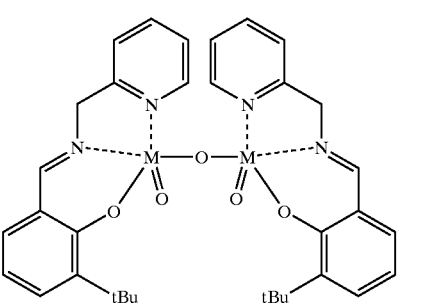
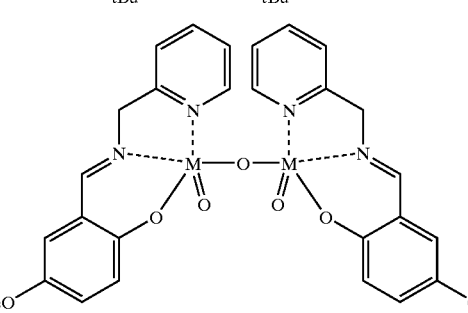
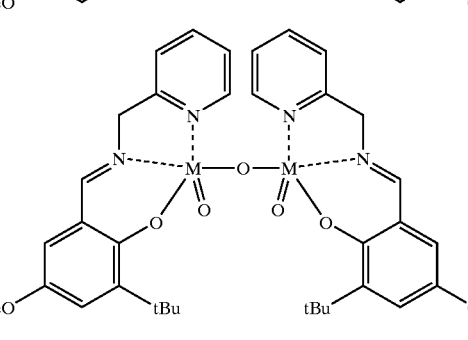

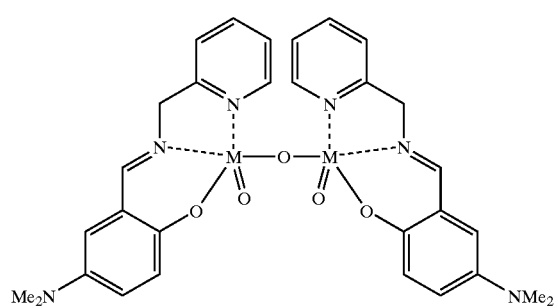
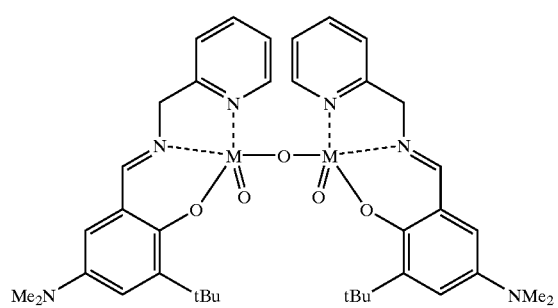
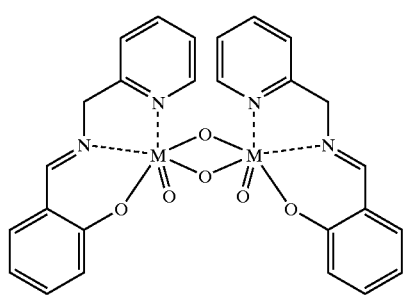
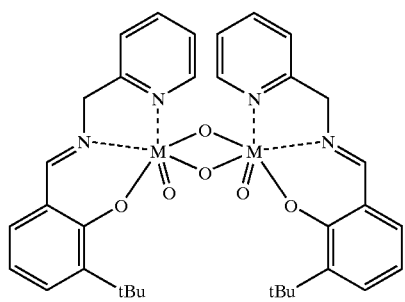
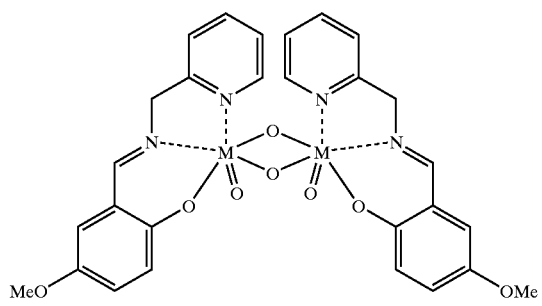
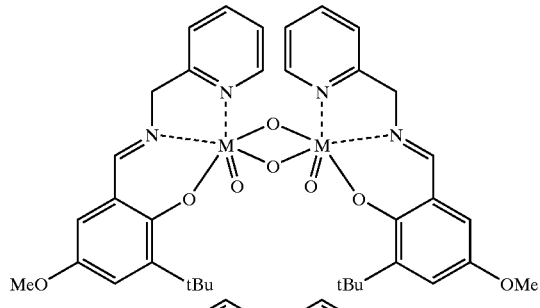
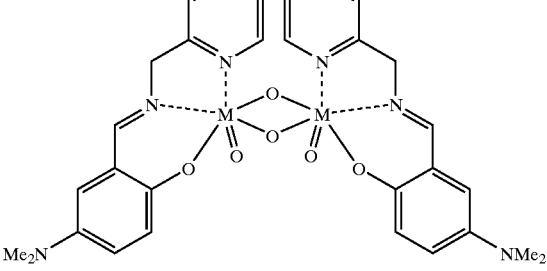
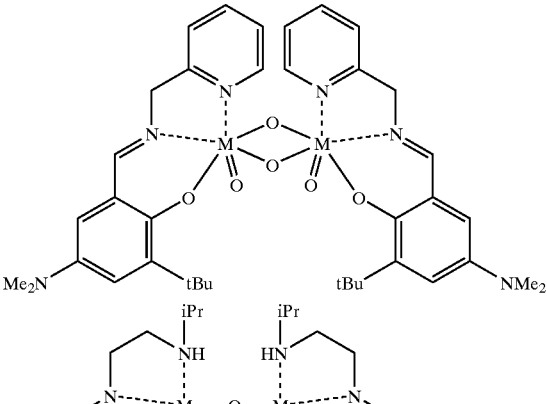
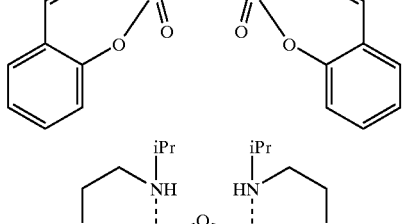
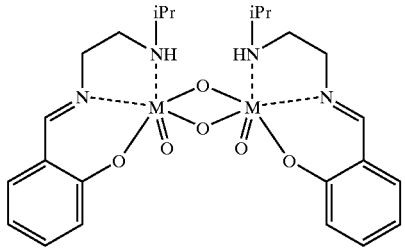
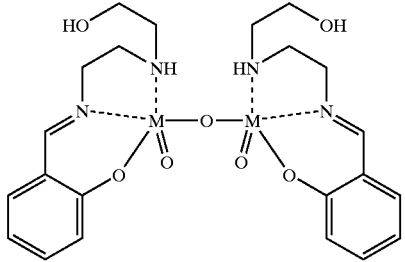

-continued
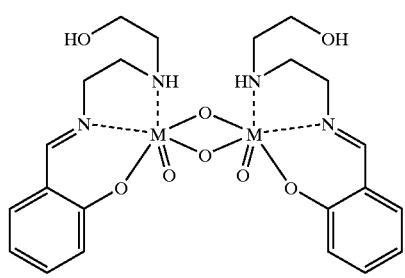
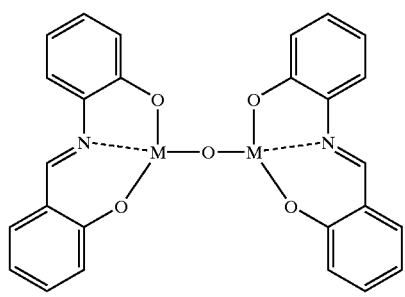
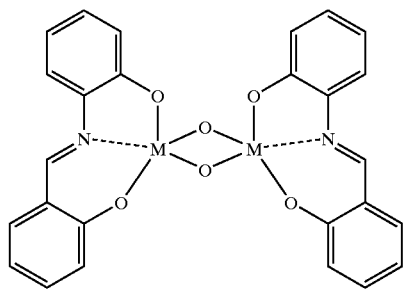
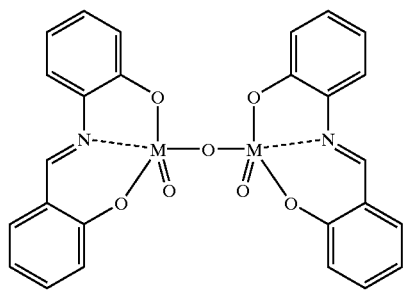
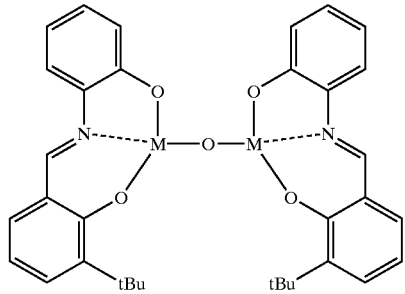
-continued
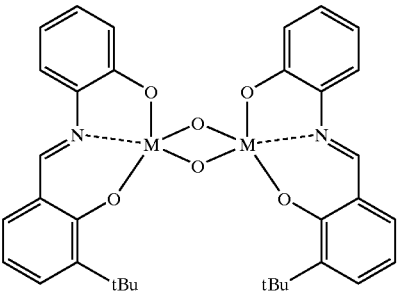
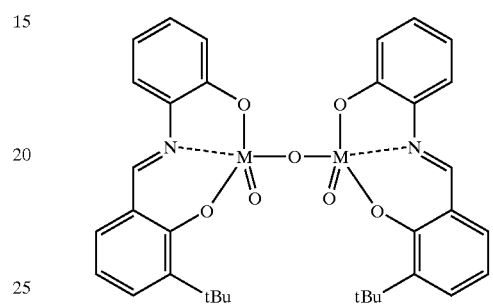
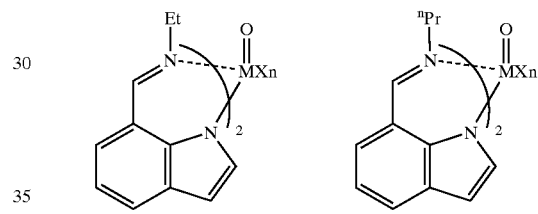
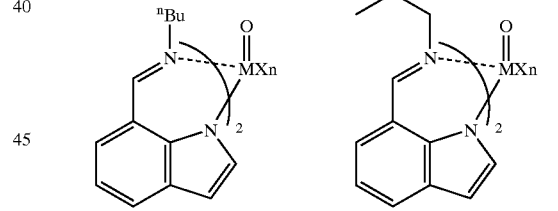
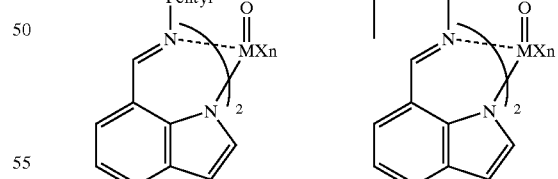
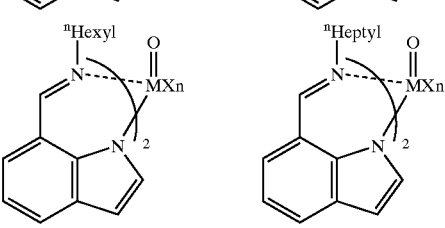

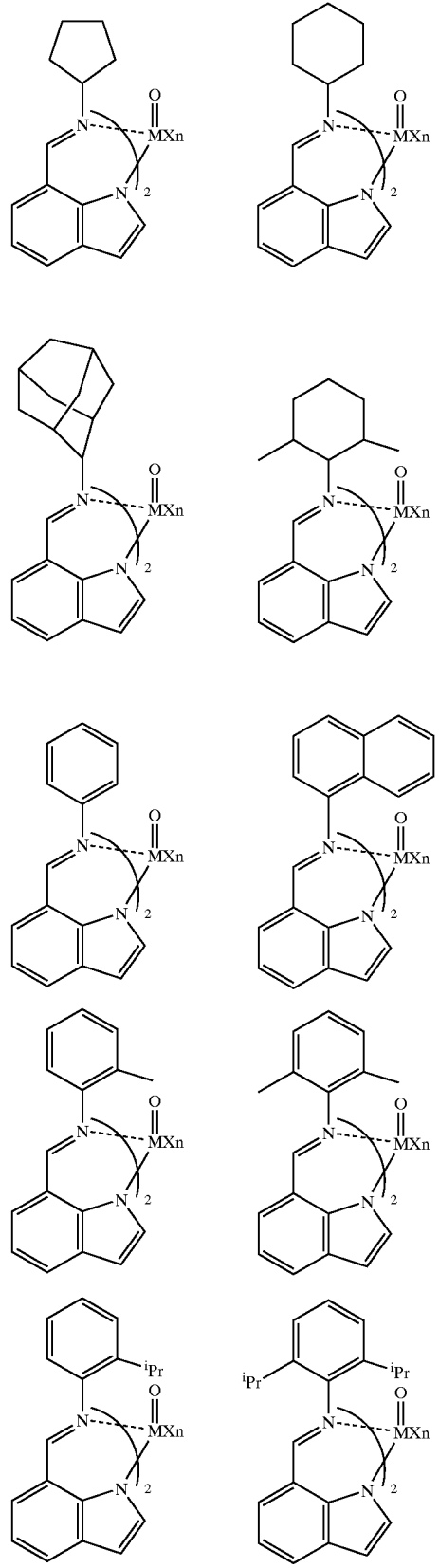
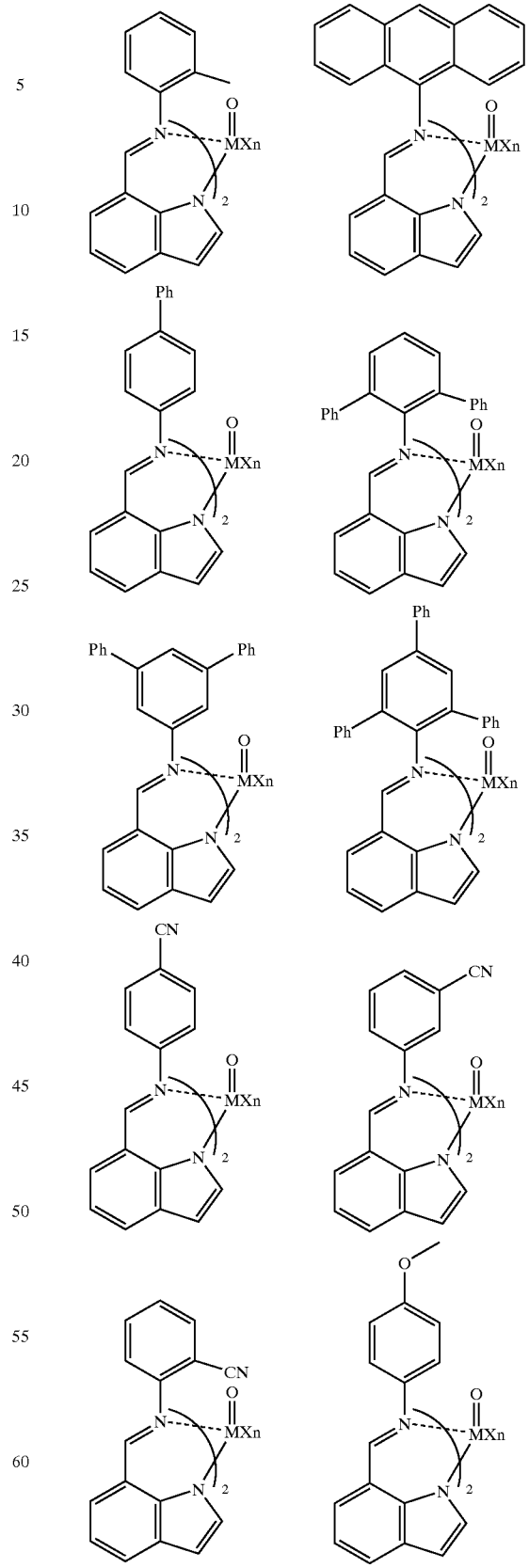

-continued
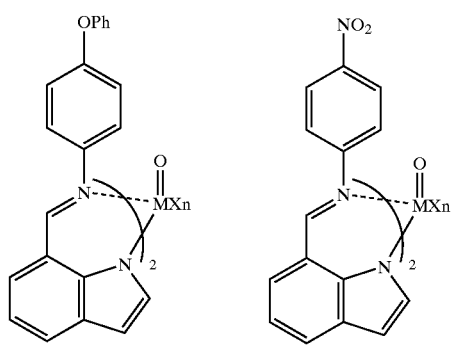
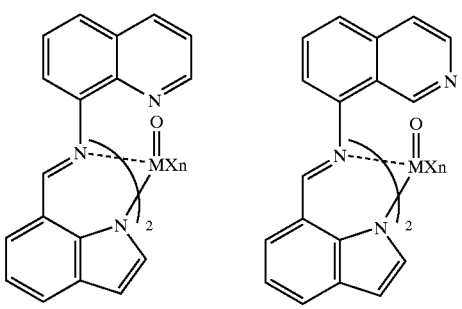
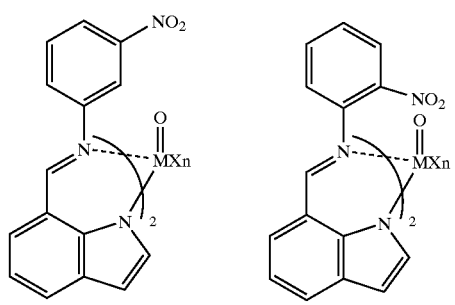
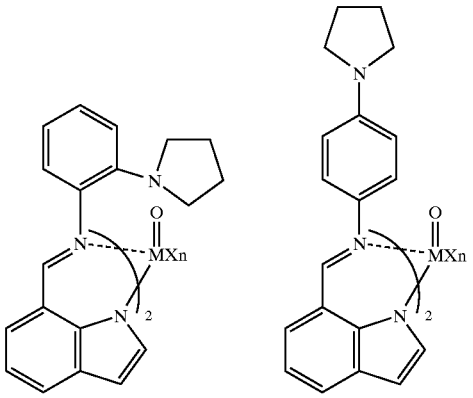
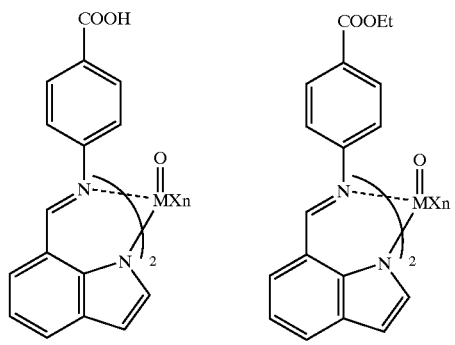
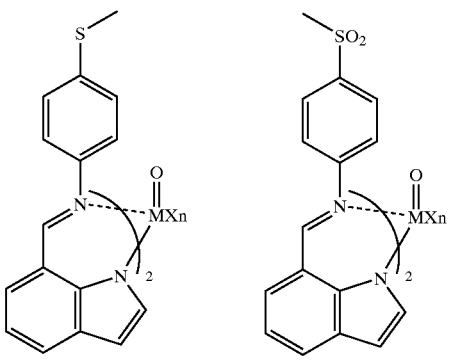
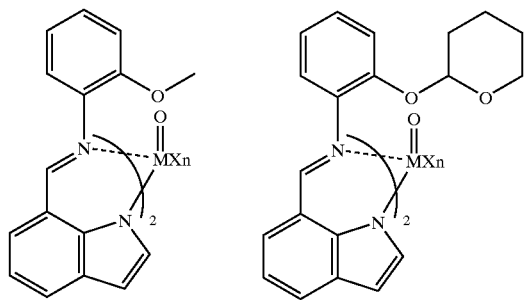
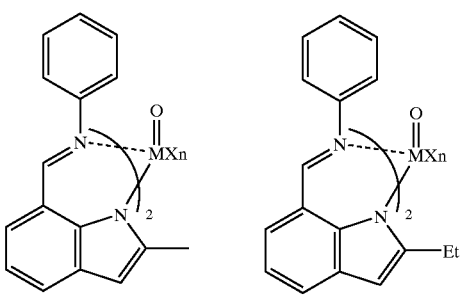
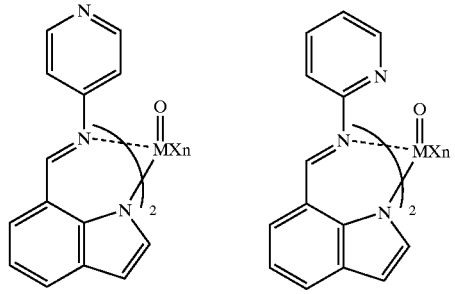
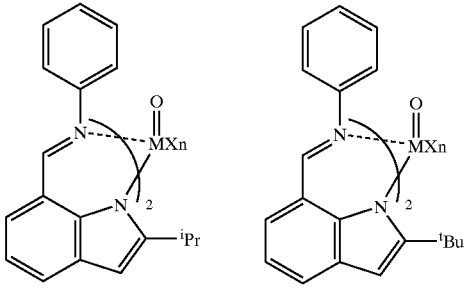

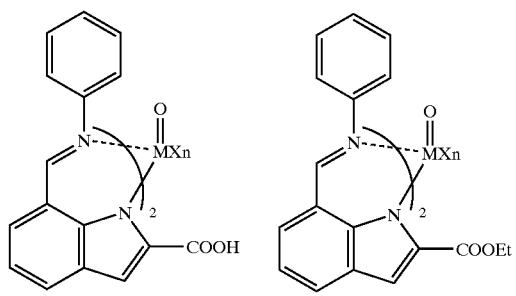
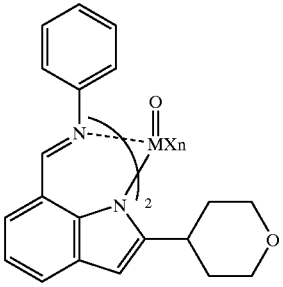
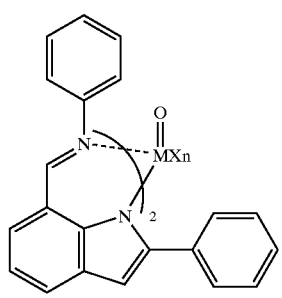
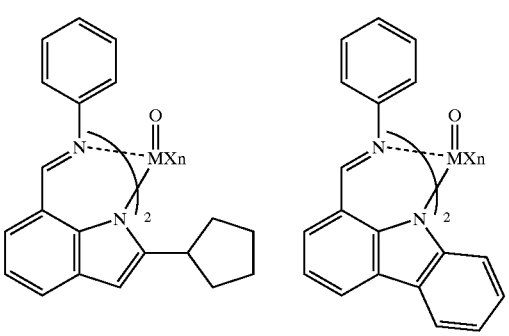
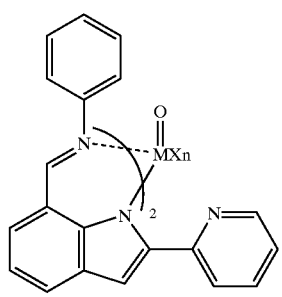
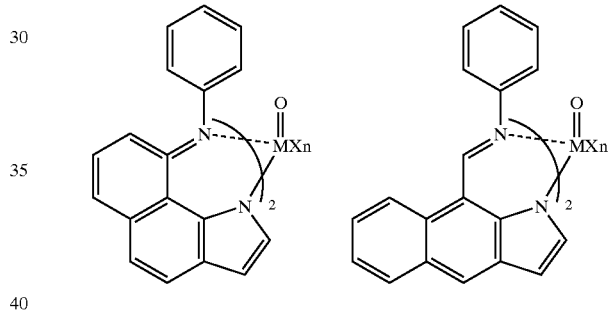
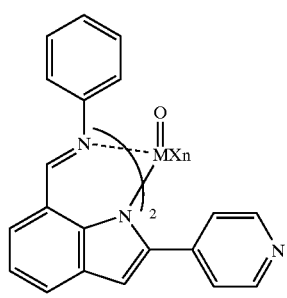
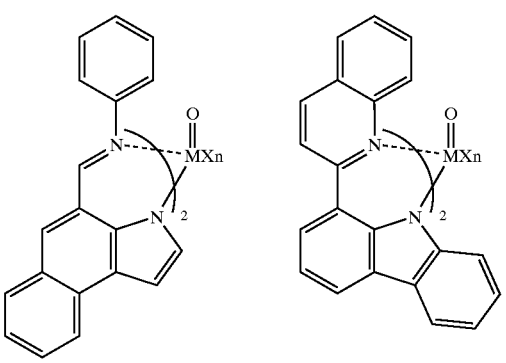
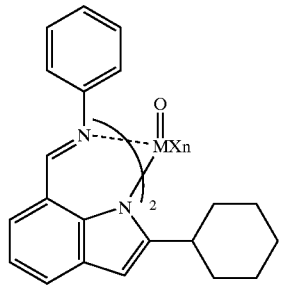
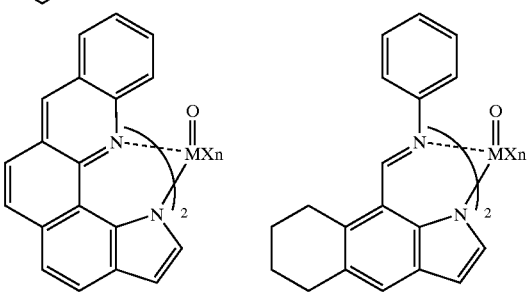

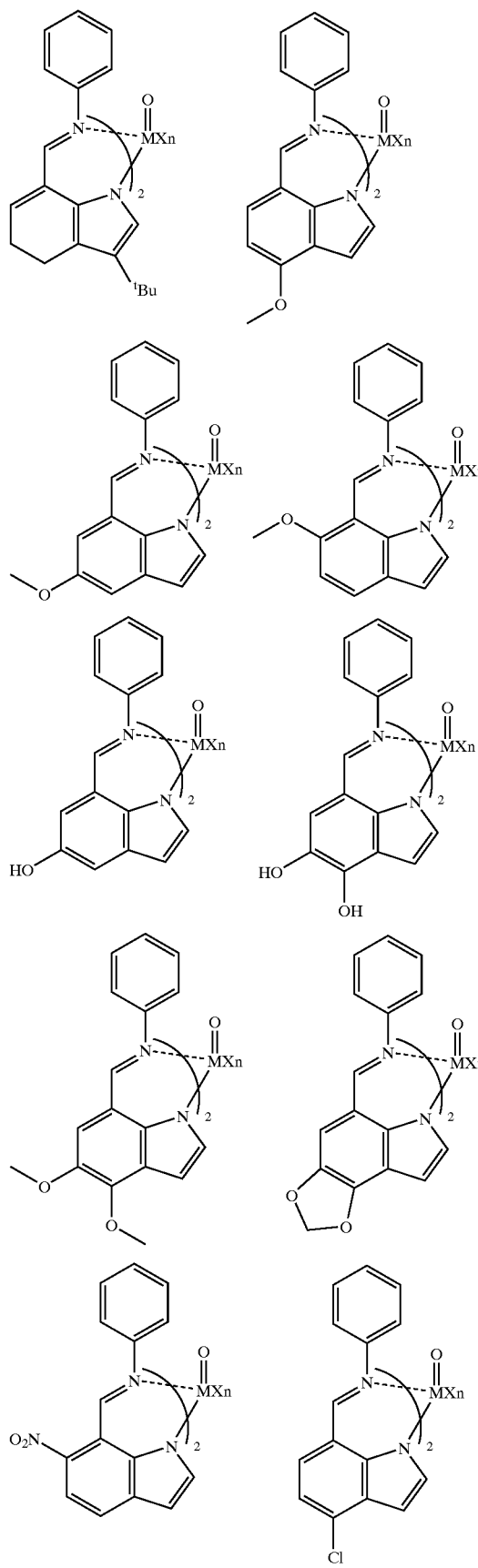
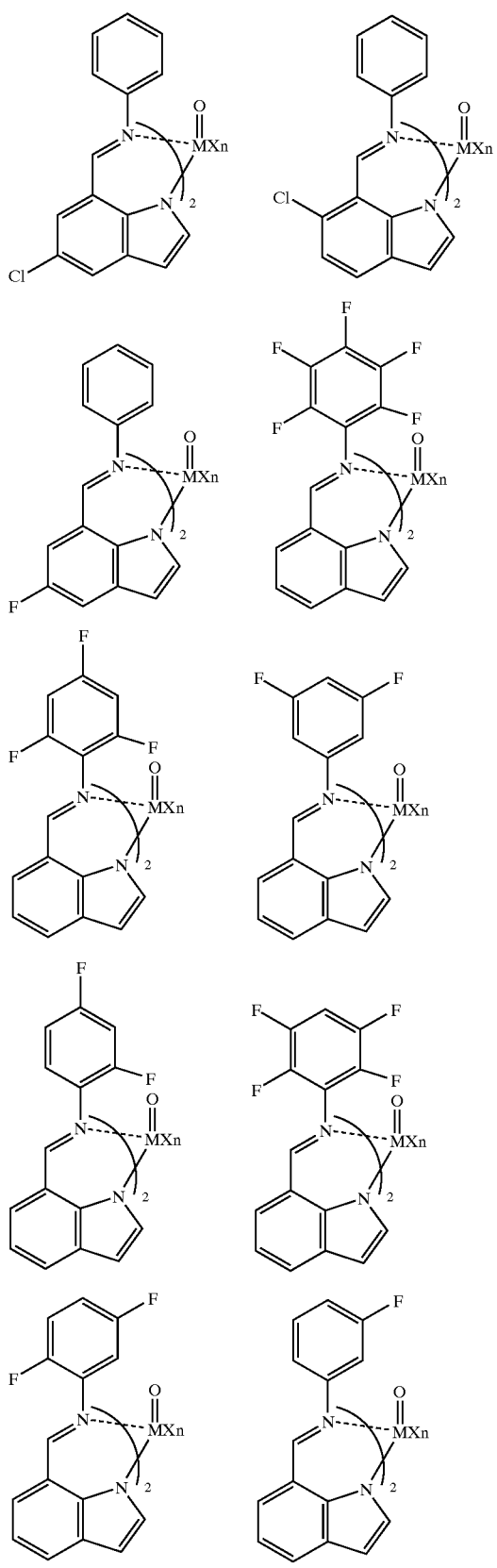

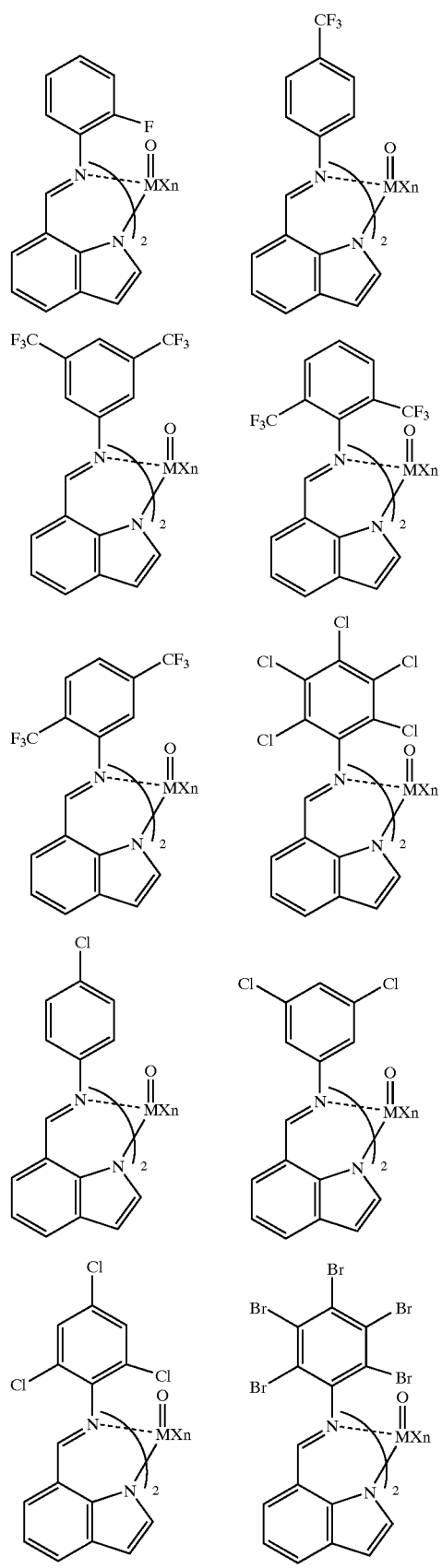
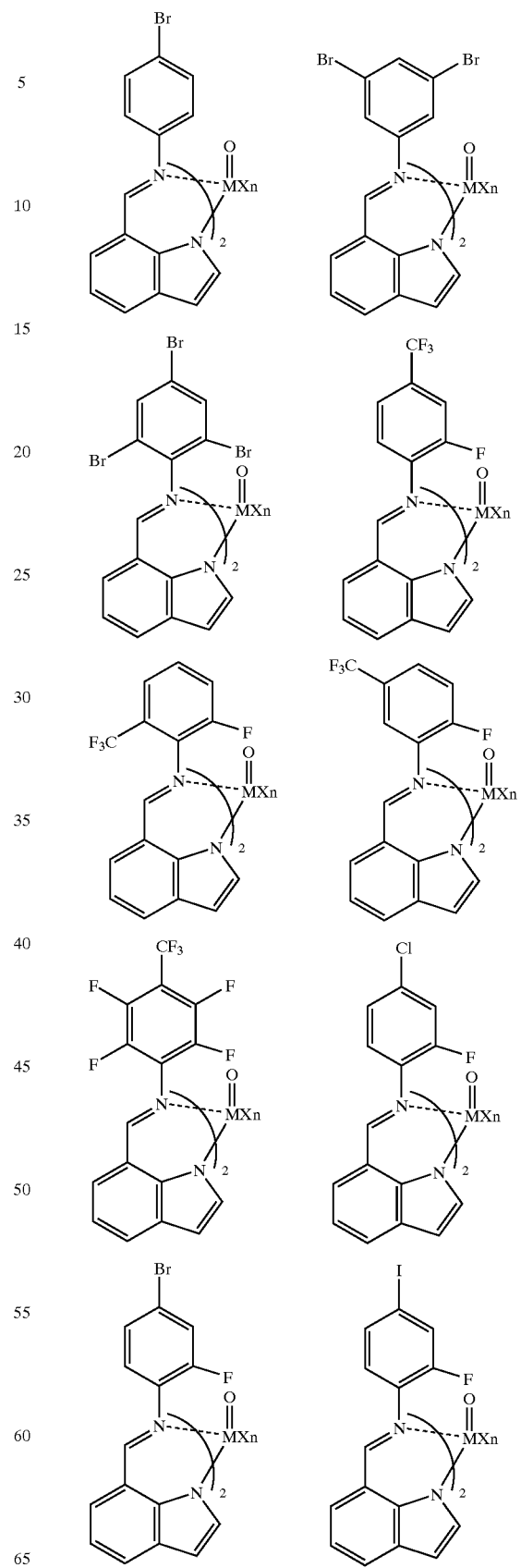

-continued
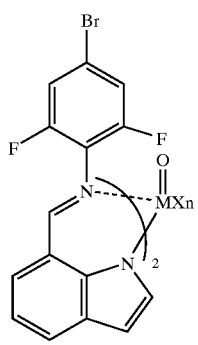
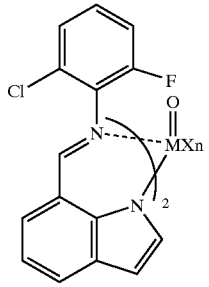
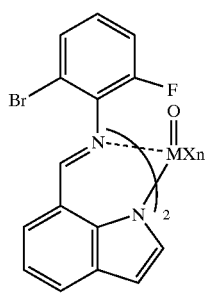
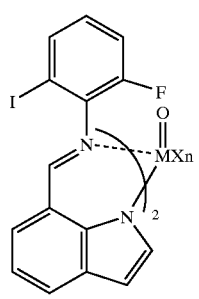
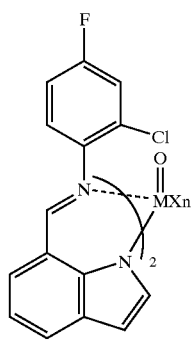
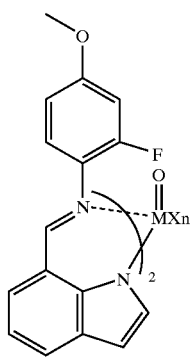
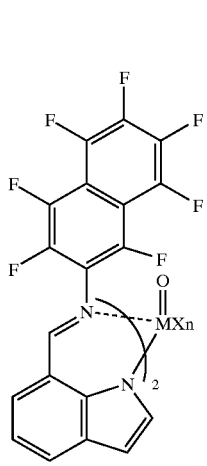
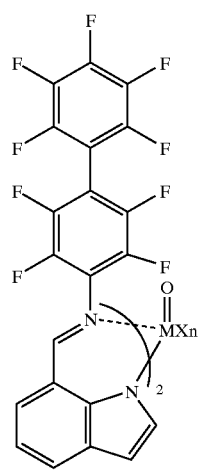
-continued
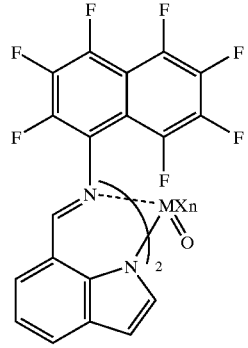
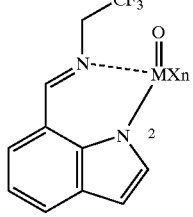
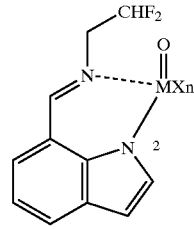
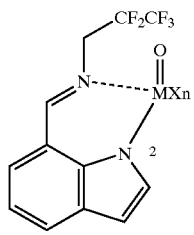
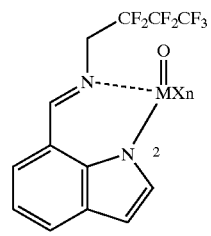
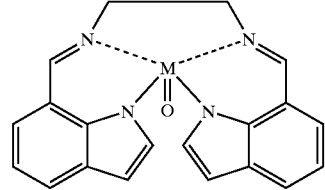
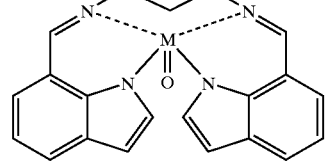
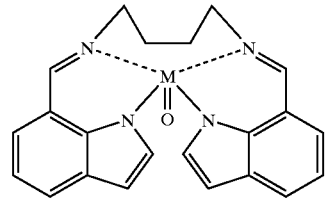
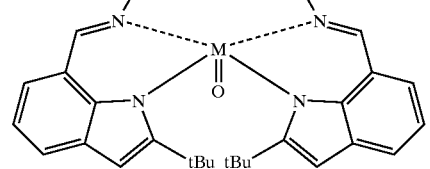

-continued

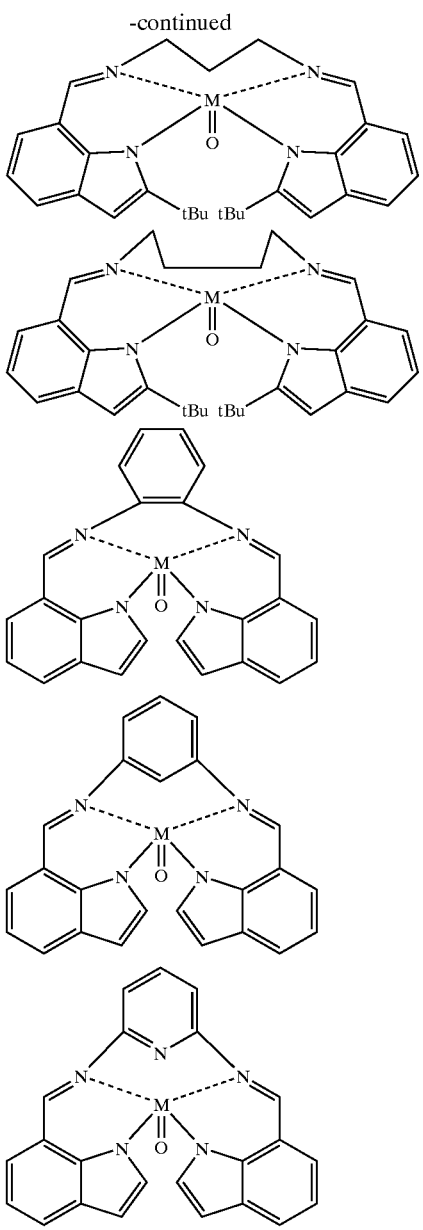

In the above formulas of the exemplified compounds, symbols are used as below: Me for methyl, Et for ethyl, iPr for isopropyl, tBu for t-butyl, Ph for phenyl, and Ada for 1-adamantyl.

Compound (a-2)

The component (A) of the present invention includes also the compounds (a-2) represented by General Formula (IVa) below:

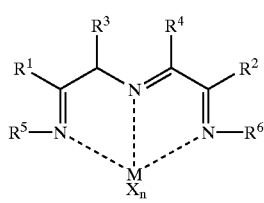

(IVa)

In General Formula (IVa), the symbol M represents a transition metal atom selected from Groups 3–7 of Periodic Table, preferably a transition metal atom selected from Groups 4 and 5, specifically including titanium, zirconium, hafnium, vanadium, niobium, and tantalum; preferably titanium, zirconium, and vanadium.

The symbols $R^1$–$R^6$ in Formula (IVa) represent the same or different moieties: respectively a hydrogen atom, a halogen atom, a hydrocarbon group, an oxygen-containing group, a nitrogen-containing group, a boron-containing group, a sulfur-containing group, a phosphorus-containing group, a heterocyclic compound residue, a silicon-containing group, a germanium-containing group, or a tin-containing group; and two or more thereof may be joined together to form one or more rings such as an aromatic ring, an aliphatic ring, and a hydrocarbon ring containing a heteroatom of nitrogen, sulfur, oxygen, or the like. Of these, $R^5$ and $R^6$ are preferably a hydrocarbon group, more preferably an alkyl-substituted aryl group.

The halogen atom and the hydrocarbon group represented by $R^1$–$R^6$ in Formula (IVa) include the same as the ones shown for $R^1$–$R^7$ in the aforementioned Formula (I).

The hydrocarbon groups represented by $R^1$–$R^6$ in Formula (IVa) may be substituted by an oxygen-containing group, a nitrogen-containing group, a boron-containing group, a sulfur-containing group, a phosphorus-containing group, a silicon-containing group, a germanium-containing group, a tin-containing group, or the like. In this substitution, preferably, the characteristic atomic group of the substituent like the oxygen-containing group is preferably not bonded directly to the N atom in Formula (IVa).

Of the hydrocarbon groups, preferred are linear or branched alkyl groups of 1–30 carbon atoms, preferably 1–20 carbon atoms such as methyl, ethyl, n-propyl, isopropyl, n-butyl, isobutyl, s-butyl, t-butyl, neopentyl, and n-hexyl; aryl groups of 6–30 carbon atoms, preferably 6–20 carbon atoms such as phenyl, naphtyl, biphenylyl, terphenylyl, phenanthryl, and anthryl; and substituted aryl groups having, on the aryl group, 1–5 substituents such as halogen atoms, alkyl or alkoxy of 1–30 carbon atoms, preferably 1–20 carbon atoms, aryl or aryloxy having 6–30 carbon atoms, preferably 6–20 carbon atoms, and the like.

Two or more of the groups $R^1$–$R^6$ in Formula (IVa), preferably adjacent groups thereof, may be joined together to form an aromatic ring, a aliphatic ring, or a hydrocarbon ring containing a nitrogen atom, sulfur atom, an oxygen atom, or the like, and the formed ring may have one or more additional substituents. Particularly preferably, $R^3$ and $R^4$ are joined together to form an aromatic ring.

As the groups $R^1$–$R^6$ in Formula (IVa), the oxygen-containing group, the nitrogen-containing group, the boron-containing group, the sulfur-containing group, the phosphorus-containing group, the hetero cyclic compound residue, the silicon-containing group, the germanium-containing, and the tin-containing group are the same as those shown for $R^1$–$R^7$ in the aforementioned Formula (I).

Specific examples of the groups $R^1$–$R^6$ in Formula (IVa) include the same as those shown for $R^1$–$R^7$ in the aforementioned Formula (I).

The symbol n in Formula (IVa) represents a number satisfying the valence of M; specifically an integer of 1–5, preferably 1–4, more preferably 1–3.

The symbol X in Formula (IVa) represents a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group, or a tin-containing group.

In Formula (IVa), the halogen atom, the hydrocarbon group, the oxygen-containing group, the sulfur containing group, the nitrogen-containing group, the boron-containing group, the aluminum-containing group, the phosphorus-containing group, the halogen-containing group, the heterocyclic compound residue, the silicon-containing group, the germanium-containing group, and the tin-containing group represented by X include the same as the atoms and groups exemplified for $X^1$ in the aforementioned Formula (I).

Of these, the hydrocarbon groups has preferably 1–20 carbon atoms.

When n is 2 or more, the plural groups represented by X may be the same or different, and may be joined together to form one or more rings.

The compound (a-2) represented by the above General Formula (IVa) is preferably a compound represented by General Formula (IVa') below.

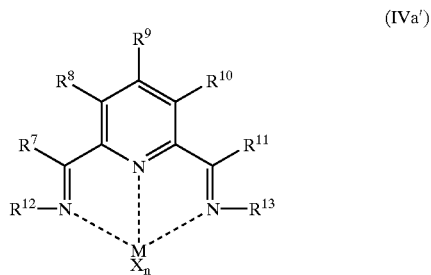

(IVa')

wherein M is a transition metal atom selected from Groups 4 and 5 of Periodical Table; specifically including titanium, zirconium, vanadium, niobium, and tantalum.

The symbols $R^7$–$R^{13}$ in Formula (IVa') represent the same or different moieties: respectively a hydrogen atom, a halogen atom, a hydrocarbon group, an oxygen-containing group, a nitrogen-containing group, a boron-containing group, a sulfur-containing group, a phosphorus-containing group, a heterocyclic compound residue, a silicon-containing group, a germanium-containing group, or a tin-containing group; and two or more thereof maybe joined together to form one or more rings. Of these, $R^{12}$ and $R^{13}$ are preferably a hydrocarbon group, more preferably an o-alkyl-substituted aryl group.

The halogen atom and the hydrocarbon group represented by $R^7$–$R^{13}$ in General Formula (IVa') include the same as those shown for $R^1$–$R^7$ in the aforementioned General Formula (I).

The hydrocarbon groups may be substituted by an oxygen-containing group, a nitrogen-containing group, a boron-containing group, a sulfur-containing group, a phosphorus-containing group, a silicon-containing group, a germanium-containing group, a tin-containing group, or the like. In this substitution, preferably, the characteristic atomic group of the substituent like the oxygen-containing group is preferably not bonded directly to the N atom in Formula (IVa').

The $R^7$–$R^{13}$ in Formula (IVa') representing an oxygen-containing group, a nitrogen-containing group, a boron-containing group, a sulfur-containing group, a phosphorus-containing group, a heterocyclic compound residue, a silicon-containing group, a germanium-containing group, or a tin-containing group include the same as those shown for $R^1$–$R^7$ in the aforementioned Formula (I).

Specific examples of $R^7$–$R^{13}$ in Formula (IVa') include the same as those shown for $R^1$–$R^7$ in the aforementioned Formula (I).

The symbol n in Formula (IVa') represents a number satisfying the valence of M; specifically an integer of 1–5, preferably 1–4, more preferably 1–3.

The symbol X in Formula (IVa') represents a hydrogen atom, a halogen atom, a hydrocarbon group, an oxygen-containing group, a sulfur-containing group, a nitrogen-containing group, a boron-containing group, a phosphorus-containing group, a halogen-containing group, a heterocyclic compound residue, an aluminum-containing group, a silicon-containing group, a germanium-containing group, or a tin-containing group.

In Formula (IVa'), the halogen atom, the hydrocarbon group, the oxygen-containing group, the sulfur containing group, the nitrogen-containing group, the boron-containing group, the aluminum-containing group, the phosphorus-containing group, the halogen-containing group, the heterocyclic compound residue, the silicon-containing group, the germanium-containing group, and the tin-containing group represented by X include the same as the atoms and groups exemplified for $X^1$ in the aforementioned Formula (I).

When the number n is 2 or more, the plural groups represented by X may be the same or different, and may be joined together to form one or more rings.

Specific Examples represented by the above General Formula (IVa) are shown below.

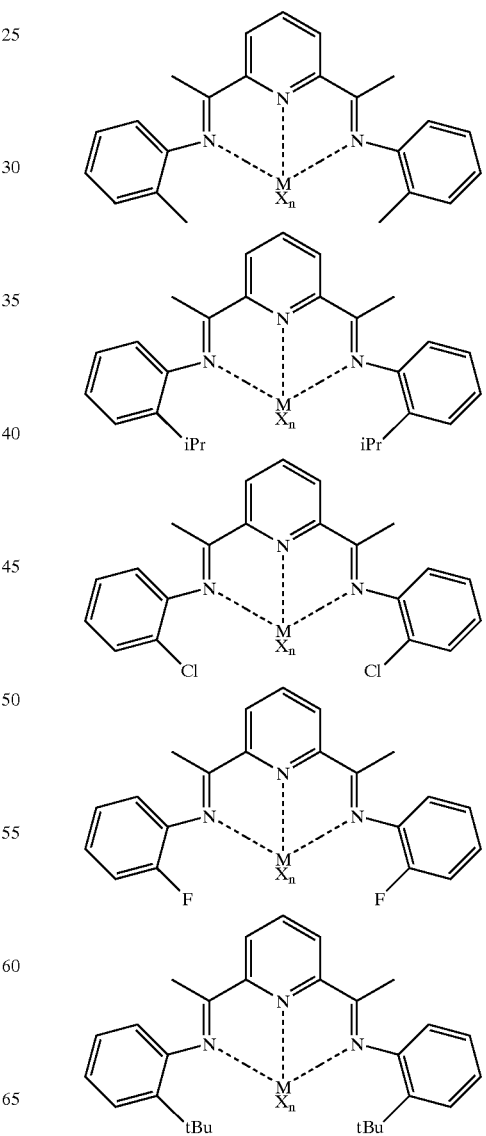

-continued
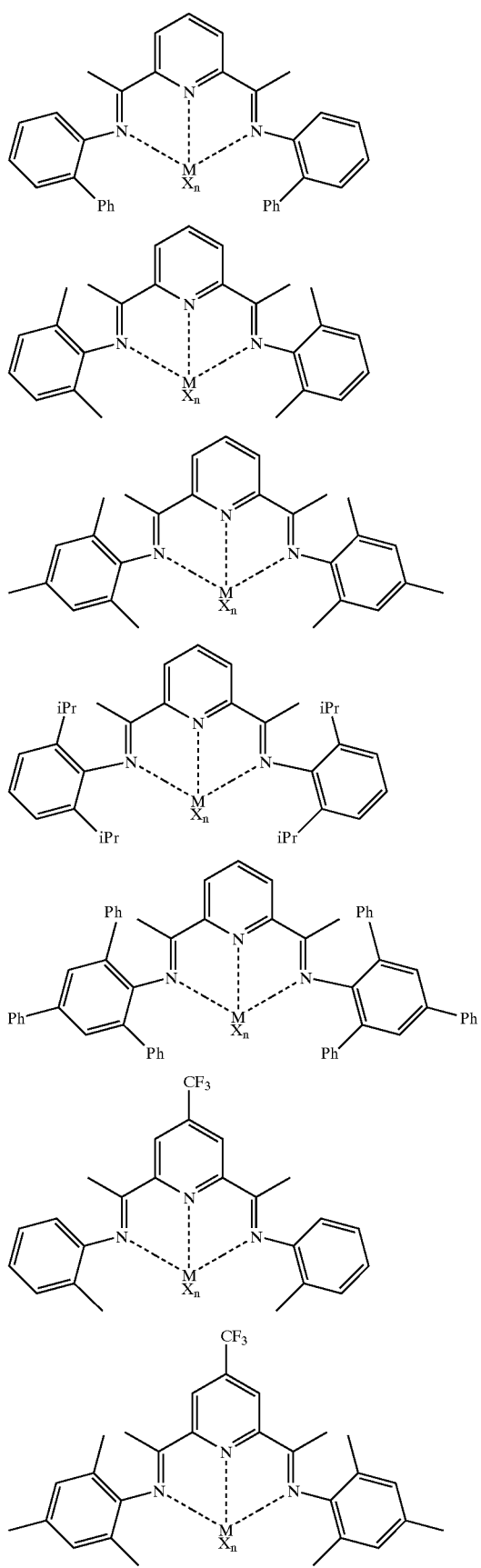
-continued
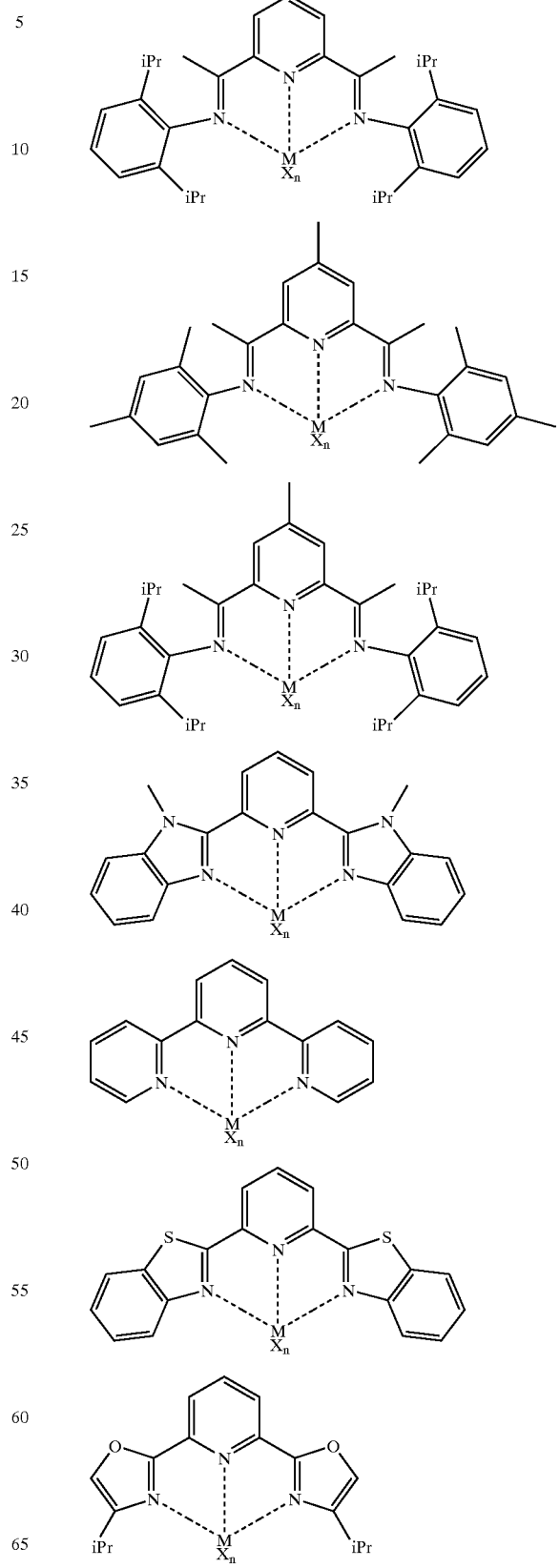

-continued

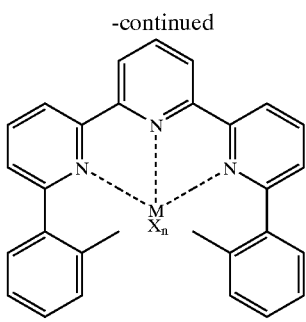

In the above examples, iPr represents isopropyl, tBu represents t-butyl, and Ph represents phenyl.

Compound (a-3)

The component (A) of the present invention includes also the compounds (a-3) represented by General Formula (IVb) below:

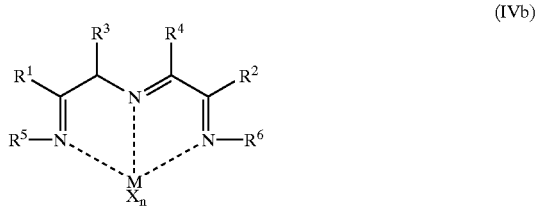

(IVb)

In General Formula (IVb), M represents a transition metal atom selected from Groups 8–11 of Periodic Table, preferably a transition metal atom selected from Groups 8 and 9, specifically including iron, ruthenium, osmium, cobalt, rhodium, iridium, nickel, palladium, and copper; preferably iron, ruthenium, cobalt, rhodium, and the like; more preferably iron and cobalt.

The symbols $R^1$–$R^6$ in Formula (IVb) represent the same or different moieties: respectively a hydrogen atom, a halogen atom, a hydrocarbon group, an oxygen-containing group, a nitrogen-containing group, a boron-containing group, a sulfur-containing group, a phosphorus-containing group, a heterocyclic compound residue, a silicon-containing group, a germanium-containing group, or a tin-containing group; and two or more thereof may be joined together to form one or more rings such as an aromatic ring, an aliphatic ring, and a hydrocarbon ring containing a heteroatom such as of nitrogen, sulfur, and oxygen. Of these, $R^5$ and $R^6$ are preferably a hydrocarbon group, more preferably an alkyl-substituted aryl group.

The halogen atoms and the hydrocarbon groups represented by $R^1$–$R^6$ in Formula (IVb) include the same as the ones shown for $R^1$–$R^7$ in the aforementioned Formula (I).

The hydrocarbon groups represented by $R^1$–$R^6$ in Formula (IVb) may be substituted by an oxygen-containing group, a nitrogen-containing group, a boron-containing group, a sulfur-containing group, a phosphorus-containing group, a silicon-containing group, a germanium-containing group, a tin-containing group, or the like. In this substitution, preferably, the characteristic atomic group of the substituent like an oxygen-containing group is preferably not bonded directly to the N atom in Formula (IVb).

Of the hydrocarbon groups, preferred are linear or branched alkyl groups of 1–30 carbon atoms, preferably 1–20 carbon atoms such as methyl, ethyl, n-propyl, isopropyl, n-butyl, isobutyl, s-butyl, t-butyl, neopentyl, and n-hexyl; aryl groups of 6–30 carbon atoms, preferably 6–20 carbon atoms such as phenyl, naphtyl, biphenylyl, terphenylyl, phenanthryl, and anthryl; and substituted aryl groups having, on the aryl group, 1–5 substituents such as halogen atoms, alkyl or alkoxy of 1–30 carbon atoms, preferably 1–20 carbon atoms, aryl or aryloxy having 6–30 carbon atoms, preferably 6–20 carbon atoms, and the like.

Two or more of the groups $R^1$–$R^6$ in Formula (IVb), preferably adjacent groups thereof, may be joined together to form an aromatic ring, a aliphatic ring, or a hydrocarbon ring containing a nitrogen atom, a sulfur atom, an oxygen atom, or the like, and the formed ring may have one or more additional substituents. Particularly preferably, $R^3$ and $R^4$ are joined together to form an aromatic ring.

As the groups $R^1$–$R^6$ in Formula (IVb), the oxygen-containing group, the nitrogen-containing group, the boron-containing group, the sulfur-containing group, the phosphorus-containing group, the heterocyclic compound residue, the silicon-containing group, the germanium-containing, and the tin-containing group include the same as those shown for $R^1$–$R^7$ in the aforementioned Formula (I).

Specific examples of $R^1$–$R^6$ in Formula (IVb) include the same as those shown for $R^1$–$R^7$ in the aforementioned Formula (I).

The symbol n in Formula (IVa) represents an integer satisfying the valence of M; specifically an integer of 1–5, preferably 1–4, more preferably 1–3.

The symbol X in Formula (IVb) represents respectively a hydrogen atom, a halogen atom, a hydrocarbon group, an oxygen-containing group, a sulfur containing group, a nitrogen-containing group, a boron-containing group, an aluminum-containing group, a phosphorus-containing group, a halogen-containing group, a heterocyclic compound residue, a silicon-containing group, a germanium-containing group, or a tin-containing group.

In Formula (IVb), the halogen atom, the hydrocarbon group, the oxygen-containing group, the sulfur containing group, the nitrogen-containing group, the boron-containing group, the aluminum-containing group, the phosphorus-containing group, the halogen-containing group, the heterocyclic compound residue, the silicon-containing group, the germanium-containing group, and the tin-containing group represented by X include the same atoms and groups as exemplified for $X^1$ in the aforementioned Formula (I).

Of these, the hydrocarbon groups has preferably 1–20 carbon atoms.

For the integer n of 2 or more, the plural groups represented by X may be the same or different, and maybe joined together to form one or more rings.

The compound (a-3) represented by the above Formula (IVb) is preferably a compound represented by General Formula (IVb') below.

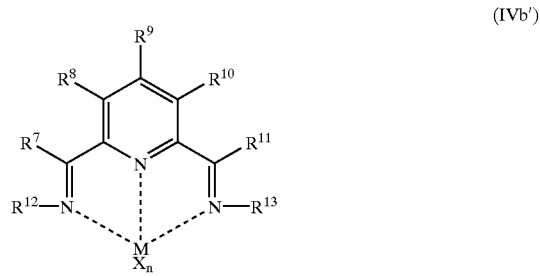

(IVb')

wherein M represents a transition metal atom selected from Groups 8 and 9 of Periodical Table; specifically iron and cobalt.

The R$^7$–R$^{13}$ in Formula (IVb') may be the same or different in each other, and represent respectively a hydrogen atom, a halogen atom, a hydrocarbon group, an oxygen-containing group, a nitrogen-containing group, a boron-containing group, a sulfur-containing group, a phosphorus-containing group, a heterocyclic compound residue, a silicon-containing group, a germanium-containing group, or a tin-containing group; and two or more thereof may be joined together to form one or more rings. Of these, R$^{12}$ and R$^{13}$ are preferably a hydrocarbon group, more preferably an o-alkyl-substituted aryl group, respectively.

The halogen atom and the hydrocarbon group represented by R$^7$–R$^{13}$ in General Formula (IVb') include the same as those shown for R$^1$–R$^7$ in the aforementioned General Formula (I).

The hydrocarbon groups may be substituted by an oxygen-containing group, a nitrogen-containing group, a boron-containing group, a sulfur-containing group, a phosphorus-containing group, a silicon-containing group, a germanium-containing group, a tin-containing group, or the like. In this substitution, preferably, the characteristic atomic group of the substituent like the oxygen-containing group is preferably not bonded directly to the N atom in Formula (IVb').

The oxygen-containing group, the nitrogen-containing group, the boron-containing group, the sulfur-containing group, the phosphorus-containing group, the heterocyclic compound residue, the silicon-containing group, the germanium-containing group, and the tin-containing group represented by R$^7$–R$^{13}$ in Formula (IVb') include the same as the ones shown for R$^1$–R$^6$ in the aforementioned Formula (I).

Specific examples of R$^7$–R$^{13}$ in Formula (IVb') include the same as those shown for R$^1$–R$^7$ in the aforementioned Formula (I).

The symbol n in Formula (IVb') represents a number satisfying the valence of M; specifically an integer of 1–5, preferably 1–4, more preferably 1–3.

The symbol X in Formula (Ivb') represents a hydrogen atom, a halogen atom, a hydrocarbon group, an oxygen-containing group, a sulfur containing group, a nitrogen-containing group, a boron-containing group, a phosphorus-containing group, a halogen-containing group, a heterocyclic compound residue, an aluminum-containing group, a silicon-containing group, a germanium-containing group, or a tin-containing group.

In Formula (IVb'), the halogen atom, the hydrocarbon group, the oxygen-containing group, the sulfur-containing group, the nitrogen-containing group, the boron-containing group, the aluminum-containing group, the phosphorus-containing group, the halogen-containing group, the heterocyclic compound residue, the silicon-containing group, the germanium-containing group, and the tin-containing group represented by X include the same as the atoms and groups exemplified for X$^1$ in the aforementioned Formula (I).

For the integer n of 2 or more, the plural groups represented by X may be the same or different, and may be joined together to form one or more rings.

Specific examples represented by the above General Formula (IVb) are shown below.

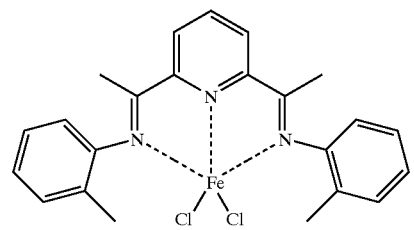

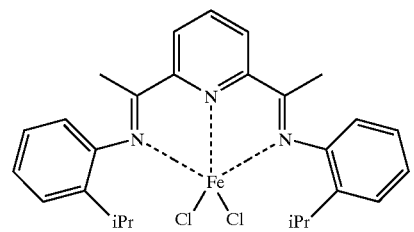

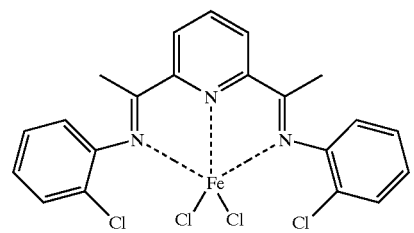

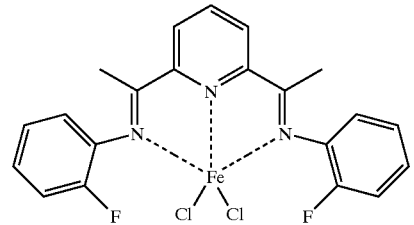

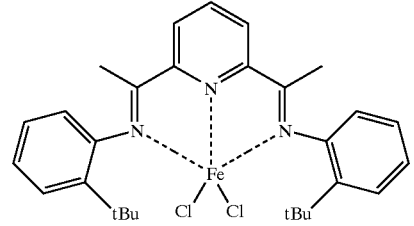

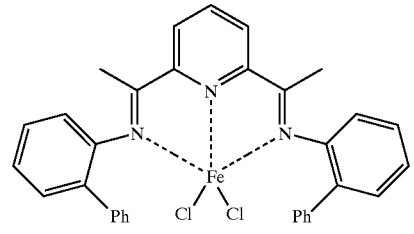

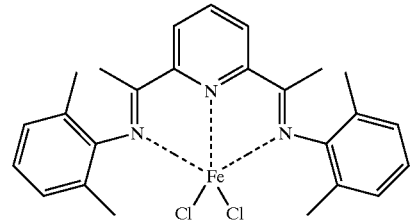

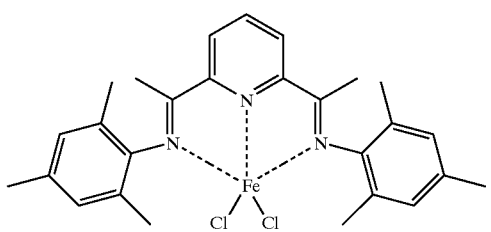
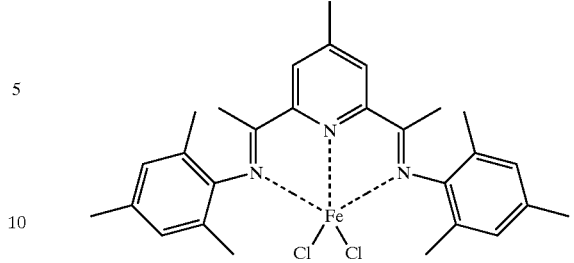
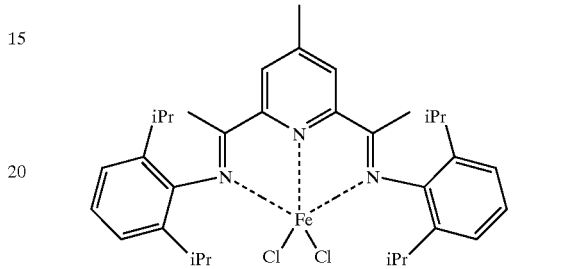
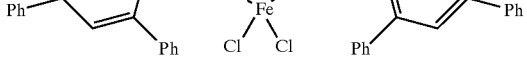
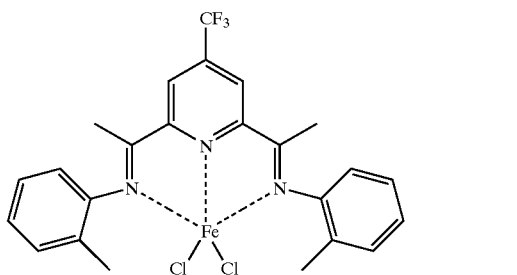
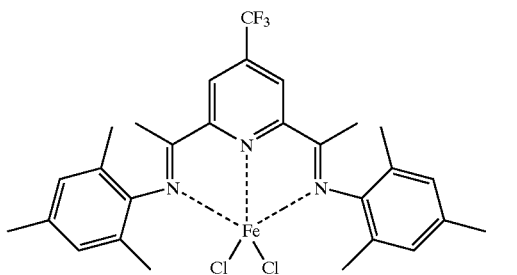
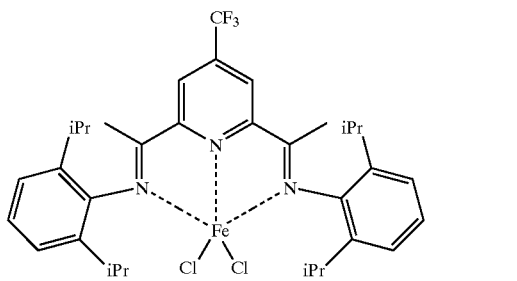
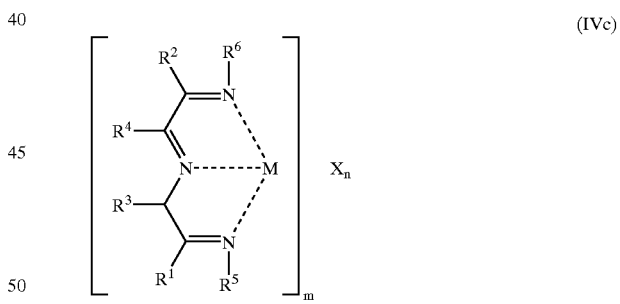

In the above examples, iPr represents isopropyl, tBu represents t-butyl, and Ph represents phenyl.

The examples also includes the transition metal compounds derived by replacing the iron of the above compounds by a metal other than iron selected from Groups 8–11 of Perodic Table, such as rhodium, and cobalt in the present invention.

Compound (a-4)

The component (A) of the present invention includes also the compounds (a-4) represented by General Formula (IVc) below:

$$\left[\begin{array}{c} R^2 \quad R^6 \\ \diagdown \diagup \\ N \\ R^4 \diagup \\ \vert \\ N \text{------} M \\ R^3 \diagdown \\ \diagup \\ N \\ \diagup \diagdown \\ R^1 \quad R^5 \end{array}\right]_m X_n$$

(IVc)

In General Formula (IVc), M represents a transition metal atom selected from Groups 3–11 of Periodic Table, preferably a transition metal atom selected from Groups 4, 5, 8 and 9, specifically including titanium, zirconium, hafnium, vanadium, niobium, tantalum, iron, ruthenium, osmium, cobalt, rhodium, iridium, nickel, palladium, and copper; more preferably titanium, zirconium, vanadium, niobium, tantalum, iron, ruthenium, cobalt, and rhodium, still more preferably titanium, zirconium, vanadium, iron, or cobalt.

The symbol m in Formula (IVc) represents an integer of 1–6, preferably an integer of 1–4, still more preferably 1–3, still more preferably 1–2.

The symbols $R^1$–$R^6$ in Formula (IVc) represent the same or different moieties: respectively a hydrogen atom, a halogen atom, a hydrocarbon group, an oxygen-containing group, a nitrogen-containing group, a boron-containing group, a sulfur-containing group, a phosphorus-containing group, a heterocyclic compound residue, a silicon-containing group, a germanium-containing group, or a tin-containing group; and two or more thereof may be joined together to form one or more rings such as an aromatic ring, an aliphatic ring, and a hydrocarbon ring containing a hetero atom such as nitrogen, sulfur, and oxygen. Of these, $R^5$ and $R^6$ are preferably a hydrocarbon group, more preferably an alkyl-substituted aryl group.

The halogen atom and the hydrocarbon group represented by $R^1$–$R^6$ in Formula (IVc) include the same as the ones shown for $R^1$–$R^7$ in the aforementioned Formula (I).

The hydrocarbon groups represented by $R^1$–$R^6$ in Formula (IVc) may be substituted by an oxygen-containing group, a nitrogen-containing group, a boron-containing group, a sulfur-containing group, a phosphorus-containing group, a silicon-containing group, a germanium-containing group, a tin-containing group, or the like. In this substitution, preferably, the characteristic atomic group of the substituent like the oxygen-containing group is preferably not bonded directly to the N atom in Formula (IVc).

Of the hydrocarbon groups, preferred are linear or branched alkyl groups of 1–30 carbon atoms, preferably 1–20 carbon atoms such as methyl, ethyl, n-propyl, isopropyl, n-butyl, isobutyl, s-butyl, t-butyl, neopentyl, and n-hexyl; aryl groups of 6–30 carbon atoms, preferably 6–20 carbon atoms, such as phenyl, naphtyl, biphenylyl, terphenylyl, phenanthryl, and anthryl; and substituted aryl groups having, on the aryl group, 1–5 substituents such as halogen atoms, alkyl or alkoxy groups of 1–30 carbon atoms, preferably 1–20 carbon atoms, aryl or aryloxy groups of 6–30 carbon atoms, preferably 6–20 carbon atoms, and the like.

Two or more of the groups $R^1$–$R^6$ in Formula (IVc) preferably adjacent groups thereof, may be joined together to form an aromatic ring, a aliphatic ring, or a hydrocarbon ring containing a nitrogen atom, sulfur atom, an oxygen atom, or the like, and the formed ring may have one or more additional substituents. Particularly preferably, $R^3$ and $R^4$ are joined together to form an aromatic ring.

The oxygen-containing groups, the nitrogen-containing groups, the boron-containing groups, the sulfur-containing groups, the phosphorus-containing groups, the heterocyclic compound residues, the silicon-containing groups, the germanium-containing groups, and the tin-containing groups represented by $R^1$–$R^6$ in Formula (IVc) include the same as those shown for $R^1$–$R^7$ in the aforementioned Formula (I).

Specific examples of the groups $R^1$–$R^6$ in Formula (IVc) include the same as the ones shown for $R^1$–$R^7$ in the aforementioned Formula (I).

The symbol n in Formula (IVc) represents a number satisfying the valence of M; specifically an integer of 1–5, preferably 1–4, more preferably 1–3.

When the number n is 1, X is an oxygen atom; when the number n is 2 or more, at least one X is an oxygen atom, and other Xs represent a hydrogen atom, a halogen atom, an oxygen atom, a hydrocarbon group, an oxygen-containing group, a sulfur containing group, a nitrogen-containing group, a boron-containing group, an aluminum-containing group, a phosphorus-containing group, a halogen-containing group, a heterocyclic compound residue, a silicon-containing group, a germanium-containing group, or a tin-containing group.

In Formula (IVc), the halogen atom, the hydrocarbon group, the oxygen-containing group, the sulfur containing group, the nitrogen-containing group, the boron-containing group, the aluminum-containing group, the phosphorus-containing group, the halogen-containing group, the heterocyclic compound residue, the silicon-containing group, the germanium-containing group, and the tin-containing group represented by X include the same atoms and groups as the ones exemplified for $X^1$ in the aforementioned Formula (I).

Of these, the hydrocarbon groups has preferably 1–20 carbon atoms.

For the integer n of 2 or more, the plural groups represented by X may be the same or different, and may be joined together to form one or more rings.

The compound (a-4) represented by the above Formula (IVc) is preferably a compound represented by General Formula (IVc') below.

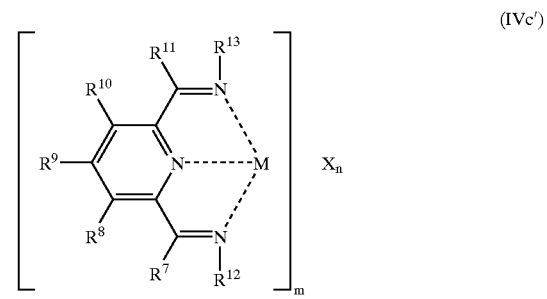

(IVc')

The symbol M in Formula (IVc') represents a transition metal atom selected from Groups 4, 5, 8, and 9 of Periodical Table; specifically titanium, zirconium, vanadium, niobium, tantalum, iron, and cobalt.

The symbol m in Formula (IVc') represents an integer of 1–6, preferably an integer of 1–4, still more preferably 1–3, still more preferably 1–2.

The symbols $R^7$–$R^{13}$ in Formula (IVc') may be the same or different, and represent respectively a hydrogen atom, a halogen atom, a hydrocarbon group, an oxygen-containing group, a nitrogen-containing group, a boron-containing group, a sulfur-containing group, a phosphorus-containing group, a heterocyclic compound residue, a silicon-containing group, a germanium-containing group, or a tin-containing group; and two or more thereof may be joined together to form one or more rings. Of these, $R^{12}$ and $R^{13}$ respectively are preferably a hydrocarbon group, more preferably an o-alkyl-substituted aryl group.

The halogen atom and the hydrocarbon group represented by $R^7$–$R^{13}$ in Formula (IVc') include the same as those shown for $R^1$–$R^7$ in the aforementioned General Formula (I).

The hydrocarbon groups may be substituted by an oxygen-containing group, a nitrogen-containing group, a boron-containing group, a sulfur-containing group, a phosphorus-containing group, a silicon-containing group, a germanium-containing group, a tin-containing group, or the like. In this substitution, preferably, the characteristic atomic group of the substituent like the oxygen-containing group is preferably not bonded directly to the N atom in Formula (IVc')

As the groups $R^7$–$R^{13}$ in Formula (IVc'), the oxygen-containing group, the nitrogen-containing group, the boron-containing group, the sulfur-containing group, the phosphorus-containing group, the heterocyclic compound residue, the silicon-containing group, the germanium-containing group, and the tin-containing group include the same as those shown for $R^1$–$R^7$ in the aforementioned Formula (I).

Specific examples of $R^7$–$R^{13}$ in Formula (IVc') include the same as those shown for $R^1$–$R^7$ in the aforementioned Formula (I).

The symbol n in Formula (IVc') represents an integer satisfying the valence of M; specifically an integer of 1–5, preferably 1–4, more preferably 1–3.

When the number is 1, X is an oxygen atom; when the number n is 2 or more, at least one X is an oxygen atom, and other X represents a hydrogen atom, a halogen atom, an oxygen atom, a hydrocarbon group, an oxygen-containing group, a sulfur containing group, a nitrogen-containing group, a boron-containing group, a phosphorus-containing group, a halogen-containing group, a heterocyclic compound residue, an aluminum-containing group, a silicon-containing group, a germanium-containing group, or a tin-containing group.

In Formula (IVc'), the halogen atom, the hydrocarbon group, the oxygen-containing group, the sulfur containing group, the nitrogen-containing group, the boron-containing group, the aluminum-containing group, the phosphorus-containing group, the halogen-containing group, the heterocyclic compound residue, the silicon-containing group, the germanium-containing group, and the tin-containing group represented by X include the same as the atoms and groups exemplified for $X^1$ in the aforementioned Formula (I).

When the number n is 2 or more, the plural groups represented by X may be the same or different, and may be joined together to form one or more rings.

Compound (a-5)

The component (A) of the present invention includes also the compounds (a-5) represented by General Formula (V) below:

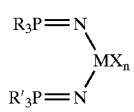
(V)

In Formula (V), M represents a transition metal atom selected from Groups 3–6 of Periodic Table, preferably a transition metal atom of Group 4, specifically including titanium, zirconium, and hafnium.

In Formula (V), the symbols R and R' represent the same or different moieties: respectively a hydrogen atom, a hydrocarbon group of 1–50 carbon atoms, a halogenated hydrocarbon or organosilyl group of 1–50 carbon atoms, or substituent having at least one atom selected from nitrogen, oxygen, phosphorus, sulfur, or silicon. Of these groups, hydrocarbon groups are preferred.

The hydrocarbon groups of 1–50 carbon atoms and halogenated hydrocarbon groups of 1–50 carbon atoms represented by R and R' in Formula (V) include the hydrocarbon groups and halogenated hydrocarbon groups mentioned for $R^1$–$R^7$ in the aforementioned General Formula (I). The organic silyl groups represented by R and R' include the silicon-containing groups mentioned for $R^1$–$R^7$ in the aforementioned General Formula (I). The substituent shaving at least one atom selected from nitrogen, oxygen, phosphorus, sulfur, or silicon represented by R and R' include the nitrogen-containing groups, oxygen-containing groups, sulfur-containing groups, and heterocyclic compound residues containing nitrogen, oxygen, phosphorus, sulfur or silicon mentioned for $R^1$–$R^7$ in the aforementioned General Formula (I).

The symbol n in Formula (V) represents a number satisfying the valence of M; specifically an integer of 1–5, preferably 1–4, more preferably 1–3.

The symbol X in Formula (V) represents a hydrogen atom, halogen atoms, an oxygen atom, a hydrocarbon group of 1–20 carbon atoms, a halogenated hydrocarbon groups of 1–20 carbon atoms, an oxygen-containing groups, sulfur-continuing groups, a silicon containig group or a nitrogen-containing group. The plural X moieties may be the same or different, and may be joined together to form one or more rings.

The halogen atoms, the hydrocarbon groups of 1–20 carbon atoms, the halogenated hydrocarbon groups of 1–20 carbon atoms, the oxygen-containing groups, the sulfur-containing groups, the silicon-containig groups and the nitrogen-containing groups represented by X in Formula (V) include the halogen atoms, hydrocarbon group, halogenated hydrocarbon groups, oxygen-containing groups, sulfur-containing groups, silicon-containig groups, and nitrogen-containing groups mentioned for $R^1$–$R^7$ in the aforementioned General Formula (I).

Specific examples of the compounds represented by General Formula (V) are shown below.

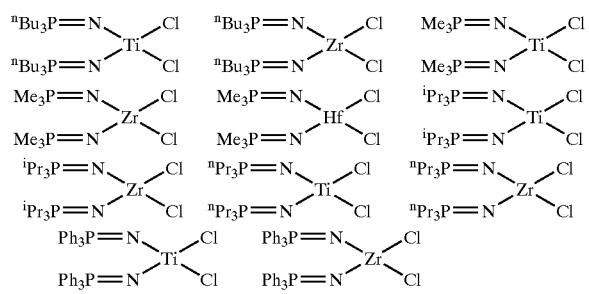

In the above examples, the symbols used are as follows: $^n$Bu for n-butyl, Me for methyl, $^i$Pr for isopropyl, and Ph for phenyl.

Compound (a-6)

The component (A) of the present invention includes also the compounds (a-6) represented by General Formula (VI) below:

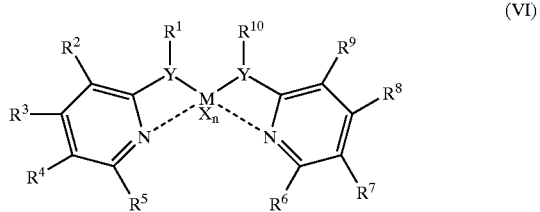
(VI)

In Formula (VI), the symbol M represents a transition metal atom selected from Groups 4 and 5 of Periodic Table, specifically including titanium, zirconium, hafnium, vanadium, niobium, and tantalum.

In Formula (VI), the symbols $R^1$–$R^{10}$ represent the same or different moieties: respectively a hydrogen atom, a hydrocarbon group of 1–50 carbon atoms, a halogenated hydrocarbon or organosilyl group of 1–50 carbon atoms, and a hydrocarbon group having a substitutent having at least one atom selected from nitrogen, oxygen, phosphorus, sulfur, and silicon. Of these groups, a hydrogen atom and hydrocarbon groups are preferred. The groups represented by $R^1$–$R^{10}$ may be joined together to form one or more rings.

The hydrocarbon groups of 1–50 carbon atoms and halogenated hydrocarbon groups of 1–50 carbon atoms represented by $R^1$–$R^{10}$ in Formula (VI) include the hydrocarbon groups and halogenated hydrocarbon groups mentioned for $R^1$–$R^7$ in the aforementioned General Formula (I). The organic silyl groups represented by $R^1$–$R^{10}$ include the silicon-containing groups mentioned for $R^1$–$R^7$ in the aforementioned General Formula (I). The hydrocarbon group having a substitutuent having at least one atom of nitrogen, oxygen, phosphorus, sulfur, or silicon represented by $R^1$–$R^{10}$ include the nitrogen-containing groups, oxygen-containing groups, sulfur-containing groups, and heterocyclic compound residues containing nitrogen, oxygen, phosphorus, sulfur, or silicon mentioned for $R^1$–$R^7$ in the aforementioned General Formula (I).

The symbol n in Formula (VI) represents a number satisfying the valence of M; specifically an integer of 1–5, preferably 1–4, more preferably 1–3.

The symbol X in Formula (VI) represents a hydrogen atom, a halogen atoms, an oxygen atom, a hydrocarbon group of 1–20 carbon atoms, a halogenated hydrocarbon group of 1–20 carbon atoms, an oxygen-containing group, a sulfur-containing group, a silicon-containig group, or a nitrogen-containing group; preferably a halogen atom. when n is 2 or more, the plural X groups maybe the same or different, and may be joined together to form one or more rings.

The halogen atoms, the hydrocarbon groups of 1–20 carbon atoms, the halogenated hydrocarbon groups of 1–20 carbon atoms, the oxygen-containing groups, the sulfur-containing groups, the silicon containing groups or the nitrogen-containing groups represented by X in Formula (VI) include the halogen atoms, the hydrocarbon group, the halogenated hydrocarbon groups, the oxygen-containing groups, the sulfur-containing groups, the silicon containig groups or the nitrogen-containing groups which are mentioned for $R^1$–$R^7$ in the aforementioned General Formula (I).

The symbol Y in Formula (VI) represents an atom selected from Groups 15 and 16 of Periodic Table, specifically including atoms of nitrogen, phosphorus, arsenic, antimony, oxygen, sulfur and selenium; preferably a nitrogen atom and an oxygen atom.

Specific examples of the compounds represented by General Formula (VI) are shown below.

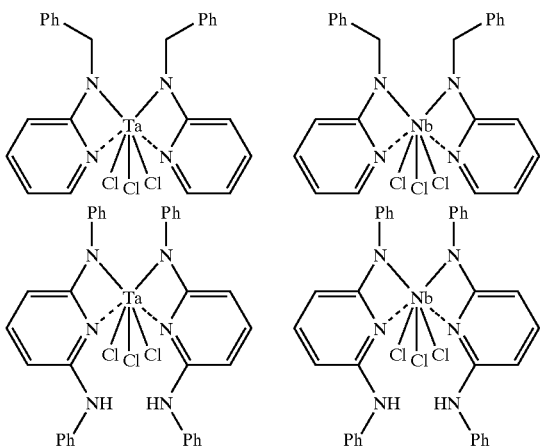

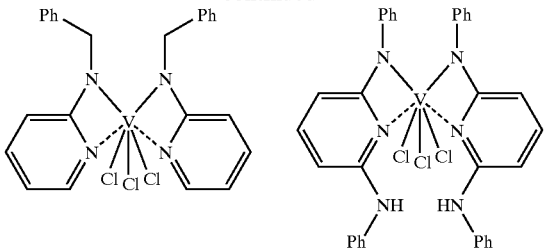

In the above examples, the symbol Ph represents phenyl. Compound (a-7)

The component (A) of the present invention includes also the compounds (a-7) represented by General Formulas (VII) or (VIII) below:

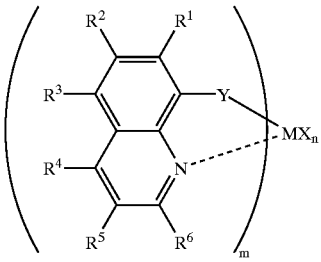

(VII)

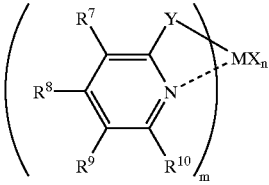

(VIII)

In Formulas (VII) and (VIII), M represents a transition metal atom selected from Groups 4 and 5 of Periodic Table, specifically including titanium, zirconium, hafnium, vanadium, niobium, and tantalum.

The symbols $R^1$–$R^{10}$ in Formula (VII) and $R^7$–$R^{10}$ in Formula (VIII) represent the same or different moieties: respectively a hydrogen atom, hydrocarbon groups of 1–50 carbon atoms, halogenated hydrocarbon or organosilyl groups of 1–50 carbon atoms, or a hydrocarbon group having a substituent having at least one atom of nitrogen, oxygen, phosphorus, sulfur, and silicon. Of these groups, a hydrogen atom and hydrocarbon groups are preferred. The two or more groups represented by $R^1$–$R^6$ in Formula (VII) or $R^7$–$R^{10}$ in Formula (VIII) may be joined together to form one or more rings.

The hydrocarbon groups of 1–50 carbon atoms and halogenated hydrocarbon groups of 1–50 carbon atoms represented by $R^1$–$R^6$ in Formula (VII) and $R^7$–$R^{10}$ in Formula (VIII) include the hydrocarbon groups and halogenated hydrocarbon groups mentioned for $R^1$–$R^7$ in the aforementioned General Formula (I). The organic silyl groups represented by $R^1$–$R^6$ in Formula (VII) and $R^7$–$R^{10}$ in Formula (VIII) include the silicon-containing groups mentioned for $R^1$–$R^7$ in the aforementioned General Formula (I). The hydrocarbon groups having a substituent having at least one atom selected from nitrogen, oxygen, phosphorus, sulfur, or silicon represented by $R^1$–$R^6$ in Formula (VII) and $R^7$–$R^{10}$ in Formula (VIII) include the hydrocarbon groups having the nitrogen-containing group, oxygen-containing group, sulfur-containing group, or heterocyclic compound residue containing nitrogen, oxygen, phosphorus, sulfur or silicon which are mentioned for $R^1$–$R^7$ in the aforementioned General Formula (I).

The symbol m in Formulas (VII) and (VIII) represents an integer of 1–6, preferably 1–4, more preferably 1–2.

The symbol n in Formulas (VII) and (VIII) represents an integer satisfying the valence of M; specifically an integer of 1–5, preferably 1–4, more preferably 1–3.

The symbol X in Formulas (VII) and (VIII) represents a hydrogen atom, a halogen atom, an oxygen atom, a hydrocarbon group of 1–20 carbon atoms, a halogenated hydrocarbon group of 1–20 carbon atoms, an oxygen-containing group, a sulfur-containing group, a silicon containing group, or a nitrogen-containing group, preferably a halogen atom. When n is 2 or more, the plural X groups may be the same or different.

The halogen atoms, the hydrocarbon groups of 1–20 carbon atoms, the halogenated hydrocarbon groups of 1–20 carbon atoms, the oxygen-containing groups, the sulfur-containing groups, the silicon-containing groups or the nitrogen-containing groups represented by X in Formulas (VII) and (VIII) include the halogen atoms, hydrocarbon groups, halogenated hydrocarbon groups, oxygen-containing groups, sulfur-containing groups, silicon containing groups, and nitrogen-containing groups mentioned for $R^1$–$R^7$ in the aforementioned General Formula (I).

The symbol Y in Formulas (VII) and (VIII) represents an atom selected from Groups 15 and 16 of Periodic Table, preferably the atoms of Group 15, specifically including atoms of nitrogen, phosphorus, arsenic, antimony, oxygen, sulfur and selenium; preferably an oxygen atom.

Specific examples of the compounds represented by General Formulas (VII) and (VIII) are shown below.

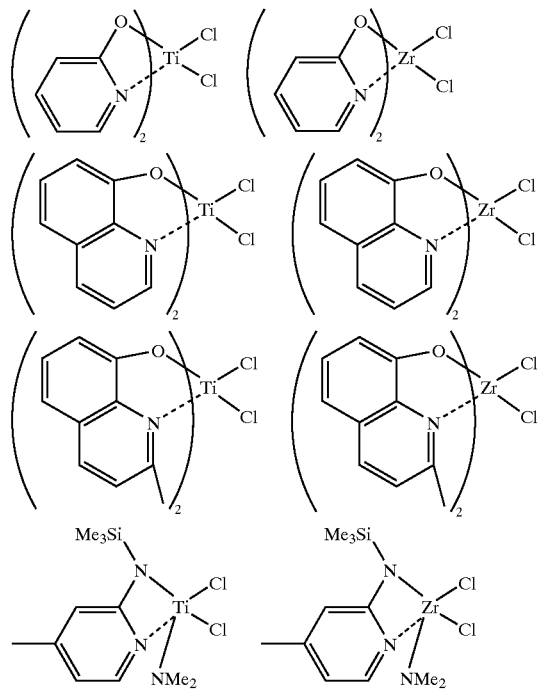

In the above examples, the symbol Me represents methyl.
Compound (a-8)

The component (A) of the present invention includes also the compounds (a-8) represented by General Formula (IX) below:

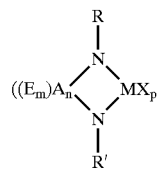

In Formula (IX), M represents a transition metal atom selected from Groups 3–6 of Periodic Table, preferably a transition metal atom of Group 4, specifically including scandium, yttrium, titanium, zirconium, hafnium, vanadium, niobium, tantalum, chromium, molybdenum, and tungsten, preferably titanium, zirconium, and hafnium.

In Formula (IX), the symbols R and R' represent the same or different moieties: respectively a hydrogen atom, a hydrocarbon group of 1–50 carbon atoms, a halogenated hydrocarbon group or organic silyl group of 1–50 carbon atoms, or substituents having at least one atom of nitrogen, oxygen, phosphorus, sulfur, or silicon. Of these groups, hydrocarbon groups are preferred. The hydrocaron groups is preferably an alkyl-substituted aryl group.

The hydrocarbon groups of 1–50 carbon atoms and halogenated hydrocarbon groups of 1–50 carbon atoms represented by R and R' in Formula (IX) include the hydrocarbon groups and halogenated hydrocarbon groups mentioned for $R^1$–$R^7$ in the aforementioned General Formula (I). The organic silyl groups represented by R and R' include the silicon-containing groups mentioned for $R^1$–$R^7$ in the aforementioned General Formula (I). The substituents having at least one atom selected from nitrogen, oxygen, phosphorus, sulfur, and silicon represented by R and R' include the nitrogen-containing groups, oxygen-containing groups, sulfur-containing groups, and heterocyclic compound residues containing nitrogen, oxygen, phosphorus, sulfur or silicon mentioned for $R^1$–$R^7$ in the aforementioned General Formula (I).

The symbol m in Formula (IX) represents an integer of 0–2, preferably 2.

The symbol n in Formula (IX) represents an integer of 1–5, preferably 1–3.

The symbol A in Formula (IX) represents an atom selected from Groups 13–16 of Periodic Table, preferably Group 14 of Periodic Table, including atoms of boron, carbon, nitrogen, oxygen, silicon, phophorus, sulfur, germanium, selenium, and tin; preferably carbon and silicon. When the integer n is 2 or more, the plural A atoms may be the same or different.

The symbol E in Formula (IX) represents a substituent having at least one atom selected from carbon, hydrogen, oxygen, halogen, nitrogen, sulfur, phosphorus, boron, and silicon; preferably hydrogen or carbon. Plural E substituents may be the same or different. Two or more of the E substituents may be joined together to form one or more rings.

The substituent E having at least one atom selected from carbon, hydrogen, oxygen, halogen, nitrogen, sulfur, phosphorus, boron, and silicon in Formula (IX) includes the halogen atoms, hydrocarbon groups, oxygen-containing groups, nitrogen-containing groups, boron-containing groups, sulfur-containing groups, phosphorus-containing groups, heterocyclic compound residues, and silicon-containing groups mentioned for $R^1$–$R^7$ in the aforementioned General Formula (I).

The symbol p in Formula (IX) represents an integer of 0–4, preferably an integer of 2.

The symbol X in Formula (IX) represents a hydrogen atom, a halogen atom, an oxygen atom, a hydrocarbon group of 1–20 carbon atoms, a halogenated hydrocarbon group of 1–20 carbon atoms, an oxygen-containing group, a sulfur-containing group, a silicon-containing group, or a nitrogen-containing group. When p is 2 or more, the plural X groups may be the same or different.

The halogen atoms, the hydrocarbon groups of 1–20 carbon atoms, the halogenated hydrocarbon groups of 1–20 carbon atoms, the oxygen-containing groups, the sulfur-containing groups, the silicon-containing groups, and the nitrogen-containing groups represented by X in Formula (IX) include the halogen atoms, hydrocarbon groups, halogenated hydrocarbon groups, oxygen-containing groups, sulfur-containing groups, silicon containing groups, and nitrogen-containing groups mentioned for $R^1$–$R^7$ in the aforementioned General Formula (I).

Specific examples of the compounds represented by General Formula (IX) are shown below.

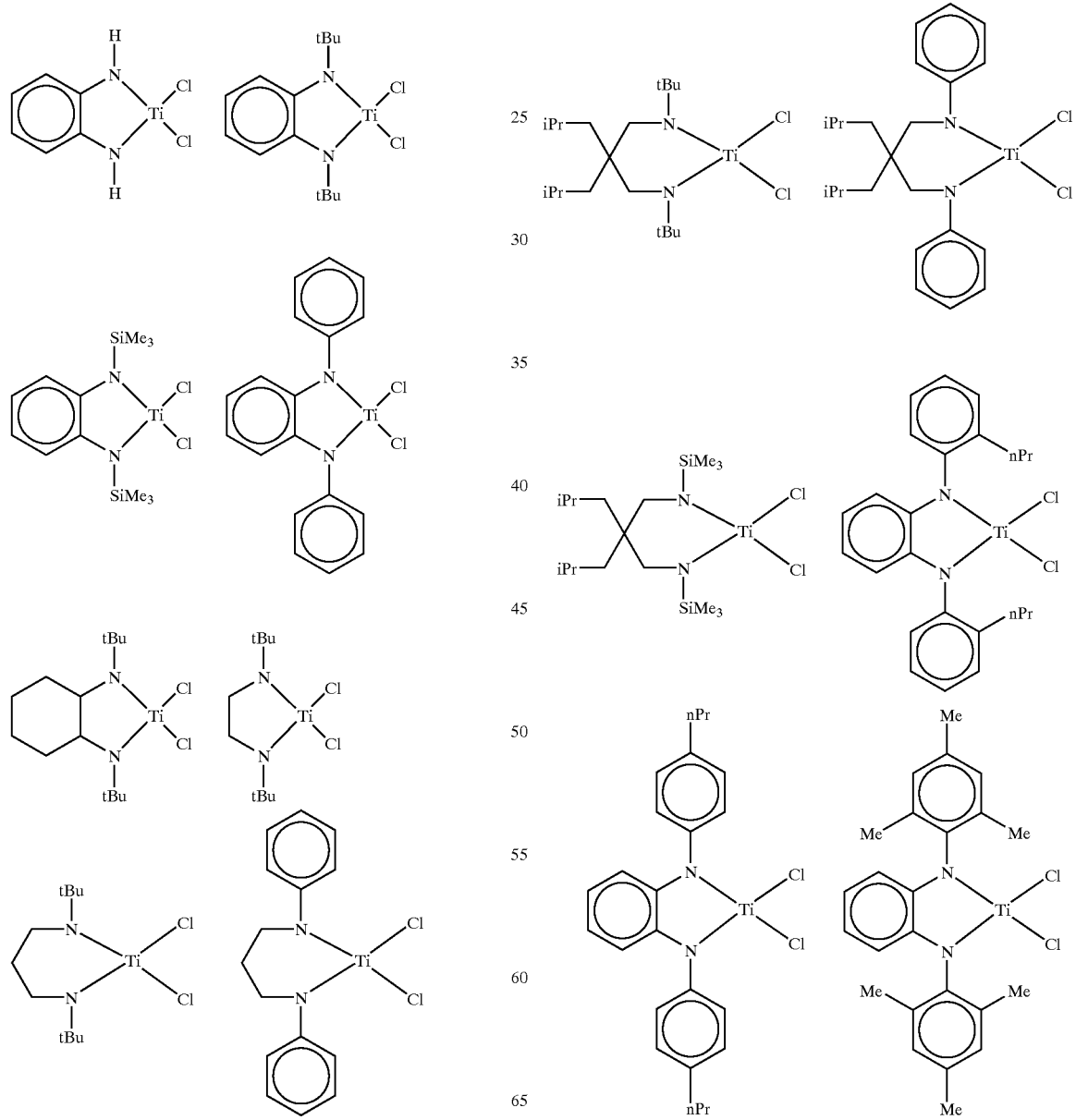

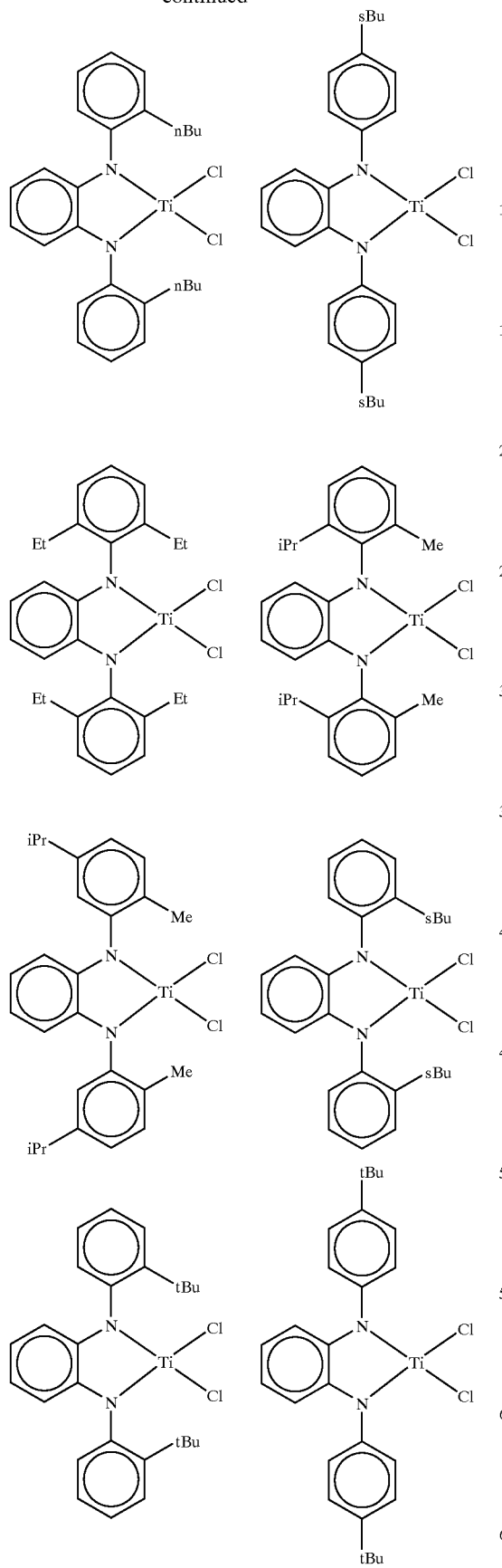
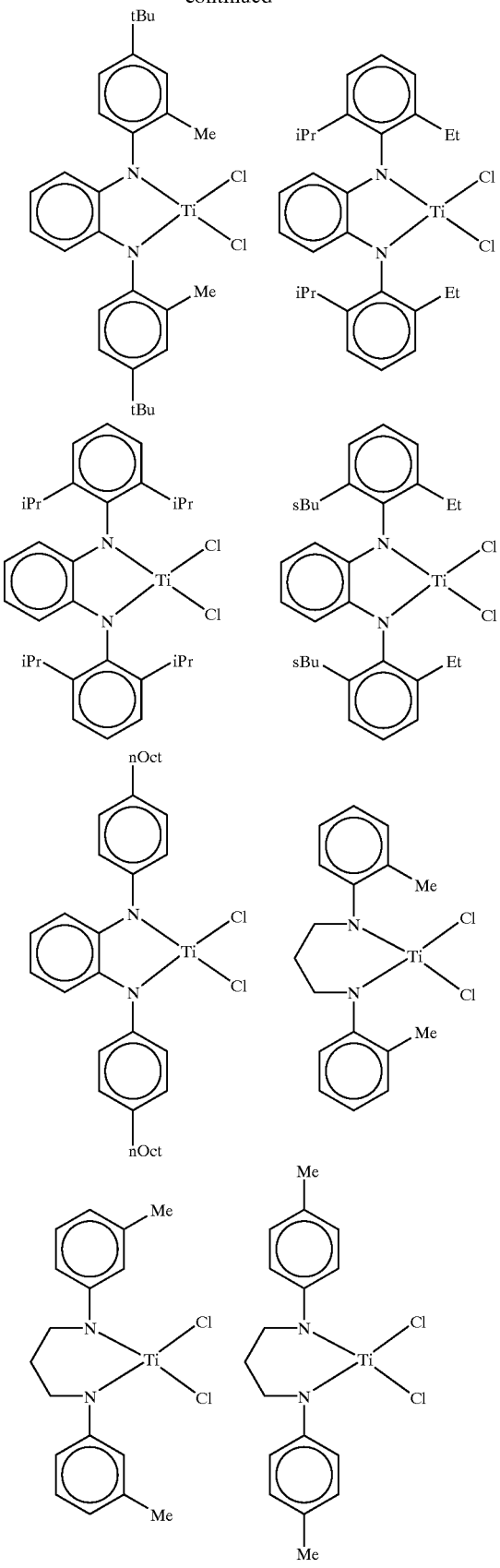

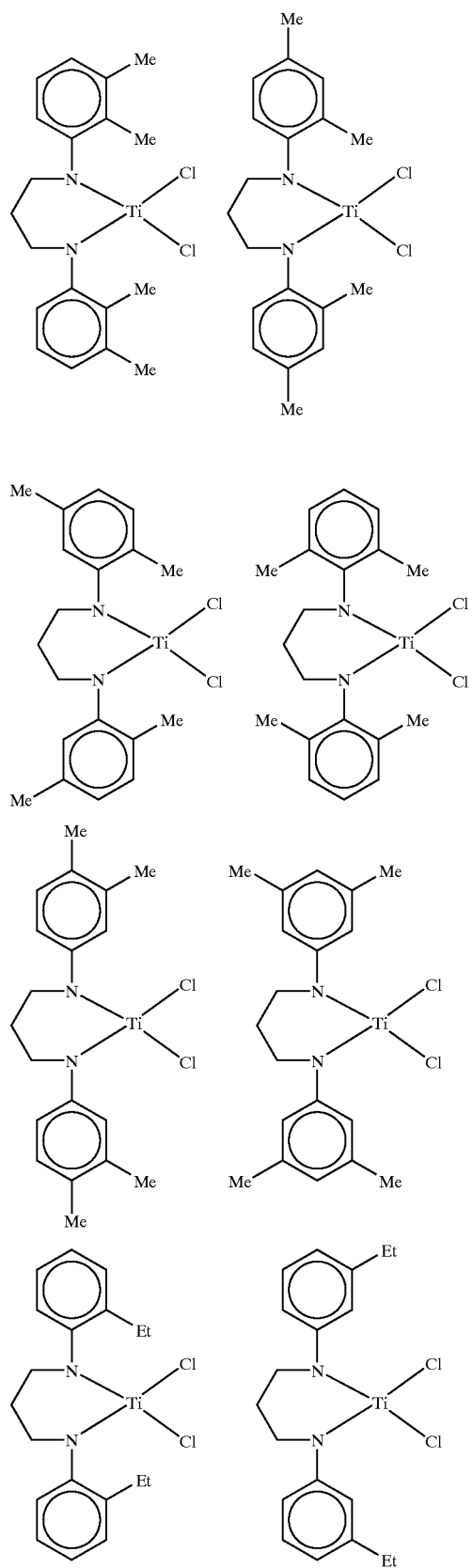
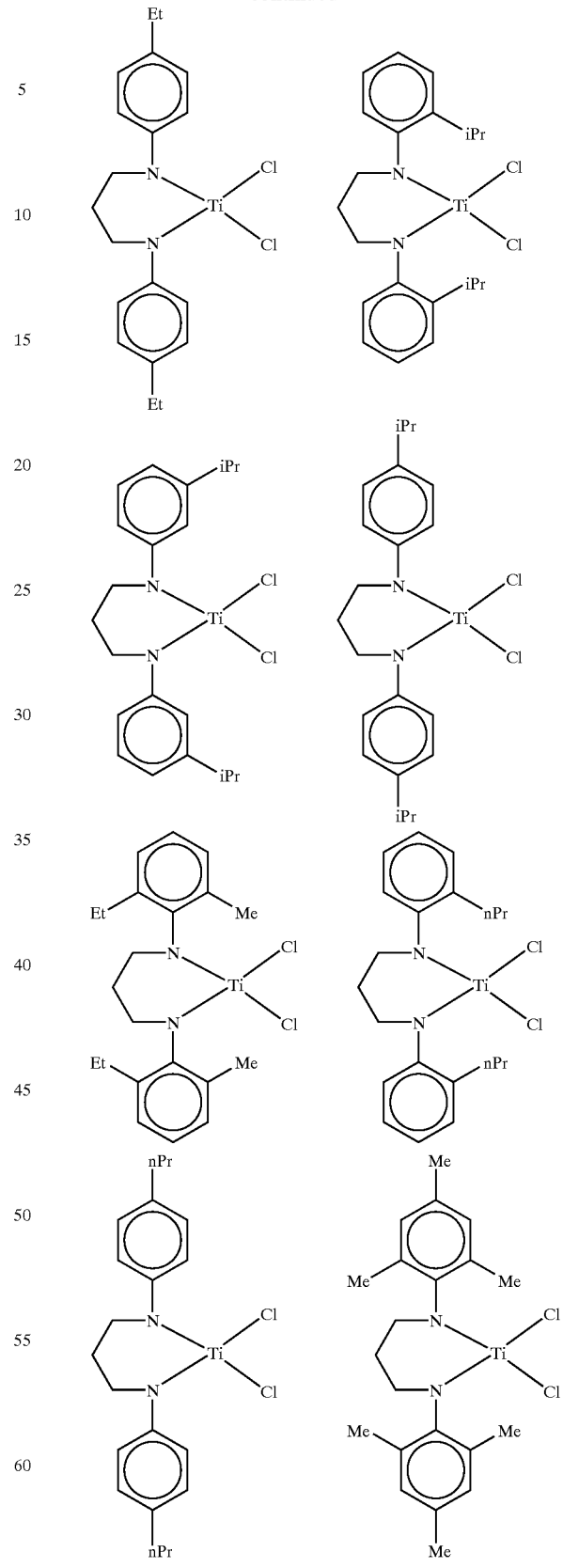

-continued
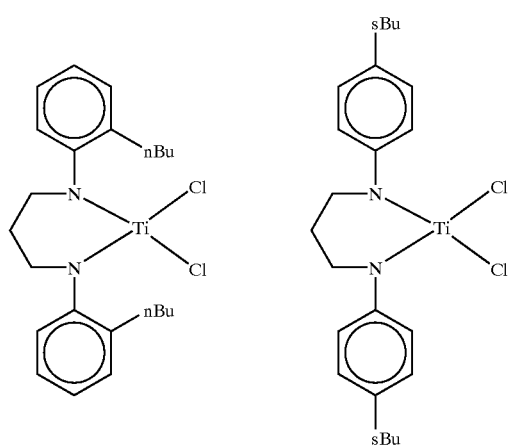
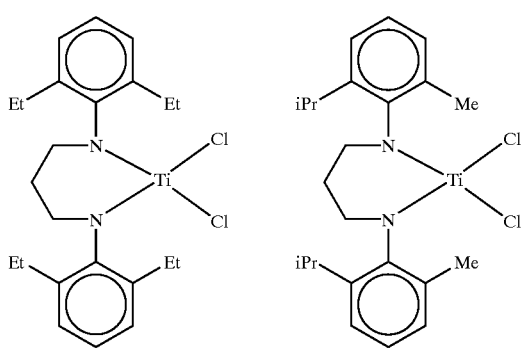
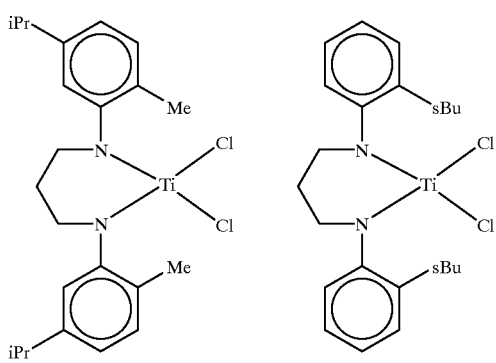
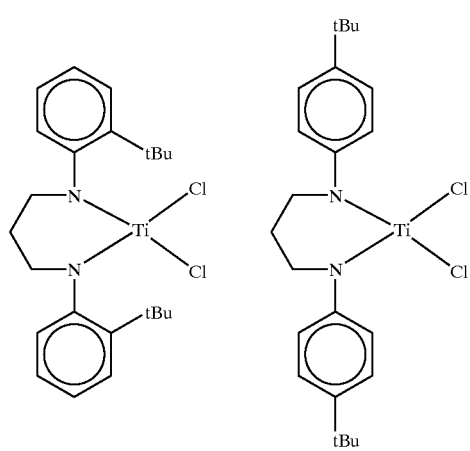
-continued
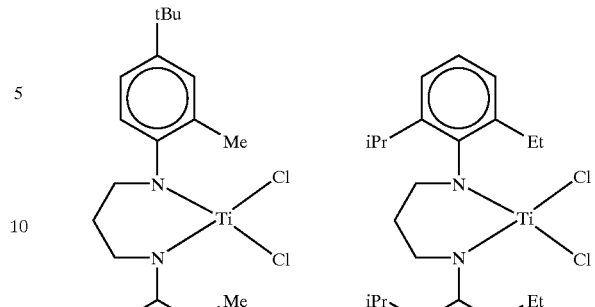
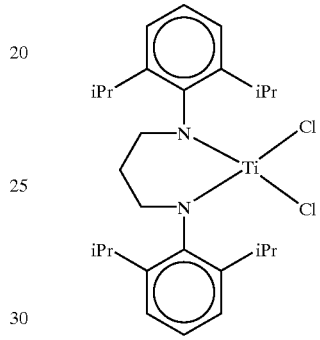
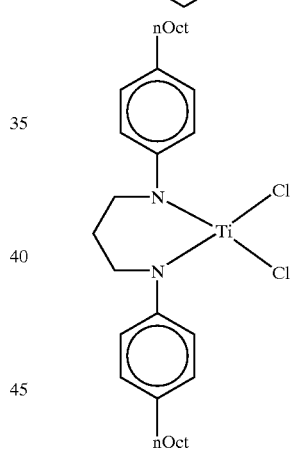
Compound (a-9)
The component (A) of the present invention includes also the compounds (a-9) represented by General Formula (X) below:
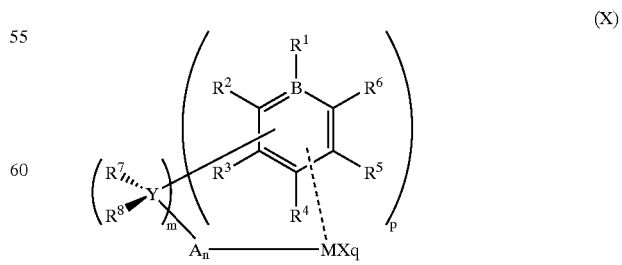

The symbol M in Formula (X) represents a transition metal atom selected from Groups 3–11 of Periodic Table, preferably a transition metal atom selected from Groups 3–6, more preferably a transition metal atom of Group 4 of Periodic Table; specifically including scandium, yttrium, titanium, zirconium, hafnium, vanadium, niobium, tantalum, chromium, molybdenum, and tungsten, preferably titanium, zirconium, and hafnium.

The symbol A in Formula (X) represents an atom selected from Groups 14–16 of Periodic Table, preferably from Groups 15 and 16 thereof; specifically including $NR^9$, $PR^{10}$, O, and S.

The symbol m in Formula (X) represents an integer or 0–3, the symbol n, an integer of 0 or 1; the symbol p, an integer of 1–3; and the symbol q, a number satisfying the valence of M. When m is 0, preferably n is 0, and p is 2.

The groups $R^1$–$R^{10}$ in Formula (X), may be the same or different, and represent a hydrogen atom, a halogen atom, a hydrocarbon group of 1–20 carbon atoms, a halogenated hydrocarbon group of 1–20 carbon atoms, an oxygen-containing group, a sulfur-containing group, a silicon-containing group, or a nitrogen-containing group. Two or more thereof may be joined to form one or more rings.

The halogen atom, the hydrocarbon group of 1–20 carbon atoms, the halogenated hydrocarbon group of 1–20 carbon atoms, the oxygen-containing group, the sulfur-containing group, the silicon-containing group, or the nitrogen-containing group represented by $R^1$–$R^{10}$ in Formula (X) include the halogen atoms, hydrocarbon groups, halogenated hydrocarbon groups, oxygen-containing groups, sulfur-containing groups, silicon-containing groups, and nitrogen-containing groups mentioned for $R^1$–$R^7$ in the aforementioned General Formula (I).

The symbol X represents a hydrogen atom, a halogen atom, an oxygen atom, a hydrocarbon group of 1–20 carbon atoms, a halogenated hydrocarbon group of 1–20 carbon atoms, an oxygen-containing group, a sulfur-containing group, a silicon-containing group, or a nitrogen-containing group. When q is 2 or more, the plural X groups may be the same or different.

The halogen atoms, the hydrocarbon groups of 1–20 carbon atoms, the halogenated hydrocarbon groups of 1–20 carbon atoms, the oxygen-containing groups, the sulfur-containing groups, the silicon containing groups, and the nitrogen-containing groups represented by X include the halogen atoms, hydrocarbon groups, halogenated hydrocarbon groups, oxygen-containing groups, sulfur-containing groups, silicon containing groups, and nitrogen-containing groups mentioned for $R^1$–$R^7$ in the aforementioned General Formula (I).

The symbol m in Formula (X) represents a numeral of 1–3, Y represents a group forming a bridge between A and the boratabenzene ring, including carbon, silicon, and germanium.

Specific examples of the compounds represented by General Formula (X) are shown below.

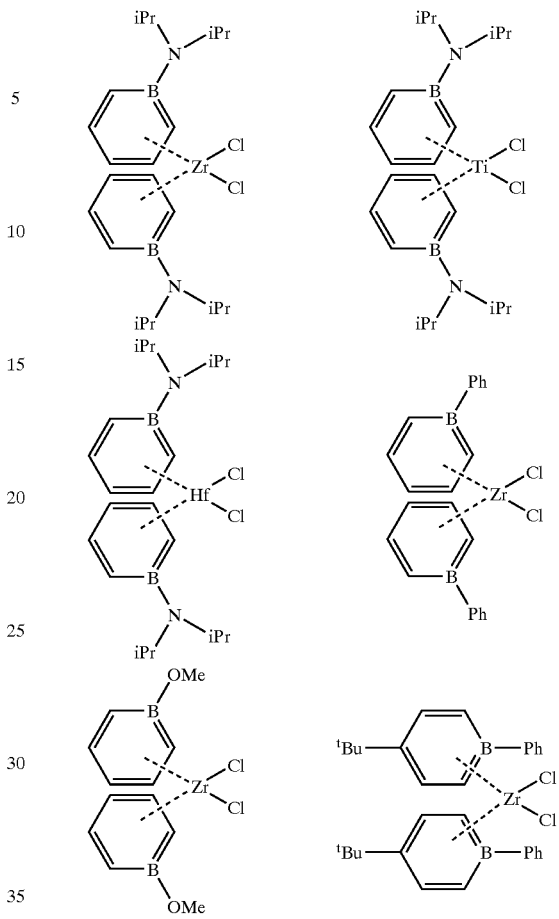

In the above Formulas of the exemplified compounds, iPr represents isopropyl, $^t$Bu represents t-butyl, and Ph represents phenyl.

Compound (a-10)

The component (A) of the present invention includes also the compounds (a-10) represented by General Formula (XIa) below:

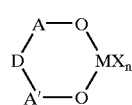

(XIa)

The symbol M in Formula (XIa) represents a transition metal atom selected from Groups 3–11 of Periodic Table, preferably a transition metal atom selected from Groups 3–6, more preferably a transition metal atom of Groups 4–5, still more preferably of Group 4 of Periodic Table; specifically including scandium, yttrium, titanium, zirconium, hafnium, vanadium, niobium, tantalum, chromium, molybdenum, and tungsten, preferably titanium, zirconium, and hafnium.

The symbols A and A' in Formula (XIa) represent the same or different moieties: respectively a hydrocarbon group of 1–50 carbon atoms; a halogenated hydrocarbon group of 1–50 carbon atoms; a hydrocarbon group having an oxygen-containing group, a sulfur-containing group, or a silicon-containing group; a halogenated hydrocarbon group having an oxygen-containing group, a sulfur-containing group, or a silicon-containing group, preferably a hydrocarbon group, more preferably an alkyl-substituted aryl group.

The hydrocarbon group of 1–50 carbon atoms and a halogenated hydrocarbon groups of 1–50 carbon atoms represented by A and A' in Formula (XIa) include the hydrocarbon groups and halogenated hydrocarbon groups mentioned for $R^1$–$R^7$ in the aforementioned General Formula (I). The hydrocarbon group having an oxygen-containing group, a sulfur-containing group, or a silicon-containing group represented by A and A' includes the hydrocarbon groups having an oxygen-substituted group, sulfur-containing group, or silicon-containing group mentioned for $R^1$–$R^7$ in the aforementioned General Formula (I). The halogenated hydrocarbon group having an oxygen-containing group, a sulfur-containing group, or a silicon-containing group represented by A and A' includes the halogenated hydrocarbon groups having an oxygen-substituted group, a sulfur-containing group, or a silicon-containing group mentioned for $R^1$–$R^7$ in the aforementioned General Formula (I).

In Formula (XIa), the group D may be present or absent. When D is present, D represents a group forming a bridge between A and A', whereas when D is absent, A and A' is bonded through —O—M—O— only.

The group D in Formula (IXa) includes specifically a single bond, hydrocarbon groups of 1–20 carbon atoms, halogenated hydrocarbon groups of 1–20 carbon atoms, an oxygen atom, a sulfur atom, or groups represented by $R^1R^2Z$, where $R^1$ and $R^2$ may be the same or different, representing respectively a hydrocarbon group of 1–20 carbon atoms, or a hydrocarbon group containing at least one heteroatom of 1–20 carbon atoms, and may be joined together to form a ring, and Z represents a carbon atom, a nitrogen atom, a sulfur atom, a phosphorus atom, or a silicon atom.

The symbol n in Formula (XIa) represents an integer satisfying the valence of M, specifically an integer of 1–5, preferably 1–4, more preferably 1–3.

The symbol X in Formula (XIa) represents a hydrogen atom, a halogen atom, a hydrocarbon group of 1–20 carbon atoms, a halogenated hydrocarbon group of 1–20 carbon atoms, an oxygen-containing group, a sulfur-containing group, a silicon-containing group, or a nitrogen-containing group. When n is 2 or more, the plural X groups may be the same or different, and may be joined together to form one or more rings.

The halogen atoms, the hydrocarbon groups of 1–20 carbon atoms, the halogenated hydrocarbon groups of 1–20 carbon atoms, the oxygen-containing groups, the sulfur-containing groups, the silicon containig groups, and the nitrogen-containing groups represented by X in Formula (XIa) include the halogen atoms, hydrocarbon groups, halogenated hydrocarbon groups, oxygen-containing groups, sulfur-containing groups, silicon containing groups, and nitrogen-containing groups mentioned for $R^1$–$R^7$ in the aforementioned General Formula (I).

Specific examples of the compounds represented by General Formula (XIa) are shown below.

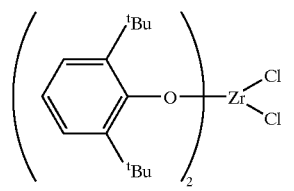
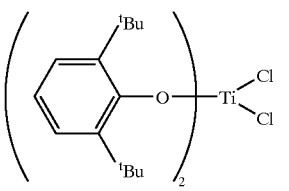

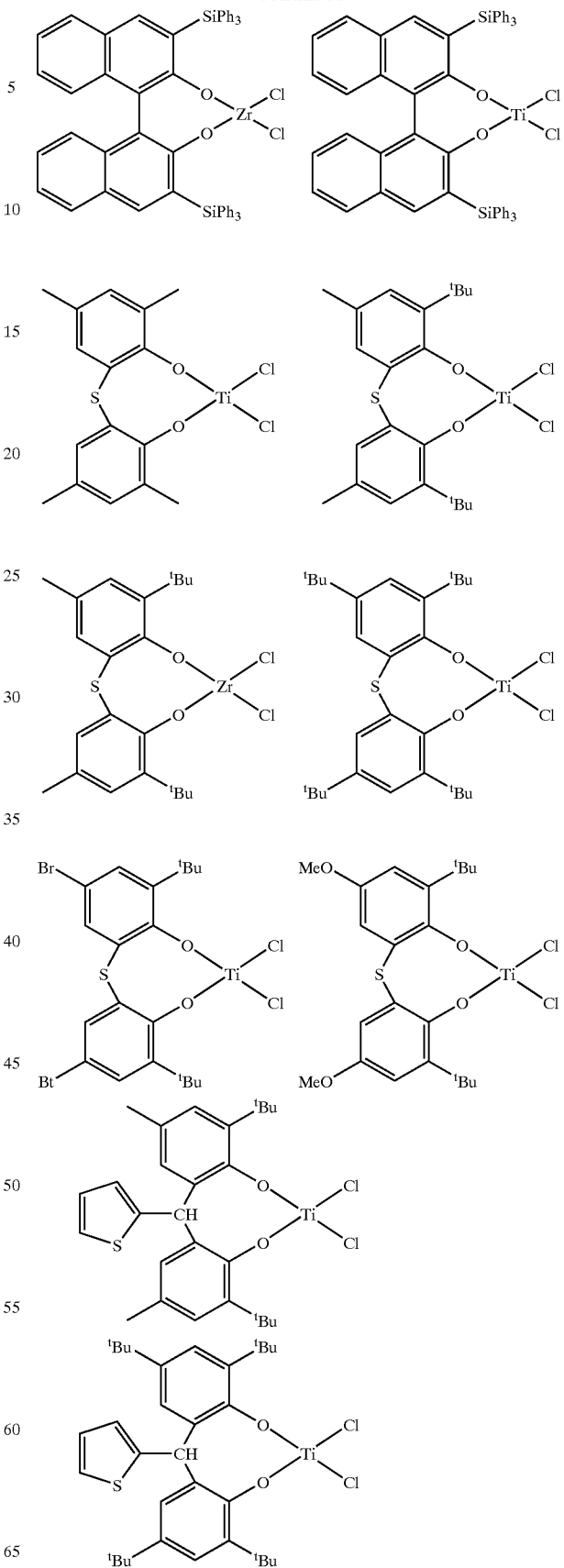

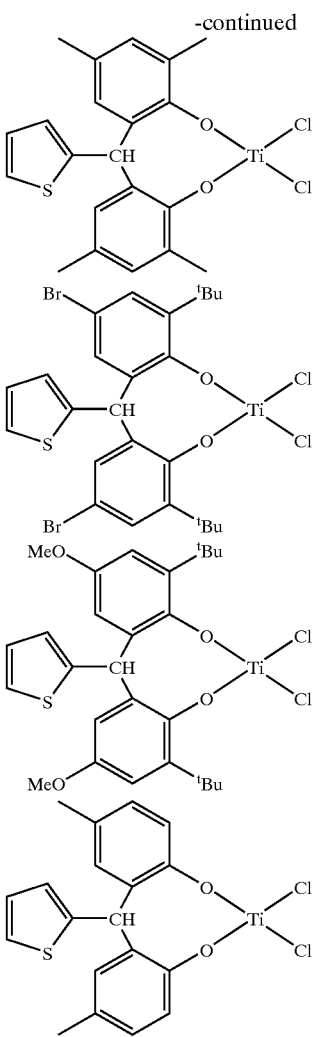

In the above exemplified formulas, ᵗBu represents t-butyl, and Me represents methyl.

Compound (a-11)

The component (A) of the present invention includes also the compounds (a-11) represented by General Formula (XIb) below:

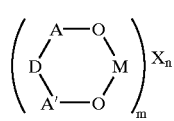

(XIb)

The symbol M in Formula (XIb) represents a transition metal atom selected from Groups 3–11 of Periodic Table, preferably a transition metal atom selected from Groups 3–6, more preferably a transition metal atom of Groups 4–5, still more preferably of Group 4 of Periodic Table; specifically including scandium, yttrium, titanium, zirconium, hafnium, vanadium, niobium, tantalum, chromium, molybdenum, and tungsten, preferably titanium, zirconium, and hafnium.

The symbol m in Formula (XIb) represents an integer of 1–6, preferably 1–4, more preferably 1–3, still more preferably 1–2.

The symbols A and A' in Formula (XIb) may be the same or different, and represent respectively a hydrocarbon group of 1–50 carbon atoms; a halogenated hydrocarbon groups of 1–50 carbon atoms; a hydrocarbon group having an oxygen-containing group, sulfur-containing group, or silicon-containing group; a halogenated hydrocarbon group having an oxygen-containing group, sulfur-containing group, or silicon-containing group, preferably a hydrocarbon group, more preferably an alkyl-substituted aryl group.

The hydrocarbon group of 1–50 carbon atoms and a halogenated hydrocarbon groups of 1–50 carbon atoms represented by A and A' in Formula (XIa) include the hydrocarbon groups and halogenated hydrocarbon groups mentioned for $R^1$–$R^7$ in the aforementioned General Formula (I). The hydrocarbon group having an oxygen-containing group, sulfur-containing group, or silicon-containing group represented by A and A' includes the hydrocarbon groups having an oxygen-substituted group, sulfur-containing group, or silicon-containing group mentioned for $R^1$–$R^7$ in the aforementioned General Formula (I). The halogenated hydrocarbon group having an oxygen-containing group, sulfur-containing group, or silicon-containing group represented by A and A' includes the halogenated hydrocarbon groups having an oxygen-substituted group, sulfur-containing group, or silicon-containing group mentioned for $R^1$–$R^7$ in the aforementioned General Formula (I).

In Formula (XIb), the group D may be present or absent. When D is present, D represents a group forming a bridge between A and A', whereas when D is absent, A and A' is bonded through —O—M—O— only. The group D includes specifically a single bond, hydrocarbon groups of 1–20 carbon atoms, halogenated hydrocarbon groups of 1–20 carbon atoms, an oxygen atom, a sulfur atom, or groups represented by $R^1$ $R^2Z$, where $R^1$ and $R^2$ may be the same or different, representing respectively a hydrocarbon group of 1–20 carbon atoms, or a hydrocarbon group of 1–20 carbon atoms containing at least one heteroatom, and may be joined together to form a ring, and Z represents a carbon atom, a nitrogen atom, a sulfur atom, a phosphorus atom, or a silicon atom.

The symbol n in Formula (XIb) represents an integer satisfying the valence of M, specifically an integer of 1–5, preferably 1–4, more preferably 1–3.

The symbol X in Formula (XIb) represents an oxygen atom when n is 1. When n is 2 or more, at least one X represents an oxygen atom, and the rest of the X or Xs represent a hydrogen atom, a halogen atom, an oxygen atom, a hydrocarbon group of 1–20 carbon atoms, a halogenated hydrocarbon group of 1–20 carbon atoms, an oxygen-containing group, a sulfur-containing group, a silicon-containing group, or a nitrogen-containing group. The plural X groups may be the same or different, and may be joined together to form one or more rings.

The halogen atoms, the hydrocarbon groups of 1–20 carbon atoms, the halogenated hydrocarbon groups of 1–20 carbon atoms, the oxygen-containing groups, the sulfur-containing groups, the silicon containing groups, or the nitrogen-containing groups represented by X in Formula (XIb) include the halogen atoms, hydrocarbon groups, halogenated hydrocarbon groups, oxygen-containing groups, sulfur-containing groups, silicon containing groups, and nitrogen-containing groups mentioned for $R^1$–$R^7$ in the aforementioned General Formula (I).

Compound (a-12)

The component (A) of the present invention includes also the compounds (a-12) represented by General Formula (XII) below:

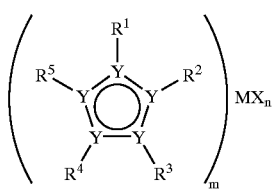

(XII)

The symbol M in Formula (XII) represents a transition metal atom selected from Groups 3–11 of Periodic Table, preferably a transition metal atom selected from Groups 3–6, more preferably a transition metal atom of Group 4 of Periodic Table; specifically including scandium, yttrium, titanium, zirconium, hafnium, vanadium, niobium, tantalum, chromium, molybdenum, and tungsten, preferably titanium, zirconium, and hafnium.

The symbols of Y may be the same or different, and represent respectively an atom of Group 13–15 of Periodic Table, specifically including carbon, silicon, germanium, nitrogen, phosphorus, oxygen, sulfur, and selenium, and at least one of Ys is other than a carbon atom.

The symbol m in Formula (XII) represents an integer of 1–6, preferably 1–4, more preferably 1–3.

In Formula (XII), the groups $R^1$–$R^5$ are present when the atom Y to be bonded is selected from Group 14 of Periodic Table, and may be the same or different, representing respectively a hydrogen atom, a halogen atom, a hydrocarbon group, a halogenated hydrocarbon group, an organic silyl group, or a hydrocarbon group substituted with a substituent containing at least one atom selected from nitrogen, oxygen, phosphorus, sulfur, and silicon. Two or more of the groups $R^1$–$R^5$ may be joined to form one or more rings.

The hydrocarbon groups and the halogenated hydrocarbon groups represented by $R^1$–$R^5$ in the Formula (XII) include the hydrocarbon groups and halogenated hydrocarbon groups mentioned for $R^1$–$R^7$ in the aforementioned General Formula (I). The organic silyl groups represented by $R^1$–$R^5$ include the silicon-containing groups mentioned for $R^1$–$R^7$ in the aforementioned General Formula (I). The substituent containing at least one atom selected from nitrogen, oxygen, phosphorus, sulfur, and silicon include the nitrogen-containing groups, oxygen-containing groups, sulfur-containing groups, and heterocyclic compound residues containing nitrogen, oxygen, phosphorus, sulfur, or silicon mentioned for $R^1$–$R^7$ in the aforementioned General Formula (I).

The symbol n in Formula (XII) represents a numeral satisfying the valence of M, specifically an integer of 1–5, preferably 1–4, more preferably 1–3.

The symbol X in Formula (XII) represents a hydrogen atom, a halogen atom, an oxygen atom, a hydrocarbon group of 1–20 carbon atoms, a halogenated hydrocarbon group of 1–20 carbon atoms, an oxygen-containing group, a sulfur-containing group, a silicon-containing group, or a nitrogen-containing group. The plural X groups, when n is 2 or more, may be the same or different, and may be joined together to form one or more rings.

The halogen atoms, the hydrocarbon groups of 1–20 carbon atoms, the halogenated hydrocarbon groups of 1–20 carbon atoms, the oxygen-containing groups, the sulfur-containing groups, the silicon containing groups, and the nitrogen-containing groups represented by X in Formula (XII) include the halogen atoms, hydrocarbon groups, halogenated hydrocarbon groups, oxygen-containing groups, sulfur-containing groups, silicon containing groups, and nitrogen-containing groups mentioned for $R^1$–$R^6$ in the aforementioned General Formula (I).

Specific examples of the compounds represented by General Formula (XII) are shown below.

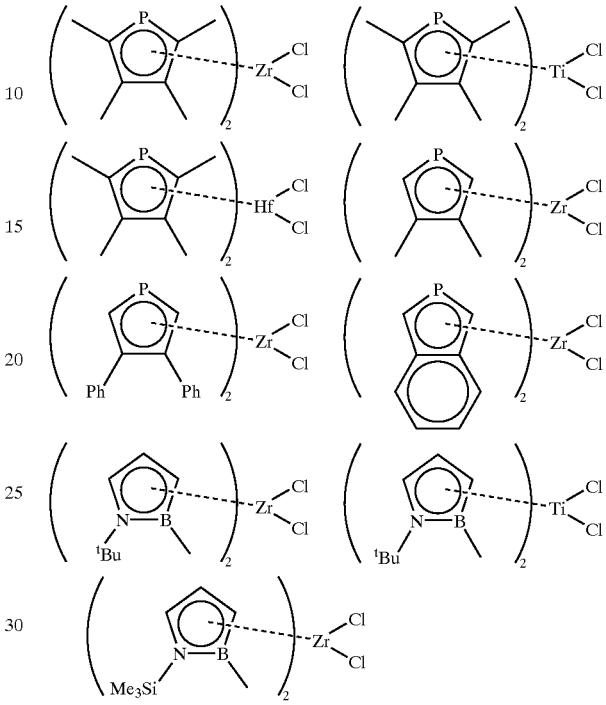

In the above exemplified formulas, $^tBu$ represents t-butyl, and Me represents methyl.

Compound (a-13)

The component (A) of the present invention includes also the compounds (a-13) represented by General Formula (XIII) below:

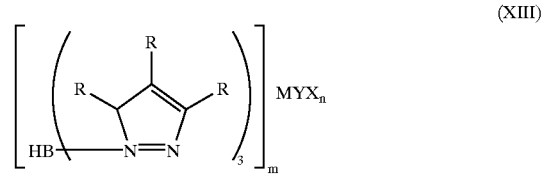

(XIII)

The symbol M in Formula (XIII) represents a transition metal atom selected from Groups 3–11 of Periodic Table, preferably a transition metal atom selected from Groups 4–5; specifically including, titanium, zirconium, vanadium, niobium, and tantalum.

The symbol m in Formula (XIII) represents an integer of 1–6, preferably 1–3.

The R groups may be the same or different, representing a hydrogen atom, a hydrocarbon group of 1–20 carbon atoms, or a halogenated hydrocarbon group of 1–20 carbon atoms. Two or more thereof may be joined together to form one or more rings.

The symbol n in Formula (XIII) represents an integer satisfying the valence of M; specifically an integer of 1–5, preferably 1–4, more preferably 1–3.

The symbol X in Formula (XIII) represents a hydrogen atom, a halogen atom, an oxygen atom, a hydrocarbon group of 1–20 carbon atoms, a halogenated hydrocarbon group of 1–20 carbon atoms, an oxygen-containing group, a sulfur-containing group, a silicon-containing group, or a nitrogen-containing group. The plural X groups may be the same or different, and may be joined together to form one or more rings when n is 2 or more.

The halogen atoms, the hydrocarbon groups of 1–20 carbon atoms, the halogenated hydrocarbon groups of 1–20 carbon atoms, the oxygen-containing groups, sulfur-containing groups, silicon containing groups, and nitrogen-containing groups represented by X in Formula (XIII) include the halogen atoms, hydrocarbon groups, halogenated hydrocarbon groups, oxygen-containing groups, sulfur-containing groups, silicon-containing groups, and nitrogen-containing groups mentioned for $R^1$–$R^7$ in the aforementioned General Formula (I)

In Formula (XIII), the group Y may be present or absent, When Y is present, Y is an atom selected from the atoms of Groups 15 and 16 of Periodic Table, specifically including O, S, Se, and NR.

Specific examples of the compounds are shown below without limitation.

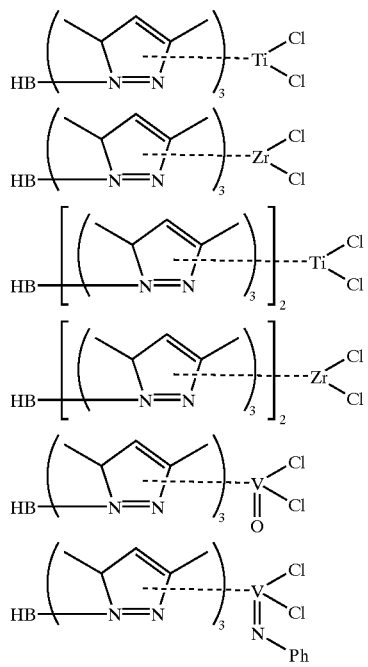

Compound (a-14)

The component (A) of the present invention includes also the compounds (a-14) represented by General Formula (XIVa) below:

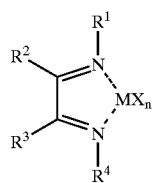

(XIVa)

The symbol M in Formula (XIVa) represents a transition metal atom selected from Groups 3–7 and 11 of Periodic Table, preferably a transition metal atom selected from Groups 4 and 5.

In Formula (XIVa), the groups $R^1$–$R^4$ may be the same or different, representing a hydrocarbon group of 1–50 carbon atoms, a halogenated hydrocarbon group of 1–50 carbon atoms, an organic silyl group, or a hydrocarbon group substituted with a substituent containing at least one atom selected from nitrogen, oxygen, phosphorus, sulfur, and silicon. Two or more of the groups $R^1$–$R^4$, preferably an adjacent groups may be joined to form one or more rings.

The hydrocarbon groups of 1–50 carbon atoms and the halogenated hydrocarbon groups of 1–50 carbon atoms represented by $R^1$–$R^4$ in Formula (XIVa) include the hydrocarbon groups and halogenated hydrocarbon groups mentioned for $R^1$–$R^7$ in the aforementioned General Formula (I). The organic silyl groups represented by $R^1$–$R^4$ include the silicon-containing groups mentioned for $R^1$–$R^7$ in the aforementioned General Formula (I). The substituent containing at least one atom selected from nitrogen, oxygen, phosphorus, sulfur, and silicon represented by $R^1$–$R^4$ include the nitrogen-containing groups, oxygen-containing groups, sulfur-containing groups, and heterocyclic compound residues containing nitrogen, oxygen, phosphorus, sulfur, or silicon mentioned for $R^1$–$R^7$ in the aforementioned General Formula (I).

The symbol n in Formula (XIVa) represents a number satisfying the valence of M, specifically an integer of 0–4.

The symbol X in Formula (XIVa) represents a hydrogen atom, a halogen atom, a hydrocarbon group of 1–20 carbon atoms, a halogenated hydrocarbon group of 1–20 carbon atoms, an oxygen-containing group, a sulfur-containing group, a silicon-containing group, or a nitrogen-containing group. The plural X groups, when n is 2 or more, maybe the same or different.

The halogen atoms, the hydrocarbon groups of 1–20 carbon atoms, the halogenated hydrocarbon groups of 1–20 carbon atoms, the oxygen-containing groups, the sulfur-containing groups, the silicon containing groups, or the nitrogen-containing groups represented by X in Formula (XIVa) include the halogen atoms, hydrocarbon groups, halogenated hydrocarbon groups, oxygen-containing groups, sulfur-containing groups, silicon containing groups, and nitrogen-containing groups mentioned for $R^1$–$R^7$ in the aforementioned General Formula (I).

Compound (a-15)

The component (A) of the present invention includes also the compounds (a-15) represented by General Formula (XIVb) below:

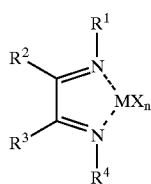

(XIVb)

The symbol M in Formula (XIVb) represents a transition metal atom selected from Groups 8–10 of Periodic Table, including preferably nickel, palladium, and platinum.

In Formula (XIVb), the groups $R^1$–$R^4$ may be the same or different, representing a hydrocarbon group of 1–50 carbon atoms. a halogenated hydrocarbon group of 1–50 carbon atoms, an organic silyl group, or a hydrocarbon group substituted with one or more substituents containing at least one atom selected from nitrogen, oxygen, phosphorus, sulfur, and silicon. Two or more of the $R^1$–$R^4$ groups, preferably an adjacent groups, maybe joined to form one or more rings.

The hydrocarbon groups of 1–50 carbon atoms and the halogenated hydrocarbon groups of 1–50 carbon atoms represented by $R^1$–$R^4$ in Formula (XIVb) include the hydrocarbon groups and the halogenated hydrocarbon groups mentioned for $R^1$–$R^7$ in the aforementioned General Formula (I). The organic silyl groups represented by $R^1$–$R^4$ include the silicon-containing groups mentioned for $R^1$–$R^7$ in the aforementioned General Formula (I). The substituent containing at least one atom selected from nitrogen, oxygen, phosphorus, sulfur, and silicon represented by $R^1$–$R^4$ includes the nitrogen-containing groups, oxygen-containing groups, sulfur-containing groups, and heterocyclic compound residues containing nitrogen, oxygen, phosphorus, sulfur, or silicon mentioned for $R^1$–$R^7$ in the aforementioned General Formula (I).

The symbol n in Formula (XIVb) represents an integer satisfying the valence of M, specifically an integer of 0–4.

The symbol X in Formula (XIVb) represents a hydrogen atom, a halogen atom, a hydrocarbon group of 1–20 carbon atoms, a halogenated hydrocarbon group of 1–20 carbon atoms, an oxygen-containing group, a sulfur-containing group, a silicon-containing group, or a nitrogen-containing group. The plural X groups, when n is 2 or more, maybe the same or different.

The halogen atoms, the hydrocarbon groups of 1–20 carbon atoms, the halogenated hydrocarbon groups of 1–20 carbon atoms, the oxygen-containing groups, the sulfur-containing groups, the silicon-containing groups, and the nitrogen-containing groups represented by X in Formula (XIVb) include the halogen atoms, hydrocarbon groups, halogenated hydrocarbon groups, oxygen-containing groups, sulfur-containing groups, silicon containing groups, and nitrogen-containing groups mentioned for $R^1$–$R^7$ in the aforementioned General Formula (I).

Specific examples of these compounds are shown below.

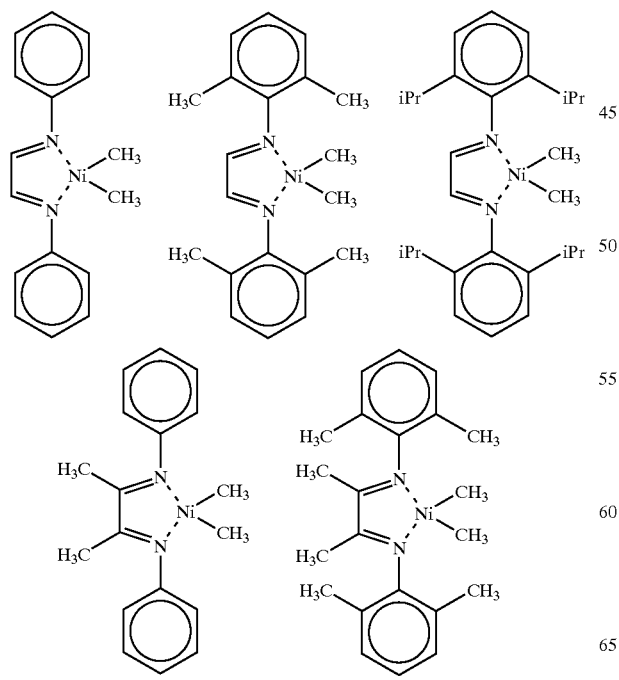

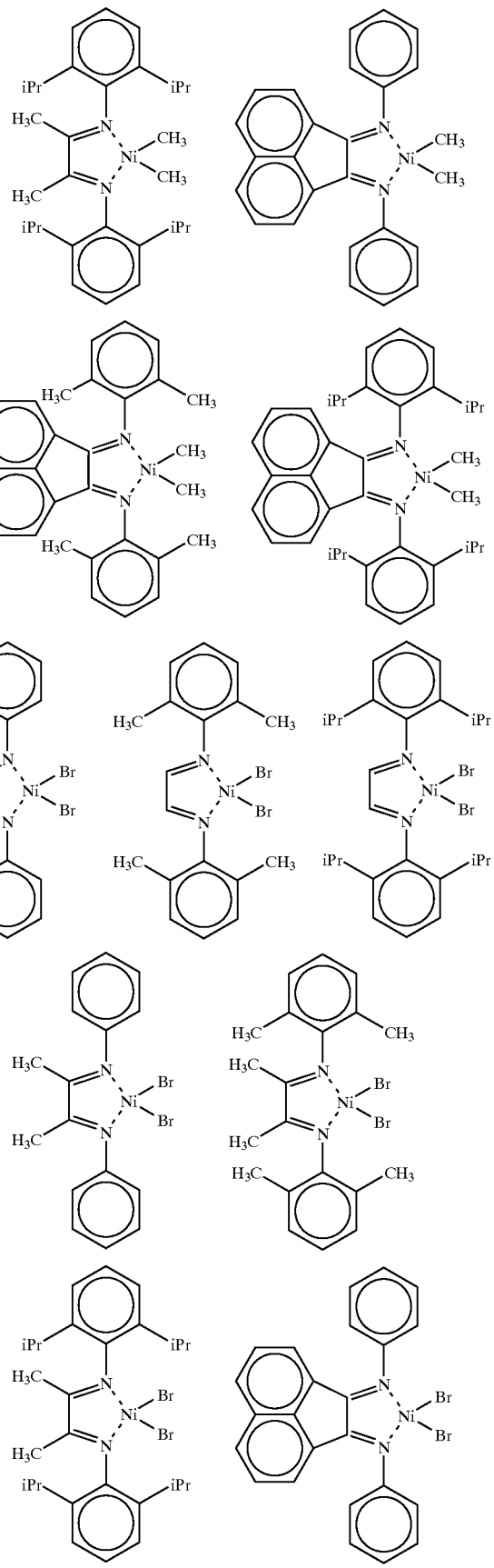

-continued

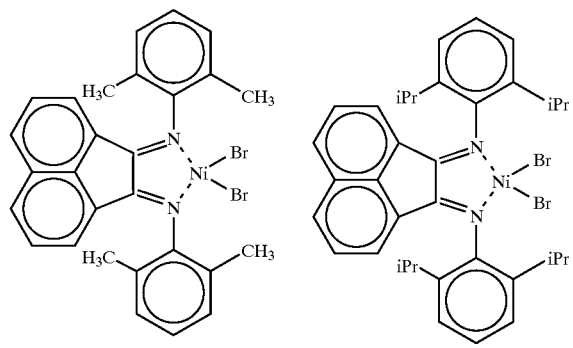

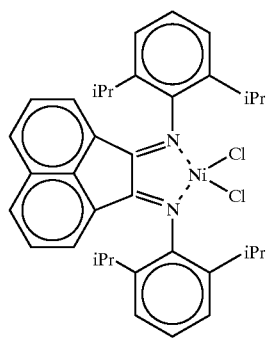

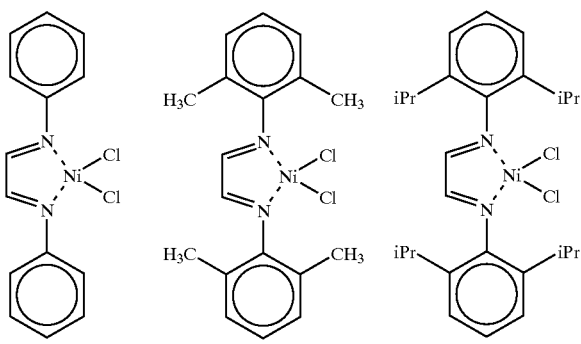

Compound (a-16)

The component (A) of the present invention includes also the compounds (a-16) represented by General Formula (XIVc) below:

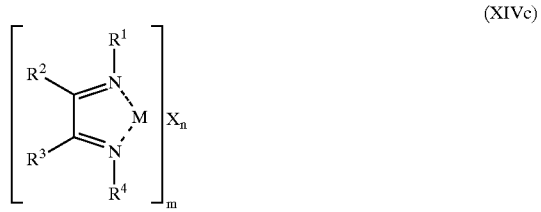

(XIVc)

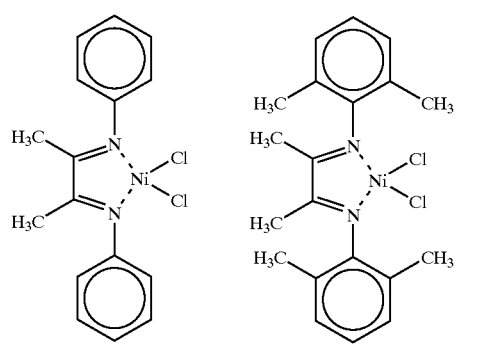

The symbol M in Formula (XIVC) represents a transition metal atom selected from Groups 3–11 of Periodic Table, including preferably nickel, palladium, and platinum.

The symbol m in Formula (XIVC) represents an integer of 1–6, preferably 1–4, more preferably 1–3, still more preferably 1–2.

The groups $R^1$–$R^4$ in Formula (XIVC), may be the same or different, representing a hydrocarbon group of 1–50 carbon atoms, a halogenated hydrocarbon group of 1–50 carbon atoms, an organic silyl group, or a hydrocarbon group substituted with one or more substituents containing at least one atom selected from nitrogen, oxygen, phosphorus, sulfur, and silicon. Two or more of the groups of $R^1$ $R^4$, preferably an adjacent groups, may be joined to form one or more rings.

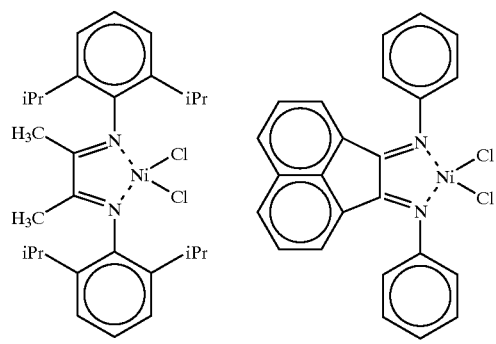

The hydrocarbon groups of 1–50 carbon atoms and the halogenated hydrocarbon groups of 1–50 carbon atoms represented by $R^1$–$R^4$ in Formula (XIVc) include the hydrocarbon groups and halogenated hydrocarbon groups mentioned for $R^1$–$R^7$ in the aforementioned General Formula (I). The organic silyl groups represented by $R^1$–$R^4$ include the silicon-containing groups mentioned for $R^1$–$R^7$ in the aforementioned General Formula (I). The substituent containing at least one atom selected from nitrogen, oxygen, phosphorus, sulfur, and silicon includes the nitrogen-containing groups, oxygen-containing groups, sulfur-containing groups, and heterocyclic compound residues containing nitrogen, oxygen, phosphorus, sulfur, or silicon mentioned for $R^1$–$R^7$ in the aforementioned General Formula (I).

The symbol n in Formula (XIVc) represents a number satisfying the valence of M, specifically an integer of 1–5, preferably 1–4, still more preferably 1–3.

The symbol X in Formula (XIVc) represents an oxygen atom when n is 1. When n is 2 or more, at least one X represents an oxygen atom, and the rest of the X or Xs represent respectively a hydrogen atom, a halogen atom, an oxygen atom, a hydrocarbon group of 1–20 carbon atoms, a halogenated hydrocarbon group of 1–20 carbon atoms, an oxygen-containing group, a sulfur-containing group, a silicon-containing group, or a nitrogen-containing group. The plural X groups maybe the same or different.

The halogen atoms, the hydrocarbon groups of 1–20 carbon atoms, the halogenated hydrocarbon groups of 1–20 carbon atoms, the oxygen-containing groups, sulfur-containing groups, silicon-containing groups, and nitrogen-containing groups represented by X in Formula (XIVc) include the halogen atoms, hydrocarbon groups, halogenated hydrocarbon groups, oxygen-containing groups, sulfur-containing groups, silicon-containing groups, and nitrogen-containing groups mentioned for $R^1$–$R^6$ in the aforementioned General Formula (IVa).

Compound (a-17)

The component (A) of the present invention includes also the compounds (a-17) represented by General Formula (XV) below:

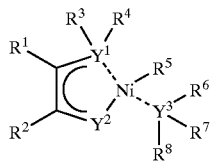

(XV)

The symbols $Y^1$ and $Y^3$ in Formula (XV) represent respectively an atom selected from Group 15 of Periodic Table, which may be the same or different.

The symbol $Y^2$ in Formula (XV) represents an atom selected from Group 16 of Periodic Table.

The groups $R^1$–$R^8$ in Formula (XV) may be the same or different, representing a hydrogen atom, a halogen atom, a hydrocarbon group of 1–20 carbon atoms, a halogenated hydrocarbon group of 1–20 carbon atoms, an oxygen-containing group, a sulfur-containing group, or a silicon-containing group. Two or more of the these groups may be joined to form one or more rings.

The hydrocarbon groups of 1–20 carbon atoms and the halogenated hydrocarbon groups of 1–20 carbon atoms represented by $R^1$–$R^8$ in Formula (XV) include the hydrocarbon groups and halogenated hydrocarbon groups mentioned for $R^1$–$R^7$ in the aforementioned General Formula (I). The halogen atoms, the oxygen-containing group, the sulfur-containing group, the silicon-containing group represented by $R^1$–$R^8$ include the halogen atoms, the oxygen-containing groups, sulfur-containing groups, and silicon-containing groups mentioned for $R^1$–$R^7$ in the aforementioned General Formula (I).

Compound (a-18)

The component (A) of the present invention includes also the compounds (a-18) represented by General Formula (XVI) below:

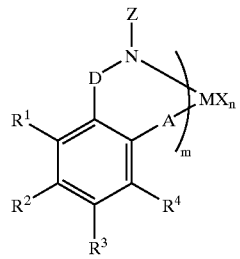

(XVI)

The symbol M in Formula (XVI) represents a transition metal atom selected from Groups 3–11 of Periodic Table, preferably a transition metal atom selected from Groups 3–6 and 8–10, more preferably a metal atom of Group4, 5, or 6, still more preferably a metal atom of Group 4 or 5.

The symbol m in Formula (XVI) represents an integer of 1–6, preferably 1–4, more preferably 1–3, still more preferably 1–2.

The symbol A in Formula (XVI) represents an oxygen atom, a sulfur atom, a selenium atom, or a nitrogen atom having a substituent —$R^5$(—N($R^5$)—).

The symbol D in Formula (XVI) represents a group of —C($R^6$)($R^7$)—, —Si($R^1$)($R^9$)—, —P(O)($R^{10}$)—, —P($R^{11}$)—, —SO—, or —S—.

The symbol Z in Formula (XVI) represents groups of both —$R^{12}$ and —$R^{13}$ bonding to N, ═C($R^{14}$)$R^{15}$, or ═$NR^{16}$.

The groups $R^1$–$R^{16}$ in Formula (XVI) may be the same or different, representing respectively a hydrogen atom, a halogen atom, a hydrocarbon group, an oxygen-containing group, a nitrogen-containing group, a boron-containing group, a sulfur-containing group, a phosphorus-containing group, a heterocyclic compound residue, a silicon-containing group, a germanium-containing group, or a tin-containing group; and two or more thereof may be joined together to form one or more rings. When m is 2 or more, two of the groups $R^1$–$R^{16}$ maybe linked together.

The halogen atom, the hydrocarbon group, the oxygen-containing group, the nitrogen-containing group, the boron-containing group, the sulfur-containing group, the phosphorus-containing group, the heterocyclic compound residue, the silicon-containing group, the germanium-containing group, and the tin-containing group represented by $R^1$–$R^{16}$ in Formula (XVI) include those as mentioned for $R^1$–$R^7$ in the aforementioned General Formula (I).

The symbol n in Formula (XVI) represents an integer satisfying the valence of M, specifically an integer of 1–5, preferably 1–4, still more preferably 1–3.

The symbol X in Formula (XVI) represents a hydrogen atom, a halogen atom, an oxygen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group, or a tin-containing group. When n is 2 or more, the plural X groups may be the same or different, and may be joined together to form one or more rings.

The halogen atom, the hydrocarbon group, the oxygen-containing group, the sulfur-containing group, the nitrogen-containing group, the boron-containing group, the aluminum-containing group, the phosphorus-containing group, the halogen-containing group, the heterocyclic compound residue, the silicon-containing group, the germanium-containing group, and the tin-containing group include the atoms and groups as mentioned for $X^1$ in the aforementioned General Formula (I).

Compound (a-19)

The component (A) of the present invention includes also the compounds (a-19) represented by General Formulas (XVII) or (XVIII) below:

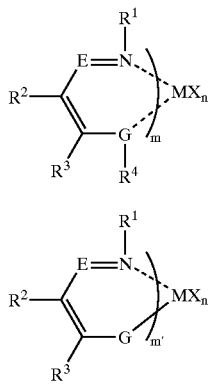

(XVII)

(XVIII)

The symbol M in Formulas (XVII) and (XVIII) represents a transition metal atom selected from Groups 3–11 of Periodic Table, preferably a transition metal atom selected from Groups 3–6 and 8–10, more preferably a transition metal atom of Group 4, 5, or 6, still more preferably a metal atom of Groups 5 and 6.

The symbol m in Formula (XVII) represents an integer of 1–3.

The symbol m' in Formula (XVIII) represents an integer of 1–6, preferably 1–4, more preferably 1–3, still more preferably 1–2.

The symbol E in Formulas (XVII) and (XVIII) represents a nitrogen atom, or a carbon atom having a substituent —$R^5$, (—$C(R^5)$=).

The symbol G in Formulas (XVII) and (XVIII) represents an oxygen atom, a sulfur atom, a selenium atom, or a nitrogen atom having a substituent —$R^6$, (—$N(R^6)$—).

The $R^1$–$R^6$ in Formulas (XVII) and (XVIII) represent the same or different mioeties: respectively a hydrogen atom, a halogen atom, a hydrocarbon group, an oxygen-containing group, a nitrogen-containing group, a boron-containing group, a sulfur-containing group, a phosphorus-containing group, a heterocyclic compound residue, a silicon-containing group, a germanium-containing group, or a tin-containing group; and two or more thereof may be joined together to form one or more rings. In Formula (XVII), when m is 2 or more, two of the groups $R^1$–$R^6$ may be linked together. In Formula (XVIII), when m' is 2 or more, two of the groups $R^1$–$R^6$ may be linked together.

The halogen atom, the hydrocarbon group, the oxygen-containing group, the nitrogen-containing group, the boron-containing group, the sulfur-containing group, the phosphorus-containing group, the heterocyclic compound residue, the silicon-containing group, the germanium-containing group, and the tin-containing group represented by $R^1$–$R^6$ in Formulas (XVII) and (XVIII) include the atoms and groups mentioned for $R^1$–$R^7$ in the aforementioned General Formula (I).

The symbol n in Formula (XVII) and (XVIII) represents a number satisfying the valence of M, specifically an integer of 1–5, preferably 1–4, still more preferably 1–3.

The symbol X in Formulas (XVII) and (XVIII) represents a hydrogen atom, a halogen atom, an oxygen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group, or a tin-containing group. In Formulas (XVII) and (XVIII), when n is 2 or more, the plural X groups may be the same or different, and may be joined together to form one or more rings.

The halogen atom, the hydrocarbon group, the oxygen-containing group, the sulfur-containing group, the nitrogen-containing group, the boron-containing group, the aluminum-containing group, the phosphorus-containing group, the halogen-containing group, the heterocyclic compound residue, the silicon-containing group, the germanium-containing group, and the tin-containing group include the atoms and groups as mentioned for $R^1$–$R^7$ in the aforementioned General Formula (I).

Compound (a-20)

The component (A) of the present invention includes also the compounds (a-20) represented by General Formula (XIX) below:

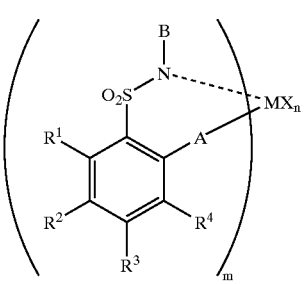

(XIX)

The symbol M in Formula (XIX) represents a transition metal atom selected from Groups 3–11 of Periodic Table, preferably a transition metal atom selected from Groups 3–6 and 8–10, more preferably a transition metal atom of Groups 4, 5, or 6, still more preferably a metal atom of Group 4 or 5.

The symbol m in Formula (XIX) represents an integer of 1–6, preferably 1–4, more preferably 1–3, still more preferably 1–2.

The symbol A in Formula (XIX) represents an oxygen atom, a sulfur atom, a selenium atom, or a nitrogen atom having a substituent —$R^5$(—$N(R^5)$—).

The symbol B in Formula (XIX) represents groups of —$R^6$ and —$R^7$ both bonding to N, =$C(R^8)R^9$, or =$NR^{10}$.

The symbols $R^1$–$R^{10}$ in Formula (XIX) represent the same or different moieties: respectively a hydrogen atom, a halogen atom, a hydrocarbon group, an oxygen-containing group, a nitrogen-containing group, a boron-containing group, a sulfur-containing group, a phosphorus-containing group, a heterocyclic compound residue, a silicon-containing group, a germanium-containing group, or a tin-containing group; and two or more thereof may be joined together to form a ring. When m is 2 or more, one of the $R^1$–$R^{10}$ groups of one ligand and one of the $R^1$–$R^{10}$ groups of another ligand may be linked together, and two or more of the $R^1$ groups, of the $R^2$ groups, of the $R^3$ groups, of the $R^4$ groups, of the $R^5$ groups, of the $R^6$ groups, of the $R^7$ groups, of the $R^8$ groups, of the $R^9$ groups, or of the $R^{10}$ groups may be the same or different.

The halogen atom, the hydrocarbon group, the oxygen-containing group, the nitrogen-containing group, the boron-containing group, the sulfur-containing group, the phosphorus-containing group, the heterocyclic compound residue, the silicon-containing group, the germanium-containing group, and the tin-containing group represented by $R^1$–$R^{10}$ in Formula (XIX) include the atoms and groups mentioned for $R^1$–$R^7$ in the aforementioned General Formula (I).

The symbol n in Formula (XIX) represents a number satisfying the valence of M, specifically an integer of 1–5, preferably 1–4, still more preferably 1–3.

The symbol X in Formula (XIX) represents a hydrogen atom, a halogen atom, an oxygen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group, or a tin-containing group. When n is 2 or more, the plural X groups may be the same or different, and may be joined together to form one or more rings.

The halogen atom, the hydrocarbon group, the halogenated hydrocarbon group, the oxygen-containing group, the sulfur-containing group, the nitrogen-containing group, the boron-containing group, the aluminum-containing group, the phosphorus-containing group, the halogen-containing group, the heterocyclic compound residue, the silicon-containing group, the germanium-containing group, and the tin-containing group represented by X in Formula (XIX) include the atoms and groups as mentioned for $X^1$ in the aforementioned General Formula (I).

Compound (a-21)

The component (A) of the present invention includes also the compounds (a-21) represented by General Formulas (XXa) and (XXIa) below:

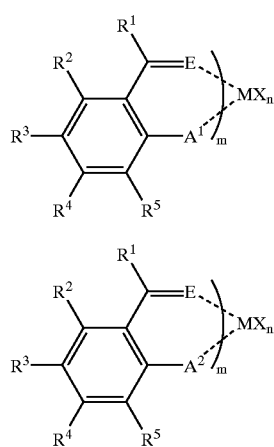

(XXa)

(XXIa)

The symbol M in Formulas (XXa) and (XXIa) represents a transition metal atom selected from Groups 3 and 4 of Periodic Table.

The symbol $A^1$ in Formula (XXa) represents an oxygen atom, a sulfur atom, or a hydrocarbon-substituted nitrogen atom.

The symbol $A^2$ in Formula (XXIa) represents a hydrocarbon-substituted oxygen atom, a hydrocarbon-substituted sulfur atom, or a hydrocarbon-substituted nitrogen atom.

The symbol E in Formulas (XXa) and (XXIa) represents an oxygen atom, or a sulfur atom.

The symbol m in Formulas (XXa) and (XXIa) represents an integer of 1–2.

The symbols $R^1$–$R^5$ in Formulas (XXa) and (XXIa) represent the same or different moieties: repsectively a hydrogen atom, a hydrocarbon group, or a hydrocarbon-substituted silyl group.

The symbol n in Formulas (XXa) and (XXIa) represents an integer satisfying the valence of M, specifically an integer of 0–5, preferably 0–4, still more preferably 0–3.

The symbol X in Formulas (XXa) and (XXIa) represents a hydrogen atom, a halogen atom, an oxygen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group, or a tin-containing group. When n is 2 or more, the plural X groups may be the same or different, and may be joined together to form one or more rings.

The halogen atom, the hydrocarbon group, the oxygen-containing group, the sulfur-containing group, the nitrogen-containing group, the boron-containing group, the aluminum-containing group, the phosphorus-containing group, the halogen-containing group, the heterocyclic compound residue, the silicon-containing group, the germanium-containing group, and the tin-containing group represented by X in Formulas (XXa) and (XXIa) include the atoms and groups as mentioned for $X^1$ in the aforementioned General Formula (I).

Compound (a-22)

The component (A) of the present invention includes also the compounds (a-22) represented by General Formulas (XXb) and (XXIb) below:

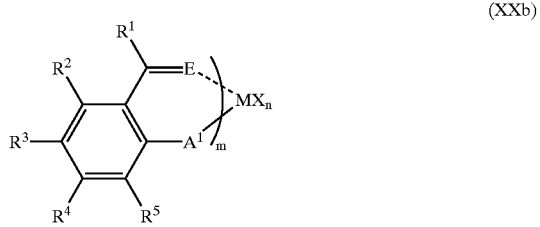

(XXb)

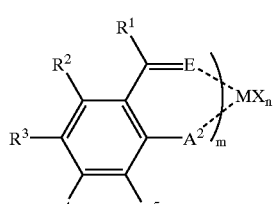

(XXIb)

The symbol M in Formulas (XXb) and (XXIb) represents a transition metal atom selected from Groups 5–11 of Periodic Table.

The symbol $A^1$ in Formula (XXb) represents an oxygen atom, a sulfur atom, or a hydrocarbon-substituted nitrogen atom.

The symbol $A^2$ in Formula (XXIb) represents a hydrocarbon-substituted oxygen atom, a hydrocarbon-substituted sulfur atom, or a hydrocarbon-substituted nitrogen atom.

The symbol E in Formulas (XXb) and (XXIb) represents an oxygen atom, or a sulfur atom.

The symbol m in Formulas (XXb) and (XXIb) represents an integer of 1–2.

The symbols $R^1$–$R^5$ in Formulas (XXb) and (XXIb) represent the same or different moieties: respectively a hydrogen atom, a hydrocarbon group, or a hydrocarbon-substituted silyl group.

The symbol n in Formulas (XXb) and (XXIb) represents a number satisfying the valence of M, specifically an integer of 1–5, preferably 1–4, still more preferably 1–3.

The symbol X in Formulas (XXb) and (XXIb) represents a hydrogen atom, a halogen atom, an oxygen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group, or a tin-containing group. When n is 2 or more, the plural X groups may be the same or different, and may be joined together to form one or more rings.

The halogen atom, the hydrocarbon group, the oxygen-containing group, the sulfur-containing group, the nitrogen-containing group, the boron-containing group, the aluminum-containing group, the phosphorus-containing group, the halogen-containing group, the heterocyclic compound residue, the silicon-containing group, the germanium-containing group, and the tin-containing group represented by X in Formulas (XXb) and (XXIb) include the atoms and groups as mentioned for $X^1$ in the aforementioned General Formula (I).

Compound (a-23)

The component (A) of the present invention includes also the compounds (a-23) represented by General Formulas (XXII), (XXIII), (XXIV), or (XXV) below:

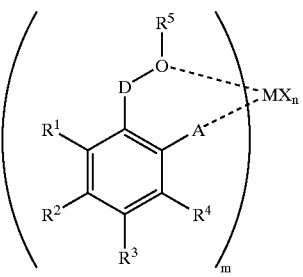
(XXII)

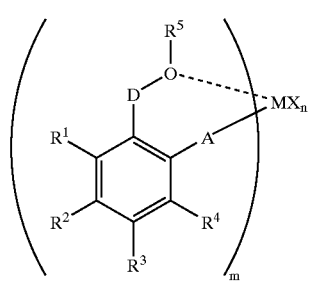
(XXIII)

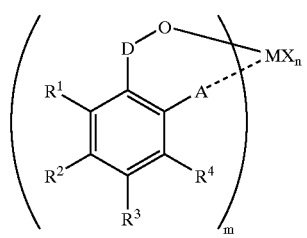
(XXIV)

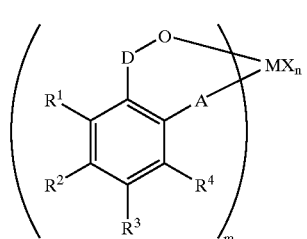
(XXV)

The symbol M in Formulas (XXII), (XXIII), (XXIV), and (XXV) represents a transition metal atom selected from Groups 3–11 of Periodic Table, preferably a transition metal atom selected from Groups 3–6 and 8–10, more preferably a transition metal atom of Groups 4, 5, or 6, still more preferably a metal atom of Group 4 or 5.

The symbol A in Formulas (XXII), (XXIII), (XXIV), and (XXV) represents an oxygen atom, a sulfur atom, a selenium atom, or a nitrogen atom. The atom A may have a substituent $R^6$ depending on the mode of bonding to the metal M.

The symbol D in Formulas (XXII), (XXIII), (XXIV), and (XXV) represents a group of —C($R^7$)($R^8$)—, —Si($R^9$)($R^{10}$)—, —CO—, —SO$_2$—, —SO—, or —P(O)(O$R^{11}$).

The symbol m in Formulas (XXII), (XXIII), (XXIV), and (XXV) represents an integer of 1–6, preferably 1–4, more preferably 1–3, still more preferably 1–2.

The symbols $R^1$–$R^{11}$ in Formulas (XXII), (XXIII), (XXIV), and (XXV) represent the same or different moieties: respectively a hydrogen atom, a halogen atom, a hydrocarbon group, an oxygen-containing group, a nitrogen-containing group, a boron-containing group, a sulfur-containing group, a phosphorus-containing group, a heterocyclic compound residue, a silicon-containing group, a germanium-containing group, or a tin-containing group; and two or more thereof may be joined together to form one or more rings. When m is 2 or more, two or more of the $R^1$ groups, of the $R^2$ groups, of the $R^3$ groups, of the $R^4$ groups, of the $R^5$ groups, of the $R^6$ groups, of the $R^7$ groups, of the $R^8$ groups, of the $R^9$ groups, of the $R^{10}$ groups, or of the $R^{11}$ groups may be the same or different, and at least one of the groups $R^1$–$R^{11}$ of one ligand and at least one of the groups $R^1$–$R^{11}$ of another ligand may be linked together.

The halogen atom, the hydrocarbon group, the oxygen-containing group, the nitrogen-containing group, the boron-containing group, the sulfur-containing group, the phosphorus-containing group, the heterocyclic compound residue, the silicon-containing group, the germanium-containing group, and the tin-containing group represented by $R^1$–$R^{11}$ in Formulas (XXII), (XXIII), (XXIV), and (XXV) include the atoms and groups mentioned for $R^1$–$R^7$ in the aforementioned General Formula (I).

The symbol n in Formulas (XXII), (XXIII), (XXIV), and (XXV) represents a number satisfying the valence of M, specifically an integer of 1–5, preferably 1–4, still more preferably 1–3.

The symbol X in Formulas (XXII), (XXIII), (XXIV), and (XXV) represents a hydrogen atom, a halogen atom, an oxygen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group, or a tin-containing group. When n is 2 or more, the plural X groups may be the same or different, and may be joined together to form one or more rings.

The halogen atom, the hydrocarbon group, the oxygen-containing group, the sulfur-containing group, the nitrogen-containing group, the boron-containing group, the aluminum-containing group, the phosphorus-containing group, the halogen-containing group, the heterocyclic compound residue, the silicon-containing group, the germanium-containing group, and the tin-containing group represented by X in Formulas (XXII), (XXIII), (XXIV), and (XXV) include the atoms and groups as mentioned for $X^1$ in the aforementioned General Formula (I).

Compound (a-24)

The component (A) of the present invention includes also the compounds (a-24) represented by General Formulas (XXVI), (XXVII), (XXVIII), or (XXIX) below:

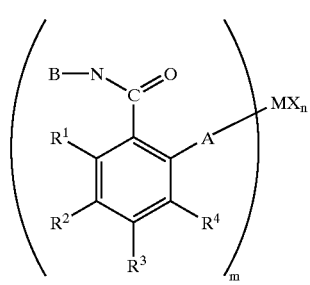

(XXVI)

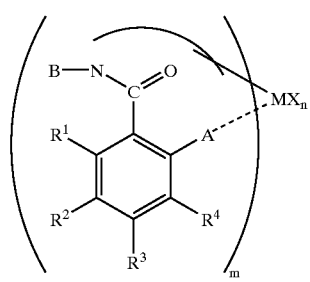

(XXVII)

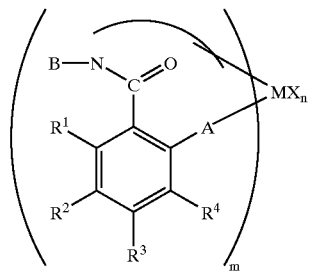

(XXVIII)

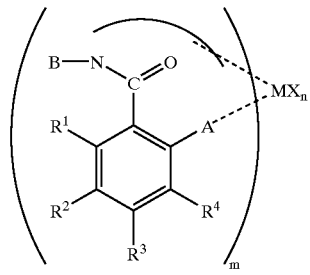

(XXIX)

The symbol M in Formulas (XXVI), (XXVII), (XXVIII), and (XXIX) represents a transition metal atom selected from Groups 3–11 of Periodic Table, preferably a transition metal atom selected from Groups 3–6 and 8–10, more preferably a transition metal atom of Groups 4, 5, or 6, still more preferably a metal atom of Group 4 or 5.

The symbol m in Formulas (XXVI), (XXVII), (XXVIII), and (XXIX) represents an integer of 1–6, preferably 1–4, more preferably 1–3, still more preferably 1–2.

The symbol A in Formulas (XXVI), (XXVII), (XXVIII), and (XXIX) represents an oxygen atom, a sulfur atom, a selenium atom, or a nitrogen atom. The atom A may have a substituent $R^5$ depending on the mode of bonding to the metal M.

The symbol B in Formula (XXVI), (XXVII), (XXVIII), and (XXIX) represents groups of $-R^6$ and $-R^7$ both bonding to N, $=NR^8$, or $=C(R^9)(R^{10})$.

The groups $R^1-R^{10}$ in Formulas (XXVI), (XXVII), (XXVIII), and (XXIX) may be the same or different, representing respectively a hydrogen atom, a halogen atom, a hydrocarbon group, an oxygen-containing group, a nitrogen-containing group, a boron-containing group, a sulfur-containing group, a phosphorus-containing group, a heterocyclic compound residue, a silicon-containing group, a germanium-containing group, or a tin-containing group; and two or more thereof may be joined together to form one or more rings. When m is 2 or more, two of the $R^1-R^{10}$ groups may be linked together, and the each $R^1-R^{10}$ group may be the same or different.

The halogen atom, the hydrocarbon group, the oxygen-containing group, the nitrogen-containing group, the boron-containing group, the sulfur-containing group, the phosphorus-containing group, the heterocyclic compound residue, the silicon-containing group, the germanium-containing group, and the tin-containing group represented by $R^1-R^{10}$ in Formulas (XXVI), (XXVII), (XXVIII), and (XXIX) include the atoms and groups mentioned for $R^1-R^7$ in the aforementioned General Formula (I).

The symbol n in Formulas (XXVI), (XXVII), (XXVIII), and (XXIX) represents a number satisfying the valence of M, specifically an integer of 1–5, preferably 1–4, still more preferably 1–3.

The symbol X in Formulas (XXVI), (XXVII), (XXVIII), and (XXIX) represents a hydrogen atom, a halogen atom, an oxygen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group, or a tin-containing group. When n is 2 or more, the plural X groups may be the same or different, and may be joined together to form one or more rings.

The halogen atom, the hydrocarbon group, the oxygen-containing group, the sulfur-containing group, the nitrogen-containing group, the boron-containing group, the aluminum-containing group, the phosphorus-containing group, the halogen-containing group, the heterocyclic compound residue, the silicon-containing group, the germanium-containing group, and the tin-containing group represented by X in Formulas (XXVI), (XXVII), (XXVIII), and (XXIX) include the atoms and groups as mentioned for $X^1$ in the aforementioned General Formula (I).

Compound (a-25)

The component (A) of the present invention includes also the compounds (a-25) represented by General Formula (XXX) below:

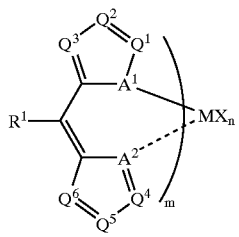

(XXX)

The symbol M in Formula (XXX) represents a transition metal atom selected from Groups 3–11 of Periodic Table, preferably a transition metal atom selected from Groups 3–6 and 8–10, more preferably a transition metal atom of Groups 4, 5, or 6, still more preferably a metal atom of Group 4 or 5.

The symbols $A^1$ and $A^2$ in Formulas (XXX) represent the same or different moieties: respectively a nitrogen atom or a phosphorus atom.

The symbols $Q^1$–$Q^6$ in Formula (XXX) represent the same or different moieties: respectively a nitrogen atom, a phosphorus atom, or a carbon atom having a substituent —$R^2$, (—C($R^2$)=). When two or more of $Q^1$–$Q^6$ are respectively a carbon atom having an $R^2$-substituent, the $R^2$s thereof may be the same or different.

The symbols $R^1$ and $R^2$ in Formulas (XXX) represent the same or different mioeties: respectively a hydrogen atom, a halogen atom, a hydrocarbon group, a heterocyclic compound residue, an oxygen-containing group, a nitrogen-containing group, a boron-containing group, a sulfur-containing group, a phosphorus-containing group, a silicon-containing group, a germanium-containing group, or a tin-containing group; and two or more thereof may be joined together to form one or more rings.

The halogen atom, the hydrocarbon group, the oxygen-containing group, the nitrogen-containing group, the boron-containing group, the sulfur-containing group, the phosphorus-containing group, the heterocyclic compound residue, the silicon-containing group, the germanium-containing group, and the tin-containing group represented by $R^1$ or $R^2$ in Formula (XXX) include the atoms and groups mentioned for $R^1$–$R^7$ in the aforementioned General Formula (I).

The symbol m in Formula (XXX) represents an integer of 1–6, preferably 1–4, more preferably 1–3, still more preferably 1–2. When m is 2 or more, any of $R^1$ and $R^2$ of one ligand and any of $R^1$ and $R^2$ in another ligand may be linked together, and the plural $R^1$ groups, and the plural $R^2$ groups may be the same or different.

The symbol n in Formulas (XXX) represents a number satisfying the valence of M, specifically an integer of 1–5, preferably 1–4, still more preferably 1–3.

The symbol X in Formulas (XXX) represents a hydrogen atom, a halogen atom, an oxygen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group, or a tin-containing group. When n is 2 or more, the plural X groups represent the same or different moieties, and may be joined together to form one or more rings.

The halogen atom, the hydrocarbon group, the oxygen-containing group, the sulfur-containing group, the nitrogen-containing group, the boron-containing group, the aluminum-containing group, the phosphorus-containing group, the halogen-containing group, the heterocyclic compound residue, the silicon-containing group, the germanium-containing group, and the tin-containing group represented by X in Formulas (XXX) include the atoms and groups mentioned for $X^1$ in the aforementioned General Formula (I).

Compound (a-26)

The component (A) of the present invention includes also the compounds (a-26) represented by General Formulas (XXXIa) and (XXXIIa) below:

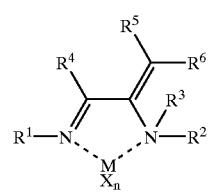

(XXXIa)

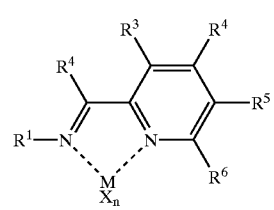

(XXXIIa)

The symbol M in Formulas (XXXIa) and (XXXIIa) represents a transition metal atom selected from Groups 3–7 of Periodic Table, preferably a transition metal atom selected from Groups 4 and 5.

The symbols $R^1$–$R^6$ in Formulas (XXXIa) and (XXXIIa) represent the same or different moieties: respectively a hydrogen atom, a hydrocarbon group, a halogenated hydrocarbon group of 1–20 carbon atoms, an oxygen-containing group, a sulfur-containing group, a silicon-containing group, a nitrogen-containing group, or a phosphorus-containing group; and two or more thereof may be joined together to form one or more rings.

The hydrocarbon group, the halogenated hydrocarbon group of 1–20 carbon atoms, the oxygen-containing group, the sulfur-containing group, the silicon-containing group, the nitrogen-containing group, and the phosphorus-containing group represented by $R^1$–$R^6$ in Formulas (XXXIa) and (XXXIIa) include the hydrocarbon group, halogenated hydrocarbon group, oxygen-containing group, sulfur-containing group, silicon-containing group, nitrogen-containing group, and phosphorus-containing group mentioned for $R^1$–$R^7$ in the aforementioned General Formula (I).

The symbol n in Formulas (XXXIa) and (XXXIIa) represents a number satisfying the valence of M, specifically an integer of 1–5, preferably 1–4, still more preferably 1–3.

The X groups in Formulas (XXXIa) and (XXXIIa) may be the same or different, and represent a hydrogen atom, a halogen atom, an oxygen atom, a hydrocarbon group of 1–20 carbon atoms, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group, or a tin-containing group. When n is 2 or more, the plural X groups represent the same or different moieties, and may be joined to form one or more rings.

The halogen atom, the hydrocarbon group of 1–20 carbon atoms, the oxygen-containing group, the sulfur-containing group, a nitrogen-containing group, a boron-containing group, an aluminum-containing group, a phosphorus-containing group, a halogen-containing group, a heterocyclic compound residue, a silicon-containing group, a germanium-containing group, or a tin-containing group, represented by X in Formulas (XXXIa) and (XXXIIa) include the atoms and groups mentioned for $X^1$ in the aforementioned General Formula (I).

Compound (a-27)

The component (A) of the present invention includes also the compounds (a-27) represented by General Formulas (XXXIb) and (XXXIIb) below:

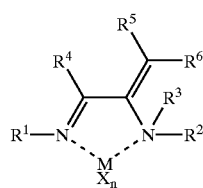
(XXXIb)

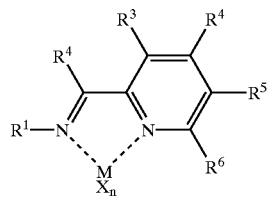
(XXXIIb)

The symbol M in Formulas (XXXIb) and (XXXIIb) represents a transition metal atom selected from Groups 8–11 of Periodic Table, preferably a transition metal atom selected from Groups 8 and 9.

The symbols $R^1$–$R^6$ in Formulas (XXXIb) and (XXXIIb) represent the same or different moieties: respectively a hydrogen atom, a hydrocarbon group, a halogenated hydrocarbon group of 1–20 carbon atoms, an oxygen-containing group, a sulfur-containing group, a silicon-containing group, a nitrogen-containing group, or a phosphorus-containing group; and two or more thereof may be joined together to form one or more rings.

The hydrocarbon group, the halogenated hydrocarbon group of 1–20 carbon atoms, the oxygen-containing group, the sulfur-containing group, the silicon-containing group, the nitrogen-containing group, and the phosphorus-containing group represented by $R^1$–$R^6$ in Formulas (XXXIb) and (XXXIIb) include the hydrocarbon groups, halogenated hydrocarbon groups, oxygen-containing group, sulfur-containing group, silicon-containing group, nitrogen-containing group, and phosphorus-containing group as mentioned for $R^1$–$R^7$ in the aforementioned General Formula (I).

The symbol n in Formulas (XXXIb) and (XXXIIb) represents a numeral satisfying the valence of M, specifically an integer of 1–5, preferably 1–4, still more preferably 1–3.

The X groups in Formulas (XXXIb) and (XXXIIb) may be the same or different, and represent a hydrogen atom, a halogen atom, an oxygen atom, a hydrocarbon group of 1–20 carbon atoms, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group, or a tin-containing group. When n is 2 or more, the plural X groups represent the same or different moieties, and may be joined to form one or more rings.

The halogen atom, the hydrocarbon group of 1–20 carbon atoms, the oxygen-containing group, the sulfur-containing group, a nitrogen-containing group, a boron-containing group, an aluminum-containing group, a phosphorus-containing group, a halogen-containing group, a heterocyclic compound residue, a silicon-containing group, a germanium-containing group, or a tin-containing group, represented by X in Formulas (XXXIb) and (XXXIIb) include the atoms, and groups mentioned for $X^1$ in the aforementioned General Formula (I).

(B) Lewis Acid

The Lewis acid (B) employed in the present invention is a compound which is capable of receiving at least one electron pair and is capable of forming an ion pair by reaction with the aforementioned transition metal compound (A). The Lewis acid includes (b-1) ionic-bonding compounds having a layered crystal structure of a $CdCl_2$ type or $CdI_2$ type (hereinafter simply referred to as an "ionic-bonding compound" occasionally), (b-2) clay·clay minerals, or ion-exchange layered compounds, (b-3) heteropoly compounds, and (b-4) halogenated lanthanoid compounds. The Lewis acid further includes $SiO_2$, $Al_2O_3$, natural and synthetic zeolites which have Lewis acid points formed by heating or a like treatment, and complexes and mixtures thereof.

Incidentally, the Lewis acid (B) in the present invention does not include the organoaluminum oxy-compounds (also called aluminoxane or alumoxane) which are known as a cocatalyst component of conventional olefin polymerization catalysts, and does not contain the organic boron compounds such as Lewis acids, the ionic compounds, borane compounds, and carborane compounds described in Japanese Patent Laid-Open Nos. Hei 1-501950, 1-502036, 3-179005, 3-179006, 3-207703, and 3-207704, and U.S. Pat. No. 5,321,106, and so forth.

The Lewis acids (B) may be used singly or in combination of two or more thereof.

(b-1) Ionic-Bonding Compounds

The ionic-bonding compound (b-1) is a compound having a layered crystal structure of a $CdI_2$ or $CdCl_2$ type.

Generally, most of the salts constituted of a strongly polar cation and a polarizable anion have a layer structure in which the cation layer is sandwiched between the anion layers and no excess cation exists between the sandwiches. The ionic-bonding compounds (b-1) employed in the present invention are classified as layer-structured compounds. Such compounds have a known crystal structure as described in various literature: for example, "Chemical Encyclopedia 1" (Kyoritsu Shuppan K. K., First Ed., Feb. 28 , 1962,); "Treatise on Modern Inorganic Chemistry, (2) Itemized Description of Inorganic Chemistry (first volume)" written by S. Utsumi, Gihodo K. K., First Edition, Jul. 20, 1965; and so forth.

The compounds having a $CdI_2$ type crystal structure include specifically $CdBr_2$, $FeBr_2$, $CoBr_2$, $NiBr_2$, $CdI_2$, $MgI_2$, $CaI_2$, $ZnI_2$, $PbI_2$, $MnI_2$, $FeI_2$, $CoI_2$, $Mg(OH)_2$, $Ca(OH)_2$, $Cd(OH)_2$, $Mn(OH)_2$, $Fe(OH)_2$, $Co(OH)_2$, $Ni(OH)_2$, $ZrS_4$, $SnS_4$, $TiS_4$, and $PtS_4$.

The compounds having a $CdCl_2$ type crystal structure include specifically $CdCl_2$, $MnCl_2$, $FeCl_2$, $CoCl_2$, $NiI_2$, $NiCl_2$, $MgCl_2$, $ZnBr_2$, and $CrCl_3$.

Of these, preferred are $CdBr_2$, $FeBr_2$, $CoBr_2$, $NiBr_2$, $CdI_2$, $MgI_2$, $CaI_2$, $ZnI_2$, $PbI_2$, $MnI_2$, $FeI_2$, $CoI_2$, $CdCl_2$, $MnCl_2$, $FeCl_2$, $CoCl_2$, $NiI_2$, $NiCl_2$, $MgCl_2$, and $ZnBr_2$, more preferred are $MnCl_2$, $FeCl_2$, $CoCl_2$, $NiCl_2$, and $MgCl_2$.

The aforementioned ionic-bonding compound (b-1) itself need not necessarily be used, but should be contained finally in the catalyst. Therefore, a precursor compound convertible to the ionic-bonding compound (b-1) may be used in a catalyst preparation step to form the ionic-bonding compound (b-1) to be incorporated finally in the catalyst. In other words, a compound which does not have the $CdI_2$ or $CdCl_2$ type crystal structure may be brought into contact with a halogen-containing compound or a hydroxyl-containing compound during the catalyst preparation to react with it to form the ionic-bonding compound (b-1) finally in the formed catalyst.

For example, for formation of $MgCl_2$ or $MgI_2$ to be incorporated finally in the catalyst component, a magnesium compound having a reducing power and another magnesium compound having no reducing power may be used combinedly as the source materials for compounds capable to form said $MgCl_2$ or $MgI_2$.

The magnesium compound having the reducing power (reducing organomagnesium compound) includes the organomagnesium compound shown by the formula below:

wherein the symbol n denotes a number of $0 \leq n < 2$; R is hydrogen, an alkyl group of 1–20 carbon atoms, an aryl group of 6–21 carbon atoms, or a cycloalkyl group of 5–20 carbon atoms; and the two R groups may be the same or different when n is 0; and X is a halogen.

The organomagnesium compound having such a reducing power (reducing organomagnesium compound) includes specifically dialkylmagnesium compounds such as dimethylmagnesium, diethylmagnesium, dipropylmagnesium, dibutylmagnesium, diamylmagnesium, dihexylmagnesium, didecylmagnesium, octylbutylmagnesium, and ethylbutylmagnesium; alkylmagnesium halides such as ethylmagnesium chloride, propylmagnesium chloride, butylmagnesium chloride, hexylmagnesium chloride, and amylmagnesium chloride; alkylmagnesium alkoxides such as butylethoxymagnesium, ethylbutoxymagnesium, and octylbutoxymagnesium; butylmagnesium hydride; and so forth.

The magnesium compound having no reducing power (non-reducing magnesium compound) includes specifically alkoxymagnesium halides such as methoxy magnesium chloride, ethoxymagnesium chloride, isopropoxymagnesium chloride, butoxymagnesium chloride, and octoxymagnesium chloride; aryloxymagnesium halides such as phenoxymagnesium chloride, and methylphenoxymagnesium chloride; alkoxymagnesiums such as ethoxymagnesium, isopropoxymagnesium, butoxymagnesium, n-octoxymagnesium, and 2-ethylhexoxymagnesium; aryloxymagnesiums such as diphenoxymagnesium, and methylphenoxymagnesium; and carboxylic acid magnesium salts such as magnesium laurate, and magnesium stearate.

Magnesium metal, magnesium hydride, and the like are also useful therefor.

Such a non-reducing magnesium compound may be a compound derived from the aforementioned reducing magnesium compound, or may be a compound derived in a process of the catalyst preparation. To derive the non-reducing magnesium compound from the reducing magnesium compound, for example, the reducing magnesium compound is brought into contact with a compound such as a polysiloxane compound, a halogen-containing silane compound, a halogen-containing aluminum compound, an ester, an alcohol, a halogen-containing compound, or a compound having an OH group or active carbon-oxygen linkage.

The reducing magnesium compound or the non-reducing magnesium compound may be in a state of a complex compound or double compound with another organometallic compound of aluminum, zinc, boron, beryllium, sodium, potassium, or the like, or a mixture thereof. The magnesium compound may be used singly or in combination of two or more thereof, or may be in a state of a liquid or a solid. The reducing magnesium compound or the non-reducing magnesium compound which is in a solid state can be converted to be in a liquid state by use of an oxygen-containing compound or nitrogen-containing compound (C) described later.

For formation of the ionic-bonding compound (b-1) other than the magnesium compound, a reducing compound and a non-reducing compound may be used similarly as the compounds which can be converted to the ionic-bonding compound (b-1) (herein after referred to as "source compounds").

The source compound includes specifically
alkylmetal compounds such as dimethylcadmium, diethylcadmium, dipropylcadmium, dibutylcadmium, diamylcadmium, dihexylcadmium, didecylcadmium, octylbutylcadmium, ethybutylcadmium, dimethylzinc, diethylzinc, dipropylzinc, dibutylzinc, diamylzinc, dihexylzinc, didecylzinc, octylbutylzinc, ethylbutylzinc, tetrametyllead, tetraethyllead, tatrapropyllead, tetrabutyllead, tetraamyllead, tetrahexyllead, tetradecyllead, trioctylbutyllead, and diethyldibutyllead;
alkylmetal halides such as methylcadmium chloride, ethylcadmium chloride, propylcadmium chloride, butylcadmium chloride, amylcadmium chloride, hexylcadmium chloride, decylcadmiumchloride, methylzinc chloride, ethylzinc chloride, propylzinc chloride, butylzinc chloride, amylzinc chloride, hexylzincchloride, decylzincchloride, trimethylleadchloride, dimethyldichlorolead, methyltrichlorolead, triethyllead chloride, diethyldichlorolead, ethyltrichlorolead, tripropyllead chloride, tributyllead chloride, triamyllead chloride, trihexyllead chloride, tridecyllead chloride, dioctylbutyllead chloride, and diethylbutyllead chloride;
phenylmetal compounds such as diphenylcadmium, diphenylzinc, tetraphenyllead, triphenylmethyllead, and diphenyldiethyllead, α-naphthylcalcium;
phenyl halide compounds such as phenylcadmium chloride, phenylzinc chloride, triphenyllead chloride, diphenylmethylzinc chloride, and diphenyldichlorolead;
metal fluorides such as cadmium fluoride, iron(II) fluoride, iron(III) fluoride, cobalt(II) fluoride, cobalt(III) fluoride, nickel fluoride, calcium fluoride, zinc fluoride, lead fluoride, manganese(II) fluoride, and manganese(III) fluoride;
alkoxymetal compounds such as methoxyiron(II), methoxyiron(III), ethoxyiron(II), ethoxyiron(III), n-propoxy iron (II), n-propoxyiron (III), isopropoxyiron(II), isopropoxyiron(III), n-butoxyiron(II), n-butoxyiron(III), t-butoxyiron(II), t-butoxyiron(III), 2-ethylhexoxyiron (II), 2-ethylhexoxyiron(III), N,N-dimethylaminomethoxyiron (II), N,N-dimethylaminomethoxyiron(III), methoxycobalt, ethoxycobalt, n-propoxycobalt, isopropoxycobalt, n-butoxycobalt, t-butoxycobalt, 2-ethylhexoxycobalt, N,N-dimethylaminomethoxycobalt, methoxynickel, ethoxynickel, n-propoxynickel, isopropoxynickel, n-butoxynickel, t-butoxynickel, 2-ethylhexoxynickel, N,N-dimethylaminomethoxynickel, methoxycalcium, ethoxycalcium, n-propoxycalcium, isopropoxycalcium, n-butoxycalcium, t-butoxycalcium, 2-ethylhexoxycalcium, N,N-dimethylaminomethoxycalcium, methoxyzinc, ethoxyzinc, n-propoxyzinc, isopropoxyzinc, n-butoxyzinc, t-butoxyzinc, 2-ethylhexoxyzinc, N,N-dimethylaminomethoxyzinc, methoxymanganese, ethoxymanganese, n-propoxymanganese, isopropoxymanganese, n-butoxymanganese, t-butoxymanganese, 2-ethylhexoxymanganese, and N,N-dimethylaminomethoxymanganese;

alkoxymetal halide compounds such as methoxyiron(II) chloride, dimethoxyiron(III) chloride, methoxyiron(III) dichloride, ethoxyiron(II) chloride, diethoxyiron(III) chloride, ethoxyiron(III) dichloride, n-propoxyiron(II) chloride, di-n-propoxyiron(III) chloride, isopropoxyiron(II) chloride, diisopropoxyiron(III) chloride, n-butoxyiron(II) chloride, di-n-butoxyiron(III) chloride, t-butoxyiron(II) chloride, di-t-butoxyiron(III) chloride, 2-ethylhexoxyiron (II) chloride, di-2-ethylhexoxyiron(III) chloride, N,N-dimethylaminomethoxyiron(II) chloride, bis(N,N-dimethylaminomethoxy)iron(III) chloride, N,N-dimethylaminomethoxyiron(III) dichloride, methoxycobalt chloride, ethoxycobalt chloride, n-propoxycobalt chloride, isopropoxycobalt chloride, n-butoxycobalt chloride, t-butoxycobalt chloride, 2-ethylhexoxycobalt chloride, N,N-dimethylaminomethoxycobalt chloride, methoxynickel chloride, ethoxynickel chloride, n-propoxynickel chloride, isopropoxynickel chloride, n-butoxynickel chloride, t-butoxynickel chloride, 2-ethylhexoxynickel chloride, N,N-dimethylaminomethoxynickel chloride, methoxycalcium chloride, ethoxycalcium chloride, n-propoxycalcium chloride, isopropoxycalcium chloride, n-butoxycalcium chloride, t-butoxycalcium chloride, 2-ethylhexoxycalcium chloride, N,N-dimethylaminomethoxycalcium chloride, methoxyzinc chloride, ethoxyzinc chloride, n-propoxyzinc chloride, isopropoxyzinc chloride, n-butoxyzinc chloride, t-butoxyzinc chloride, 2-ethylhexoxyzinc chloride, N,N-dimethylaminomethoxyzinc chloride, methoxymanganese chloride, ethoxymanganese chloride, n-propoxymanganese chloride, isopropoxymanganese chloride, n-butoxymanganese chloride, t-butoxymanganese chloride, 2-ethylhexoxymanganese chloride, and N,N-dimethylaminomethoxymanganese chloride; aryloxymetal compounds such as phenoxyiron(II), phenoxyiron(III), methylphenoxyiron(II), methyl-bis(phenoxy)iron(III), dimethyl(phenoxy)iron(III), bis (phenoxy) cobalt, methylphenoxycobalt, bis (phenoxy)nickel, methylphenoxynickel, bis(phenoxy)calcium, methylphenoxycalcium, bis(phenoxy)zinc, methylphenoxyzinc, bis(phenoxy)manganese, and methylphenoxymanganese; aryloxymetal halide compounds such as phenoxy(II) chloride, bis(phenoxy)iron(III) chloride, phenoxyiron(III) dichloride, methylphenoxyiron(III) chloride, phenoxycobalt chloride, phenoxynickel chloride, phenoxycalcium chloride, phenoxyzinc chloride, and phenoxymanganese chloride;

metal carboxylates such as cadmium formate, cadmium acetate, cadmiumpropionate, cadmiumacrylate, cadmium2-ethyhexanoate, cadmium decanoate, cadmium laurate, cadmium stearate, cadmium cyclohexylbutyrate, cadmiumoxalate, cadmiumbenzoate, cadmium phthalate, iron(III) formate, iron(II) acetate, iron(III) acetate, iron(II) propionate, iron(III) propionate, iron(II) acrylate, iron(III) acrylate, iron(II) 2-ethyhexanoate, iron(III) 2-ethyhexanoate, iron(II) decanoate, iron(III) decanoate, iron(II) laurate, iron(III) laurate, iron(II) stearate, iron(III) stearate, iron(II) cyclohexylbutyrate, iron(III) cyclohexylbutyrate, iron(II) oxalate, iron(III) oxalate, iron (II) benzoate, iron(III) benzoate, iron(II) phthalate, cobalt formate, cobalt acetate, cobalt propionate, cobalt acrylate, cobalt 2-ethyhexanoate, cobalt decanoate, cobalt laurate, cobalt stearate, cobalt cyclohexylbutyrate, cobalt oxalate, cobalt benzoate, cobalt phthalate, cobalt adipate, nickel formate, nickel acetate, nickel propionate, nickel acrylate, nickel 2-ethyhexanoate, nickel decanoate, nickel laurate, nickel stearate, nickel cyclohexylbutyrate, nickel oxalate, nickel benzoate, nickel phthalate, nickel adipate, calcium formate, calcium acetate, calcium propionate, calcium acrylate, calcium 2-ethyhexanoate, calcium decanoate, calcium laurate, calciumstearate, calciumcyclohexylbutyrate, calcium oxalate, calcium benzoate, calcium phthalate, zinc formate, zinc acetate, zinc propionate, zinc acrylate, zinc 2-ethyhexanoate, zinc decanoate, zinc laurate, zinc stearate, zinc cyclohexylbutyrate, zinc oxalate, zinc benzoate, zinc phthalate, lead formate, lead acetate, lead propionate, lead acrylate, lead 2-ethyhexanoate, lead decanoate, lead laurate, lead stearate, lead cyclohexylbutyrate, lead oxalate, lead benzoate, lead phthalate, manganese formate, manganese acetate, manganese propionate, manganese acrylate, manganese 2-ethyhexanoate, manganese decanoate, manganese laurate, manganese stearate, manganese cyclohexylbutyrate, manganese oxalate, manganese benzoate, and manganese phthalate;

and metal hydrides such as calcium hydride, calcium hypochlorite, lead hydride, triphenyllead hydride, tris(1-pyrrolyl)lead hydride, tricyclohexyllead hydride, and tris(1-naphtyl)lead hydride.

Also useful therefor are cadmium acetylacetonate, iron(II) acetylacetonate, iron(III) acetylacetonate, cobalt(II) acetylacetonate, cobalt(III) acetylacetonate, nickel(II) acetylacetonate, calcium acetylacetonate, zinc acetylacetonate, lead(II) acetylacetonate, manganese(II) acetylacetonate, ferrocene, cobaltocene, nickelocene, manganocene, decamethylferrocene, decamethylcobaltocene, decamethylnickelocene, decamethylmanganocene, and so forth.

Of the above compounds, the non-reducing source compound may be a compound derived from a reducing source compound, or a compound derived in the process of the catalyst preparation, similarly as described for the magnesium compound. To derive the non-reducing source compound from a reducing source compound, for example, the reducing source compound is brought into contact with a compound such as a polysiloxane compound, a halogen-containing silane compound, a halogen-containing aluminum compound, an ester, an alcohol, a halogen-containing compound, or a compound having an OH group or an active carbon-oxygen linkage. The reducing source compound or the non-reducing source compound may be in a state of a complex compound or double compound with another organometallic compound of aluminum, zinc, boron, beryllium, sodium, potassium, or the like, or a mixture thereof. The source compound may be used singly or in combination of two or more thereof, or may be in a state of a liquid or a solid. The source compound which is in a solid state can be converted to be in a liquid state by use of an oxygen-containing compound or nitrogen-containing compound (C) described later, similarly as the magnesium compound.

The ionic-bonding compound (b-1) in the present invention, when used in a solid state, is preferably in a finer crystal particle size. For finer crystal particle size, for example, the fine crystalline matter is deposited from a liquid, or pulverized mechanically by a ball mill, or a vibrating mill.

For depositing the ionic-bonding compound (b-1) from a liquid state, for example, a magnesium compound as the component (B), an alcohol, a carboxylic acid, or an amine as the component (C), and an organoaluminum compound as the component (D) are employed, and the component (B) and the component (C) are brought into contact in a hydrocarbon solution to form a complex in a liquid state, and then the complex is brought into contact with the component (D) to deposit the ionic-bonding compound (b-1).

In the case where magnesium chloride in a solid state is used, for example, the fine crystal of the magnesium chloride is in a size preferably not larger than 250 Å, more preferably not larger than 150 Å. The polymerization activity of the catalyst tends to be higher with the magnesium chloride having fine crystal size of not more than 250 Å.

The fine crystal size can be determined by measuring the half value width of the (110) face of the magnesium chloride by an X-ray diffraction apparatus, and calculating the size according to the known Scherrer's equation (in the equation, the constant K being 0.9). The method of measuring the fine crystal size according to the Scherrer' equation is described in detail in B. D. Cullity: "X-sen Kaisetu Yoron (Elements of X-ray diffraction)(translated by G. Matsumura), Agune K. K.).

(b-2) Clay•Clay Minerals, or Ion-Exchange Layered Compound

The clay is usually constituted of a clay mineral as the main component. The ion-exchange layered compound is a compound having a crystal structure constituted of layers formed by ionic-bonding and piled in parallel by weak bonding force, and is capable of exchanging the contained ions.

The clay•clay minerals or ion-exchange layered compound can be used of artificial minerals or naturally produced minerals.

Most of clay minerals are constituted of combination of tetrahedron-constituted sheets having silica tetrahedrons connected continuously two-dimensionally and octahedron-constituted sheets having alumina octahedrons or magnesia octahedrons connected continuously two-dimensionally. The constitution includes 1:1-layer structures in which a tetrahedron sheet and an octahedron sheet are combined, and 2:1-layer structures in which one octahedron sheet is held between two tetrahedron sheets with the apexes of the tetrahedrons of the sheets counterposed. The clay mineral constituted by piling of the 1:1-layer is called a 1:1 type mineral, and the clay mineral constituted by piling basically the 2:1-layer is called a 2:1 type mineral. The clay mineral which is constituted of combination of an 1:1 type mineral or 2:1 type mineral with other 1:1 type mineral or 2:1 type mineral is called a mixed-layer mineral. The layers as a whole are charged negatively by lack of positive charges in the interior of the layers caused by partial isomorphous replacement of $Si^{4+}$ of the silica octahedron by $Al^{3+}$, $Al^{3+}$ of the alumina octahedron by $Mg^{2+}$, or $Mg^{2+}$ of magnesia octahedron by $Li^+$. The negative charge is compensated by cations held between the layers. The interlayer cations are exchangeable with other cations. Therefore, most of clay minerals are an ion-exchange layered compound.

The clay•clay mineral includes specifically:
1:1 type ion-exchange layered compounds including kaolin minerals such as kaolinite, dickite, nacrite, halloysite, and anauxite; serpentine minerals such as chrysotile, lizardite, and antigorite; serpentine analogue minerals such as pecoraite, nepouite, greenalite, caryopilite, amesite, aluminiam lizardite, berthierine, brindleyite, kellyite, and cronstedite;
2:1 type ion-exchange layered compounds including pyrophilite-talc minerals such as pyrophyllite, talc, kerolite, willemseite, pimelite, and minnesetaite; mica clay minerals such as illite, sericite, glauconite, celadonite, and tobelite; chlorites such as Mg chlorite, FeMg chlorite, Fe chlorite, nimite, pennantite, donbassite, sudoite, and cookeite; vermiculite minerals such as vermiculite; smectites such as montmorillonite, beidllite, nontronite, saponite, hectorite, sauconite, and stevensite;
mixed layer minerals as the ion-exchange compounds including mica/smectite mixed layer minerals such as illite/montmorillonite, sericite/montmorillonite, glauconite/smectite, and rectorite; chlorite/smectite mixed layer minerals such as sudoite/montmorillonite, donbassite/montmorillonite, and to sudite, mica/chlorite mixed layer minerals; mica/chlorite/smectite mixed layer minerals; black mica/vermiculite mixed layer minerals such as hydrobiotite; and chlorite/vermiculite mixed layer minerals such as corrensite).

Artificial minerals include synthetic mica, synthetic hectorite, synthetic saponite, and synthetic teaniolite.

The clay•clay minerals not belonging to the ion-exchange layered compounds include sepiolite, palygorskite having a shape of a fiber and belonging to 2:1 ribbon type minerals, and allophane, and imogolite classified as amorphous or low-crystalline minerals.

Further, a clay called bentonite containing montmorillonite at a low content, Kibushi clay containing montmorillonite and a lot of other components, gairome clay, and so forth are useful therefor.

Also, useful therefor are ionic crystalline compounds having layered crystal structure of a hexagonal closest packing type, and of an antimony type as the ion-exchange layered compounds not being a clay•clay minerals.

The specific examples include acidic crystalline salts of multivalent metals such as $\alpha\text{-}Zr(HAsO_4)_2.H_2O$, $\alpha\text{-}Zr(HPO_4)_2$, $\alpha\text{-}Zr(KPO_4)_2.3H_2O$, $\alpha\text{-}Ti(HPO_4)_2$, $\alpha\text{-}Ti(HAsO_4)_2.H_2O$, $\alpha\text{-}Sn(HPO_4)_2.H_2O$, $\gamma\text{-}Zr(HPO_4)_2$, $\gamma\text{-}Ti(HPO_4)_2$, and $\gamma\text{-}Ti(NH_4PO_4)_2.H_2O$.

Of the above substances, preferred are the clay•clay minerals, and the more preferred ones include smectitess such as montmorillonite, beidellite, nontronite, saponite, hectorite, sauconite, and stevensite; vermiculite minerals such as vermiculite; synthetic mica; synthetic hectorite; synthetic saponite; and synthetic teaniolite. Particularly preferred are montmorillonite, vermiculite, synthetic mica, synthetichectorite, syntheticsaponite, syntheticteaniolite, and so forth.

The above substances may be used without special treatment, or may be used after treatment with a ball mill, or after sieving treatment.

The clay•clay mineral is preferably chemically treated. The chemical treatment includes surface treatment for removal of an impurity from the surface, and treatment for affecting the crystal structure of the clay. Specifically the chemical treatment includes acid treatment, alkali treatment, salt treatment, and organic material treatment. The acid treatment removes an impurity from the surface, or dissolves out cations, such as Al, Fe, and Mg, from the crystal structure to increase the surface area. The alkali treatment destroys the crystal structure of the clay to change the construction of the clay. The salt treatment or the organic substance treatment forms an ion complex, a molecular complex, or an organic derivative to change the surface area or the interlayer distance.

In the aforementioned pretreatment, the contained exchangeable metal ion is preferably ion-exchanged by the cation dissociated from the salt and/or the acid shown below. The salt for the ion exchange is a compound constituted of a cation of at least one kind of atom selected from the atoms of Groups 1–14 of Periodic Table, and an anion derived from at least one atom or atomic group selected from the group of halogen atoms, inorganic acids, and organic acids. More preferably, the salt is a compound composed of a cation of at least one kind of atom selected from the atoms of Groups 2–14 of Periodic Table, and at least one anion selected from the group of Cl, Br, I, F, $PO_4$, $SO_4$, $NO_3$, $CO_3$, $C_2O_4$, $ClO_4$, $OOCCH_3$, $CH_3COCHCOCH_3$, $OCl_2$, $O(NO_3)_2$, $O(ClO_4)_2$, $O(SO_4)_2$, OH, $O_2Cl_2$, $OCl_3$, OOCH, and $OOCCH_2CH_3$. Two or more of the salts may be simultaneously used.

The acid used for the above ion-exchange is not speccially limited, but is preferably selected from hydrochloric acid, sulfuric acid, nitric acid, acetic acid, and oxalic acid. The acid may be used in combination of two or more thereof. The salt treatment and the acid treatment may be conducted in combination: specifically, salt treatment followed by acid treatment, acid treatment followed by salt treatment, simultaneous salt and acid treatment, and salt treatment followed by simultaneous salt and acid treatment.

The ion-exchange layered compound may be a layered compound having an interlayer space expanded by exchanging the exchangeable interlayer ions by other bulky ions by utilizing the ion-exchangeability. Such bulky ions serve as a support for keeping the layer structure, being called a pillar. The introduction of a foreign substance between the layers of the layered compound is called intercalation. The guest compound to be intercalated includes cationic inorganic compounds such as $TiCl_4$, and $ZrCl_4$; metal alkoxides such as $Ti(OR)_4$, $Zr(OR)_4$, $PO(OR)_3$, and $B(OR)_3$ (R being a hydrocarbon group or the like); and metal hydroxide ions such as $[Al_{13}O_4(OH)_{24}]^{7+}$, $[Zr_4(OH)_{14}]^{2+}$, and $[Fe_3O(OCOCH_3)_6]^+$. These compounds my be used singly or in combination of two or more thereof. The intercalation of such a compound may be conducted in the presence of a polymerizate derived by hydrolys is of a metalalkoxide such as $Si(OR)_4$, $Al(OR)_3$, and $Ge(OR)_4$ (R being a hydrocarbon group or the like), or a colloidal inorganic compound such as $SiO_2$. The pillar may be an oxide formed by intercalation of the above metal hydroxide to the interlayer and subsequent dehydration by heating.

The clay•clay mineral or the ion-exchange compound having been treated as above has preferably a pore volume of pores (20 Å or larger in diameter) of not less than 0.1 cc/g, more preferably in the range of 0.3–5 cc/g as measured by a mercury press-in method. The pore volume is measured by a mercury press-in method by means of a mercury porosimeter in the pore radius range from 20 to $3 \times 10^4$ Å. The carrier having a volume of pores (20 Å or larger in diameter) larger the 0.1 cc/g tends to give higher polymerization activity.

The clay•clay mineral or ion-exchange compound contains usually adsorbed water and interlayer water. The adsorbed water herein means the water adsorbed on the surface of the ion-exchange layered compound or clay•clay mineral or on a crystal fracture surface, and the interlayer water means the water existing between the layers in the crystal. The adsorbed water and the interlayer water is preferably removed before use. The method of the water removal is not specially limited. The water can be removed by thermal dehydration, thermal dehydration under gas stream, thermal dehydration under vacuum, azeotropic dehydration by an organic solvent, or a like method. The heating temperature range is selected not to leave the adsorbed water or the interlayer water, usually not lower than 100° C., preferably not lower than 150° C., but a high temperature which may cause structure damage is not preferred. The heating time is 0.5 hour or more, preferably not less than one hour. After the dehydration, the weight loss by heating and evacuation at a temperature of 200° C. at a pressure of 1 mmHg for 2 hours is preferably not more than 3% by weight.

(b-3) Heteropoly Compound

The heteropoly compound (b-3) is a compound containing an atom selected from the group of silicon, phosphorus, titanium, germanium, arsenic, and tin; and one or more atoms selected from the group of vanadium, niobium, molybdenum, and tungsten.

The heteropoly compound (b-3) includes specifically phosphovanadic acid, germanovanadic acid, arsenovanadic acid, phosphoniobic acid, germanoniobic acid, siliconomolybdic acid, phosphomolybdic acid, titanomolybdic acid, germanomolybdic acid, arsenomolybdic acid, stannomolybdic acid, phosphotungstic acid, germanotungstic acid, stannotungstic acid, phosphomolybdovanadic acid, phosphotungstovanadic acid, germanotungstovanadic acid, phosphomolybdotungstovanadic acid, germanomolybdotungstovanadic acid, phosphomolybdotungstic acid, and phosphomolybdoniobic acid; and salts of these acids with an element of Group 1 or 2 of Periodic Table including specifically lithium, sodium, potassium, rubidium, cesium, beryllium, magnesium, calcium, strontium, and barium, and organic salts such as triphenylethyl salt.

(b-4) Halogenated Lanthanoid Compound

The halogenated lanthanoid compound includes specifically chlorinated lanthanoid compound such as lanthanum chloride, cerium chloride, praseodymium chloride, neodymium chloride, promethium chloride, samarium chloride, europium chloride, gadolinium chloride, terbium chloride, dysprosium chloride, holmiumchloride, erbiumchloride, thuliumchloride, ytterbium chloride, and lutetium chloride; brominated lanthanoid compound such as lanthanum bromide, cerium bromide, praseodymium bromide, neodymium bromide, promethium bromide, samarium bromide, europium bromide, gadolinium bromide, terbium bromide, dysprosium bromide, holmium bromide, erbium bromide, thulium bromide, ytterbium bromide, and lutetium bromide; iodinated lanthanoid compound such as lanthanum iodide, cerium iodide, praseodymium iodide, neodymium iodide, promethium iodide, samarium iodide, europium iodide, gadolinium iodide, terbium iodide, dysprosium iodide, holmium iodide, erbium iodide, thulium iodide, ytterbium iodide, and lutetium iodide; and fluorinated lanthanoid compound such as lanthanum fluoride, cerium fluoride, praseodymium fluoride, neodymium fluoride, promethium fluoride, samarium fluoride, europium fluoride, gadolinium fluoride, terbium fluoride, dysprosium fluoride, holmium fluoride, erbium fluoride, thulium fluoride, ytterbium fluoride, and lutetium fluoride;

The above halogenated lanthanoid compound is required to be contained finally in the catalyst. Therefore, in catalyst preparation, the halogenated lanthanoid compound (b-4) itself need not be employed, but may be formed as one of the final catalyst components from a compound convertible to the component (b-4). In other words, the halogenated lanthanoid compound (b-4) may be formed as the final catalyst component from a compound not belonging to the abovementioned halogenated lanthanoid compound (b-4) during the catalyst component preparation by bringing the compound into contact with a halogen-containing compound not belonging to the halogenated lanthanoid compound (b-4) to cause reaction.

Of the above components (B), preferred are the ionic-bonding compounds (b-1), the heteropoly compounds (b-3), and the halogenated lanthanoid compounds (b-4); more preferably the ionic-bonding compounds (b-1), and the heteropoly compounds (b-3); still more preferably the ionic-bonding compounds (b-1).

(C) Oxygen-Containing Compound or Nitrogen-Containing Compound

The oxygen-containing compound or nitrogen-containing compound (C) includes the oxygen-containing compounds and the nitrogen-containing compounds shown below. The oxygen-containing compounds includes alcohols, phenols, aldehydes, carboxylic acids, ketones, organic halides, esters of organic acids or inorganic acids, ethers, epoxides, acid anhydrides, oxygen-containing sulfur compounds, oxygen-containing phosphorus compounds, and polyethers represented by General Formula (c-1), and diethers represented by General Formula (c-2) below:

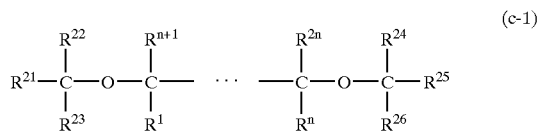
(c-1)

(wherein n is an integer of $2 \leq n \leq 10$; $R^1$–$R^{26}$ are respectively a substituent having at least one kind of atom selected from carbon, hydrogen, oxygen, halogen, nitrogen, sulfur, phosphorus, boron, and silicon; and any of $R^1$–$R^{26}$, preferably $R^1$–$R^{2n}$, may be joined together to form one or more rings other than a benzene ring, and an atom other than carbon may be contained in the main chain);

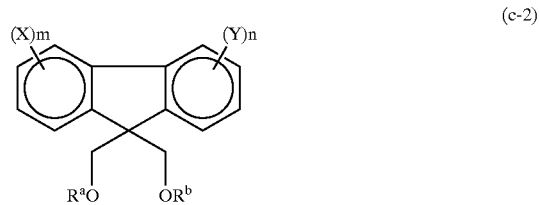
(c-2)

(wherein $R^a$ and $R^b$ may be the same or different, representing independently an alkyl group of 1–6 carbon atoms such as methyl, ethyl, n-propyl, isopropyl, n-butyl, isobutyl, t-butyl, pentyl, hexyl, and 2-ethylhexyl; X and Y may be the same or different, representing an alkyl group of 1–6 carbon atoms, or a halogen atom; m is an integer of $0 \leq m \leq 4$; and n is an integer of $0 \leq n \leq 4$). The nitrogen-containing compound includes ammonia and derivative thereof, amines, amino-containing group, acid amides, acidimides, nitrites, pyridines, and nitro compounds.

The oxygen-containing compound or the nitrogen-containing compound (C) includes further alkoxy group-containing compounds, carbonyl group-containing compounds, and amino group-containing compounds which are not mentioned above for the oxygen-containing compound or nitrogen-containing group (C).

The oxygen-containing compound or nitrogen-containing group (C) includes specifically:

alcohols having 1–18 carbon atoms such as methanol, ethanol, propanol, butanol, pentanol, hexanol, 2-ethylhexanol, octanol, dodecanol, octadecyl alcohol, oleyl alcohol, benzyl alcohol, phenylethyl alcohol, cumyl alcohol, isopropyl alcohol, and isopropylbenzyl alcohol; halogen-containing alcohols of 1–18 carbon atoms such as trichloromethanol, trichloroethanol, and trichlorohexanol;

phenols of 6–20 carbon atoms, which may have a lower alkyl group, such as phenol, cresol, xylenol, ethylphenol, propylphenol, nonylphenol, cumylphenol, and naphthol;

aldehydes of 2–15 carbon atoms such as acetaldehyde, propionaldehyde, octyl aldehyde, benzaldehyde, tolualdehyde, and naphthaldehyde;

carboxylic acids of 1–20 carbon atoms such as formic acid, acetic acid, propionic acid, butyric acid, valeric acid, caproic acid, caprylic acid, capric acid, lauric acid, myristic acid, palmitic acid, stearic acid, oleic acid, linoleic acid, linolenic acid, phenylacetic acid, benzoic acid, toluic acid, phthalic acid, and terephthalic acid;

ketones of 3–15 carbon atoms such as acetone, methyl ethyl ketone, methyl isobutyl ketone, acetophenone, benzophenone, and benzoquinone; acid halides having 2–15 carbon atoms such as acetyl chloride, benzoyl chloride, toluyl acid chloride, and anisyl acid chloride;

organic esters such as methyl formate, methyl acetaate, ethyl acetate, vinyl acetate, propyl acetate, octyl acetate, cyclohexyl acetate, ethyl propionate, methyl butyrate, ethyl varelate, methyl chloroacetate, ethyl dichloroacetate, ethyl trichloroacetate, methyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, ethyl anisate, ethyl ethoxybenzoate, γ-butyrolactone, δ-valerolactone, coumarin, phthalide, and ethyle carbonate; ethers of 2–20 carbon atoms such as methyl ether, ethyl ether, isopropyl ether, butyl ether, amyl ether, tetrahydrofuran, anisole, and diphenyl ether;

epoxides such as ethylene oxide, propylene oxide, and epichlorohydrin;

acid anhydrides such as acetic anhydride, phthalic anhydride, benzoic anhydride;

oxygen-containing sulfur compounds such as diphenyl sulfone, phenyl methyl sulfone, dimethyl sulfoxide, diphenyl sulfoxide, dimethyl sulfite, glycol sulfite, 1,3-butylene glycol sulfite, 1,2-propylene glycol sulfite, dimethyl sulfate, diethyl sulfate, dipropyl sulfate, ethylene sulfate, 1,3-propanediol cyclic sulfate, ethyl chlorosulfonate, 1,3-propane sultone, 1,4-butane sultone, methyl methanesulfonate, methyl p-toluenesulfonate, methyl benzenesulfonate, sulfuryl acetate, acetyl methanesulfonate, sulfamide, N,N-dimethylsulfamide, N,N,N',N'-tetraethylsulfamide, dimethylsulfamoyl chloride, methanesulfonamide, benzenesolfonamide, N-methylbenzenesulfonamide, methylanilinesulfonamide, and N,N-dimethylmethanesulfonamide;

oxygen-containing phosphorus compounds such as trimethyl phosphite, triethyl phosphite, tri-2-ethylhexyl phosphite, pentamethoxyphosphorane, trimethyl phosphate, triethyl phosphate, tri-2-ethylhexyl phosphate, diethyl chlorophosphite, dimethyl chlorophosphate, dimethyldiethoxyphosphine, dimethyl methyl phosphonate, diethyl methyl phosphonate, methyl dichlorophosphite, ethyl phosphorodichloride, methyl dichlorophosphate, ethyl diethyl phosphinate, and dimethyl acethyl phosphine;

diethers such as 2,2-isobutyl-1,3-dimethoxypropane, 2-isopropyl-2-isobutyl-1,3-dimethoxypropane, 2-isopropyl-2-isopentyl-1,3-dimethoxypropane, 2,2-dicyclohexyl-1,3-dimethoxypropane, 2,2-bis(cyclohexylmethyl)-1,3-dimethoxypropane, 2-cyclohexyl-2-isopropyl-1,3-dimethoxypropane, 2-isopropyl-2-s-butyl-1,3-dimethoxypropane, 2,2-diphenyl-1,3-dimethoxypropane, 2-cyclopentyl-2-isopropyl-1,3-dimethoxypropane, 9,9-bis(methoxymethyl)fluorene, 9,9-bis(ethoxymethyl)fluorene, 9-methoxy-9-ethoxymethylfluorene, 9,9-bis(methoxymethyl)-2,7-dimethylfluorene, 9,9-bis(methoxymethyl)-2,6-diisopropylfluorene, 9,9-bis(methoxymethyl)-3,6-diisobutylfluorene, 9,9-bis(methoxymethyl)-2-isobutyl-7-isopropylfluorene, 9,9-bis(methoxymethyl)-2,7-dichlorofluorene, and 9,9-bis(methoxymethyl)-2-chloro-7-isopropylfluorene;

amines such as trimethylamine, triethylamine, tributylamine, tribenzylamine, and tetramethylethylenediamine;

acid amides such as N,N-dimethylacetamide, N,N-diethylbenzamide, and N,N-dimetyltoluamide;
acid imides such as phthalimide, and succinimide;
nitrites such as acetonitrile, benzonitrile, and tolunitrile;
pyridines such as pyridine, methylpyridine, ethylpyridine, and dimethylpyridine; and
nitro compounds such as nitromethane, nitroethane, nitropropane, nitrobenzene, and nitrotoluene.

Alkoxy group-containing compounds, carbonyl group-containing compounds, and amino group-containing compounds not mentioned above for the oxygen-containing compound or nitrogen-containing group include further the compounds having the skeletons represented by General Formulas (c-3) and (c-4) below:

$$M^1A_{m1}X_{n1}R^1{}_{3-(m1+n1)} \quad (c\text{-}3)$$

$$M^2A_{m2}X_{n2}R^2{}_{4-(m2+n2)} \quad (c\text{-}4)$$

In the above General Formulas $M^1$ represents Al or B; $M^2$ represents Ge, Si, Ti, or Sn;

$R^1$ and $R^2$ are the same or different, representing independently a hydrocarbon group of 1–12 carbon atoms;

A represents —$OR^3$, —$COR^4$, $OCOR^5$, or —$NR^6R^7$, where $R^3$–$R^7$ represents substituted or unsubstituted hydrocarbon group of 1–12 carbon atoms, the substituent for the substituted $R^3$–$R^7$ of hydrocarbon groups containing a heteroatom such as N, O, or S, for example C—O—C, COOR, and —C—N—C—, and $R^6$ and $R^7$ may be joined together to form a ring.

The hydrocarbon group of 1–12 carbon atoms represented by $R^1$–$R^7$ includes alkyl groups, cycloalkyl groups, alkylene groups, aryl groups, and aralkyl groups, specifically methyl, ethyl, n-propyl, isopropyl, isobutyl, pentyl, hexyl, octyl, 2-ethylhexyl, cyclopentyl, cyclohexyl, vinyl, phenyl, tolyl, and benzyl;

X represents a halogen;

m1 is an integer of 1–3; m2 is an integer of 1–4, n1 is an integer of 0–2, and n2 is an integer of 0–3.

The aforementioned alkoxy group-containing compound, the carbonyl group-containing compounds, and the amino group-containing compounds include specifically:

oxygen-containing aluminum compounds such as trimethoxyaluminum, triethoxyaluminum, triisopropoxyaluminum, tri(2-ethylhexoxy)aluminum, triphenoxyaluminum, methylaluminum-bis(2,6-di-t-butyl-4-methylphenoxide), diethylaluminum ethoxide, tris(acetylacetonato)aluminum, aluminum triacrylate, aluminum triacetate, and aluminum trimethacrylate;

nitrogen-containing aluminum compounds such as tris(dimethylamino)aluminum, tris(diethylamino)aluminum, tris(dipropylamino)aluminum, tris(dibutylamino)aluminum, bis(dimethylamino)aluminum chloride, bis(dimethylamino)aluminum bromide, bis(diethylamino)aluminum chloride, bis(dipropylamino)aluminum chloride, bis(dimethylamino)methylaluminum, bis(dimethylamino)ethylaluminum, bis(dimethylamino)propylaluminum, bis(dimethylamino)isobutylaluminum, bis(dimethylamino)phenylaluminum, dimethylaminoaluminum dichloride, diethylaminoaluminum dichloride, dimethylaminodimethylaluminum, dimethylaminodiethylaluminum, dimethylaminodipropylaluminum, dimethylaminodiisobutylaluminum, dimethylaminodioctylaluminum, and dimethylaminodiphenylaluminum;

oxygen-containing boron compounds such as trimethyl borate, triethylborate, triisopropylborate, tri-2-ethylhexylborate, triphenyl borate, diisopropoxymethyl borane, butyldiisopropoxyborane, diisopropoxyphenylborane, and diethylmethoxyborane;

nitrogen-containing boron compounds such as tris(dimethylamino)borane, tris(diethylamino)borane, tris(dipropylamino)borane, bis(dimethylamino)chloroborane, bis(dimethylamino)bromoborane, bis(dimethylamino)methylborane, bis(dimethylamino)ethylborane, bis(dimethylamino)propylborane, bis(dimethylamino)butylborane, bis(dimethylamino)phenylborane, dimethylaminodichloroborane, dimethylaminodibromoborane, dimethylaminodimethylborane, dimethylaminodiethylborane, dimethylaminodipropylborane, dimethylaminodiisobutylborane, and dimethylaminodiphenylborane;

oxygen-containing titanium compounds such as tetremethoxytitanium, tetraethoxytitanium, tetraisopropoxytitanium, tetrabutoxytitanium, tetra-2-ethylhexoxytitanium, tetraphenoxytitanium, tetrabenzyloxytitanium, triisopropoxychlorotitanium, triisopropoxyiodotitanium, diethoxydichlorotitanium, diisopropoxydichlorotitanium, and titanium tetramethacrylate;

nitrogen-containing titanium compounds such as tetrakis(dimethylamino)titanium, tetrakis(diethylamino)titanium, tris(dimethylamino)chlorotitanium, tris(dimethylamino)bromotitanium, tris(diethylamino)chlorotitanium, bis(dimethylamino)dichlorotitanium, bis(diethylamino)dichlorotitanium, dimethylaminotrichlorotitanium, and diethylaminotrichlorotitanium;

oxygen-containing silane compounds such as tetramethoxysilane, tetraethoxysilane, tetrapropoxysilane, tetrabutoxysilane, tetra-2-ethylhexoxysilane, tetraphenoxysilane, tetrabenzyloxysilane, ethyltrimethoxysilane, ethyltriethoxysilane, vinyltrimethoxysilane, methyltrimethoxysilane, n-propyltriethoxysilane, decyltrimethoxysilane, decyltriethoxysilane, phenyltrimethoxysilane, γ-chloropropyltrimethoxysilane, methyltriethoxysilane, ethyltriethoxysilane, vinyltriethoxysilane, t-butyltriethoxysilane, n-butyltriethoxysilane, isobutyltriethoxysilane, phenyltriethoxysilane, γ-aminopropyltriethoxysilane, ethyltriisopropoxysilane, vinyltributoxysilane, vinyltriacetoxysilane, methyltriallyloxysilane, cyclopentyltrimethoxysilane, hexenyltrimethoxysilane, 2-methylcyclopentyltrimethoxysilane, 2,3-dimethylcyclopentyltrimethoxysilane, cyclopentyltriethoxysilane, cyclohexyltrimethoxysilane, cyclohexyltriethoxysilane, 2-norbornanetrimethoxysilane, 2-norbornanetriethoxysilane, dimethyldimethoxysilane, dimethyldiethoxysilane, diisopropyldimethoxysilane, t-butylmethyldimethoxysilane, t-butylmethyldiethoxysilane, t-amylmethyldiethoxysilane, diphenyldimethoxysilane, phenylmethyldimethoxysilane, diphenyldiethoxysilane, bis(o-tolyl)dimethoxysilane, bis(m-tolyl)dimethoxysilane, bis(p-tolyl)dimethoxysilane, bis(p-tolyl)diethoxysilane, bis(ethylphenyl)dimethoxysilane, dicyclohexyldimethoxysilane, cyclohexylmethyldimethoxysilane, cyclohexylmethyldiethoxysilane, 2-norbornanemethyldimethoxysilane, dicyclopentyldimethoxysilane, bis(2-methylcyclopentyl) dimethoxysilane, bis(2,3-dimethylcyclopentyl) dimethoxysilane, dicyclopentyldiethoxysilane, trimethylmethoxysilane, trimethylethoxysilane, trimethylphenoxysilane, tricyclopentylmethoxysilane, tricyclopentylethoxysilane, dicyclopentylmethylmethoxysilane, dicyclopentylethylmethoxysilane, dicyclopentylmethylethoxysilane, cyclopentyldimethylmethoxysilane, cyclopentyldiethylmethoxysilane, cyclopentyldimethylethoxysilane, ethyl silicate, butyl silcate, vinyl-tris(β-methoxyethoxy)silane, dimethyltetraethoxydisiloxane, trimethoxychlorosilane, triethyoxychlorosilane, tripropoxychlorosilane, tributoxychlorosilane, tri-2-ethylhexoxychlorosilane, triphenoxychlorosilane, trimethoxybromosilane, triethyoxybromosilane, tripropoxybromosilane, tributoxybromosilane, tri-2-ethylhexoxybromosilane, triphenoxybromosilane, dibenzyloxydichlorosilane, phenoxytrichlorosilane, silicon acetate, silicon benzoate, silicon 2-ethylhexanoate, methyltriacetoxysilane, ethyltriacetoxysilane, vinylmethyldiacetoxysilane, phenylmethydiacetoxysilane, diphenyldiacetoxysilane, dimethyldiacetoxysilane, trimethylacetoxysilane, acetyltriphenylsilane, benzoyltriphenylsilane, and acetyltrimethylsilane;

nitrogen-containing silane compounds such as tetrakis(dimethylamino) silane, tetrakis (diethylamino) silane, tris(dimethylamiono)chlorsilane, tris(diethylamino) chlorosilane, tris(dimethylamino)methylsilane, tris(dimethylamino)ethylsilane, tris(dimethylamino) phenylsilane, bis(dimethylamino)dichlorosilane, bis(dimethylamino)methylchlorosilane, bis(dimethylamino) phenylchlorosilane, bis(dimethyolamino)dimethylsilane, bis(dimethylamino)diphenylsilane, bis(diethylamino) dimethylsilane, dimethylaminotrichlorosilane, diethylaminotrichlorosilane, dimethylaminotrimethylsilane, dimethylaminomethyldichlorosilane, and trimethylsilylpyrrole;

oxygen-containing germanium compounds such as tetramethoxygermane, tetraethoxygermane, tetrapropoxygermane, tetrabutoxygermane, tetra-2-ethylhexoxygermane, tetraphenoxygermane, methyltriethoxygermane, ethyltriethoxygermane, diethyldiethoxygermane, triethylmethoxygermane, butyldiacetoxygermane, tributylacetoxygermane, triethylmethacryloxygermane, and triphenylacetylgermane;

nitrogen-containing germanium compounds such as tetrakis(dimethylamino)germane, tetrakis(diethylamino)germane, tris(dimethylamino)chlorogermane, tris(dimethylamino)methylgermane, tris(dimethylamino)ethylgermane, bis(dimethylamino)dichlorogermane, bis(dimethylamino)dimethylgermane, bis(dimethylamino)diethylgermane, dimethylaminotrichlorogermane, diethylaminotrichlorogermane, dimethylaminotrimethylgermane, dimethylaminotriethylgermane, and dimethylaminotriphenylgermane;

oxygen-containing tin compounds such as bis(acetylacetonato)dichlorotin, dibutyldimethoxytin, dibutyldibutoxytin, tributylmethoxytin, tributylethoxytin, tin acetate, tin methacrylate, butyl-tris(2-ethylhexanoate)tin, dimethyldiacetoxytin, dibutyldiacetoxytin, tripropylacetoxytin, and tributylacetoxytin; and nitrogen-containing tin compounds such as tetrakis(dimethylamino)tin, tetrakis(diethylamino)tin, tris(dimethylamino)chlorotin, tris(dimethylamino)bromotin, tris(dimethylamino)methyltin, bis(dimethylamino) dichlorotin, bis(dimethylamino)dimethyltin, bis(dimethylamino)diethyltin, dimethylaminotrichlorotin, dimethylaminotrimethyltin, dimethylaminotriethyltin, diethylaminotrimethyltin, dimethylaminotributyltin, and triphenylpiperidinotin.

The above oxygen-containing compound or nitrogen-containing compound (C) is required to be contained finally in the catalyst. Therefore, in catalyst preparation, the oxygen-containing compound or nitrogen-containing compound (C) itself need not be used as the source material. Thus, the oxygen-containing compound or nitrogen-containing compound (C) may be formed during the catalyst preparation from a compound capable of forming the oxygen-containing compound or nitrogen-containing compound (C) as the final catalyst component. In other words, a compound not belonging to the oxygen-containing compound or nitrogen-containing compound (C) is subjected to a reaction with an oxgen-containing compound or nitrogen-containing compound other than the above oxgen-containing compound or nitrogen-containing compound (C) during the catalyst component preparation to form the oxygen-containing compound or nitrogen-containing compound (C) as the final catalyst component.

The oxygen-containing compounds and the nitrogen-containing compounds for obtaining the compound (C) include preferably alcohols of 1–18 carbon atoms, halogen-containing alcohols of 1–18 carbon atoms, phenols of 6–20 carbon atoms which may have a lower alkyl group, aldehydes of 2–15 carbon atoms, carboxylic acids of 1–20 carbon atoms, ketones of 3–15 carbon atoms, acid halides of 2–15 carbon atoms, organic acid esters, ethers of 2–20 carbon atoms, epoxides, acid anhydrides, diethers, oxygen-containing aluminum compounds, oxygen-containing boron compounds, oxygen-containing titanium compounds, oxygen-containing silane compounds, amines, acid amides, acid imides, nitrogen-containing aluminum compounds, nitrogen-containing boron compounds, nitrogen-containing titanium compounds, nitrogen-containing silane compounds, and compounds capable of forming the above-mentioned compounds.

Of these, more preferable are alcohols of 1–18 carbon atoms, halogen-containing alcohols of 1–18 carbon atoms, aldehydes of 2–15 carbon atoms, carboxylic acids of 1–20 carbon atoms, ketones of 3–15 carbon atoms, acid halides of 2–15 carbon atoms, organic acid esters, ethers of 2–20 carbon atoms, diethers, oxygen-containing aluminum compounds, oxygen-containing titanium compounds, oxygen-containing silane compound, amines, nitrogen-containing aluminum compounds, nitrogen containing titanium compounds, nitrogen-containing silane compounds, and compounds capable of forming the above-mentioned compounds.

Still more preferable are alcohols of 1–18 carbon atoms, halogen-containing alcohols of 1–18 carbon atoms, carboxylic acids of 1–20 carbon atoms, organic acid esters, diethers, oxygen-containing aluminum compounds, oxygen-containing titanium compounds, oxygen-containing silane compound, and amines.

(D) Inactivating Compound to React with Oxygen-Containing Compound or Nitrogen-Containing Compound (C) for Inactivation Thereof to Transition Metal Compound (A)

The inactivating compound (D) includes organoaluminum compounds, halogenated boron compounds, halogenated phosphorus compounds, halogenated sulfur compounds, halogenated titanium compounds, halogenated silane compounds, halogenated germanium compounds, and halogenated tin compounds. When the inactivating compound (D) is employed, the compound (D) is not the same as the oxygen-containing compound or nitrogen-containing compound (C).

The organic aluminum compound includes the compound represented by the formula below:

wherein $R^a$ is a hydrocarbon group of 1–12 carbon atoms; X is a halogen atom or a hydrogen atom; and n is a number of 1–3.

The hydrocarbon group of 1–12 carbon atoms includes alkyl groups, cycloalkyl groups, and aryl groups; specifically including methyl, ethyl, n-propyl, isopropyl, isobutyl, pentyl, hexyl, octyl, cyclopentyl, cyclohexyl, phenyl, and tolyl.

The organoaluminum compound includes specifically the compounds below:
trialkylaluminum such as trimethylaluminum, triethylaluminum, triisopropylaluminum, triisobutylaluminum, trioctylaluminum, tri-2-ethylhexylaluminum;
alkenylaluminum such as isoprenyl aluminum; dialkylaluminum halide such as dimethylaluminum chloride, diethylaluminum chloride, diisopropylaluminum chloride, diisobutylaluminum chloride, and dimethylaluminum bromide; alkylaluminum sesquihalide such as methylaluminum sesquichloride, ethylaluminum sesquichloride, isopropylaluminum sesquichloride, butylaluminum sesquichloride, and ethylaluminum sesquibromide;
alkylaluminum dihalide such as methylaluminum dichloride, ethylaluminum dichloride, isopropylaluminum dichloride, and ethyaluminum dibromide; and
alkylaluminum hydride such as diethylaluminum hydride, and diisobutylaluminum hydride.

The alkylaluminum compounds represented by the formula below are also useful:

wherein $R^a$ is the same as that defined above; Y represents groups of $-OR^b$, $-OSiR^c{}_3$, $-OAlR^d{}_2$, $-NR^e{}_2$, $-SiR^f{}_3$, or $-N(R^g)AlR^h{}_2$; n is a number of 1–2; $R^b$, $R^c$, $R^d$, and $R^h$ represent respectively groups of methyl, ethyl, isopropyl, isobutyl, cyclohexyl, phenyl, or the like; $R^e$ represents hydrogen, methyl, ethyl, isopropyl, phenyl, trimethylsilyl, or the like; and $R^f$ and $R^g$ represent respectively methyl, ethyl, or the like.

Such organoaluminum compound include specifically the compounds below.
(i) compounds represented by $R^a{}_nAl(OR^b)_{3-n}$:
  alkylaluminum alkoxide such as dimethylaluminum methoxide, diethylaluminum ethoxide, diisobutylaluminum methoxide, and diethylaluminum 2-ethylhexoxide;
(ii) compounds represented by $R^a{}_nAl(OSiR^c{}_3)_{3-n}$:
  $Et_2Al(OSiMe_3)$, $(iso-Bu)_2Al(OSiMe_3)$, $(iso-Bu)_2Al(OSiEt_3)$, and the like;
(iii) compounds represented by $R^a{}_nAl(OAlR^d{}_2)_{3-n}$:
  $Et_2AlOAlEt_2$, $(iso-Bu)_2AlOAl(iso-Bu)_2$, and the like;
(iv) compounds represented by $R^a{}_nAl(NR^e{}_2)_{3-n}$:
  $Me_2AlNEt_2$, $Et_2AlNHMe$, $Me_2AlNHEt$, $Et_2AlN(Me_3Si)_2$, $(iso-Bu)_2AlN(Me_3Si)_2$, and the like;
(v) compounds represented by $R^a{}_nAl(SiR^f{}_3)_{3-n}$:
  $(iso-Bu)_2AlSiMe_3$, and the like;
(vi) compounds represented by $R^a{}_nAl[N(R^g)-AlR^h{}_2]_{3-n}$:
  $Et_2AlN(Me)-AlEt_2$, $(iso-Bu)_2AlN(Et)Al(iso-Bu)_2$, and the like;

The alkylated complexes of a metal of Group 1 and aluminum represented by the formula below are also useful as the organoaluminum compound:

where $M^1$ is Li, Na, or K; and $R^j$ is a hydrocarbon group of 1–15 carbon atoms.

The complex includes specifically $LiAl(C_2H_5)_4$, and $LiAl(C_7H_{15})_4$.

Specific examples of the aforementioned halogenated boron compounds, halogenated phosphorus compounds, halogenated sulfur compounds, halogenated germanium compounds, halogenated silane compounds, halogenated titanium compounds, and halogenated tin compounds are shown below: halogenated boron compounds such as boron trifluoride, boron trichloride, and boron tribromide;
halogenated phosphorus compounds such as phosphorus trichloride, phosphorus tribromide, phosphorus triiodide, phosphorus pentachloride, phosphorus pentabromide, phosphorus oxychloride, phosphorus oxybromide, methyldichlorophosphine, ethyldichlorophosphine, propyldichlorophosphine, butyldichlorophosphine, cyclohexyldichlorophosphine, phenyldichlorophosphine, methyldichlorophosphine oxide, ethyldichlorophosphine oxide, butyldichlorophosphine oxide, cyclohexyldichlorophosphine oxide, phenyldichlorophosphine oxide, methylphenylchlorophosphine oxide, dibromotriphenylphosphorane, tetraethylphosphonium chloride, dimethyldiphenylphosphonium iodide, ethyltriphenylphosphonium chloride, allyltriphenylphosphonium chloride, benzyltriphenylphosphoniumchloride, allyltriphenylphosphonium bromide, butyltriphenylphosphonium bromide, and benzyltriphenylphosphonium bromide;
halogenated sulfur compounds such as sulfur dichloride, thionyl chloride, sulfuryl chloride, and thionyl bromide;
halogenated titanium compounds such as titanium tetrafluoride, titanium tetrachloride, titanium tetrabromide, titanium tetraiodide, methoxytrichlorotitanium, ethoxytrichlorotitanium, butoxytrichlorotitanium, ethoxytribromotitanium, butoxytribromotitanium, dimethoxydichlorotitanium, diethoxydichlorotitanium, dibutoxydichlorotitanium, diethoxydibromotitanium, trimethoxychlorotitanium, triethoxychlorotitanium, tributoxychlorotitanium, and triethoxybromotitanium;
halogenated silane compounds such as silicon tetrachloride, silicon tetrabromide, silicon tetraiodide, methoxytrichlorosilane, ethoxytrichlorosilane, butoxytrichlorosilane, ethoxytribromosilane, butoxytribromosilane, dimethoxydichlorodsilane, diethoxydichlorosilane, dibutoxydichlorosilane, diethoxydibromosilane, trimethoxychlorosilane, triethoxychlorosilane, tributoxychlorosilane, triethoxybromosilane, methyltrichlorosilane, ethyltrichlorosilane, butyltrichlorosilane, phenyltrichlorosilane, dimethyldichlorosilane, diethyldichlorosilane, dibutyldichlorosilane, diphenyldichlorosilane, trimethylchlorosilane, triethylchlorosilane, tributylchlorosilane, and triphenylchlorosilane;
halogenated germanium compounds such as germanium tetrafluoride, germaniumtetrachloride, germaniumtetraiodide, methoxytrichlorogermanium, ethoxytrichlorogermanium, butoxytrichlorogermanium, ethoxytribromogermanium, butoxytribromogermanium, dimethoxydichlorogermanium, diethoxydichlorogermanium, dibutoxydichlorogermanium, diethoxydibromogermanium, trimethoxychlorogermanium, triethoxychlorogermanium, tributoxychlorogermanium, and triethoxybromogermanium;

halogenated tin compounds such as tin tetrafluoride, tin tetrachloride, tin tetrabromide, tin tetraiodide, methoxytrichlorotin, ethoxytrichlorotin, butoxytrichlorotin, ethoxytribromotin, butoxytribromotin, dimethoxydichlorotin, diethoxydichlorotin, dibutoxydichlorotin, diethoxydibromotin, trimethoxychorotin, triethoxychlorotin, tributoxychlorotin, triethoxybromotin, methyltrichlorotin, ethyltrichlorotin, butyltrichlorotin, phenyltrichlorotin, dimethyldichlorotin, diethyldichlorotin, dibutyldichlorotin, diphenyldichlorotin, trimethylchlorotin, triethylchlorotin, tributylchlorotin, and triphenylchlorotin;

The above compounds may be used singly or in combination of two or more thereof, or may be diluted with a hydrocarbon or a halogenated hydrocarbon.

Of the specific examples of Component (D), prefered are trialkylaluminums, alkenylaluminums, dialkylaluminum halides, alkylaluminum sesquihalides, alkylaluminum dihalides, alkylaluminum hydrides, alkylaluminum alkoxides, (iso-Bu)$_2$Al(OSiMe$_3$), (iso-Bu)$_2$Al(OSiEt$_3$), Et$_2$AlOAlEt$_2$, (iso-Bu)$_2$AlOAl(iso-Bu)$_2$, LiAl(C$_2$H$_5$)$_4$, halogenated silane compounds, and halogenated titanium compounds.

More preferable are trialkylaluminums, alkenylaluminums, dialkylaluminum halides, alkylaluminum sesquihalides, alkylaluminum dihalides, alkylaluminum hydrides, and alkylaluminum alkoxides.

Next, preferable combinations of the catalyst components constituting the olefin polymerization catalyst of the present invention are shown below:

combination of a transition metal compound represented by General Formula (I) (hereinafter simply referred to as "Compound (I)") and an ionic-bonding compound having the CdI$_2$ type or CdCl$_2$ type layered crystal structure (b-1) (hereinafter simply referred to as "(b-1)");
combination of Compound (I), (b-1), and at least one compound selected from oxygen-containing compounds and nitrogen-containing compounds (hereinafter simply "(C)");
combination of (I), (b-1), (C), and at least one compound selected from inactivating compounds capable of reacting with (C) to make (C) inactive to (I)(hereinafter simply "(D)");
combination of Compound (I), and at least one Lewis acid selected from clay•clay minerals and ion-exchange compounds (b-2) (hereinafter simply "(b-2)");
combination of Compound (I), (b-2), and (C);
combination of Compound (I), (b-2), (C), and (D);
combination of Compound (I), and at least one Lewis acid selected from the heteropoly compounds (b-3)(hereinafter simply "(b-3) ");
combination of Compound (I), (b-3), and (C);
combination of Compound (I), (b-3), (C), and (D);
combination of Compound (I) and at least one Lewis acid selected from the halogenated lanthanoid compound (b-4) (hereinafter simply "(b-4)");
combination of Compound (I), (b-4), and (C);
combination of Compound (I), (b-4), (C), and (D);
combination of the transition metal compound represented by General Formula (II)(hereinafter simply "Compound (II)"), and (b-1);
combination of Compound (II), (b-1), and (C);
combination of Compound (II), (b-1), (C), and (D);
combination of Compound (II), and (b-2);
combination of Compound (II), (b-2), and (C);
combination of Compound (II), (b-2), (C), and (D);
combination of Compound (II), and (b-3);
combination of Compound (II), (b-3), and (C);
combination of Compound (II), (b-3), (C), and (D);
combination of Compound (II), and (b-4);
combination of Compound (II), (b-4), and (C);
combination of Compound (II), (b-4), (C), and (D);
combination of the transition metal compound represented by General Formula (III)(hereinafter simply "Compound (III)"), and (b-1);
combination of Compound (III), (b-1), and (C);
combination of Compound (III), (b-1), (C), and (D);
combination of Compound (III), and (b-2);
combination of Compound (III), (b-2), and (C);
combination of Compound (III), (b-2), (C), and (D);
combination of Compound (III), and (b-3);
combination of Compound (III), (b-3), and (C);
combination of Compound (III), (b-3), (C), and (D);
combination of Compound (III), and (b-4);
combination of Compound (III), (b-4), and (C);
combination of Compound (III), (b-4), (C), and (D);
combination of the transition metal compound represented by General Formula (IVa) (hereinafter simply "Compound (IVa)"), and (b-1);
combination of Compound (IVa), (b-1), and (C);
combination of Compound (IVa), (b-1), (C), and (D);
combination of Compound (IVa), and (b-2);
combination of Compound (IVa), (b-2), and (C);
combination of Compound (IVa), (b-2), (C), and (D);
combination of Compound (IVa), and (b-3);
combination of Compound (IVa), (b-3), and (C);
combination of Compound (IVa), (b-3), (C), and (D);
combination of Compound (IVa), and (b-4);
combination of Compound (IVa), (b-4), and (C);
combination of Compound (IVa), (b-4), (C), and (D);
combination of the transition metal compound represented by General Formula (IVb) (hereinafter simply "Compound (IVb)"), (b-1), and (C);
combination of Compound (IVb), (b-1), (C), and (D);
combination of Compound (IVb), (b-2), and (C);
combination of Compound (IVb), (b-2), (C), and (D);
combination of Compound (IVb), and (b-3);
combination of Compound (IVb), (b-3), and (C);
combination of Compound (IVb), (b-3), (C), and (D);
combination of Compound (IVb), and (b-4);
combination of Compound (IVb), (b-4), and (C);
combination of Compound (IVb), (b-4), (C), and (D);
combination of the transition metal compound represented by General Formula (IVc) (hereinafter simply "Compound (IVc)"), and (b-1);
combination of Compound (IVc), (b-1), and (C);
combination of Compound (IVc), (b-1), (C), and (D);
combination of Compound (IVc), and (b-2);
combination of Compound (IVc), (b-2), and (C);
combination of Compound (IVc), (b-2), (C), and (D);
combination of Compound (IVc), and (b-3);
combination of Compound (IVc), (b-3), and (C);
combination of Compound (IVc), (b-3), (C), and (D);
combination of Compound (IVc), and (b-4);
combination of Compound (IVc), (b-4), and (C);
combination of Compound (IVc), (b-4), (C), and (D);
combination of the transition metal compound represented by General Formula (V) (hereinafter simply "Compound (V)"), and (b-1);
combination of Compound (V), (b-1), and (C);
combination of Compound (V), (b-1), (C), and (D);
combination of Compound (V), and (b-2);
combination of Compound (V), (b-2), and (C);

combination of Compound (V), (b-2), (C), and (D);
combination of Compound (V), and (b-3);
combination of Compound (V), (b-3), and (C);
combination of Compound (V), (b-3), (C), and (D);
combination of Compound (V), and (b-4);
combination of Compound (V), (b-4), and (C);
combination of Compound (V), (b-4), (C), and (D);
combination of the transition metal compound represented by General Formula (VI) (hereinafter simply "Compound (VI)"), and (b-1);
combination of Compound (VI), (b-1), and (C);
combination of Compound (VI), (b-1), (C), and (D);
combination of Compound (VI), and (b-2);
combination of Compound (VI), (b-2), and (C);
combination of Compound (VI), (b-2), (C), and (D);
combination of Compound (VI), and (b-3);
combination of Compound (VI), (b-3), and (C);
combination of Compound (VI), (b-3), (C), and (D);
combination of Compound (VI), and (b-4);
combination of Compound (VI), (b-4), and (C);
combination of Compound (VI), (b-4), (C), and (D);
combination of the transition metal compound represented by General Formula (VII) (hereinafter simply "Compound (VII)"), and (b-1);
combination of Compound (VII), (b-1), and (C);
combination of Compound (VII), (b-1), (C), and (D);
combination of Compound (VII), and (b-2);
combination of Compound (VII), (b-2), and (C);
combination of Compound (VII), (b-2), (C), and (D);
combination of Compound (VII), and (b-3);
combination of Compound (VII), (b-3), and (C);
combination of Compound (VII), (b-3), (C), and (D);
combination of Compound (VII), and (b-4);
combination of Compound (VII), (b-4), and (C);
combination of Compound (VII), (b-4), (C), and (D);
combination of the transition metal compound represented by General Formula (VIII) (hereinafter simply "Compound (VIII)"), and (b-1);
combination of Compound (VIII), (b-1), and (C);
combination of Compound (VIII), (b-1), (C), and (D);
combination of Compound (VIII), and (b-2);
combination of Compound (VIII), (b-2), and (C);
combination of Compound (VIII), (b-2), (C), and (D);
combination of Compound (VIII), and (b-3);
combination of Compound (VIII), (b-3), and (C);
combination of Compound (VIII), (b-3), (C), and (D);
combination of Compound (VIII), and (b-4);
combination of Compound (VIII), (b-4), and (C);
combination of Compound (VIII), (b-4), (C), and (D);
combination of the transition metal compound represented by General Formula (IX) (hereinafter simply "Compound (IX)"), and (b-1);
combination of Compound (IX), (b-1), and (C);
combination of Compound (IX), (b-1), (C), and (D);
combination of Compound (IX), and (b-2);
combination of Compound (IX), (b-2), and (C);
combination of Compound (IX), (b-2), (C), and (D);
combination of Compound (IX), and (b-3);
combination of Compound (IX), (b-3), and (C);
combination of Compound (IX), (b-3), (C), and (D);
combination of Compound (IX), and (b-4);
combination of Compound (IX), (b-4), and (C);
combination of Compound (IX), (b-4), (C), and (D);
combination of the transition metal compound represented by General Formula (X) (hereinafter simply "Compound (X)"), and (b-1);
combination of Compound (X), (b-1), and (C);
combination of Compound (X), (b-1), (C), and (D);
combination of Compound (X), and (b-2);
combination of Compound (X), (b-2), and (C);
combination of Compound (X), (b-2), (C), and (D);
combination of Compound (X), and (b-3);
combination of Compound (X), (b-3), and (C);
combination of Compound (X), (b-3), (C), and (D);
combination of Compound (X), and (b-4);
combination of Compound (X), (b-4), and (C);
combination of Compound (X), (b-4), (C), and (D);
combination of the transition metal compound represented by General Formula (XIa) (hereinafter simply "Compound (XIa)"), and (b-1);
combination of Compound (XIa), (b-1), and (C);
combination of Compound (XIa), (b-1), (C), and (D);
combination of Compound (XIa), (b-2), and (C);
combination of Compound (XIa), (b-2), (C), and (D);
combination of Compound (XIa), and (b-3);
combination of Compound (XIa), (b-3), and (C);
combination of Compound (XIa), (b-3), (C), and (D);
combination of Compound (XIa), and (b-4);
combination of Compound (XIa), (b-4), and (C);
combination of Compound (XIa), (b-4), (C), and (D);
combination of the transition metal compound represented by General Formula (XIb) (hereinafter simply "Compound (XIb)"), and (b-1);
combination of Compound (XIb), (b-1), and (C);
combination of Compound (XIb), (b-1), (C), and (D);
combination of Compound (XIb), and (b-2);
combination of Compound (XIb), (b-2), and (C);
combination of Compound (XIb), (b-2), (C), and (D);
combination of Compound (XIb), and (b-3);
combination of Compound (XIb), (b-3), and (C);
combination of Compound (XIb), (b-3), (C), and (D);
combination of Compound (XIb), and (b-4);
combination of Compound (XIb), (b-4), and (C);
combination of Compound (XIb), (b-4), (C), and (D);
combination of the transition metal compound represented by General Formula (XII) (hereinafter simply "Compound (XII)"), and (b-1);
combination of Compound (XII), (b-1), and (C);
combination of Compound (XII), (b-1), (C), and (D);
combination of Compound (XII), and (b-2);
combination of Compound (XII), (b-2), and (C);
combination of Compound (XII), (b-2), (C), and (D);
combination of Compound (XII), and (b-3);
combination of Compound (XII), (b-3), and (C);
combination of Compound (XII), (b-3), (C), and (D);
combination of Compound (XII), and (b-4);
combination of Compound (XII), (b-4), and (C);
combination of Compound (XII), (b-4), (C), and (D);
combination of the transition metal compound represented by General Formula (XIII) (hereinafter simply "Compound (XIII)"), and (b-1);
combination of Compound (XIII), (b-1), and (C);
combination of Compound (XIII), (b-1), (C), and (D);
combination of Compound (XIII), and (b-2);
combination of Compound (XIII), (b-2), and (C);
combination of Compound (XIII), (b-2), (C), and (D);
combination of Compound (XIII), and (b-3);
combination of Compound (XIII), (b-3), and (C);
combination of Compound (XIII), (b-3), (C), and (D);
combination of Compound (XIII), and (b-4);
combination of Compound (XIII), (b-4), and (C);
combination of Compound (XIII), (b-4), (C), and (D);
combination of the transition metal compound represented by General Formula (XIVa) (hereinafter simply "Compound (XIVa)"), and (b-1);

combination of Compound (XIVa), (b-1), and (C);
combination of Compound (XIVa), (b-1), (C), and (D);
combination of Compound (XIVa), and (b-2);
combination of Compound (XIVa), (b-2), and (C);
combination of Compound (XIVa), (b-2), (C), and (D);
combination of Compound (XIVa), and (b-3);
combination of Compound (XIVa), (b-3), and (C);
combination of Compound (XIVa), (b-3), (C), and (D);
combination of Compound (XIVa), and (b-4);
combination of Compound (XIVa), (b-4), and (C);
combination of Compound (XIVa), (b-4), (C), and (D);
combination of the transition metal compound represented by General Formula (XIVb) (hereinafter simply "Compound (XIVb)") (b-1), and (C);
combination of Compound (XIVb), (b-1), (C), and (D);
combination of Compound (XIVb), (b-2), and (C);
combination of Compound (XIVb), (b-2), (C), and (D);
combination of Compound (XIVb), and (b-3);
combination of Compound (XIVb), (b-3), and (C);
combination of Compound (XIVb), (b-3), (C), and (D);
combination of Compound (XIVb), and (b-4);
combination of Compound (XIVb), (b-4), and (C);
combination of Compound (XIVb), (b-4), (C), and (D);
combination of the transition metal compound represented by General Formula (XIVC) (hereinafter simply "Compound (XIVc)"), and (b-1);
combination of Compound (XIVc), (b-1), and (C);
combination of Compound (XIVc), (b-1), (C), and (D);
combination of Compound (XIVc), and (b-2);
combination of Compound (XIVc), (b-2), and (C);
combination of Compound (XIVc), (b-2), (C), and (D);
combination of Compound (XIVc), and (b-3);
combination of Compound (XIVc), (b-3), and (C);
combination of Compound (XIVc), (b-3), (C), and (D);
combination of Compound (XIVc), and (b-4);
combination of Compound (XIVc), (b-4), and (C);
combination of Compound (XIVc), (b-4), (C), and (D);
combination of the transition metal compound represented by General Formula (XV) (hereinafter simply "Compound (XV)"), and (b-1);
combination of Compound (XV), (b-1), and (C);
combination of Compound (XV), (b-1), (C), and (D);
combination of Compound (XV), and (b-2);
combination of Compound (XV), (b-2), and (C);
combination of Compound (XV), (b-2), (C), and (D);
combination of Compound (XV), and (b-3);
combination of Compound (XV), (b-3), and (C);
combination of Compound (XV), (b-3), (C), and (D);
combination of Compound (XV), and (b-4);
combination of Compound (XV), (b-4), and (C);
combination of Compound (XV), (b-4), (C), and (D);
combination of the transition metal compound represented by General Formula (XVI) (hereinafter simply "Compound (XVI)"), and (b-1);
combination of Compound (XVI), (b-1), and (C);
combination of Compound (XVI), (b-1), (C), and (D);
combination of Compound (XVI), and (b-2);
combination of Compound (XVI), (b-2), and (C);
combination of Compound (XVI), (b-2), (C), and (D);
combination of Compound (XVI), and (b-3);
combination of Compound (XVI), (b-3), and (C);
combination of Compound (XVI), (b-3), (C), and (D);
combination of Compound (XVI), and (b-4);
combination of Compound (XVI), (b-4), and (C);
combination of Compound (XVI), (b-4), (C), and (D);
combination of the transition metal compound represented by General Formula (XVII) (hereinafter simply "Compound (XVII)"), and (b-1);
combination of Compound (XVII), (b-1), and (C);
combination of Compound (XVII), (b-1), (C), and (D);
combination of Compound (XVII), and (b-2);
combination of Compound (XVII), (b-2), and (C);
combination of Compound (XVII), (b-2), (C), and (D);
combination of Compound (XVII), and (b-3);
combination of Compound (XVII), (b-3), and (C);
combination of Compound (XVII), (b-3), (C), and (D);
combination of Compound (XVII), and (b-4);
combination of Compound (XVII), (b-4), and (C);
combination of Compound (XVII), (b-4), (C), and (D);
combination of the transition metal compound represented by General Formula (XVIII) (hereinafter simply "Compound (XVIII)"), and (b-1);
combination of Compound (XVIII), (b-1), and (C);
combination of Compound (XVIII), (b-1), (C), and (D);
combination of Compound (XVIII), and (b-2);
combination of Compound (XVIII), (b-2), and (C);
combination of Compound (XVIII), (b-2), (C), and (D);
combination of Compound (XVIII), and (b-3);
combination of Compound (XVIII), (b-3), and (C);
combination of Compound (XVIII), (b-3), (C), and (D);
combination of Compound (XVIII), and (b-4);
combination of Compound (XVIII), (b-4), and (C);
combination of Compound (XVIII), (b-4), (C), and (D);
combination of the transition metal compound represented by General Formula (XIX) (hereinafter simply "Compound (XIX)"), and (b-1);
combination of Compound (XIX), (b-1), and (C);
combination of Compound (XIX), (b-1), (C), and (D);
combination of Compound (XIX), and (b-2);
combination of Compound (XIX), (b-2), and (C);
combination of Compound (XIX), (b-2), (C), and (D);
combination of Compound (XIX), and (b-3);
combination of Compound (XIX), (b-3), and (C);
combination of Compound (XIX), (b-3), (C), and (D);
combination of Compound (XIX), and (b-4);
combination of Compound (XIX), (b-4), and (C);
combination of Compound (XIX), (b-4), (C), and (D);
combination of the transition metal compound represented by General Formula (XXa) (hereinafter simply "Compound (XXa)"), and (b-1);
combination of Compound (XXa), (b-1), and (C);
combination of Compound (XXa), (b-1), (C), and (D);
combination of Compound (XXa), and (b-2);
combination of Compound (XXa), (b-2), and (C);
combination of Compound (XXa), (b-2), (C), and (D);
combination of Compound (XXa), and (b-3);
combination of Compound (XXa), (b-3), and (C);
combination of Compound (XXa), (b-3), (C), and (D);
combination of Compound (XXa), and (b-4);
combination of Compound (XXa), (b-4), and (C);
combination of Compound (XXa), (b-4), (C), and (D);
combination of the transition metal compound represented by General Formula (XXb) (hereinafter simply "Compound (XXb)"), and (b-1);
combination of Compound (XXb), (b-1), and (C);
combination of Compound (XXb), (b-1), (C), and (D);
combination of Compound (XXb), and (b-2);
combination of Compound (XXb), (b-2), and (C);
combination of Compound (XXb), (b-2), (C), and (D);
combination of Compound (XXb), and (b-3);
combination of Compound (XXb), (b-3), and (C);
combination of Compound (XXb), (b-3), (C), and (D);
combination of Compound (XXb), and (b-4);
combination of Compound (XXb), (b-4), and (C);
combination of Compound (XXb), (b-4), (C), and (D);

combination of the transition metal compound represented by General Formula (XXIa) (hereinafter simply "Compound (XXIa)"), and (b-1);
combination of Compound (XXIa), (b-1), and (C);
combination of Compound (XXIa), (b-1), (C), and (D);
combination of Compound (XXIa), and (b-2);
combination of Compound (XXIa), (b-2), and (C);
combination of Compound (XXIa), (b-2), (C), and (D);
combination of Compound (XXIa), and (b-3);
combination of Compound (XXIa), (b-3), and (C);
combination of Compound (XXIa), (b-3), (C), and (D);
combination of Compound (XXIa), and (b-4);
combination of Compound (XXIa), (b-4), and (C);
combination of Compound (XXIa), (b-4), (C), and (D);
combination of the transition metal compound represented by General Formula (XXIb) (hereinafter simply "Compound (XXIb)"), and (b-1);
combination of Compound (XXIb), (b-1), and (C);
combination of Compound (XXIb), (b-1), (C), and (D);
combination of Compound (XXIb), and (b-2);
combination of Compound (XXIb), (b-2), and (C);
combination of Compound (XXIb), (b-2), (C), and (D);
combination of Compound (XXIb), and (b-3);
combination of Compound (XXIb), (b-3), and (C);
combination of Compound (XXIb), (b-3), (C), and (D);
combination of Compound (XXIb), and (b-4);
combination of Compound (XXIb), (b-4), and (C);
combination of Compound (XXIb), (b-4), (C), and (D);
combination of the transition metal compound represented by General Formula (XXII) (hereinafter simply "Compound (XXII)"), and (b-1);
combination of Compound (XXII), (b-1), and (C);
combination of Compound (XXII), (b-1), (C), and (D);
combination of Compound (XXII), and (b-2);
combination of Compound (XXII), (b-2), and (C);
combination of Compound (XXII), (b-2), (C), and (D);
combination of Compound (XXII), and (b-3);
combination of Compound (XXII), (b-3), and (C);
combination of Compound (XXII), (b-3), (C), and (D);
combination of Compound (XXII), and (b-4);
combination of Compound (XXII), (b-4), and (C);
combination of Compound (XXII), (b-4), (C), and (D);
combination of the transition metal compound represented by General Formula (XXIII) (hereinafter simply "Compound (XXIII)"), and (b-1);
combination of Compound (XXIII), (b-1), and (C);
combination of Compound (XXIII), (b-1), (C), and (D);
combination of Compound (XXIII), and (b-2);
combination of Compound (XXIII), (b-2), and (C);
combination of Compound (XXIII), (b-2), (C), and (D);
combination of Compound (XXIII), and (b-3);
combination of Compound (XXIII), (b-3), and (C);
combination of Compound (XXIII), (b-3), (C), and (D);
combination of Compound (XXIII), and (b-4);
combination of Compound (XXIII), (b-4), and (C);
combination of Compound (XXIII), (b-4), (C), and (D);
combination of the transition metal compound represented by General Formula (XXIV) (hereinafter simply "Compound (XXIV)"), and (b-1);
combination of Compound (XXIV), (b-1), and (C);
combination of Compound (XXIV), (b-1), (C), and (D);
combination of Compound (XXIV), and (b-2);
combination of Compound (XXIV), (b-2), and (C);
combination of Compound (XXIV), (b-2), (C), and (D);
combination of Compound (XXIV), and (b-3);
combination of Compound (XXIV), (b-3), and (C);
combination of Compound (XXIV), (b-3), (C), and (D);
combination of Compound (XXIV), and (b-4);
combination of Compound (XXIV), (b-4), and (C);
combination of Compound (XXIV), (b-4), (C), and (D);
combination of the transition metal compound represented by General Formula (XXV) (hereinafter simply "Compound (XXV)"), and (b-1);
combination of Compound (XXV), (b-1), and (C);
combination of Compound (XXV), (b-1), (C), and (D);
combination of Compound (XXV), and (b-2);
combination of Compound (XXV), (b-2), and (C);
combination of Compound (XXV), (b-2), (C), and (D);
combination of Compound (XXV), and (b-3);
combination of Compound (XXV), (b-3), and (C);
combination of Compound (XXV), (b-3), (C), and (D);
combination of Compound (XXV), and (b-4);
combination of Compound (XXV), (b-4), and (C);
combination of Compound (XXV), (b-4), (C), and (D);
combination of the transition metal compound represented by General Formula (XXVI) (hereinafter simply "Compound (XXVI)"), and (b-1);
combination of Compound (XXVI), (b-1), and (C);
combination of Compound (XXVI), (b-1), (C), and (D);
combination of Compound (XXVI), and (b-2);
combination of Compound (XXVI), (b-2), and (C);
combination of Compound (XXVI), (b-2), (C), and (D);
combination of Compound (XXVI), and (b-3);
combination of Compound (XXVI), (b-3), and (C);
combination of Compound (XXVI), (b-3), (C), and (D);
combination of Compound (XXVI), and (b-4);
combination of Compound (XXVI), (b-4), and (C);
combination of Compound (XXVI), (b-4), (C), and (D);
combination of the transition metal compound represented by General Formula (XXVII) (hereinafter simply "Compound (XXVII)"), and (b-1);
combination of Compound (XXVII), (b-1), and (C);
combination of Compound (XXVII), (b-1), (C), and (D);
combination of Compound (XXVII), and (b-2);
combination of Compound (XXVII), (b-2), and (C);
combination of Compound (XXVII), (b-2), (C), and (D);
combination of Compound (XXVII), and (b-3);
combination of Compound (XXVII), (b-3), and (C);
combination of Compound (XXVII), (b-3), (C), and (D);
combination of Compound (XXVII), and (b-4);
combination of Compound (XXVII), (b-4), and (C);
combination of Compound (XXVII), (b-4), (C), and (D);
combination of the transition metal compound represented by General Formula (XXVIII) (hereinafter simply "Compound (XXVIII)"), and (b-1);
combination of Compound (XXVIII), (b-1), and (C);
combination of Compound (XXVIII), (b-1), (C), and (D);
combination of Compound (XXVIII), and (b-2);
combination of Compound (XXVIII), (b-2), and (C);
combination of Compound (XXVIII), (b-2), (C), and (D);
combination of Compound (XXVIII), and (b-3);
combination of Compound (XXVIII), (b-3), and (C);
combination of Compound (XXVIII), (b-3), (C), and (D);
combination of Compound (XXVIII), and (b-4);
combination of Compound (XXVIII), (b-4), and (C);
combination of Compound (XXVIII), (b-4), (C), and (D);
combination of the transition metal compound represented by General Formula (XXIX) (hereinafter simply "Compound (XXIX)"), and (b-1);
combination of Compound (XXIX), (b-1), and (C);
combination of Compound (XXIX), (b-1), (C), and (D);
combination of Compound (XXIX), and (b-2);
combination of Compound (XXIX), (b-2), and (C);
combination of Compound (XXIX), (b-2), (C), and (D);

combination of Compound (XXIX), and (b-3);
combination of Compound (XXIX), (b-3), and (C);
combination of Compound (XXIX), (b-3), (C), and (D);
combination of Compound (XXIX), and (b-4);
combination of Compound (XXIX), (b-4), and (C);
combination of Compound (XXIX), (b-4), (C), and (D);
combination of the transition metal compound represented by General Formula (XXX) (hereinafter simply "Compound (XXX)"), and (b-1);
combination of Compound (XXX), (b-1), and (C);
combination of Compound (XXX), (b-1), (C), and (D);
combination of Compound (XXX), and (b-2);
combination of Compound (XXX), (b-2), and (C);
combination of Compound (XXX), (b-2), (C), and (D);
combination of Compound (XXX), and (b-3);
combination of Compound (XXX), (b-3), and (C);
combination of Compound (XXX), (b-3), (C), and (D);
combination of Compound (XXX), and (b-4);
combination of Compound (XXX), (b-4), and (C);
combination of Compound (XXX), (b-4), (C), and (D);
combination of the transition metal compound represented by General Formula (XXXIa) (hereinafter simply "Compound (XXXIa)"), and (b-1);
combination of Compound (XXXIa), (b-1), and (C);
combination of Compound (XXXIa), (b-1), (C), and (D);
combination of Compound (XXXIa), and (b-2);
combination of Compound (XXXIa), (b-2), and (C);
combination of Compound (XXXIa), (b-2), (C), and (D);
combination of Compound (XXXIa), and (b-3);
combination of Compound (XXXIa), (b-3), and (C);
combination of Compound (XXXIa), (b-3), (C), and (D);
combination of Compound (XXXIa), and (b-4);
combination of Compound (XXXIa), (b-4), and (C);
combination of Compound (XXXIa), (b-4), (C), and (D);
combination of the transition metal compound represented by General Formula (XXXIb) (hereinafter simply "Compound (XXXIb)"), and (b-1);
combination of Compound (XXXIb), (b-1), and (C);
combination of Compound (XXXIb), (b-1), (C), and (D);
combination of Compound (XXXIb), and (b-2);
combination of Compound (XXXIb), (b-2), and (C);
combination of Compound (XXXIb), (b-2), (C), and (D);
combination of Compound (XXXIb), and (b-3);
combination of Compound (XXXIb), (b-3), and (C);
combination of Compound (XXXIb), (b-3), (C), and (D);
combination of Compound (XXXIb), and (b-4);
combination of Compound (XXXIb), (b-4), and (C);
combination of Compound (XXXIb), (b-4), (C), and (D);
combination of the transition metal compound represented by General Formula (XXXIIa) (hereinafter simply "Compound (XXXIIa)"), and (b-1);
combination of Compound (XXXIIa), (b-1), and (C);
combination of Compound (XXXIIa), (b-1), (C), and (D);
combination of Compound (XXXIIa), and (b-2);
combination of Compound (XXXIIa), (b-2), and (C);
combination of Compound (XXXIIa), (b-2), (C), and (D);
combination of Compound (XXXIIa), and (b-3);
combination of Compound (XXXIIa), (b-3), and (C);
combination of Compound (XXXIIa), (b-3), (C), and (D);
combination of Compound (XXXIIa), and (b-4);
combination of Compound (XXXIIa), (b-4), and (C);
combination of Compound (XXXIIa), (b-4), (C), and (D);
combination of the transition metal compound represented by General Formula (XXXIIb) (hereinafter simply "Compound (XXXIIb)"), and (b-1);
combination of Compound (XXXIIb), (b-1), and (C);
combination of Compound (XXXIIb), (b-1), (C), and (D);
combination of Compound (XXXIIb), and (b-2);
combination of Compound (XXXIIb), (b-2), and (C);
combination of Compound (XXXIIb), (b-2), (C), and (D);
combination of Compound (XXXIIb), and (b-3);
combination of Compound (XXXIIb), (b-3), and (C);
combination of Compound (XXXIIb), (b-3), (C), and (D);
combination of Compound (XXXIIb), and (b-4);
combination of Compound (XXXIIb), (b-4), and (C);
combination of Compound (XXXIIb), (b-4), (C), and (D);
of these, more preferable combinations are as shown below:
combination of Compound (I), (b-1), and (C);
combination of Compound (I), (b-1), (C), and (D);
combination of Compound (I), and (b-2);
combination of Compound (I), (b-2), and (C);
combination of Compound (I), (b-2), (C), and (D);
combination of Compound (I), and (b-3);
combination of Compound (I), (b-3), and (C);
combination of Compound (I), (b-3), (C), and (D);
combination of Compound (I), (b-4), (C), and (D);
combination of Compound (II), (b-1), and (C);
combination of Compound (II), (b-1), (C), and (D);
combination of Compound (II), and (b-2);
combination of Compound (II), (b-2), and (C);
combination of Compound (II), (b-2), (C), and (D);
combination of Compound (II), and (b-3);
combination of Compound (II), (b-3), and (C);
combination of Compound (II), (b-3), (C), and (D);
combination of Compound (II), (b-4), (C), and (D);
combination of Compound (III), (b-1), and (C);
combination of Compound (III), (b-1), (C), and (D);
combination of Compound (III), and (b-2);
combination of Compound (III), (b-2), and (C);
combination of Compound (III), (b-2), (C), and (D);
combination of Compound (III), and (b-3);
combination of Compound (III), (b-3), and (C);
combination of Compound (III), (b-3), (C), and (D);
combination of Compound (III), (b-4), (C), and (D);
combination of Compound (IVa), (b-1), and (C);
combination of Compound (IVa), (b-1), (C), and (D);
combination of Compound (IVa), and (b-2);
combination of Compound (IVa), (b-2), and (C);
combination of Compound (IVa), (b-2), (C), and (D);
combination of Compound (IVa), and (b-3);
combination of Compound (IVa), (b-3), and (C);
combination of Compound (IVa), (b-3), (C), and (D);
combination of Compound (IVa), (b-4), (C), and (D);
combination of Compound (IVc), (b-1), and (C);
combination of Compound (IVc), (b-1), (C), and (D);
combination of Compound (IVc), and (b-2);
combination of Compound (IVc), (b-2), and (C);
combination of Compound (IVc), (b-2), (C), and (D);
combination of Compound (IVc), and (b-3);
combination of Compound (IVc), (b-3), and (C);
combination of Compound (IVc), (b-3), (C), and (D);
combination of Compound (IVc), (b-4), (C), and (D);
combination of Compound (VI), (b-1), and (C);
combination of Compound (VI), (b-1), (C), and (D);
combination of Compound (VI), and (b-2);
combination of Compound (VI), (b-2), and (C);
combination of Compound (VI), (b-2), (C), and (D);
combination of Compound (VI), and (b-3);
combination of Compound (VI), (b-3), and (C);
combination of Compound (VI), (b-3), (C), and (D);
combination of Compound (VI), (b-4), (C), and (D);
combination of Compound (X), (b-1), and (C);
combination of Compound (X), (b-1), (C), and (D);
combination of Compound (X), and (b-2);

combination of Compound (X), (b-2), and (C);
combination of Compound (X), (b-2), (C), and (D);
combination of Compound (X), and (b-3);
combination of Compound (X), (b-3), and (C);
combination of Compound (X), (b-3), (C), and (D);
combination of Compound (X), (b-4), (C), and (D);
combination of Compound (XIa), (b-1), and (C);
combination of Compound (XIa), (b-1), (C), and (D);
combination of Compound (XIb), (b-1), and (C);
combination of Compound (XIb), (b-1), (C), and (D);
combination of Compound (XIb), and (b-2);
combination of Compound (XIb), (b-2), and (C);
combination of Compound (XIb), (b-2), (C), and (D);
combination of Compound (XIb), and (b-3);
combination of Compound (XIb), (b-3), and (C);
combination of Compound (XIb), (b-3), (C), and (D);
combination of Compound (XIb), (b-4), (C), and (D);
combination of Compound (XII), (b-1), and (C);
combination of Compound (XII), (b-1), (C), and (D);
combination of Compound (XII), and (b-2);
combination of Compound (XII), (b-2), and (C);
combination of Compound (XII), (b-2), (C), and (D);
combination of Compound (XII), and (b-3);
combination of Compound (XII), (b-3), and (C);
combination of Compound (XII), (b-3), (C), and (D);
combination of Compound (XII), (b-4), (C), and (D);
combination of Compound (XIII), (b-1), and (C);
combination of Compound (XIII), (b-1), (C), and (D);
combination of Compound (XIII), and (b-2);
combination of Compound (XIII), (b-2), and (C);
combination of Compound (XIII), (b-2), (C), and (D);
combination of Compound (XIII), and (b-3);
combination of Compound (XIII), (b-3), and (C);
combination of Compound (XIII), (b-3), (C), and (D);
combination of Compound (XIII), (b-4), (C), and (D);
combination of Compound (XIVa), (b-1), and (C);
combination of Compound (XIVa), (b-1), (C), and (D);
combination of Compound (XIVa), and (b-2);
combination of Compound (XIVa), (b-2), and (C);
combination of Compound (XIVa), (b-2), (C), and (D);
combination of Compound (XIVa), and (b-3);
combination of Compound (XIVa), (b-3), and (C);
combination of Compound (XIVa), (b-3), (C), and (D);
combination of Compound (XIVa), (b-4), (C), and (D);
combination of Compound (XIVc), (b-1), and (C);
combination of Compound (XIVc), (b-1), (C), and (D);
combination of Compound (XIVc), and (b-2);
combination of Compound (XIVc), (b-2), and (C);
combination of Compound (XIVc), (b-2), (C), and (D);
combination of Compound (XIVc), and (b-3);
combination of Compound (XIVc), (b-3), and (C);
combination of Compound (XIVc), (b-3), (C), and (D);
combination of Compound (XIVc), (b-4), (C), and (D);
combination of Compound (XXb), (b-1), and (C);
combination of Compound (XXb), (b-1), (C), and (D);
combination of Compound (XXb), and (b-2);
combination of Compound (XXb), (b-2), and (C);
combination of Compound (XXb), (b-2), (C), and (D);
combination of Compound (XXb), and (b-3);
combination of Compound (XXb), (b-3), and (C);
combination of Compound (XXb), (b-3), (C), and (D);
combination of Compound (XXb), (b-4), (C), and (D);
combination of Compound (XXIb), (b-1), and (C);
combination of Compound (XXIb), (b-1), (C), and (D);
combination of Compound (XXIb), and (b-2);
combination of Compound (XXIb), (b-2), and (C);
combination of Compound (XXIb), (b-2), (C), and (D);
combination of Compound (XXIb), and (b-3);
combination of Compound (XXIb), (b-3), and (C);
combination of Compound (XXIb), (b-3), (C), and (D); and
combination of Compound (XXIb), (b-4), (C), and (D).

Of these, particularly preferred are as shown below;
combination of Compound (I), (b-1), and (C);
combination of Compound (I), (b-1), (C), and (D);
combination of Compound (I), and (b-2);
combination of Compound (I), (b-2), and (C);
combination of Compound (I), (b-2), (C), and (D);
combination of Compound (II), (b-1), and (C);
combination of Compound (II), (b-1), (C), and (D);
combination of Compound (II), and (b-2);
combination of Compound (II), (b-2), and (C);
combination of Compound (II), (b-2), (C), and (D);
combination of Compound (III), (b-1), and (C);
combination of Compound (III), (b-1), (C), and (D);
combination of Compound (III), and (b-2);
combination of Compound (III), (b-2), and (C);
combination of Compound (III), (b-2), (C), and (D);
combination of Compound (IVa), (b-1), and (C);
combination of Compound (IVa), (b-1), (C), and (D);
combination of Compound (IVa), and (b-2);
combination of Compound (IVa), (b-2), and (C);
combination of Compound (IVa), (b-2), (C), and (D);
combination of Compound (IVc), (b-1), and (C);
combination of Compound (IVc), (b-1), (C), and (D);
combination of Compound (IVc), and (b-2);
combination of Compound (IVc), (b-2), and (C);
combination of Compound (IVc), (b-2), (C), and (D);
combination of Compound (VI), (b-1), and (C);
combination of Compound (VI), (b-1), (C), and (D);
combination of Compound (VI), and (b-2);
combination of Compound (VI), (b-2), and (C);
combination of Compound (VI), (b-2), (C), and (D);
combination of Compound (XIa), (b-1), and (C);
combination of Compound (XIa), (b-1), (C), and (D);
combination of Compound (XIb), (b-1), and (C);
combination of Compound (XIb), (b-1), (C), and (D);
combination of Compound (XIb), and (b-2);
combination of Compound (XIb), (b-2), and (C);
combination of Compound (XIb), (b-2), (C), and (D);
combination of Compound (XIII), (b-1), and (C);
combination of Compound (XIII), (b-1), (C), and (D);
combination of Compound (XIII), and (b-2);
combination of Compound (XIII), (b-2), and (C); and
combination of Compound (XIII), (b-2), (C), and (D).

The olefin polymerization catalyst of the present invention may be supported by an inorganic or organic carrier described below as necessary.

The inorganic compound for the carrier includes inorganic oxides, inorganic hydroxides, inorganic chlorides, and other inorganic salts such as sulfates, carbonates, phosphates, nitrates, and silicates.

Of the inorganic compounds for the carrier, preferred are inorganic oxides such as silica, titania, alumina, zirconia, chromia, magnesia, boron oxide, calcium oxide, zinc oxide, barium oxide, silica hydrogel, silica xerogel, silica aerogel, and mixtures thereof such as talc, silica/chromia, silica/chromia/titania, silica/alumina, silica/titania, silica/magnesia, silica/magnesia/titania, aluminum phosphate gel. The inorganic oxide may contain a carbonate salt, a nitrate salt, a sulfate salt, an oxide, including $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $N_2O$, $K_2O$, and $Li_2O$.

The inorganic compound used in the present invention includes also inorganic compound polymers such as carbosiloxane, phosphazyne, siloxane, and polymer/silica composites.

Of the above inorganic carriers, particularly preferred are simple or mixed inorganic compounds such as silica, titania, alumina, talc, silica/chromia, silica/chromia/titania, silica/alumina, and silica/titania. These inorganic oxides may be used as a composite with a chloride of a metal of Group 2 of Periodic Table, specifically including a silica/magnesium chloride complex (trade name: Sylopol 5510, and Sylopol 5550, supplied by Grace Davison Co.).

Organic compound useful as the carrier in the present invention includes functionalized polyethylenes, functionalized polypropylenes, functionalized ethylene/α-olefincopolymers, polystyrenes, functionalized polystyrenes, polyamides, and polyesters.

Process for Preparing Olefin

A method for preparing olefin polymerization catalyst of the present invention is explained below. FIG. 1 shows the steps of preparation of the olefin polymerization catalyst of the present invention.

In the preparation of the polymerization catalyst in the present invention, the usage of the components and the order of addition thereof are selected arbitrarily, and are exemplified as below:

(1) (A) at least one compound selected from the transition metal compounds shown by the above General formulas (I) to (XXXII) (hereinafter referred to simply as "Component (A)"), and (B) a Lewis acid (hereinafter referred to simply as "Component (B)") are introduced in an arbitrary order into a polymerization vessel to prepare the catalyst;

(2) Component (A) and Component (B) are brought into contact preliminarily, and the contact product is introduced into a polymerization vessel to prepare the catalyst;

(3) Component (A) and a first Component (B) are brought into contact preliminarily, and the contact product and a second Component (B) are introduced in an arbitrary order into a polymerization vessel to prepare the catalyst, where the first Component (B) and the second Component (B) may be the same or different;

(4) Component (A), Component (B), and (C) at least one compound selected from the oxygen-containing compounds and the nitrogen-containing compounds (hereinafter referred to simply as "Component (C)") are introduced in an arbitrary order into a polymerization vessel to prepare the catalyst;

(5) Component (A) and Component (B) are brought into contact preliminarily, and the contact product and Component (C) are introduced in an arbitrary order into a polymerization vessel to prepare the catalyst;

(6) Component (A) and Component (C) are brought into contact preliminarily, and the contact product and Component (B) are introduced in an arbitrary order into a polymerization vessel to prepare the catalyst;

(7) Component (B) and Component (C) are brought into contact preliminarily, and the contact product and Component (A) are introduced in an arbitrary order into a polymerization vessel to prepare the catalyst;

(8) Component (A) and a first Component (B) are brought into contact preliminarily, and separately a second Component (B) and Component (C) are preliminarily brought into contact, and the contact products are introduced in an arbitrary order into a polymerization vessel to prepare the catalyst, where the first Component (B) and the second Component (B) may be the same or different;

(9) Component (A) and a first Component (C) are brought into contact preliminarily, and separately Component (B) and a second Component (C) are preliminarily brought into contact, and the contact products are introduced in an arbitrary order into a polymerization vessel to prepare the catalyst, where the first Component (C) and the second Component (C) may be the same or different;

(10) Component (A), Component (B), and Component (C) are brought into contact preliminarily, and the contact product is introduced into a polymerization vessel to prepare the catalyst;

(11) Component (A), a first Component (B), and Component (C) are brought into contact preliminarily, and the contact product and a second Component (B) are introduced in an arbitrary order into a polymerization vessel to prepare the catalyst, where the first Component (B) and the second Component (B) may be the same or different;

(12) Component (A), Component (B), and a first Component (C) are brought into contact preliminarily, and the contact product and a second Component (C) are introduced in an arbitrary order into a polymerization vessel to prepare the catalyst, where the first Component (C) and the second Component (C) may be the same or different;

(13) Component (A), a first Component (B), and a first Component (C) are brought into contact preliminarily, and separately a second Component (B) and a second Component (C) are preliminarily brought into contact, and the contact products are introduced in an arbitrary order into a polymerization vessel to prepare the catalyst, where the first Component (B) and the second Component (B), and the first Component (C) and the second Component (C) may be respectively the same or different;

(14) Component (A), Component (B), Component (C), and (D) the inactivating compound (hereinafter referred to simply as "Component (D)") are introduced in an arbitrary order into a polymerization vessel to prepare the catalyst;

(15) Component (A) and Component (B) are brought into contact preliminarily, and the contact product, Component (C), and Component (D) are introduced in an arbitrary order into a polymerization vessel to prepare the catalyst;

(16) Component (B) and Component (C) are brought into contact preliminarily, and the contact product, Component (A), and Component (D) are introduced in an arbitrary order into a polymerization vessel to prepare the catalyst;

(17) Component (C) and Component (D) are brought into contact preliminarily, and the contact product, Component (A), and Component (B) are introduced in an arbitrary order into a polymerization vessel to prepare the catalyst;

(18) Component (A) and Component (C) are brought into contact preliminarily, and the contact product, Component (B), and Component (D) are introduced in an arbitrary order into a polymerization vessel to prepare the catalyst;

(19) Component (A) and Component (D) are brought into contact preliminarily, and the contact product, Component (B), and Component (C) are introduced in an arbitrary order into a polymerization vessel to prepare the catalyst;

(20) Component (B) and Component (D) are brought into contact preliminarily, and the contact product, Component (A), and Component (C) are introduced in an arbitrary order into a polymerization vessel to prepare the catalyst;

(21) Component (A) and Component (B) are brought into contact preliminarily, and separately Component (C) and Component (D) are preliminarily brought into contact, and the contact products are introduced in an arbitrary order into a polymerization vessel to prepare the catalyst;

(22) Component (A) and Component (C) are brought into contact preliminarily, and separately Component (B) and Component (D) are preliminarily brought into contact, and the contact products are introduced in an arbitrary order into a polymerization vessel to prepare the catalyst;

(23) Component (A) and Component (D) are brought into contact preliminarily, and separately Component (B) and Component (C) are preliminarily brought into contact, and the contact products are introduced in an arbitrary order into a polymerization vessel to prepare the catalyst;

(24) Component (A), Component (B), and Component (C) are brought into contact preliminarily, and the contact products and Component (D) are introduced in an arbitrary order into a polymerization vessel to prepare the catalyst;

(25) Component (A), Component (B), and Component (D) are brought into contact preliminarily, and the contact products and Component (C) are introduced in an arbitrary order into a polymerization vessel to prepare the catalyst;

(26) Component (B), Component (C), and Component (D) are brought into contact preliminarily, and the contact products and Component (A) are introduced in an arbitrary order into a polymerization vessel to prepare the catalyst; and

(27) Component (A), Component (B), Component (C), and Component (D) are brought into contact preliminarily, and the contact products is introduced into a polymerization vessel to prepare the catalyst.

Of the above catalyst preparation methods, preferred are the methods in which Component (C) and Component (D) are brought into contact at least before Component (A) and Component (C) are brought into contact. Preferably, Component (B) is brought into a liquid state at least once.

In a preferred embodiment, Component (B) is selected from the ionic-bonding compound (b-1), Component (C) is selected from alcohols, phenols, aldehydes, carboxylic acids, ketones, organic acid halides, esters of organic or inorganic acids, ethers, epoxides, acid anhydrides, oxygen-containing sulfur compounds, and oxygen-containing phosphorus compounds, and a contact product of Component (B), Component (C), and Component (D) is brought into contact with Component (A).

The olefin polymerization catalyst prepared as above in the present invention may be used after prepolymerization of an olefin.

Process for Producing Olefin Polymer

In the process for producing an olefin polymer of the present invention, an olefin polymer is produced by polymerizing an olefin or copolymerizing olefins in the presence of the aforementioned olefin polymerization catalyst, and optionally (E) an organoaluminum compound.

(E) Organoaluminum Compound

The organoaluminum compound (E) used in the present invention is represented by General Formula below:

$R_{3-m}AlX$ where R is a hydrocarbon residue of 1–20 carbon atoms, preferably 1–12 carbon atoms; X is hydrogen or a halogen; and m is a number of $0 \leq m \leq 2$.

Specific examples of the organoaluminum compound include trialkylaluminums such as trimethylaluminum, triethylaluminum, triisobutylaluminum, trihexylaluminum, trioctylaluminum, and tridecylaluminum; alkylaluminum halides such as diethylaluminum monochloride, diisobutylaluminum monochloride, ethylaluminum sesquichloride, and ethylaluminum dichloride; alkylaluminum hydrides such as diethylaluminum hydride, and diisobutylaluminum hydride.

Of these specific examples of Component (E), preferred are trialkylaluminums and alkylaluminum halides; more preferred are triethylaluminum, triisobutylaluminum, trihexylaluminum, trioctylaluminum, diethylaluminum monochloride, diisobutylaluminum monochloride, ethylaluminum sesquichloride, and ethylaluminum dichloride.

The polymerization may be conducted by any process of liquid phase polymerization such as solution polymerization, and suspension polymerization; and gas phase polymerization.

The inert hydrocarbon medium employed in the liquid phase polymerization includes specifically aliphatic hydrocarbons such as propane, butane, pentane, hexane, heptane, octane, decane, dodecane, and kerosene; alicyclic hydrocarbons such as cyclopentane, cyclohexane, and methylcyclopentane; aromatic hydrocarbons such as benzene, toluene, and xylene; and halogenated hydrocarbons such as ethylene chloride, chlorobenzene, and dichloromethane, and the mixture thereof. The olefin itself may be used as the solvent.

In the olefin polymerization with the aforementioned olefin polymerization catalyst, Component (A) is used in an amount in the range of usually $10^{-11-10}$ mmol, preferably $10^{-9-1}$ mmol in terms of the transition metal element or the lanthanoid atom in Component (A) per liter of the reaction volume.

Per gram of Component(B), Component (A) is used in an amount in the range of usually $10^{-4-100}$ mmol, preferably $10^{-3-50}$ mmol.

Component (E) is used as necessary, at a molar ratio [(E)/M] of Component (E) to transition metal atom (M) in Component (A) in the range of usually 0.001–100000, preferably 0.005–50000.

The temperature of polymerization with the olefin polymerization catalyst is in the range usually from −50 to +200° C., preferably from 0 to 170° C. The polymerization pressure is in the range usually from atmospheric pressure to 100 kg/cm², preferably from atmospheric pressure to 50 kg/cm². The polymerization may be conducted by any of a batch system, a semicontinuous system, and a continuous system. The polymerization can be conducted in two or more steps under different reaction conditions.

The molecular weight of the produced olefin polymer can be controlled by presence of hydrogen in the polymerization system, change of polymerization temperature, or the kind of Component (E) employed.

The olefins which can be polymerized according to the present invention include linear or branched α-olefins of 2–30, preferably 2–20 carbon atoms such as ethylene, propylene, 1-butene, 2-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, and 1-icosene; cycloolefins of 3–30, preferably 3–20 carbon atoms such as cyclopentene, cycloheptene, norbornene, 5-methyl-2-norbornene, tetracyclododecene, and 2-methyl-1,4,5,8-dimethano-1,2,3,4,4a,5,8,8a-octahydronaphthalene; polar monomers: including α, β-unsaturated carboxylic acid such as acrylic acid, methacrylic acid, fumaric acid, maleic anhydride, itaconic acid, itaconic anhydride, and bicyclo[2.2.1]-5-heptene-2,3-dicarboxylic acid anhydride, and α,β-unsaturated carboxylic acid metal salts such as salts thereof of sodium, potassium, lithium, zinc, magnesium, and calcium; α,β-unsaturated carboxylic acid esters such as methyl acrylate, ethyl acrylate, n-propyl acrylate, isopropyl acrylate, n-butyl acrylate, isobutyl acrylate, t-butyl acrylate, 2-ethylhexyl acrylate, methyl methacrylate, ethyl methacrylate, n-propyl methacrylate, isopropyl methacrylate, n-butyl methacrylate, and isobutyl methacrylate; vinyl esters such as vinyl acetate, vinyl propionate, vinyl caproate, vinyl caprylate, vinyl laureate, vinyl stearate, and vinyl trifluoroacetate; and unsaturated glycidyl esters such as glycidyl acrylate, glycidyl methacrylate, and monoglycidyl itaconate.

Vinylcyclohexane, dienes, and polyenes are also useful. The diene and polyenes include cyclic or linear compounds having two or more double bonds having 4–30, preferably 4–20 carbon atoms, specifically including butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidenenorbornene, vinylnorbornene, dicyclopentadiene, 7-methyl-1,6-octadiene, 4-ethylidene-8-methyl-1,7-nonadiene, and 5,9-dimethyl-1,4,8-decatriene. Further useful are aromatic vinyl compounds including mono- or polyalkylstyrenes such as styrene, o-methylstyrene, m-methylstyrene, p-methylstyrene, o,p-dimethylstyrene, o-ethylstyrene, m-ethylstyrene, p-ethylstyrene; functional group-containing styrene derivatives such as methoxystyrene, ethoxystyrene, vinylbenzoic acid, methyl vinylbenzoate, vinylbenzyl acetate, hydroxystyrene, o-chlorostyrene, p-chlorostyrene, and divinylbenzene; 3-phenylpropylene, 4-phenylpropylene, and α-methylstyrene.

The olefin polymerization catalyst of the present invention has a high polymerization activity, giving a polymer having a narrow molecular weight distribution, and giving an olefin copolymer having narrow composition distribution in copolymerization of two or more olefins.

The olefin polymerization catalyst of the present invention is also useful for copolymerization of an α-olefin and a conjugated diene.

The α-olefin useful therefor includes linear or branched α-olefins having 2–30, preferably 2–20 carbon atoms, similarly as mentioned above. Of the α-olefins, preferred are ethylene, propylene, 1-butene, 1-pentene, 1-hexene, 4-methyl-1-pentene, and 1-octene: particularly preferred are ethylene and propylene. These α-olefins may be used singly or in combination of two or more thereof.

The conjugated diene useful therefor includes aliphatic conjugated dienes of 4–30, preferably 4–20 carbon atoms such as 1,3-butadiene, isoprene, chloroprene, 1,3-cyclohexadiene, 1,3-pentadiene, 4-methyl-1,3-pentadiene, 1,3-hexadiene, and 1,3-octdiene. These conjugate dienes may be use singly or in combination of two or more thereof.

In the present invention, in copolymerization of an α-olefin and a conjugated diene, a nonconjugated diene or a polyene may be additionally used. The nonconjugated diene and the polyene include 1,4-pentadiene, 1,5-hexadiene, 1,4-hexadiene, 1,4-octadiene, 1,5-octadiene, 1,6-octadiene, 1,7-octadiene, ethylidenenorbornene, vinylnorbornene, dicyclopentadiene, 7-methyl-1,6-octadiene, 4-ethylidene-8-methyl-1,7-nonadiene, and 5,9-dimethyl-1,4,8-decatriene.

Furthermore, the olefin polymerization catalyst of the present invention is useful for copolymerization of α-olefin and a polymer having a terminal unsaturated bond. The terminal-unsaturated polymer used therefor includes linear or branched polymers having a terminal unsaturated bond having a number-average molecular weight (Mn) ranging from 100 to 5,000,000: preferably linear or branched polymers having a terminal unsaturated bond having an Mn ranging from 500 to 1,000,000, more preferably from 1,000 to 500,000.

The olefin polymer obtained according to the present invention may contain a heat stabilizer, a weather stabilizer, an antistatic agent, an antiblocking agent, a lubricant, a nucleating agent, a pigment, a dye, an inorganic or organic filler, and the like.

[Effects of the Invention]

The olefin polymerization catalyst of the present invention has high activity for olefin polymerization without combined use of an expensive organoaluminum oxycompound or organoboron compound. The catalyst is inexpensive since the catalyst does not use an expensive organoaluminum compound or organoboron compound. The catalyst keeps high activity in a long time of olefin polymerization.

The process for producing an olefin polymer of the present invention gives the olefin polymer having a narrow molecular weight distribution at a high yield by polymerization in the presence of the above olefin polymerization catalyst.

EXAMPLES

The present invention is described specifically by reference to examples without limiting the invention in any way.

The molecular weight distribution of the polymers and copolymers was measured by gel permeation chromatography (GPC: high-temperature size exclusion chromatography) to obtain the weight-average molecular weight (Mw) and the number-average molecular weight (Wn) under the operation conditions below:

GPC Apparatus: Alliance GPC 2000(Waters Co.)

Mobile phase: o-Dichlorobenzene

Mobile phase flow rate: 1 mL/min.

Columns: Four columns:
  two columns of TSK/GEL (trade name) model "GMH6-HT"
  two columns of TSK/GEL (trade name) model "GMH6-HTL"

Temperature: 140° C.

Sample concentration: 30 mg/20 mL (0.15%(w/v))

Sample injection volume: 500 μL

Detector: Built-in refratometer of chromatograph apparatus

Calibration standard:
  High-density polyethylene, Rigidex (trademark) 6070EA (supplied by BP Chemicals S.N.C.)
  Mw=65,000, Mw/Mn=4, and Mw=210,000, Mw/Mn=17.5

Example 1

[Preparation of Component (B1)]

Component (B1) in a homogeneous solution was prepared by reaction of 95.2 g (1.0 mol) of anhydrous magnesium chloride, 442 mL of decane, and 390.6 g (3.0 mol) of 2-ethylhexyl alcohol at 130° C. for 2 hours.

[Preparation of Component (B1-1)]

Component (B1-1) was prepared by contact reaction of 1.0 mL of Component (B1) (1 mmol in terms of magnesium atom), and 3.0 mmol of triethylaluminum in 15 mL of purified toluene for 5 minutes.

[Polymerization]

A 500-mL glass autoclave equipped with a paddle stirrer and purged sufficiently with nitrogen was charged with 250 mL of purified toluene. The autoclave was heated up to 50° C. Therein ethylene was allowed to flow at a rate of 100 L/hr to saturate the liquid phase and the gas phase with ethylene. Then the entire of the Component (B1-1) was introduced therein. After 3 minutes, 3.12 mg (0.005 mmol in terms of titanium atom) of Component (A1) shown below was introduced thereinto initiate polymerization. The polymerization was conducted in an ethylene gas atmosphere at atmospheric pressure for 30 minutes. The polymerization was stopped by addition of a small amount of isobutyl alcohol. The reaction mixture was poured into a large amount of methanol to deposit the resulting polymer entirely. After addition of hydrochloric acid, the polymer was collected by filtration with a glass filter. The collected polymer was vacuum-dried for 10 hours to obtain 2.75 g of polyethylene.

The catalyst had polymerization activity of 1,100 g/mmol-Ti·hr. The resulting polyethylene had an intrinsic viscosity of 4.05 dL/g at 135° C. in decaline (hereinafter referred to as "[η]"); and Mw of $2.4 \times 10^5$ and Mw/Mn of 2.18 according to GPC.

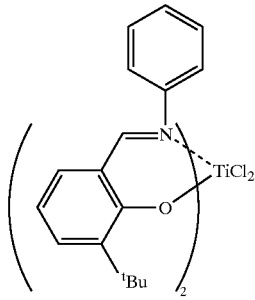

Component (A1)

Example 1-1

A 500-mL glass autoclave equipped with a paddle stirrer and purged sufficiently with nitrogen was charged with 250 mL of purified toluene. The autoclave was heated up to 50° C. Therein ethylene was allowed to flow at a rate of 100 L/hr to saturate the liquid phase and the gas phase with ethylene. Then the entire of Component (B1-1) prepared in the same manner as in Example 1 was introduced therein. After 3 minutes, 3.68 mg (0.005 mmol in terms of titanium atom) of Component (A1-117) shown below was added therein to initiate polymerization. The polymerization was conducted in an ethylene gas atmosphere at atmospheric pressure for 30 minutes. The polymerization was stopped by addition of a small amount of isobutyl alcohol. The reaction mixture was poured into a large amount of methanol to deposit the resulting polymer entirely. After addition of hydrochloric acid, the polymer was collected by filtration with a glass filter. The collected polymer was vacuum-dried for 10 hours to obtain 5.59 g of polyethylene.

The catalyst had polymerization activity of 2240 g/mmol-Ti·hr. The resulting polyethylene had [η] of 6.10 dL/g; and Mw of $3.25 \times 10^5$ and Mw/Mn of 2.26 according to GPC.

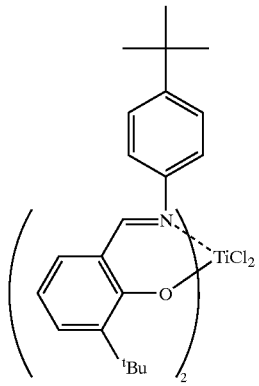

Component (A1-117)

Example 1-2

A 500-mL glass autoclave equipped with a paddle stirrer and purged sufficiently with nitrogen was charged with 250 mL of purified toluene. The autoclave was heated up to 50° C. Therein ethylene was allowed to flow at a rate of 100 L/hr to saturate the liquid phase and the gas phase with ethylene. Then the entire of Component (B1-1) prepared in the same manner as in Example 1 was introduced therein. After 3 minutes, 3.48 mg (0.005 mmol in terms of titanium atom) of Component (A1-72) shown below was introduced therein to initiate polymerization. The polymerization was conducted in an ethylene gas atmosphere at atmospheric pressure for 30 minutes. The polymerization was stopped by addition of a small amount of isobutyl alcohol. The reaction mixture was poured into a large amount of methanol to deposit the resulting polymer entirely. After addition of hydrochloric acid, the polymer was collected by filtration with a glass filter. The collected polymer was vacuum-dried for 10 hours to obtain 7.81 g of polyethylene.

The catalyst had polymerization activity of 3120 g/mmol-Ti·hr. The resulting polyethylene had [η] of 8.64 dL/g; and Mw of $4.97 \times 10^5$ and Mw/Mn of 2.71 according to GPC.

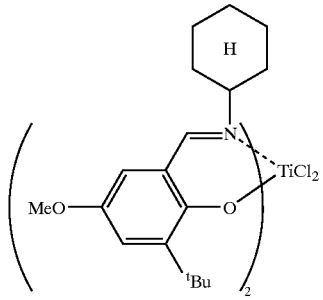

Component (A1-72)

Example 1-3

A 500-mL glass autoclave equipped with a paddle stirrer and purged sufficiently with nitrogen was charged with 250 mL of purified toluene. The autoclave was heated up to 50° C. Therein ethylene was allowed to flow at a rate of 100 L/hr to saturate the liquid phase and the gas phase with ethylene. Then the entire of Component (B1-1) prepared in the same manner as in Example 1 was introduced therein. After 3 minutes, 4.48 mg (0.005 mmol in terms of titanium atom) of Component (A1-51) shown below was introduced therein to initiate polymerization. The polymerization was conducted in an ethylene gas atmosphere at atmospheric pressure for 30 minutes. The polymerization was stopped by addition of a small amount of isobutyl alcohol. The reaction mixture was poured into a large amount of methanol to deposit the resulting polymer entirely. After addition of hydrochloric acid, the polymer was collected by filtration with a glass filter. The collected polymer was vacuum-dried for 10 hours to obtain 2.21 g of polyethylene.

The catalyst had polymerization activity of 880 g/mmol-Ti·hr. The resulting polyethylene had [η] of 6.28 dL/g; and Mw of $3.43 \times 10^5$ and Mw/Mn of 2.60 according to GPC.

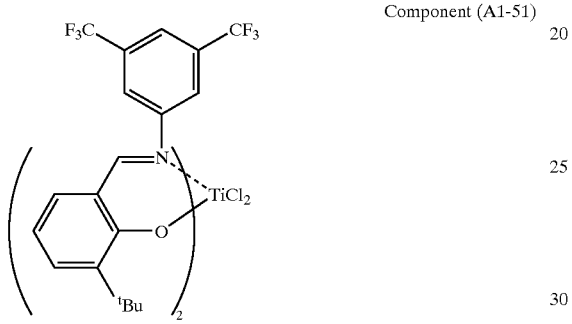

Component (A1-51)

Comparative Example 1

A 500-mL glass autoclave equipped with a paddle stirrer and purged sufficiently with nitrogen was charged with 250 mL of purified toluene. Then a solution previously prepared by contact reaction of 390.6 mg (3.0 mmol) and 3.0 mmol of triethyl aluminum in 15 mL of purified toluene for 5 minutes was introduced therein. After 3 minutes, 3.12 mg (0.005 mmol in terms of titanium atom) of Component (A1) used in Example 1 was introduced therein to initiate polymerization. The polymerization was conducted in an ethylene gas atmosphere at atmospheric pressure for 30 minutes. The polymerization was stopped by addition of a small amount of isobutyl alcohol. The reaction mixture was poured into a large amount of methanol. However, no polymer was obtained.

Example 2

[Preparation of Component (B1-2)]

Component (B1-2) was prepared by contact reaction of 1.0 mL of Component (B1) (1 mmol in terms of magnesium atom) prepared in the same manner as in Example 1, and 4.0 mmol of triethylaluminum in 15 mL of purified toluene for 5 minutes.

[Polymerization]

A 500-mL glass autoclave equipped with a paddle stirrer and purged sufficiently with nitrogen was charged with 250 mL of purified toluene. The autoclave was heated up to 50° C. Therein ethylene was allowed to flow at a rate of 100 L/hr to saturate the liquid phase and the gas phase with ethylene. Then the entire of the Component (B1-2) was introduced therein. After 3 minutes, 3.33 mg (0.005 mmol in terms of zirconium atom) of Component (A2) shown below was added therein to initiate polymerization. The polymerization was conducted in an ethylene gas atmosphere at atmospheric pressure for 30 minutes. The polymerization was stopped by addition of a small amount of isobutyl alcohol. The reaction mixture was poured into a large amount of methanol to deposit the resulting polymer entirely. After addition of hydrochloric acid, the polymer was collected by filtration with a glass filter. The collected polymer was vacuum-dried for 10 hours to obtain 12.3 g of polyethylene.

The catalyst had polymerization activity of 4,920 g/mmol-Zr·hr. The resulting polyethylene had [η] of 1.45 dL/g.

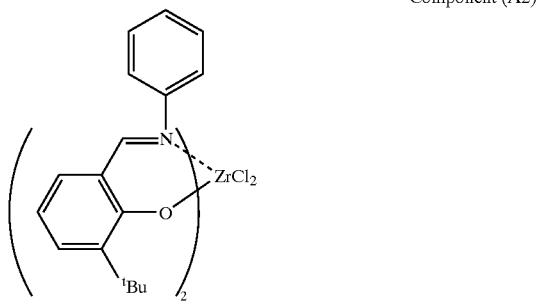

Component (A2)

Example 2-1

A 500-mL glass autoclave equipped with a paddle stirrer and purged sufficiently with nitrogen was charged with 250 mL of purified toluene. The autoclave was heated up to 50° C. Therein ethylene was allowed to flow at a rate of 100 L/hr to saturate the liquid phase and the gas phase with ethylene. Then the entire of Component (B1-2) prepared in the same manner as in Example 2 was introduced therein. After 3 minutes, 3.76 mg (0.005 mmol in terms of zirconium atom) of Component (A2-84) shown below was introduced therein to initiate polymerization. The polymerization was conducted in an ethylene gas atmosphere at atmospheric pressure for 30 minutes. The polymerization was stopped by addition of a small amount of isobutyl alcohol. The reaction mixture was poured into a large amount of methanol to deposit the resulting polymer entirely. After addition of hydrochloric acid, the polymer was collected by filtration with a glass filter. The collected polymer was vacuum-dried for 10 hours to obtain 11.19 g of polyethylene.

The catalyst had polymerization activity of 4,480 g/mmol-Zr·hr. The resulting polyethylene had [η] of 3.32 dL/g.

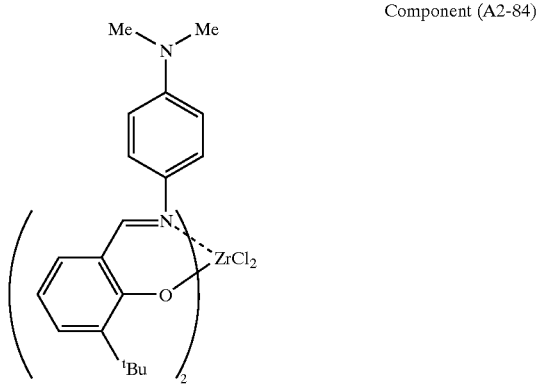

Component (A2-84)

Example 2-2
[Preparation of Component (B1-3)]

Component (B1-3) was prepared in the same manner as Example 2 except that 4.0 mmol of triisobutylaluminum was used in place of triethylaluminum used in preparing Component (B1-2).

[Polymerization]

Polymerization was conducted in the same manner as in Example 2 except that Component (B1-3) was used in place of Component (B1-2). Thereby 14.92 g of polyethylene was obtained.

The catalyst had polymerization activity of 5,970 g/mmol-Zr·hr. The resulting polyethylene had [η] of 2.04 dL/g.

Comparative Example 2

A 500-mL glass autoclave equipped with a paddle stirrer and purged sufficiently with nitrogen was charged with 250 mL of purified toluene. The autoclave was heated up to 50° C. Therein ethylene was allowed to flow at a rate of 100 L/hr to saturate the liquid phase and the gas phase with ethylene. Then 1.0 mmol of triethylaluminum was introduced therein. After 3 minutes, 3.33 mg (0.005 mmol in terms of zirconium atom) of Component (A2) used in Example 2 was introduced therein to initiate polymerization. The polymerization was conducted in an ethylene gas atmosphere at atmospheric pressure for 30 minutes. The polymerization was stopped by addition of a small amount of isobutyl alcohol. The reaction mixture was poured into a large amount of methanol. However, no polymer was obtained.

Example 3-1
[Preparation of Component (B1-4)]

Component (B1-4) was prepared by contact reaction of 0.4 mL (0.4 mmol in terms of magnesium atom) of Component (B1) prepared in the same manner as in Example 1 and 1.2 mmol of trimethylaluminum in 15 mL of purified toluene for 5 minutes.

[Polymerization]

A 1-liter stainless steel autoclave (hereinafter stainless steel is referred to as "SUS") purged sufficiently with nitrogen was charged with 500 mL of purified toluene. Therein ethylene was allowed to flow to saturate the liquid phase and the gas phase with ethylene. Then the entire of Component (B1-4) (0.4 mmol in terms of magnesium atom) prepared previously was introduced therein. After 3 minutes, 1.25 mg (0.002 mmol in terms of titanium atom) of Component (A1) was introduced therein to initiate polymerization. The polymerization was conducted at an ethylene pressure of 0.78 MPa·G for 30 minutes. During the polymerization, the temperature was kept at 25° C., and the ethylene pressure was kept at 0.78 MPa·G. After the polymerization, the reaction mixture was poured into a large amount of methanol to deposit the resulting polymer entirely. After addition of hydrochloric acid, the polymer was collected by filtration with a glass filter. The collected polymer was vacuum-dried for 10 hours to obtain 5.46 g of polyethylene.

The catalyst had polymerization activity of 5,500 g/mmol-Ti·hr. The resulting polyethylene had [η] of 17.6 dL/g.

Example 3-2
[Polymerization]

Polymerization was conducted in the same manner as in Example 3-1 except that 0.4 mmol, in terms of magnesium atom, of Component (B1-1) was used in place of Component (B1-4). Thereby 9.00 g of polyethylene was obtained.

The catalyst had polymerization activity of 9,000 g/mmol-Ti·hr. The resulting polyethylene had [η] of 9.47 dL/g; and Mw of $5.35 \times 10^5$ and Mw/Mn of 2.66 according to GPC.

Example 3-3
[Preparation of Component (B1-5)]

Component (B1-5) was prepared in the same manner as Example 3-1 except that 1.2 mmol of triisobutylaluminum was used in place of trimethylaluminum used in preparing Component (B1-4).

[Polymerization]

Polymerization was conducted in the same manner as Example 3-1 except that Component (B1-5) was used in place of Component (B1-4). Thereby 12.1 g of polyethylene was obtained.

The catalyst had polymerization activity of 12,100 g/mmol-Ti·hr. The resulting polyethylene had [η] of 9.96 dL/g.

Example 3-4
[Preparation of Component (B1-6)]

Component (B1-6) was prepared in the same manner as Example 3-1 except that 1.2 mmol of tri-n-octylaluminum was used in place of trimethylaluminum used in preparing Component (B1-4).

[Polymerization]

Polymerization was conducted in the same manner as in Example 3-1 except that Component (B1-6) was used in place of Component (B1-4), to obtain 0.20 g of polyethylene.

The catalyst had polymerization activity of 200 g/mmol-Ti·hr. The resulting polyethylene had [η] of 10.3 dL/g; and Mw of $4.35 \times 10^5$ and Mw/Mn of 1.95 according to GPC.

Example 3-5
[Polymerization]

A 1-liter SUS autoclave purged sufficiently with nitrogen was charged with 500 mL of purified toluene. Therein ethylene was allowed to flow to saturate the liquid phase and the gas phase with ethylene. Therein, were charged successively 1.2 mmol of triisobutylaluminum, 0.4 mL of Component (B1) prepared in the same manner as in Example 1(0.4 mmol in terms of magnesium atom), and 1.25 mg of Component (A1) (0.002 mmol in terms of titanium atom) in the named order at 25° C. under an ethylene atmosphere. Polymerization was conducted at an ethylene pressure of 0.78 MPa·G for 30 minutes. During the polymerization, the temperature was kept at 25° C., and the ethylene pressure was kept at 0.78 MPa·G. After the polymerization, the reaction mixture was poured into a large amount of methanol to deposit the resulting polymer entirely. After addition of hydrochloric acid, the polymer was collected by filtration with a glass filter. The collected polymer was vacuum-dried for 10 hours to obtain 14.30 g of polyethylene.

The catalyst had polymerization activity of 14,300 g/mmol-Ti·hr. The resulting polyethylene had [η] of 9.31 dL/g; and Mw of $5.68 \times 10^5$ and Mw/Mn of 2.46 according to GPC.

Example 3-6
[Preparation of Component (B2)]

Component (B2) was prepared by adding 78.1 mg (0.6 mmol) of 2-ethylhexyl alcohol to 0.4 mL of Component (B1) (0.4 mmol in terms of magnesium atom) prepared in the same manner as in Example 1 in 15 mL of purified toluene, and stirring the mixture for contact for 5 minutes.

[Polymerization]

A 1-liter SUS autoclave purged sufficiently with nitrogen was charged with 500 mL of purified toluene. Therein ethylene was allowed to flow to saturate the liquid phase and the gas phase with ethylene. Therein, were charged successively 1.8 mmol of triisobutylaluminum, the entire of Component (B2) (0.4 mmol in terms of magnesium atom) prepared previously, and 1.25 mg of Component (A1) (0.002 mmol in terms of titanium atom) in the named order at 25° C. under an ethylene atmosphere. Polymerization was conducted at an ethylene pressure of 0.78 MPa·G for 30 minutes. During the polymerization, the temperature was kept at 25° C., and the ethylene pressure was kept at 0.78 MPa·G. After the polymerization, the reaction mixture was poured into a large amount of methanol to deposit the resulting polymer entirely. After addition of hydrochloric acid, the polymer was collected by filtration with a glass filter. The collected polymer was vacuum-dried for 10 hours to obtain 21.75 g of polyethylene.

The catalyst had polymerization activity of 21,800 g/mmol-Ti·hr. The resulting polyethylene had [η] of 9.55 dL/g; and Mw of $5.52 \times 10^5$ and Mw/Mn of 2.50 according to GPC.

Example 3-7
[Preparation of Component (B3)]

Component (B3) was prepared by adding 156.2 mg (1.2 mmol) of 2-ethylhexyl alcohol to 0.4 mL of Component (B1) (0.4 mmol in terms of magnesium atom) prepared in the same manner as in Example 1 in 15 mL of purified toluene, and stirring the mixture for contact for 5 minutes.
[Polymerization]

A 1-liter SUS autoclave purged sufficiently with nitrogen was charged with 500 mL of purified toluene. Therein ethylene was allowed to flow to saturate the liquid phase and the gas phase with ethylene. Therein, were charged successively 2.4 mmol of triisobutylaluminum, the entire of Component (B3) (0.4 mmol in terms of magnesium atom) prepared previously, and 1.25 mg of Component (A1) (0.002 mmol in terms of titanium atom) in the named order at 25° C. under an ethylene atmosphere. Polymerization was conducted at an ethylene pressure of 0.78 MPa·G for 30 minutes. During the polymerization, the temperature was kept at 25° C., and the ethylene pressure was kept at 0.78 MPa·G. After the polymerization, the reaction mixture was poured into a large amount of methanol to deposit the resulting polymer entirely. After addition of hydrochloric acid, the polymer was collected by filtration with a glass filter. The collected polymer was vacuum-dried for 10 hours to obtain 29.28 g of polyethylene.

The catalyst had polymerization activity of 29,300 g/mmol-Ti·hr. The resulting polyethylene had [η] of 9.43 dL/g; and Mw of $5.39 \times 10^5$ and Mw/Mn of 2.38 according to GPC.

Example 3-8
[Preparation of Component (B4)]

Component (B4) was prepared by adding 312.5 mg (2.4 mmol) of 2-ethylhexyl alcohol to 0.4 mL (0.4 mmol in terms of magnesium atom) of Component (B1) prepared in the same manner as in Example 1 in 15 mL of purified toluene, and stirring the mixture for contact for 5 minutes.
[Polymerization]

A 1-liter SUS autoclave purged sufficiently with nitrogen was charged with 500 mL of purified toluene. Therein ethylene was allowed to flow to saturate the liquid phase and the gas phase with ethylene. Therein, were charged successively 3.6 mmol of triisobutylaluminum, the entire of Component (B4) (0.4 mmol in terms of magnesium atom) prepared previously, and 1.25 mg of Component (A1) (0.002 mmol in terms of titanium atom) in the named order at 25° C. under an ethylene atmosphere. Polymerization was conducted at an ethylene pressure of 0.78 MPa·G for 30 minutes. During the polymerization, the temperature was kept at 25° C., and the ethylene pressure was kept at 0.78 MPa·G. After the polymerization, the reaction mixture was poured into a large amount of methanol to deposit the resulting polymer entirely. After addition of hydrochloric acid, the polymer was collected by filtration with a glass filter. The collected polymer was vacuum-dried for 10 hours to obtain 15.47 g of polyethylene.

The catalyst had polymerization activity of 15,500 g/mmol-Ti·hr. The resulting polyethylene had [η] of 9.41 dL/g; and Mw of $5.13 \times 10^5$ and Mw/Mn of 2.39 according to GPC.

Example 3-9
[Preparation of Component (B5)]

Component (B5) was prepared by adding 468.7 mg (3.6 mmol) of 2-ethylhexyl alcohol to 0.4 mL of Component (B1) (0.4 mmol in terms of magnesium atom) prepared in the same manner as in Example 1 in 15 mL of purified toluene, and stirring the mixture for contact for 5 minutes.
[Polymerization]

A 1-liter SUS autoclave purged sufficiently with nitrogen was charged with 500 mL of purified toluene. Therein ethylene was allowed to flow to saturate the liquid phase and the gas phase with ethylene. Therein, were charged successively 4.8 mmol of triisobutylaluminum, the entire of Component (B5) (0.4 mmol in terms of magnesium atom) prepared previously, and 1.25 mg of Component (A1) (0.002 mmol in terms of titanium atom) in the named order at 25° C. under an ethylene atmosphere. Polymerization was conducted at an ethylene pressure of 0.78 MPa·G for 30 minutes. During the polymerization, the temperature was kept at 25° C., and the ethylene pressure was kept at 0.78 MPa·G. After the polymerization, the reaction mixture was poured into a large amount of methanol to deposit the resulting polymer entirely. After addition of hydrochloric acid, the polymer was collected by filtration with a glass filter. The collected polymer was vacuum-dried for 10 hours to obtain 13.17 g of polyethylene.

The catalyst had polymerization activity of 13,200 g/mmol-Ti·hr. The resulting polyethylene had [η] of 8.95 dL/g; and Mw of $5.20 \times 10^5$ and Mw/Mn of 2.47 according to GPC.

Example 3-10
[Preparation of Component (B6)]

Component (B6) in a homogeneous solution was prepared by reaction of 9.86 g (0.10 mol) of anhydrous magnesium chloride, 50 mL of decane, and 64.89 g (0.45 mol) of 2-ethylhexanoic acid at 140° C. for 4 hours.
[Polymerization]

A 1-liter SUS autoclave purged sufficiently with nitrogen was charged with 500 mL of purified toluene. Therein ethylene was allowed to flow to saturate the liquid phase and the gas phase with ethylene. Therein, were charged successively 1.8 mmol of triisobutylaluminum, 0.48 mL of Component (B6) (0.4 mmol in terms of magnesium atom) prepared previously, and 1.25 mg of Component (A1) (0.002 mmol in terms of titanium atom) in the named order at 25° C. under an ethylene atmosphere. Polymerization was conducted at an ethylene pressure of 0.78 MPa·G for 30 minutes. During the polymerization, the temperature was kept at 25° C., and the ethylene pressure was kept at 0.78 MPa·G. After the polymerization, the reaction mixture was poured into a large amount of methanol to deposit the resulting polymer entirely. After addition of hydrochloric acid, the polymer was collected by filtration with a glass filter. The collected polymer was vacuum-dried for 10 hours to obtain 0.23 g of polyethylene.

The catalyst had polymerization activity of 230 g/mmol-Ti·hr. The resulting polyethylene had [η] of 6.59 dL/g.

Example 3-11

[Preparation of Component (B7)]

Component (B7) in a homogeneous solution was prepared by mixing and stirring 0.75 g (6.05 mmol) of anhydrous manganese chloride, 45 mL of toluene, and 3.2 mL (55.2 mmol) of ethanol at room temperature for 24 hours.

[Polymerization]

A 1-liter SUS autoclave purged sufficiently with nitrogen was charged with 500 mL of purified toluene. Therein ethylene was allowed to flow to saturate the liquid phase and the gas phase with ethylene. Therein, were charged successively 3.6 mmol of triisobutylaluminum, 3.31 mL of Component (B7) (0.4 mmol in terms of manganese atom) prepared previously, and 1.25 mg of Component (A1) (0.002 mmol in terms of titanium atom) in the named order at 25° C. under an ethylene atmosphere. Polymerization was conducted at an ethylene pressure of 0.78 MPa·G for 30 minutes. During the polymerization, the temperature was kept at 25° C., and the ethylene pressure was kept at 0.78 MPa·G. After the polymerization, the reaction mixture was poured into a large amount of methanol to deposit the resulting polymer entirely. After addition of hydrochloric acid, the polymer was collected by filtration with a glass filter. The collected polymer was vacuum-dried for 10 hours to obtain 0.85 g of polyethylene.

The catalyst had polymerization activity of 850 g/mmol-Ti·hr.

Example 3-12

[Polymerization]

A 1-liter SUS autoclave purged sufficiently with nitrogen was charged with 500 mL of purified toluene. Therein ethylene was allowed to flow to saturate the liquid phase and the gas phase with ethylene. Therein, were charged successively 1.2 mmol of diethylaluminum chloride, 1.2 mmol of triethylaluminum, and Component (B3) (0.4 mmol in terms of manganese atom) prepared in the same manner as Example 3-7, and then 0.156 mg of Component (A1) (0.25 μmol in terms of titanium. atom) in the named order at 50° C. under an ethylene atmosphere. Polymerization was conducted at an ethylene pressure of 0.78 MPa·G for 30 minutes. During the polymerization, the temperature was kept at 50° C., and the ethylene pressure was kept at 0.78 MPa·G. After the polymerization, the reaction mixture was poured into a large amount of methanol to deposit the resulting polymer entirely. After addition of hydrochloric acid, the polymer was collected by filtration with a glass filter. The collected polymer was vacuum-dried for 10 hours to obtain 16.44 g of polyethylene.

The catalyst had polymerization activity of 131,500 g/mmol-Ti·hr.

Example 3-13

[Polymerization]

A 1-liter SUS autoclave purged sufficiently with nitrogen was charged with 500 mL of purified toluene. Therein ethylene was allowed to flow to saturate the liquid phase and the gas phase with ethylene. Therein, were charged successively 1.2 mmol of diethylaluminum chloride, 1.2 mL of triethylaluminum and Component (B3) (0.4 mmol in terms of manganese atom) prepared in the same manner as Example 3-7, and then 0.078 mg of Component (A1)(0.125 μmol in terms of titanium atom) in the named order at 75° C. under an ethylene atmosphere. Polymerization was conducted at an ethylene pressure of 0.78 MPa·G for 30 minutes. During the polymerization, the temperature was kept at 75° C., and the ethylene pressure was kept at 0.78 MPa·G. After the polymerization, the reaction mixture was poured into a large amount of methanol to deposit the resulting polymer entirely. After addition of hydrochloric acid, the polymer was collected by filtration with a glass filter. The collected polymer was vacuum-dried for 10 hours to obtain 29.94 g of polyethylene.

The catalyst had polymerization activity of 479,000 g/mmol-Ti·hr.

Comparative Example 3

[Preparation of Component (B1-0)]

Component (B1-0) was prepared by adding 0.4 mL of Component (B1) (0.4 mmol in terms of magnesium atom) prepared in the same manner as in Example 1 and 0.6 mmol of triethylaluminum in 15 mL of purified toluene, and conducting contact reaction thereof for 5 minutes.

[Polymerization]

Polymerization was conducted in the same manner as in Example 3-1 except that Component (B1-0) was used in place of Component (B1-4). After the polymerization, the reaction mixture was poured into a large amount of methanol. However, no polymer was obtained.

Comparative Example 4

A 1-liter SUS autoclave purged sufficiently with nitrogen was charged with 500 mL of purified toluene. Therein ethylene was allowed to flow to saturate the liquid phase and the gas phase with ethylene. Therein, were charged successively 1.25 mmol of methylaluminoxane, in terms of aluminum atom (manufactured by Albemal Co., Ltd. 10 wt % toluene solution), and then 0.312 mg of Component (A1) (0.5 mol in terms of titanium atom) in this order at 50° C. under an ethylene atmosphere. Polymerization was conducted at an ethylene pressure of 0.78 MPa·G for 30 minutes. During the polymerization, the temperature was kept at 50° C., and the ethylene pressure was kept at 0.78 MPa·G. After the polymerization, the reaction mixture was poured into a large amount of methanol to deposit the resulting polymer entirely. After addition of hydrochloric acid, the polymer was collected by filtration with a glass filter. The collected polymer was vacuum-dried for 10 hours to obtain 11.16 g of polyethylene.

The catalyst had polymerization activity of 44,600 g/mmol-Ti·hr.

Comparative Example 5

[Polymerization]

Polymerization was conducted in the same manner as in Comparative Example 4 except that the temperature of feeding methylaluminoxane and Component (A1) and polymerization temperature were changed to 75° C. Thereby 8.96 g of polyethylene was obtained.

Example 4-1

A 1-liter SUS autoclave purged sufficiently with nitrogen was charged with 500 mL of purified toluene. Therein ethylene was allowed to flow to saturate the liquid phase and the gas phase with ethylene. Therein, were charged successively 2.5 mmol of triisobutylaluminum, 0.5 mL of Component (B1) (0.5 mmol in terms of magnesium atom) prepared in the same manner as in Example 1, and 0.667 mg of Component (A2) (0.001 mmol in terms of zirconium atom) in the named order at 25° C. under an ethylene atmosphere. Polymerization was conducted at an ethylene pressure of 0.78 MPa·G for 30 minutes. During the polymerization, the temperature was kept at 25° C., and the ethylene pressure was kept at 0.78 MPa·G. After the polymerization, the reaction mixture was poured into a large amount of methanol to deposit the resulting polymer entirely. After addition of hydrochloric acid, the polymer was collected by filtration with a glass filter. The collected polymer was vacuum-dried for 10 hours to obtain 12.34 g of polyethylene.

The catalyst had polymerization activity of 24,700 g/mmol-Zr·hr. The resulting polyethylene had [η] of 3.68 dL/g.

Example 4-2

Polymerization was conducted in the same manner as in Example 4-1 except that the temperature of charging of triisobutylaluminum, Component (B1), and Component (A2), and the temperature of polymerization were changed to 50° C. respectively. As the result, 28.11 g of polyethylene was obtained.

The catalyst had polymerization activity of 56,200 g/mmol-Zr·hr. The resulting polyethylene had [η] of 5.33 dL/g.

Example 4-3

Polymerization was conducted in the same manner as in Example 4-1 except that the temperature of feeding of triisobutylaluminum, Component (B1), and Component (A2), and the polymerization temperature were changed to 75° C. As the result, 16.63 g of polyethylene was obtained.

The catalyst had polymerization activity of 33,300 g/mmol-Zr·hr. The resulting polyethylene had [η] of 3.14 dL/g.

Example 4-4

A 1-liter SUS autoclave purged sufficiently with nitrogen was charged with 500 mL of purified toluene. Therein ethylene was allowed to flow to saturate the liquid phase and the gas phase with ethylene. Then the autoclave was heated up to 50° C. Therein, were charged successively 1.9 mmol of triisobutylaluminum, 0.5 mL of Component (B1) (0.5 mmol in terms of magnesium atom) prepared in the same manner as in Example 1, and 0.753 mg of Component (A2-84)(0.001 mmol in terms of zirconium atom) in the named order under an ethylene atmosphere. Polymerization was conducted at an ethylene pressure of 0.78 MPa·G for 30 minutes. During the polymerization, the temperature was kept at 50° C., and the ethylene pressure was kept at 0.78 MPa·G. After the polymerization, the reaction mixture was poured into a large amount of methanol to deposit the resulting polymer entirely. After addition of hydrochloric acid, the polymer was collected by filtration with a glass filter. The collected polymer was vacuum-dried for 10 hours to obtain 24.58 g of polyethylene.

The catalyst had polymerization activity of 49,200 g/mmol-Zr·hr. The resulting polyethylene had [η] of 11.9 dL/g.

Example 4-5

Polymerization was conducted in the same manner as in Example 4-4 except that the temperature of feeding of triisobutylaluminum, Component (B1), and Component (A2-84), and the temperature of polymerization were changed to 75° C. As the result, polyethylene was obtained in a yield of 17.67 g.

The catalyst had polymerization activity of 35,300 g/mmol-Zr·hr. The resulting polyethylene had [η] of 7.25 dL/g.

Example 4-6

A 1-liter SUS autoclave purged sufficiently with nitrogen was charged with 500 mL of purified toluene. Therein ethylene was allowed to flow to saturate the liquid phase and the gas phase with ethylene. Then the autoclave was heated up to 50° C. Therein, were charged successively 1.9 mmol of triisobutylaluminum, 0.5 mL of Component (B1) (0.5 mmol in terms of magnesium atom) prepared in the same manner as in Example 1, and 0.767 mg of Component (A2-116) (0.001 mmol in terms of zirconium atom) shown below in the named order under an ethylene atmosphere. Polymerization was conducted at an ethylene pressure of 0.78 MPa·G for 30 minutes. During the polymerization, the temperature was kept at 50° C., and the ethylene pressure was kept at 0.78 MPa·G. After the polymerization, the reaction mixture was poured into a large amount of methanol to deposit the resulting polymer entirely. After addition of hydrochloric acid, the polymer was collected by filtration with a glass filter. The collected polymer was vacuum-dried for 10 hours to obtain 44.22 g of polyethylene.

The catalyst had polymerization activity of 176,900 g/mmol-Zr·hr. The resulting polyethylene had [η] of 24.2 dL/g.

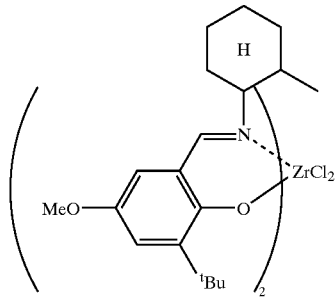

Component (A2-116)

Example 4-7

A 1-liter SUS autoclave purged sufficiently with nitrogen was charged with 500 mL of purified toluene. Therein ethylene was allowed to flow to saturate the liquid phase and the gas phase with ethylene. Then the autoclave was heated up to 75° C. Therein, were charged successively 1.9 mmol of triisobutylaluminum, 0.5 mL of Component (B1) (0.5 mmol in terms of magnesium atom prepared in the same manner as in Example 1), and 0.384 mg of Component (A2-116) (0.0005 mmol in terms of zirconium atom) in the named order under an ethylene atmosphere. Polymerization was conducted at an ethylene pressure of 0.78 MPa·G for 15 minutes. During the polymerization, the temperature was kept at 75° C., and the ethylene pressure was kept at 0.78 MPa·G. After the polymerization, the reaction mixture was poured into a large amount of methanol to deposit the resulting polymer entirely. After addition of hydrochloric acid, the polymer was collected by filtration with a glass filter. The collected polymer was vacuum-dried for 10 hours to obtain 33.25 g of polyethylene.

The catalyst had polymerization activity of 266,000 g/mmol-Zr·hr. The resulting polyethylene had [η] of 15.8 dL/g.

Example 5-1

A 500-mL glass autoclave equipped with a paddle stirrer and purged sufficiently with nitrogen was charged with 250 mL of purified toluene, and was heated up to 75° C. Therein ethylene was allowed to flow at a rate of 100 L/hr with stirring to saturate the liquid phase and the gas phase with ethylene. Therein, were charged successively 0.5 mL of Component (B1) (0.5 mmol in terms of magnesium atom) prepared in the same manner as in Example 1, 0.25 mmol of ethyl trichloroacetate, 1.5 mmol of triethylaluminum, 0.25 mmol of diethylaluminum chloride, and 1.317 mg of Component (A7-1) (0.00275 mmol in terms of vanadium atom) shown below in the named order at intervals of 30 seconds with stirring at 1200 rpm to initiate polymerization. Polymerization was conducted in an ethylene gas atmosphere at atmospheric pressure for 15 minutes. The polymerization was stopped by addition of a small amount of isobutyl alcohol. The reaction mixture was poured into a large amount of methanol to deposit the resulting polymer entirely. After addition of hydrochloric acid, the polymer was collected by filtration with a glass filter. The collected polymer was vacuum-dried for 10 hours to obtain 15.23 g of polyethylene.

The catalyst had polymerization activity of 22,200 g/mmol-V·hr. The resulting polyethylene had [η] of 26.5 dL/g.

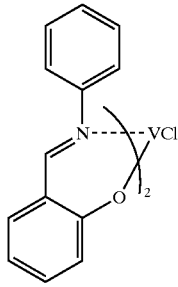

Component (A7-1)

Example 5-2

Polymerization was conducted in the same manner as in Example 5-1 except that 1.414 mg of Component (A7-2) (0.00275 mmol in terms of vanadium atom) shown below was used in place of Component (A7-1). As the result, polyethylene was obtained in a yield of 13.80 g.

The catalyst had polymerization activity of 20,100 g/mmol-V·hr. The resulting polyethylene had [η] of 30.6 dL/g.

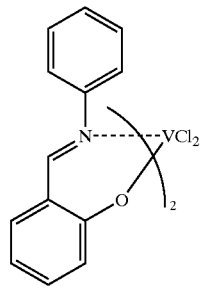

Component (A7-2)

Example 5-3

Polymerization was conducted in the same manner as in Example 5-1 except that 1.317 mg of Component (A7-3) (0.00275 mmol in terms of vanadium atom) shown below was used in place of Component (A7-1). As the result, polyethylene was obtained in a yield of 5.95 g.

The catalyst had polymerization activity of 8,650 g/mmol-V·hr.

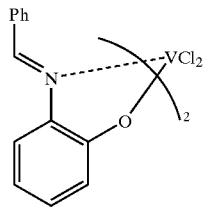

Component (A7-3)

Example 5-4

Polymerization was conducted in the same manner as in Example 5-1 except that 1.934 mg of Component (A7-4) (0.00275 mmol in terms of vanadium atom) shown below was used in place of Component (A7-1). As the result, polyethylene was obtained in a yield of 15.65 g.

The catalyst had polymerization activity of 22,800 g/mmol-V·hr. The resulting polyethylene had [η] m of 31.5 dL/g.

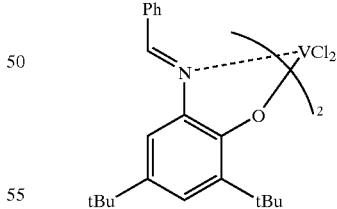

Component (A7-4)

Example 5-5

Polymerization was conducted in the same manner as in Example 5-1 except that 1.168 mg of Component (A7-5) (0.00275 mmol in terms of vanadium atom) shown below was used in place of Component (A7-1). As the result, 13.61 g of polyethylene was obtained.

The catalyst had polymerization activity of 19,800 g/mmol-V·hr. The resulting polyethylene had [η] of 26.7 dL/g.

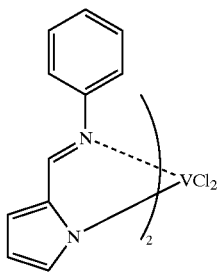

Component (A7-5)

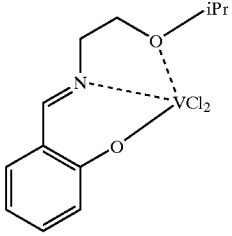

Component (A7-8)

Example 5-6

Polymerization was conducted in the same manner as in Example 5-1 except that 0.883 mg of Component (A7-6) (0.00275 mmol in terms of vanadium atom) shown below was used in place of Component (A7-1), to obtain 10.46 g of polyethylene.

The catalyst had polymerization activity of 15,200 g/mmol-V·hr. The resulting polyethylene had [η] of 34.4 dL/g.

The catalyst had polymerization activity of 19,600 g/mmol-V·hr. The resulting polyethylene had [η] of 33.9 dL/g.

Example 5-9

Polymerization was conducted in the same manner as in Example 5-1 except that 1.015 mg of Component (A7-9) (0.00275 mmol in terms of vanadium atom) shown below was used in place of Component (A7-1). As the result, polyethylene was obtained in a yield of 3.06 g.

The catalyst had polymerization activity of 4,460 g/mmol-V·hr. The resulting polyethylene had [η] of 39.4 dL/g.

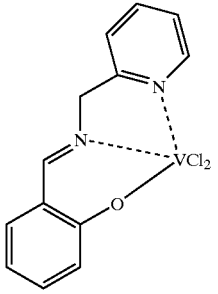

Component (A7-6)

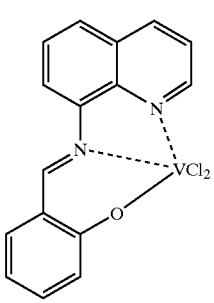

Component (A7-9)

Example 5-7

Polymerization was conducted in the same manner as in Example 5-1 except that 0.900 mg of Component (A7-7) (0.00275 mmol in terms of vanadium atom) shown below was used in place of Component (A7-1), to obtain 10.67 g of polyethylene.

The catalyst had polymerization activity of 15,500 g/mmol-V·hr. The resulting polyethylene had [η] of 31.0 dL/g.

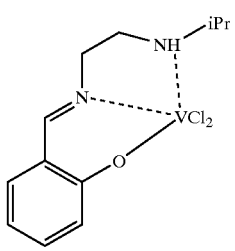

Component (A7-7)

Example 5-10

A 500-mL glass autoclave equipped with a paddle stirrer and purged sufficiently with nitrogen was charged with 250 mL of purified decane, and was heated up to 75° C. Therein ethylene and propylene were allowed to flow at an ethylene flow rate of 150 L/hr and a propylene flow rate of 50 L/hr with stirring to saturate the liquid phase and the gas phase with the mixed gas.

Therein, were charged successively 0.5 mL of Component (B1) (0.5 mmol in terms of magnesium atom) prepared in the same manner as in Example 1, 0.25 mmol of ethyl trichloroacetate, 1.5 mmol of triethylaluminum, 0.5 mmol of diethylaluminum chloride, and 1.317 mg of Component (A7-1) (0.00275 mmol in terms of vanadium atom) in the named order at intervals of 30 seconds with stirring at 1200 rpm to initiate copolymerization. The copolymerization was conducted in an ethylene-propylene mixed gas atmosphere at atmospheric pressure for 15 minutes. The polymerization was stopped by addition of a small amount of isobutyl alcohol. The reaction mixture was poured into a large amount of a methanol-acetone mixed solvent to deposit the resulting polymer entirely. After addition of hydrochloric acid, the polymer was collected by filtration with a glass filter. The collected polymer was vacuum-dried for 10 hours to obtain 2.37 g of an ethylene-propylene copolymer.

The catalyst had polymerization activity of 3,450 g/mmol-V·hr. The resulting copolymer has a propylene

Example 5-8

Polymerization was conducted in the same manner as in Example 5-1 except that 0.902 mg of Component (A7-8) (0.00275 mmol in terms of vanadium atom) shown below was used in place of Component (A7-1). As the result, polyethylene was obtained in a yield of 13.49 g.

content of 12.0 mol % according to IR measurement, and had [η] of 5.36 dL/g.

Example 5-11

Copolymerization was conducted in the same manner as in Example 5-10 except that the flow rates of the olefin gases was changed to 100 L/hr of ethylene and 100 L/hr of propylene. As the result, an ethylene-propylene copolymer was obtained in a yield of 0.93 g.

The catalyst had polymerization activity of 1,350 g/mmol-V·hr. The resulting copolymer had [η] of 3.04 dL/g.

Comparative Example 6

A 500-mL glass autoclave equipped with a paddle stirrer and purged sufficiently with nitrogen was charged with 250 mL of purified toluene, and was heated up to 75° C. Therein ethylene was allowed to flow at a rate of 100 L/hr with stirring to saturate the liquid phase and the gas phase with ethylene.

Therein, were charged successively 0.1 mmol of diethylaluminum chloride and then 0.5 mmol of ethyl trichloroacetate, and 0.239 mmg (0.0005 mmol in terms of vanadium atom) of Component (A7-1) used in Example 5-1 in the named order at intervals of 30 seconds, to initiate polymerization. The polymerization was conducted in an ethylene gas atmosphere at atmospheric pressure for 5 minutes. The polymerization was stopped by addition of a small amount of isobutyl alcohol. The reaction mixture was poured into a large amount of methanol to deposit the resulting polymer entirely. After addition of hydrochloric acid, the polymer was collected by filtration with a glass filter. The collected polymer was vacuum-dried for 10 hours to obtain 0.228 g of polyethylene.

The catalyst had polymerization activity of 5,470 g/mmol-V·hr.

Example 6-1
[Preparation of Component (B1-7-1)]

A 200-mL flask purged sufficiently with nitrogen was charged with 25 mL of Component (B1) (25 mmol in terms of magnesium atom) prepared in the same manner as in Example 1 and 100 mL of purified decane. Thereto, 26 mmol of triethylaluminum diluted with purified decane was added dropwise over 30 minutes at the liquid temperature kept at 15° C. with stirring. Then the liquid temperature was raised to 80° C. over 2 hours, and the reaction was continued further for one hour. Thereto, 49 mmol of triethylaluminum diluted with purified decane was added dropwise over 30 minutes at the temperature kept at 80° C., and the reaction was allowed to proceed by heating further for one hour. After the reaction, the solid portion was collected by filtration, and washed sufficiently with toluene.

A part of the Component (B1-7-1) prepared as above was dried and analyzed, and was found to contain 17.0 wt % of magnesium, 2.7 wt % of aluminum, 23.4 wt % of 2-ethylhexoxy group and 49.0 wt % of chlorine.
[Polymerization]

A 1-liter SUS autoclave purged sufficiently with nitrogen was charged with 400 mL of purified toluene. Therein ethylene was allowed to flow to saturate the liquid phase and the gas phase with ethylene. Then the autoclave was heated up to 50° C. Therein, were charged successively 0.2 mmol of triethylaluminum, 1.6 mmol (in terms of magnesium atom) of the above-prepared Component (B1-7-1), 5.335 mg of Component (A2) (0.008 mmol in terms of zirconium atom) used in Example 2 in the named order under an ethylene atmosphere. Polymerization was conducted at an ethylene pressure of 0.78 MPa·G for 20 minutes. During the polymerization, the temperature was kept at 50° C., and the ethylene pressure was kept at 0.78 MPa·G. After the polymerization, the reaction mixture was poured into a large amount of methanol to deposit the resulting polymer entirely. After addition of hydrochloric acid, the polymer was collected by filtration with a glass filter. The collected polymer was vacuum-dried for 10 hours to obtain 10.2 g of polyethylene.

The catalyst had polymerization activity of 3,830 g/mmol-Zr·hr. The resulting polyethylene had [η] of 3.1 dL/g.

Example 6-2
[Preparation of Component (B1-7-2)]

A 200-mL flask purged sufficiently with nitrogen was charged with 25 mL of Component (B1) (25 mmol in terms of magnesium) prepared in the same manner as in Example 1 and 100 mL of purified decane. Thereto, 100 mmol of triethylaluminum diluted with purified decane was added dropwise over 30 minutes at the liquid temperature kept at 15° C. with stirring. Then the liquid temperature was raised to 80° C. over 2 hours, and the reaction was continued further for 2 hours and 30 minutes. After the reaction, the solid portion was collected by filtration, and washed well with toluene.

A part of the Component (B1-7-2) prepared as above was dried and analyzed for the composition, and was found to contain 22.0 wt % of magnesium, 1.0 wt % of aluminum, 3.6 wt % of 2-ethylhexoxy group, and 66.0 wt % of chlorine.
[Polymerization]

Polymerization was conducted in the same manner as in Example 6-1 except that Component (B1-7-2) prepared above was used in place of Component (B1-7-1). As the result, polyethylene was obtained in a yield of 9.8 g.

The catalyst had polymerization activity of 3,680 g/mmol-Zr·hr. The resulting polyethylene had [η] of 7.1 dL/g.

Example 6-3
[Preparation of Component (B1-7-3)]

A 200-mL flask purged sufficiently with nitrogen was charged with 18.8 mL of Component (B1) (18.8 mmol in terms of magnesium) prepared in the same manner as in Example 1 and 26 mL of purified decane. Thereto, 75 mmol of triethylaluminum diluted with purified decane was added dropwise and contact reaction was allowed to proceed with stirring at the liquid temperature kept at 15° C. for 5 minutes.

Then, the entire of the reaction mixture was added to separately provided purified decane kept at 50° C. with stirring, and the reaction was continued further for 10 minutes at 50° C. After the reaction, the solid portion was collected by filtration, and washed well with toluene.

A part of the Component (B1-7-3) prepared as above was dried and analyzed, and was found to contain 19.0 wt % of magnesium, 2.1 wt % of aluminum, 13.7 wt % of 2-ethylhexoxy group, and 56.0 wt % of chlorine.
[Polymerization]

Polymerization was conducted in the same manner as in Example 6-1 except that Component (B1-7-3) prepared above was used in place of Component (B1-7-1). As the result, polyethylene was obtained in a yield of 20.8 g.

The catalyst had polymerization activity of 7,800 g/mmol-Zr·hr. The resulting polyethylene had [η] of 4.74 dL/g.

Example 6-4

[Preparation of Component (B1-7-4)]

A 200-mL flask purged sufficiently with nitrogen was charged with 18.8 mL of Component (B1) (18.8 mmol in terms of magnesium atom) prepared in the same manner as in Example 1 and 26 mL of purified decane. Thereto, 75 mmol of triethylaluminum diluted with purified decane was added dropwise and contact reaction was allowed to proceed with stirring at the liquid temperature kept at 15° C. for 5 minutes.

Then, the entire of the reaction mixture was added to separately provided purified decane kept at 80° C. with stirring, and the reaction was continued further for 10 minutes at 80° C. After the reaction, the solid portion was collected by filtration, and washed well with toluene.

A part of the Component (B1-7-4) prepared as above was dried and analyzed for the composition, and was found to contain 21.0 wt % of magnesium, 1.6 wt % of aluminum, 8.0 wt % of 2-ethylhexoxy group and 61.0 wt % of chlorine.

[Polymerization]

Polymerization was conducted in the same manner as in Example 6-1 except that Component (B1-7-4) prepared above was used in place of Component (B1-7-1). As the result, polyethylene was obtained in a yield of 19.3 g.

The catalyst had polymerization activity of 7,240 g/mmol-Zr·hr. The resulting polyethylene had [η] of 5.5 dL/g.

Example 6-5

A 1-liter SUS autoclave purged sufficiently with nitrogen was charged with 400 mL of purified toluene. Therein ethylene was allowed to flow to saturate the liquid phase and the gas phase with ethylene. The autoclave was heated up to 50° C. Therein, were charged successively 0.2 mmol of triethylaluminum, 1.6 mmol (in terms of magnesium atom) of Component (B1-7-3) prepared in the same manner as in Example 6-3, 6.024 mg of Component (A2-84) (0.008 mmol in terms of zirconium atom) in the named order under an ethylene atmosphere. Polymerization was conducted at an ethylene pressure of 0.78 MPa·G for 20 minutes. During the polymerization, the temperature was kept at 50° C., and the ethylene pressure was kept at 0.78 MPa·G. After the polymerization, the reaction mixture was poured into a large amount of methanol to deposit the resulting polymer entirely. After addition of hydrochloric acid, the polymer was collected by filtration with a glass filter. The collected polymer was vacuum-dried for 10 hours to obtain 20.7 g of polyethylene.

The catalyst had polymerization activity of 7,760 g/mmol-Zr·hr. The resulting polyethylene had [η] of 8.8 dL/g.

Example 6-6

A 1-liter SUS autoclave purged sufficiently with nitrogen was charged with 400 mL of purified toluene. Therein ethylene was allowed to flow to saturate the liquid phase and the gas phase with ethylene. Then the autoclave was heated up to 50° C. Therein, were charged successively 0.2 mmol of triethylaluminum, 1.6 mmol (in terms of magnesium atom) of Component (B1-7-4) prepared in the same manner as in Example 6-4, 6.024 mg of Component (A2-84) (0.008 mmol in terms of zirconium atom) in the named order under an ethylene atmosphere. Polymerization was conducted at an ethylene pressure of 0.78 MPa·G for 20 minutes. During the polymerization, the temperature was kept at 50° C., and the ethylene pressure was kept at 0.78 MPa·G. After the polymerization, the reaction mixture was poured into a large amount of methanol to deposit the resulting polymer entirely. After addition of hydrochloric acid, the polymer was collected by filtration with a glass filter. The collected polymer was vacuum-dried for 10 hours to obtain 17.1 g of polyethylene.

The catalyst had polymerization activity of 6,410 g/mmol-Zr·hr. The resulting polyethylene had [η] of 9.3 dL/g.

Example 6-7

Polymerization was conducted in the same manner as in Example 6-5 except that the amount of addition of Component (B1-7-3) was changed to 0.8 mmol in terms of magnesium atom, and 3.068 mg (0.004 mmol in terms of zirconium atom) of Component (A2-116) was used in place of Component (A2-84). As the result, polyethylene was obtained in a yield of 44.5 g.

The catalyst had polymerization activity of 33,400 g/mmol-Zr·hr.

Example 6-81

Polymerization was conducted in the same manner as in Example 6-6 except that the amount of addition of Component (B1-7-4) was changed to 0.8 mmol in terms of magnesium atom, and 3.068 mg (0.004 mmol in terms of zirconium atom) of Component (A2-116) was used in place of Component (A2-84). As the result, polyethylene was obtained in a yield of 41.7 g.

The catalyst had polymerization activity of 31,300 g/mmol-Zr·hr.

Example 6-9

Polymerization was conducted in the same manner as in Example 6-5 except that the amount of addition of Component (B1-7-3) was changed to 0.8 mmol in terms of magnesium atom, and 3.693 mg (0.004 mmol in terms of zirconium atom) of Component (A2-138) shown below was used in place of Component (A2-84) As the result, polyethylene was obtained in a yield of 60.4 g.

The catalyst had polymerization activity of 45,300 g/mmol-Zr·hr.

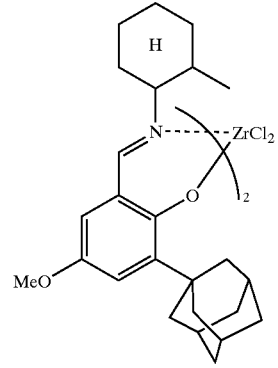

Component (A2-138)

Example 6-10

Polymerization was conducted in the same manner as in Example 6-6 except that the amount of addition of Component (B1-7-4) was changed to 0.8 mmol in terms of magnesium atom, and 3.693 mg (0.004 mmol in terms of zirconium atom) of Component (A2-138) was used in place of Component (A2-84). As the result, polyethylene was obtained in a yield of 60.7 g.

The catalyst had polymerization activity of 45,500 g/mmol-Zr·hr.

Example 7-1

[Preparation of Component (B1-8)]

Phthalic anhydride, 22.2 g, was added to Component (B1) prepared in the same manner as in Example 1, and was dissolved therein by stirring at 130° C. for one hour. The resulting homogeneous solution was cooled to room temperature and then 30 mL of this homogeneous solution was added dropwise into 80 mL of titanium tetrachloride kept at +20° C. over 45 minutes. Thereafter the temperature of the liquid mixture was raised to 20° C. over 3 hours. When the temperature reached 20° C., the liquid was filtered. The collected solid matter was washed with decane and was suspended again in 110 mL of toluene. The suspension liquid was heated to 110° C. Immediately before the suspension reaches 110° C., 2.8 mL of tetraethoxysilane was added thereto, and the mixture was kept at 110° C. for 2 hours. After the reaction, the solid matter was collected by hot filtration. The solid matter was washed sufficiently with decane at 110° C. until free titanium compound was not detected in the solution.

A part of Component (B1-8) prepared above was dried and analyzed for the composition, and was found to contain 0.2 wt % of titanium, 23.0 wt % of magnesium, 66.0 wt % of chlorine, and 0.4 wt % of ethoxy.

[Preparation of Solid Catalyst Component]

The above-prepared Component (B1-8), 0.45 g, was placed in a Schrenk tube purged sufficiently with nitrogen, and was suspended in 10 mL of methylene chloride. In a second Schrenk tube, 22.5 mg of Component (A2) used in Example 2 was dissolved in 10 mL of methylene chloride. The entire of this solution was added dropwise to the aforementioned slurry of Component (B1-8) with stirring at room temperature. The content in the Schrenk tube was stirred at room temperature for 2 hours. Then the methylenechloride was distilled off under reduced pressure. The resulting solid product was suspended again in 15 mL of toluene. The solid matter was collected by filtration with a glass filter, and was washed with toluene until free zirconium compound was not detected in the solution.

The solid catalyst component prepared above was stored as a decane slurry. A part of the component was dried and analyzed for the composition, and was found to contain 0.84 wt % of zirconium, 0.12 wt % of titanium and 21.0 wt % of magnesium.

(Polymerization

A 500-mL glass autoclave equipped with a paddle stirrer and purged sufficiently with nitrogen was charged with 250 mL of purified toluene. Therein, ethylene was allowed to flow at a rate of 100 L/hr to saturate the liquid phase and the gas phase with ethylene. Thereto, were added 0.5 mmol of triethylaluminum and 2.48 mL of the decane slurry containing 0.0025 mmol (in terms of zirconium atom) of the above-prepared solid catalyst component at 25° C. under an ethylene atmosphere to initiate polymerization. Polymerization was conducted under an ethylene gas atmosphere at atmospheric pressure at 25° C. for 30 minutes. The polymerization was stopped by addition of a small amount of isobutyl alcohol. The reaction mixture was poured into a large amount of methanol to deposit the resulting polymer entirely. After addition of hydrochloric acid, the polymer was collected by filtration with a glass filter. The collected polymer was vacuum-dried for 10 hours to obtain 0.61 g of polyethylene.

The catalyst had polymerization activity of 490 g/mmol-Zr·hr. The resulting polyethylene had [η] of 1.68 dL/g.

Example 7-2

[Preparation of Solid Catalyst Component]

Component (B1-8), 0.40 g, prepared in the same manner as in Example 7-1 was placed in a Schrenk tube purged sufficiently with nitrogen, and was suspended in 10 mL of methylene chloride. In a second Schrenk tube, 23.0 mg of Component (A2-84) was dissolved in 10 mL of methylene chloride. The entire of this solution was added dropwise to the above slurry of Component (B1-8) with stirring at room temperature. The content in the Schrenk tube was stirred at room temperature for 2 hours. Then the methylene chloride was distilled off under reduced pressure. The resulting solid product was suspended again in 15 mL of toluene. The solid matter was collected by filtration with a glass filter and was washed with toluene until free zirconium compound was not detected in the solution.

The solid catalyst component prepared above was stored as a decane slurry. A part of the component was dried and analyzed for the catalyst composition, and was found to contain 1.70 wt % of zirconium, 0.27 wt % of titanium, and 21.0 wt % of magnesium.

[Polymerization]

A 500-mL glass autoclave equipped with a paddle stirrer and purged sufficiently with nitrogen was charged with 250 mL of purified toluene. Therein, ethylene was allowed to flow at a rate of 100 L/hr to saturate the liquid phase and the gas phase with ethylene. Thereto, were added 0.5 mmol of triethylaluminum and 1.56 mL of the decane slurry containing 0.0025 mmol (in terms of zirconium atom) of the above-prepared solid catalyst component at 25° C. under an ethylene atmosphere to initiate polymerization. The polymerization was conducted under an ethylene gas atmosphere at atmospheric pressure at 25° C. for 30 minutes. The polymerization was stopped by addition of a small amount of isobutyl alcohol. The reaction mixture was poured into a large amount of methanol to deposit the resulting polymer entirely. After addition of hydrochloric acid, the polymer was collected by filtration with a glass filter. The collected polymer was vacuum-dried for 10 hours to obtain 1.20 g of polyethylene.

The catalyst had polymerization activity of 960 g/mmol-Zr·hr. The resulting polyethylene had [η] of 3.85 dL/g.

Example 7-3

[Polymerization]

A 1-liter stainless steel autoclave purged sufficiently with nitrogen was charged with 500 mL of purified toluene. Therein ethylene was allowed to flow to saturate the liquid phase and the gas phase with ethylene. Thereto, were added 0.5 mmol of triethylaluminum and 2.48 mL of the decane slurry containing 0.0025 mmol (in terms of zirconium atom) of the solid catalyst component prepared in the same manner as in Example 7-1, at 25° C. under an ethylene atmosphere to initiate polymerization. The polymerization was conducted at an ethylene pressure of 0.78 MPa·G for 30 minutes. During the polymerization, the temperature was kept at 25° C., and the ethylene pressure was kept at 0.78 MPa·G. After the polymerization, the reaction mixture was poured into a large amount of methanol to deposit the resulting polymer entirely. After addition of hydrochloric acid, the polymer was collected by filtration with a glass filter. The collected polymer was vacuum-dried for 10 hours to obtain 27.26 g of polyethylene.

The catalyst had polymerization activity of 21,800 g/mmol-Zr·hr. The resulting polyethylene had n [η] of 1.38 dL/g; and Mw of $0.89 \times 10^5$ and Mw/Mn of 24.53 according to GPC.

Example 7-4
[Polymerization]

A 1-liter stainless steel autoclave purged sufficiently with nitrogen was charged with 500 mL of purified toluene. Therein, ethylene was allowed to flow to saturate the liquid phase and the gas phase with ethylene. Thereto, were added 0.5 mmol of triethylaluminum and 1.56 mL of the decane slurry containing 0.0025 mmol (in terms of zirconium atom) of the solid catalyst component prepared in Example 7-2, at 25° C. under an ethylene atmosphere to initiate polymerization. The polymerization was conducted at an ethylene pressure of 0.78 MPa·G for 30 minutes. During the polymerization, the temperature was kept at 25° C., and the ethylene pressure was kept at 0.78 MPa·G. After the polymerization, the reaction mixture was poured into a large amount of methanol to deposit the resulting polymer entirely. After addition of hydrochloric acid, the polymer was collected by filtration with a glass filter. The collected polymer was vacuum-dried for 10 hours to obtain 18.81 g of polyethylene.

The catalyst had polymerization activity of 15,000 g/mmol-Zr·hr. The resulting polyethylene had [η] of 5.28 dL/g; and Mw of $4.67 \times 10^5$ and Mw/Mn of 126.58 according to GPC.

Example 8-1
[Preparation of Component (B8-1)]

In a nitrogen atmosphere, 3.5 mL of purified toluene, 2.59 mL of triethylaluminum and 2.91 mL of 2-ethylhexyl alcohol were allowed to react at 50° C. for 0.5 hour. The entire of this contact reaction product and 20 g of anhydrous magnesium chloride were placed in a 800-mL SUS milling pot containing 2.8 kg of SUS balls of 15 mm diameter, purged with nitrogen sufficiently. Milling was conducted on a vibrating milling apparatus with water-cooling to keep the pot at room temperature for 8 hours. The milled product was washed with hexane twice, to prepare a decane slurry.
[Polymerization]

A 1-liter SUS autoclave purged sufficiently with nitrogen was charged with 500 mL of purified toluene. Therein ethylene was allowed to flow to saturate the liquid phase and the gas phase with ethylene. Therein, were charged successively 0.15 mmol of triethylaluminum, 10.54 mmol (in terms of magnesium atom) of the above-prepared Component (B8-1), and 1.559 mg of Component (A1)(0.0025 mmol in terms of titanium atom) in the named order at 25° C. under an ethylene atmosphere. The polymerization was conducted at an ethylene pressure of 0.78 MPa·G for 30 minutes. During the polymerization, the temperature was kept at 25° C., and the ethylene pressure was kept at 0.78 MPa·G. After the polymerization, the reaction mixture was poured into a large amount of methanol to deposit the resulting polymer entirely. After addition of hydrochloric acid, the polymer was collected by filtration with a glass filter. The collected polymer was vacuum-dried for 10 hours to obtain 3.47 g of polyethylene.

The catalyst had polymerization activity of 2,780 g/mmol-Ti·hr.

Example 8-2
[Preparation of Component (B8-1-1)]

Component (B8-1-1) was prepared by adding 10.54 mmol (in terms of magnesium atom) of Component (B8-1) prepared in the same manner as in Example 8-1 and 1.559 mg of Component (A1) (0.0025 mmol in terms of titanium atom) in 10 mL of purified toluene and conducting contact reaction thereof for 15 minutes.
[Polymerization]

A 1-liter SUS autoclave purged sufficiently with nitrogen was charged with 500 mL of purified toluene. Therein ethylene was allowed to flow to saturate the liquid phase and the gas phase with ethylene. Then 0.15 mmol of triethylaluminum, and the entire of Component (B8-1-1) prepared above were introduced therein at 25° C. in an ethylene atmosphere. Polymerization was conducted at an ethylene pressure of 0.78 MPa·G for 30 minutes. During the polymerization, the temperature was kept at 25° C., and the ethylene pressure was kept at 0.78 MPa·G. After the polymerization, the reaction mixture was poured into a large amount of methanol to deposit the resulting polymer entirely. After addition of hydrochloric acid, the polymer was collected by filtration with a glass filter. The collected polymer was vacuum-dried for 10 hours to obtain 5.54 g of polyethylene.

The catalyst had polymerization activity of 4,430 g/mmol-Ti·hr.

Example 8-3
[Preparation of Component (B8-2)]

In a nitrogen atmosphere, 1.3 mL of purified toluene, 4.80 mL of triisobutylaluminum, and 2.91 mL of 2-ethylhexyl alcohol were allowed to react with heat at 50° C. for 0.5 hour. The entire of this contact reaction product and 20 g of anhydrous magnesium chloride were placed in a 800-mL SUS milling pot containing 2.8 kg of SUS balls of 15 mm diameter. Milling was conducted on a vibrating milling apparatus with water-cooling to keep the pot at room temperature for 8 hours. The milled product was washed with hexane twice to prepare a decane slurry (Component (B8-2)).
[Polymerization]

The polymerization was conducted in the same manner as in Example 8-1 except that 13.45 mmol (in terms of magnesium atom) of Component (B8-2) prepared above was used in place of Component (B8-1), to obtain 4.88 g of polyethylene.

The catalyst had polymerization activity of 3,900 g/mmol-Ti·hr.

Example 8-4
[Preparation of Component (B8-2-1)]

Component (B8-2-1) was prepared by adding 13.45 mmol (in terms of magnesium atom) of Component (B8-2) used in Example 8-3 and 1.559 mg of Component (A1) (0.0025 mmol in terms of titanium atom) used in Example 1 in 10 mL of purified toluene and conducting contact reaction thereof for 15 minutes.
[Polymerization]

Polymerization was conducted in the same manner as in Example 8-2 except that Component (B8-2-1) prepared above was used in place of Component (B8-1-1). As the result, polyethylene was obtained in a yield of 7.26 g.

The catalyst had polymerization activity of 5,810 g/mmol-Ti·hr.

Example 8-5

Polymerization was conducted in the same manner as in Example 8-3 except that the polymerization temperature was changed to 50° C. As the result, polyethylene was obtained in a yield of 17.15 g.

The catalyst had polymerization activity of 13,700 g/mmol-Ti·hr.

Example 8-6

Polymerization was conducted in the same manner as in Example 8-4 except that the polymerization temperature was changed to 50° C. As the result, polyethylene was obtained in a yield of 14.26 g.

The catalyst had polymerization activity of 11,400 g/mmol-Ti·hr.

Example 9-1
[Synthesis of Component (B20-1)]

In a 200-mL eggplant-shape flask, 5.00 g (2.13 mmol) of $H_3[PMo_{12}O_{40}]\cdot nH_2O$ (n=28.84) was placed and was dissolved in 50 mL of acetone. Separately, 1.78 g (6.40 mmol) of triphenylmethane chloride ($Ph_3CCl$) was dissolved in 20 mL of acetone. The $Ph_3CCl$ solution was added gradually dropwise to the $H_3[PMo_{12}O_{40}]\cdot nH_2O$ solution with stirring at room temperature, and the mixture was stirred further 2 hours. After the stirring, the acetone was distilled off under reduced pressure. The residue was washed with 100-mL of toluene five times, and with 100-mL of hexane twice. After washing, the solid matter was dried at 100° C. under reduced pressure for 4 hours. Thereby Component (B20-1) was obtained in a dry state in a yield of 3.30 g.

[Preparation of Component (B20-1-0)]

In a 30-mL Schrenk tube, 10 mL of purified toluene, and 51.0 mg (0.02 mmol) of Component (B20-1) were placed. There to, 1.0 mL of a toluene solution (1M) of triethylaluminum (1.0 mmol) was added. Further, 10 mL of a toluene solution (1M) of Component (A2) (0.01 mmol) separately prepared was added thereto and the mixture was stirred for 5 minutes to obtain Component (B20-1-0)

[Polymerization]

A 500-mL glass autoclave equipped with a paddle stirrer and purged sufficiently with nitrogen was charged with 250 mL of purified toluene. Therein, ethylene was allowed to flow at a rate of 100 L/hr to saturate the liquid phase and the gas phase with ethylene. There to, the entire of the above Component (B20-1-0) was added to initiate polymerization. The polymerization was conducted in an ethylene gas atmosphere at atmospheric pressure for 30 minutes. The polymerization was stopped by addition of a small amount of methanol. The reaction mixture was poured into a large amount of methanol to deposit the resulting polymer entirely. After addition of hydrochloric acid, the polymer was collected by filtration with a glass filter. The collected polymer was vacuum-dried for 10 hours to obtain 3.74 g of polyethylene.

The catalyst had polymerization activity of 750 g/mmol-Zr·hr. The resulting polyethylene had [η] of 1.63 dL/g.

Example 9-2
[Preparation of Component (B20-1-1)]

In a 30-mL Schrenk flask, was placed 12.8 mg (0.005 mmol) of Component (B20-1) prepared in the same manner as in Example 9-1. There to, 1.0 mL of a toluene solution (1M) of triethylaluminum (1.0 mmol) was added. Further, 10 mL of a toluene solution (1M) of Component (A2-116) (0.01 mmol) separately prepared was added there to and the mixture was stirred for 5 minutes to prepare Component (B20-1-1).

[Polymerization]

A 500-mL glass autoclave equipped with a paddle stirrer and purged sufficiently with nitrogen was charged with 250 mL of purified toluene. Therein, ethylene was allowed to flow at a rate of 100 L/hr to saturate the liquid phase and the gas phase with ethylene. Thereto, the entire of the above Component (B20-1-1) was added to initiate polymerization. The polymerization was conducted under an ethylene gas atmosphere at atmospheric pressure for 15 minutes. The polymerization was stopped by addition of a small amount of methanol. The reaction mixture was poured into a large amount of methanol to deposit the resulting polymer entirely. After addition of hydrochloric acid, the polymer was collected by filtration with a glass filter. The collected polymer was vacuum-dried for 10 hours to prepare 5.11 g of polyethylene.

The catalyst had polymerization activity of 2,040 g/mmol-Zr·hr. The resulting polyethylene had [η] of 7.66 dL/g.

Example 9-3
[Preparation of Component (B20-1-1-1)]

In a 30-mL Schrenk flask, was placed 12.8 mg (0.005 mmol) of Component (B20-1) prepared in the same manner as in Example 9-1. Thereto, 1.56 mg (0.015 mmol) of 2-ethylhexanol, 1.0 mL of a toluene solution (1M) of triethylaluminum (1.0 mmol) were added. Further, 10 mL of a toluene solution (1M) of Component (A2-116) (0.01 mmol) separately prepared was added thereto and the mixture was stirred for 5 minutes to prepare Component (B20-1-1-1).

[Polymerization]

A 500-mL glass autoclave equipped with a paddle stirrer and purged sufficiently with nitrogen was charged with 250 mL of purified toluene. Therein, ethylene was allowed to flow at a rate of 100 L/hr to saturate the liquid phase and the gas phase with ethylene. Thereto, the entire of the above Component (B20-1-1-1) was added to initiate polymerization. The polymerization was conducted under an ethylene gas atmosphere at atmospheric pressure for 15 minutes. The polymerization was stopped by addition of a small amount of methanol. The reaction mixture was poured into a large amount of methanol to deposit the resulting polymer entirely. After addition of hydrochloric acid, the polymer was collected by filtration with a glass filter. The collected polymer was vacuum-dried for 10 hours to obtain 6.65 g of polyethylene.

The catalyst had polymerization activity of 2,660 g/mmol-Zr·hr. The resulting polyethylene had [η] of 7.80 dL/g.

Example 9-4
[Synthesis of Component (B21-1)]

In a 200-mL eggplant-shape flask, 3.00 g (1.15 mmol) of $H_3[PMo_9W_3O_{40}]\cdot nH_2O$ (n=28.62) was placed and was dissolved in 30 mL of acetone. Separately, 0.96 g (3.46 mmol) of triphenylmethane chloride ($Ph_3CCl$) was dissolved in 20 mL of acetone. The $Ph_3CCl$ solution was added gradually dropwise to the $H_3[PMo_9W_3O_{40}]\cdot nH_2O$ solution with stirring at room temperature, and the mixture was stirred further 2 hours. After the stirring, the acetone was distilled off under reduced pressure. The residue was washed with 100-mL of toluene five times, and with 100-mL of hexane twice. After washing, the solid matter was dried at 100° C. under reduced pressure for 4 hours. Thereby Component (B21-1) was obtained in a dry state in a yield of 1.79 g.

[Preparation of Component (B21-1-1)]

In a 30-mL Schrenk tube, 14.01 mg (0.005 mmol) of Component (B21-1) were placed. Thereto, 1.0 mL of a toluene solution (1M) of triethylaluminum (1.0 mmol) was added. Further, 10 mL of a toluene solution (1M) of Component (A2-116) (0.01 mmol) separately prepared was added thereto and the mixture was stirred for 5 minutes to obtain Component (B21-1-1).

[Polymerization]

A 500-mL glass autoclave equipped with a paddle stirrer and purged sufficiently with nitrogen was charged with 250 mL of purified toluene. Therein, ethylene was allowed to flow at a rate of 100 L/hr at room temperature to saturate the liquid phase and the gas phase with ethylene. Thereto, the entire of the Component (B21-1-1) was added to initiate polymerization. The polymerization was conducted under an ethylene gas atmosphere at atmospheric pressure for 15 minutes. The polymerization was stopped by addition of a small amount of methanol. The reaction mixture was poured into a large amount of methanol to deposit the resulting polymer entirely. After addition of hydrochloric acid, the polymer was collected by filtration with a glass filter. The collected polymer was vacuum-dried for 10 hours to obtain 5.87 g of polyethylene.

The catalyst had polymerization activity of 2,350 g/mmol-Zr·hr. The resulting polyethylene had [η] of 6.80 dL/g.

Example 9-5

[Synthesis of Component (B22-1)]

In a 200-mL eggplant-shape flask, 3.00 g (1.05 mmol) of $H_3[PMo_6W_6O_{40}]\cdot nH_2O$ (n=28.43) was placed and was dissolved in 30 mL of acetone. Separately, 0.88 g (3.14 mmol) of $Ph_3CCl$ was dissolved in 20 mL of acetone. The $Ph_3CCl$ solution was added gradually dropwise to the $H_3[PMo_6W_6O_{40}]\cdot nH_2O$ solution with stirring at room temperature, and the mixture was stirred further for 2 hours. After the stirring, the acetone was distilled off under reduced pressure. The residue was washed 100-mL of toluene five times, and 100-mL of hexane twice. After washing, the solid matter was dried at 100° C. under reduced pressure for 4 hours. Thereby Component (B22-1) was obtained in a dry state in a yield of 1.62 g.

[Preparation of Component (B22-1-1)]

In a 30-mL Schrenk tube, 12.8 mg (0.005 mmol) of Component (B22-1) was placed. Thereto, 1.0 mL of a toluene solution (1M) of triethylaluminum (1.0 mmol) was added. Further, 10 mL of a toluene solution (1M) of Component (A2-116)(0.01 mmol) separately prepared was added thereto and the mixture was stirred for 5 minutes to prepare Component (B22-1-1).

[Polymerization]

A 500-mL glass autoclave equipped with a paddle stirrer and purged sufficiently with nitrogen was charged with 250 mL of purified toluene. Therein, ethylene was allowed to flow at a rate of 100 L/hr to saturate the liquid phase and the gas phase with ethylene at room temperature. Thereto, the entire of the Component (B22-1-1) was added to initiate polymerization. The polymerization was conducted under an ethylene gas atmosphere at atmospheric pressure for 15 minutes. The polymerization was stopped by addition of a small amount of methanol. The reaction mixture was poured into a large amount of methanol to deposit the resulting polymer entirely. After addition of hydrochloric acid, the polymer was collected by filtration with a glass filter. The collected polymer was vacuum-dried for 10 hours to obtain 5.54 g of polyethylene.

The catalyst had polymerization activity of 2,220 g/mmol-Zr·hr. The resulting polyethylene had [η] of 6.56 dL/g.

Example 9-6

[Synthesis of Component (B23-1)]

In a 200-mL eggplant-shape flask, 3.00 g (0.96 mmol) of $H_3[PMo_3W_9O_{40}]\cdot nH_2O$ (n=29.17) was placed, and was dissolved in 30 mL of acetone. Separately, 0.80 g (2.86 mmol) of $Ph_3CCl$ was dissolved in 20 mL of acetone. The $Ph_3CCl$ solution was added gradually dropwise to the $H_3[PMo_3W_9O_{40}]\cdot nH_2O$ solution with stirring at room temperature, and the mixture was stirred further for 2 hours. After the stirring, the acetone was distilled off under reduced pressure. The residue was washed with 100-mL of toluene five times, and 100-mL of hexane twice. After washing, the solid matter was dried at 100° C. under reduced pressure for 4 hours. Thereby Component (B23-1) was obtained in a dry state in a yield of 1.84 g.

[Preparation of Component (B23-1-1)]

In a30-mL Schrenk tube, 16.7 mg (0.005 mmol) of Component (B23-1) was placed. Thereto, 1.0 mL of a toluene solution (1M) of triethylaluminum (1.0 mmol) was added. Further, 10 mL of a toluene solution (1M) of Component (A2-116) (0.01 mmol) separately prepared was added there to and the mixture was stirred for 5 minutes to prepare Component (B23-1-1).

[Polymerization]

A 500-mL glass autoclave equipped with a paddle stirrer and purged sufficiently with nitrogen was charged with 250 mL of purified toluene. Therein, ethylene was allowed to flow at a rate of 100 L/hr to saturate the liquid phase and the gas phase with ethylene at room temperature. Thereto, the entire of the Component (B23-1-1) was added to initiate polymerization. The polymerization was conducted under an ethylene gas atmosphere at atmospheric pressure for 15 minutes. The polymerization was stopped by addition of a small amount of methanol. The reaction mixture was poured into a large amount of methanol to deposit the resulting polymer entirely. After addition of hydrochloric acid, the polymer was collected by filtration with a glass filter. The collected polymer was vacuum-dried for 10 hours to obtain 7.62 g of polyethylene.

The catalyst had polymerization activity of 3,050 g/mmol-Zr·hr. The resulting polyethylene had [η] of 6.69 dL/g.

Example 9-7

[Synthesis of Component (B24-1)]

In a 200-mL eggplant-shape flask, 5.00 g (1.49 mmol) of $H_3[PW_{12}O_{40}]\cdot nH_2O$ (n=26.06) was placed, and was dissolved in 50 mL of acetone. Separately, 1.25 g (4.47 mmol) of $Ph_3CCl$ was dissolved in 20 mL of acetone. The $Ph_3CCl$ solution was added gradually drop wise to the $H_3[PW_{12}O_{40}]\cdot nH_2O$ solution with stirring at room temperature, and the mixture was stirred further for 2 hours. After the stirring, the acetone was distilled off under reduced pressure. The residue was washed with 100-mL of toluene five times, and 100-mL of hexane twice. After washing, the solid matter was dried at 100° C. under reduced pressure for 4 hours. Thereby Component (B24-1) was obtained in a dry state in a yield of 3.45 g.

[Preparation of Component (B24-1-1)]

In a 30-mL Schrenk tube, 18.0 mg (0.005 mmol) of Component (B24-1) was placed. Thereto, 1.0 mL of a toluene solution (1M) of triethylaluminum (1.0 mmol) was added. Further, 10 mL of a toluene solution (1M) of Component (A2-116) (0.01 mmol) separately prepared was added thereto and the mixture was stirred for 5 minutes to prepare Component (B24-1-1).

[Polymerization]

A 500-mL glass autoclave equipped with a paddle stirrer and purged sufficiently with nitrogen was charged with 250 mL of purified toluene. Therein, ethylene was allowed to flow at a rate of 100 L/hr to saturate the liquid phase and the gas phase with ethylene at room temperature. Thereto, the entire of the Component (B24-1-1) was added to initiate polymerization. The polymerization was conducted under an ethylene gas atmosphere at atmospheric pressure for 15 minutes. The polymerization was stopped by addition of a small amount of methanol. The reaction mixture was poured into a large amount of methanol to deposit the resulting polymer entirely. After addition of hydrochloric acid, the polymer was collected by filtration with a glass filter. The collected polymer was vacuum-dried for 10 hours to obtain 7.80 g of polyethylene.

The catalyst had polymerization activity of 3,120 g/mmol-Zr·hr. The resulting polyethylene had [η] of 6.34 dL/g.

Example 9-8

[Synthesis of Component (B25-1)]

In a 200-mL eggplant-shape flask, 5.00 g (1.51 mmol) of $H_4[SiW_{12}O_{40}]\cdot nH_2O$ (n=24.20) was placed, and was dissolved in 50 mL of acetone. Separately, 1.68 g (6.04 mmol) of $Ph_3CCl$ was dissolved in 20 mL of acetone. The $Ph_3CCl$ solution was added gradually dropwise to the $H_4[SiW_{12}O_{40}]\cdot nH_2O$ solution with stirring at room temperature, and the mixture was stirred further for 2 hours. After the stirring, the acetone was distilled off under reduced pressure. The residue was washed with 100-mL of toluene five times, and 100-mL of hexane twice. After washing, the solid matter was dried at 100° C. under reduced pressure for 4 hours. Thereby Component (B25-1) was obtained in a dry state in a yield of 3.55 g.

[Preparation of Component (B25-1-1)]

In a 30-mL Schrenk tube, 19.2 mg (0.005 mmol) of Component (B25-1) was placed. Thereto, 1.0 mL of a toluene solution (1M) of triethylaluminum (1.0 mmol) was added. Further, 10 mL of a toluene solution (1M) of Component (A2-116) (0.01 mmol) separately prepared was added there to and the mixture was stirred for 5 minutes to prepare Component (B25-1-1).

[Polymerization]

A 500-mL glass autoclave equipped with a paddle stirrer and purged sufficiently with nitrogen was charged with 250 mL of purified toluene. Therein, ethylene was allowed to flow at a rate of 100 L/hr to saturate the liquid phase and the gas phase with ethylene at room temperature. Thereto, the entire of the Component (B25-1-1) was added to initiate polymerization. The polymerization was conducted under an ethylene gas atmosphere at atmospheric pressure for 15 minutes. The polymerization was stopped by addition of a small amount of methanol. The reaction mixture was poured into a large amount of methanol to deposit the resulting polymer entirely. After addition of hydrochloric acid, the polymer was collected by filtration with a glass filter. The collected polymer was vacuum-dried for 10 hours to obtain 3.63 g of polyethylene.

The catalyst had polymerization activity of 1,450 g/mmol-Zr·hr. The resulting polyethylene had [η] of 6.17 dL/g.

Example 9-9

[Synthesis of Component (B26-1)]

In a 200-mL eggplant-shape flask, 5.00 g (2.14 mmol) of $H_4[SiMo_{12}O_{40}]\cdot nH_2O$ (n=28.23) was placed and was dissolved in 50 mL of acetone. Separately, 2.39 g (8.56 mmol) of $Ph_3CCl$ was dissolved in 20 mL of acetone. The $Ph_3CCl$ solution was added gradually dropwise to the $H_4[SiMo_{12}O_{40}]\cdot nH_2O$ solution with stirring at room temperature, and the mixture was stirred further for 2 hours. After the stirring, the acetone was distilled off under reduced pressure. The residue was washed with 100-mL of toluene five times, and 100-mL of hexane twice. After washing, the solid matter was dried at 100° C. under reduced pressure for 4 hours. Thereby Component (B26-1) was obtained in a dry state in a yield of 3.85 g.

[Preparation of Component (B26-1-1)]

In a 30-mL Schrenk tube, 14.0 mg (0.005 mmol) of Component (B26-1) was placed. Thereto, 1.0 mL of a toluene solution (1M) of triethylaluminum (1.0 mmol) was added. Further, 10 mL of a toluene solution (1M) of Component (A2-116) (0.01 mmol) separately prepared was added thereto and the mixture was stirred for 5 minutes to prepare Component (B26-1-1).

[Polymerization]

A 500-mL glass autoclave equipped with a paddle stirrer and purged sufficiently with nitrogen was charged with 250 mL of purified toluene. Therein, ethylene was allowed to flow at a rate of 100 L/hr to saturate the liquid phase and the gas phase with ethylene at room temperature. Thereto, the entire of the Component (B26-1-1) was added to initiate polymerization. The polymerization was conducted under an ethylene gas atmosphere at atmospheric pressure for 15 minutes. The polymerization was stopped by addition of a small amount of methanol. The reaction mixture was poured into a large amount of methanol to deposit the resulting polymer entirely. After addition of hydrochloric acid, the polymer was collected by filtration with a glass filter. The collected polymer was vacuum-dried for 10 hours to obtain 4.74 g of polyethylene.

The catalyst had polymerization activity of 1,900 g/mmol-Zr·hr. The resulting polyethylene had [η] of 6.73 dL/g.

Example 9-10

[Synthesis of Component (B27-1)]

In a 200-mL eggplant-shape flask, 3.00 g (1.30 mmol) of $H_4[PVMo_{11}O_{40}]\cdot nH_2O$ (n=29.35) was placed and was dissolved in 30 mL of acetone. Separately, 1.45 g (5.20 mmol) of $Ph_3CCl$ was dissolved in 20 mL of acetone. The $Ph_3CCl$ solution was added gradually dropwise to the $H_4[PVMo_{11}O_{40}]\cdot nH_2O$ solution with stirring at room temperature, and the mixture was stirred further for 2 hours. After the stirring, the acetone was distilled off under reduced pressure. The residue was washed with 100-mL of toluene five times and 100-mL of hexane twice. After washing, the solid matter was dried at 100° C. under reduced pressure for 4 hours. Thereby Component (B27-1) was obtained in a dry state in a yield of 2.09 g.

[Preparation of Component (B27-1-1)]

In a 30-mL Schrenk tube, 13.8 mg (0.005 mmol) of Component (B27-1) was placed. Thereto, 1.0 mL of a toluene solution (1M) of triethylaluminum (1.0 mmol) was added. Further, 10 mL of a toluene solution (1M) of Component (A2-116) (0.01 mmol) separately prepared was added thereto and the mixture was stirred for 5 minutes to prepare Component (B27-1-1).

[Polymerization]

A 500-mL glass autoclave equipped with a paddle stirrer and purged sufficiently with nitrogen was charged with 250 mL of purified toluene. Therein, ethylene was allowed to flow at a rate of 100 L/hr to saturate the liquid phase and the gas phase with ethylene at room temperature. Thereto, the entire of the Component (B27-1-1) was added to initiate polymerization. The polymerization was conducted under an ethylene gas atmosphere at atmospheric pressure for 15 minutes. The polymerization was stopped by addition of a small amount of methanol. The reaction mixture was poured into a large amount of methanol to deposit the resulting polymer entirely. After addition of hydrochloric acid, the polymer was collected by filtration with a glass filter. The collected polymer was vacuum-dried for 10 hours to obtain 3.57 g of polyethylene.

The catalyst had polymerization activity of 1,430 g/mmol-Zr·hr. The resulting polyethylene had [η] of 6.87 dL/g.

Example 9-11

[Preparation of Component (B20-1-2)]

In a 30-mL Schrenk tube, 12.8 mg (0.005 mmol) of Component (B20-1) was placed. Thereto, 1.0 mL of a toluene solution (1M) of triethylaluminum (1.0 mmol) was added. Further, 10 mL of a toluene solution (1M) of Component (A2-126) (0.01 mmol) separately prepared was added thereto and the mixture was stirred for 5 minutes to prepare Component (B20-1-2).

[Polymerization]

A 500-mL glass autoclave equipped with a paddle stirrer and purged sufficiently with nitrogen was charged with 250 mL of purified toluene. Therein, ethylene was allowed to flow at a rate of 100 L/hr to saturate the liquid phase and the gas phase with ethylene at room temperature. Thereto, the entire of the Component (B20-1-2) was added to initiate polymerization. The polymerization was conducted under an ethylene gas atmosphere at atmospheric pressure for 15 minutes. The polymerization was stopped by addition of a small amount of methanol. The reaction mixture was poured into a large amount of methanol to deposit the resulting polymer entirely. After addition of hydrochloric acid, the polymer was collected by filtration with a glass filter. The collected polymer was vacuum-dried for 10 hours to obtain 7.37 g of polyethylene.

The catalyst had polymerization activity of 2,950 g/mmol-Zr·hr. The resulting polyethylene had [η] of 7.37 dL/g.

Example 9-12

[Preparation of Component (B20-1-3)]

In a 30-mL Schrenk tube, 12.8 mg (0.005 mmol) of Component (B20-1) prepared in the same manner as Example 9-1 was placed. Thereto, 1.0 mL of a toluene solution (1M) of triethylaluminum (1.0 mmol) was added. Further, 10 mL of a toluene solution (1M) of Component (A2-171) (0.01 mmol) separately prepared was added thereto and the mixture was stirred for 5 minutes to prepare Component (B20-1-3).

[Polymerization]

A 500-mL glass autoclave equipped with a paddle stirrer and purged sufficiently with nitrogen was charged with 250 mL of purified toluene. Therein, ethylene was allowed to flow at a rate of 100 L/hr to saturate the liquid phase and the gas phase with ethylene at room temperature. Thereto, the entire of the Component (B20-1-3) was added to initiate polymerization. The polymerization was conducted under an ethylene gas atmosphere at atmospheric pressure for 3 minutes. The polymerization was stopped by addition of a small amount of methanol. The reaction mixture was poured into a large amount of methanol to deposit the resulting polymer entirely. After addition of hydrochloric acid, the polymer was collected by filtration with a glass filter. The collected polymer was vacuum-dried for 10 hours to obtain 4.55 g of polyethylene.

The catalyst had polymerization activity of 9,100 g/mmol-Zr·hr. The resulting polyethylene had [η] of 0.35 dL/g.

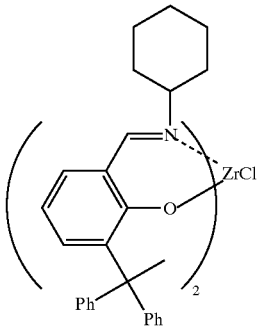

Component (A2-171)

Example 9-13

[Preparation of Component (B24-1-2)]

In a 30-mL Schrenk tube, 18.0 mg (0.005 mmol) of Component (B24-1) prepared in the same manner as in Example 9-7 was placed. Thereto, a toluene solution, 1.0 mL, containing 1.0 mmol of triethylaluminum (1.0 mol/L) was added. Further, a separately prepared toluene solution, 10 mL, containing 0.01 mmol of Component (A2-171) (1.0 mmol/L) was added thereto and the mixture was stirred for 5 minutes to obtain Component (B24-1-2).

[Polymerization]

A 500-mL glass autoclave equipped with a paddle stirrer and purged sufficiently with nitrogen was charged with 250 mL of purified toluene. Therein, ethylene was allowed to flow at a rate of 100 L/hr to saturate the liquid phase and the gas phase with ethylene at room temperature. Thereto, the entire of Component (B24-1-2) was added to initiate the polymerization. The polymerization was conducted under an ethylene gas atmosphere at atmospheric pressure for 3 minutes. The polymerization was stopped by addition of a small amount of methanol. The reaction mixture was poured into a large amount of methanol to deposit the polymer entirely. After addition of hydrochloric acid, the polymer was collected by filtration with a glass filter. The collected polymer was vacuum-dried for 10 hours to obtain 3.85 g of polyethylene.

The catalyst had polymerization activity of 7,700 g/mmol-Zr·hr. The polyethylene had [η] of 0.29 dL/g.

Example 9-14

[Preparation of Component (B20-2)]

In a 100-mL Schrenk tube, $Na_3[PMo_{12}O_{40}] \cdot nH_2O$ (supplied by Nippon Muki Kagaku K.K.), 5.00 g, was placed and dried at 150° C. under reduced pressure for 2 hours to obtain Component (B20-2).

[Preparation of Component (B20-2-1)]

Component (B20-2), 9.5 mg (0.005 mmol), was placed in a 30-mL Schrenk tube. Thereto, a toluene solution, 1.0 mL, containing 1.0 mmol of triethylaluminum (1.0 mol/L) was added. Further, a separately prepared toluene solution, 10 mL, containing 0.01 mmol of Component (A2-116) (1.0 mmol/L) was added thereto and the mixture was stirred for 5 minutes to obtain Component (B20-2-1).

[Polymerization]

A 500-mL glass autoclave equipped with a paddle stirrer and purged sufficiently with nitrogen was charged with 250 mL of purified toluene. Therein, ethylene was allowed to flow at a rate of 100 L/hr to saturate the liquid phase and the gas phase with ethylene at room temperature. Thereto, the entire of the above Component (B20-2-1) was added to initiate the polymerization. The polymerization was conducted under an ethylene gas atmosphere at atmospheric pressure for 15 minutes. The polymerization was stopped by addition of a small amount of methanol. The reaction mixture was poured in to a large amount of methanol to deposit the polymer entirely. After addition of hydrochloric acid, the polymer was collected by filtration with a glass filter. The collected polymer was vacuum-dried for 10 hours to obtain 4.77 g of polyethylene.

The catalyst had polymerization activity of 1,900 g/mmol-Zr·hr. The polyethylene had [η] of 7.70 dL/g.

Example 9-15
[Synthesis of Component (B20-3)]

Component (B20-2), 1.00 g (0.53 mmol), was placed in a 100-mL Schrenk tube purged sufficiently with nitrogen, and was dissolved in 80 mL of acetone. Separately, 0.27 g (1.73 mmol) of N,N-dimethylaniline hydrochloride was dissolved in 20 mL of acetone. The solution of N,N-dimethylaniline hydrochloride was added gradually dropwise to the solution of Component (B20-2) under a nitrogen atmosphere with stirring at room temperature, and the mixture was stirred further for 2 hours. After the stirring, the acetone was distilled off under reduced pressure. The residue was washed with 100 mL of toluene five times, and with 100 mL of hexane two times. After washing, the solid matter was dried at 100° C. under reduced pressure for 4 hours. Thereby Component (B20-3) was obtained. The yield of Component (B20-3) after drying was 0.54 g.

[Preparation of Component (B20-3-1)]

Component (B20-3), 10.9 mg (0.005 mmol), was placed in a 30-mL Schrenk tube. Thereto, a toluene solution, 1.0 mL, containing 1.0 mmol of triethylaluminum (1.0 mol/L) was added. Further, a separately prepared toluene solution, 10 mL, containing 0.01 mmol of Component (A2-116) (1.0 mmol/L) was added thereto and the mixture was stirred for 5 minutes to obtain Component (B20-3-1).

[Polymerization]

A 500-mL glass autoclave equipped with a paddle stirrer and purged sufficiently with nitrogen was charged with 250 mL of purified toluene. Therein, ethylene was allowed to flow at a rate of 100 L/hr to saturate the liquid phase and the gas phase with ethylene at room temperature. Thereto, the entire of Component (B20-3-1) was added to initiate the polymerization. The polymerization was conducted under an ethylene gas atmosphere at atmospheric pressure for 30 minutes. The polymerization was stopped by addition of a small amount of methanol. The reaction mixture was poured into a large amount of methanol to deposit the polymer entirely. After addition of hydrochloric acid, the polymer was collected by filtration with a glass filter. The collected polymer was vacuum-dried for 10 hours to obtain 6.19 g of polyethylene.

The catalyst had polymerization activity of 2,500 g/mmol-Zr·hr. The polyethylene had [η] of 6.64 dL/g.

Example 9-16
[Preparation of Component (B20-1-1-2)]

In a first 30-mL Schrenk tube purged sufficiently with nitrogen, was placed $SiO_2$ (trade name P10, produced by Fuji Silicia K.K.), 127.5 mg, having been calcined under a nitrogen stream at 150° C. for 5 hours. Separately, 12.8 mg (0.005 mmol) of Component (B20-1) was placed in a second 30-mL Schrenk tube purged sufficiently with nitrogen, and thereto, a hexane solution, 1.0 mL, containing 1.0 mmol of triethylaluminum (1.0 mol/L) was added. An ultrasonic wave was applied thereto for 10 minutes. The content of the second Schrenk tube was added to the first Schrenk tube. After removal of hexane, a toluene solution, 1.0 mL, containing 1.0 mmol of triethylaluminum (1.0 mol/L) was added to the first Schrenk tube. Further thereto, a toluene solution, 10 mL, containing 0.01 mmol of Component (A2-116) (1.0 mmol/L) was added, and the mixture was stirred for 5 minutes to obtain Component (B20-1-1-2).

[Polymerization]

A 500-mL glass autoclave equipped with a paddle stirrer and purged sufficiently with nitrogen was charged with 250 mL of purified toluene. Therein, ethylene was allowed to flow at a rate of 100 L/hr to saturate the liquid phase and the gas phase with ethylene at room temperature. Thereto, the entire of Component (B20-1-1-2) was added to initiate the polymerization. The polymerization was conducted under an ethylene gas atmosphere at atmospheric pressure for 15 minutes. The polymerization was stopped by addition of a small amount of methanol. There action mixture was poured in to a large amount of methanol to deposit the polymer entirely. After addition of hydrochloric acid, the polymer was collected by filtration with a glass filter. The collected polymer was vacuum-dried for 10 hours to obtain 7.95 g of polyethylene.

The catalyst had polymerization activity of 3,180 g/mmol-Zr·hr. The polyethylene had [η] of 21.5 dL/g.

Example 9-17
[Preparation of Component (B20-1-1a)]

Component (B20-1), 6.4 mg (0.0025 mmol), prepared in the same manner as in Example 9-1 was placed in a 30-mL Schrenk tube. Thereto, a toluene solution, 0.5 mL, containing 0.5 mmol of triethylaluminum (1.0 mol/L) was added. An ultrasonic wave was applied thereto for 10 minutes. Further, a separately prepared toluene solution, 5 mL, containing 0.005 mmol of Component (A2-116) (1.0 mmol/L) was added there to and the mixture was stirred for 5 minutes to obtain Component (B20-1-1a).

[Polymerization]

A 1-liter autoclave purged sufficiently with nitrogen was charged with 500 mL of purified toluene. Therein ethylene was allowed to flow to saturate the liquid phase and the gas phase with ethylene. Then the entire of Component (B20-1-1a) was introduced therein at 25° C. under an ethylene atmosphere to initiate the polymerization. The polymerization was conducted at an ethylene pressure of 0.78 MPa·G for 20 minutes. During the polymerization, the temperature was kept at 25° C., and the ethylene pressure was kept at 0.78 MPa·G. After the polymerization, the reaction mixture was poured into a large amount of methanol to deposit the polymer entirely. After addition of hydrochloric acid, the polymer was collected by filtration with a glass filter. The collected polymer was vacuum-dried for 10 hours to obtain 17.64 g of polyethylene.

The catalyst had polymerization activity of 10,600 g/mmol-Zr·hr.

Comparative Example 7
[Polymerization]

Polymerization was conducted in the same manner as in Example 1 except that Component (B20-1) was not added and the polymerization time was changed to 30 minutes. No polymer was obtained when the reaction mixture was poured into a large amount of methanol.

Comparative Example 8
[Polymerization]

Polymerization was conducted in the same manner as in Example 2 except that Component (B20-1) was not added and the polymerization time was changed to 30 minutes. The reaction mixture was poured into a large amount of methanol to deposit the polymer entirely. After addition of hydrochloric acid, the polymer was collected by filtration with a glass filter. The collected polymer was vacuum-dried for 10 hours to obtain 2.10 g of polyethylene.

The catalyst had polymerization activity of 430 g/mmol-Zr·hr. The polyethylene had [η] of 9.97 dL/g.

Comparative Example 9
[Preparation of Component (B20-0-1)]

Dried Ph$_3$CCl (0.015 mmol) was placed in a 30-mL Schrenk tube. Thereto, a toluene solution, 1.0 mL, containing 1.0 mmol of triethylaluminum (1.0 mol/L) was added. Further, a separately prepared toluene solution, 10 mL, containing 0.01 mmol of Component (A2-116) (1.0 mmol/L) was added thereto and the mixture was stirred for 5 minutes to obtain Component (B20-0-1).

[Polymerization]

A 500-mL glass autoclave equipped with a paddle stirrer and purged sufficiently with nitrogen was charged with 250 mL of purified toluene. Therein, ethylene was allowed to flow at a rate of 100 L/hr to saturate the liquid phase and the gas phase with ethylene at room temperature. Thereto, the entire of Component (B20-0-1) was added to initiate the polymerization. The polymerization was conducted under an ethylene gas atmosphere at atmospheric pressure for 15 minutes. The polymerization was stopped by addition of a small amount of methanol. The reaction mixture was poured into a large amount of methanol to deposit the polymer entirely. After addition of hydrochloric acid, the polymer was collected by filtration with a glass filter. The collected polymer was vacuum-dried for 10 hours to obtain 1.67 g of polyethylene.

The catalyst had polymerization activity of 670 g/mmol-Zr·hr. The polyethylene had [η] of 9.89 dL/g.

Example 10-1
[Preparation of Component (B30-1)]
(1) Chemical Treatment of Clay Mineral Montmorillonite (Montmorillonite K10, produced by Aldrich Co.), 7.65 g, was dispersed in 100 mL of an aqueous 1N hydrochloric acid solution, and was treated at 90° C. for 2 hours. The treated solid matter was washed sufficiently with water. The obtained solid matter was dispersed and stirred in 150 mL of distilled water containing 7.25 g of dissolved Al$_2$(SO$_4$)$_3$·14-18H$_2$O at room temperature for 30 minutes, and then the solid matter was collected by filtration. This treatment was conducted twice. The solid matter was washed with distilled water, dried (under reduced pressure at ordinary temperature for 10 hours), and dehydrated (by heating at 200° C. under reduced pressure for 2 hours).

(2) Treatment with Organoaluminum

The chemically treated montmorillonite, 2 g, obtained by the above treatment (1) was slurried in 20 mL of dehydrated toluene. Thereto, a toluene solution, 4.6 mL, containing triethylaluminum at 1.0 mol/L was added, and kept in contact at room temperature for one hour. The solid matter was washed sufficiently with toluene and slurried by addition of 50 mL of toluene, thus preparing a toluene slurry of organoaluminum-treated montmorillonite (Component (B30-1)).

[Preparation of Component (B30-1-1)]

To Component (B30-1), 34 mg, obtained by the treatment (2), a toluene solution, 0.2 mL, containing triethylaluminum at 1.0 mol/L was added and further, a toluene solution, 0.71 mL, containing Component (A2-116) prepared in the same manner as in Example 4-6 at 0.007 mmol/L was added thereto and was kept in contact for 30 minutes to obtain a catalyst component (Component (B30-1-1)).

[Polymerization]

A 1-liter SUS autoclave purged sufficiently with nitrogen was charged with 500 mL of purified toluene. Therein ethylene was allowed to flow to saturate the liquid phase and the gas phase with ethylene. Then 0.25 mmol of triethylaluminum, and the entire of Component (B30-1-1) were introduced therein at 50° C. under an ethylene atmosphere. The polymerization was conducted at an ethylene pressure of 0.78 MPa·G for 30 minutes. During the polymerization, the temperature was kept at 50° C., and the ethylene pressure was kept at 0.78 MPa·G. After the polymerization, the reaction mixture was poured into a large amount of methanol to deposit the polymer entirely. After addition of hydrochloric acid, the polymer was collected by filtration with a glass filter. The collected polymer was vacuum-dried for 10 hours to obtain 43.45 g of polyethylene.

The catalyst had polymerization activity of 173,800 g/mmol-Zr·hr. The polyethylene had [η] of 19.7 dL/g.

Example 10-2
[Preparation of Component(B31-1)]

A toluene slurry of an organoaluminum-treated synthetic mica (Component (B31-1)) was prepared by the same treatment as in "Preparation of Component (B30-1)" in Example 10-1 except that a syntheticmica (Somashif ME-100, supplied by Corp Chemical Co.) was used in place of the montmorillonite (Montmorillonite K10, supplied by Aldrich Co.).

[Preparation of Component (B31-1-1)]

To 34 mg of Component (B31-1) obtained above, a toluene solution, 0.2 mL, containing triethylaluminum at 1.0 mol/L was added and further, a toluene solution, 0.71 mL, containing Component (A2-116) at 0.007 mmol/L was added thereto and kept in contact for 30 minutes to obtain a catalyst component (Component (B31-1-1)).

[Polymerization]

Polymerization was conducted in the same manner as in Example 10-1 except that Component (B31-1-1) was used in place of Component (B30-1-1). As the result, polyethylene was obtained in a yield of 51.29 g.

The catalyst had polymerization activity of 205,200 g/mmol-Zr·hr. The polyethylene had [η] of 14.2 dL/g.

Example 10-3
[Preparation of Component (B32-1)]

A toluene slurry of an organoaluminum-treated montmorillonite (Component (B32-1)) was prepared by the same treatment as in "Preparation of Component (B30-1)" in Example 10-1 except that a montmorillonite (Kunipia F, supplied by Kunimine Kogyo K.K.) was used in place of the montmorillonite (Montmorillonite K10, supplied by Aldrich Co.).

[Preparation of Component (B32-1-1)]

To 34 mg of Component (B32-1) obtained above, a toluene solution, 0.2 mL, containing triethylaluminum at 1.0 mol/L was added and further, a toluene solution, 0.71 mL, containing Component (A2-116) at 0.007 mmol/L was added thereto and kept in contact for 30 minutes to obtain a catalyst component (Component (B32-1-1)).

[Polymerization]

Polymerization was conducted in the same manner as in Example 10-1 except that Component (B32-1-1) was used in place of Component (B30-1-1). As the result, polyethylene was obtained in a yield of 26.92 g.

The catalyst had polymerization activity of 107,700 g/mmol-Zr·hr. The polyethylene had [η] of 13.2 dL/g.

Example 10-4
[Preparation of Component (B33-1)]

A toluene slurry of an organoaluminum-treated pyrophyllite (Component (B33-1)) was prepared by the same treatment as in "Preparation of Component (B30-1)" in Example 10-1 except that a pyrophillite (HA Clay, supplied by Maruo Calcium K.K.) was used in place of the montmorillonite (Montmorillonite K10, supplied by Aldrich Co.).

[Preparation of Component (B33-1-1)]

To 34 mg of Component (B33-1) obtained above, a toluene solution, 0.2 mL, containing triethylaluminum at 1.0 mol/L was added and further, a toluene solution, 0.71 mL, containing Component (A2-116) at 0.007 mmol/L was added thereto and kept in contact for 30 minutes to obtain a catalyst component (Component (B33-1-1)).

[Polymerization]

Polymerization was conducted in the same manner as in Example 10-1 except that Component (B33-1-1) was used in place of Component (B30-1-1). As the result, polyethylene was obtained in a yield of 45.98 g.

The catalyst had polymerization activity of 184,000 g/mmol-Zr·hr. The polyethylene had [η] of 14.4 dL/g.

Example 10-5
[Preparation of Component(B34-1)]

A toluene slurry of an organoaluminum-treated montmorillonite (Component (B34-1)) was prepared by the same treatment as in "Preparation of Component (B30-1)" in Example 10-1 except that the treatment with $Al_2(SO_4)_3 \cdot 14$-$18H_2O$ was not conducted.

[Preparation of Component (B34-1-1)]

To 34 mg of Component (B34-1) obtained above, a toluene solution, 0.2 mL, containing triethylaluminum at 1.0 mol/L was added and further, a toluene solution, 0.71 mL, containing Component (A2-116) at 0.007 mmol/L was added thereto and kept in contact for 30 minutes to obtain a catalyst component (Component (B34-1-1)).

[Polymerization]

Polymerization was conducted in the same manner as in Example 10-1 except that Component (B34-1-1) was used in place of Component (B30-1-1). As the result, polyethylene was obtained in a yield of 30.91 g.

The catalyst had polymerization activity of 124,000 g/mmol-Zr·hr. The polyethylene had [η] of 18.5 dL/g.

Example 11-1

A 500-mL glass autoclave equipped with a paddle stirrer and purged sufficiently with nitrogen was charged with 250 mL of purified toluene. The autoclave was heated up to 50° C. Therein ethylene was allowed to flow at a rate of 100 L/hr to saturate the liquid phase and the gas phase with ethylene. Then the entire of Component (B1-2) prepared in the same manner as in Example 2 was introduced therein. After 3 minutes, 2.62 mg (0.005 mmol in terms of iron atom) of Component (A4) shown below was introduced therein to initiate the polymerization. The polymerization was conducted in an ethylene gas atmosphere at atmospheric pressure for 30 minutes. The polymerization was stopped by addition of a small amount of isobutyl alcohol. The reaction mixture was poured into a large amount of methanol to deposit the polymer entirely. After addition of hydrochloric acid, the polymer was collected by filtration with a glass filter. The collected polymer was vacuum-dried for 10 hours to obtain 6.12 g of polyethylene.

The catalyst had polymerization activity of 2,450 g/mmol-Fe·hr. The polyethylene had [η] of 1.80 dL/g.

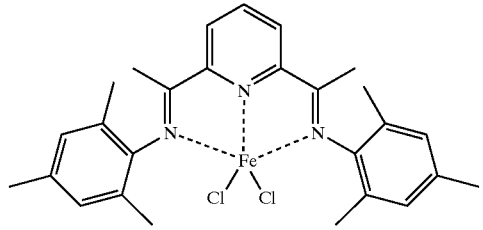

Component (A4)

Comparative Example 10

A 500-mL glass autoclave equipped with a paddle stirrer and purged sufficiently with nitrogen was charged with 250 mL of purified toluene. The autoclave was heated up to 50° C. Therein ethylene was allowed to flow at a rate of 100 L/hr to saturate the liquid phase and the gas phase with ethylene. Then 1.0 mmol of triethylaluminum was introduced therein and 2.62 mg (0.005 mmol in terms of iron atom) of Component (A4) used in Example 11-1 was added thereto to initiate the polymerization. The polymerization was conducted in an ethylene gas atmosphere at atmospheric pressure for 30 minutes. The polymerization was stopped by addition of a small amount of isobutyl alcohol. The reaction mixture was poured into a large amount of methanol to deposit the polymer entirely. After addition of hydrochloric acid, the polymer was collected by filtration with a glass filter. The collected polymer was vacuum-dried for 10 hours to obtain 1.48 g of polyethylene.

The catalyst had polymerization activity of 590 g/mmol-Fe·hr. The polyethylene had [η] of 0.27 dL/g.

Example 11-2

A 500-mL glass autoclave equipped with a paddle stirrer and purged sufficiently with nitrogen was charged with 250 mL of purified toluene, and was heated up to 75° C. Therein ethylene was allowed to flow at a rate of 100 L/hr with stirring to saturate the liquid phase and the gas phase with ethylene. Therein, were charged successively 0.5 mL of Component (B1) prepared in the same manner as in Example 1 (0.5 mmol in terms of magnesium atom), 0.25 mmol of ethyl trichloroacetate, 1.5 mmol of triethylaluminum, 0.25 mmol of diethylaluminum chloride, and 1.074 mg of Component (A8-1) shown below (0.00275 mmol in terms of vanadium atom) in the named order at intervals of 30 seconds with stirring at 1200 rpm to initiate the polymerization. The polymerization was conducted in an ethylene gas atmosphere at atmospheric pressure for 15 minutes. The polymerization was stopped by addition of a small amount of isobutyl alcohol. The reaction mixture was poured into a large amount of methanol to deposit the polymer entirely. After addition of hydrochloric acid, the polymer was collected by filtration with a glass filter. The collected polymer was vacuum-dried for 10 hours to obtain 2.14 g of polyethylene.

The catalyst had polymerization activity of 3,120 g/mmol-V·hr. The polyethylene had [η] of 46.5 dL/g.

Component (A8-1)

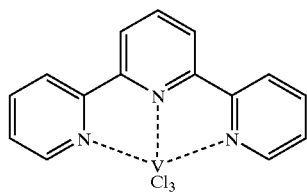

Example 11-3

Polymerization was conducted in the same manner as in Example 11-2 except that 1.366 mg of Component (A8-2) shown below (0.00275 mmol in terms of vanadium atom) was used in place of Component (A8-1). Thereby, polyethylene was obtained in a yield of 2.24 g.

The catalyst had polymerization activity of 3,260 g/mmol-V·hr. The polyethylene had [η] of 28.1 dL/g.

Component (A8-2)

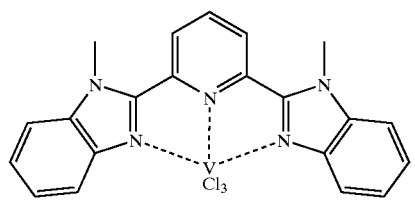

Example 11-4

Polymerization was conducted in the same manner as in Example 11-2 except that 1.383 mg of Component (A8-3) shown below (0.00275 mmol in terms of vanadium atom) was used in place of Component (A8-1). As the result, polyethylene was obtained in a yield of 0.605 g.

The catalyst had polymerization activity of 880 g/mmol-V·hr. The polyethylene had [η] of 34.1 dL/g.

Component (A8-3)

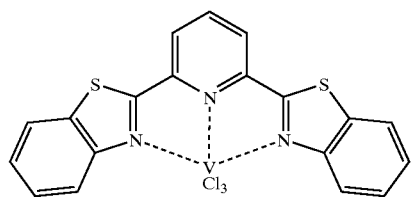

Example 11-5

Polymerization was conducted in the same manner as in Example 11-2 except that 1.570 mg of Component (A8-4) shown below (0.00275 mmol in terms of vanadium atom) was used in place of Component (A8-1). As the result, polyethylene was obtained in a yield of 1.27 g.

The catalyst had polymerization activity of 1,850 g/mmol-V·hr. The polyethylene had [η] of 30.2 dL/g.

Component (A8-4)

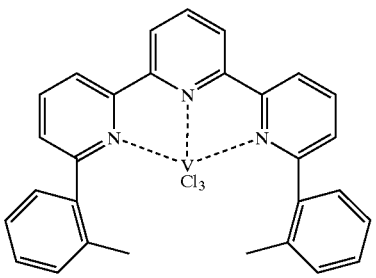

Example 11-6

Polymerization was conducted in the same manner as in Example 11-2 except that 1.250 mg of Component (A8-5) shown below (0.00275 mmol in terms of vanadium atom) was used in place of Component (A8-1). As the result, polyethylene was obtained in a yield of 4.08 g.

The catalyst had polymerization activity of 5,930 g/mmol-V·hr. The polyethylene had [η] of 31.5 dL/g.

Component (A8-5)

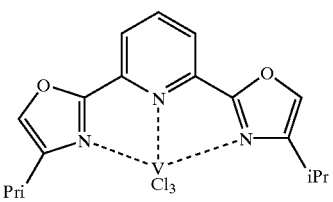

Example 11-7

Polymerization was conducted in the same manner as in Example 11-2 except that 1.218 mg of Component (A8-6) shown below (0.00275 mmol in terms of vanadium atom) was used in place of Component (A8-1). As the result, polyethylene was obtained in a yield of 1.46 g.

The catalyst had polymerization activity of 2,120 g/mmol-V·hr.

Component (A8-6)

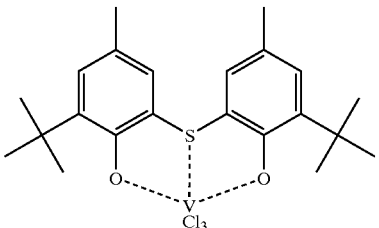

Example 11-8

Polymerization was conducted in the same manner as in Example 11-2 except that 1.317 mg of Component (A8-7) shown below (0.00275 mmol in terms of vanadium atom) was used in place of Component (A8-1). As the result, polyethylene was obtained in a yield of 1.15 g.

The catalyst had polymerization activity of 1,670 g/mmol-V·hr. The polyethylene had [η] of 27.9 dL/g.

Component (A8-7)

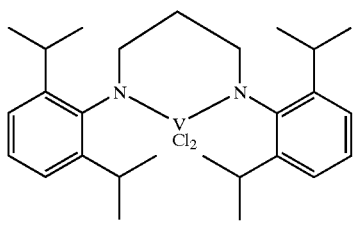

Example 11-9

Polymerization was conducted in the same manner as in Example 11-2 except that 1.152 mg of Component (A8-8) shown below (0.00275 mmol in terms of vanadium atom) was used in place of Component (A8-1). As the result, polyethylene was obtained in a yield of 15.38 g.

The catalyst had polymerization activity of 22,400 g/mmol-V·hr. The polyethylene had [η] of 27.9 dL/g.

Component (A8-8)

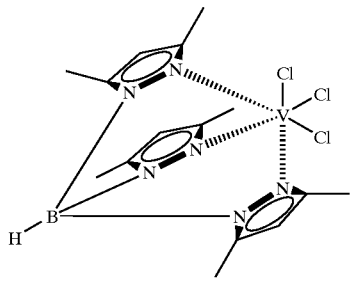

Example 11-10

Polymerization was conducted in the same manner as in Example 11-2 except that 1.767 mg of Component (A8-9) shown below (0.00275 mmol in terms of vanadium atom) was used in place of Component (A8-1). As the result, polyethylene was obtained in a yield of 2.16 g.

The catalyst had polymerization activity of 3,140 g/mmol-V·hr. The polyethylene had [η] of 30.4 dL/g.

Component (A8-9)

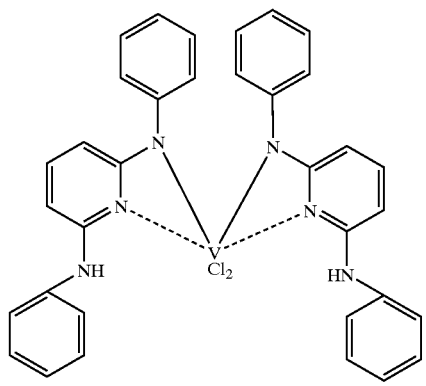

Example 12-1
[Preparation of Component (B1-7-5)]

A 200-mL flask purged sufficiently with nitrogen was charged with 18.8 mL of Component (B1) prepared in Example 1 (18.8 mmol in terms of magnesium atom) and 26 mL of purified decane. Thereto, 75 mmol of triethylaluminum diluted with purified decane was added dropwise with stirring at the liquid temperature kept at 15° C. and contact reaction was allowed to proceed under the same conditions for 5 minutes.

Then, the entire of the reaction mixture was added to separately provided purified decane kept at 110° C. with stirring, and the reaction was conducted for 10 minutes at 110° C. After the reaction, the solid portion was collected by filtration, and washed well with toluene.

A part of Component (B1-7-5) prepared as above was dried and analyzed for the composition, and was found to contain magnesium at 22.0 wt %, aluminum at 1.4 wt %, 2-ethylhexoxy group at 4.0 wt % and chlorine at 64.0 wt %.
[Polymerization]

A 1-liter SUS autoclave purged sufficiently with nitrogen was charged with 400 mL of purified toluene. Therein ethylene was allowed to flow to saturate the liquid phase and the gas phase with ethylene. The temperature was raised to 50° C. Therein, were charged successively 0.2 mmol of triethylaluminum, 0.6 mmol (in terms of magnesium atom) of the above-prepared Component (B1-7-5), and 1.573 mg of Component (A4)(0.003 mmol in terms of iron atom) used in Example 11-1 in the named order under an ethylene atmosphere. The polymerization was conducted at an ethylene pressure of 0.78 MPa·G for 20 minutes. During the polymerization, the temperature was kept at 5° C., and the ethylene pressure was kept at 0.78 MPa·G. After the polymerization, the reaction mixture was poured into a large amount of methanol to deposit the polymer entirely. After addition of hydrochloric acid, the polymer was collected by filtration with a glass filter. The collected polymer was vacuum-dried for 10 hours to obtain 58.5 g of polyethylene.

The catalyst had polymerization activity of 58,500 g/mmol-Zr·hr. The polyethylene had [η] of 2.98 dL/g.

Example 13-1
[Preparation of Solid Catalyst Component]

Component (B1-8), 0.42 g, prepared in the same manner as in Example 7-1 was placed in a Schrenk tube purged sufficiently with nitrogen, and was suspended in 10 mL of methylene chloride. In another Schrenk tube, 16.4 mg of Component (A4) was dissolved in 10 mL of methylene chloride. The entire of this solution was added dropwise to the above slurry of Component (B1-8) with stirring at room temperature. The content in this Schrenk tube was stirred at room temperature for 2 hours. Then the methylene chloride was removed by distillation under reduced pressure. The resulting solid product was suspended again in 15 mL of toluene. The solid matter was collected by filtration with a glass filter and was washed with toluene until iron compounds free in the solution came to be undetected.

The solid catalyst component prepared above was stored as a decane slurry. A part of the catalyst component was dried and analyzed for the composition, and was found to contain iron at 1.06 wt %, titanium at 0.28 wt %, and magnesium at 21.0 wt %.
[Polymerization]

A 500-mL glass autoclave equipped with a paddle stirrer and purged sufficiently with nitrogen was charged with 250 mL of purified toluene. Therein, ethylene was allowed to flow at a rate of 100 L/hr to saturate the liquid phase and the gas phase with ethylene. Thereto, were added 0.5 mmol of triethylaluminum and 1.36 mL of the decane slurry containing 0.0025 mmol (in terms of iron atom) of the above-prepared solid catalyst component at 25° C. under an ethylene atmosphere to initiate the polymerization. The polymerization was conducted under an ethylene gas atmosphere at atmospheric pressure at 25° C. for 30 minutes. The polymerization was stopped by addition of a small amount of isobutyl alcohol. The reaction mixture was poured into a large amount of methanol to deposit the polymer entirely. After addition of hydrochloric acid, the polymer was collected by filtration with a glass filter. The collected polymer was vacuum-dried for 10 hours to obtain 4.28 g of polyethylene.

The catalyst had polymerization activity of 3,424 g/mmol-Fe·hr. The polyethylene had [η] of 1.42 dL/g.

Example 13-2

[Polymerization]

A 1-liter autoclave purged sufficiently with nitrogen was charged with 500 mL of purified toluene. Therein ethylene was allowed to flow to saturate the liquid phase and the gas phase with ethylene. Thereto, were added 0.5 mmol of triethylaluminum and 1.36 mL of the decane slurry containing 0.0025 mmol (in terms of iron atom) of the solid catalyst component prepared in the same manner as in Example 13-1, at 25° C. under an ethylene atmosphere, to initiate the polymerization. The polymerization was conducted at an ethylene pressure of 0.78 MPa·G for 30 minutes. During the polymerization, the temperature was kept at 25° C., and the ethylene pressure was kept at 0.78 MPa·G. After the polymerization, the reaction mixture was poured into a large amount of methanol to deposit the polymer entirely. After addition of hydrochloric acid, the polymer was collected by filtration with a glass filter. The collected polymer was vacuum-dried for 10 hours to obtain 36.7 g of polyethylene.

The catalyst had polymerization activity of 73,400 g/mmol-Fe·hr. The polyethylene had [η] of 1.42 dL/g; and Mw of 0.64×10$^5$ and Mw/Mn of 4.09 according to GPC.

Example 14-1

[Preparation of Component (B20-1-4)]

In a 30-mL Schrenk tube, was placed 10 mL of purified toluene and 51.0 mg (0.02 mmol) of Component (B20-1) prepared in the same manner as in Example 9-1. Thereto, a toluene solution, 1.0 mL, containing 1.0 mmol of triethylaluminum (1.0 mol/L) was added. Further, a toluene solution, 10 mL, containing 0.01 mmol of Component (A4) (1.0 mmol/L) was added thereto and the mixture was stirred for 5 minutes to obtain Component (B20-1-4).

[Polymerization]

A 500-mL glass autoclave equipped with a paddle stirrer and purged sufficiently with nitrogen was charged with 250 mL of purified toluene. Therein, ethylene was allowed to flow at a rate of 100 L/hr to saturate the liquid phase and the gas phase with ethylene at room temperature. Thereto, the entire of Component (B20-1-4) was added to initiate the polymerization. The polymerization was conducted under an ethylene gas atmosphere at atmospheric pressure for 30 minutes. The polymerization was stopped by addition of a small amount of methanol. The reaction mixture was poured into a large amount of methanol to deposit the polymer entirely. After addition of hydrochloric acid, the polymer was collected by filtration with a glass filter. The collected polymer was vacuum-dried for 10 hours to obtain 12.5 g of polyethylene.

The catalyst had polymerization activity of 2,500 g/mmol-Zr·hr. The polyethylene had [η] of 2.99 dL/g.

Example 14-2

[Preparation of Component (B20-1-5)]

Component (B20-1), 12.8 mg (0.005 mmol), was placed in a 30-mL Schrenk tube. Thereto, a toluene solution, 1.0 mL, containing 1.0 mmol of triethylaluminum (1.0 mol/L) was added. Further, Component (A5), 6.2. mg (0.01 mmol), shown below was added thereto, and the mixture was stirred for 5 minutes to obtain Component (B20-1-5).

[Polymerization]

A 500-mL glass autoclave equipped with a paddle stirrer and purged sufficiently with nitrogen was charged with 250 mL of purified toluene. Therein, ethylene was allowed to flow at a rate of 100 L/hr to saturate the liquid phase and the gas phase with ethylene at room temperature. Thereto, the entire of Component (B20-1-5) was added to initiate the polymerization. The polymerization was conducted under an ethylene gas atmosphere at atmospheric pressure for 15 minutes. The polymerization was stopped by addition of a small amount of methanol. The reaction mixture was poured into a large amount of methanol to deposit the polymer entirely. After addition of hydrochloric acid, the polymer was collected by filtration with a glass filter. The collected polymer was vacuum-dried for 10 hours to obtain 0.46 g of polyethylene.

The catalyst had polymerization activity of 180 g/mmol-Zr·hr.

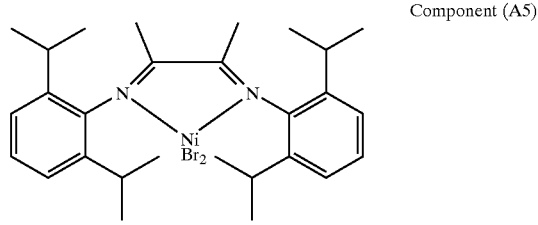

Component (A5)

Example 14-3

[Preparation of Component (B20-1-6)]

Component (B20-1), 12.8 mg (0.005 mmol), was placed in a 30-mL Schrenk tube. Thereto, a toluene solution, 1.0 mL, containing 1.0 mmol of triethylaluminum (1.0 mol/L) was added. Further, Component (A6), 5.0 mg (0.01 mmol), shown below was added thereto and the mixture was stirred for 5 minutes to obtain Component (B20-1-6).

[Polymerization]

A 500-mL glass autoclave equipped with a paddle stirrer and purged sufficiently with nitrogen was charged with 250 mL of purified toluene. Therein, ethylene was allowed to flow at a rate of 100 L/hr to saturate the liquid phase and the gas phase with ethylene at room temperature. Thereto, the entire of Component (B20-1-6) was added to initiate the polymerization. The polymerization was conducted under an ethylene gas atmosphere at atmospheric pressure for 15 minutes. The polymerization was stopped by addition of a small amount of methanol. The reaction mixture was poured into a large amount of methanol to deposit the polymer entirely. After addition of hydrochloric acid, the polymer was collected by filtration with a glass filter. The collected polymer was vacuum-dried for 10 hours to obtain 2.43 g of polyethylene.

The catalyst had polymerization activity of 1,000 g/mmol-Zr·hr. The polyethylene had [η] of 2.61 dL/g.

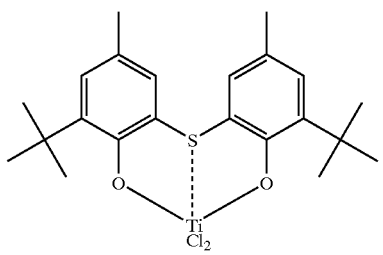

Component (A6)

Comparative Example 11

The experiment was conducted in the same manner as in Example 14-2 except that Component (B20-1) was not used. No polymer was obtained when the reaction mixture was poured into a large amount of methanol.

Comparative Example 12

The experiment was conducted in the same manner as in Example 14-3 except that Component (B20-1) was not used. No polymer was obtained when the reaction mixture was poured into a large amount of methanol.

Example 15-1

[Preparation of Component (B30-1-2)]

Component (B30-1), 114.9 mg, prepared in the same manner as in Example 10-1 was kept in contact with 1.250 mg (0.00275 mmol in terms of vanadium atom) of Component (A8-5) in 9 mL of dehydrated toluene for 15 minutes. Thereto 0.25 mmol of ethyl trichloroacetate, and 0.25 mmol of diethylaluminum chloride were brought into contact in this order to prepare Component (B30-1-2).

[Polymerization]

A 1-liter SUS autoclave purged sufficiently with nitrogen was charged with 500 mL of purified toluene. Therein ethylene was allowed to flow to saturate the liquid phase and the gas phase with ethylene. Then the entire of Component (B30-1-2) prepared above was introduced therein at 75° C. under an ethylene atmosphere. The polymerization was conducted at an ethylene pressure of 0.78 MPa·G for 30 minutes. During the polymerization, the temperature was kept at 75° C., and the ethylene pressure was kept at 0.78 MPa·G. After the polymerization, the reaction mixture was poured into a large amount of methanol to deposit the polymer entirely. After addition of hydrochloric acid, the polymer was collected by filtration with a glass filter. The collected polymer was vacuum-dried for 10 hours to obtain 3.77 g of polyethylene.

The catalyst had polymerization activity of 2,700 g/mmol-V·hr. The polyethylene had [η] of 4.31 dL/g.

Example 15-2

The preparation of the catalyst component and the polymerization were conducted in the same manner as in Example 15-1 except that 1.152 mg (0.00275 mmol in terms of vanadium atom) of Component (A8-8) was used in place of Component (A8-5) Thereby, polyethylene was obtained in a yield of 2.37 g.

The catalyst had polymerization activity of 1,700 g/mmol-V·hr.

Example 16-1

[Preliminary Contact of Catalyst Components]

Component (B1), 1.0 mL, prepared in the same manner as in Example 1 (1 mmol in terms of magnesium atom), and 0.5 mmol of ethyl trichloroacetate were added to 10 mL of purified toluene. To this mixture solution, 3.0 mmol of triethylaluminum was added and allowed to react with it for 3 minutes. Then, 0.5 mmol of diethylaluminum chloride was added thereto and allowed to react for 2 minutes. Further, 2.527 mg (0.0055 mmol in terms of vanadium atom) of Component (A3-1) shown below was added thereto and allowed to react for 5 minutes.

[Polymerization]

A 500-mL glass autoclave equipped with a paddle stirrer and purged sufficiently with nitrogen was charged with 250 mL of purified toluene. The autoclave was heated up to 75° C. Therein ethylene was allowed to flow at a rate of 100 L/hr with stirring to saturate the liquid phase and the gas phase with ethylene. Then the entire of the above preliminarily contacted catalyst component mixture was introduced with stirring at 600 rpm to initiate the polymerization. The polymerization was conducted in an ethylene gas atmosphere at atmospheric pressure for 15 minutes. The polymerization was stopped by addition of a small amount of isobutyl alcohol. The reaction mixture was poured into a large amount of methanol to deposit the polymer entirely. After addition of hydrochloric acid, the polymer was collected by filtration with a glass filter. The collected polymer was vacuum-dried for 10 hours to obtain 9.68 g of polyethylene.

The catalyst had polymerization activity of 7,040 g/mmol-V·hr. The polyethylene had [η] of 28.1 dL/g.

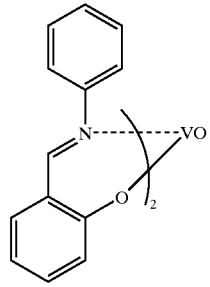

Component (A3-1)

Example 16-2

[Preliminary Contact of Catalyst Components]

Component (B1), 1.0 mL, prepared in the same manner as in Example 1 (1 mmol in terms of magnesium atom), and 3.0 mmol of triethylaluminum were added to 10 mL of purified toluene, and allowed to react for 3 minutes. Thereto, 0.5 mmol of diethylaluminum chloride was added and allowed to react for 2 minutes. Further, 2.527 mg (0.0055 mmol in terms of vanadium atom) of Component (A3-1) was added thereto and allowed to react for 5 minutes.

[Polymerization]

A 500-mL glass autoclave equipped with a paddle stirrer and purged sufficiently with nitrogen was charged with 250 mL of purified toluene. The autoclave was heated up to 75° C. Therein ethylene was allowed to flow at a rate of 100 L/hr with stirring to saturate the liquid phase and the gas phase with ethylene. Then 0.5 mmol of ethyl trichloroacetate, and the entire of the above preliminarily contacted catalyst component mixture were introduced with stirring at 600 rpm to initiate the polymerization. The polymerization was conducted in an ethylene gas atmosphere at atmospheric pressure for 15 minutes. The polymerization was stopped by addition of a small amount of isobutyl alcohol. The reaction mixture was poured into a large amount of methanol to deposit the polymer entirely. After addition of hydrochloric acid, the polymer was collected by filtration with a glass filter. The collected polymer was vacuum-dried for 10 hours to obtain 9.92 g of polyethylene.

The catalyst had polymerization activity of 7,210 g/mmol-V·hr. The polyethylene had [η] of 18.7 dL/g.

Example 16-3

[Preliminary Contact of Catalyst Components]

Component (B1), 1.0 mL, prepared in the same manner as in Example 1 (1 mmol in terms of magnesium atom), and 0.5 mmol of ethyl trichloroacetate were added to 10 mL of purified toluene. To this mixture solution, 3.0 mmol of triethylaluminum was added and allowed to react with it for 3 minutes. Then, 2.527 mg (0.0055 mmol in terms of vanadium atom) of Component (A3-1) was added thereto and allowed to react for 2 minutes. Further, 0.5 mmol of diethylaluminum chloride was added thereto and allowed to react for 5 minutes.

[Polymerization]

A 500-mL glass autoclave equipped with a paddle stirrer and purged sufficiently with nitrogen was charged with 250 mL of purified toluene. The autoclave was heated up to 75° C. Therein ethylene was allowed to flow at a rate of 100 L/hr with stirring to saturate the liquid phase and the gas phase with ethylene. Then the entire of the above preliminarily contacted catalyst component mixture was added therein with stirring at 600 rpm to initiate the polymerization. The polymerization was conducted in an ethylene gas atmosphere at atmospheric pressure for 15 minutes. The polymerization was stopped by addition of a small amount of isobutyl alcohol. The reaction mixture was poured into a large amount of methanol to deposit the polymer entirely. After addition of hydrochloric acid, the polymer was collected by filtration with a glass filter. The collected polymer was vacuum-dried for 10 hours to obtain 9.83 g of polyethylene.

The catalyst had polymerization activity of 7,150 g/mmol-V·hr. The polyethylene had [η] of 19.5 dL/g.

Example 16-4

[Preliminary Contact of Catalyst Components]

In 5 mL of purified toluene, 0.25 mmol of diethylaluminum chloride and 1.263 mg (0.00275 mmol in terms of vanadium atom) of Component (A3-1) were allowed to react for 3 minutes.

[Polymerization]

A 500-mL glass autoclave equipped with a paddle stirrer and purged sufficiently with nitrogen was charged with 250 mL of purified toluene. The autoclave was heated up to 75° C. Therein ethylene was allowed to flow at a rate of 100 L/hr with stirring to saturate the liquid phase and the gas phase with ethylene. Then 0.5 mL of Component (B1) prepared in the same manner as in Example 1 (0.5 mmol in terms of magnesium atom), 1.5 mmol of triethylaluminum, 0.25 mmol of ethyl trichloroacetate, and the entire of the above preliminarily contacted catalyst component mixture were added successively in the named order at intervals of 30 seconds with stirring at 600 rpm to initiate the polymerization. The polymerization was conducted in an ethylene gas atmosphere at atmospheric pressure for 15 minutes. The polymerization was stopped by addition of a small amount of isobutyl alcohol. The reaction mixture was poured into a large amount of methanol to deposit the polymer entirely. After addition of hydrochloric acid, the polymer was collected by filtration with a glass filter. The collected polymer was vacuum-dried for 10 hours to obtain 7.81 g of polyethylene.

The catalyst had polymerization activity of 11,360 g/mmol-V·hr. The polyethylene had [η] of 24.3 dL/g.

Example 17-1

A 500-mL glass autoclave equipped with a paddle stirrer and purged sufficiently with nitrogen was charged with 250 mL of purified toluene. The autoclave was heated up to 75° C. Therein ethylene was allowed to flow at a rate of 100 L/hr with stirring to saturate the liquid phase and the gas phase with ethylene. Then 0.5 mL of Component (B1) prepared in the same manner as in Example 1 (0.5 mmol in terms of magnesium atom), 0.25 mmol of ethyl trichloroacetate, 1.5 mmol of triethylaluminum, 0.25 mmol of diethylaluminum chloride, and 1.263 mg (0.00275 mmol in terms of vanadium atom) of Component (A3-1) were added successively in the named order at intervals of 30 seconds with stirring at 600 rpm to initiate the polymerization. The polymerization was conducted in an ethylene gas atmosphere at atmospheric pressure for 15 minutes. The polymerization was stopped by addition of a small amount of isobutyl alcohol. The reaction mixture was poured into a large amount of methanol to deposit the polymer entirely. After addition of hydrochloric acid, the polymer was collected by filtration with a glass filter. The collected polymer was vacuum-dried for 10 hours to obtain 10.96 g of polyethylene.

The catalyst had polymerization activity of 15,900 g/mmol-V·hr. The polyethylene had [η] of 24.5 dL/g.

Example 17-2

Polymerization was conducted in the same manner as in Example 17-1 except that the order of addition of the components was changed to the order of triethylaluminum, diethylaluminum chloride, Component (B1), ethyl trichloroacetate, and Component (A3-1). Thereby, polyethylene was obtained in a yield of 9.98 g.

The catalyst had polymerization activity of 14,520 g/mmol-V·hr. The polyethylene had [η] of 31.1 dL/g.

Example 17-3

Polymerization was conducted in the same manner as in Example 17-1 except that the order of addition of the components was changed to the order of Component (B1), triethylaluminum, ethyl trichloroacetate, diethylaluminum chloride, and Component (A3-1) Thereby, polyethylene was obtained in a yield of 9.91 g.

The catalyst had polymerization activity of 14,410 g/mmol-V·hr. The polyethylene had [η] of 27.4 dL/g.

Example 17-4

Polymerization was conducted in the same manner as in Example 17-1 except that the order of addition of the components was changed to the order of Component (B1), ethyl trichloroacetate, diethylaluminum chloride, triethylaluminum, and Component (A3-1). Thereby, polyethylene was obtained in a yield of 8.28 g.

The catalyst had polymerization activity of 12,040 g/mmol-V·hr. The polyethylene had [η] of 50.7 dL/g.

Example 17-5

Polymerization was conducted in the same manner as in Example 17-1 except that the order of addition of the components was changed to the order of Component (B1), triethylaluminum, Component (A3-1), ethyl trichloroacetate, and diethylaluminum chloride. Thereby, polyethylene was obtained in a yield of 7.96 g.

The catalyst had polymerization activity of 11,580 g/mmol-V·hr. The polyethylene had [η] of 41.5 dL/g.

Example 17-6

Polymerization was conducted in the same manner as in Example 17-1 except that the order of addition of the components was changed to the order of Component (B1), diethylaluminum chloride, triethylaluminum, Component (A3-1), and ethyl trichloroacetate.

Thereby, polyethylene was obtained in a yield of 7.96 g. The catalyst had polymerization activity of the same level as that of Example 17-5, but the polyethylene had [η] of 31.7 dL/g which is different from that of Example 17-5.

Example 17-7

Polymerization was conducted in the same manner as in Example 17-1 except that the order of addition of the components was changed to the order of Component (B1), triethylaluminum, ethyl trichloroacetate, Component (A3-1), and diethylaluminum chloride. Thereby, polyethylene was obtained in a yield of 7.81 g.

The catalyst had polymerization activity of 11,360 g/mmol-V·hr. The polyethylene had [η] of 21.6 dL/g.

Example 17-8

Polymerization was conducted in the same manner as in Example 17-1 except that the order of addition of the components was changed to the order of Component (B1), triethylaluminum, diethylaluminum chloride, Component (A3-1), and ethyl trichloroacetate. Thereby, polyethylene was obtained in a yield of 7.37 g.

The catalyst had polymerization activity of 10,720 g/mmol-V·hr. The polyethylene had [η] of 23.2 dL/g.

Example 17-9

Polymerization was conducted in the same manner as in Example 17-1 except that the order of addition of the components was changed to the order of Component (B1), triethylaluminum, diethylaluminum chloride, ethyl trichloroacetate, and Component (A3-1). Thereby, polyethylene was obtained in a yield of 6.66 g.

The catalyst had polymerization activity of 9,690 g/mmol-V·hr. The polyethylene had [η] of 25.7 dL/g.

Example 17-10

Polymerization was conducted in the same manner as in Example 17-1 except that the order of addition of the components was changed to the order of Component (B1), triethylaluminum, Component (A3-1), diethylaluminum chloride, and ethyl trichloroacetate. Thereby, polyethylene was obtained in a yield of 6.53 g.

The catalyst had polymerization activity of 9,500 g/mmol-V·hr. The polyethylene had [η] of 24.3 dL/g.

Example 17-11

Polymerization was conducted in the same manner as in Example 17-1 except that the order of addition of the components was changed to the order of Component (B1), diethylaluminum chloride, triethylaluminum, ethyl trichloroacetate, and Component (A3-1). Thereby, polyethylene was obtained in a yield of 4.98 g.

The catalyst had polymerization activity of 7,240 g/mmol-V·hr. The polyethylene had [η] of 59.0 dL/g.

Comparative Example 13

A 500-mL glass autoclave equipped with a paddle stirrer and purged sufficiently with nitrogen was charged with 250 mL of purified toluene. The autoclave was heated up to 75° C. Therein ethylene was allowed to flow at a rate of 100 L/hr with stirring to saturate the liquid phase and the gas phase with ethylene. Then 0.5 mmol of ethyl trichloroacetate, 0.5 mmol of diethylaluminum chloride, and 2.527 mg (0.0055 mmol in terms of vanadium atom) of Component (A3-1) were added successively in the named order at intervals of 30 seconds with stirring at 600 rpm to initiate the polymerization. The polymerization was conducted in an ethylene gas atmosphere at atmospheric pressure for 15 minutes. The polymerization was stopped by addition of a small amount of isobutyl alcohol. The reaction mixture was poured into a large amount of methanol to deposit the polymer entirely. After addition of hydrochloric acid, the polymer was collected by filtration with a glass filter. The collected polymer was vacuum-dried for 10 hours to obtain 2.30 g of polyethylene.

The catalyst had polymerization activity of 1,670 g/mmol-V·hr. The polyethylene had [η] of 11.3 dL/g.

Example 17-12

Polymerization was conducted in the same manner as in Example 17-1 except that the amount of addition of ethyl trichloroacetate was changed to 0.125 mmol, and the amount of addition of diethylaluminum chloride was changed to 0.125 mmol. Thereby, polyethylene was obtained in a yield of 6.04 g.

The catalyst had polymerization activity of 8,790 g/mmol-V·hr.

Example 17-13

Polymerization was conducted in the same manner as in Example 17-1 except that the amount of addition of ethyl trichloroacetate was changed to 0.75 mmol, and the amount of addition of diethylaluminum chloride was changed to 0.75 mmol. Thereby, polyethylene was obtained in a yield of 8.04 g.

The catalyst had polymerization activity of 11,690 g/mmol-V·hr. The polyethylene had [η] of 19.1 dL/g.

Example 17-14

Polymerization was conducted in the same manner as in Example 17-1 except that the amount of addition of diethylaluminum chloride only was changed to 0.75 mmol Thereby, polyethylene was obtained in a yield of 6.07 g.

The catalyst had polymerization activity of 8,830 g/mmol-V·hr. The polyethylene had [η] of 25.1 dL/g.

Example 17-15

Polymerization was conducted in the same manner as in Example 17-5 except that the amount of addition of ethyl trichloroacetate was changed to 0.125 mmol, and the amount of addition of diethylaluminum chloride was changed to 0.125 mmol. Thereby, polyethylene was obtained in a yield of 10.67 g.

The catalyst had polymerization activity of 15,520 g/mmol-V·hr. The polyethylene had [η] of 26.0 dL/g.

Example 17-16

Polymerization was conducted in the same manner as in Example 17-5 except that the amount of addition of ethyl trichloroacetate was changed to 0.75 mmol, and the amount of addition of diethylaluminum chloride was changed to 0.75 mmol. Thereby, polyethylene was obtained in a yield of 8.22 g.

The catalyst had polymerization activity of 11,960 g/mmol-V·hr. The polyethylene had [η] of 25.7 dL/g.

Example 17-17

Polymerization was conducted in the same manner as in Example 17-5 except that the amount of addition of diethylaluminum chloride only was changed to 0.75 mmol. Thereby, polyethylene was obtained in a yield of 6.01 g.

The catalyst had polymerization activity of 8,740 g/mmol-V·hr. The polyethylene had [η] of 22.1 dL/g.

Example 17-18

Polymerization was conducted in the same manner as in Example 17-3 except that only the stirring rate was changed to 1200 rpm. Thereby, polyethylene was obtained in a yield of 14.94 g.

The catalyst had polymerization activity of 21,700 g/mmol-V·hr. The polyethylene had [η] of 28.3 dL/g.

Example 17-19

Polymerization was conducted in the same manner as in Example 17-5 except that only the stirring rate was changed to 1200 rpm. Thereby, polyethylene was obtained in a yield of 12.04 g.

The catalyst had polymerization activity of 17,500 g/mmol-V·hr. The polyethylene had [η] of 25.5 dL/g.

Example 17-20

A 500-mL glass autoclave equipped with a paddle stirrer and purged sufficiently with nitrogen was charged with 250 mL of purified toluene. The autoclave was heated up to 75° C. Therein ethylene was allowed to flow at a rate of 100 L/hr with stirring to saturate the liquid phase and the gas phase with ethylene. Then 0.5 mL of Component (B1) prepared in the same manner as in Example 1 (0.5 mmol in terms of magnesium atom), 0.25 mmol of ethyl trichloroacetate, 1.5 mmol of triethylaluminum, 0.25 mmol of diethylaluminum chloride, and 1.263 mg (0.00275 mmol in terms of vanadium atom) of Component (A3-1) were added successively in the named order at intervals of 30 seconds with stirring at 1200 rpm to initiate the polymerization. The polymerization was conducted in an ethylene gas atmosphere at atmospheric pressure for 15 minutes. The polymerization was stopped by addition of a small amount of isobutyl alcohol. The reaction mixture was poured into a large amount of methanol to deposit the polymer entirely. After addition of hydrochloric acid, the polymer was collected by filtration with a glass filter. The collected polymer was vacuum-dried for 10 hours to obtain 16.49 g of polyethylene.

The catalyst had polymerization activity of 24,000 g/mmol-V·hr. The polyethylene had [η] of 31.6 dL/g.

Example 17-21

Polymerization was conducted in the same manner as in Example 17-20 except that the polymerization temperature was changed to 50° C. Thereby, polyethylene was obtained in a yield of 20.28 g.

The catalyst had polymerization activity of 29,500 g/mmol-V·hr. The polyethylene had [η] of 46.6 dL/g.

Example 17-22

Polymerization was conducted in the same manner as in Example 17-20 except that 0.25 mmol of ethylaluminum dichloride was used in place of the diethylaluminum chloride as the catalyst component. Thereby, polyethylene was obtained in a yield of 12.31 g.

The catalyst had polymerization activity of 17,900 g/mmol-V·hr. The polyethylene had [η] of 27.8 dL/g.

Example 17-23

Polymerization was conducted in the same manner as in Example 17-20 except that 0.25 mmol of ethylaluminum sesquichloride (0.5 mmol in terms of aluminum atom) was used in place of the diethylaluminum chloride as the catalyst component. Thereby, polyethylene was obtained in a yield of 10.65 g.

The catalyst had polymerization activity of 15,500 g/mmol-V·hr. The polyethylene had [η] of 28.7 dL/g.

Example 17-24

Polymerization was conducted in the same manner as in Example 17-1 except that the amounts of addition of the components were changed to 1.0 mL for Component (B1) (1.0 mmol in terms of magnesium atom), 0.5 mmol for ethyl trichloroacetate, 3.0 mmol for triethylaluminum, 0.5 mmol for diethylaluminum chloride, and 2.527 mg for Component (A3-1) (0.0055 mmol in terms of vanadium atom). Thereby, polyethylene was obtained in a yield of 11.27 g.

The catalyst had polymerization activity of 8200 g/mmol-V·hr. The polyethylene had [η] of 20.0 dL/g.

Example 17-25

Polymerization was conducted in the same manner as in Example 17-20 except that the amounts of addition of the components were changed to 0.2 mL for Component (B1) (0.2 mmol in terms of magnesium atom), 0.1 mmol for ethyl trichloroacetate, 0.9 mmol for triethylaluminum, 0.1 mmol for diethylaluminum chloride, and 0.505 mg for Component (A3-1) (1.1 mol in terms of vanadium atom). Thereby, polyethylene was obtained in a yield of 12.96 g The catalyst had polymerization activity of 47,100 g/mmol-V·hr. The polyethylene had [η] of 31.2 dL/g.

Example 17-26

Polymerization was conducted in the same manner as in Example 17-20 except that the amounts of addition of the components were changed to 0.1 mL for Component (B1) (0.1 mmol in terms of magnesium atom), 0.05 mmol for ethyl trichloroacetate, 0.45 mmol for triethylaluminum, 0.05 mmol for diethylaluminum chloride, and 0.2527 mg for Component (A3-1) (0.55 μmol in terms of vanadium atom). Thereby, polyethylene was obtained in a yield of 6.59 g The catalyst had polymerization activity of 47,900 mg/mmol-V·hr. The polyethylene had [η] of 38.2 dL/g.

Example 17-27

A 500-mL glass autoclave equipped with a paddle stirrer and purged sufficiently with nitrogen was charged with 250 mL of purified toluene. The autoclave was heated up to 75° C., Therein a gas mixture of ethylene and hydrogen was allowed to flow at an ethylene flow rate of 100 L/hr and a hydrogen flow rate of 25 L/hr with stirring to saturate the liquid phase and the gas phase with the gas mixture.

Then 0.5 mL of Component (B1) prepared in the same manner as in Example 1 (0.5 mmol in terms of magnesium atom), 0.25 mmol of ethyl trichloroacetate, 1.5 mmol of triethylaluminum, 0.25 mmol of diethylaluminum chloride, and 1.263 mg (0.00275 mmol in terms of vanadium atom) of Component (A3-1) were added successively in the named order at intervals of 30 seconds with stirring at 600 rpm to initiate the polymerization. The polymerization was conducted in an ethylene-hydrogen mixed gas atmosphere at atmospheric pressure for 30 minutes. The polymerization was stopped by addition of a small amount of isobutyl alcohol. The reaction mixture was poured into a large amount of methanol to deposit the polymer entirely. After addition of hydrochloric acid, the polymer was collected by filtration with a glass filter. The collected polymer was vacuum-dried for 10 hours to obtain 0.12 g of polyethylene.

The catalyst had polymerization activity of 90 g/mmol-V·hr. The polyethylene had Mw of $1.95 \times 10^4$ and an Mw/Mn ratio of 2.50 according to GPC.

Example 17-28

A 500-mL glass autoclave equipped with a paddle stirrer and purged sufficiently with nitrogen was charged with 250 mL of purified toluene. The autoclave was heated up to 75° C. Therein a gas mixture of ethylene and propylene was allowed to flow at an ethylene flow rate of 50 L/hr and a propylene flow rate of 50 L/hr with stirring to saturate the liquid phase and the gas phase with the gas mixture.

Then 0.2 mL of Component (B1) prepared in the same manner as in Example 1 (0.2 mmol in terms of magnesium atom), 0.1 mmol of ethyl trichloroacetate, 0.9 mmol of triethylaluminum, 0.1 mmol of diethylaluminum chloride, and 0.505 mg (1.1 µmol in terms of vanadium atom) of Component (A3-1) were added successively in the named order at intervals of 30 seconds with stirring at 1200 rpm to initiate the copolymerization. The polymerization was conducted in an ethylene-propylene mixed gas atmosphere at atmospheric pressure for 15 minutes. The polymerization was stopped by addition of a small amount of isobutyl alcohol. The reaction mixture was poured into a large amount of a methanol-acetone mixed solvent to deposit the polymer entirely. After addition of hydrochloric acid, the polymer was collected by filtration with a glass filter. The collected polymer was vacuum-dried for 10 hours to obtain 0.71 g of an ethylene-propylene copolymer.

The catalyst had polymerization activity of 2,580 g/mmol-V·hr. The copolymer contained propylene at 19.0 mole % according to IR measurement, and had [η] of 5.19 dL/g.

Example 17-29

Polymerization was conducted in the same manner as in Example 17-20 except that 250 mL of decane was used in place of the toluene as the polymerization solvent. Thereby, polyethylene was obtained in a yield of 14.78 g.

The catalyst had polymerization activity of 21,500 g/mmol-V·hr. The polyethylene had [η] of 39.5 dL/g.

Example 17-30

A 500-mL glass autoclave equipped with a paddle stirrer and purged sufficiently with nitrogen was charged with 250 mL of decane. The autoclave was heated up to 75° C. Therein a gas mixture of ethylene and propylene was allowed to flow at an ethylene flow rate of 95 L/hr and a propylene flow rate of 5 L/hr with stirring to saturate the liquid phase and the gas phase with the gas mixture.

Then 0.5 mL of Component (B1) prepared in the same manner as in Example 1 (0.5 mmol in terms of magnesium atom), 0.25 mmol of ethyl trichloroacetate, 1.5 mmol of triethylaluminum, 0.25 mmol of diethylaluminum chloride, and 1.263 mg (0.00275 mmol in terms of vanadium atom) of Component (A3-1) were added successively in the named order at intervals of 30 seconds with stirring at 1200 rpm to initiate the copolymerization. The polymerization was conducted in an ethylene-propylene mixed gas atmosphere at atmospheric pressure for 15 minutes. The polymerization was stopped by addition of a small amount of isobutyl alcohol. The reaction mixture was poured into a large amount of a methanol-acetone mixed solvent to deposit the polymer entirely. After addition of hydrochloric acid, the polymer was collected by filtration with a glass filter. The collected polymer was vacuum-dried for 10 hours to obtain 5.42 g of an ethylene-propylene copolymer.

The catalyst had polymerization activity of 7,880 g/mmol-V·hr. The copolymer contained propylene at 0.8 mole % according to IR measurement, and had [η] of 21.6 dL/g.

Example 17-31

Polymerization was conducted in the same manner as in Example 17-30 except that the flow rate ratio of the fed olefin gases was change to 80 L/hr of ethylene and 20 L/hr of propylene. Thereby an ethylene-propylene copolymer was obtained in a yield of 2.01 g.

The catalyst had polymerization activity of 2,920 g/mmol-V·hr. The copolymer contained propylene at 9.9 mole % according to IR measurement, and had [η] of 9.14 dL/g Example 17-32

Polymerization was conducted in the same manner as in Example 17-20 except that 1.434 mg (0.00275 mmol in terms of vanadium atom) of Component (A3-2) shown below was used in place of Component (A3-1). Thereby, polyethylene was obtained in a yield of 14.62 g.

The catalyst had polymerization activity of 21,300 g/mmol-V·hr. The polyethylene had [η] of 32.1 dL/g.

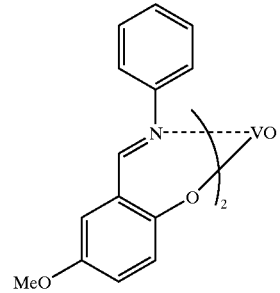

Component (A3-2)

Example 17-33

Polymerization was conducted in the same manner as in Example 17-20 except that 1.297 mg (0.00275 mmol in terms of vanadium atom) of Component (A3-3) shown below was used in place of Component (A3-1). Thereby, polyethylene was obtained in a yield of 13.31 g.

The catalyst had polymerization activity of 19,400 g/mmol-V·hr.

Component (A3-3)

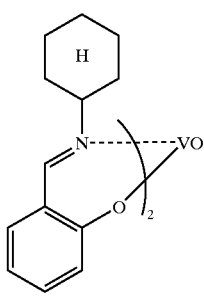

Example 17-34

Polymerization was conducted in the same manner as in Example 17-20 except that 1.071 mg (0.00275 mmol in terms of vanadium atom) of Component (A3-4) shown below was used in place of Component (A3-1). Thereby, polyethylene was obtained in a yield of 11.01 g.

The catalyst had polymerization activity of 16,000 g/mmol-V·hr. The polyethylene had [η] of 29.2 dL/g.

Component (A3-4)

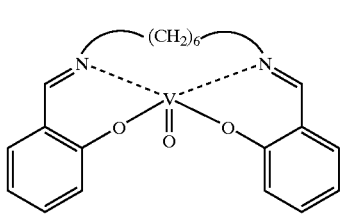

Example 17-35

Polymerization was conducted in the same manner as in Example 17-20 except that 0.8295 mg (0.00275 mmol in terms of vanadium atom) of Component (A3-5) shown below was used in place of Component (A3-1). Thereby, polyethylene was obtained in a yield of 7.80 g.

The catalyst had polymerization activity of 11,300 g/mmol-V·hr. The polyethylene had [η] of 37.5 dL/g.

Component (A3-5)

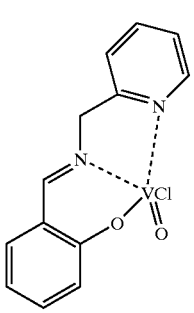

Example 17-36

Polymerization was conducted in the same manner as in Example 17-20 except that 0.9039 mg (0.00275 mmol in terms of vanadium atom) of Component (A3-6) shown below was used in place of Component (A3-1). Thereby, polyethylene was obtained in a yield of 12.00 g.

The catalyst had polymerization activity of 17,500 g/mmol-V·hr. The polyethylene had [η] of 28.7 dL/g.

Component (A3-6)

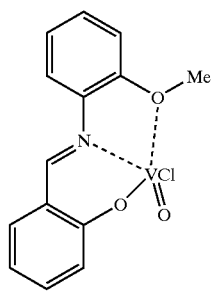

Example 17-37

Polymerization was conducted in the same manner as in Example 17-20 except that 0.8443 mg (0.00275 mmol in terms of vanadium atom) of Component (A3-7) shown below was used in place of Component (A3-1). Thereby, polyethylene was obtained in a yield of 12.40 g.

The catalyst had polymerization activity of 18,000 g/mmol-V·hr. The polyethylene had [η] of 29.5 dL/g.

Component (A3-7)

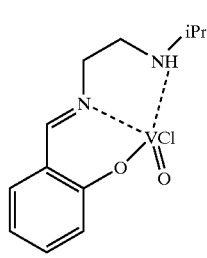

Example 17-38

Polymerization was conducted in the same manner as in Example 17-20 except that 0.8625 mg (0.00275 mmol in terms of vanadium atom) of Component (A3-8) shown below was used in place of Component (A3-1). Thereby, polyethylene was obtained in a yield of 12.22 g.

The catalyst had polymerization activity of 17,800 g/mmol-V·hr. The polyethylene had [η] of 35.5 dL/g.

Component (A3-8)

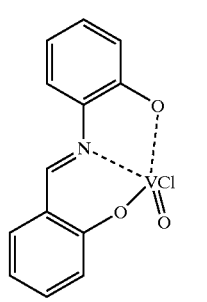

Example 17-39

Polymerization was conducted in the same manner as in Example 17-20 except that 0.7870 mg (0.00275 mmol in terms of vanadium atom) of Component (A3-9) shown below was used in place of Component (A3-1). Thereby, polyethylene was obtained in a yield of 11.43 g.

The catalyst had polymerization activity of 16,600 g/mmol-V·hr. The polyethylene had [η] of 35.2 dL/g.

Component (A3-9)

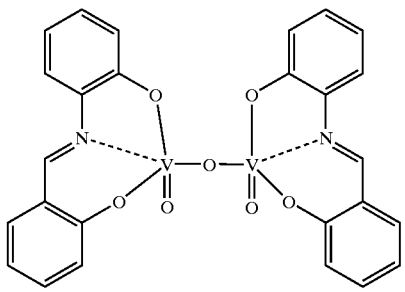

Example 18-1
[Preparation of Component (B30-1-3)]

Component (B30-1), 114.9 mg, prepared in the same manner as in Example 10-1 was brought in to contact with 1.263 mg (0.00275 mmol in terms of vanadium atom) of Component (A3-1) in 9 mL of dehydrated toluene for 15 minutes. Then 0.25 mmol of ethyl trichloroacetate, and 0.25 mmol of diethylaluminum chloride were brought into contact therewith successively in the named order to prepare Component (B30-1-3).

[Polymerization]

A 1-liter SUS autoclave purged sufficiently with nitrogen was charged with 500 mL of purified toluene. Therein ethylene was allowed to flow to saturate the liquid phase and the gas phase with ethylene. Then the entire of Component (B30-1-3) prepared above was introduced therein at 75° C. under an ethylene atmosphere. The polymerization was conducted at an ethylene pressure of 0.78 MPa·G for 30 minutes. During the polymerization, the temperature was kept at 75° C., and the ethylene pressure was kept at 0.78 MPa·G. After the polymerization, the reaction mixture was poured into a large amount of methanol to deposit the polymer entirely. After addition of hydrochloric acid, the polymer was collected by filtration with a glass filter. The collected polymer was vacuum-dried for 10 hours to obtain 29.25 g of polyethylene. The catalyst had polymerization activity of 21,300 g/mmol-Zr·hr. The polyethylene had [η] of 10.3 dL/g.

What is claimed is:

1. An olefin polymerization catalyst, which comprises:
   (A) a transition metal compound or lanthanoid compound containing two or more atoms selected from the group consisting of boron, nitrogen, oxygen, phosphorus, sulfur, and selenium; and
   (B) a Lewis acid selected from the group of compounds (b-1) to (b-4) below:
      (b-1) ionic-bonding compounds having a $CdCl_2$ type or a $CdI_2$ type of layered crystal structure;
      (b-2) clay·clay minerals, or ion-exchange layered compounds;
      (b-3) heteropoly-compounds; and
      (b-4) halogenated lanthanoid compounds.

2. An olefin polymerization catalyst, according to claim 1 which further comprises
   (C) an oxygen-containing compound or nitrogen-containing compound.

3. The olefin polymerization catalyst according to claim 1, wherein the catalyst is prepared from
   (A) a transition metal compound or lanthanoid compound containing two or more atoms selected from the group consisting of boron, nitrogen, oxygen, phosphorus, sulfur, and selenium;
   (B) a Lewis acid selected from the group of compounds (b-1) to (b-4) below:
      (b-1) ionic-bonding compounds having a $CdCl_2$ type or a $CdI_2$ type of layered crystal structure;
      (b-2) clay·clay minerals, or ion-exchange layered compounds;
      (b-3) heteropoly-compounds; and
      (b-4) halogenated lanthanoid compounds;
   (C) an oxygen-containing compound or nitrogen-containing compound; and optionally
   (D) an inactivating compound which is capable of reacting with said oxygen-containing compound or nitrogen-containing compound
   (C) to make the oxygen-containing compound or nitrogen-containing compound inactive to the compound (A).

4. The olefin polymerization catalyst as claimed in any one of claims 1 to 3, wherein the transition metal compound or lanthanoid compound (A) is selected from the compounds represented by Formulas (I) to (XXXII):

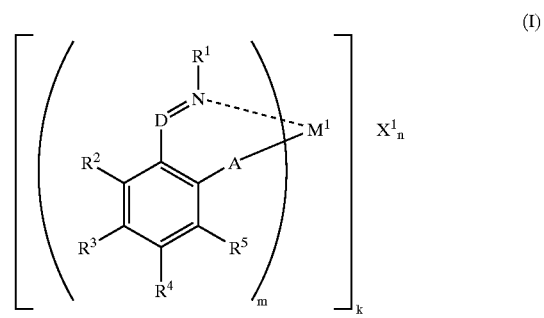

(I)

wherein $M^1$ represents a transition metal atom selected from Groups 3–11 of Periodical Table;

k represents an integer of 1–6;

m represents an integer of 1–6;

A represents an oxygen atom, a sulfur atom, a selenium atom, or a nitrogen atom having a substituent —$R^6$;

D represents a nitrogen atom, a phosphorus atom, or a carbon atom having a substituent —$R^7$;

$R^1$–$R^7$ may be the same or different and $R^1$–$R^7$ represent a hydrogen atom, a halogen atom, a hydrocarbon group, a heterocyclic compound residue, an oxygen-containing group, a nitrogen-containing group, a boron-containing group, a sulfur-containing group, a phosphorus-containing group, a silicon-containing group, a germanium-containing group, or a tin-containing group; and two or more thereof may be joined together to form one or more rings; when m is 2 or more, two or more of $R^1$ groups, of $R^2$ groups, of $R^3$ groups, of $R^4$ groups, of $R^5$ groups, of $R^6$ groups, and of $R^7$ groups may be the same or different; and when m is 2 or more, one of the $R^1$-$R^7$ groups in one ligand and one of the $R^1$-$R^7$ groups in another ligand may form a bonding group or a single bond; and a heteroatom contained in the $R^1$–$R^7$ groups may be coordinated with $M^1$ or bonded to $M^1$;

n represents a number satisfying the valence of $M^1$;

$X^1$ represents a hydrogen atom, a halogen atom, an oxygen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group, or a tin-containing groups; the plural $X^1$ groups may be the same or different and may be joined together to form one or more rings when n is 2 or more;

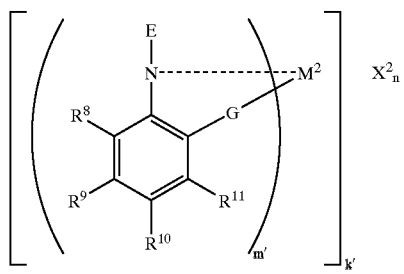

(II)

wherein $M^2$ represents a transition metal atom selected from Groups 3–11 of Periodical Table;

k' represents an integer of 1–6;

m' represents an integer of 1–6;

G represents an oxygen atom, a sulfur atom, a selenium atom, or a nitrogen atom having a substituent —$R^{12}$;

E represents —$R^{13}$ and —$R^{14}$ both bonding to N, or =C($R^{15}$)$R^{16}$;

$R^8$–$R^{16}$ may be the same or different and $R^8$–$R^{16}$ represent a hydrogen atom, a halogen atom, a hydrocarbon group, a heterocyclic compound residue, an oxygen-containing group, a nitrogen-containing group, a boron-containing group, a sulfur-containing group, a phosphorus-containing group, a silicon-containing group, a germanium-containing group, or a tin-containing group; and two or more thereof may be joined together to form one or more rings, excluding aromatic rings formed by joining of $R^8$ and $R^{13}$ or $R^8$ and $R^{14}$; one of the $R^8$–$R^{16}$ groups in one ligand and one of the $R^8$–$R^{16}$ groups in another ligand may form a bonding group or a single bond when m' is 2 or more; two or more of $R^8$ groups, of $R^9$ groups, of $R^{10}$ groups, of $R^{11}$ groups, of $R^{12}$ groups, of $R^{13}$ groups, of $R^{14}$ groups, of $R^{15}$ groups, and of $R^{16}$ groups may be the same or different; and a heteroatom contained in the $R^8$–$R^{16}$ groups may be coordinated with $M^2$ or bonded to $M^2$;

n represents a number satisfying the valence of $M^2$; and $X^2$ represents a hydrogen atom, a halogen atom, an oxygen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group, or a tin-containing groups; and the plural $X^2$ groups may be the same or different and may be joined together to form one or more rings when n is 2 or more;

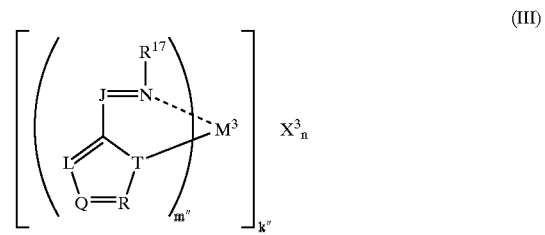

(III)

wherein $M^3$ represents a transition metal atom selected from Groups 3–11 of Periodical Table;

k" represents an integer of 1–6;

m" represents an integer of 1–6;

J represents a nitrogen atom, a phosphorus atom, or a carbon atom having a substituent —$R^{18}$;

T represents a nitrogen atom, or a phosphorus atom;

L represents a nitrogen atom, a phosphorus atom, or a carbon atom having a substituent —$R^{19}$;

Q represents a nitrogen atom, a phosphorus atom, or a carbon atom having a substituent —$R^{20}$;

R represents a nitrogen atom, a phosphorus atom, or a carbon atom having a substituent —$R^{21}$;

$R^{17}$–$R^{21}$ may be the same or different and $R^{17}$–$R^{21}$ represent a hydrogen atom, a halogen atom, a hydrocarbon group, a heterocyclic compound residue, an oxygen-containing group, a nitrogen-containing group, a boron-containing group, a sulfur-containing group, a phosphorus-containing group, a silicon-containing group, a germanium-containing group, or a tin-containing group; and two or more thereof may be joined together to form one or more rings; one of the groups of $R^{17}$–$R^{21}$ in one ligand and one of the groups of $R^{17}$–$R^{21}$ in another ligand may form a bonding group or a single bond when m" is 2 or more; two or more of $R^{17}$ groups, of $R^{19}$ groups, of $R^{19}$ groups, of $R^{20}$ groups, and of $R^{21}$ groups may be the same or different; and a heteroatom contained in the $R^{17}$–$R^{21}$ groups may be coordinated with $M^3$ or bonded to $M^3$;

n represents a number satisfying the valence of $M^3$;

$X^3$ represents a hydrogen atom, a halogen atom, an oxygen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group, or a tin-containing groups; and the plural $X^3$ groups may be the same or different and may be joined together to form one or more rings when n is 2 or more;

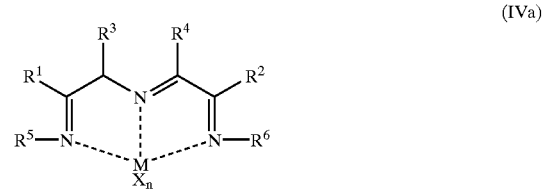

(IVa)

wherein M represents a transition metal atom selected from Groups 3–7 of Periodical Table;

R¹–R⁶ may be the same or different and R¹–R⁶ represent a hydrogen atom, a halogen atom, a hydrocarbon group, a heterocyclic compound residue, an oxygen-containing group, a nitrogen-containing group, a boron-containing group, a sulfur-containing group, a phosphorus-containing group, a silicon-containing group, a germanium-containing group, or a tin-containing group; and two or more thereof may be joined together to form an aromatic ring, an aliphatic ring, or a heteroatom-containing hydrocarbon ring, and the ring may have one or more additional substituents;

n represents a number satisfying the valence of M;

X represents a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group, or a tin-containing groups; the plural X groups may be the same or different and may be joined together to form one or more rings when n is 2 or more;

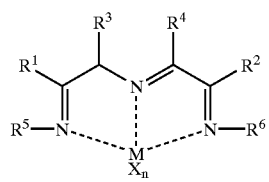

(IVb)

wherein M represents a transition metal atom selected from Groups 8–11 of Periodical Table;

R¹–R⁶ may be the same or different and R¹–R⁶ represent a hydrogen atom, a halogen atom, a hydrocarbon group, a heterocyclic compound residue, an oxygen-containing group, a nitrogen-containing group, a boron-containing group, a sulfur-containing group, a phosphorus-containing group, a silicon-containing group, a germanium-containing group, or a tin-containing group; and two or more thereof may be joined together to form an aromatic ring, an aliphatic ring, or a heteroatom-containing hydrocarbon ring, and the ring may have one or more additional substituents;

n represents a number satisfying the valence of M;

X represents a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group, or a tin-containing groups; the plural X groups may be the same or different and may be joined together to form one or more rings when n is 2 or more;

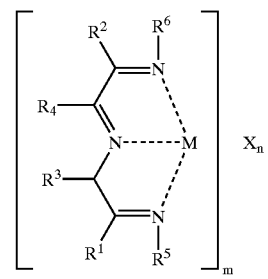

(IVc)

wherein M represents a transition metal atom selected from Groups 3–11 of Periodical Table;

m represents an integer of 1–6;

R¹–R⁶ may be the same or different and R¹–R⁶ represent a hydrogen atom, a halogen atom, a hydrocarbon group, a heterocyclic compound residue, an oxygen-containing group, a nitrogen-containing group, a boron-containing group, a sulfur-containing group, a phosphorus-containing group, a silicon-containing group, a germanium-containing group, or a tin-containing group; and two or more thereof may be joined together to form an aromatic ring, an aliphatic ring, or a heteroatom-containing hydrocarbon ring, and the ring may have one or more additional substituents;

n represents a number satisfying the valence of M; and

X represents an oxygen atom when n is 1, and when n is 2 or more, at least one X is an oxygen atom, and other X is a hydrogen atom, a halogen atom, an oxygen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group, or a tin-containing groups; the plural X groups may be the same or different and may be joined together to form one or more rings;

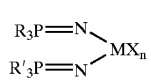

(V)

wherein M represents a transition metal atom selected from Groups 3–6 of Periodic Table;

R and R' may be the same or different and R and R' represent a hydrogen atom, a hydrocarbon group, a halogenated hydrocarbon group, an organic silyl group, or a substituent having at least one element selected from nitrogen, oxygen, phosphorus, sulfur, and silicon;

n represents a number satisfying the valence of M;

X represents a hydrogen atom, a halogen atom, an oxygen atom, a hydrocarbon group, a halogenated hydrocarbon group, an oxygen-containing group, a sulfur-containing group, a silicon-containing group, or a nitrogen-containing group; the plural X groups may be the same or different and may be joined together to form one or more rings when n is 2 or more;

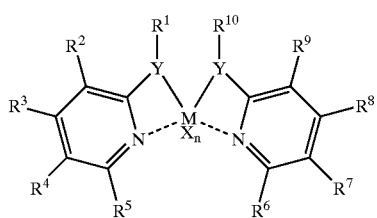
(VI)

wherein M represents a transition metal atom selected from Groups 4 or 5 of Periodic Table;

$R^1$–$R^{10}$ may be the same or different and $R^1$–$R^{10}$ represent a hydrogen atom, a hydrocarbon group, a halogenated hydrocarbon group, an organic silyl group, or a hydrocarbon group substituted with a substituent having at least one element selected from nitrogen, oxygen, phosphorus, sulfur, and silicon; and the groups of $R^1$–$R^{10}$ may be joined together to form one or more rings;

n represents a number satisfying the valence of M;

X represents a hydrogen atom, a halogen atom, an oxygen atom, a hydrocarbon group, a halogenated hydrocarbon group, an oxygen-containing group, a sulfur-containing group, a silicon-containing group, or a nitrogen-containing group; the plural X groups may be the same or different when n is 2 or more; and Y represents an atom of Group 15 or 16 of Periodic Table;

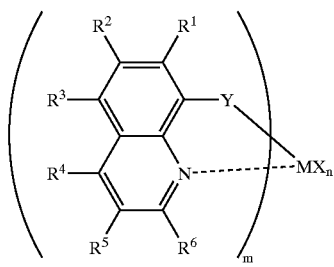
(VII)

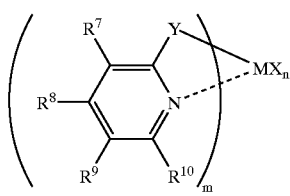
(VIII)

wherein M represents a transition metal atom selected from Groups 4 or 5 of Periodic Table;

$R^1$–$R^6$ and $R^7$–$R^{10}$ may be the same or different and $R^1$–$R^6$ and $R^7$–$R^{10}$ represent a hydrogen atom, a hydrocarbon group, a halogenated hydrocarbon group, an organic silyl group, or a hydrocarbon group substituted with a substituent having at least one element selected from nitrogen, oxygen, phosphorus, sulfur, and silicon; and any of the $R^1$–$R^6$ groups and the $R^7$–$R^{10}$ groups may be joined together to form one or more rings;

m represents an integer of 1–6;

n represents a number satisfying the valence of M;

X represents a hydrogen atom, a halogen atom, an oxygen atom, a hydrocarbon group, a halogenated hydrocarbon group, an oxygen-containing group, a sulfur-containing group, a silicon-containing group, or a nitrogen-containing group; the plural X groups may be the same or different when n is 2 or more; and Y represents an atom of Group 15 or 16 of Periodic Table;

(IX)

wherein M represents a transition metal atom selected from Groups 3–6 of Periodic Table;

R and R' may be the same or different and R and R' represent a hydrogen atom, a hydrocarbon group, a halogenated hydrocarbon group, an organic silyl group, or a substituent having at least one element selected from nitrogen, oxygen, phosphorus, sulfur, and silicon;

m represents an integer of 0–2;

n represents an integer of 1–5;

A represents an atom of Group 13–16 of Periodic Table, and when n is 2 or more, the plural A atoms may be the same or different;

E represents a substituent having at least one element selected from carbon, hydrogen, oxygen, halogen, nitrogen, sulfur, phosphorus, boron, and silicon; the plural E substituents may be the same or different, and two or more of the E substituents may be joined together to form one or more rings;

p is a number satisfying the valence of M;

X represents a hydrogen atom, a halogen atom, an oxygen atom, a hydrocarbon group, a halogenated hydrocarbon group, an oxygen-containing group, a sulfur-containing group, a silicon-containing group, or a nitrogen-containing group; the plural X groups may be the same or different when p is 2 or more;

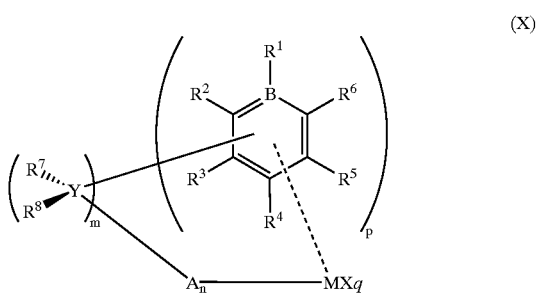
(X)

wherein M represents a transition metal atom selected from Groups 3–11 of Periodic Table;

m represents an integer of 0–3;

n represents an integer of 0–1;

p represents an integer of 1–3;

$R^1$–$R^8$ may be the same or different and $R^1$–$R^8$ represent a hydrogen atom, a halogen atom, a hydrocarbon group, a halogenated hydrocarbon group, an oxygen-containing group, a sulfur-containing group, a silicon-containing group, or a nitrogen-containing group, and two or more thereof may be joined together to form one or more rings;

q represents a number satisfying the valence of M;

X represents a hydrogen atom, a halogen atom, an oxygen atom, a hydrocarbon group, a halogenated hydrocarbon group, an oxygen-containing group, a sulfur-containing group, a silicon-containing group, or a nitrogen-containing group; the plural X groups may be the same or different when q is 2 or more;

Y represents a group forming a bridge between A and a boratabenzene ring when m is 1–3, and is a carbon atom, a silicon atom, or a germanium atom; and A is an atom of Groups 14–16 of Periodic Table;

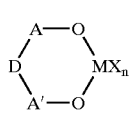

(XIa)

wherein M represents a transition metal atom selected from Groups 3–11 of Periodic Table;

A and A' may be the same or different and A and A' represent a hydrocarbon group, a halogenated hydrocarbon group; a hydrocarbon group having an oxygen-containing group, a sulfur-containing group, or a silicon-containing group; a halogenated hydrocarbon group having an oxygen-containing group, a sulfur-containing group, or a silicon-containing group;

D may be present or absent, and when present, D is a group forming a bridge between A and A', D represents a hydrocarbon group, a halogenated hydrocarbon group, an oxygen atom, a sulfur atom, or a group represented by $R^1R^2Z$ wherein $R^1$ and $R^2$ may be the same or different and $R^1$ and $R^2$ represents a hydrocarbon group or a hydrocarbon group containing at least one heteroatom, and may be joined together to form a ring, and Z represents a carbon atom, a nitrogen atom, a sulfur atom, a phosphorus atom, or a silicon atom, and A and A' may be directly bonded;

n represents a number satisfying the valence of M;

X represents a hydrogen atom, a halogen atom, a hydrocarbon group, a halogenated hydrocarbon group, an oxygen-containing group, a sulfur-containing group, a silicon-containing group, or a nitrogen-containing group; the plural X groups may be the same or different and may be joined together to form one or more rings when n is 2 or more;

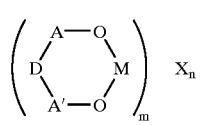

(XIb)

wherein M represents a transition metal atom selected from Groups 3–11 of Periodic Table;

m represents an integer of 1–6;

A and A' may be the same or different and A and A' represent a hydrocarbon group, a halogenated hydrocarbon group; a hydrocarbon group having an oxygen-containing group, a sulfur-containing group, or a silicon-containing group; or a halogenated hydrocarbon group having an oxygen-containing group, a sulfur-containing group, or a silicon-containing group;

D may be present or absent, and when present, D is a group forming a bridge between A and A', D represents a hydrocarbon group, a halogenated hydrocarbon group, an oxygen atom, a sulfur atom, or a group represented by $R^1R^2Z$ wherein $R^1$ and $R^2$ may be the same or different and $R^1$ and $R^2$ represents a hydrocarbon group or a hydrocarbon group containing at least one heteroatom, and may be joined together to form a ring, and Z represents a carbon atom, a nitrogen atom, a sulfur atom, a phosphorus atom, or a silicon atom; and A and A' may be directly bonded;

n represents a number satisfying the valence of M;

X represents an oxygen atom when n is 1, and at least one X is an oxygen atom, and other X is a hydrogen atom, a halogen atom, an oxygen atom, a hydrocarbon group, a halogenated hydrocarbon group, an oxygen-containing group, a sulfur-containing group, a silicon-containing group, or a nitrogen-containing group when n is 2 or more; the plural X groups may be the same or different and may be joined together to form one or more rings when n is 2 or more;

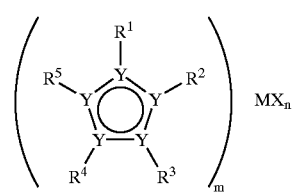

(XII)

wherein M represents a transition metal atom selected from Groups 3–11 of Periodic Table;

Y may be the same or different, Y represents an atom of Group 13–15 of Periodic Table and at least one of the Y atoms is other than carbon;

m represents an integer of 1–6;

$R^1$–$R^5$ are present when the atom Y to be bonded thereto is an atom of Group 14 of Periodic Table, and may be the same or different and represent a hydrogen atom, a halogen atom, a hydrocarbon group, a halogenated hydrocarbon group, an organic silyl group, or a hydrocarbon group substituted with a substituent containing at least one element selected from nitrogen, oxygen, phosphorus, sulfur, and silicon; and two or more of the groups $R^1$–$R^5$ may be joined to form one or more rings;

n represents a number satisfying the valence of M;

X represents a hydrogen atom, a halogen atom, an oxygen atom, a hydrocarbon group, a halogenated hydrocarbon group, an oxygen-containing group, a sulfur-containing group, a silicon-containing group, or a nitrogen-containing group; the plural X groups may be the same or different and may be joined together to form one or more rings when n is 2 or more;

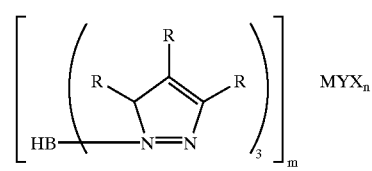

(XIII)

wherein M represents a transition metal atom selected from Groups 3–11 of Periodic Table;

m represents an integer of 1–6;

R may be the same or different and R represents a hydrogen atom, a hydrocarbon group, or a halogenated hydrocarbon group; two or more thereof may be joined together to form one or more rings;

n represents a number satisfying the valence of M;

X represents a hydrogen atom, a halogen atom, an oxygen atom, a hydrocarbon group, a halogenated hydrocarbon group, an oxygen-containing group, a sulfur-containing group, a silicon-containing group, or a nitrogen-containing group; the plural X groups may be the same or different and may be joined together to form one or more rings when n is 2 or more; and Y may be present or absent, and when present, Y is an atom selected from the atoms of Groups 15 and 16 of Periodic Table;

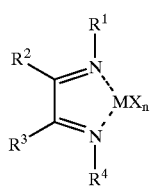

(XIVa)

wherein M represents a transition metal atom selected from Groups 3–7 and 11 of Periodic Table;

$R^1$–$R^4$ represent a hydrocarbon group, a halogenated hydrocarbon group, an organic silyl group, or a hydrocarbon group substituted with a substituent containing at least one element selected from nitrogen, oxygen, phosphorus, sulfur, and silicon; two or more of $R^1$–$R^4$ may be joined to form one or more rings;

n represents a number satisfying the valence of M; and

X represents a hydrogen atom, a halogen atom, a hydrocarbon group, a halogenated hydrocarbon group, an oxygen-containing group, a sulfur-containing group, a silicon-containing group, or a nitrogen-containing group; the plural X groups may be the same or different when n is 2 or more;

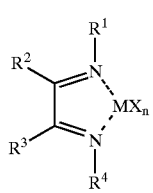

(XIVb)

wherein M represents a transition metal atom selected from Groups 8–10 of Periodic Table;

$R^1$–$R^4$ may be the same or different and $R^1$–$R^4$ represent a hydrocarbon group, a halogenated hydrocarbon group, an organic silyl group, or a hydrocarbon group substituted with one or more substituents containing at least one element selected from nitrogen, oxygen, phosphorus, sulfur, and silicon; two or more of the $R^1$–$R^4$ groups may be joined to form one or more rings;

n represents a number satisfying the valence of M;

X represents a hydrogen atom, a halogen atom, a hydrocarbon group, a halogenated hydrocarbon group, an oxygen-containing group, a sulfur-containing group, a silicon-containing group, or a nitrogen-containing group; the plural X groups may be the same or different when n is 2 or more;

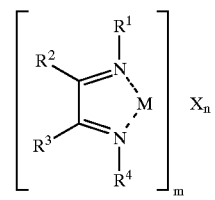

(XIVc)

wherein M represents a transition metal atom selected from Groups 3–11 of Periodic Table;

m represents an integer of 1–6;

$R^1$–$R^4$ may be the same or different and represent a hydrocarbon group, a halogenated hydrocarbon group, an organic silyl group, or a hydrocarbon group substituted with one or more substituents containing at least one element selected from nitrogen, oxygen, phosphorus, sulfur, and silicon; two or more of the $R^1$–$R^4$ groups may be joined to form one or more rings;

n represents a number satisfying the valence of M;

X represents an oxygen atom when n is 1; when n is 2 or more, at least one X represents an oxygen atom, and the rest of the X represents a hydrogen atom, a halogen atom, an oxygen atom, a hydrocarbon group, a halogenated hydrocarbon group, an oxygen-containing group, a sulfur-containing group, a silicon-containing group, or a nitrogen-containing group; the plural X groups may be the same or different when n is 2 or more;

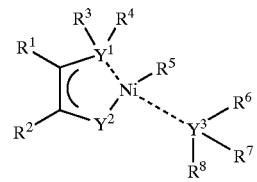

(XV)

wherein $Y^1$ and $Y^3$ represent respectively an atom of Group 15 of Periodic Table, and $Y^2$ represents an atom of Group 16 of Periodic Table;

$R^1$–$R^8$ may be the same or different and represent a hydrogen atom, a halogen atom, a hydrocarbon group, a halogenated hydrocarbon group, an oxygen-containing group, a sulfur-containing group, or a silicon-containing group; two or more of thereof may be joined to form one or more rings;

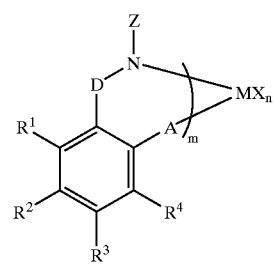

(XVI)

wherein M represents a transition metal atom selected from Groups 3–11 of Periodic Table;

m represents an integer of 1–6;

A represents an oxygen atom, a sulfur atom, a selenium atom, or a nitrogen atom having a substituent —R$^5$;

D represents a group of —C(R$^6$) (R$^7$)—, —Si (R$^8$)(R$^9$)—, —P(O)(R$^{10}$)—, —P(R$^{11}$)—, —SO—, or —S—;

Z represents groups of —R$^{12}$ and —R$^{13}$ both bonding to N, =C(R$^{14}$)R$^{15}$, or =NR$^{16}$;

R$^1$–R$^{16}$ may be the same or different and represent a hydrogen atom, a halogen atom, a hydrocarbon group, a heterocyclic compound residue, an oxygen-containing group, a nitrogen-containing group, a boron-containing group, a sulfur-containing group, a phosphorus-containing group, a silicon-containing group, a germanium-containing group, or a tin-containing group; and two or more thereof may be joined together to form one or more rings; when m is 2 or more, two of the R$^1$–R$^{16}$ groups may be linked together;

n represents a number satisfying the valence of M;

X represents a hydrogen atom, a halogen atom, an oxygen atom, a hydrocarbon group, an oxygen-containing group, a sulfur-containing group, a nitrogen-containing group, a boron-containing group, an aluminum-containing group, a phosphorus-containing group, a halogen-containing, group, a heterocyclic compound residue, a silicon-containing group, a germanium-containing group, or a tin-containing group; the plural X groups may be the same or different and may be joined together to form one or more rings when n is 2 or more;

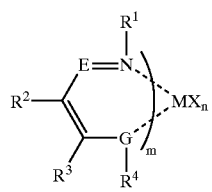

(XVII)

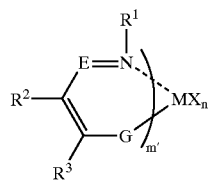

(XVIII)

wherein M represents a transition metal atom selected from Groups 3–11 of Periodic Table;

m represents an integer of 1–3;

m' represents an integer of 1–6;

E represents a nitrogen atom, or a carbon atom having a substituent —R$^5$;

G represents an oxygen atom, a sulfur atom, a selenium atom, or a nitrogen atom having a substituent —R$^6$;

R$^1$–R$^6$ may be the same or different and represent a hydrogen atom, a halogen atom, a hydrocarbon group, a heterocyclic compound residue, an oxygen-containing group, a nitrogen-containing group, a boron-containing group, a sulfur-containing group, a phosphorus-containing group, a silicon-containing group, a germanium-containing group, or a tin-containing group; and two or more thereof may be joined together to form one or more rings; two of the groups R$^1$–R$^6$ may be linked together when m or m' is 2 or more;

n represents a number satisfying the valence of M;

X represents a hydrogen atom, a halogen atom, an oxygen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group, or a tin-containing group; the plural X groups may be the same or different and may be joined together to form one or more rings when n is 2 or more;

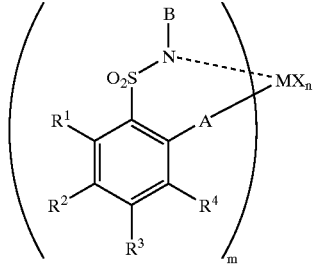

(XIX)

wherein M represents a transition metal atom selected from Groups 3–11 of Periodic Table;

m represents an integer of 1–6;

A represents an oxygen atom, a sulfur atom, a selenium atom, or a nitrogen atom having a substituent —R$^5$;

B represents groups of —R$^6$ and —R$^7$ both bonding to N, =C(R$^8$)R$^9$, or =NR$^{10}$;

R$^1$–R$^{10}$ may be the same or different and represent a hydrogen atom, a halogen atom, a hydrocarbon group, a heterocyclic compound residue, an oxygen-containing group, a nitrogen-containing group, a boron-containing group, a sulfur-containing group, a phosphorus-containing group, a silicon-containing group, a germanium-containing group, or a tin-containing group; and two or more thereof may be joined together to form one or more rings; when m is 2 or more, one of the R$^1$–R$^{10}$ groups of one ligand and one of the R$^1$–R$^{10}$ groups of another ligand may be linked together, and two or more of the R$^1$ groups, of the R$^2$ groups, of the R$^3$ groups, of the R$^4$ groups, of the R$^5$ groups, of the R$^6$ groups, of the R$^7$ groups, of the R$^8$ groups, of the R$^9$ groups, or of the R$^{10}$ groups may be the same or different;

n represents a number satisfying the valence of M;

X represents a hydrogen atom, a halogen atom, an oxygen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group, or a tin-containing group; the plural X groups may be the same or different and may be joined together to form one or more rings when n is 2 or more;

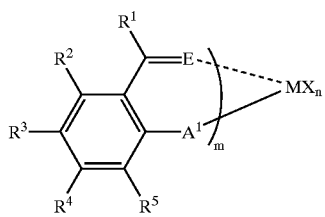

(XXa)

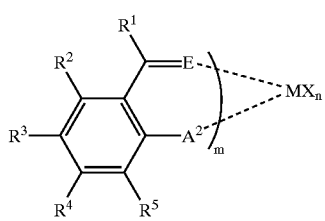

(XXIa)

wherein M represents a transition metal atom selected from Groups 3 and 4 of Periodic Table;

$A^1$ represents an oxygen atom, a sulfur atom, or a hydrocarbon-substituted nitrogen atom;

$A^2$ represents a hydrocarbon-substituted oxygen atom, a hydrocarbon-substituted sulfur atom, or a hydrocarbon-substituted nitrogen atom;

E represents an oxygen atom, or a sulfur atom;

m represents an integer of 1–2;

$R^1$–$R^5$ may be the same or different and represent a hydrocarbon group, a hydrogen atom, or a hydrocarbon-substituted silyl group;

n represents a number satisfying the valence of M;

X represents a hydrogen atom, a halogen atom, an oxygen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group, or a tin-containing group; and the plural X groups may be the same or different and may be joined together to form one or more rings when n is 2 or more;

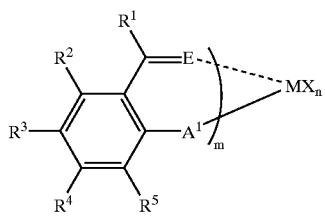

(XXb)

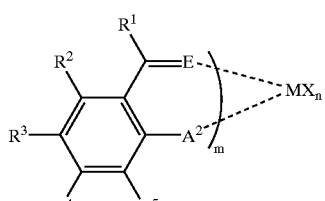

(XXIb)

wherein M represents a transition metal atom selected from Groups 5–11 of Periodic Table;

$A^1$ represents an oxygen atom, a sulfur atom, or a hydrocarbon-substituted nitrogen atom;

$A^2$ represents a hydrocarbon-substituted oxygen atom, a hydrocarbon-substituted sulfur atom, or a hydrocarbon-substituted nitrogen atom;

E represents an oxygen atom, or a sulfur atom;

m represents an integer of 1–2;

$R^1$–$R^5$ may be the same or different and represent a hydrocarbon group, a hydrogen atom, or a hydrocarbon-substituted silyl group;

n represents a number satisfying the valence of M;

X represents a hydrogen atom, a halogen atom, an oxygen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group, or a tin-containing group; the plural X groups may be the same or different and may be joined together to form one or more rings when n is 2 or more;

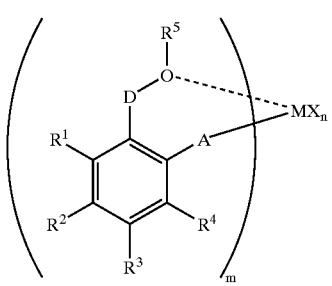

(XXII)

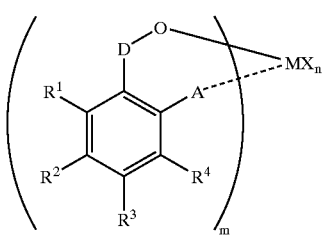

(XXIII)

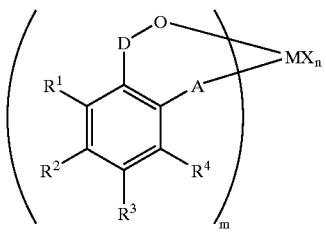

(XXIV)

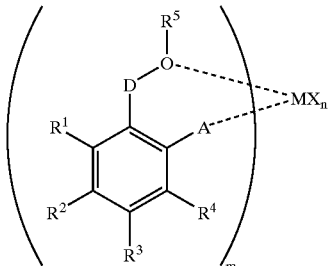

(XXV)

wherein M represents a transition metal atom selected from Groups 3–11 of Periodic Table;

m represents an integer of 1–6;

A represents an oxygen atom, a sulfur atom, a selenium atom, or a nitrogen atom and A may have a substituent $R^6$ depending on the mode of bonding to the metal M;

D represents a group of —C($R^7$) ($R^8$)—, —Si($R^9$) ($R^{10}$)—, —CO—, —SO$_2$—, —SO—, or —P(O) (O$R^{11}$);

$R^1$–$R^{11}$ may be the same or different and represent a hydrogen atom, a halogen atom, a hydrocarbon group, a heterocyclic compound residue, an oxygen-containing group, a nitrogen-containing group, a boron-containing group, a sulfur-containing group, a phosphorus-containing group, a silicon-containing group, a germanium-containing group, or a tin-containing group; and two or more thereof may be joined together to form one or more rings; and when m is 2 or more, two of the groups represented by $R^1$–$R^{11}$ groups may be linked, and each of the $R^1$–$R^{11}$ groups may be the same or different independently;

n is a number satisfying the valence of M;

X represents a hydrogen atom, a halogen atom, an oxygen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group, or a tin-containing group; and the plural X groups may be the same or different and may be joined together to form one or more rings when n is 2 or more;

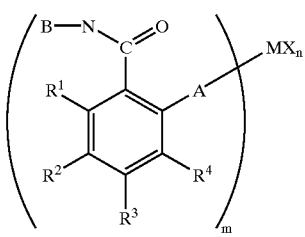

(XXVI)

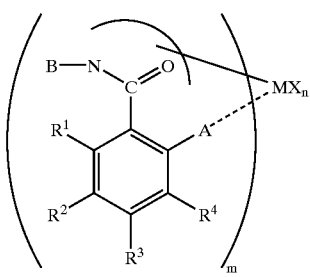

(XXVII)

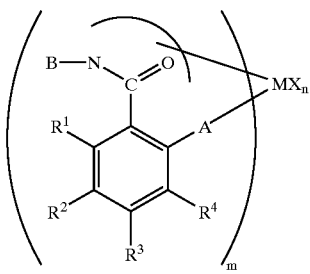

(XXVIII)

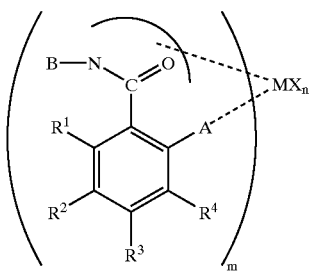

(XXIX)

wherein M represents a transition metal atom selected from Groups 3–11 of Periodic Table;

m represents an integer of 1–6;

A represents an oxygen atom, a sulfur atom, a selenium atom, or a nitrogen atom; the atom A may have a substituent $R^5$ depending on the mode of bonding to the metal M;

B represents groups of —$R^6$ and —$R^7$ both bonding to N, =$NR^8$, or °$CR^9R^{10}$;

$R^1$–$R^{10}$ may be the same or different and represent a hydrogen atom, a halogen atom, a hydrocarbon group, a heterocyclic compound residue, an oxygen-containing group, a nitrogen-containing group, a boron-containing group, a sulfur-containing group, a phosphorus-containing group, a silicon-containing group, a germanium-containing group, or a tin-containing group; and two or more thereof may be joined together to form one or more rings; when m is 2 or more, two of the $R^1$–$R^{10}$ groups may be linked together, and the each $R^1$–$R^{10}$ group may be the same or different;

n represents a number satisfying the valence of M;

X represents a hydrogen atom, a halogen atom, an oxygen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group, or a tin-containing group; and the plural X groups may be the same or different and may be joined together to form one or more rings when n is 2 or more;

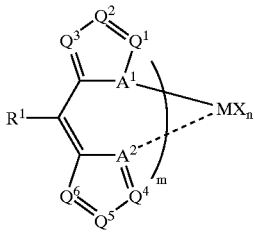

(XXX)

wherein M represents a transition metal atom selected from Groups 3–11 of Periodic Table;

$A^1$ and $A^2$ may be the same or different and represent a nitrogen atom or a phosphorus atom;

$Q^1$–$Q^6$ may be the same or different and represent a nitrogen atom, a phosphorus atom, or a carbon atom having a substituent-$R^2$; when two or more of $Q^1$–$Q^6$ have respectively a carbon atom having an R²-substituent, the R² substituents may be the same or different;

R¹ and R² may be the same or different and represent a hydrogen atom, a halogen atom, a hydrocarbon group, a heterocyclic compound residue, an oxygen-containing group, a nitrogen-containing group, a boron-containing group, a sulfur-containing group, a phosphorus-containing group, a silicon-containing group, a germanium-containing group, or a tin-containing group; and two or more thereof may be joined together to form one or more rings;

m represents an integer of 1–6; when m is 2 or more, any of R¹ and R² of one ligand and any of R¹ and R² in another ligand may be linked together, and the plural R¹ groups, and the plural R² groups may respectively be the same or different;

n represents a number satisfying the valence of M;

X represents a hydrogen atom, a halogen atom, an oxygen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group, or a tin-containing group; and the plural X groups may be the same or different and may be joined together to form one or more rings when n is 2 or more;

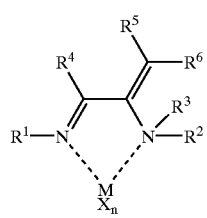

(XXXIa)

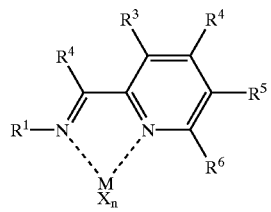

(XXXIIa)

wherein M represents a transition metal atom selected from Groups 3–7 of Periodic Table;

R¹–R⁶ may be the same or different and represent a hydrogen atom, a hydrocarbon group, a halogenated hydrocarbon group, an oxygen-containing group, a sulfur-containing group, a silicon-containing group, a nitrogen-containing group, or a phosphorus-containing group; and two or more thereof may be joined together to form one or more rings;

n represents a number satisfying the valence of M;

X represents a hydrogen atom, a halogen atom, an oxygen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group, or a tin-containing group; and the plural X groups may be the same or different and may be joined to form one or more rings when n is 2 or more;

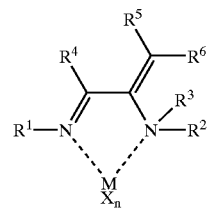

(XXXIb)

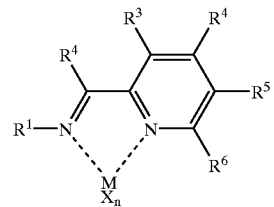

(XXXIIb)

wherein M represents a transition metal atom selected from Groups 8–11 of Periodic Table;

R¹–R⁶ may be the same or different and represent a hydrogen atom, a hydrocarbon group, a halogenated hydrocarbon group, an oxygen-containing group, a sulfur-containing group, a silicon-containing group, a nitrogen-containing group, or a phosphorus-containing group; and two or more thereof may be joined together to form one or more rings;

n represents a number satisfying the valence of M;

X represents a hydrogen atom, a halogen atom, an oxygen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group, or a tin-containing group; and the plural X groups may be the same or different and may be joined to form one or more rings when n is 2 or more.

5. The olefin polymerization catalyst according to any one of claims 1 to 3, wherein the Lewis acid (B) is at least one halogen compound selected from halogenated magnesium compounds, halogenated manganese compounds, halogenated iron compounds, halogenated cobalt compounds, and halogenated nickel compounds.

* * * * *